US010997325B2

(12) United States Patent
Austern et al.

(10) Patent No.: US 10,997,325 B2
(45) Date of Patent: May 4, 2021

(54) STRUCTURAL DESIGN SYSTEMS AND METHODS FOR AUTOMATIC EXTRACTION OF DATA FROM 2D FLOOR PLANS FOR RETENTION IN BUILDING INFORMATION MODELS

(71) Applicant: BeamUp, Ltd., Tel Aviv (IL)

(72) Inventors: Guy Austern, Tel Aviv (IL); Tom Segev, Tel Aviv (IL); Yonatan Goyhman, Tel Aviv (IL); Stephane Levy, Tel Aviv (IL)

(73) Assignee: BEAMUP LTD., Tel Aviv (IL)

( * ) Notice: Subject to any disclaimer, the term of this patent is extended or adjusted under 35 U.S.C. 154(b) by 0 days.

(21) Appl. No.: 17/013,476

(22) Filed: Sep. 4, 2020

(65) Prior Publication Data

US 2021/0073433 A1 Mar. 11, 2021

Related U.S. Application Data

(60) Provisional application No. 62/897,159, filed on Sep. 6, 2019, provisional application No. 62/940,040, filed
(Continued)

(51) Int. Cl.
*G06F 30/13* (2020.01)
*G06F 30/27* (2020.01)

(52) U.S. Cl.
CPC .............. *G06F 30/13* (2020.01); *G06F 30/27* (2020.01)

(58) Field of Classification Search
CPC ........... G06F 30/13; G06F 30/00; G06F 30/27
(Continued)

(56) References Cited

U.S. PATENT DOCUMENTS 5,021,976 A 6/1991 Wexelblat et al.
5,038,294 A 8/1991 Arakawa et al.
(Continued)

FOREIGN PATENT DOCUMENTS

EP 3-275-204 A1 1/2018
WO WO 2015/132691 A2 9/2015

OTHER PUBLICATIONS

Zeng, Zhiliang et al., "Deep Floor Plan Recognition using a Multi-Task Network with Room-Boundary-Guided Attention", Aug. 2019. (Year: 2019).*
(Continued)

*Primary Examiner* — Cedric Johnson
(74) *Attorney, Agent, or Firm* — Finnegan, Henderson, Farabow, Garrett & Dunner LLP

(57) ABSTRACT

Systems and methods for extracting data from a 2D floor plan and retaining it in a building information model are disclosed. The system may include at least one processor configured to perform operations that may include accessing a 2D floor plan demarcating a plurality of rooms. Operations may include identifying, using a machine learning model, wall boundaries of the plurality of rooms. Operations may include storing the identified wall boundaries in a retention data structure. Operations may include generating a building information model, wherein the building information model includes the identified wall boundaries. Operations may include displaying, at an interface, a comparison of at least a portion of the 2D floor plan and the building information model. Operations may include receiving, from the interface, input based on the comparison. Operations may include updating the retention data structure based on the input.

29 Claims, 73 Drawing Sheets

Related U.S. Application Data on Nov. 25, 2019, provisional application No. 62/980,932, filed on Feb. 24, 2020, provisional application No. 63/016,131, filed on Apr. 27, 2020.

(58) Field of Classification Search
USPC .................................................. 703/1
See application file for complete search history.

(56) References Cited

U.S. PATENT DOCUMENTS

| | | | |
|---|---|---|---|
| 8,719,758 | B1 | 5/2014 | Knapp et al. |
| 9,230,366 | B1 | 1/2016 | McClendon et al. |
| 9,305,136 | B2 | 4/2016 | K M et al. |
| 10,049,297 | B1 | 8/2018 | Chen et al. |
| 10,606,963 | B2 | 3/2020 | Tiwari et al. |
| 2003/0097240 | A1 | 5/2003 | Atasoy |
| 2009/0024970 | A1 | 1/2009 | Saito et al. |
| 2010/0262298 | A1 | 10/2010 | Johnson et al. |
| 2012/0066306 | A1 | 3/2012 | Leacock et al. |
| 2012/0086568 | A1 | 4/2012 | Scott et al. |
| 2012/0259743 | A1 | 10/2012 | Pate |
| 2014/0137024 | A1 | 5/2014 | Curtis |
| 2014/0278268 | A1 | 9/2014 | Woolsley |
| 2015/0227644 | A1 | 8/2015 | Schultz |
| 2015/0317418 | A1 | 11/2015 | Sankarapandian et al. |
| 2016/0239199 | A1 | 8/2016 | Dharmalingam et al. |
| 2016/0253842 | A1 | 9/2016 | Shapira et al. |
| 2017/0076015 | A1* | 3/2017 | Patel ............. G06F 30/18 |
| 2017/0132568 | A1 | 5/2017 | Glunz |
| 2017/0208344 | A1 | 7/2017 | Mertens |
| 2018/0075168 | A1 | 3/2018 | Tiwari et al. |
| 2018/0120793 | A1 | 5/2018 | Tiwari et al. |
| 2018/0121571 | A1 | 5/2018 | Tiwari et al. |
| 2018/0143756 | A1* | 5/2018 | Mildrew ............. G06F 3/0482 |
| 2018/0268087 | A1 | 9/2018 | Tierney et al. |
| 2018/0276319 | A1 | 9/2018 | Tierney et al. |
| 2019/0026956 | A1 | 1/2019 | Guasebeck et al. |
| 2019/0139314 | A1 | 5/2019 | Marsh et al. |
| 2019/0188473 | A1 | 6/2019 | Witt et al. |
| 2019/0188477 | A1 | 6/2019 | Mair et al. |
| 2019/0205485 | A1 | 6/2019 | Rejeb et al. |
| 2019/0228115 | A1 | 7/2019 | Bergin et al. |
| 2019/0243928 | A1 | 8/2019 | Rejeb et al. |
| 2019/0280889 | A1 | 9/2019 | Malakuti et al. |
| 2020/0116493 | A1* | 4/2020 | Colburn ............. G06T 17/10 |
| 2020/0151923 | A1 | 5/2020 | Bergin et al. |
| 2020/0242201 | A1 | 7/2020 | Lafreniere et al. |
| 2020/0313978 | A1 | 10/2020 | Childers et al. |
| 2020/0334253 | A1 | 10/2020 | El Kaed et al. |
| 2020/0349351 | A1 | 11/2020 | Brook et al. |

OTHER PUBLICATIONS

Gimenez, Lucile et al., "Review: Reconstruction of 3D Building Information Models from 2D Scanned Plans", Apr. 11, 2015, Journal of Building Engineering 2, Elsevier, Ltd. (Year: 2015).*

Yin, Xuetao et al., "Generating 3D Building Models from Architectural Drawings: A Survey", Jan./Feb. 2009, IEEE Computer Society. (Year: 2009).*

Sacks, Rafael et al., "Semantic Enrichment for Building Information Modeling: Procedure for Compiling Inference Rules and Operators for Complex Geometry", 2017, J, Comput. Civ. Eng., 31. (Year: 2017).*

Ahmed et al., "Improved Automatic Analysis of Architectural Floor Plans", 2011 International Conference on Document Analysis and Recognition, Sep. 18-21, 2011, 864-869, 1520-5363/11, IEEE, Beijing, China.

Ahmed et al., "Automatic Room Detection and Room Labeling from Architectural Floor Plans", 2012 10th IAPR International Workshop on Document Analysis Systems, Mar. 27-29, 2012, 339-343, 978-0-7695-4661-2/12, IEEE, Gold Coast, Australia.

Baldwn, "The Future of Generative Design: Autodesk on Architecture and Machine Learning", Apr. 28, 2020, ArchDaily.

Barfield, "AI Architecture Generative Design Housing", Sep. 2019, Bricsys.

Berquist et al., "An Investigation of Generative Design for Heating, Ventilation, and Air-Conditioning", SimAUD 2017 Conference proceedings: Symposium on Simulation for Architecture and Urban Design, May 22-24, 2017, 155-162, Society for Modeling & Simulation International (SCS), Toronto, Canada.

Bloch and Sacks, "Comparing machine learning and rule-based inferencing for semantic enrichment of BIM models", Automation in Construction, Mar. 23, 2018, 256-272, 91, Elsevier, Amsterdam, Netherlands.

Bodor et al., "Optimal Camera Placement for Automated Surveillance Tasks", J Intel! Robot Syst, Oct. 3, 2007, 257-295, 50, Springer Science + Business Media B.V., Minneapolis, U.S.A.

Chaillou, "AI + Architecture: Towards a New Approach", Thesis, 2019, Harvard University Graduate School of Design, Cambridge, U.S.A.

Chvatal, "A Combinatorial Theorem in Plane Geometry", Journal of Combinatorial Theory, 1975, 39-41, 18, Centre de Recherches Mathematiques, Universite de Montreal, Canada.

Conru, "A Genetic Approach to the Cable Harness Routing Problem", Proceedings of the First IEEE Conference on Evolutionary Computation. IEEE World Congress on Computational Intelligence, Jun. 27-29, 1994, IEEE, Orlando, U.S.A.

De Las Heras et al., "Unsupervised Wall Detector in Architectural Floor Plans", 2013 12th International Conference on Document Analysis and Recognition, Aug. 25-28, 2013, IEEE, Washington, DC, U.S.A.

De Las Heras et al., "Statistical segmentation and structural recognition for floor plan interpretation", International Journal on Document Analysis and Recognition (IJDAR), Dec. 3, 2013, 221-237, 17(3), Springer-Verlag Berlin Heidelberg.

Dodge et al., "Parsing Floor Plan Images", 2017 Fifteenth IAPR International Conference on Machine Vision Applications (MVA), May 8-12, 2017, 358-361, MVA Organization, Nagoya, Japan.

Dominguez et al., "Semiautomatic detection of floor topology from CAD architectural drawings", Article, May 2012, Computer-Aided Design, Jaen, Spain.

Ekahau Pro, Wi-Fi Site Survey, Planning, WLAN Troubleshooting Software, Website, https://www.ekahau.com/products/ekahau-connect/pro/, Ekahau.

Erdem and Sclaroff, "Optimal Placement of Cameras in Floorplans to Satisfy Task Requirements and Cost Constraints", In Proc. of OMNIVIS Workshop, 2004.

Fischetti and Pisinger, "Optimizing wind farm cable routing considering power losses", European Journal of Operational Research, Nov. 1, 2018, 917-930, 270(3), Elsevier, Amsterdam, Netherlands.

Gimenez et al., "Review: reconstruction of 3D building information models from 2D scanned plans", Journal of Building Engineering, Jun. 2015, 24-35, 2, Elsevier, Amsterdam, Netherlands.

Gonzalez-Barbosa et al., "Optimal Camera Placement for Total Coverage", 2009 IEEE International Conference on Robotics and Automation, May 12-17, 2009, 844-848, IEEE, Kobe, Japan.

Horna et al., "Consistency constraints and 3D building reconstruction", Computer-Aided Design, 2009, 13-27, 41(1), Elsevier, Amsterdam, Netherlands.

Huang et al., "Graph theory-based approach for automatic recognition of CAD data", Engineering Applications of Artificial Intelligence, Mar. 6, 2008, 1073-1079, 21, Elsevier, Amsterdam, Netherlands.

Jiang and Bunke, "An optimal algorithm for extracting the regions of a plane graph", Pattern Recognition Letters, Jul. 1993, 553-558, 14(7), Elsevier, Amsterdam, Netherlands.

Kasper et al., "A machine learning approach for constrained sensor placement", 2015 American Control Conference, Jul. 1-3, 2015, 4479-4484, IEEE, Chicago, U.S.A.

Kiyota, "Promoting Open Innovations in Real Estate Tech: Provision of the LIFULL Home'S Data Set and Collaborative Studies", ICMR '18: Proceedings of the 2018 ACM on International Conference on Multimedia Retrieval, Jun. 11-14, 2018, 6, ACM, Yokohama, Japan.

(56) References Cited

OTHER PUBLICATIONS

Kritter et al., "On the optimal placement of cameras for surveillance and the underlying set cover problem", Applied Soft Computing Journal, Jan. 2019, 133-153, 74, Elsevier, Amsterdam, Netherlands.
Kroller et al., "A Novel Efficient Approach for Solving the Art Gallery Problem", WALCOM: Algorithms and Computation, Feb. 2013, 5-16, WALCOM, Kharagpur, India.
Liu, "Optimal Design of High-Rise Building Wiring Based on Ant Colony Optimization", Cluster Computing, Mar. 7, 2018, 3479-3486, 22(2), Springer Science+Business Media.
Liu et al., "Recent Advances in Camera Planning for Large Area Surveillance: A Comprehensive Review", ACM Computing Surveys, May 2016, 6:1-37, 49(1), Association for Computing Machinery, New York, U.S.A.
Liu et al., "Raster-to-Vector: Revisiting Floorplan Transformation", 2017 IEEE International Conference on Computer Vision, Oct. 1, 2017, 2214-2222, IEEE, Venice, Italy.
Lu et al., "Automatic analysis and integration of architectural drawings", International Journal of Document and Recognition (IJDAR), Aug. 26, 2006, 31-47, 9(1), Springer-Verlag.
Ma et al., "A Genetic Algorithm for the Optimization of Cable Routing", Systems and Computers in Japan, 2006, 61-71, 37(7), Wiley Periodicals.
Mace et al., "A System to Detect Rooms in Architectural Floor Plan Images", ACM International Conference Proceeding Series, Jun. 9, 2010, 167-174, Association for Computing Machinery, New York, U.S.A.
Murray et al., "Coverage optimization to support security monitoring", Computers, Environment and Urban Systems, Mar. 2007, 133-147, 31(2), Elsevier, Amsterdam, Netherlands.
Nagy et al., "Project Discover: An Application of Generative Design for Architectural Space Planning", SimAUD 2017 Conference proceedings: Symposium on Simulation for Architecture and Urban Design, May 2017, 59-66.
Pemarathne and Fernando, "Wire and cable routings and harness designing systems with AI, a Review", 2016 IEEE International Conference on Information and Automation for Sustainability (ICIAfS), Dec. 16-19, 2016, 1-6, IEEE, Galle, Sri Lanka.
Reddy and Conci, "Camera positioning for global and local coverage optimization", 2012 Sixth International Conference on Distributed Smart Cameras (ICDSC), Oct. 30-Nov. 2, 2012, 1-6, IEEE, Hong Kong, China.
Sacks et al., "Semantic Enrichment for Building Information Modeling: Procedure for Compiling Inference Rules and Operators for Complex Geometry", Journal of Computing in Civil Engineering, Nov. 1, 2017, 04017062-1-12, 31, ASCE.
Schafer et al., "Automatic Generation of Topological Indoor Maps for Real-Time Map-Based Localization and Tracking", 2011 International Conference on Indoor Positioning and Indoor Navigation, Sep. 21-23, 2011, 1-8, IEEE, Guimaraes, Portugal.
Schwartz et al., "Semantically Enriched BIM Life Cycle Assessment to Enhance Buildings' Environmental Performance", CIBSE Technical Symposium 2016, Apr. 2016, 1-14, Edinburgh, United Kingdom.
Semaan, "Optimal sensor placement using machine learning", Computers & Fluids, Dec. 15, 2017, 167-176, 159, Elsevier, Amsterdam, Netherlands.
Simeone et al., "BIM semantic-enrichment for built heritage representation", Automation in Construction, Jan. 2019, 122-137, 97, Elsevier, Amsterdam, Netherlands.
Tarabanis et al., "A Survey of Sensor Planning in Computer Vision", IEEE Transactions on Robotics and Automation, Feb. 1995, 86-104, 11(1), IEEE.
Vermeulen and El Ayoubi, "Using Generative Design in Construction Applications", https://medium.com/autodesk-university/using-generative-design-in-construction-applications-e268c785b004, Jan. 10, 2020, 1-17, Autodesk University.
Werbrouck et al., "Semantic enrichment of existing building geometry", Automation in Construction, Nov. 2020, 2-15, 119: 103286, Elsevier, Amsterdam, Netherlands.
Zeng et al., "Deep Floor Plan Recognition Using a Multi-Task Network with Room-Boundary-Guided Attention", 2019 IEEE/CVF International Conference on Computer Vision (ICCV), Oct. 2019, 9095-9103, IEEE, Seoul, South Korea.
Ziran and Marina!, "Object Detection in Floor Plan Images", Artificial Neural Networks in Pattern Recognition, Sep. 2019, 383-394, Springer.
"Demystifying Generative Design: For Architecture, Engineering, and Construction," AutoDesk®, pp. 1-9, https://damassets.autodesk.net/content/dam/autodesk/www/solutions/generative-design/autodesk-aec-generative-design-ebook.pdf (Accessed Sep. 11, 2020).
"Generative Design for Architecture, Engineering & Construction," AutoDesk®, pp. 1-10, https://www.autodesk.com/solutions/generative-design/architecture-engineering-construction (Accessed Sep. 11, 2020).
Doyle_2016 (Tier contracts and their effects on a provider's finances, Sep. 7, 2016). (Year: 2016).
AutoDesk_2017 (AutoCAD Architecture to Filter Scheduled Object by Classification in a Schedule Table Style, Mar. 23, 2017). (Year : 2017).
Friedman_2017 (Designing the Perfect Feature Comparison Table, Smashing Magazine, Aug. 15, 2017). (Year: 2017).
MEP-Holabird-Bid_ 2017 (Holabird Academy Elementary / Middle School City of Baltimore, MD BID SET Mar. 13, 2017) (Year: 2017).
Autodesk_2018 (About Wire Sizing, Revit Products Autodesk Help May 17, 2018). (Year: 2018).
Villagee_2018 (Generative Design for Architectural Space Planning the Case of the AU 2017 Exhibit Hall Layout, Autodesk University Jan. 10, 2018). (Year: 2018).
SQL_2016 (Modifying Data Through a View Microsoft Oct. 5, 2016). (Year: 2016).
Cauduro_2019 (MEP Modeling Made Easy with Dynamo CI 124118 AutoDesk University Aug. 29, 2019). (Year: 2019).
Sakaryali (An interactive computational approach to 3D layout design of single-family houses by evolutionary algorithms, Thesis (208 pages)). (Year: 2017).
Caldas (Generation of energy-efficient architecture solutions applying GENE_ARCH: An evolution-based generative design system, (12 pages)). (Year: 2007).

* cited by examiner

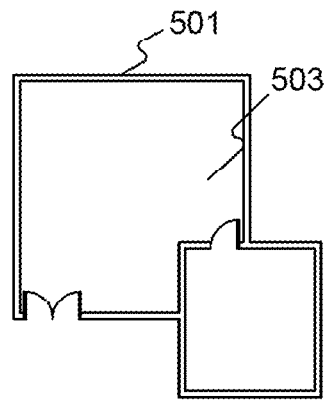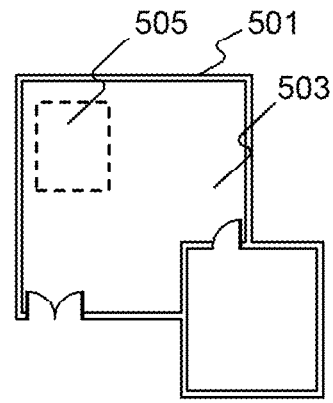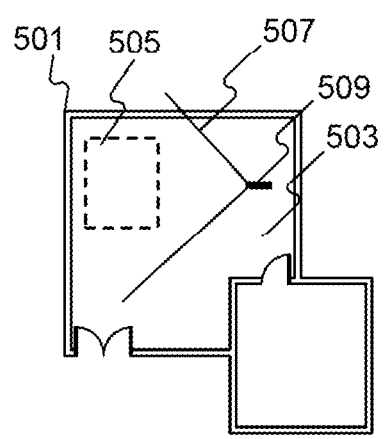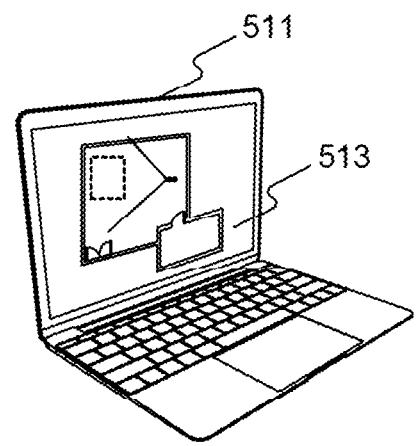
FIG. 5

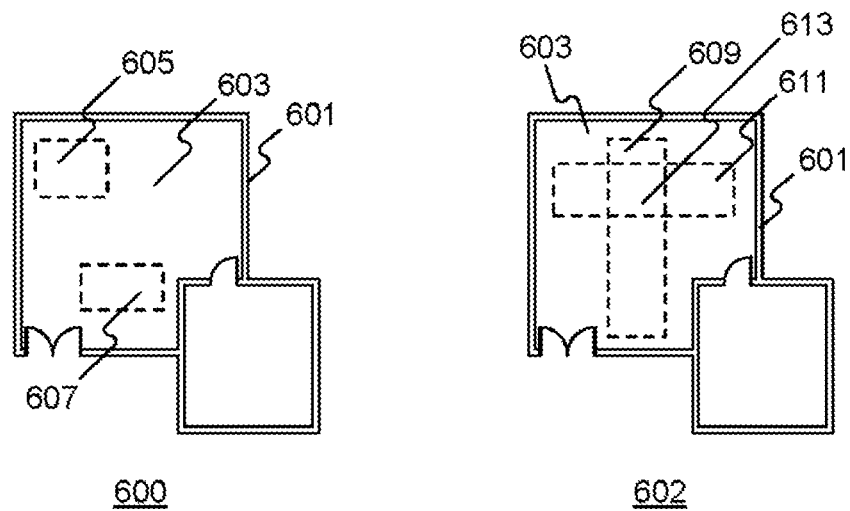
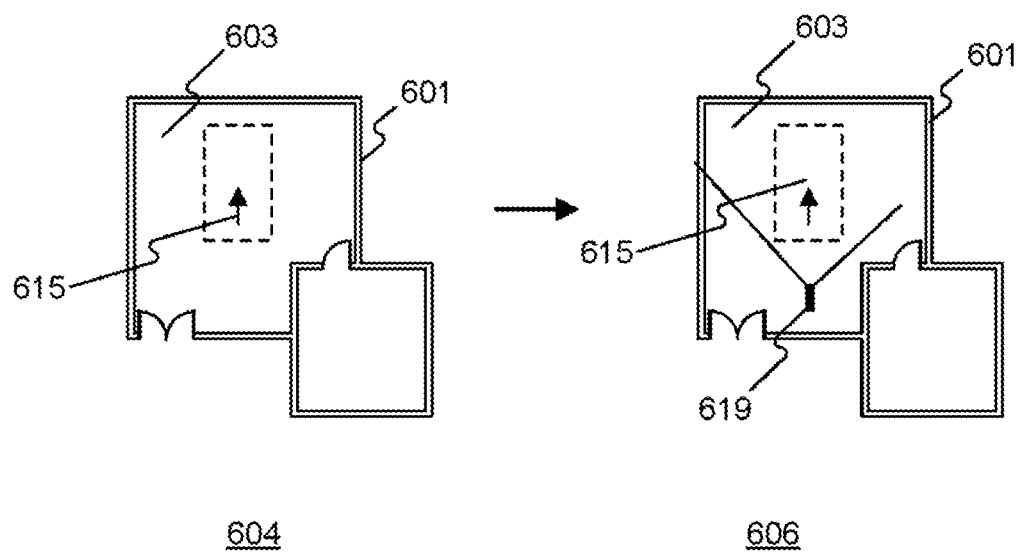
FIG. 6A

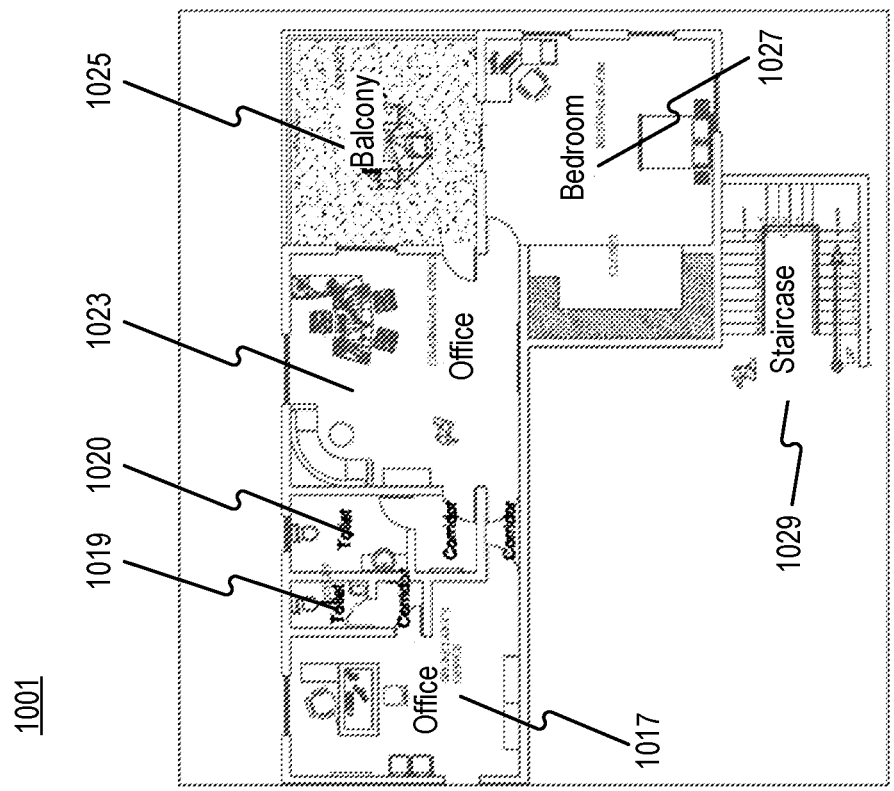
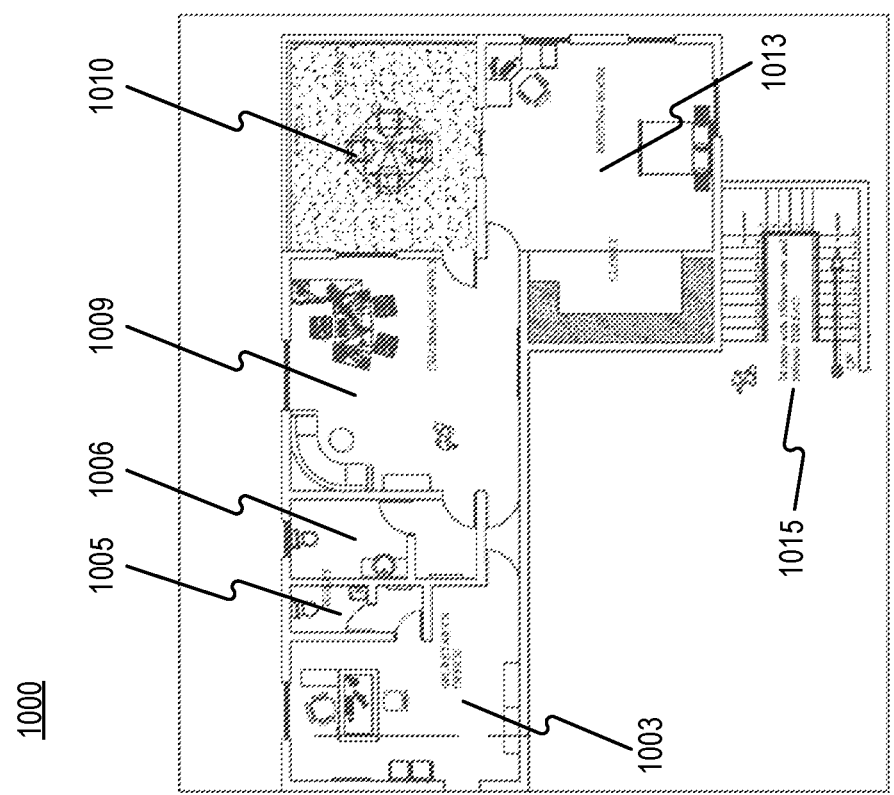
FIG. 10A

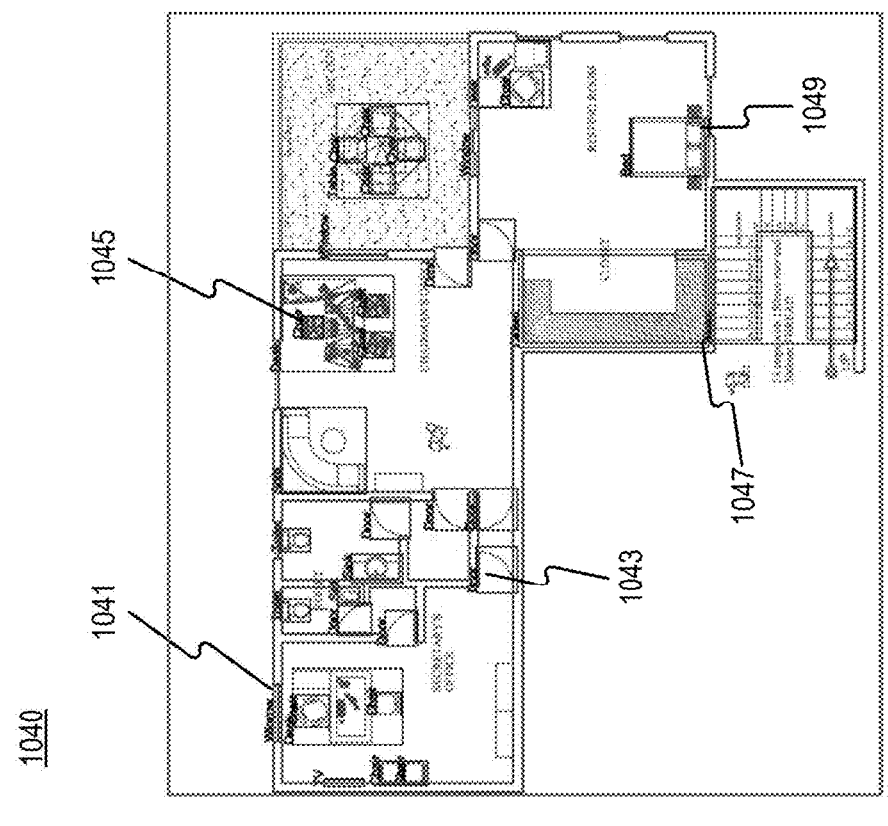
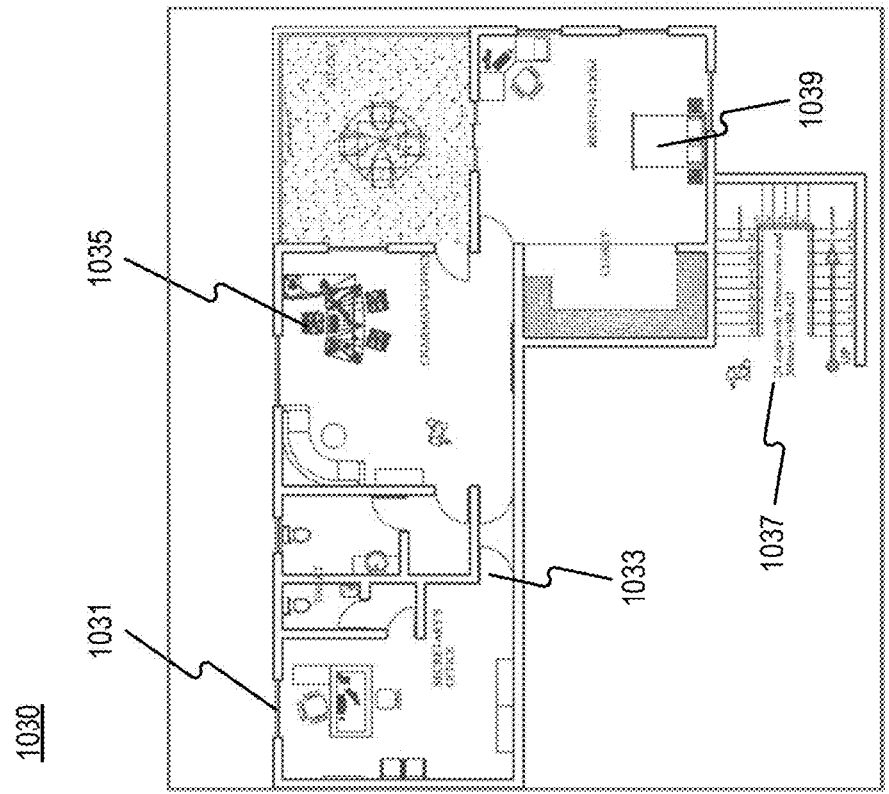
FIG. 10B

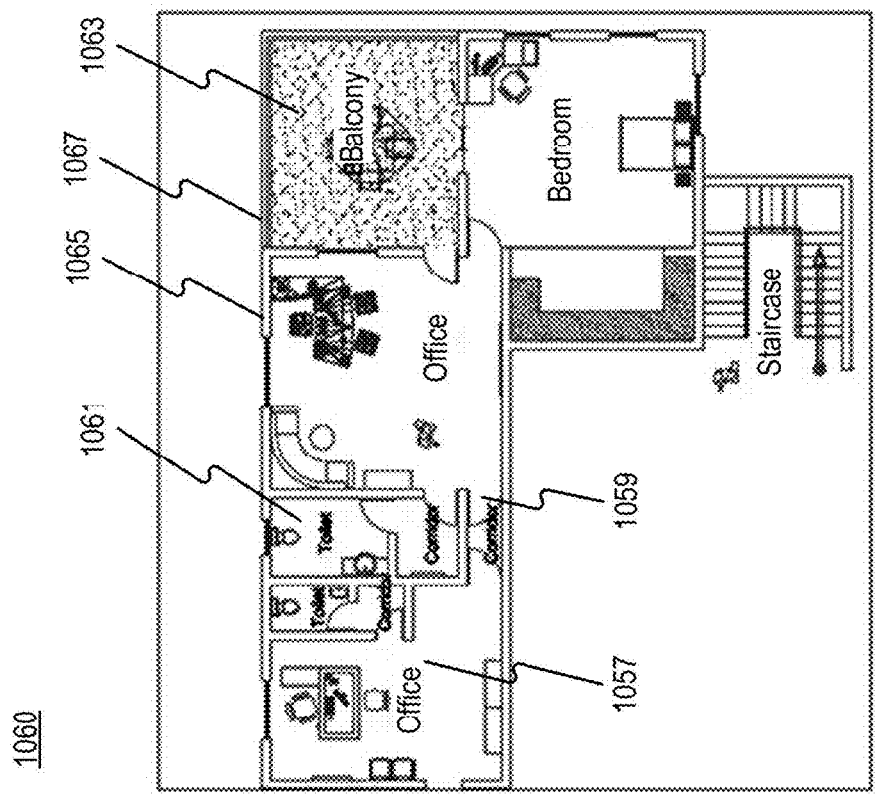
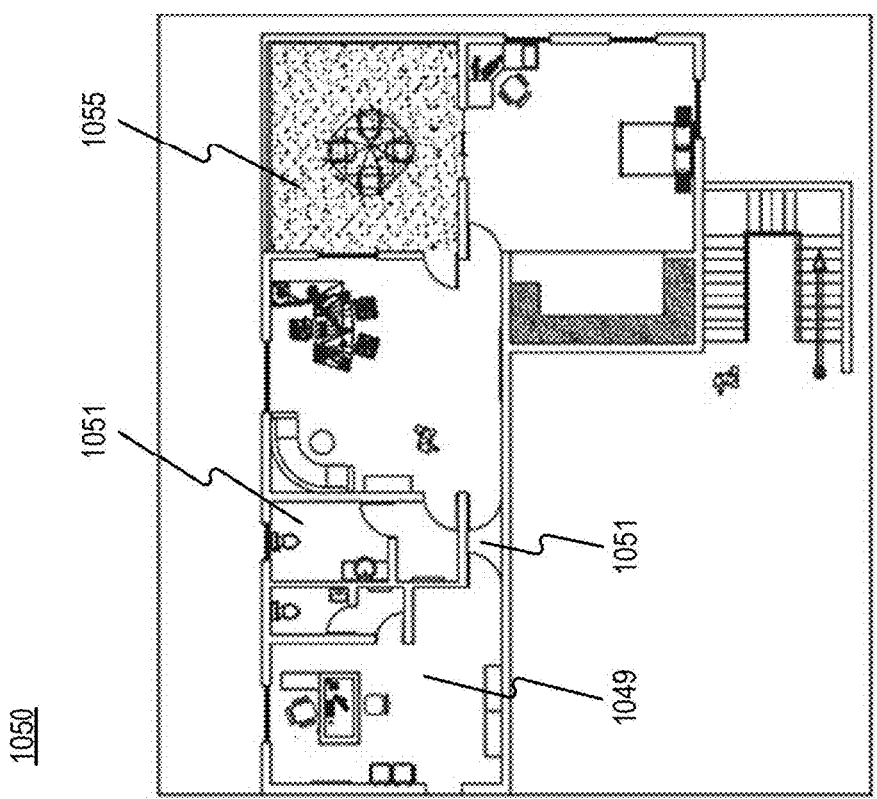
FIG. 10C

Generative analysis places equipment and obtains a specification

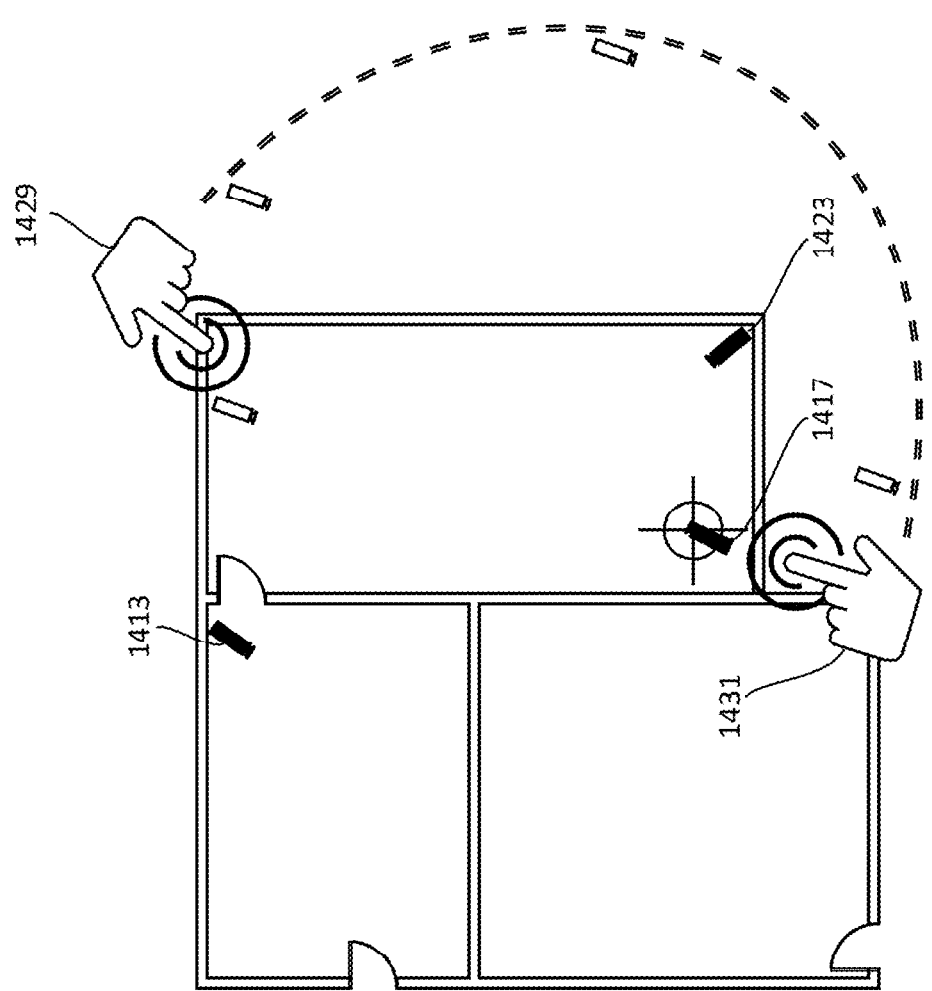

Generative analysis places equipment and obtains a specification

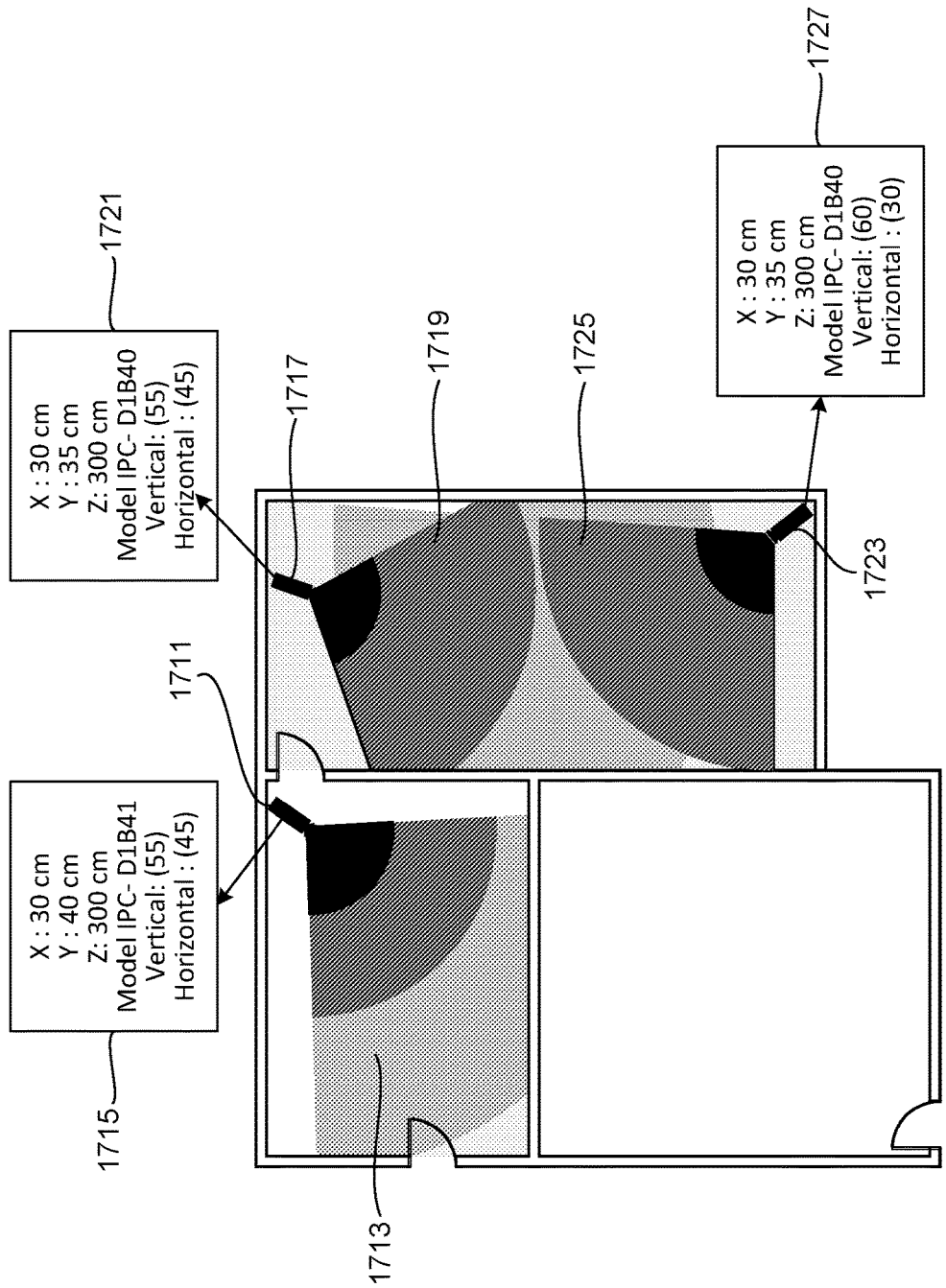

Generative analysis places equipment changes and obtains a specification

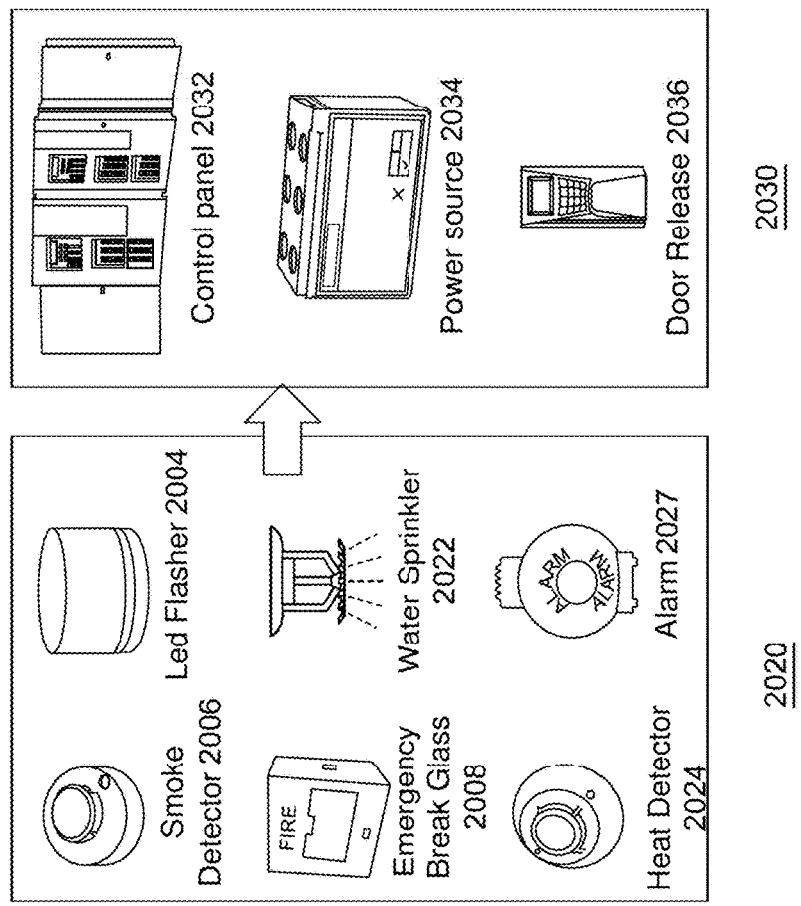
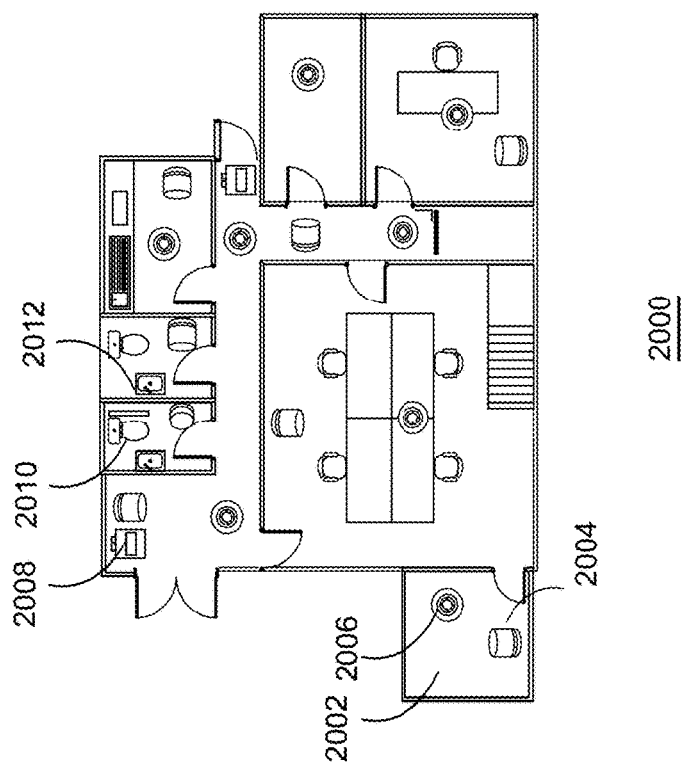
FIG. 20A

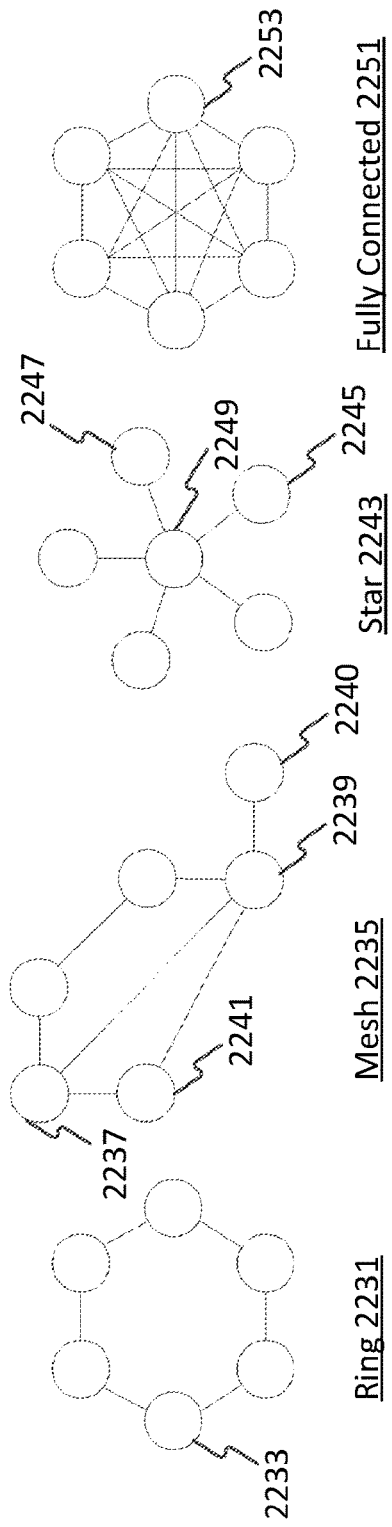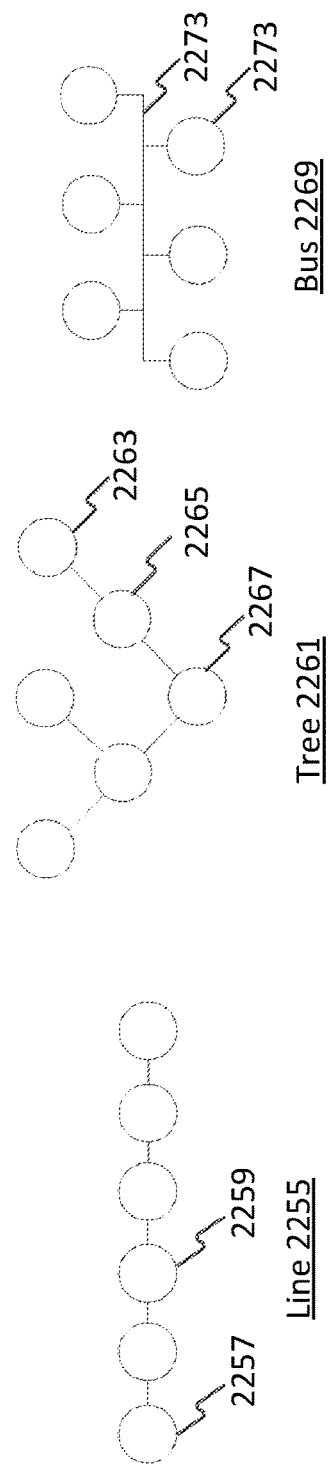
FIG. 22B

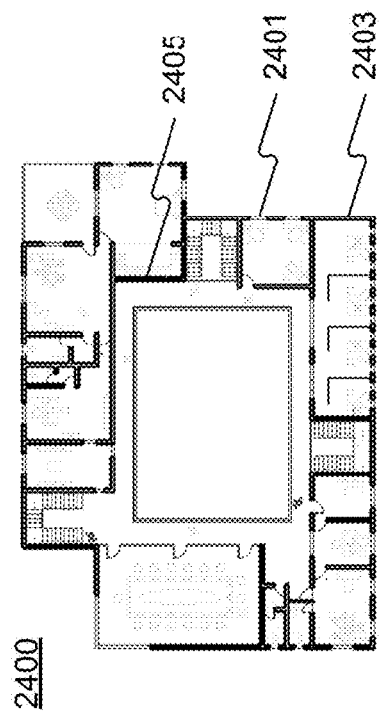
① Access a 2D floor plan
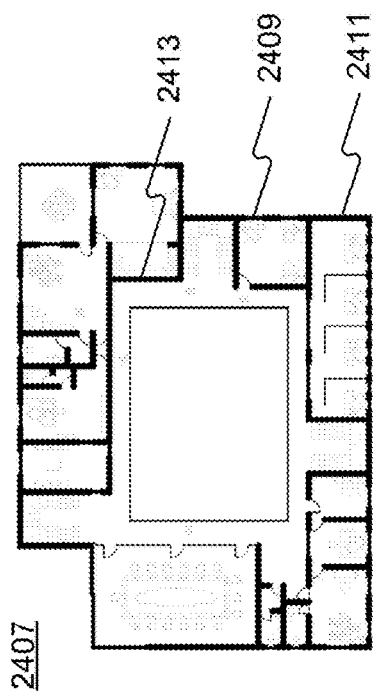
② Identify wall boundaries of a plurality of rooms
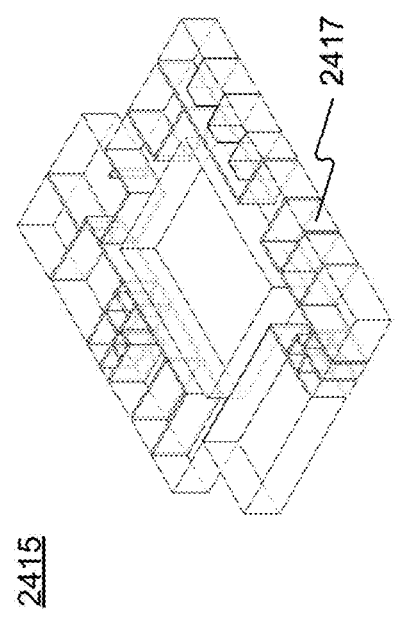
③ Visualize a 3D model
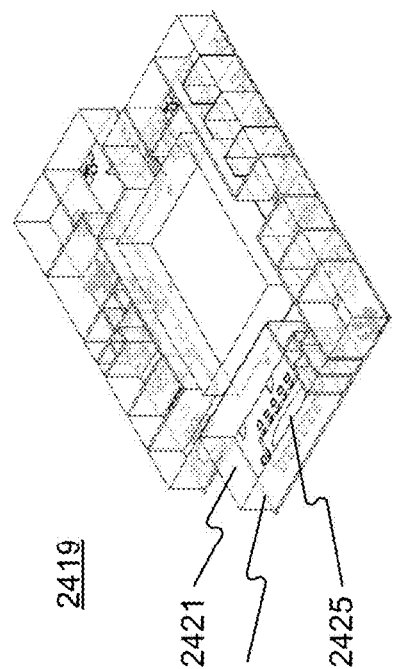
④ Display a comparison with the 2D file
FIG. 24A

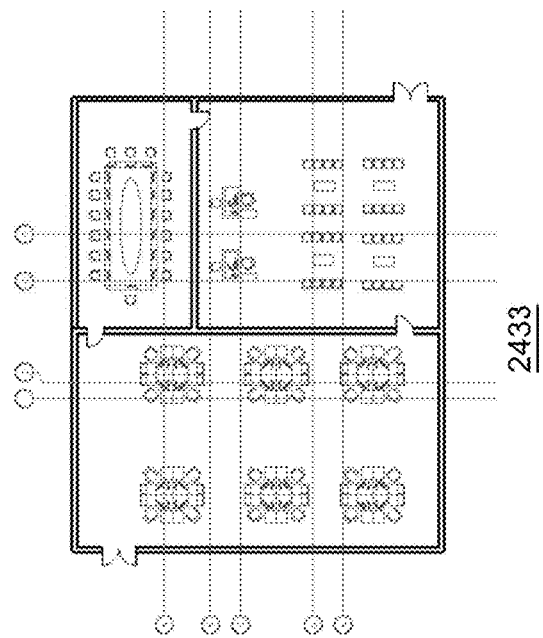
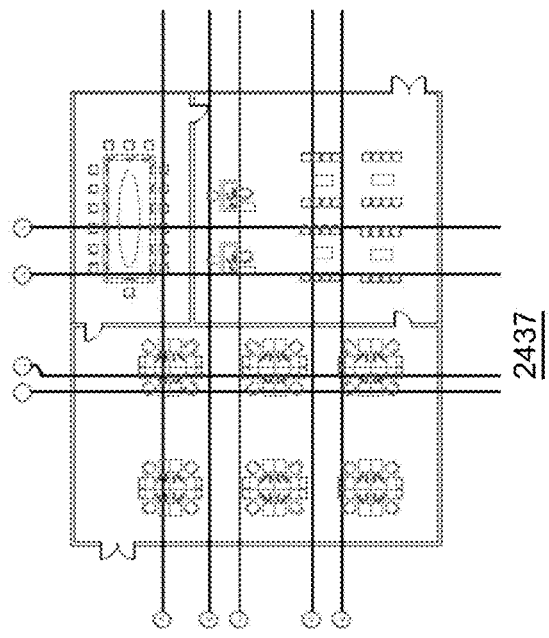
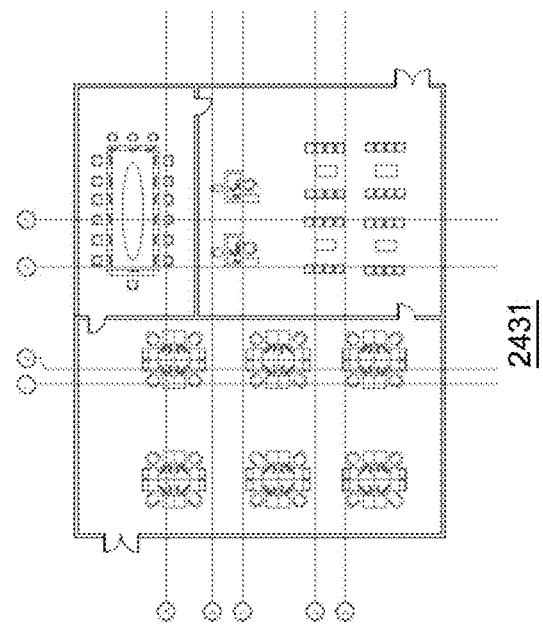
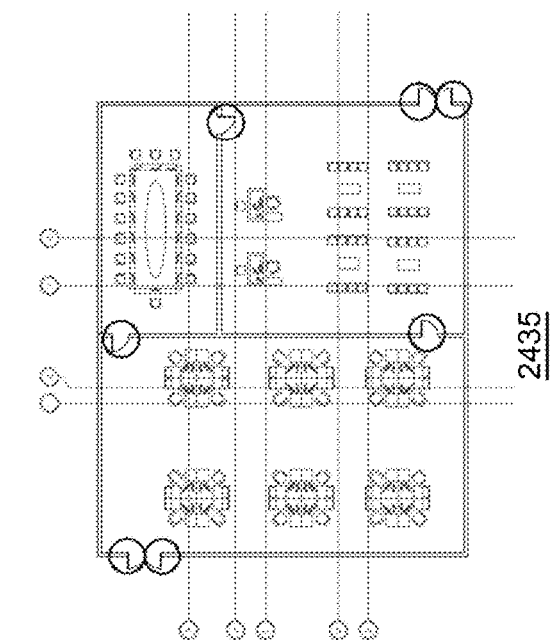
FIG. 24B

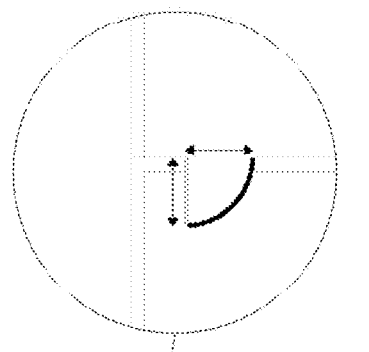
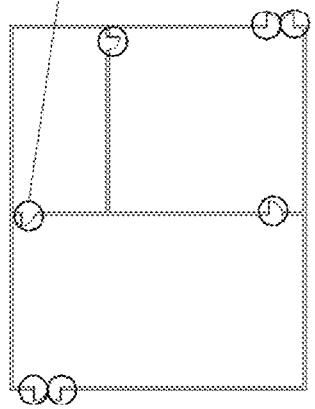
2441 Detect doors
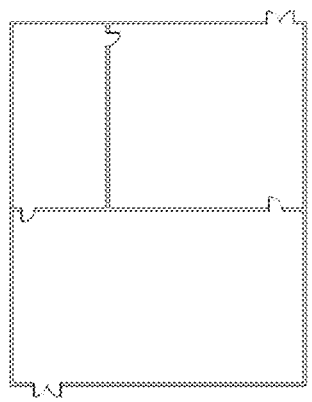
2439 Access a floor plan
2443 Detect arc's two sides
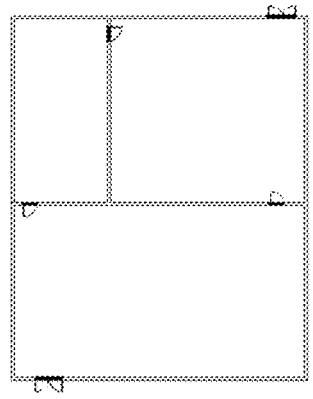
2449 Sills identified throughout floor plan
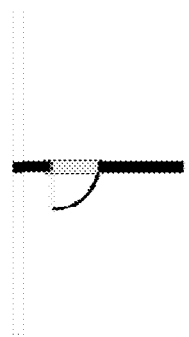
2447 Choose the candidate that successfully continues the wall
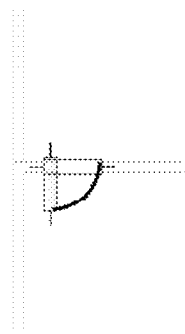
2445 Check two candidates intersection with walls
FIG. 24C

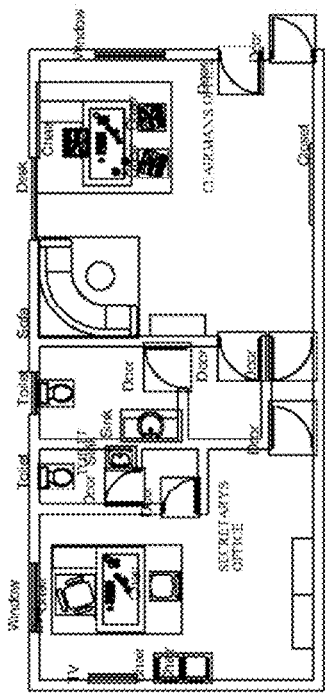
2501 Access a floor plan with architectural features
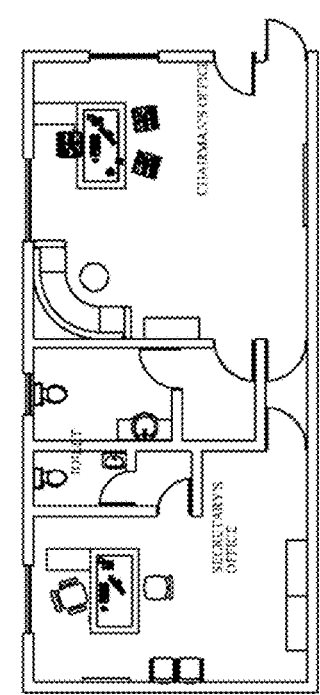
2505 Features are associated with BIM objects based on a rule and stored in data structure
2503 Features identified using machine learning methods
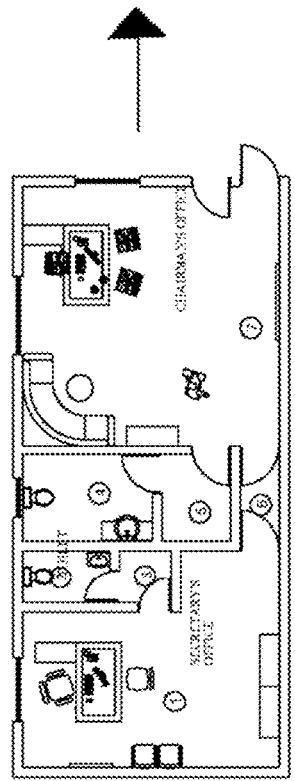
| Room 1 | Room 2 | Room 3 | Room 4 | Room 5 | Room 6 | Room 7 |
|---|---|---|---|---|---|---|
| chairs:4 desk:1 TV:1 window:1 door:2 | toilet:1 sink:1 door:1 | door:1 | toilet:1 sink:1 window:1 door:1 | door:2 | door:2 | desk:1 sofa:1 window:2 chair:3 door:4 |
FIG. 25A

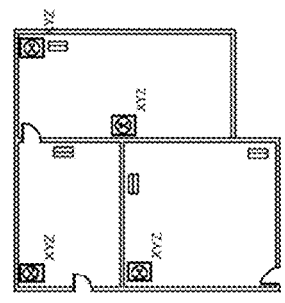

Smoke Detector

Light Fixture

Door

2507 Access a 2D floor plan with architectural features

2509 Identify features by machine learning methods and store in data structure

2511 Receive user input associating identified features with BIM objects rule = all smoke detectors are BIM object type XYZ 2513 Receive user applying rule to identified features 2515 Update BIM objects and store in data structure

FIG. 25B

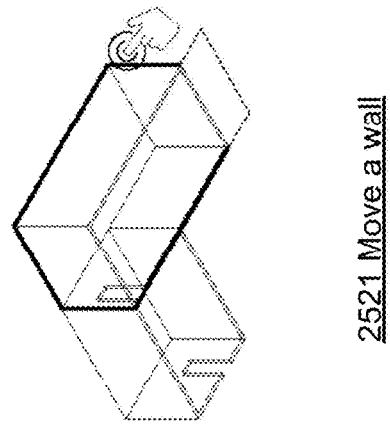
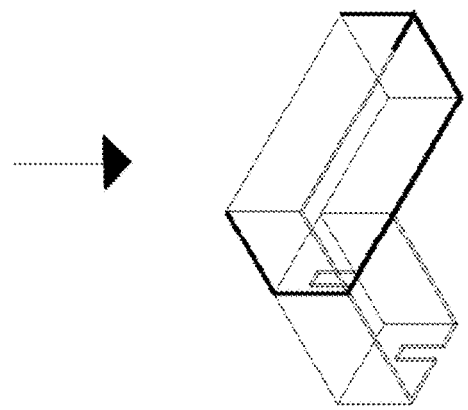
2521 Move a wall
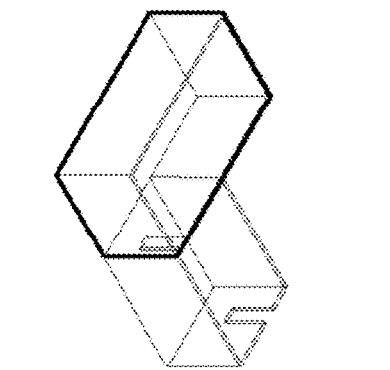
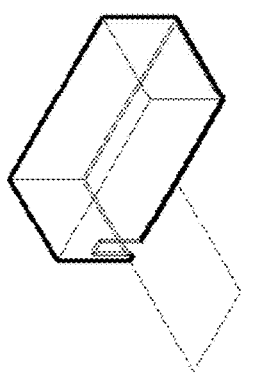
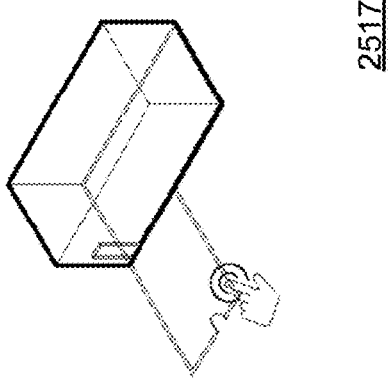
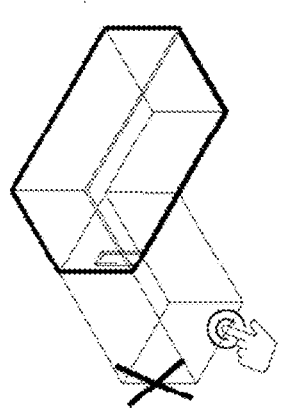
2517 Add a room
2519 Delete a room
FIG. 25C

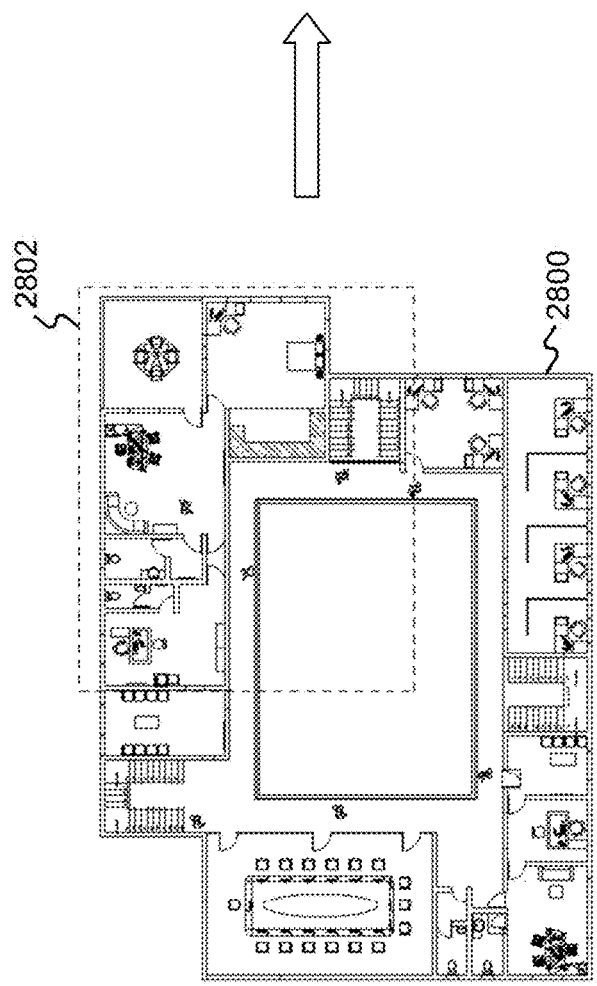
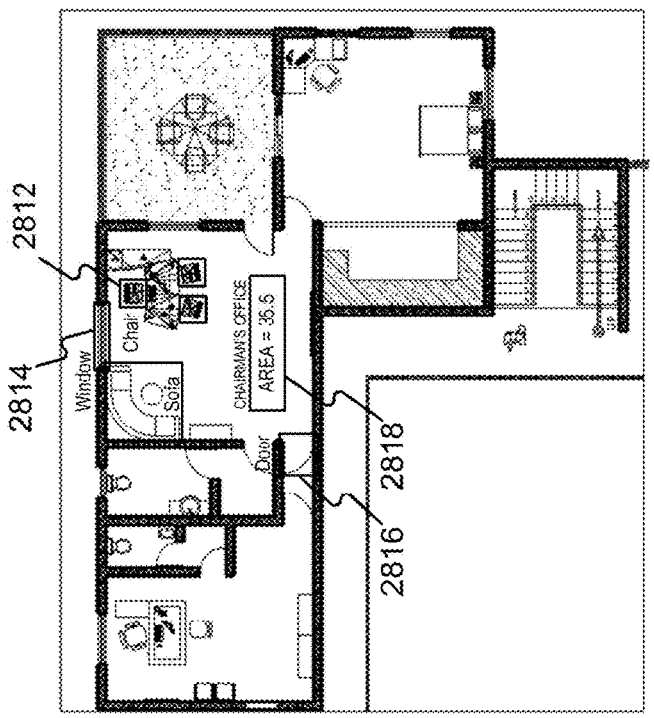
Fig. 28A

| Room Number | Room Name | Identified Room Function (via Semantic Enrichment) | Area (m²) | Furniture Text | Identified Furniture (via Semantic Enrichment) | Identified Equipment (via Semantic Enrichment) | Energy Consumption |
|---|---|---|---|---|---|---|---|
| 1 | CHAIRMAN'S OFFICE | Office | 3.57 | personal-table, vxchairmodel, sofa | 1 desk, 3 chairs, 1 sofa | thermostat | xx watts |
| 2 | SIT-OUT | Balcony | 2.63 | -- | 4 chairs, 1 table | fan coil unit | xx watts |
| 3 | -- | Corridor | 3.15 | -- | -- | light switch | zy watts |
| 4 | RESTING ROOM CLOSET | Bedroom | 4.24 | armario,korse,single-bed | 1 closet, 1 chair, 1 desk, 1 bed | controller | zz watts |
| 5 | TOILET | Toilet | 5.91 | -- | 1 toilet, 1 sink | camera | xz watts |
| 6 | -- | Corridor | 1.9 | -- | 3 chair, 1 desk | camera | xy watts |
| 10 | SECRETARY'S OFFICE | Office | 2.45 | item-1 | -- | light switcher | xx watts |
| 11 | 1ST LANDING 2ND LANDING | Staircase | 1.40 | -- | 1 staircase | sensor | yz |
| 13 | TOILET | Toilet | 2.40 | sd-type-item, item | 1 toilet, 1 sink | thermostat | yy watts |
| 15 | -- | Corridor | 4.4 | -- | -- | camera | zz watts |

Associate an index with the semantic designation (room function, architectural features, furniture and equipment semantically enriched)

Fig. 28C

| Room Number | Room Name | Identified Room Function (via Semantic Enrichment) | Area (m²) | Identified Furniture (via Semantic Enrichment) | Identified Equipment (via Semantic Enrichment) | Energy Consumption |
|---|---|---|---|---|---|---|
| 1 | CHAIRMAN'S OFFICE | Office | 3.57 | 1 desk, 3 chairs, 1 sofa | thermostat | x watts |
| 2 | SIT-OUT | Balcony | 2.63 | | | |
| 3 | -- | Corridor | 3.15 | | fan coil unit | |
| 4 | RESTING ROOM CLOSET | Bedroom | 4.24 | | | |
| 5 | TOILET | Toilet | 5.91 | | | |
| 6 | -- | Corridor | 2.17 | | | |
| 7 | ICT UNIT | Open Space | 2.14 | | | |
| 8 | 24 STEPS | Staircase | 1.62 | | | |
| 9 | BOARD Room | Meeting Room | 7.84 | 16 chairs, 1 conference table | light switch | xz watts |
| 10 | SECRETARY'S OFFICE | Office | 2.45 | | | |
| 11 | 1ST LANDING 2ND LANDING | Staircase | 1.40 | | | |
| 12 | SECRETARY'S OFFICE | Office | 1.17 | | | |
| 13 | TOILET | Toilet | 2.40 | | | |
| 14 | TOILET | Toilet | 4.41 | | | |
| 15 | 1ST LANDING 2ND LANDING | Staircase | 1.49 | | | |
| 16 | LOBBY | Corridor | 9.79 | | | |
| 17 | -- | Corridor | 2.25 | | | |
| 18 | MANAGING DIRECTOR'S OFFICE | Office | 2.14 | | controller | |
| 19 | WORKS UNIT | Open Space | 5.44 | 1 desk, 1 chair | camera | xy watts |
| 20 | TOILET | Toilet | 3.60 | 1 toilet, 1 sink | sensor | xx watts |

| Room Number | Room Name | Identified Room Function (via Semantic Enrichment) | Area (m²) | Identified Furniture (via Semantic Enrichment) | Identified Equipment (via Semantic Enrichment) | Energy Consumption |
|---|---|---|---|---|---|---|
| 1 | CHAIRMAN'S OFFICE | Office | 3.57 | 1 desk, 3 chairs, 1 sofa | thermostat | x watts |
| 2 | SIT-OUT | Balcony | 2.63 | | light | |
| 3 | -- | Corridor | 3.15 | | fan coil unit | |
| 4 | RESTING ROOM CLOSET | Bedroom | 4.24 | | light | |
| 5 | TOILET | Toilet | 5.91 | | light | |
| 6 | -- | Corridor | 2.17 | | | |
| 7 | ICT UNIT | Open Space | 2.14 | | light | |
| 8 | 24 STEPS | Staircase | 1.62 | | | |
| 9 | BOARD Room | Meeting Room | 7.84 | 16 chairs, 1 conference table | | xz watts |
| 10 | SECRETARY'S OFFICE | Office | 2.45 | | | |
| 11 | 1ST LANDING 2ND LANDING | Staircase | 1.40 | | | |
| 12 | SECRETARY'S OFFICE | Office | 1.17 | | | |
| 13 | TOILET | Toilet | 2.40 | | | |
| 14 | TOILET | Toilet | 4.41 | | | |
| 15 | 1ST LANDING 2ND LANDING | Staircase | 1.49 | | | |
| 16 | LOBBY | Corridor | 9.79 | | | |
| 17 | -- | Corridor | 2.25 | | | |
| 18 | MANAGING DIRECTOR'S OFFICE | Office | 2.14 | | controller | xy watts |
| 19 | WORKS UNIT | Open Space | 5.44 | 1 desk, 1 chair | camera | xx watts |
| 20 | TOILET | Toilet | 3.60 | 1 toilet, 1 sink | sensor | |

2820

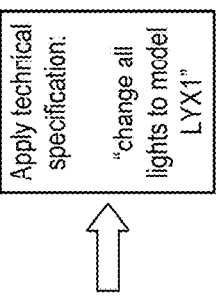

2860 — Apply technical specification: "change all lights to model LYX1"

Fig. 28H

| Room Number | Room Name | Identified Room Function (via Semantic Enrichment) | Area (m²) | Identified Furniture (via Semantic Enrichment) | Identified Equipment (via Semantic Enrichment) | Energy Consumption |
|---|---|---|---|---|---|---|
| 1 | CHAIRMAN'S OFFICE | Office | 3.57 | 1 desk, 3 chairs, 1 sofa | thermostat | x watts |
| 2 | SIT-OUT | Balcony | 2.63 | | light LYX1 | |
| 3 | – | Corridor | 3.15 | | | |
| 4 | RESTING ROOM CLOSET | Bedroom | 4.24 | | far coil unit | |
| 5 | TOILET | Toilet | 5.91 | | light LYX1 | |
| 6 | – | Corridor | 2.17 | | light LYX1 | |
| 7 | ICT UNIT | Open Space | 2.14 | | | |
| 8 | 24 STEPS | Staircase | 1.62 | | light LYX1 | |
| 9 | BOARD Room | Meeting Room | 7.84 | 16 chairs, 1 conference table | | xz watts |
| 10 | SECRETARY'S OFFICE | Office | 2.45 | | | |
| 11 | 1ST LANDING 2ND LANDING | Staircase | 1.40 | | | |
| 12 | SECRETARY'S OFFICE | Office | 1.17 | | | |
| 13 | TOILET | Toilet | 2.40 | | | |
| 14 | TOILET | Toilet | 4.41 | | | |
| 15 | 1ST LANDING 2ND LANDING | Staircase | 1.49 | | | |
| 16 | LOBBY | Corridor | 9.79 | | | |
| 17 | – | Corridor | 2.25 | | | |
| 18 | MANAGING DIRECTOR'S OFFICE | Office | 2.14 | 1 desk, 1 chair | controller | |
| 19 | WORKS UNIT | Open Space | 5.44 | | camera | xy watts |
| 20 | TOILET | Toilet | 3.60 | 1 toilet, 1 sink | sensor | xx watts |

Fig. 28I

| Room Number | Room Name | Identified Room Function (via Semantic Enrichment) | Area (m²) | Identified Furniture (via Semantic Enrichment) | Identified Equipment (via Semantic Enrichment) | Energy Consumption |
|---|---|---|---|---|---|---|
| 1 | CHAIRMAN'S OFFICE | Office | 3.57 | 1 desk, 3 chairs, 1 sofa | thermostat | xx watts |
| 2 | SIT-OUT | Balcony | 2.63 | | | |
| 3 | -- | Corridor | 3.15 | | | |
| 4 | RESTING ROOM CLOSET | Bedroom | 4.24 | | fan coil unit | |
| 5 | TOILET | Toilet | 5.91 | | | |
| 6 | -- | Corridor | 2.17 | | | |
| 7 | ICT UNIT | Open Space | 2.14 | | | |
| 8 | 24 STEPS.. | Staircase | 1.62 | | | |
| 9 | BOARD Room | Meeting Room | 7.84 | 16 chairs, 1 conference table | light switch | xz watts |
| 10 | SECRETARY'S OFFICE | Office | 2.45 | | | |
| 11 | 1ST LANDING 2ND LANDING | Staircase | 1.40 | | | |
| 12 | SECRETARY'S OFFICE | Office | 1.17 | | | |
| 13 | TOILET | Toilet | 2.40 | | | |
| 14 | TOILET | Toilet | 4.41 | | | |
| 15 | 1ST LANDING 2ND LANDING | Staircase | 1.49 | | | |
| 16 | LOBBY | Corridor | 9.79 | | | |
| 17 | -- | Corridor | 2.25 | | | |
| 18 | MANAGING DIRECTOR'S OFFICE | Office | 2.14 | | controller camera sensor | xy watts |
| 19 | WORKS UNIT | Open Space | 5.44 | 1 desk, 1 chair | | xx watts |
| 20 | TOILET | Toilet | 3.60 | 1 toilet, 1 sink | | |

2820

2870 — Add electrical floor box model xx in the center of all conference tables, connected to electrical distribution panel DB-X1A 2872 — Search for "conference tables"

```
ACCESS A FLOOR PLAN DEMARCATING A PLURALITY OF ROOMS
2902
                            │
                            ▼
ACCESS FUNCTIONAL REQUIREMENTS ASSOCIATED WITH THE
PLURALITY OF ROOMS
2904
                            │
                            ▼
USING THE ARCHITECTURAL FEATURE DATA, PERFORM A SEMANTIC
ENRICHMENT PROCESS ON THE PLURALITY OF ROOMS IN ORDER TO
DETERMINE SEMANTIC DESIGNATIONS FOR THE PLURALITY OF ROOMS
2906
                            │
                            ▼
ASSOCIATE, ON THE FLOORPLAN, THE SEMANTIC DESIGNATIONS WITH
THE PLURALITY OF ROOMS
2908
                            │
                            ▼
ASSOCIATE, IN AN INDEX, THE SEMANTIC DESIGNATIONS WITH THE
PLURALITY OF ROOMS
2910
                            │
                            ▼
UPDATE THE FLOORPLAN BY USING THE INDEX TO ENABLE AN ACTION
TO BE APPLIED TO A GROUP OF ROOMS SHARING A COMMON
SEMANTIC DESIGNATION
2912
```

Fig. 29

STRUCTURAL DESIGN SYSTEMS AND METHODS FOR AUTOMATIC EXTRACTION OF DATA FROM 2D FLOOR PLANS FOR RETENTION IN BUILDING INFORMATION MODELS

CROSS-REFERENCE TO RELATED APPLICATIONS

This application is based on and claims benefit of priority of U.S. Provisional Patent Application No. 62/897,159 filed Sep. 6, 2019; U.S. Provisional Patent Application No. 62/940,040 filed Nov. 25, 2019; U.S. Provisional Patent Application No. 62/980,932 filed Feb. 24, 2020; and U.S. Provisional Patent Application No. 63/016,131 filed Apr. 27, 2020. The contents of the foregoing applications are incorporated herein by reference in their entirety.

BACKGROUND

Technical Field

The present disclosure relates generally to systems and methods for designing floor plans for buildings. Disclosed systems and methods may involve automatically analyzing semantically unstructured two-dimensional floor plans to generate structured three-dimensional models of the floor plans.

Background Information

In architectural planning, the geometry contained in 2D architectural files such as CAD, PDF and image files may lack structured semantic information and metadata. For example, the vectors representing rooms and their demarcations such as walls may be a set of points without any associated metadata or semantic designation identifying them as rooms and walls. In some cases, the vectors representing walls may be not be differentiated from vectors representing furniture or other architectural elements. The absence of machine-readable room demarcations and architectural features may render conventional computational processes challenging or infeasible. In another cases, two-dimensional drawings may provide inadequate context for a designer who wishes to view a building or a room in three dimensions. For example, a designer or planner may not be able to grasp the size of a room relative to its height using only a two-dimensional plan. A designer may also wish to understand how layouts of multiple floors relate to each other by viewing multiple floors in three dimensions at the same time. Designers may also wish to view hand drawn or paper plans in three dimensions. In many situations, manually generating three dimensional plans is not practical or feasible. Conventional solutions face difficulty generating floorplans with structured semantic data and three dimensional views from two dimensional plans accurately and efficiently, and may require a large amount of manual input. Accordingly, there is a need for non-conventional systems and methods of automatically generating three dimensional models with structured data of buildings from two dimensional plans.

SUMMARY

Embodiments consistent with the present disclosure provide systems and methods for architectural planning. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which are executable by at least one processing device and perform any of the steps and/or methods described herein.

Consistent with disclosed embodiments, systems, methods, and computer readable media related to selecting equipment for use in buildings are disclosed. The methods may include accessing a floor plan demarcating a plurality of rooms. The methods may further include receiving a first functional requirement for at least one first room of the plurality of rooms and receiving a second functional requirement for at least one second room of the plurality of rooms. The method may include generatively analyzing the at least one first room in conjunction with the first functional requirement to identify a first technical specification and a first equipment placement location in order to at least partially conform to the first functional requirement; and generatively analyzing the at least one second in conjunction with the second functional requirement to identify a second technical specification and a second equipment placement location order to at least partially conform to the second functional requirement. The method may further include outputting the first technical specification and the first equipment placement location in an associative manner with the at least one first room and outputting the second technical specification and the second equipment placement location in an associative manner with the at least one second room.

Embodiments consistent with the present disclosure provide systems and methods for selective simulation of equipment coverage in a floor plan. These embodiments may involve at least one processor configured to access a floor plan demarcating at least one room, receive, via a graphical user interface, information marking an area within the at least one room, wherein the marked area defines an area of interest or disinterest within the at least one room, and wherein the area of interest or disinterest covers an area less than an area of the at least on room. The at least on processor may be further configured to access a functional requirement associated with an area of interest or disinterest, access technical specifications associated with the functional requirement, generatively analyze the technical specifications to define a solution that at least partially conforms to the functional requirement, and output the solution.

Some embodiments of this disclosure involve structural design systems, methods, and computer readable media for selective simulation of technical specification coverage in a floor plan. These embodiments may include accessing a floor plan demarcating a plurality of rooms. Embodiments may include performing at least one of a machine learning method, semantic analysis, or geometric analysis on the floor plan to identify at least one opening associated with at least one room from the plurality of rooms, accessing a functional requirement associated with the at least one opening, and accessing at least one rule that associates the functional requirement with the at least one opening. The at least one rule and the functional requirement may be used to define at least one of an area of interest or disinterest less than an area of the at least one room, and accessing a technical specification associated with the functional requirement. Embodiment may include generatively analyzing the at least one room in conjunction with the technical specification and the defined area of interest or disinterest to define a solution that at least partially conforms to the functional requirement, and outputting the solution.

Consistent with disclosed embodiments, systems, methods, and computer readable media related to rule-based application of functional requirements to spaces in a floor plan are disclosed. The methods may include accessing a floor plan demarcating a plurality of spaces. The methods may further include performing semantic enrichment on the plurality of spaces in order to determine a semantic designation for at least one space of the plurality of spaces, enriching the floor plan by associating on the floor plan the semantic designation with the at least one space, and identifying, in a data structure, a rule that includes a functional requirement based on the semantic designation and associating the identified rule with the at least one space.

Consistent with disclosed embodiments, systems, methods, and computer readable media related to selecting equipment for use in buildings are disclosed. Embodiments may include accessing a floor plan demarcating a plurality of rooms, accessing functional requirements associated with the plurality of rooms and accessing technical specifications associated with the functional requirements. The embodiments may further include performing floor plan analysis on a floor plan to ascertain room features associated with the functional requirements and technical specifications. Then, structural embodiments of the disclosure may generatively analyze the room features with reference to the functional requirements and the technical specifications to determine at least one customized equipment configuration for at least some of the plurality of rooms; and generate a manufacturer dataset including a room identifier, an equipment identifier, and the at least one customized equipment configuration, in a manner enabling a manufacturer to customize equipment for each of the plurality of rooms and to package the customized equipment in a manner displaying the room identifier.

Some embodiments consistent with the present disclosure provide systems and methods for selecting equipment for use in buildings. These embodiments may involve at least one processor configured to receive a floor plan demarcating contours of a room, receive a selection of at least one functional requirement or equipment specification associated with the room, and generatively analyze the room to obtain a plurality of solution that at least partially conform to the at least one functional requirement or equipment specification. The at least on processor may be further configured to receive a selection of a solution from the plurality of solutions, wherein the selected solution includes an equipment placement location, receive instructions to vary the equipment placement location, generatively analyze the room to update the selected solution based on the instructions to vary the equipment placement location, and display the updated solution.

Embodiments of this disclosure involve structural design systems, methods, and computer readable media for automatically positioning primary equipment and auxiliary equipment in a floor plan. These embodiments may include accessing the floor plan demarcating a plurality of rooms and assigning functional requirements to each of the plurality of rooms. Embodiments may include accessing at least one data structure containing technical specifications for primary equipment and auxiliary equipment, and further containing locations of primary equipment and compatibility rules associating primary and auxiliary equipment. Then, a floor plan may be generatively analyzed using the functional requirements and the technical specifications for the primary equipment to select and position in the floor plan primary equipment to at least partially conform to the functional requirements for each of the plurality of rooms. Based on the selection of the primary equipment in the floor plan, embodiment may include using the compatibility rules and the technical specifications for the primary equipment and the auxiliary equipment to determine whether auxiliary equipment is required for each of the plurality of rooms and to select the auxiliary equipment to at least partially conform to the functional requirements of each of the plurality of rooms requiring auxiliary equipment.

Consistent with disclosed embodiments, systems, methods, and computer readable media related to generating wiring diagrams for equipment are disclosed. Embodiments may include accessing a floor plan defining a plurality of rooms, receiving input associating at least one of a plurality of functional requirements with at least one room of the plurality of rooms, and accessing, in a data structure, technical specifications associated with electrical equipment. Embodiments may further include selecting, from the data structure, a plurality of the technical specifications associated with electrical equipment and generatively analyzing the at least one room in conjunction with the functional requirement and the selected technical specifications in order to select a piece of equipment for the at least one room and select an equipment placement location of the selected piece of equipment within the at least one room. Structural data associated with the at least one room may be accessed, the structural data including wall locations. Then, a wiring diagram for the at least one room may be generated using the selected technical specifications and the structural data, wherein the wiring diagram includes a graphical representation on the floor plan of the equipment placement location of the selected piece of equipment and wiring runs to the selected piece of equipment.

Disclosed embodiments, systems, methods, and computer readable media related to extracting data from a 2D floor plan and retaining it in a building information model are disclosed. The methods may include accessing a 2D floor plan demarcating a plurality of rooms. The methods may further include identifying, using a machine learning model, wall boundaries of the plurality of rooms. The methods may further include storing the identified wall boundaries in a retention data structure. The methods may further include generating a building information model, wherein the building information model includes the identified wall boundaries. The methods may further include displaying, at an interface, a comparison of at least a portion of the 2D floor plan and the building information model. The methods may further include receiving, from the interface, input based on the comparison. The methods may further include updating the retention data structure based on the input.

Embodiments consistent with the present disclosure provide systems and methods for selecting equipment models and optimizing placement of equipment in floor plans. These embodiments may involve at least one processor configured to access a floor plan demarcating a plurality of rooms and equipment symbols, enable a user to select an equipment symbol for analysis, parse the floor plan to identify instances of the selected equipment symbol, and parse the floor plan to identify structural elements including walls. The at least one processor may be further configured to access functional requirements for a set of rooms in the plurality of rooms containing the instances of the selected equipment symbols, access equipment technical specifications to identify equipment technical specifications associated with the functional requirements, and perform a generative analysis on the identified equipment technical specifications within identified walls of each room in the set of rooms to select an equipment model that at least partially conforms to the functional requirements. The at least one processor may be further configured to update the floor plan by associating the selected equipment model with the instances of the selected equipment symbols and output a bill of material based on the updated floor plan.

Consistent with disclosed embodiments, systems, methods, and computer readable media related to selecting equipment for use in buildings are disclosed. Embodiments may include accessing a floor plan demarcating a plurality of rooms and accessing architectural feature data associated with the plurality of rooms. The embodiments may further include using the architectural feature data to perform a semantic enrichment process on the plurality of rooms in order to determine semantic designations for the plurality of rooms. Embodiments may then include associating, on the floor plan, the semantic designations with the plurality of rooms and associating, in an index, the semantic designations with plurality of rooms. The embodiments may include updating the floor plan by using the index to enable an action to be applied to a group of rooms sharing a common semantic designation.

The forgoing summary provides just a few examples of disclosed embodiments to provide a flavor for this disclosure and is not intended to summarize all aspects of the disclosed embodiments. Moreover, the following detailed description is exemplary and explanatory only and is not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 5 depicts exemplary floor plans with areas of interest, consistent with disclosed embodiments.

FIG. 6A depicts exemplary floor plans with areas of interest, consistent with disclosed embodiments.

FIG. 10A is a depiction of exemplary floor plans showing changing of semantic designations, consistent with disclosed embodiments.

FIG. 10B is a depiction of exemplary floor plans showing semantic enrichment of furniture, consistent with disclosed embodiments.

FIG. 10C is a depiction of exemplary floor plans showing addition of semantic designations, consistent with disclosed embodiments.

FIG. 14D depicts exemplary user input varying equipment location, consistent with disclosed embodiments.

FIG. 17A depicts an exemplary solution as a result of generative analysis indicating equipment placement and providing specification details, consistent with disclosed embodiments.

FIG. 20A illustrates aspects of an exemplary process for using generative analysis to select primary equipment and auxiliary equipment, consistent with disclosed embodiments.

FIG. 22B is a depiction of exemplary wiring typologies, consistent with disclosed embodiments.

FIG. 24A is an illustration of exemplary stages of an exemplary process for extracting data from a 2D floor plan and retaining it in a building information model, consistent with disclosed embodiments.

FIG. 24B is an illustration depicting an exemplary geometric analysis on a floor plan, consistent with disclosed embodiments.

FIG. 24C is an illustration depicting an exemplary geometric analysis for identifying doors and sills, consistent with disclosed embodiments.

FIG. 25A is an illustration depicting an exemplary process for adding identified features and equipment associated with BIM objects to a building information model, consistent with disclosed embodiments.

FIG. 25B is an illustration depicting an exemplary process for adding identified features and equipment associated with BIM objects to a building information model, consistent with disclosed embodiments.

FIG. 25C is an illustration depicting exemplary user input for updating a retention data structure, consistent with disclosed embodiments.

FIG. 28A is a diagram illustrating an example floor plan augmented with architectural features consistent with disclosed embodiments.

FIG. 28C illustrates a tabular representation of an example index consistent with disclosed embodiments.

FIG. 28E, illustrates output of an index search consistent with disclosed embodiments.

FIG. 28H illustrates another example action that may be performed based on an index, consistent with disclosed embodiments.

FIG. 28I illustrates an updated index following the action performed in the prior figure, consistent with disclosed embodiments.

FIG. 28J illustrates another example action that may be performed based on an index, consistent with disclosed embodiments.

FIG. 29 is a flowchart illustrating an example process 2900 for analysis, segmentation, and indexing of architectural renderings, consistent with disclosed embodiments.

DETAILED DESCRIPTION

Figure 1:
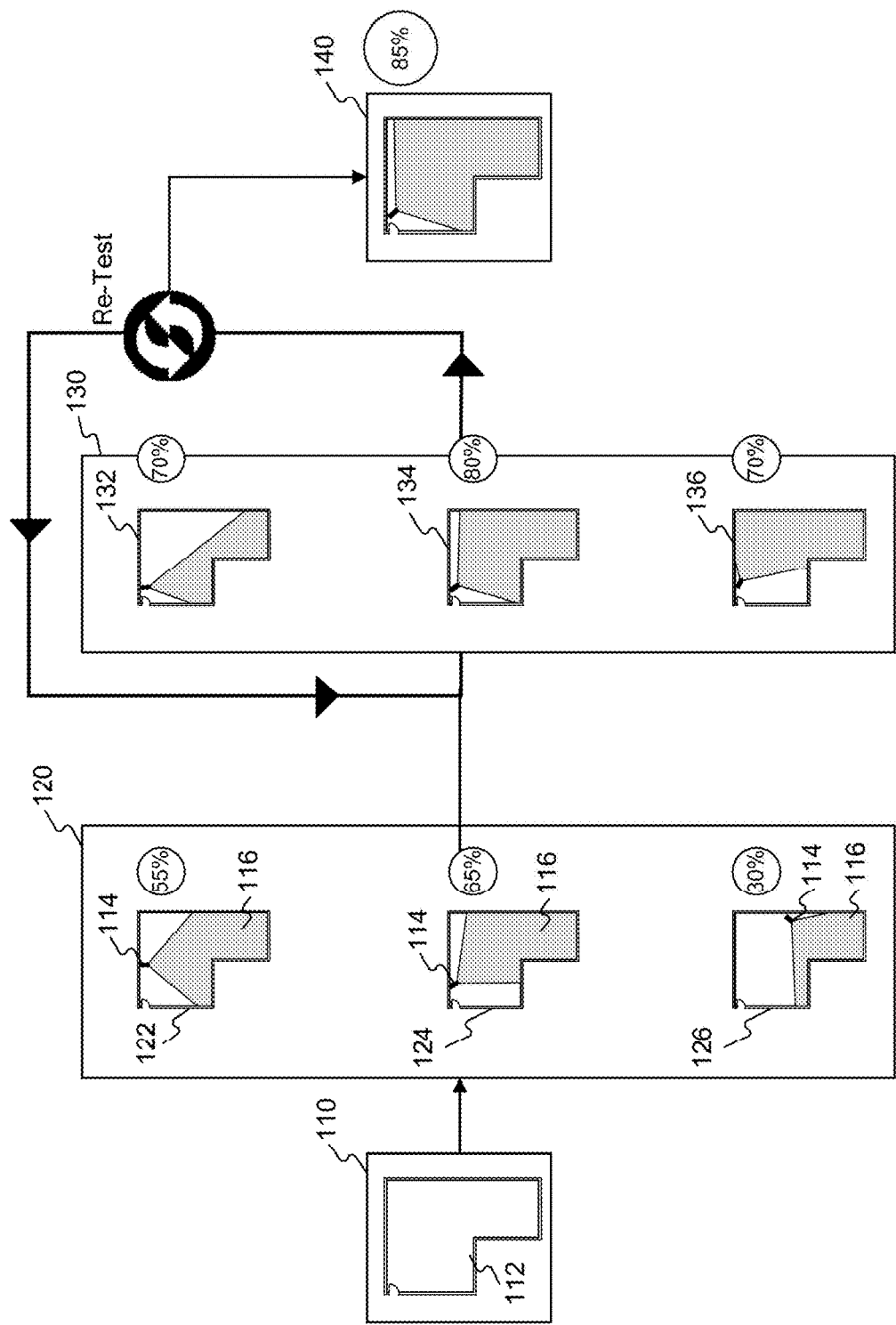
FIG. 1 is a block diagram illustrating an example of an optimization-based generative analyses process, for identifying technical specifications and equipment locations, consistent with the disclosed embodiments.

In architectural planning, selecting the appropriate specifications and locations for equipment to be used in many rooms in a floor plan can be a daunting task. For example, each room may have multiple functional requirements that may affect the selection and placement of equipment within the room. Further, there may be thousands of possible combinations of equipment specifications and placement locations, each with varying degrees of conformance to the functional requirements.

Therefore, there is a need for unconventional approaches that enable users to input functional specifications for multiple rooms into a system configured to run a series of simulations to automatically suggest equipment and equipment placement within the rooms.

The disclosed methods and systems are directed to provided new and unconventional methods of selective simulation of equipment coverage in a floor plan. Conventional approached to selecting equipment in a floor plan may be unable to generate accurate, optimized plans due to resource constraints given the labor-intensive engineering and drafting process or when information is lacking (e.g., a designer may make a "best guess" or assumption when estimating equipment location, install time, etc.). Additionally, the interconnectivity of multiple complex systems may impose significant challenges when attempting to select equipment to improve performance (e.g., improved energy efficiency). As a result, conventional approaches may lead to inefficiencies, high costs, sub optimal solutions, and/or rigid plans that are not customized to a particular need.

Therefore, there is a need for a new type of system and method that may use a variety of data sources, including incomplete data sources, to optimize floor plans, efficiently analyze floor plans, optimally place equipment to meet various design objectives, identify and place auxiliary equipment, generate wiring diagrams, and more. As compared to conventional approaches, the disclosed systems and methods improve computational efficiency, produce more optimal solutions, and allow greater customization.

When designing the interior of a building, an architect or structural engineer may consider, from a large list of equipment specifications, which equipment may be appropriate for s space, where to place it, and how to orient it. At the same time, the architect or structural engineer must consider costs and structural issues that may arise from using one piece of equipment over another. Conventional approaches to this aspect of designing the interior of a building may rely on human judgment or overly simplistic algorithms, thereby lacking the ability to automatically perform these tasks in an efficient and optimized manner. Further, some areas within a floor plan, including areas inside a room, may have different requirement than adjacent areas, or may be particularly important. For example, camera coverage or the lighting of an egress may be more important to design than coverage in other areas of a room, and camera coverage may be undesired in private spaces such as bathrooms or changing rooms. Conventional solutions may fail to identify such areas of interest or disinterest accurately in automated way, or may be labor intensive and fail to efficiently scale or be consistently applied when planning using dozens, hundreds, or even thousands of floor plans.

In accordance with the present disclosure, a structural design system, method, and/or computer readable medium may be provided for selective simulation of technical specification coverage in a floor plan. Embodiments may include defining areas of interest for modeling and simulation-based space planning. Defining an area of interest or disinterest may include delimiting, outlining, establishing, and/or any other implementing any method of distinguishing one space from another. Generally, an area of interest or disinterest may be an area upon which functional requirements or technical characteristics are applied and may differ from the functional requirement applied to another area of the room. Such areas may be unmarked on floor plans, making it difficult to design or plan equipment for spaces. For example, if a floor plan generally contains a functional requirement to maximize Wi-Fi coverage in many rooms, proposed solutions may maximize coverage without providing coverage in areas of interest such as at cubicle locations within offices or in a waiting area of a lobby. To enable more efficient and effective planning, disclosed embodiments provide ways to automatically define areas of interest or disinterest based on an analysis of a floor plan. Embodiments may include identifying or defining areas of interest or disinterest based on user input. Accordingly, embodiments promote rapid, large scale, customizable, and accurate identification of areas of equipment, and embodiments may further provide improved techniques to identify and select equipment that satisfy functional requirements for areas of interest or disinterest.

In architectural planning, adding accurate and consistent labels to various aspects architectural floor plans may be difficult and labor intensive. In some cases, a designer may desire to make the same changes to rooms of the same or similar type across a very large complex architectural plan or set of plans. However, such widespread changes to a large floor plan may require painstaking effort to change only a small aspect of a large number of rooms. Further, rooms of some plans could be mislabeled, which may lead to further errors that could drastically affect later design considerations or even the construction of a building. Therefore, aspects of the current disclosure relate to unconventional approaches that efficiently, effectively, and consistently update architectural plans.

In building floor plans, equipment and functional requirements associated with rooms are often unspecified, leaving designers with the challenge of determining which equipment to select and where to place it. This problem is compounded when selecting and placing auxiliary equipment (e.g., cables, screws, patch panels, junction boxes, video recorders, network switches, racks, or other accessories) that support primary equipment. In such data-limited situations, conventional approaches may lack the ability to determine functional requirements and automatically select and place primary and auxiliary equipment that meets those requirements in an efficient and optimized manner.

In architectural planning, creating comprehensive, detailed, and accurate wiring diagrams for building planning and construction may be difficult and labor intensive. Buildings may include a wide variety of equipment that requires electrical wiring including, for example, lighting, power outlets, smoke alarms, CCTV systems, sensor systems, HVAC systems, motors and pumps, solar power grids, electric car charging stations, and others. Electrical wiring may include high-voltage, medium-voltage and low-voltage wires and/or cables. Therefore, when designing a building, a designer or planner may need to create complex wiring diagrams for equipment to ensure that wires are run properly throughout the building and permit various pieces of equipment to access electrical power. Conventional design tools face difficulty creating such complex wiring diagrams accurately and efficiently. Planners may rely on manual inputs or leave such details off plans entirely, causing installers to make decisions based on limited information in a floor plan. Additionally, selection of electrical equipment and wiring and the locations of the equipment may affect operating costs, and there is a need for systems and methods of generating wiring solutions that minimize future costs.

In architectural planning, the geometry contained in 2D architectural files such as CAD, PDF and image files may lack structured semantic information and metadata. For example, the vectors representing rooms and their demarcations such as walls may be a set of points without any associated metadata or semantic designation identifying them as rooms and walls. In some cases, the vectors representing walls may be not be differentiated from vectors representing furniture or other architectural elements. The absence of machine-readable room demarcations and architectural features may render conventional computational processes challenging or infeasible. In another cases, two-dimensional drawings may provide inadequate context for a designer who wishes to view a building or a room in three dimensions. For example, a designer or planner may not be able to grasp the size of a room relative to its height using only a two-dimensional plan. A designer may also wish to understand how layouts of multiple floors relate to each other by viewing multiple floors in three dimensions at the same time. Designers may also wish to view hand drawn or paper plans in three dimensions. In many situations, manually generating three dimensional plans is not practical or feasible. Conventional solutions face difficulty generating floorplans with structured semantic data and three dimensional views from two dimensional plans accurately and efficiently, and may require a large amount of manual input. Accordingly, there is a need for non-conventional systems and methods of automatically generating three dimensional models with structured data of buildings from two dimensional plans.

Some disclosed methods and systems are directed to providing new and unconventional methods for selectively simulating equipment coverage in a floor plan. Building planners may seek to ensure that a floor plan is sufficiently covered by lights, cameras, motion detectors, or other sensors, equipment or devices. Conventional approaches to selecting equipment may not adequately ensure that each space in every room in a floor plan that should be covered is in fact covered. Constraints on designers and drafters make it difficult if not impossible to use conventional techniques for ensuring equipment coverage. Often, designers or drafters are left to make a "best guess" or assumption when selecting equipment and estimating its location. Additionally, the interconnectivity of multiple complex systems may impose significant challenges when attempting to select equipment to improve performance or coverage. As a result, conventional approaches may lead to inefficiencies, high costs, sub optimal solutions, or rigid plans that may not satisfy coverage needs.

Therefore, there is a need for a new type of system and method that may use a variety of data sources, including incomplete data sources, to optimize floor plans, efficiently analyze floor plans, optimally place equipment to meet coverage requirements.

During the architectural planning process, it may be beneficial to apply actions in bulk, for example, to a group of rooms sharing similar architectural features or room functions. In many cases, identifying similar rooms on a floor plan may be challenging, especially when analyzing large numbers of rooms in many floor plans. For example, many floor plans may not list room names, which may indicate a room's function. In other instances, the room names identified on the floor plan may not be structured, which may prevent bulk actions from being performed. In other instances, the names of large numbers of identified architectural features, furniture and equipment may not be structured. Further, information embedded in floor plans may be difficult to efficiently search or act upon. For example, a search for "offices" in floor plans may require inefficient loading of large files that contain information not relevant to a search, such as image data. Further, applying bulk actions to groups having shared characteristics may be difficult or impossible when working with floor plans directly.

Therefore, there is a need for unconventional approaches for automatically determining semantic designations for a plurality of rooms in a floor plan and generating an index to facilitate rapid searching and bulk actions.

In architectural planning, selecting appropriate specifications and locations for equipment to be used in many rooms in a floor plan can be a burdensome and time consuming procedure. Even when the same model equipment is used in multiple rooms throughout a building, the precise location of the equipment in each room and customizations for the equipment may vary from room to room. For example, each room may have different functional requirements or room features that require customizations to the equipment, such as physical configurations, programming, labeling, or coloring, or other customizations. Moreover, buildings may have hundreds of rooms where equipment models and equipment placement may vary from room to room. This can result in situations where technicians select from a large equipment shipment the wrong equipment for a particular room; install the correct equipment in the incorrect location; and/or install the correct equipment in the correct location but with incorrect selected settings. Such human error can be costly both in terms of labor and delay.

Therefore, there is a need for unconventional approaches that maximize the chances that customized equipment will be installed in the correct rooms, at the correct locations, and with the correct settings. Further, there is a need for systems and methods to present the customized information to enable a manufacturer to customize product in the factory, and add a custom label to the packaging to facilitate installation.

The disclosed methods and systems are directed to provided methods of selecting equipment for use in buildings. In large building projects for example, thousands of pieces of equipment might need to be specified, placed, oriented and adjusted. In some instances, there is an interrelationship between pieces of equipment, leading to a preferred solution that includes interdependencies. And once equipment is selected and placed, there is sometimes a need to change the selection or placement, which can have a cascading effect. Embodiments of this disclosure enable both generative analysis of floor plans to select, place and adjust equipment, and further enable movement of equipment in the floor plans after placement, along with associated recalculations to arrive at a preferred solution.

Embodiments of the present disclosure enable design constraints to be achieved must more accurately than conventional approaches and in much shorter time. In addition, if changes are needed after an equipment selection is already made, disclosed embodiments may enable rapid adjustment unattainable with conventional approaches. Therefore, there is a need for a new type of system and method that may use a variety of data sources, including incomplete data sources, to optimize floor plans, efficiently analyze floor plans, optimally place equipment to meet various design objectives, identify and place auxiliary equipment, generate wiring diagrams, and more. As compared to conventional approaches, the disclosed systems and methods improve computational efficiency, produce more optimal solutions, and allow greater customization.

Unless specifically stated otherwise, as apparent from the following description, throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include actions and/or processes of a computer that manipulate and/or transform data into other data, the data represented as physical quantities, for example such as electronic quantities, and/or the data representing physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, smart glasses, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to features of "embodiments" "one case", "some cases", "other cases" or variants thereof means that a particular feature, structure or characteristic described may be included in at least one embodiment of the presently disclosed subject matter. Thus the appearance of such terms does not necessarily refer to the same embodiment(s). As used herein, the term "and/or" includes any and all combinations of one or more of the associated listed items. In the present disclosure, "or" may be used as a convenient shorthand for "and/or." That is, "or" may encompass both conjunctive and disjunctive joining of terms. Further, "and" may also be used as a convenient shorthand for "and/or" in the present disclosure. Accordingly, the use of either "and" or "or" is not necessarily intended to require all of the elements to be included or to exclude other elements.

Features of the presently disclosed subject matter, are, for brevity, described in the context of particular embodiments. However, it is to be understood that features described in connection with one embodiment are also applicable to other embodiments. Likewise, features described in the context of a specific combination may be considered separate embodiments, either alone or in a context other than the specific combination.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

Examples of the presently disclosed subject matter are not limited in application to the details of construction and the arrangement of the components set forth in the following description or illustrated in the drawings. The subject matter may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Aspects of this disclosure may relate to systems, methods and computer readable media for selecting equipment for use in buildings. For example, in architectural planning, selecting appropriate equipment for use in many rooms and identifying locations for this equipment can be a daunting task. The disclosed embodiments may simplify this process by enabling users to input functional requirements for multiple rooms. A processor may run a series of simulations, which may also be referred to as an optimization process, which may constitute of running a series of simulations to suggest equipment and equipment placement in the rooms. A processor may run a calculation or series of calculations to suggest equipment and equipment placements in rooms, or use a machine learning model to suggest equipment and equipment placements models in rooms For ease of discussion, a method is described below with the understanding that aspects of the method apply equally to systems, devices, and computer readable media. For example, some aspects of such a method may occur electronically over a network that is either wired, wireless, or both. Other aspects of such a method may occur using non-electronic means. In a broadest sense, the method is not limited to particular physical and/or electronic instrumentalities, but rather may be accomplished using many differing instrumentalities.

Consistent with disclosed embodiments, a method may involve accessing a floor plan. As used herein, a floor plan may include any graphic representation of a layout, partial layout or section of a building, which may include an interior of the building, an exterior of the building, or both. The floor plan can include any representation of any floor or surface in any structure, including an existing structure and/or a contemplated structure that has not been constructed. The floor plan can include representations of rooms; representations of architectural features such as windows, doors, walls, columns and furniture including their materials, representations of both primary and auxiliary equipment such as sensors, electrical equipment, HVAC equipment, motors, pumps, wiring, cable trays, and technical equipment rooms. These representations may be in the form of symbols as is the case with formats such as CAD or parametric objects or digital representations of real life objects as is the case with a Building Information Model (BIM) file which may contain BIM objects. BIM files may be used to generate and manage digital representations of physical and functional characteristics of places, buildings and objects. BIM objects may describe actual architectural elements such as walls, doors and furniture and equipment and can hold a various metadata, geometric and parametric information regarding them. For example, a wall BIM object may contain a wall geometry, a physical makeup of a wall (bricks, concrete or gypsum), a finishing type of a wall, a fire resistance rating of a wall, and/or locations of openings in a wall. It may include both 2D and 3D images or graphical representations of the wall, and graphical representation for the BIM object on a floor plan object. Building Information Modeling (BIM) objects may include a combination of detailed information, attributes, parameters, technical characteristics, geometry, and metadata that defines an object (e.g., piece of equipment, architectural feature, etc.) and represents the object's physical characteristics in two and/or three dimensions. A BIM object may be described as a "digital twin" or digital equivalent of real world objects, architectural features and equipment. For example, a BIM object may contain a description, dimension, BIM family classification, model number, a 2D floor plan symbol and a 3D image. A BIM object may include technical characteristics such as visualization data that gives the object a recognizable appearance and behavioral data, such as detection zones, which enable the object's position to be determined or to behave in exactly the same way as the product itself, for example in a simulation. A BIM object may represent windows, doors, boilers, or any other equipment, as disclosed herein. A BIM object may indicate a specific model of equipment, a generic piece of equipment, a family of equipment, or any level of specificity in between.

The floor plan may be associated with residential, commercial, or public buildings (e.g., offices, homes, schools, museums, transportation stations/airports, medical facilities, or other public structures.), or any other structure. For example, the floor plan may depict a physical layout of one or more rooms in the building (e.g., a single room in a building, a suite of rooms, a whole floor of rooms, or an entire building of rooms). In some embodiments, the floor plan may be associated with a mobile structure, such as a ship, a motor home or other recreational vehicle, an airplane, or other vehicles. The floor plan may be constructed in a 2D format, 3D format or any combination thereof. A floor plan may be complemented or augmented with a single line diagram which may be a simplified graphic representation of a plurality of pieces of equipment in a system or plurality of systems. In a single line diagram, each line may represent one part of a system. A single line diagram may indicate equipment technical specifications and/or quantities and/or identifiers without a representation of a layout and/or the room demarcations of the rooms in which the equipment is located. A single line diagram may use simplified symbols to represent equipment. A single line diagram may include, for example, connection details between one or more pieces of equipment. A single line diagram may provide an overview of one or multiple systems. The floor plan may be represented in any suitable format. For example, the floor plan may be represented as a hand-drawn or scanned image, in a vector-based format (e.g., CAD, PDF, DWG, SVG, or other 2D drawing formats), in an image format (e.g., BMP, JPG, PNG, or similar image files), in 3D models, in Building Information Models ("BIM") in Industry Foundation Classes (IFC) or Revit™ (.RVT) format, or any other graphical or digital format. The floor plan may be in digital or hard copy formats or both. In some embodiments, the floor plan may be represented as a data structure, described in further detail below. A floor plan may also include other information associated with the plurality of rooms and the equipment and data contained therein including architectural features such as door and furniture locations and types, equipment, technical specifications, functional requirements, equipment lists, energy metering, BMS data, iOT data, or any other data that may be relevant to the floor plan.

Consistent with the present disclosure, the floor plan may demarcate a plurality of rooms. As used herein, a room may include any defined indoor and/or outdoor space. For example, a room may include a bedroom, an office, an entryway, an electrical room, a kitchen, a bathroom, a laboratory, a control room, a boiler room, a mechanical rooms, a garden, a hallway, an attic, a balcony, an atrium, or any other area or space that may be associated with a building or structure. A room demarcation may include information in the floor plan indicating the location of a room in relation to the rest of the floor plan. The demarcation may include representations of one or more boundaries (sometimes referred to as contours) of the room. The boundaries may include objects, real or imaginary, that constitute the room's borders (such as walls or windows that surround a room), openings associated with the room's borders (doors and window leading in and out of the room), equipment and/or architectural features (columns, beams, furniture, etc.) contained in the room. In some embodiments, the floor plan may include textual information, such as the name or function of the rooms, the number of the room, the classification tag of the room, information regarding the dimensions of the room, or other textual information. Identification of a room demarcations and contours may allow for a variety of actions to be efficiently applied or performed on a room. Non-limiting examples of the many types actions that may be applied to a room with identified contours may include: application of functional requirements or technical specifications; addition of equipment; extraction of geometric data as an input for a simulation or optimization process; extraction of room geometric data such as room area and number of boundary segments and architectural features such as walls, doors and furniture to be used as inputs to an optimization process and/or for a machine learning model, or various other actions as described throughout the present disclosure. These inputs may be used, for example, by a machine learning model to semantically enrich various elements of the room including semantic designations such as room function, and/or the semantic designations of its architectural features and equipment an optimization to be run within the boundaries of a room. They may also be used by a machine learning model trained on a dataset of room geometries and equipment technical specifications and placement locations generated with an optimization process, for example, to select and place equipment within the room.

In some embodiments, the borders or contours of a room may not initially be demarcated in the floor plan in a machine readable format or format which can deciphered by a machine. In an image file (JPG, PNG), for example, the representations of room borders may only be pixels without any associated metadata or semantic designation to distinguish them for other pixels representing furniture and other elements. In a CAD or PDF floor plan, for example, the vector data structure representing the geometry used to symbolize or represent rooms including their walls, doors and other architectural feature many not contain any metadata or semantic designations identifying them as such, and may only contain the actual points that make up the geometry. In some cases, the specific vectors describing the room's borders may have the same properties as any other vector in the file and may not be identified as such. These vectors may be described as a list of points without any associated metadata (e.g., [(0,0), (2,2), etc.]).

In other cases, a set of points or lines in a file may be grouped together in a layer which may be associated with a name or other metadata. However, this metadata may be unstructured and not conform to a standard, convention, classification, and/or semantic designation. A layer, for example, containing lines representing walls may be named "A3-1." In a building information model (BIM), otherwise referred to as a BIM file or BIM floor plan, objects such as walls, windows, and doors may have not been bound and/or associated with a room. In other cases, for example, spaces and/or rooms may have not been defined. In other cases, there may be duplicated or overlapping rooms. This may be the result, for example, of a user error during the creation of the BIM model or an issue with a BIM object. In many cases, room borders represented in a floor plan may be inferred by a human viewer, who mentally visualizes them by connecting lines which make up walls, doors and windows in the plan and recognized by their visual style and context. However, a computer may not have these capabilities and may not be capable of isolating the borders from existing data. Thus, the disclosed embodiments may include processes to automatically add such borders, inferring them from name, geometry, visual style, metadata and context. Accordingly, receiving the floor plan demarcating contours of a room may include performing additional processing on the floor plan to demarcate the contours of the room. In cases where room contours are not initially identified by a machine, a user may need to manually define room contours. Examples of manual definition of room contours may include marking the contours on a floor plan using a drawing tool, selecting the walls that constitute the contours of the room, using a create room or space tool, or entering the room contour coordinates.

In some embodiments, the additional processing on the floor plan to demarcate the contours of a room may include performing image processing on the floor plan to demarcate the contours of the room. Image processing (i.e., image analysis or image processing algorithms) may include identifying lines, circles, or other features from pixel-based images to fill in missing contours or otherwise gather information regarding geometry. For example, this may include a Hough transform algorithm to reconstruct lines or circles from pixel-based images. Another example may include the use of Canny edge detection to identify edges of solidly colored shapes. In some embodiments, image analysis may be employed to analyze a floor plan if vector information is missing. For example, image analysis may be used to demarcate contours of a room for hand drawn plans, scanned plans, or other representations. Image analysis may be used to augment geometric analysis, semantic analysis and machine learning methods.

In some embodiments, artificial neural networks may be configured to analyze inputs and generate corresponding outputs. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

For example, artificial intelligence methods including, but not limited to, deep learning networks may be used to segment walls and room contours from a floor plan, or detect and classify architectural features such as doors, windows, furniture as well as equipment. A non-limiting illustrative example of possible artificial intelligence techniques is the use of segmentation, detection, and/or classification models such as ResNet, YOLO or RetinaNET trained to identify walls, doors, or furniture based on a training set of labelled walls, doors, and furniture. Machine learning models may include but are not limited to classification models, neural network models, random forest models, Convolutional Neural Network Models, deep learning models, recurrent Neural network models, support vector machine models, a support vector machine model, ensemble prediction models, Adaptive Network Based Inference System, or any other machine learning model. Possible deep neural types of CNN's may vary according to the type of task and may include Resnet 50 for classification, RetinaNet for detection- and Unet and Mask RCNN for segmentation. Embodiments consistent with the present disclosure may include structured data models such as, for example, boosting algorithms (e.g XGBoost), standard neural networks, and random forest models.

As one of skill in the art will appreciate, machine learning may include training a model to perform a task, the training including providing example training data to the model and iteratively optimizing model parameters until training criteria are satisfied. For example, a model may be trained to classify data using labelled datasets. In some embodiments, a model may be trained to use training input data to produce an output that closely matches training output data. Model training may include hyperparameter tuning, sizing of mini-batches, regularization and changes in network architectures. It should be understood that systems and methods contemplated herein include using available machine learning platforms and/or libraries to train and/or manage models (e.g., TENSORFLOW, PYTHON, MATLAB, KERAS, MICROSOFT COGNITIVE TOOLKIT, and/or any other machine learning platform). In some embodiments, training of machine learning models may be supervised and/or unsupervised. Training data may take many forms including, for example, the annotation of elements including but not limited to various architectural features (e.g. doors, door sills, windows, walls, rooms, etc.) and equipment (e.g. sensors, furniture, cabinetry, lighting fixtures, HVAC ducting, etc.).

Some examples of possible approaches to the training of a dataset, a plurality of floor plans may be annotated in different formats including but not limited to CSV, JSON, and/or other file types to allow multi-type deep learning training and other possible machine learning training techniques. Various annotation methods may be used to label features for training depending on the task such as masks or bounding boxes. As illustrative non-limiting examples regarding annotations, geometric objects such as boxes, oriented boxes, or polygons may be used to identify and demarcate features of interest in a plurality of floor plans. These objects may be generated manually by drawing them over the image or automatically, by using heuristic, geometric or statistic algorithms to generate them, or generated and/or identified using other possible techniques, or any combination thereof. The annotations may be used for detection, segmentation, and/or classification tasks, as well as other machine learning algorithms, computer vision tasks, or any other artificial intelligence tasks, as well as in conventional machine learning and/or statistical methods.

In some embodiments, training images may be cleaned by removing text and/or redundant features and/or other elements. Training sets, may include 1000 images per class or more. In some embodiments, training data may be augmented, for example, by rotating images, adding synthetic data, \the addition of noise, or various other techniques. For small object detection such as doors and door sills, a floor plan may be cropped into a reduced size such as, 1000×1000 pixels, and afterwards may be recomposed and used with non-maximum suppression. Floor plans may be resized to 1024×1024, 512-512, or other suitable sizes before inputting them to the artificial intelligence model for larger holistic objects such as walls and room. Annotated floor plans may be divided into training and validation sets. For detecting architectural features in the floor plans and predicting features, various deep learning models may be used, which may include, but are not limited to RetinaNet based on the Resnet classification network, for detecting doors. For segmentation tasks of walls and rooms, mask RCNN or a base of a multi-purpose network such as UNET may be used, which may employ an encoder-decoder architecture to reconstruct semantic segmentation on top of the floor plan image. In some embodiments, various metrics may be used to assess the prediction performance of models. Such metrics may include, for example, mAP, F Score, accuracy, intersection over union (IOU), or other performance metrics. In some cases, an ensemble of a plurality of models may be used to increase prediction performance. For example, deep learning networks may be trained on a specialized cloud machine with an industrial GPU or with a variety of other types of machines. The result of deep learning models may be post-processed with computer vision algorithms, such as RANSAC, Hough lines, and Connected components algorithms. A machine learning model may be combined with a geometric analysis and/or semantic analysis.

In some embodiments, receiving the floor plan may include performing a geometric analysis on the floor plan to demarcate the contours of the room. As used herein, a geometric analysis may include any form of analysis for extracting information from a floor plan based on geometries represented in the floor plan to identify walls, windows, doors and other architectural feature which may demarcate the contours of the room. A geometric analysis may include an interrogation of a floor plan represented in a BIM, CAD, PDF or file format containing geometric entities such as lines, polylines, arcs circles or vectors. The geometric analysis may use coordinates (e.g., XYZ coordinates) of end points of entities to determine properties of the entities and their relationship each other. For example, information derived from a geometric analysis may include: line length, line direction, the location of geometric objects in the floor plan, or any other properties represented in the floor plan. The geometric analysis may include searching the floor plan for sets of parallel lines or vectors, perpendicular lines or vectors or lines in a certain angle, which may be indicative of walls or other boundaries of a room. The geometric analysis may include measuring distances between entities and find pairs of entities close to each other, identifying sets of entities that create patterns which repeat in different locations in the floor plan, finding relations of inclusion between a point and a closed geometry, or any other relationships between points, lines, or shapes represented in the floor plan that may indicate room contours. After identifying a series of polygons that may be potential walls (e.g. wall candidates), rooms and their contours may be identified, for example, by offsetting the polygons outwards by 50-100 mm to close gaps and joining all polygon borders using polygon Boolean operation. This may result in a large border polygon, with several "hole" polygons. The "hole" polygons may be considered rooms, for example if they meet certain conditions. Examples of the many types of conditions, may include, for example minimum area, minimum width and rules against not being nested into each other. Another example geometric analysis for the identification of doors may include searching for containment of possible door geometries (e.g. an arc and a line with similar sizes/radii which meet in their end points) within room boundaries.

In some embodiments, receiving the floor plan may include performing a semantic analysis on the floor plan to demarcate the contours of the room. A semantic analysis may include but is not limited to an analysis of a BIM or CAD or PDF file, which may interrogate and analyze parameters and attributes of a plurality of elements in the file. For example, in a CAD file, a semantic analysis may include interrogating the name of the layer an entity is drawn in, the type of entity, or the type of line it is represented with. As another example, a semantic analysis may include using the name of a CAD block to determine if the type of element it describes. In a BIM model, a large amount of information may be contained within semantic and textual fields as BIM object properties, geometric data, metadata, and attributes. In this type of files, a semantic analysis may yield information regarding the type, location, and the physical makeup of architectural elements represented by BIM objects. For example, a semantic analysis may determine a type of wall, its location, bounding points, its structure, its fire rating or its dimensions.

In some embodiments, a semantic analysis of a BIM file may yield information regarding the type, model, or manufacturer of furniture represented as BIM objects. In these files a semantic analysis may also yield relationships or associations between different elements in the floor plan, for example an association of a wall with a door within it, or a wall with the room it borders. A semantic analysis may include accessing and extracting data from a BIM file regarding room demarcations, otherwise referred to as room contours or room boundaries. Semantic analysis can also yield information regarding the function of a room or element (e.g. sleeping area, office, storage space, etc.). A semantic analysis may include Natural Language Processing algorithms such as word2vector, which may be used to infer semantic meaning even when it is not clearly represented in the data (i.e. algorithms that infer that a hallway is another word for a corridor or that a recliner is a type of sofa). A semantic analysis may be combined with geometric analysis and/or machine learning models.

In other embodiments, a BIM analysis may be used for additional processing of a BIM file beyond semantic analysis. A BIM analysis may include but is not limited to an analysis of a BIM model using a combination of geometric analysis, semantic analysis, and machine learning methods aimed at extracting specific information regarding the architectural features, geometry and BIM objects in a floor plan. Although semantic analysis may, in many cases, identify objects and elements of interest, in certain cases human modeling errors, or issues with a model or BIM object may necessitate additional processing such as geometric analysis and machine learning methods to identify all objects and elements of interest. For example, walls and columns may have not been bound to rooms. In some cases, rooms or spaces may have not been created. In other cases, rooms may be overlapping or duplicated. In such cases, analysis of geometries using geometric analysis may assist to rectify such as issues. In another example, a BIM object such as a chair may be incorrectly associated with a BIM family for another category of equipment (e.g. toilet). In such a case, the use of a machine learning detection model may correctly identify the object as a chair. The results of a BIM analysis may include a set of room boundaries, names, numbers, descriptions of the rooms, walls, doors, and windows associated with said rooms, equipment associated with said rooms, materiality, technical characteristics, technical specifications, and description of any of these elements, or their properties.

In other embodiments, topological analysis may be used for additional processing of a floor plan. Topological analysis may refer to an analysis of the connectivity of rooms, spaces, zones, and floors within a floor plan that can reveal information regarding the properties of these rooms, spaces, zones, and floors. A topological analysis may define relationships between rooms and their position in the floor plan hierarchy using the doors that connect between them to create spatial maps. A spatial map may include weighted graphs and graph properties such as connectivity and shortest paths. Topological analysis may employ geometric analysis, which may include an interrogation of a BIM, CAD, PDF, and/or any 2D or 3D floor plan containing geometric entities such as lines, polylines, arcs, circles, and/or vectors. Topological analysis may employ semantic analysis which may include interrogating and parsing of BIM file for information regarding room connectivity, room adjacencies and room openings such as doors. Door faces (i.e., a side of a door) may swing in one direction and not the other, so opposing door faces may behave differently because one face may open inward while the other may open outward. Determining a preferred door face may include establishing which door face is optimal for a desired result. For example, when determining a preferred door face for a door required to be covered with a sensor, topological analysis may establish that one side of the door is better suited for a particular sensor than the other. As an example, it may determine that the side of the door facing a corridor is more suitable. As another example, when determining a preferred door face for a lighting controller, topological analysis may establish that one side of the door is better suited for the lighting controller than the other. For example, a light controller may be located on a side of a wall corresponding to a door face that is easier to reach for an individual entering or exiting a space through the door. In some embodiments, a preferred door face may be identified by means of machine learning methods.

The floor plan can be accessed in a variety of ways. In a general sense, accessing may occur when, for example, a floor plan is uploaded, linked, retrieved, recovered, extracted, or otherwise provided to or obtained for analysis by at least one processor. Additionally, or alternatively, accessing may occur when at least one processor is enabled to perform operations on the floor plan. In some embodiments, accessing may occur when a floor plan is retrieved from some form of memory. The floor plan may be retrieved, for example, from a network location, such as a network drive, a cloud-based platform, a remote server, or other forms of network storage locations. Accessing a floor plan may include identifying a floor plan based on a description of a floor plan, a title, a name, a number, or another floor plan identifier. In some instances, accessing a floor plan may occur in response to user input via a user interface. In some examples, accessing a floor plan may include loading a floor plan in memory based on user inputs defining the floor plan (e.g., based on a scan of a floor plan or a drawing of a floor plan via a graphical user interface). A floor plan may be accessed based on a search of floor plans using search criteria. For example, the at least one processor may identify a floor plan using a Boolean search method of textual data associated with a floor plan, such as identifiers of the floor plan. Alternatively or additionally, accessing a floor plan may include identifying a floor plan which satisfies a minimum or maximum size, has a specific number of rooms, has a date of creation that meets particular criteria, has a room of a particular type, is associated with a functional requirement, or which satisfies any other search condition.

In some embodiments, identifying room contours, a generative analyzing process, and/or other processes such as the performing of semantic enrichment may be computed on a cloud-based servers or interface or retrieved from a cloud-based interface. A cloud-based interface may be any user interface allowing a user to download, upload, or otherwise interact with data stored in remote servers. In some embodiments, the remote servers may be managed by a hosting company, such as IBM® Cloud, Amazon® Web Services, or similar online storage platforms. More generally, cloud-based may refer to applications, services, or resources made available to users on demand via the internet from a cloud computing provider's servers. Cloud-based computing can increase capacity, enhance functionality, or add additional services on demand at reduced infrastructure and labor costs. Cloud based services may be used to allow complex, computationally expensive algorithms to be accessed by users directly through their browsers without the need to download software to their personal computers.

In some embodiments, machine learning models, such as one or more ResNet models trained to classify architectural features, or classifications models such as XGBoost trained to predict room functions, may be stored, for example, in cloud based file hosting services (such as Amazon S3, Azure Blob storage, Google cloud storage, DigitalOcean spaces, etc.). The model, for example, may be fetched and loaded into memory (RAM) by microservices during their initialization. Once loaded into RAM, the microservices may able to receive requests in the form of messages (such as synchronous HTTP messages; asynchronous messages via message brokering software/services such as Amazon SQS, RabbitMQ, KafkaMQ, ZeroMQ; persistent connection such as websockets or raw TCP sockets, or raw non-persistent packets via the UDP protocol, etc.). Once a request is received, the service may, for example, invoke the model with the payload of the message (such as bitmaps, text, or other appropriate data structures the model was trained with), and receive a result (e.g., with a data structure that is based on the type of model) in return. The service then may respond, for example, with the generated machine learning model result.

In some embodiments, a series of simulations or an optimization process may be run on the cloud. A cloud-based optimization may be, for example, based on orchestration of one or many microservices that execute an algorithm. For example, an orchestrating service may receive the locations of resources, or the actual resources in either raw binary or human-readable data structure, as well as any other parameters and metadata that may be required for the book keeping (e.g. in a database, in-memory cache service, or file storage services). The orchestrating service then may, for example, preprocess the resources and parameters, and generate permutations that may be dispatched (by either synchronous or asynchornous messaging schemes, often depending on the expected runtime duration of the algorithm) to worker microservices that may be responsible for the actual execution of the optimization algorithm. There may also be additional intermediate steps, for example, between the main algorithm orchestrator and the worker microservices. Upon completion of the optimization algorithm, the microservices may dispatch, for example, a mirroring message that signifies the completion of the algorithm. Artifacts and intermediate results may be kept in in-memory caching services (such as Redis™) or in file storage services (such as Amazon™ S3) for example. The orchestrator or the intermediate orchestrating services may then, for example, postprocess the results (and any of the aforementioned intermediate artifacts and results of the process) of the optimization algorithm, and may choose, for example, to dispatch additional requests based on the nature and performance of the results. After all expected results are received in the algorithm orchestrator, a message may dispatched back, for example, notifying the optimization process is complete, accompanied by either the results (or the locations of the results in file storage services/databases), as well as any other relevant artifacts and intermediate results generated in the process In some embodiments, the floor plan may be accessed from local storage, such as a local memory device associated with the processor performing the disclosed methods. In other embodiments, the floor plan may be uploaded by a user, for example, through a user interface. Various other means for accessing the floor plan may be used, including receiving a transmission of the floor plan from another computing device, a scanning device, an image capture device, or any other device that may transmit information for analysis.

Some embodiments may involve acquiring one or more functional requirements associated with rooms represented in the floor plan. For example, embodiments may include receiving a first functional requirement for at least one first room of the plurality of rooms, and receiving a second functional requirement for at least one second room of the plurality of rooms. As used herein, a functional requirement may include any description or other representation that defines expected or required performance parameters, attributes or performance objective. A functional requirement may be assigned to any building system, a project, a floor plan, a zone, a room, an area, an architectural feature, or any other aspect of a layout or a component of a layout. The functional requirements may define performance parameters associated with the placement and specification of equipment. In other words, whether a system satisfies the functional requirements may depend at least partially on the location and specifications of equipment within a floor plan. Accordingly, a functional requirement may be used as a target for a generative analysis to determine equipment placement locations and/or technical specifications for equipment, as described in further detail below. A functional requirement may describe, for example, minimal, maximal or preferred performance of a system, sensor, or component at performing a task.

Non-limiting examples of functional requirements may include values or parameters specifying sensor properties (e.g., image capture quality, resolution, frame rate per second, movement detection type, occupancy detection type, detection range, facial recognition, or other image or video properties), energy consumption, wattage, temperature, exchange rate, humidity, air flow, air quality, heat dissipation, comfort level, cooling or heating capacity, thermal comfort, network bandwidth, network speed, signal strength, signal to noise ratio, signal coverage, radio frequency range, screen size, speech intelligibility, noise levels, water pressure, angle, dimensions, fire rating, energy rating, environmental rating, occupancy, quantity of desks or workstations, or any other variables, objectives or properties that may be present in a building, space, room, group of rooms, or floor plan. In some embodiments the functional requirements may be defined based on applicable national, state or municipal codes or industry standards. The functional requirements may be based on other performance requirements, such as those specified by a user, architect, builder or organization.

The functional requirements may be received in various manners. In some embodiments, receiving the functional requirements may include accessing a database or other form of storage location configured to store one or more functional requirements. In some embodiments, the functional requirements may be stored in a data structure linking the functional requirements to particular floor plans, rooms, areas, zones, buildings, or otherwise specifying where the functional requirement is appliable. Accordingly, at least one of the first functional requirement or the second functional requirement may be prestored in a data structure. The functional requirements may be accessed over a network connection, or may be stored in a memory local to the processor performing the generative analysis described herein.

In some embodiments, the functional requirements may be represented in the accessed floor plan. For example, the floor plan may include textual information or metadata identifying functional requirements that apply to one or more rooms or areas of the floor plan. The functional requirements may be represented by identifiers or other short-form representations. These identifiers may be correlated with more detailed functional requirements, which may be stored in a data structure, a table, or other format. In some embodiments, the functional requirements may be represented graphically in the floor plan. For example, the disclosed methods may include associating color indicators with functional requirements. Accordingly, the functional requirements may be colorized on the floor plan with respective ones of the color indicators (e.g., by color-coded markers, colored regions of the floor plan, colored outlines, or any other means of color indications). The functional requirements may be represented in the floor plans by other features, including shading, patterns (e.g., stripes, dots, or other fill patterns), outlines, or any other forms of graphical representations.

In some embodiments, a functional requirement may describe a minimal or maximal performance of the system for a given task. For example, the functional requirement may define a minimum coverage area for a room. The coverage area may be based on a sensor (e.g., a camera, a proximity sensor, a smoke detector, motion detector, sound sensor, heat detector, LIDAR, Radar, or any other form of sensor configured to receive information within a defined area), a communications or network device (e.g., a Bluetooth™ device, a Wi-Fi access point, indoor positioning system, ultrawideband tracker, BLE beacon, RFID sensor, infrared transmitter/receiver, NFC transmitter/receiver, or any other form of information transmitting device), a fire suppressant system (e.g., a sprinkler coverage area, a foam fire suppressant, etc.), a leak detector, a temperature or humidity sensor, or any other form of device associated with a predetermined coverage area. In some embodiments, the functional requirement may define a certain level of lighting, sound pressure, air flow or electrical power provided to a room or certain area within a room. In some embodiments, the functional requirement may be rule-based. For example, the functional requirement may define a rule that an access panel must be placed next to each exit door. In some embodiments, the rules may be conditional. For example, a rule may define placement of a piece of equipment based on whether a condition is triggered (e.g., "if the room contains an exterior door, a camera coverage area must include the exterior door," or similar conditional rules).

The functional requirement may be specific to a particular room within a floor plan, or may apply to multiple rooms. Accordingly, each room within a floor plan may have a different set of functional requirements that apply. Therefore, the disclosed embodiments may include receiving different functional requirements for the at least one first room and the at least second room. In some embodiments, different types of functional requirements (for example defining noise level and camera coverage requirements) can be applied to the same room or area.

The type of a functional requirement may be specific to the type of system, sensor, or component to which it is applied. For example, a functional requirement from a lighting system may be to provide at least 500 lux to a room. A functional requirement from a CCTV system may be to provide enough pixel density and/or resolution to identify the face of a person. A functional requirement from a Building Management System (BMS) may be to cover all office desks with occupancy sensor coverage in order to detect occupancy status of a given desk or occupancy levels of a given work area. A functional requirement from an electrical system may be to distribute power according to a standard, code or regulation to a variety of equipment located inside a plurality of room such as electrical outlets, lighting fixtures, office equipment, and air conditioning units. A functional requirement from a heating/ventilation/air conditioning (HVAC) system may be to provide a required air flow and ventilation for a specific room occupancy. A functional requirement for a voice evacuation system may be a level for Speech Intelligibility (STI) and sound pressure in DB (SPL). A functional requirement from an access control system may be to fit all exit doors with keypads. A functional requirement from a fire safety system may be to protect all doors leading to escape corridors with smoke detectors, or to provide alarm initiating devices within a certain distance from all rooms. These functional requirements are provided by way of example, and the present disclosure is not limited to any particular functional requirement.

Accordingly, the disclosed embodiments may include receiving a plurality of functional requirements for the at least one first room and/or the at least one second room. In some embodiments, different types or categories of functional requirements may be associated with a given room or area. Accordingly, the disclosed methods may include receiving at least two different functional requirement types for the at least one first room or the at least one second room. In some instances, the two different functional requirements may be for different systems (e.g., 1 functional requirement related to an HVAC system and 1 for a WiFi system). In other instances, the two different functional requirements may relate to a common a system (e.g. 1 functional requirement for a lighting lux level, and 1 functional requirement for lighting controller). In such cases, the generative analysis process for the first functional requirement and the selected technical specification and placement location may be used as an input for the generative analysis process for the second functional requirement (e.g., receiving the selected light fixture technical specifications and locations associated with the first functional requirement as an input for the generative analysis process for the second functional requirement in order to select a technical specification for lighting controllers compatible the selected lighting fixture technical specifications). Accordingly, the disclosed methods may include receiving at least two different functional requirement types for the at least one first room or the at least one second room. In many instances, these different functional requirements may be nonconflicting, such that each can be satisfied by placement and specification of equipment within the room. In some instances, two or more functional requirements may conflict with each other. For example, a zone or area within a floor plan may have a first functional requirement, and a room within the zone or area may have a different functional requirement that defines the same parameters as the first functional requirement. In such instances, the disclosed embodiments may include determining which functional requirement to apply. For example, a portion of a floor plan may have a requirement to maintain camera coverage in all areas to track or identify persons, but this requirement may be superseded by a functional requirement to avoid camera coverage for privacy in a bathroom within that portion of the floor plan. Thus, functional requirements may include rules for resolving conflicting functional requirements. In other instances, for example, a functional requirement for fire suppression sprinklers may supersede a functional requirement for smoke detector coverage based on a code, regulation, or standard. In some embodiments, the generative analysis of two different functional requirements may be run sequentially. In other embodiments, they may be run simultaneously. For example, in some embodiments, a generative analysis process may first select and place light fixtures, and then run another process to select and place compatible light switches with the light fixtures. As another example, a generative analysis process may select and place fire sprinklers to conform to a first a functional requirement for water-based fire suppression. When running a sequential generative analysis for a second functional requirement for coverage a of a room with smoke detectors, it may be determined that smoke detectors are not required due to the presence of fire sprinklers. This determination may be according to a rule, code or regulation, and/or a standard.

In some embodiments, the functional requirement may be based on input from a user, as noted above. Accordingly, at least one of the first functional requirement or the second functional requirement may be defined by a user. For example, the user may define the functional requirement through a user interface, which may be configured to receive functional requirements and other parameters through various input fields and/or controls. In this context, a user may be any individual or organization that may interact with the disclosed systems, which may include providing input to the system and/or receiving outputs associated with the system. For example, a user may include, an architect, a designer, a manager or supervisor (e.g., a plant manager, etc.), a homeowner, a technician, or any other individual who may define functional requirements for a system. Similarly, at least one of the first functional requirement or the second functional requirement may be applied by a user. For example, the generative analysis based on the functional requirement, as described in detail below, may be initiated by a user through a user interface or by other means. The functional requirements may be applied using, for example, text, a mouse pointer, or a touch sensitive interface, a drop down list, by rules defined by a user, by the use of an actionable index, among many other methods. For example, list of functional requirements, which may be associated with an index, may be presented as a drop-down menu, enabling a user to select one or more functional requirements to be applied to one or more rooms. The list may also be displayed as a series of checkboxes or radio buttons, a series of selectable items, or any other display enabling a user to select one or more rooms. In some embodiments, some or all of the index itself may be displayed. For example, a user may select one or more rooms from a table or other representation of the index. Technical specifications may be similarly applied by users to rooms and/or associated with functional requirements. Such actionable indexes are described in greater detail below.

Disclosed embodiments may further include generatively analyzing rooms to identify technical specifications and/or placement locations for equipment based on a functional requirement. For example, embodiments may include generatively analyzing the at least one first room in conjunction with a first functional requirement to identify a first technical specification and a first equipment placement location in order to at least partially conform to the first functional requirement. Similarly, the method may include generatively analyzing the at least one second room in conjunction with a second functional requirement to identify a second technical specification and a second equipment placement location order to at least partially conform to the second functional requirement.

As used herein, equipment may refer to any piece of electronic, mechanic or any other type of hardware, device, machinery, cabinetry, or furniture that has a function and a technical specification. Consistent with the present disclosure, equipment may include but is not limited to sensors (including, for example, CCTV cameras, IR sensors, thermostats, motion detectors, occupancy sensors, smoke detectors, heat detectors, thermal detectors, glass break detectors, door contacts, window contacts, or other sensors), output devices (e.g., audio speakers, strobes, alarms, amplifiers, lighting fixtures, IR illuminators, or any other devices that may produce an output), network devices (e.g., WI-FI routers, WI-FI Access Points, edge switches, core switches, access switches, Bluetooth routers, patch panels, etc.), controllers (e.g., light switches, access control panel, smart house touchscreens and keypads, etc.), electrical devices (e.g., including generators, uninterruptable power devices (UPS), distribution boards, transformers, breakers, power sockets and outlets, electrical wiring, cable trays, conduits, or any other equipment related to power or communications), lighting controllers (e.g., relay modules, dimming modules, dimming switches, or any other devices for controlling lighting), HVAC equipment (e.g., air intake and output vents, AC units, fan coil units, variable air flow handlers, chillers, heaters, fans, etc.), plumbing fixtures (e.g., sprinklers, drains, etc.), display devices (e.g., televisions, monitors, projectors, projection screens, etc.), furniture (e.g., kitchen cabinetry, closet cabinetry, seats, tables, space dividers, beds, sofas, etc.), appliances (e.g., computers, refrigerators, dishwashers, washing machines, drying machines, etc.), cabinetry (e.g., kitchen cabinetry, closet cabinetry, enclosed spaces with doors, drawers, and/or shelves, wooden cabinets, metal cabinets, and/or any other cabinets), or any other object having a technical function in a room. It is to be understood that various other equipment may be included and the disclosed embodiments are not limited to the examples provided herein.

As used herein, a technical specification for a piece of equipment may refer to any means of identifying the equipment and/or any attributes of the equipment. For example, the technical specification may include a model identifier (e.g., a specific manufacturer model number or series, a model name, or any other means for identifying a particular model), an equipment class (e.g. Outdoor WI-FI Access Point, Long Range Access Point, Infrared Motion Sensor with 90 Degree Coverage, Modular Kitchen Cabinets), or any other means for specifying a piece of equipment. In some embodiments, the technical specification can also include one or more technical characteristics of the equipment. A technical characteristic may include one or more properties of a piece of equipment that may not necessarily be related to any specific model. For example, a technical characteristic may include properties such as mounting device type, resolution, decibel rating, luminosity, IR rating, lens type, network speed, voltage, wattage, power consumption, conductivity, antenna type, communication protocol, color, dimensions, material, flammability rating, environmental rating, water-resistance rating, or any other property of a piece of equipment. In some embodiments the first technical specification and the second technical specification may be different. For example, the disclosed embodiments may include specifying different equipment for placement in the first room and the second room. In other embodiments, the first technical specification and the second technical specification may be the same.

In some embodiments, a set of technical specifications may be stored in a data structure such as a database or other memory device. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

In these embodiments, identifying the technical specification (e.g., the first technical specification or second technical specification) may include retrieving the technical specification from a prestored data structure. The data can contain textual, tabular, numeric or image information which describes the equipment. The data associated with a piece of equipment may contain its model, type, brand, series, price information, specific technical characteristics or properties (such a IR rating or weather resistance), a technical specification, a physical description or a picture of the object, or any other information relating to the equipment. The data may be accessible using a simple query, such as "get camera #33," or complex queries, such as "get the model numbers of all manufacturer TBDH cameras." The data can be entered manually into the data structure or imported from a different format. A prestored data structure may refer to any type of data that is not entered by a user during the current operations, but that is stored before the fact. The data may be uploaded previously by a user in a previous session, stored by a software designer, uploaded from a different data structure or automatically, derived via an algorithm, or any other means for creating and storing the data.

Some embodiments of the present disclosure may further include accessing a data structure containing a list of equipment models and their associated technical specifications. The data structure may include a list of technical specifications that may be identified using the disclosed embodiments. The data structure may further link the technical specifications to particular functional requirements, particular floor plans, particular rooms, particular equipment models, or other variables. Identifying the first technical specification and a first equipment placement location may be based on the list. For example, identifying the technical specification may include determining which technical specification is appliable based on the data structure.

In some embodiments, the technical specification may be defined along with the functional requirement. For example, the disclosed methods may further include receiving a technical specification along with the functional requirement for generative analyzing the at least one first room (and/or the at least one second room). Association of technical specifications with a functional requirement may be a constraint in the generative analysis process. For example, the technical specification of specific series of sensors may be defined along with the functional requirement. This specific series of sensors may have a certain range of lens rotation which may limit the range of lens rotations simulations during an optimization process. As another example, the technical specification of specific model or plurality of models of Bluetooth™ beacons, which may only be wall-mountable, may limit the sampling points during an optimization process to those points located on or in proximity to walls. In other examples, a technical characteristic (e.g. antenna range, weatherproof rating, form factor, etc.) may be defined along with the functional requirement. A technical specification associated with a functional requirement may be a generic specification compromised of one or more technical characteristics (e.g. 6 megapixel, IP66) and/or may contain a specific manufacturer and/or series and/or model. Accordingly, at least a portion of the technical specifications for a piece of equipment to be located in the room may be predefined. In these embodiments, identifying the first technical specification and/or the second technical specification may include providing additional parameters for the equipment not identified in the received technical specification, or outputting the received technical specification.

As noted above, the generative analysis may be used to identify an equipment placement location. The placement location for a piece of equipment may include a suggested location within the floor plan where the equipment may be positioned. In some embodiments, the placement location may refer to a single point or location within the room. For example, the point or location may represent a center point, a corner point, an edge point, or any other point associated with the piece of equipment. Accordingly, the location may be represented in the form of X and Y coordinates in relation to the floor plan (e.g., an overall coordinate system of the floor plan, a coordinate system for the room being analyzed, or any other form of coordinate system). The location may also include orientation information for the equipment. For example, the location may include a center point or location and a facing direction or other directional information of the equipment (e.g., represented in degrees, compass direction, or other formats). In some embodiments, the location may be represented as a plurality of points or a position of a reference feature (e.g., a distance from the bottom of a sensor to the floor; a distance from a side of a sensor to a window edge). If points are used for location, the points may define the corners of the piece of equipment and thus may also define the orientation. The location may also be represented as a symbol, shape or vector within the floor plan. For example, the location may represent an outline of the equipment, an overall footprint of the equipment, a space required for operation of the equipment (e.g., including space for an operator to stand, a space to account for movement of machinery, etc.), or any other graphical representation of the location. In some embodiments, the location may also include height information (e.g., represented in Z coordinates), which may include the overall height of the equipment, an installation height, or other height information.

As noted above, the first technical specification and the first equipment location may be identified based on a generative analysis. As used herein, generative analysis may include any process that is cyclical, iterative and/or selects a solution from a group of alternative options. Such a process may converge on a solution or may involve simulating a series of options to arrive at a preferred option. This may occur using a computational device configured to perform one or more of geometric, mathematical, physical, or other analysis. In some embodiments, generative analysis may include implementing an algorithm, which may include (but is not limited to) any of a large class of algorithms such as rule-based design, heuristics, L-systems, genetic algorithms, evolutionary algorithms, model-based solvers, machine learning models, decision trees, random forests, artificial intelligence methods, simulated annealing, or any other forms of analytical techniques. For example, the generative analysis may include implementing a machine learning algorithm trained to identify technical specifications and placement locations based on a training set of floor plans that partially comply with a particular functional requirement. In some embodiments, the algorithm may be iteratively implemented until a performance criterion is satisfied. Generative analysis may use an optimization process to arrive at a solution. In some cases, generative analysis may use rule based design to arrive at a solution. In some cases, the rules may be conditional or adaptive based on the functional requirement or room, area or zone to which they are applied. For example, a rule may be to place smoke detectors according to a certain spacing and with a certain percentage overlap in a given area only if no sprinkler fire suppression system is identified.

A solution in this context may including placing a piece of equipment in a way that satisfies the demands of functional requirements or specifications. Further, a solution may include identifying the type, brand, or model of a piece of equipment that partially conforms to a functional requirement. A solution may include determining settings, configurations, or parameters of a piece of equipment. In the context of generative analysis, a solution to one or more equipment simulations may include determining a technical specification, an identifier of a piece of equipment, an equipment model identifier, an equipment placement location, a setting, a technical detail, a technical characteristic, a customized setting, a programming parameter or any other aspect of a floor plan or equipment. Further, a solution may include information describing a simulation that met a performance criterion based on functional requirements used as targets of a simulation.

In some embodiments, generative analysis may include analyzing one or more inputs associated with a room to determine equipment placement locations and technical specifications consistent with a functional requirement. A generative analysis may use a variety of input data including: room geometric and architectural features such as area, volume, ceiling height, number of boundary segments, boundary complexity, number and locations of doors, number and locations of windows, obstacles such as columns and shafts, furniture such as desks, chairs and tables, topological connections, adjacent rooms and areas, room name, room function, the level of a building the room is located in, the zone the room is part of, and any other data related to rooms, architectural features, and equipment. The data may also include data relating rooms and equipment to other rooms or equipment. For example, the data may refer to the distance between a piece of equipment in a room and the nearest exit point, the distance between a piece of equipment to a corridor, or to an equipment room, head-end or electrical panel. A generative analysis may also consider equipment technical specifications and functional requirements, both within rooms and outside of them. This analysis may seek to avoid duplicating equipment, avoid code and compliance issues, fix clashing locations, and harmonize technical specifications or manufacturers across all rooms in a given level or a project.

These characteristics may serve as constraints for selection and placement of the equipment in conjunction with the functional requirements. For example, these values may be used as inputs in one or more of the algorithms described above to determine the technical specifications and equipment placement locations. For example, in the case a functional requirement for thermostat controller for a room is received, an input of a technical specification of a fan-coil unit may be used by the generative analysis process to identify thermostat technical specifications compatible with the fan-coil units. In some embodiments, inputs of a room other than the one being generatively analyzed may be used as part of the process. For example, the distance of an egress point in a hallway to the room being analyzed may be used as an input to determine a placement location for an alarm initiating device, which may have maximum allowable distance from an egress point.

In some embodiments, the analysis of equipment or geometric and architectural features may also include analysis of other rooms outside the at least one first room. This may include, for example, determining the distance between a piece of equipment in the at least first room and the nearest exit point, the distance between a piece of equipment to a corridor, the distance to an equipment room, head-end or electrical panel, or other parameters that may depend on information outside of the first room. For example, the distance of an egress point in a hallway to the room being analyzed may be used as an input in the determination of placement location for an alarm initiating device which may have maximum allowable distance from an egress point. As another non-limiting example, the identification of an electrical panelboard in an equipment room along with its associated technical characteristics may be used as inputs in selecting electrical devices for the at least first room. In some embodiments, the generative analysis process may place and select equipment outside the demarcations of the at least first room. As a non-limiting example, a functional requirement may be applied to the at least first room to provide access control to the room. A topological analysis executed as part of the generative analysis process may identify a series of doors in other rooms which provide access to the at least first room, and determine placement of an access control device at one door protects the greatest number of rooms, including the at least first room, and the lowest cost. optimal placement of an access control device to secure entry to the at least one room.

Further, as described above, in some embodiments, more than one functional requirement may apply to a particular room. Accordingly, the generative analysis may identify technical specifications and equipment placement locations based on multiple functional requirements. For example, the disclosed embodiments may include receiving a third functional requirement for the at least one first room, and generatively analyzing the at least one first room may further include using the third functional requirement to identify the first technical specification and first equipment placement location. In instances where the functional requirements conflict with each other, the generative analysis may include selecting which functional requirement to prioritize. For example, the generative analysis may include prioritizing a more stringent requirement, prioritizing based on a building hierarchy of building, levels, zones, and rooms in which smaller constituent groups such as rooms prioritize over large groups such as zones or levels, prioritizing functional requirements based on a predefined priority ranking, prioritizing user-defined functional requirements over default requirements, prioritizing based on codes, standards or regulations, or any other basis of prioritizing.

Similarly, the generative analysis may include applying different types of functional requirements to the same room. For example, the disclosed embodiments may further include receiving a third functional requirement for the at least one first room, the third functional requirement having a different type than the first functional requirement. The system may be configured to generatively analyze the at least one first room in conjunction with the third functional requirement, the first identified technical specification, and the first equipment placement location to identify a third technical specification and a third equipment placement location in order to at least partially conform to the third functional requirement. Accordingly, the third technical specification and third equipment placement location may account for the additional type of functional requirement. The different types may refer to different systems associated with the room, such as a functional requirement relating to an HVAC system and a functional requirement relating to a Wi-Fi network. The system may output the third technical specification and the third equipment placement location in an associative manner with the at least the first room, as discussed in greater detail below. The functional requirements may be associated with related systems (e.g. electrical system and lighting system) or unrelated (e.g. Bluetooth beacons and plumbing).

In some embodiments, the generative analysis may be an iterative analysis including a series of simulations, which may also be referred to as an optimization. Accordingly, generatively analyzing the at least one first room may include a series of simulations including one or more analyses of differing equipment placement locations. In this type of process, a first solution may be posited and then the performance of the solution may be tested by running a simulation. An optimization engine may then repeat this process a plurality of times, trying different solutions and attempts to improve the performance using one of many available optimization algorithms. An optimization process may use generic technical specifications of devices (e.g. a technical characteristic of various fields of view of sensors) in order to identify an optimal generic technical specification for the piece of equipment. Once a generic specification has been identified (e.g. horizontal field of view of 40 degrees, and vertical field of view of 60 degrees), the generative analysis process may then seek the closet match to the generic technical specification within a database containing a plurality of technical specifications including equipment models. If a plurality of equivalent equipment models (or close to equivalent equipment models) are found in relation to the generic technical specification, the lowest cost model may be selected. The selected model may have identifiable, slightly varied, or entirely different technical characteristics to the generic technical specification. Another simulation may then be performed on the identified model, for example, to simulate its precise performance. In some embodiments, an optimization process may, for example, run a series of simulations a plurality of specific models of equipment rather than using generic technical specifications. For example, the algorithms may include genetic algorithms, annealing algorithms, particle swam optimization, machine learning based, or other optimization-based algorithms. The generative analysis may include generating several additional solutions and comparing the performances of each solution to select the best performing solution. The optimizations may be deterministic, such that the algorithms fully define system outputs based on system inputs, or stochastic, such that the algorithms possess some inherent randomness. The optimization may be configured, for example, to analyze single or multiple parameters, and can be local or global optimization.

FIG. 1 is a block diagram illustrating an example optimization process for identifying technical specifications and equipment locations, consistent with the disclosed embodiments. FIG. 1 is shown for purposes of illustration only and is not limiting of the embodiments. Although FIG. 1 depicts certain floor plans, optimization phases, and solutions, embodiments include different optimization processes with different, more, or fewer floor plans, phases, or solutions. Further, FIG. 1 presents non-limiting, exemplary coverage regions whose proportions and boundaries are illustrative only, and not intended to accurately reflect actual coverage area.

In an initial stage 110, an objective associated with a room 112 to be achieved using generative analysis may be defined. The objective may be based on a functional requirement associated with room 112, as described above. In the example depicted in FIG. 1, the objective may be associated with placement of a camera 114 and a functional requirement may require coverage region 116 of camera 114 to be maximized. Coverage region 116 may represent a field of view visible using camera 114. Additional functional requirements associated with room 112 may also be identified, such as a particular model or property of camera 144, a requirement that camera 114 be placed along a wall of room 112, a requirement that a bottom right portion of room 112 be included in coverage region 116, or various other requirements.

In stage 120, the generative analysis may run a plurality of simulations 122, 124 and 126 representing different option for placement of camera 114. The initial simulations may be generated randomly (e.g., with random placements of camera 114 according to the functional requirements), or according to an algorithm, as described above. Each of the simulations 122, 124, and 126 may then be assessed with respect to the functional requirements. For example, the generative analysis may determine that simulation 124 results in a coverage region 116 representing 65% of room 112, as shown in FIG. 1. In stage 130, the generative analysis may include running additional simulations 132, 134, and 136 based on one or more of the simulations from stage 120. For example, the generative analysis may include selecting the simulation in stage 120 with the greatest coverage (i.e. simulation 122) and running slight variations in stage 130. In the current example, the variations may include different camera models or properties, different camera angles, different camera heights, or any other variations that may affect coverage. In some embodiments, stage 130 may include variations of other simulations from stage 120. For example, stage 130 may also run additional simulation on any simulations from stage 120 that exceed a threshold conformance, a predefined number of top simulations (e.g., top 5, top 10, etc.), a predefined top percentage of simulations (e.g., top 10% of simulations based on coverage percentage, etc.), or various other metrics.

In stage 140, the generative analysis may determine an optimal solution which, in this example, may represent the maximum coverage percentage of 85%. This optimal solution may be output as a result of the generative analysis, as described in greater detail below. For example, the output may include a technical specification for camera 114 and a suggested location for camera 114 that maximizes coverage region 116 and at least partially complies with the functional requirements. While FIG. 1 shows two stages of simulations (120 and 130), it is understood that any number of iterations or simulations may be performed as part of an optimized analysis, consistent with the disclosed embodiments. For example, as shown in FIG. 1, the system may be configured to re-test the best alternatives to hone in on the optimal solution.

Further, while an optimization process is shown in FIG. 1, generative analysis may not always include an optimization and may include a calculation or more concrete analysis. In some embodiments the generative analysis may apply a rule-based functional requirement for selecting and placing equipment. In this context, a rule may include any logical relationship defining a functional requirement or how a functional requirement should be applied. For example, the generative analysis may include placing an access reader on each door face that exits to a corridor, placing a piece of equipment where there is at least a certain tolerance of space (e.g. 10 cm on either of the equipment), placing light switches to the side of a bed and at the entrance to rooms, placing power sockets next to desks, spacing equipment at specified distances with a specified overlap, or various other forms of analysis that may be defined by a functional requirement. In some embodiments, the rule may be a logical construct of the type "if A then B" used to create a cause and effect relationship in the computational design process just like plain human language would. For example, the rule may state "if a room has a urinal it is a toilet," or any other logical relationship. In some embodiments, the rule may include including negative limitations, such as "don't place a camera with a field of view encompassing a toilet stall" or composite limitations, such as "place a camera in every door that leads to a stairway and is numbered 3." In some embodiments, the construct of the rule may reference or use architectural features, technical specifications, equipment as inputs such as, for example, "in room areas greater than 100 square feet, provide sounders with a minimum decibel rating of 88 DB," "if rooms has a functional requirement for access control devices and if the room has a plurality of doors, cover the door leading to a corridor with a sensor," "if a room has fan-coil unit, then place a thermostat with a preference for a placement location adjacent to other controllers," "if a room has an occupancy greater than 10 people, then cover work stations with occupancy sensors," and "if a room has a lux level above 400, then connect its lighting fixtures to a dimming system," or any other form of rule that may be applied.

Figures 2A, 2B:
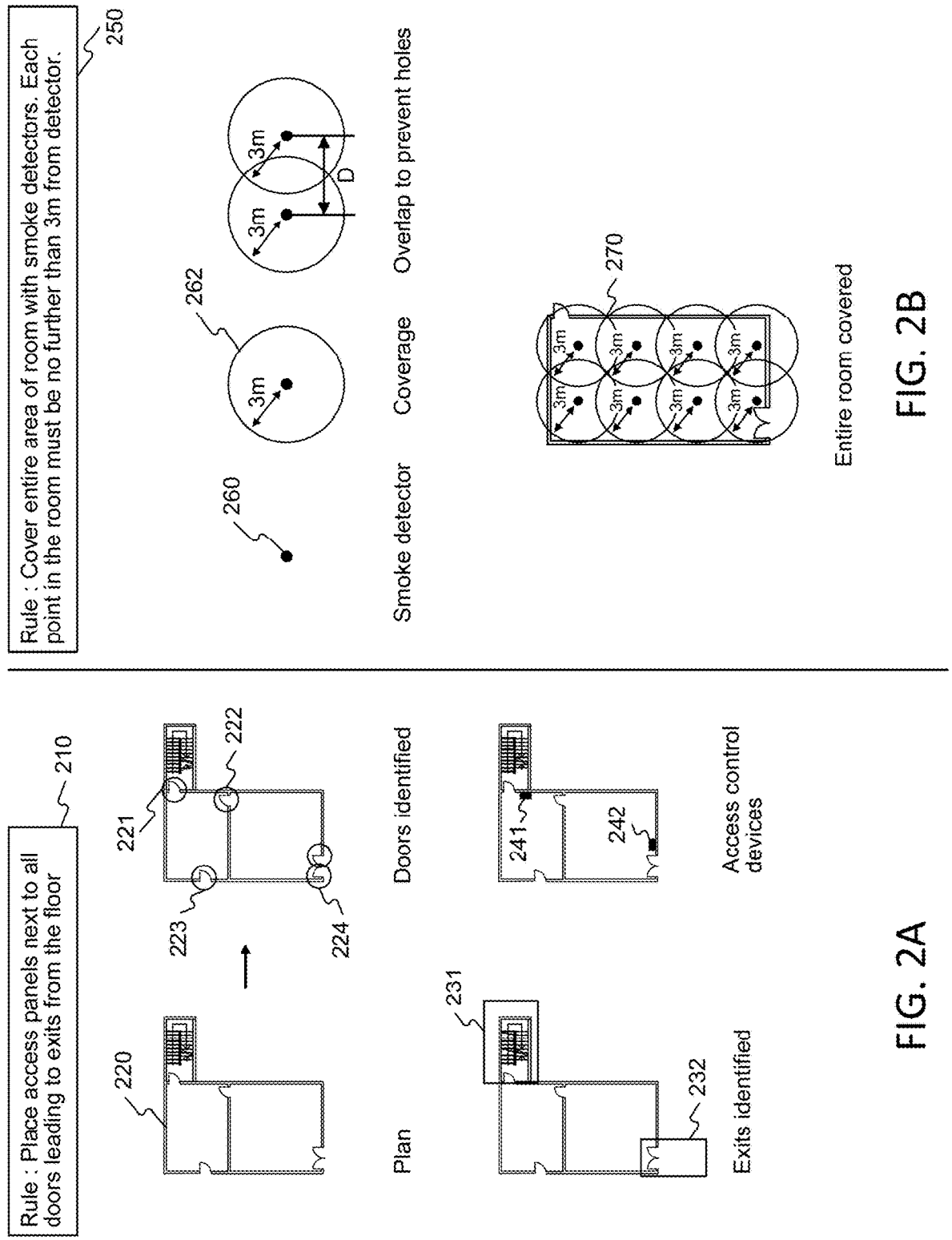
FIGS. 2A and 2B illustrate example rule-based generative analyses process for identifying technical specifications and equipment locations that may be performed, consistent with the disclosed embodiments.

FIGS. 2A and 2B illustrate example rule-based generative analyses that may be performed, consistent with the disclosed embodiments. For example, as shown in FIG. 2A, a functional requirement may define a rule 210 requiring access panels to be placed next to all doors leading to exits from a floor. The access panel may allow access to electrical equipment installed in the wall, such as a security device allowing entry to the floor, or other equipment. A generative analysis may be used to determine a technical specification and/or location of the access panels in conjunction with the functional requirement. As an initial step, a processor performing the generative analysis may access a floor plan 220. The floor plan may be represented as a CAD file (e.g., a DWG) file, a BIM file (e.g., an IFC file) or any other floor plan format as described above. The generative analysis may include detecting a plurality of doors 221, 222, 223, and 224 represented in floor plan 220. In some embodiments, doors 221-224 may be identified based on semantic analysis metadata included in or associated with floor plan 220. For example, floor plan 220 may include object property data identifying doors 221-224 as doors. In other embodiments, doors 221-224 may be identified based on a shape or other representation (e.g., text, or other information) within floor plan 220. For example, the generative analysis may include a geometric, artificial intelligence, or image processing algorithm configured to detect a typical representation of a door in an image file and designate it as a door.

The generative analysis may further include identifying exits, such as exit 231 and exit 232. Exits 231 and 232 may be identified based on doors 221-224. For example, each of doors 221-224 may be analyzed to determine whether they lead to an exterior portion of floor. This may include accessing properties of adjacent rooms (e.g., room types, or other information) to determine where the doors lead. For example, door 221 may be determined to lead to a stairway identified by means of semantic analysis, topological analysis, or machine learning methods and thus may be identified as exit 231. Similarly, door 224 may be determined, suing semantic analysis or topological analysis, to lead to an exterior of the building, and thus may be identified as exit 232.

Based on the identified exits 231 and 231, the generative analysis may include identifying access panels 241 and 242 that must be placed in floor plan 220. The generative analysis may further include determining locations for access panels 241 and 242 next to doors 221 and 224 based on rule 210. This may also account for other functional requirements related to the access panels, such as requirements specifying a spacing from the doors, sizing parameters, height requirements, or various other functional requirements.

As yet another example, a functional requirement may include a rule 250 specifying that each point in a room must be no further than 3 m from a smoke detector, as shown in FIG. 2B. Accordingly, a generative analysis may be performed to determine a placement of smoke detectors 260. The generative analysis may assume a coverage of 3 meters (m) for each smoke detector based on a technical specification, as shown by circle 262. Based on this coverage, the analysis may determine a spacing distance, D, which may prevent gaps in coverage of the smoke detectors. The spacing may be applied in multiple directions (e.g., in X and Y directions), and may be applied to an entire room 270. Accordingly, the generative analysis may result in placement of smoke detectors within room 270 to meet rule 250, as shown in FIG. 2B.

In some embodiments, generative analysis may consider equipment technical specifications and functional requirements outside of the room being analyzed. This analysis may seek to avoid duplicating of equipment and unnecessary equipment, code and compliance issues, clashing locations, and harmonization of technical specifications or manufacturers across all rooms in a given level or a project.

In some embodiments of the present disclosure, the generative analysis may account for other variables, such as user inputs, when determining the equipment placement locations and technical specifications. The user inputs may include any constraints or other parameters in addition to the functional requirements that may inform the generative analysis results. In some embodiments, these inputs may be enforced strictly, in which the generative analysis will not consider solutions that do not satisfy the user inputs. In other embodiments, the inputs may be preferences, and the generative analysis may weigh solutions that satisfy the inputs more favorably than those that do not. In some embodiments, the user may define a preferred area for equipment placement, and identifying the first technical specification and first equipment placement location may be based on the preferred area. A preferred area may include any demarcation of a certain part of a space in which there is an advantage to place a piece of equipment. Accordingly, the generative analysis may favor simulations that result in placement of equipment in the preferred area. Conversely, the user may define an undesirable area for equipment placement, and identifying the first technical specification and first equipment placement location may be based on the undesirable area. Accordingly, the generative analysis may favor simulations that result in placement of equipment outside of the undesirable area. A preferred or undesirable area may be demarcated using a rectangle, a polygon, a line or a point in 2D or 3D space. These areas may be predefined within the floor plan itself, or may be input separately by a user for example, by drawing regions on the floor plan through a user interface. In some embodiments, the preferred or undesirable areas may be based on one or more rules. Accordingly, the preferred or undesirable areas may be tie to particular features, such as within a doorway, on a column, along an exterior wall, piece of furniture, another piece of equipment, or other more general area definitions. For example, the rule may define a bathroom as an undesirable area for a camera, or an office as a preferred area for a Wi-Fi access point, or an room in which there are overhead pipes and/or wet fire suppression sprinklers an undesirable area for an electrical panel or equipment rack.

In accordance with the present disclosure, disclosed embodiments may further include identifying obstructions in the floor plan using geometric analysis. Identifying the first equipment placement location may be based on an identified obstruction. As used herein, an obstruction may include an object or architectural feature that may partially or fully block the line of sight of a piece of equipment, including equipment considered during a simulation. An obstruction may prevent equipment from viewing a part of a room or from being physically located in an area of the obstruction. The obstruction can be of any height up to and above a ceiling level of a room. The obstruction can include permanent objects or objects that are movable. As described above, the geometric analysis for identifying the obstruction may include any form of analysis for extracting information from a floor plan based on geometries represented in the floor plan. For example, the geometric analysis may include searching for lines, curves, or other features in the floor plan that may represent an obstruction, such as a column, or other form of obstruction. The generative analysis may account for obstructions when determining coverage areas for equipment and may determine the equipment placement locations based on the identification of the obstruction. For example, a camera may be positioned such that a column does not occlude an object, such as a door, from the view of the camera.

In some embodiments, identifying the at least one equipment specification may include a weighting of a cost function. A weighted cost function may provide a means to aggregate several goals into one optimization process, and a weighted cost function may have a numeric goal. More generally, a cost function and a weighted cost function may be any form of equation designed to account for multiple goals in reaching a solution. For example, a weighted cost function to determine performance (P) may be:

$$P = \sum_{i=1}^{n} a_i x_i, \qquad (1)$$

where each xi is a score associated with objective i for n objectives and the coefficients ai are weights. Scores may include a cost score, a coverage score, or other score associated a design goal. Scores and weights may be by any positive or negative real numbers. In some examples, weights may be predetermined based on stored data. Alternatively, or additionally, weights may be determined based on an optimization process that includes feedback received after generating solutions that consider multiple types of scores, such as a machine learning process. In one non-limiting example of an optimization process to improve coverage while minimizing cost by weighting a cost score more heavily than a coverage score, P may be calculated as:

$$P=1\times(\text{coverage score})+2\times(\text{cost score}). \qquad (2)$$

In this example, the generative analysis places a weight of 2 on minimizing cost and a weight of 1 on coverage. In some embodiments, the weights may be default or other predetermined weights for the system. In some embodiments, the weights may be set by a user. For example, some embodiments may include receiving a user input varying the weighting of the cost function.

In some embodiments, the functional requirements may be adaptive. In other words, the technical specification may according to the context of the equipment with which it is associated. Examples of adaptive technical specifications may include "place a strobe next to all doors, unless there is a sounder next to the door, in which case do nothing" or "place a camera looking at all doors with a certain pixel density, unless the doors lead to an exit—and then use a different pixel density." In some embodiments, the technical specifications may be adaptive. The technical specifications may be adaptive, for example, according to the context of the functional requirement, and/or technical specifications of other pieces of equipment, and/or the room, the room function, area, zone, or building. Examples may include providing a waterproof power socket in a bathroom, an electrical enclosures of a certain size based on the number of breakers required to be housed inside of it, a thermostat with programmable features suitable for a hotel guestroom, a distribution electrical panel with characteristics compatible with the main distribution panel inside a building, or an access point with a higher number of concurrent users based on its placement inside a room with a room function of multi-occupant office as opposed to single person office room function. Technical specifications may also be adapative based on the geographic location of the building represented in the floor plan. In other words, technical specification may change according to the location simulated. For example, a power socket type, a voltage requirement, or applicable code or standard may change depending on the country in which the equipment is located. Accordingly, the technical specification may include a data structure or other data format linking a plurality of geographic locations to a respective set of technical parameters.

Disclosed embodiments may further include outputting technical specifications and placement locations for the equipment. For example, embodiments may include outputting the first technical specification and the first equipment placement location in an associative manner with the at least the first room, and outputting the second technical specification and the second equipment placement location in an associative manner with the at least the second room. As used herein, an output may be any form of graphical depiction of equipment location or types. Such an output may result from a generative analysis process. The output may be overlaid on the floor plan to indicate identified equipment locations. In some embodiments, generating the output may include modifying the floor plan to include the equipment locations and technical specification. For example, where the floor plan is represented as a CAD, vector architectural file (e.g., a DWG file, or similar CAD file), or BIM file, the output may include modifying the file to include additional shape data representing the equipment locations and technical specifications or modifying the BIM object data representing the equipment location and technical specifications. Accordingly, embodiments may include populating a CAD and BIM format architectural file with the first equipment placement location and first technical specification. In embodiments where the floor plan is an image file, such as a JPG, or a vector image file, such as a PDF, the output may include equipment locations represented as shapes or graphical features overlaid on the image.

As used herein, an "associative manner" may include any manner indicating a logical pair of two or more entities of different types. In context of the present disclosure, an output associating the technical specification and equipment placement location with the room may be any way of representing the technical specification and equipment placement location such that they are tied to a particular room. In some embodiments, this may include a graphical association, such as overlaying the information on the floor plan. In some embodiments, the association may take the form of a logical pairing within an internal database or code. For example, a table or database may contain a list of rooms in the floor plan and associated equipment information. In some embodiments, one member of the pair may appear as a property in the other member's data. For example, the equipment placement locations or technical specifications may be included in property data of the room within the floor plan.

In some embodiments, the output may include textual information in addition to, or in place of, a graphical representation. For example, textual information may include information regarding the model, placement, price or parameters associated with the equipment. The text information may be included in a variety of forms, including a generated text document such as a Word® or .TXT document, a chart such as an Excel® spreadsheet, an image file such as a jpg, a vector image file such as a PDF, a vector architectural file such as DWG, and a BIM model such as a RVT or IFC. In some embodiments the output may be an electronic file, database or index containing information such as placement information and/or technical specifications. Some embodiments may further include displaying a score evaluating the equipment placement location. In this context a score may indicate a numeric appraisal of the performance of one or more pieces of equipment at a certain location. The score may indicate a degree of conformance to one or more functional requirements, such as an amount of coverage of the equipment, a number of functional requirements that are conformed to, or other means of evaluating conformance to the functional requirements. The score may also take into account other factors, such as whether user-defined constraints were met (e.g., preferred placement areas, etc.), equipment cost, equipment availability, equipment size, equipment noise, energy consumption, or other parameters that may indicate the desirability of the equipment placement location. The score may be represented as a number on a scale (e.g., a score from 1-100, a score from 1-10, etc.), a text-based grading scale (e.g., B+, Excellent, etc.), a percentage (e.g., percentage of conformance, percentage of coverage, etc.), or any other representation of how well the equipment is placed.

In some embodiments, generating the outputs may include exporting a floor plan. This may include generating a version of the floor plan (for example, in CAD, BIM PDF, or any other suitable electronic or image format) with at least some additional information regarding the placement and description of equipment. The exported floor plan can be represented either in 2D or 3D formats, depending on the export. As described above, the additions to the exported plans may include graphic representations of equipment and/or textual semantic information regarding these objects. In instances where the exported floor plan is a CAD file the equipment placement locations or other information may be represented in separate linear entities, or may be aggregated into drawing blocks. In instances where the exported floor plan is a BIM file, the equipment locations or other information may take the shape of BIM family instances or BIM objects, with 3D models and parametric information associated with them. The export file can merge and/or add the new elements to the new file or can reconstruct a new floor plan based on the original floor plan with additional information. An exported floor plan can be stored in a specified directory, transmitted via an electronic communication (e.g., via an email, over a secure network connection, etc.), electronically transmitted to a third party software application, or any other means for exporting data.

As described above, in some embodiments, the functional requirements may define a coverage requirement for a room or area. In these embodiments, outputting the first technical specification with the first equipment may include displaying a coverage map spatially indicating regions covered by at least one of sensors, wireless emitters, Wi-Fi Access Points, Bluetooth™ beacons or speakers. As used herein, a coverage map may refer to a graphical representation depicting a coverage range of a piece of equipment. For example, a coverage map may include coverage areas for one or more pieces of equipment overlaid on a floor plan. In some embodiments, a coverage map may indicate the field of view of a camera, the detection area of a smoke sensor, the range of a motion sensor, the area of effect of a sounding device (e.g., a speaker, an alarm, or other sound emitting device), the range of a light (e.g., a light source, an indicator light, or any other light-emitting device), the effective range at which a Wi-Fi access point, Bluetooth™ beacon or other device can provide a wireless network, or any other functional area associated with a piece of equipment. In some embodiments, the coverage map may be related to information regarding a functional requirement such as the field of view of a camera that provides a certain pixel resolution or the area in which an alarm sounder is heard at a certain decibel level.

Some embodiments may further include generating a material list of equipment based on the generative analysis of the at least one first room. The material list, sometimes referred to as a "bill of materials" or as a "bill of quantities"

may be a list describing equipment associated with a floor plan or building. The materials list may include a list of the equipment placed in the floor plan as part of the generative analysis. In some embodiments, the materials list may also include secondary and/or auxiliary equipment required to physically construct a building system. For example, the materials list may include additional equipment, sometimes referred to as auxiliary equipment, associated with the equipment specified in the generative analysis, such as control devices, network patch panels, network switches, racks, enclosures, batteries, cables or wiring, conduits, cable trays, bolts, screws, nuts, flanges, spare equipment, or any other items that may be associated with the primary equipment. A material list may include equipment models (e.g., a model number or model name), quantities, pricing information, specific properties (e.g., materials of construction, sizing, equipment types, or other properties), a physical description, and any other information associated with the equipment that may be useful for purchasing, tracking, or installation of the equipment. In some embodiments, the materials list may include in image of the equipment. The materials list may be displayed on the screen or exported as text, a table, an image (e.g., JPG, PDF, etc.), or any other suitable format. In some embodiments, the materials list may be electronically transmitted by email or via the internet, for example, to a third-party or third-party software application, an enterprise resource planning (ERP) system, or any other entity that may use the information.

Figure 3A:
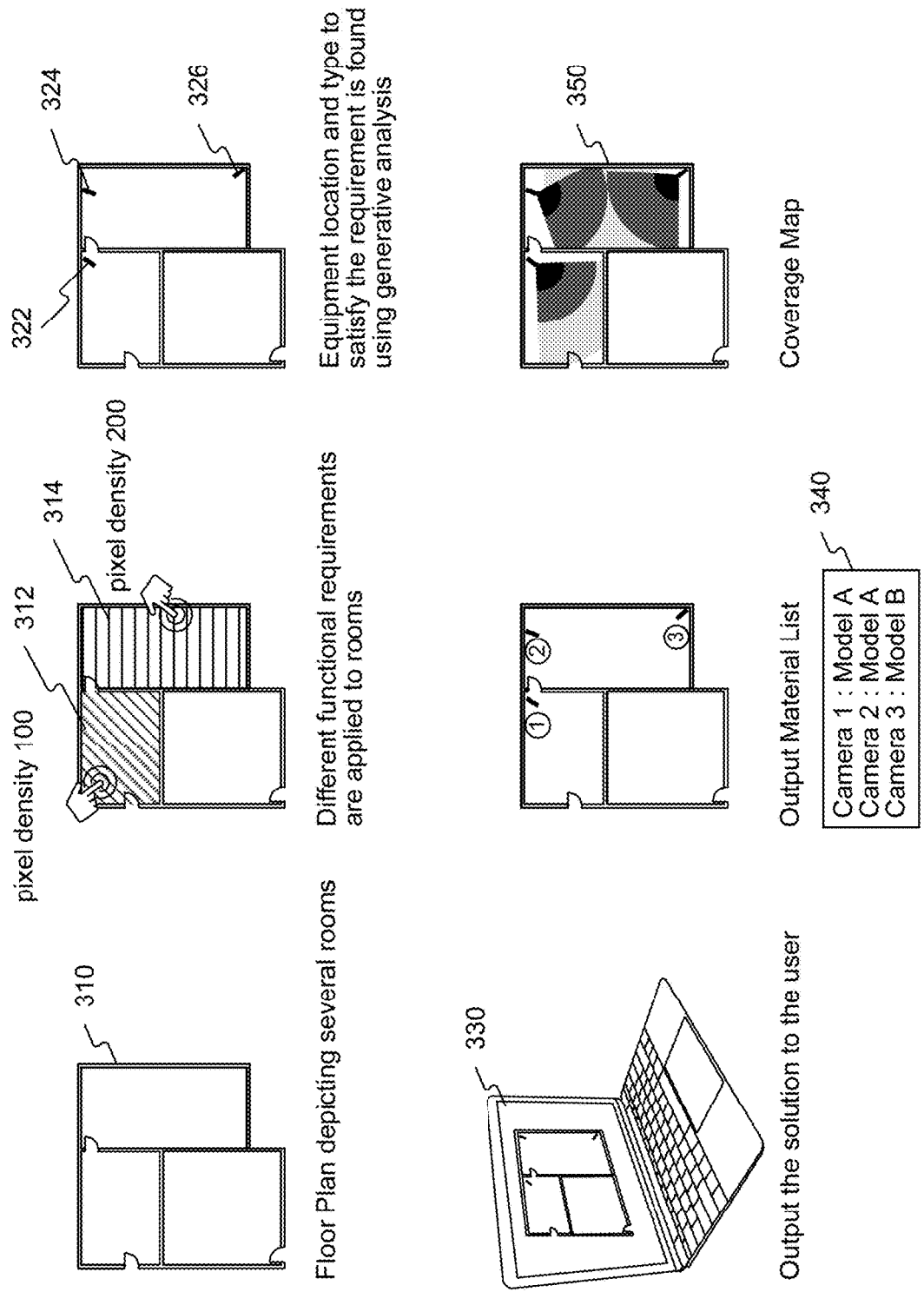
FIG. 3A illustrates an example generative analysis for selecting and placing equipment on a floor plan, outputting the solution to a user by displaying the selected equipment and placement locations on the floor plan, generating a material list indicating the model identifiers of the selected equipment, and generating a coverage map, consistent with the disclosed embodiments.

FIG. 3A illustrates an example generative analysis for generating a coverage map, consistent with the disclosed embodiments. As described above, the disclosed system may include accessing a floor plan 310, which may depict several rooms. The disclosed system may then receive different functional requirements applied to rooms within floor plan 310. For example, the system may identify functional requirements 312 and 314. In this example, functional requirements 312 and 314 may define coverage requirements for cameras, similar to the functional requirement described above with respect to FIG. 1. Functional requirement 312 may require a camera to identify objects with a pixel density of at least 100, where functional requirement 314 may require a camera to identify objects with a pixel density of at least 200. The system may use a generative analysis, as described above, to identify technical specifications and placement locations for cameras within floor plan 310. For example, the generative analysis may result in the placement of cameras 322, 324, and 326, as shown in FIG. 3A. The system may then output the technical specifications for cameras 322, 324, and 326, as well as the equipment placement locations. For example, the output may be displayed via a user interface 330. The output may include a coverage map 350, which may include the equipment placement locations for cameras 322, 324, and 326, as well as the corresponding coverage areas. The output may further include a materials list 340 (which may correspond to the output technical specification, discussed above). Materials list 340 may list the cameras included in the coverage map along with a model number or other technical information associated with cameras 322, 324, and 326.

In some embodiments, the generative analysis may result in multiple options for equipment placement locations and/or technical specifications. Accordingly, generatively analyzing the at least one first room may further include displaying a plurality of technical specifications, a plurality of equipment placement location options, or both. For example, the generative analysis may result in multiple solutions that conform to the received functional requirements, or that have similar degrees of conformation to the received functional requirements. In some embodiments, the disclosed methods may include presenting a predetermined number or percentage of solutions that best conform to the functional requirement (e.g., the top 5 results, the top 10% of results, or various other thresholds). In some embodiments, the output may allow a user to select one or more of the options. For example, multiple options may be displayed on a user interface including control elements allowing the user to select a preferred option.

Similarly, the disclosed embodiments may also allow a user to modify the technical specifications and/or the equipment placement locations. For example, the output may include equipment placement locations and a user may manually modify the equipment placement location. In some embodiments, this may include displaying the equipment placement locations through a user interface that allows the user to move the equipment placement locations, for example, by clicking on a desired location within the floor plan, dragging the equipment to a desired location. The user interface may also allow the user to rotate the equipment, change an equipment placement height, modify a coverage area of the equipment, modify a size or shape of the equipment, or any other modifications that may be made to the placement locations. Similarly, the user may modify one or more technical specifications identified during the generative analysis. For example, the user may select a different model of equipment, a different equipment size, a different equipment rating or capacity, or various other parameters. Once such changes are made, the system might run a simulation, compare the simulation result with one or more functional requirements, and provide an output as to the extent of conformance of the changes with the functional requirement(s).

In some embodiments, the system may constrain the modifications by the user such that they still conform to the functional requirement. For example, the system may allow the user to move a piece of equipment only within a specified region that conforms to the functional requirement. In some embodiments, the system may reanalyze the equipment placement location and specification to determine whether it still conforms to the functional requirement (or a degree of conformance to the functional requirement). The system may generate an alert to the user or otherwise display the updated conformance information based on the modifications.

According to various exemplary embodiments of the present disclosure, the disclosed methods may include modifying one or more functional requirements before performing the generative analysis. For example, this may include modifying the first functional requirement and generatively analyzing the at least one first room in conjunction with the modified first functional requirement. The modification may include altering (e.g., increasing or decreasing) one or more parameters specified by the functional requirement, such as a flow rate, a network speed, a coverage percentage, or any of the functional requirement parameters described above. In some embodiments, the modification may be based on a user input, which may override the functional requirements that are received by the system. In some embodiments, the modification may be automatic, for example, to adjust the functional requirement according to an applicable code or standard, a preferred value (e.g., a minimum value set by a user or organization), a value determined by a calculation (e.g., to adjust the functional requirement for a different application), or any other predefined value. This modified functional requirement may result in a different technical specification or placement location than with the unmodified functional requirement. For example, the disclosed methods may include identifying a third equipment placement location in order to at least partially conform to the modified first functional requirement. Further in some embodiments, one or more functional requirements may be modified through a representation on the floor plan itself. For example, a floor plan may be associated with a first functional requirement and a second functional requirement, which may be modified. Accordingly, the disclosed methods may include exporting a floor plan with the first and second functional requirement in a format enabling modification of at least one of the first or second functional requirements to implement the generative analysis of the at least one first room and the at least one second room.

As described above, the functional requirements may apply to a zone within a floor plan, rather than a particular room. For example, the disclosed embodiments may include accessing a floor plan demarcating a plurality of zones. As described in greater detail herein, a zone may be an aggregation of a plurality of architectural features, rooms and/or spaces sharing a common characteristic or point of interest. The at least one first room may include a first zone of the plurality of zones and the at least one second room may include a second zone of the plurality of zones. In other words, the first functional requirement may apply to at least one first zone of the plurality of zones and the second functional requirement may apply to at least one second zone of the plurality of zones.

Embodiments of the present disclosure may further include outputting additional information with the equipment placement locations and technical specifications. In some embodiments, the disclosed embodiments may include displaying power consumption data for the technical specification. For example, the power consumption data may represent an amount of electrical energy required to operate the specified equipment over a specified time (e.g., expressed in watts or kilowatts, etc.). This may include an average power consumption, a peak power consumption, or various other forms of power consumption that may be relevant. The power consumption may be associated with a single piece of equipment, or may represent the power consumption for multiple pieces of equipment (e.g., all equipment on the floor, all equipment in a room, all equipment of a particular type, etc.). In some embodiments, the power consumption may be defined by the equipment itself. In other words, the power consumption may be a property of the equipment and may be specified by the manufacturer. In other embodiments, the power consumption may depend on other factors, such as the size of the room its being placed in, how many pieces of equipment are used for a task, or other variables. Accordingly, the generative analysis may include calculating the power consumption based on these factors and the context of the equipment. The power consumption may be included in the technical specification, or may be output separately (e.g., on the floor plan, on a display device, through an email or text-based communication, or any other suitable forms for conveying the information).

As another example, the disclosed embodiments may include displaying connectivity data for the first equipment technical specification. The connectivity data may describe any forms of connections associated with the specified equipment. For example, the connectivity data may describe power connections required for one or more pieces of equipment, which may include a required voltage, a required current, wire sizing requirements, a number of connections, or any other parameters associated with supplying power to the equipment. As another example, connectivity data may describe network connections required for the equipment, which may include Wi-Fi access requirements, Ethernet or other hardwired connections, Bluetooth™ connectivity requirements, encryption requirements, data speed requirements, other equipment that must be connected to the specified equipment, or any other data associated with network connections for the equipment. As another example, connectivity data may describe a cable, wire and/or connector type that may be connected to a specific port on the piece of equipment.

In some embodiments, the disclosed embodiments may further include outputting a customized setting associated with a piece of equipment associated with the first technical specification and the first equipment placement location. A customized setting may be any property of a piece of equipment that may be varied in some way. For example, a manufacturer of a piece of equipment may offer multiple options for a piece of equipment and the customized setting may be a selection of one of the options. The customized setting may be a customized physical property of one or pieces of equipment such as a customized color, dimension, construction, door swing, or other physical property. In some embodiments, the customized setting may include whether an optional or separately-ordered accessory, which may include, but is not limited to a peripheral lens, masking lens, breaker, cover plate, fuse, cable, mount or module with a piece of equipment, or any other form of accessory.

In other embodiments, the customized setting may be a variable or user input for the equipment that may affect the operation of the equipment, such as a speed setting, an operating temperature, an operating time, a volume setpoint, or any other setpoint that may be varied for a given piece of equipment. In some embodiments, the customized setting may include setting or altering a physical component of a piece of equipment (e.g., setting an orientation, rotation, and/or tilt of a lens in a CCTV camera in a manner that differs from its default factory setting, setting of a voltage setting, setting of a fuse and/or power supply and/or switch, etc.). Further, the customized setting may include combining one or more pieces of equipment, each with their own separate order codes. The combined equipment may be configured to be fabricated or delivered inside a common chassis, housing, rack, or enclosure (e.g. an electrical panel consisting of an enclosure and one or more circuit breakers, fuses, terminal locks, contactors and protection devices delivered as a single panel to a project, a lighting switch delivered with a backbox and cover plate, etc.).

The customized setting may be selected during the generative analysis for identifying the equipment placement location and technical specification. Accordingly, the conformance to the functional requirement that the generative analysis is based on may depend on the customize setting. In some embodiments, the customized setting may be a customized setting range, which may define a range of setpoints for a particular piece of equipment.

Similarly, disclosed embodiments may include generating a programming parameter based on the first technical specification. A programming parameter may include any form of variable or input to for the firmware, operating software, programming software, or communication protocol for a piece of equipment that influences its operations. In some embodiments, the programming parameter may be related to a communication network of a device such as setting of IP address, KNX address, addressable fire alarm address, BacNet/IP address, or various other forms of communication addresses or values. In some embodiments, the equipment addresses may be generated randomly, in a sequence, or according to a range. In some embodiments, the equipment address may be generated in conjunction with other equipment addresses, or with other equipment addresses as an input to the generative analyzing process, to prevent conflicting addresses. In some embodiments the programming parameter may be related to the selection of firmware and/or operating software of a piece of equipment. For example, the programming parameter may define which operating system or operating system version a piece of equipment may run. Further, the programming parameter may be the programming of a single operation (e.g. turn AC off at 6:00 pm) or a series of operations (e.g. turn AC off at 6:00 pm and lights off at 6:30 pm). In some embodiments the programming parameter may include conditional events or logic, such as a rule to turn off the AC at 6:00 pm only if no people are present inside the room. The programming parameter may be a parameter that allows the equipment specified by the equipment specification to meet the functional requirement.

As another example, the disclosed embodiments may include outputting an accessory associated with a piece of equipment associated with the first technical specification and the first equipment placement location. An accessory may include any piece of electronic, mechanical or any other type of hardware that supports a primary piece of equipment. For example, accessories for a video camera may include cables, screws, a patch panel, a video recorder, a network switch, a rack, a UPS, or any other materials to support installation or use of the camera. The accessory may be output any suitable way to convey the information to a user. In some embodiments, the accessory may be identified on the floor plan along with the equipment placement locations. In some embodiments the accessory may be listed on a materials list, as described above.

In some embodiments, the disclosed methods may include generating a classification tag based on the first technical specification and the first equipment placement location. The classification tag may include any form of label, placard, or sign to be placed on the equipment to identify the equipment and/or its properties. For example, the classification tag may include a unique identifier for the equipment, an equipment location (e.g., plant number, laboratory number, a room name, a building number, etc.), a make and model of the equipment, a standard or code applicable to the equipment, a size of the equipment, a rating or capacity of the equipment, or any other information that may be displayed on the equipment. Generating the classification tag may include generating a text file containing the information, generating an image file (e.g., a vector image, a PDF, a JPG, etc.), printing a tag or label, transmitting information to a machine or third party for producing the tag, or any other means of presenting the information.

As another example, the disclosed embodiments may include generating installation tasks based on the first technical specification and the first equipment placement. An installation task may include any step or procedure that may be required when installing a piece of equipment. The installation tasks may define some or all of a procedure that must be followed to install the piece of equipment. For example, if the equipment is a camera, the installation tasks may include, disconnecting a power supply, mounting the camera, connecting the camera to a power source, reengaging the power supply, connecting a communications cable, configuring or tuning the camera, and/or any other steps that may be necessary. The installation tasks may be generated as a list in a text-based format (e.g., a Word® document, etc.), in a table, in a Gantt chart or other scheduling tool, etc. In some embodiments, the installation tasks may be stored in a data structure in association with various pieces of equipment. The installation tasks may also be provided by a manufacturer or other third party.

Figure 3B:
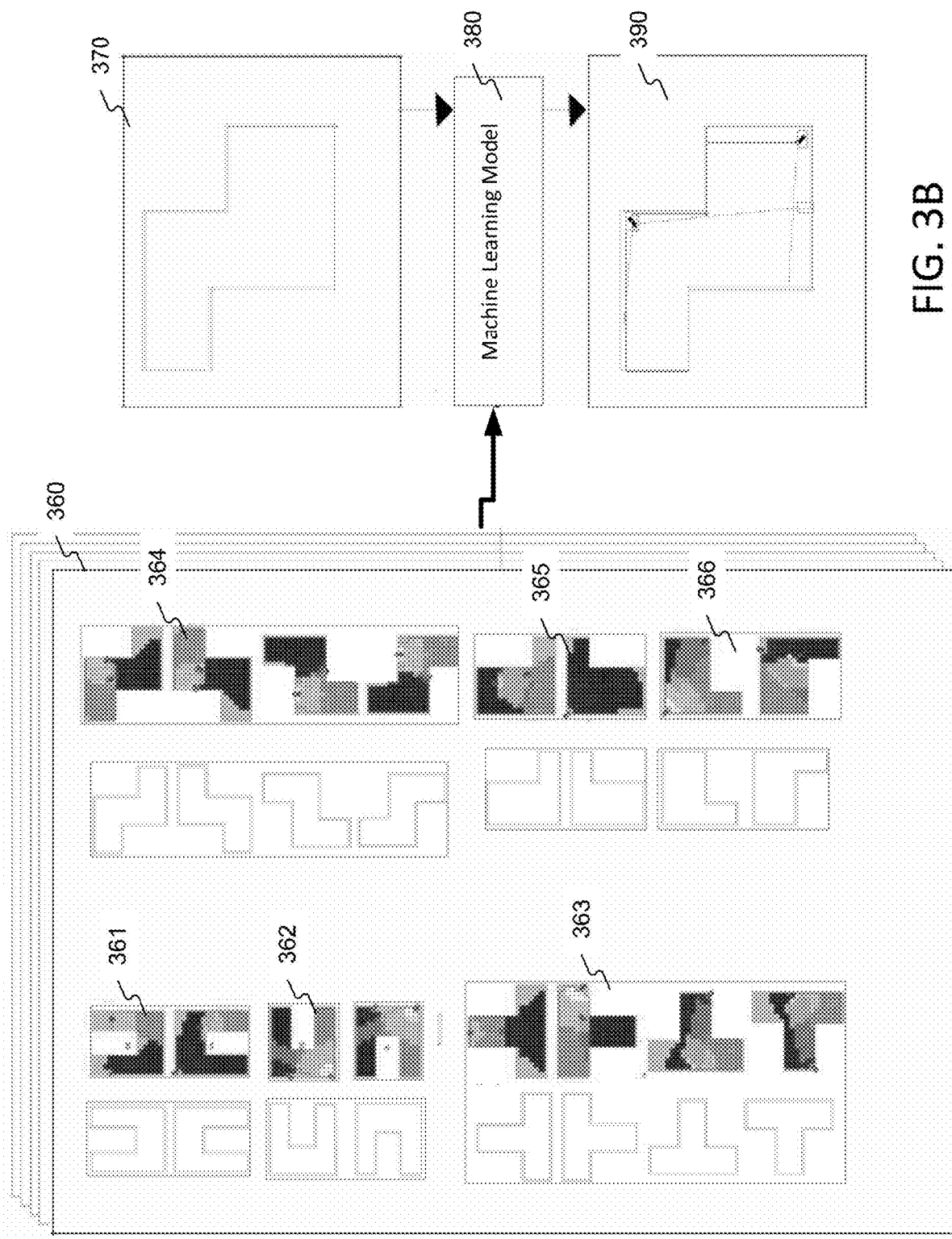
FIG. 3B illustrates an exemplary machine learning based generative analysis process, consistent with the disclosed embodiments.

By way of example, FIG. 3B illustrates an exemplary machine-learning-based generative analysis process, consistent with disclosed embodiments. The process may include training process 360 to train a machine learning model to identify solutions that at least partially conform to a functional requirement. As shown, training may include using training data that includes various room types, floor plans, and optimization results indicating conformance with the functional requirement. For example, using training data that includes sensor coverage maps 361, 362, 363, 364, 365, and 366, a machine learning model may be trained to maximize sensor coverage. The training process may include any method of training a machine learning model such as a CNN, including, for example, hyperparameter tuning. Training data may include technical specifications of equipment, floor plan architectural data (e.g., wall boundaries or geometric data such as area, boundary segment points, etc.), and by considering a variety of these inputs, the model may learn to locate sensors to maximize sensor coverage.

Generative analysis may include implementing a trained model to provide a solution. As an example, machine learning model 380 may accept floor plan 370 as input and provide solution 390 identifying sensor placement location to maximize sensor coverage. Machine learning model 380 may have been previously trained according to training process 360. As depicted in solution 390, a solution may include placement of two sensors to maximize sensor coverage. More generally, the generative analysis process illustrated in FIG. 3B may be applied to train models to provide solutions that at least partly conform to any functional requirement for any floor plan, and the solutions may include one or more equipment placement locations.

Figure 4:
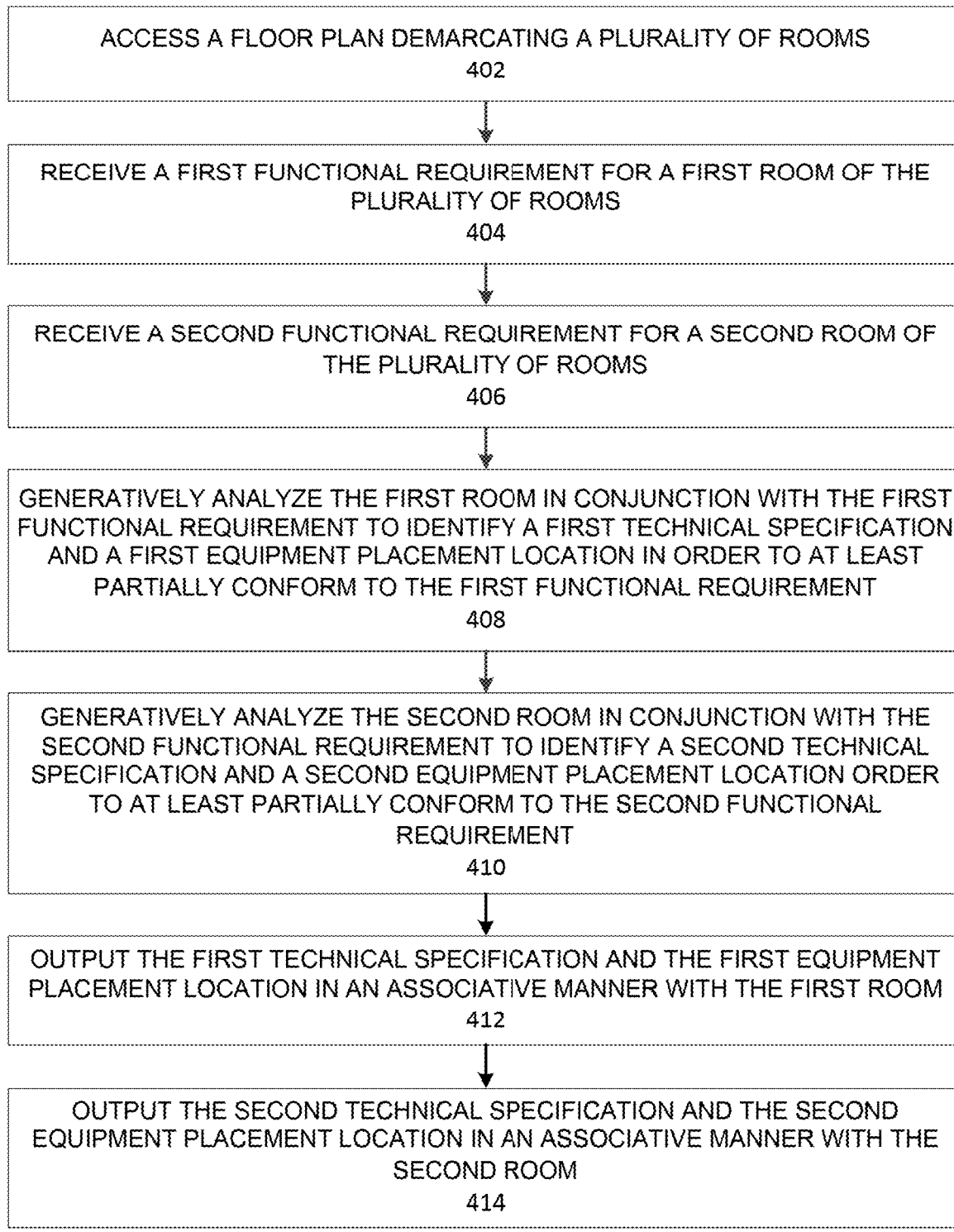
FIG. 4 is a flowchart illustrating an example process for selecting equipment technical specifications and placement locations for use in buildings, consistent with the disclosed embodiments.

FIG. 4 is a flowchart illustrating an example process 400 for selecting equipment for use in buildings, consistent with the disclosed embodiments. Process 400 may be performed by a processing device, such as any of the processors described throughout the present disclosure. It is to be understood that throughout the present disclosure, the term "processor" is used as a shorthand for "at least one processor." Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact. In other words, a processor may include one or more structures that perform logic operations whether such structures are collocated, connected, or disbursed.

In some embodiments, a non-transitory computer readable medium may contain instructions that when executed by a processor cause the processor to perform process 400, as illustrated in FIG. 4. Process 400 is not necessarily limited to the steps shown in FIG. 4 and any steps or processes of the various embodiments described throughout the present disclosure may also be included in process 400.

At step 402, process 400 may include accessing a floor plan demarcating a plurality of rooms. As described above, the floor plan may include any graphic representation of a horizontal section of a building, which may include an interior of the building, an exterior of the building, or both. In some embodiments, the floor plan may demarcate a plurality of zones in addition to or instead of the demarcations for the plurality of rooms. In some embodiments, the demarcations may not be included in the floor plan and step 402 may further include determining the demarcations through an image processing technique or geometric analysis, as described above.

At step 404, process 400 may include receiving a first functional requirement for at least one first room of the plurality of rooms. The first functional requirement may be applied by a user. In cases where the demarcations of rooms have been identified, the functional requirement may be applied to the entire contours of a room without input by the user being required to define the contours of the room. The first functional requirement may define expected or required performance parameters associated with the first room, as described above. Similarly, at step 406, process 400 may include receiving a second functional requirement for at least one second room of the plurality of rooms. In some embodiments, the first functional requirement and the second functional requirement may be the different, however, this is not necessarily so.

At step 408, process 400 may include generatively analyzing the at least one first room in conjunction with the first functional requirement to identify a first technical specification and a first equipment placement location in order to at least partially conform to the first functional requirement. In some embodiments, the generative analysis may be an iterative process. For example, the generative analysis may include a series of simulations including one or more analyses of differing equipment placement locations, as described above with respect to FIG. 1. At step 410, process 400 may include generatively analyzing the at least one second in conjunction with the second functional requirement to identify a second technical specification and a second equipment placement location order to at least partially conform to the second functional requirement. Additional details regarding the generative analysis that may be applied to the first and second rooms are provided above.

At step 412, process 400 may include outputting the first technical specification and the first equipment placement location in an associative manner with the at least one first room. Similarly, at step 414, process 400 may include outputting the second technical specification and the second equipment placement location in an associative manner with the at least one second room. The output may be provided in a variety of formats, as described above. In some embodiments the output may include a CAD file with blocks or other representations of the selected equipment technical specifications and locations, a BIM file containing BIM objects associated with the equipment technical specification and placement locations, an image file with the equipment placement locations overlaid on the image. In some embodiments, the output may further include other information, including, but not limited to, a materials list, a customized setting, a programming parameter, a score evaluating the placement locations, a coverage map, a classification tag, or any other information that may be pertinent to the technical specifications or equipment placement locations.

Embodiments of this disclosure may involve the use of artificial intelligence or machine learning. In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by an process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some embodiments, trained machine learning algorithms (also referred to as trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, analyzing image data (for example by the methods, steps and modules described herein) may comprise analyzing the image data to obtain a preprocessed image data, and subsequently analyzing the image data and/or the preprocessed image data to obtain the desired outcome. Some non-limiting examples of such image data may include one or more images, videos, frames, footages, 2D image data, 3D image data, and so forth. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to edges; corners; blobs; ridges; Scale Invariant Feature Transform (SIFT) features; temporal features; and so forth.

In some embodiments, analyzing image data (for example, by the methods, steps and modules described herein) may include analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, analyzing image data (for example, by the methods, steps and modules described herein) may include analyzing pixels, voxels, point cloud, range data, etc. included in the image data.

In accordance with the present disclosure, systems, methods, and computer readable media may be provided for selective simulation of equipment coverage in a floor plan. Selective simulation of equipment coverage may refer to a process of selecting and locating equipment to identify whether a coverage area of the equipment at least partly meets a functional requirement. Equipment coverage may include an area that equipment can illuminate (e.g., an area in which a light can provide a specific lighting condition), can provide output to (e.g., an area in which a speaker can provide sound at a level audible to persons within the area), can sense (e.g., an area viewable by a camera, or an area in which movement triggers a motion detector), can broadcast to or from (e.g., a Wi-Fi access area), or can provide any other service or condition.

The disclosed embodiments may include simulating equipment coverage. For example, equipment coverage may be simulated based on a floor plan, desired equipment coverage, desired use of an area within a floor plan, functional requirements, technical characteristics, architectural features, user input, or any other variable. One or more simulations may be run to produce a solution as described herein in order to aid the user in the selection of equipment within a floor plan. Selecting equipment may include selecting an equipment model or an equipment placement location.

Disclosed embodiments may include accessing a floor plan demarcating at least one room, as described herein. For example, a floor plan may be accessed by receiving a digital, textual, hand draw, hard copy, photographic, or any other representation of a floor plan as stored in a data structure. The floor plan may include a room demarcation indicating the location of a room in a plan in relation to the rest of the plan. More generally, a room demarcation may include information relating to a floor plan that may indicate the location of a room in a plan in relation to the rest of the plan. It may also include the boundaries (i.e., contours) of the room. Boundaries may include the objects, real or imaginary, that provide borders of the room, including walls or windows that surround a room. Openings associated with the room's borders may be included in room contours (e.g., doors or window leading in and out of the room). Demarcating a room may include contours defining equipment locations or the locations of architectural features, including columns, beams, furniture, or other objects contained in the room. As a non-limiting example, FIG. 5 depicts schematic illustrations 500, 502, and 504 of an exemplary floor plans, with room demarcations 501 indicating the location of room 503 and doors leading into that room. In some embodiments accessing the floor plan demarcating at least one room may include performing at least one of machine learning methods, geometric analysis, or semantic analysis on the floor plan to demarcate contours of the at least one room, as described in greater detail herein.

As previously discussed, accessing may occur when, for example, a floor plan is uploaded, linked, retrieved, recovered, extracted, or otherwise provided to or obtained for analysis by at least one processor. For example, a floor plan may be accessed as an image, CAD, or PDF file. The system may use machine learning methods, geometric analysis, semantic analysis, or a combination thereof in order to demarcate the contours of one or more rooms. In this way, a floor plan may be imported in a format that lacks semantic designations or other indicators of room contours, and the disclosed embodiments may include processes to automatically add such contours.

In some embodiments, floor plan analysis may be performed on an accessed floor plan to identify the room contours of at least one demarcated room. For example, floor plan analysis may be used on a floor plan to identify the room contours of one or more previously demarcated rooms. Room contours may include boundaries of a room that constitute the boarders of the room, as disclosed herein. Floorplan analysis may include image analysis, machine learning methods, semantic analysis, or geometric metric analysis, alone or in combination. It may include but is not limited to extracting information about the floor plan from a BIM, CAD, PDF, image or skeletal model. The floorplan analysis may be used to locate rooms, room borders, doors, windows, stairs, furniture and any other architectural feature. A floorplan analysis may indicate the type of feature detected. floor plan analysis may include using geometric analysis, semantic analysis, image analysis and machine learning methods as descried herein.

Disclosed embodiments may include receiving, via a graphical user interface, information marking an area within the at least one room. For example, a user may be presented with a graphical user interface on a physical or virtual display that enables the user to select either the full area or a sub-area of a room or to otherwise provide some other designation for some or all of the area of the room (any or all of which may be considered "marking"). In such situations, the interface may permit the user to touch, click on, or otherwise define a region or boundary, and/or to associate a designation with some or all of the defined area of the room. The user may provide, via such a graphical user interface, information marking the defined area. Marking may include notating boundaries of a space or sub-space. The marking may also include or alternatively include generating or displaying visual representations of an area (e.g., lines, highlighting letters, symbols, or other types of marks). Marking may also include storing a designation in a data structure, index, or database, for example.

A marked area may define an area of interest or disinterest within at least one room. An area of interest (AOI) or area of disinterest (AOD) may be an area upon which functional requirements or technical characteristics are applied and may differ from the functional requirement applied to another area of the room. For example, in a lighting simulation an AOI may include a work region or plane which needs to be lighted at a higher lux level than the rest of the room. In a CCTV simulation an AOI may include an entrance to a room in which facial identification is required, and an AOD may include the door to a restroom or stall which the camera is not allowed to observe. In a kitchen cabinetry layout simulation, an AOI may be an area where a certain appliance needs to be placed. An AOI may be defined by a rectangle, a polyline, a circle, a point, a box, or any regular or irregular geometry. An AOI may be defined by the user or automatically derived by an algorithm. In some instances an AOI may or may not include additional information related to directionality (for example, in a CCTV simulation an AOI may indicate that a cash machine needs to be scrutinized from a specific direction. More then one AOI can be defined in a single space and they may or may not overlap each other. The area of interest or disinterest may be an area equal to or less than the area of the room. In some embodiment, the area of interest or disinterest may be an area greater than an area of a single room. In some embodiments the area of interest may correspond to a piece of equipment. For example, the area of interest or disinterest may include a door. Additionally or alternatively, the area of interest or disinterest may include furniture such as a desk. In further embodiments, the area of interest or disinterest may include any equipment.

In example 502 in FIG. 5, an exemplary area of interest or disinterest 505 is designated by a user to correspond to a functional requirement, such as an area of desired coverage by a security camera. Consistent with disclosed embodiments, the user may associated a functional requirement with AOI/AOD 505 or the functional requirement may be identified based on a semantic designation of a room, a technical specification of equipment, or information retrieved from a data structure (e.g., an index), or otherwise obtained by the system.

In some embodiments the at least one processor may be configured to receive, via a graphical user interface, information marking a plurality of areas of interest or disinterest in at least one room. In further embodiments the plurality of respective areas of interest or disinterest may have respective different functional requirements or different functional requirement types. For example, a first functional requirement may involve a lighting condition and a second functional requirement may involve sensor coverage. Or, two different functional requirements may be of the same type (e.g., lighting condition) but the requirements may vary (e.g., different lux levels.) These differing variables may be entered, for example, via a graphical user interface, via a rule, or via index.

In some examples, different areas of interest or disinterest may not overlap. Alternatively or additionally, the at least one processor may be configured to receive, via the graphical user interface, information marking overlapping respective areas of interest within the at least one room. For example, a functional requirement of a lux level for an area of interest encompassing a work space may overlap with a functional requirement of motion sensing which includes the work space and another portion of the room. The graphical user interface may therefore assign a first visual representation (e.g., color, cross-hatching) to an area of interest associated with the lux level requirement and a second visual representation to an area of interest associated with the motion sensing requirement. The two visual representations may be displayed together in overlapping fashion, or may be displayed separately, upon a user's designation of a functional requirement for viewing.

By way of example, FIG. 6A depicts an example of multiple areas of interest or disinteret within a common area 603 of room 601. In example 600, area of interest or disinterest 605 and area of interest or disinterest 607 are separate and do not overlap. In the example, different areas of interest or disinterest 605 and 607 may have the same functional requirements as each other or different functional requirements. Alternatively, as depicted in example 602, areas of interest or disinterest 609 and 611 share overlapping area 613. Area of interest or disinterest 609 may have the same functional requirement as area of interest or disinterest 611. Alternatively, area of interest or disinterest 609 may have a different functional requirement from area of interest or disinterest 611.

In one example, area of interest or disinterest 605 and area of interest or disinterest 607 may both have a functional requirement for Wi-Fi coverage. In another example, area of interest or disinterest 605 may have a functional requirement for an HVAC system to provide air flow and ventilation suitable according to applicable national, state or municipal codes for a specific room occupancy while area of interest or disinterest 605 may have a functional requirement for at least 500 lux.

In some embodiments the at least one processor may be further configured to receive information defining an area of interest with a plurality of functional requirements. For example, a single area within a room may have both a smoke detection and motion sensing requirement. In this example, the area of interest may be defined in terms of both functional requirements.

In some embodiments, marking the area of interest or disinterest may include selecting an area automatically identified using machine learning methods, image analysis, geometric analysis, and/or semantic analysis. For example, the system may use image analysis in combination with machine learning models to mark or determine an area of interest within a floor plan based on an accessed floor plan automatically, without requiring a user to manually mark an area of interest or disinterest. This may occur through the application of rules. For example, one rule might be that every external door and window is required to be covered by a motion sensor. Another rule might be achieving a certain air flow level, lighting illumination level and/or sensor coverage level for desks or work planes. Another rule might be to avoid sensors or detectors covering an area within a certain range or distance of another piece of equipment such as an air vent. The system may then employ a machine learning algorithm to identify external doors and windows, and mark those regions as areas of interest. Another rule might be that bathroom doors should not be covered by a camera. An image recognition algorithm might identify a toilet in a floor plan, use the toilet to identify a bathroom, identify the door to the bathroom, and then designate an area surrounding the bathroom door as an area of disinterest for a CCTV camera. The system may mark an area on the floor plan with a visual indication or representation, including lines, dots, shading, color, highlighting, text, symbols, or other means of identifying an area. Additionally, or alternatively, the system may mark an area for validation by a user via a graphical user interface Thus, a floor plan analysis (e.g., at least one of a machine learning method or an image, semantic, or geometric analysis) may indicate that coverage is needed in area of interest or coverage should be avoided in areas of disinterest and mark the areas according. Based on predefined specifications, the system may determine areas where coverage is needed and areas where coverage is not permitted. Such a rule may define that an electrical outlet may not be located within a specified distance from a sink and that an electrical outlet needs to be located with a specified distance from a desk, or that a fire detection and/or suppression system must be located within a specified distance from a furnace. Using image recognition or semantic analysis, the system my scour floor plans to identify sinks, desks and furnaces, and automatically define the areas of interest and disinterest, without user intervention. By automating the process of identifying areas of interest or disinterest, disclosed embodiments improve on the speed and accuracy of conventional approaches. For example, in commercial projects with dozens of floors and hundreds if not thousands of rooms, there could be many thousand functional requirements. 100% compliance in such situations might be impossible, even when thousands of hours of are invested in the project. Advantageously, the disclosed embodiments may ensure a level of compliance unattainable without this inventive approach. Moreover, the inventive approach may reduce to minutes or a few hours projects that might take many weeks or months. In some embodiments, the results of a process of automatically identifying and prompting users to select areas of interest or disinterest may be used to train machine learning models.

Disclosed embodiments may include accessing a functional requirement associated with an area of interest or disinterest. This may occur when a functional requirement is stored in memory, such as a data structure, and the system accesses the functional requirement for application to a floor plan. In some embodiments a set of functional requirements may be defined and stored for a project, and the system might simultaneously run the functional requirements against a floor plan, defining all AOIs/AODs in a common process.

In some embodiments the at least on processor may be further configured to apply a functional requirement to an entire area of the at least one room without user definition of room contours in addition to the graphically marked areas of interest. For example, some areas of interest may be graphically marked in the floor plan and others may not. Regardless, the system might recognize and apply functional requirements to those areas that are already marked, while automatically identifying AOIs/AODs not predesignated and applying associated functional requirements. In such instances, room contours or boundaries may be determined through machine learning or computer image recognition without user input.

In some embodiments the area of disinterest may define an area outside a desired sensor coverage area For example, as described earlier, rather than positively defining a space or area where equipment may be located or sensor coverage may be desired, an area of disinterest may define a negative limitation where equipment placement is not desired or where sensor coverage should be avoided. Sensor coverage may refer to an area where something is able to be detected by a sensor (e.g., a .video surveillance camera, temperature sensor, motion sensor, occupancy sensor, light sensor, water leak sensor, humidity sensors, door contact, glass break sensor, or other detector configured to detect local conditions). For example, an area covered by a sensor maybe least partially within a sphere or cone of coverage originating at a sensor. Sensors may have different levels of quality associated with a coverage area (i.e., an occupancy sensor may detect small motions at four feet but only large movements at 15 feet, a camera might be able to view someone's face clearly in one location but only identify movement from another location). For example, an area with certain space of an air vent and/or obstruction may be defined as an area of where equipment placement should be avoided.

An area of interest or disinterest may define an area of desired sensor coverage, an area for placement of a controller, an area for placement of furniture, an area for placement of electrical equipment, an area for placement of an access control device an area for placement of equipment, an area of functional requirements, or any area associated with satisfaction of any other functional requirement. Areas of interest may include regions in which a level of sensor coverage is defined (e.g., a minimum Wi-Fi signal strength within the region).

Disclosed embodiments may also include assessing technical specifications associated with a functional requirement. Accessing in this context may involve retrieving a technical specification from memory, such as a data structure. A technical specification may include any information that describes a characteristic of a component, piece of equipment, or other requirement. It may include but is not limited to, for example, one or more of a model identifier (specific manufacturer model or series), an operating parameter, an operational outcome, a mechanical or electrical design, a capacity, a coverage area, a range of operation, compatibility, reliability, an equipment class (e.g. Outdoor WI-FI Access Point, Long Range Access Point, Infrared Motion Sensor with 90 Degree Coverage, Modular Kitchen Cabinets), or any other detail that defines a product, operation, or requirement. A technical specification can also include one or more technical characteristics. A technical characteristic may include properties such as mounting device type, resolution, DB rating, luminosity, IR rating, lens type, network speed, wattage requirement, color, dimensions, material, flammability rating, or water-resistance.

A functional requirement may include but is not limited to a description of performance parameters expected from a system. Generally, a functional requirement may be defined for the entire system, for a project, a floor plan, a zone, a room, an area or an architectural feature. A functional requirement may describe, for example, a minimal or maximal performance of the system in a task. A type of a functional requirement may relate to or be derived from equipment or systems (an HVAC functional requirement may describe the performance of an HVAC system).

Consistent with disclosed embodiments, a functional requirement may be used as a target for a generative analysis. For example, a functional requirement from a lighting system may be to provide at least 500 lux to a room. A functional requirement from a CCTV system may be to provide enough pixel density and/or resolution to identify the face of a person. A functional requirement from an HVAC system may be to provide air flow and ventilation suitable according to applicable national, state or municipal codes for a specific room occupancy. A functional requirement for a voice evacuation system may be a level for Speech Intelligibility (STI) and sound pressure in DB (SPL) in an area. A functional requirement from an access control system may be to fit all exit doors with keypads. A functional requirement from a fire safety system may be to protect all doors leading to escape corridors with smoke detectors. Different types of functional requirements (for example noise level and camera coverage) can be applied to the same area. When functional requirements conflict, one may supersede another, or a combination may be invalid and not applied. For example, a portion of a floor plan may have a requirement to maintain camera coverage in all areas to track or identify persons, but this requirement may be superseded by a functional requirement to avoid camera coverage for privacy in a bathroom within that portion of the floor plan. Thus, functional requirements may have associated with them hierarchical rules of application in the event of conflict.

Disclosed embodiments may also include generatively analyzing the technical specifications to define a solution that at least partially conforms to the functional requirement. In some situations it may not be possible to completely conform to a functional requirement. This may occur as the result of realities in of a design or realities of available equipment. For example, in a small bathroom, it may not be possible to locate an electrical outlet at least four feet from a door and at least four feet from a sink. Only one or the other might be achievable. The system might evaluate both options (e.g., a generative analysis where more than one option is considered) and select a solution that gets closest to achieving the conflicting specifications. Or a technical specification for an amount of airflow through a space might not be achievable by the available equipment. Generative analysis might be used to check different vent locations and available equipment to select the combination that gets closest to achieving the functional requirement. In some embodiments generatively analyzing the technical specifications to define the solution may include sequentially running simulations. For example, generatively analyzing technical specifications may include running some combination of a weighted cost function, image analysis, geometric analysis, semantic analysis, floor plan analysis, topology analysis, BIM analysis, rule-based design, statistical analysis, optimization, or any other data analysis as disclosed herein.

A generative analysis may be based on architectural features of the at least one room. For example, the system may analyze data associated with the architectural features of one or more rooms and then automatically select a piece of equipment and its placement that conforms to the functional requirement. Architectural features that might impact such analyses may include room area, ceiling height, lines of sight, window locations, door locations, railing locations, column or furniture locations, locations of other pieces of equipment specified, or any other physical detail. For example, a pitched ceiling or ceiling with dropped beams may necessitate different smoke detector coverage ranges. In some embodiments the generative analysis may be based on an architectural feature outside the at least one room. For example, a room located near a stairwell or to a main water line (examples of features outside the room) might subject the room to additional requirements. Hence, the system may analyze data associated with architectural features outside of a room when generatively analyzing technical specifications to define a solution for an area of interest or disinterest inside of a room. By way of another example, generative analysis may account for walls or other architectural features outside a room that may inhibit Wi-Fi or Bluetooth transmission when defining a solution involving Wi-Fi or Bluetooth coverage in an area of transmission.

In some embodiments, the generative analysis may be based on a furniture and/or equipment placement within the at least one room. For example, the system may access data associated with furniture placement within a room when generatively analyzing technical specifications to define a solution for an area of interest inside of a room. Additionally, or alternatively, the data associated with the furniture placement within a room may include furniture placement within the area of interest or disinterest and/or furniture placement outside the area of interest or disinterest. For example, an electrical power outlet or floorbox may have a preferred location under a desk and a undesirable location under a cabinet, and the generative analyzing process may consider the locations of desks and cabinets in a room and only sample such points located in or adjacent to desks. As another example, there may be a preference to locate some pieces of equipment adjacent to one another (e.g. aggregating light switches in one location). In other cases, for example, there may be a preference to locate some pieces of equipment away from each other (e.g. a minimum distance between a smoke detector and an HVAC air vent). Data regarding the placement of a piece of equipment (e.g., sensor, transmitter, furniture, etc.) within a floor plan may be expressed as (X,Y) coordinates in relation to a room corner or to any other reference point. The coordinates may further include height data (Z) in relation to a reference point. Additionally or alternatively, the placement data may include horizontal and vertical rotation information (i.e., expressed in degrees from a reference point).

In some embodiments, the generative analysis may include a topological analysis to determine a preferred door face for equipment placement. For example, if a functional requirement involves detecting entry to or egress from a room, an analysis of the door face may indicate the direction of door swing and inform sensor placement. More generally, a topological analysis may include but is not limited to an analysis of connectivity of spaces within a floor plan that can reveal information regarding properties of spaces. Topological analysis may include image processing, geometric analysis, and semantic analysis, and machine learning techniques. A topological analysis may define relationships between rooms and their position in the floor plan hierarchy using the doors that connect between them to create spatial maps. A spatial map may be described as weighted graphs and graph properties such as connectivity and shortest paths. The face of the door is one of the two main planes of its geometry. This is important since doors usually swing to one side, so the two door faces behave differently (one face opens inward, the other face outwards). A topological analysis may define the side of a door face located within a corridor and the side of a door located within a room (e.g. office) and determine that an access control device such as a reader should be placed on the side of the door located with a corridor while a push to exit button should be location on the other side of the door face within an office.

In some embodiments, an area of functional requirement may include directionality. For example, directionality may be related to camera coverage, speaker or microphone coverage, lighting coverage, or another type of coverage. That is, the direction a sensor or receiver faces or the angular settings on a sensor or receiver may relate to whether a particular sensor or receiver is able to fulfill a functional requirement. Thus, a solution may not only specify a piece of equipment, but also its directionality and/or its angular settings. To illustrate this example, meeting room may include a meeting room table or display system associated with an area of interest, and for example, a directionality may relate to preferred field of view specifications for video conferencing.

By way of example, FIG. 6A illustrates example floor plan 604 defining area of interest 615 with a directionality indicated by an arrow. Directionality may be related to a type of motion detector, a camera, a speaker, or any other sensor, for example. Floor plan 606 includes a coverage map illustrating angular coverage of sensor 619 conforming with a directionality component of a functional requirement of area of interest 615.

Disclosed embodiments may also include outputting the solution. An output solution may be a graphical depiction of equipment location or types which are the result of the generative analysis process. It may be depicted as a layer on top of the input floor plan. It may contain graphical and/or textual information. Graphically, the solution may include an icon or symbol indicating placement of equipment. Text might identify a model number or other information about the equipment. Textual information might also include installation or settings information. In addition or alternatively, an outputted solution, may include a text document such as in Word form, a chart such as in Excel form, an image file such as a jpg, a vector image file such as a PDF, a vector architectural file such as a DWG, and a BIM model such as a RVT or IFC. The solution may further include an electronic file, database entry, or an index containing information such as placement information and/or technical specifications. It may be electronically transmitted, such as to an ERP or CRM system or to programming software. Additionally or alternatively, an output may be displayed via a graphical user interface on a display or virtually. A solution may include a floor plan containing one or more areas of interest or disinterest.

By way of example, FIG. 5 depicts an exemplary solution. In example 504, the solution includes the placement of a security camera 509 with a coverage area 507. The solution of example 504 may be defined according to the process described in relation to FIG. 6B, for example, as is discussed later.

In some embodiments the solution may include a selection of at least one piece of equipment and/or defining an equipment placement location of a sensor. Sensors are items of equipment whose goal is to detect local conditions. Sensors types may include CCTV cameras, IR sensors, thermostats, motion detectors, occupancy sensors, smoke detectors, heat detectors, thermal detectors, glass break detectors, door contacts, window contacts, or other types of devices configured to detect real world conditions. As part of a solution, the system may identify a particular type or model of sensor and may also specify where in the floor plan the sensor should be placed.

In another embodiment outputting the solution may include displaying a coverage map spatially indicating regions covered by at least one of sensors, wireless emitters, Bluetooth beacons, wireless emitters, light emitters, or sound emitters. A coverage map may be a graphical representation of the area within the range of a sensor or an output device, and may indicate the field of view of a camera, the detection area of a sensor or an area in which an alarm can be heard at a threshold decibel level. In the context of transmitters and receivers, a coverage map may indicate areas of reception, and in the context of cameras, a coverage map may reflect fields of view meeting a threshold pixel resolution. A coverage map may be in any format including a CAD file, a BIM model, a PDF, or other file format suitable for representing spatial data.

Outputting the solution may also include displaying a furniture layout. For example, when functional specifications involve furniture, the solution output may contain a graphical representation of the furniture layout. Textual information may also be provided specifying categories, sizes, or models of furniture.

In another embodiment, outputting the solution may include an equipment placement location of electrical equipment. For example, the solution may include graphical or textual information indicating the selection or location of electrical equipment within a floor plan. The output solution may be graphical in that it uses symbols to indicate electrical equipment locations and text may also be provided to illuminate the details of the electrical equipment and/or its installation. The output may be provided in a BIM model or CAD drawing, and may include semantic data related to electrical, HVAC and other equipment (e.g. block name, family type, label, or tag), In one example, the solution may be based on a weighted cost function. A weight of the weighted cost function may be based on user input, as described herein. A cost function may be any form of equation designed to account for multiple goals in reaching a solution.

In some embodiments, the system may be a cloud-based system. For example, the methods described herein may be executed in a virtual instance by a remote computer, rather than a local processor. Cloud-based computation can provide advantages in scalability, cost, and security over approaches that rely on local computational or conventional servers.

By way of example, FIG. 5 depicts exemplary output 506 of a solution via a graphical user interface 513 of user device 511. In this example, the output includes a coverage map and an area of interest in a floor plan.

Figure 6B:
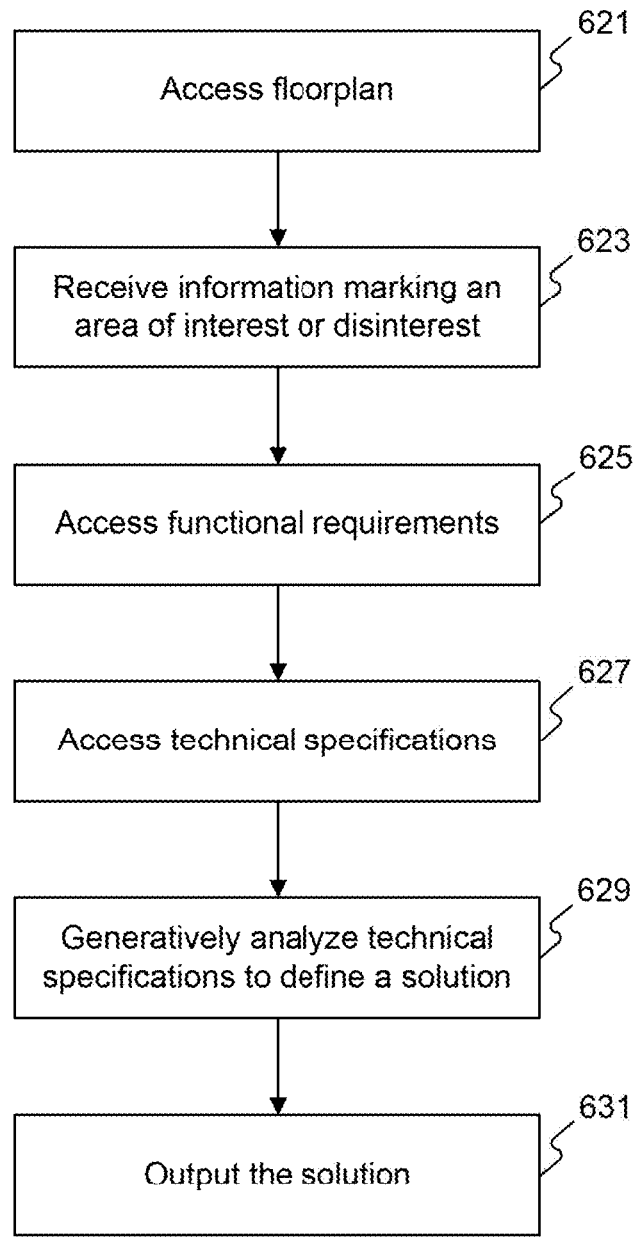
FIG. 6B depicts an exemplary flow chart of a process for selective simulation of equipment coverage in a floor plan, consistent with disclosed embodiments.

FIG. 6B depicts a flowchart of an example process for selective simulation of requirement coverage in a floor plan, consistent with disclosed embodiments. The process may be performed by at least one processor. In some embodiments the process is not necessarily limited to the steps illustrated and any of the various embodiments described herein may be included in or excluded from the process.

At step 621, the process may include accessing a floor plan demarcating at least one room. As discussed herein, for example, a floor plan may be accessed by receiving any medium containing a representation of a floor plan. A floor plan may be accessed by receiving a digital, textual, hand draw, hard copy, photographic, or any other representation of a floor plan as stored in a data structure.

At step 623, the process may include receiving, via a graphical user interface, information marking an area within the at least one room, wherein the marked area may define an area of interest or disinterest within the at least one room, and wherein the area of interest or disinterest may cover an area less than an area of the at least one room. For example, a user may provide, via a graphical user interface, information marking an area with a room. The marked area may define and area of interest or disinterest within the room, as defined herein. The area of interest or disinterest may be an area equal to or less than the area of the room. In some embodiment, the area of interest or disinterest may be an area greater than an area of a single room. In some embodiments the area of interest may correspond to a piece of equipment.

At step 625, the process may include accessing a functional requirement associated with the area of interest or disinterest. For example, the at least one processor may access a function requirement associated with an area of interest or disinterest stored in memory, such as in a data structure as disclosed herein.

At step 627, the process may include assessing technical specifications associated with the functional requirement. For example, the at least one processor may access technical specification associated with a functional requirement that are stored in memory, such as a data structure as disclosed herein. By way of non-limiting example, if the functional requirement is to detect motion in an area of interest, the technical specifications may include details for various motion sensors and their capabilities.

At step 629, the process may include generatively analyzing the technical specifications to define a solution that at least partially conforms to the functional requirement. For example, the at least one processor may generatively analyze technical specifications in order to define a solution that at least partially conforms to the functional requirement associated with an area of interest or disinterest. Continuing with the above motion detection example, the system may generatively analyze technical specifications of various motion detectors to identify a preferred solution. The preferred solution may be a function not only of sensor coverage, but also may be a function of cost and equipment usage consistency across other regions of the floor plan other than the particular room under analysis. In other examples, generative analysis might be run on many portions of the floor plan simultaneously, and the defined solution may be one that takes into account multiple areas of interest.

At step 631, the process may include outputting the solution, as disclosed herein. The at least one processor may display the output via a graphical user interface.

As previously discussed, the present disclosure relates to a method and a system for selective simulation of equipment coverage in a floor plan, as well as a non-transitory computer-readable medium that may include instructions that, when executed by at least one processor, cause the at least one processor to execute operations enabling selective simulation of equipment coverage in a floor plan.

For ease of discussion, a system is described below, with the understanding that aspects of the system apply equally to methods, devices, and computer readable media. For example, some aspects of such a system may occur electronically over a network that is either wired, wireless, or both. Other aspects of such a system may occur using non-electronic means. In a broadest sense, the system is not limited to particular physical and/or electronic instrumentalities, but rather may be accomplished using many differing instrumentalities.

Structural design, as used herein, may refer to a processes for the planning, design, construction, and/or operation of buildings. In this context, embodiments may include analysis related to equipment selection, equipment placement location, wiring diagrams associated with equipment, and other aspects of the design of a building that involves equipment. For example, embodiments may include analysis and integrated design of environmental systems (e.g., energy, HVAC, plumbing, lighting, fire protection, acoustics, vertical and horizontal transportation, or other systems in a building). Selective simulation, also referred to as generative analysis, may include but is not limited to a process in which a solution to a problem, geometric mathematical, physical, or otherwise, is arrived at by a computational device, as discussed in greater detail herein. Technical specification coverage, or technical specification, may include but is not limited to one or more of an equipment specification, a model identifier, and/or any technical characteristic describing one or more properties of a piece of equipment, as discussed in greater detail herein. A floor plan may include but is not limited to a graphic representation of a horizontal section of a building or an exterior or both, as discussed in greater detail herein.

Figure 8:
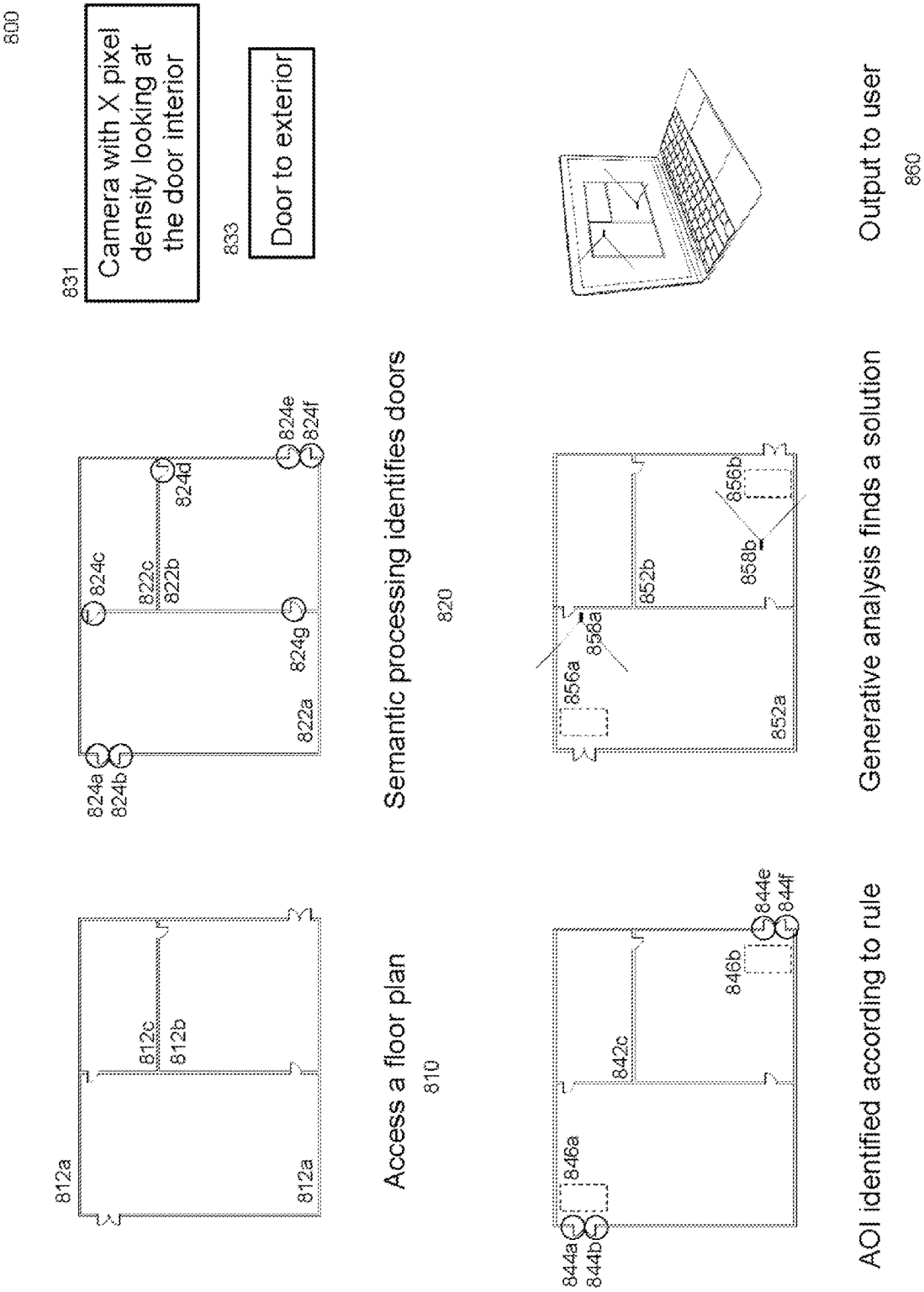
FIG. 8 is a block diagram illustrating aspects of an exemplary method for selective simulation of coverage associated with a camera in a floor plan, consistent with the disclosed embodiments.

By way of example, FIG. 8 illustrates one example of a structural design method 800 for selective simulation of technical specification coverage associated with a camera in a floor plan 810.

Disclosed embodiments may involve at least one processor configured to access a floor plan demarcating a plurality of rooms. A floor plan may include a graphic representation of a horizontal section of a building or an exterior or both, as discussed in greater detail herein. Demarcating may refer to information indicating the location of one or more rooms in a plan in relation to the rest of the plan. In some embodiments, a plurality of rooms may include an enclosed section of a building designed for a specific purpose, the boundaries of the enclosed section (sometimes referred to as contours) of the room, the openings associated with the room's borders, equipment and/or architectural features contained within the enclosed section. An architectural feature may be any part of a building, including a zone, a room, a wall, a half-wall, a door, a window, a column, a stairwell, a beam, and/or any other permanent part of the building, as discussed in greater detail herein. An architectural feature may also be a non-permanent part of the building such as furniture. Identification of architectural features (using vision-based, machine learning, and/or any other type of computational algorithm) may refer to the computational process of finding the meaning intended by a graphic symbol drawn in a floor plan or of the graphical symbol and/or metadata of a BIM object. Since there may be no accepted set of rules for architectural graphic notation, this may be a difficult task. Disclosed embodiments overcome these challenges by providing means to rapidly, automatically, and accurately identify architectural features irrespective of their format in a given floor plan.

As an illustrative example, FIG. 8 depicts a floor plan 810 with a plurality of demarcated rooms 812a, 812b, and 812c.

Consistent with disclosed embodiments, at least one processor may be configured to perform at least one of a machine learning method, semantic analysis or geometric analysis on the floor plan to identify at least one opening associated with at least one room from the plurality of rooms.

Consistent with disclosed embodiments, a machine learning method may include but is not limited to classification models, neural network models, random forest models, Convolutional Neural Network Models, deep learning models, recurrent Neural network models, support vector machine models, a support vector machine model, ensemble prediction models, Adaptive Network Based Inference System, or any other machine learning model. Possible deep neural types of CNN's for Computer Vision and other potential tasks may vary by tasking and may include Resnet 50 for Classification, RetinaNet and Mask RCNN for Detection- and Unet and Mask RCNN for Segmentation. Embodiments consistent with the present disclosure may include structured data models, such as boosting algorithms (e.g XGBoost), standard neural networks, and random forest models. As one of skill in the art will appreciate, machine learning may include training a model to perform a task, the training including providing example training data to the model and iteratively optimizing model parameters until a training criteria is satisfied. For example, a model may be trained to classify data using labelled datasets. In some embodiments, a model may be trained to use training input data to produce an output that closely matches training output data. Model training may include hyperparameter tuning, sizing of mini-batches, regularization, and changes in network architectures. Model training may include augmentations such as rotation of images or addition of noise to an image.

It should be understood that systems and methods contemplated herein may include using available machine learning platforms and/or libraries to train and/or manage models (e.g., TENSORFLOW, PYTHON, MATLAB, KERAS, MICROSOFT COGNITIVE TOOLKIT, and/or any other machine learning platform). Various other details regarding the implementation of machine learning models are described in detail throughout the present disclosure.

Further, embodiments may include identifying an egress point and/or a door (such as an office door) and to include the egress point and/or door within the defined area of interest. An egress point may include a door, ingress, egress, passage, window, and/or other architectural feature which can be used to enter or exit a space, as discussed in greater detail herein. An office door may refer to an opening associated with an office.

At least one opening may include one or more of a door, ingress, egress, passage, window, and/or other architectural features which can be used to enter or exit a space, such as an opening associated with a space. For example, an opening may be associated with a room using graphical or textual descriptions which indicate that the opening leads to or from the space and/or at least one room from the plurality of rooms, respectively. Identifying the at least one opening may include a combination of a machine learning method, semantic analysis, and geometric analysis. Embodiments may include training models to identify using training data sets that include floor plans comprising identified room openings. Such training may be supervised by a human user or unsupervised learning.

By way of example, FIG. 8 depicts the floor plan 820 which has demarcated rooms 822a, 822b, and 822c and identified openings 824a, 824b, 824c, 824d, 824e, and 824f. In this example, openings 824a and 824b are associated only with room 822a, opening 824c is associated with both rooms 822a and 822c, opening 824d is associated with both rooms 822b and 822c, openings 824e and 824f are associated only with room 822b, and opening 824g is associated with both rooms 822a and 822b.

Consistent with disclosed embodiments, the at least one processor may be configured to access a functional requirement associated with the at least one opening. A functional requirement may include but is not limited to a description of performance parameters expected from a system, as discussed in greater detail herein. In some embodiments, the functional requirement may include or be associated with image sensor coverage, door access control, light control, HVAC control, sensor coverage for egress points, sensor coverage for doors, light controllers adjacent to doors, access control devices for doors, or any other system or equipment which may be associated with residential, commercial, or public buildings. Image sensor coverage may refer to covering and/or monitoring an area with a sensor which could be a video surveillance camera, a temperature sensor, a motion sensor, an occupancy sensor, a light sensor, and any other sensor that may detect and convey information used to make an image.

A controller may refer to a type of equipment used to control (e.g., regulate) another piece of equipment. A controller may send and receive signals and other forms of communication to another piece of equipment or over a network. In some embodiments, a controller may directly execute the action using another piece of equipment (e.g., light switch may directly turn power to lights on or off) or send a command for an intermediate piece of equipment to execute the action (e.g., a building management system controller may send a signal to an HVAC actuator which then turns an HVAC unit on or off). As an example, a controller may include a light or dimmer switch which regulates the flow of electricity to a light switch or power socket. Other exemplary controllers may include a Building Management System (BMS), lighting controller for lighting, HVAC, or other building system functions. Controllers which may be programmed to send signals to an actuator to turn off lights, for example, at a certain time of the day. Controllers may include a thermostat or HVAC controller which receives environmental sensory information such as temperature and then directly turns an AC unit on or off. Still other examples include an access control controller which receives and sends signals to door access controls or other inputs or outputs (e.g., as door contact and push to exit buttons). More generally, controllers may include any type of equipment used to regulate another piece of equipment and/or send and receive signals and other forms of communication to another piece of equipment over a network.

Outputs and inputs to a controller vary and may include, for example, voltage at 110 vAC or 220 vAC, digital inputs, or analog input. Further, a controller may communicate over a network through a variety of protocols such as IP, Bacnet/IP, KNX, or ModBUS™, or other communication protocols.

Door access control and access control devices for doors may refer to a door equipped with an access control device, a device which regulates access through an opening by controlling the lock or other closing mechanism on an opening and determining whether it should be in a locked or unlocked state, or in an open or closed state. For example, a piece of equipment configured to control or monitor the door may be physically located at or adjacent to the door. Alternatively, or additionally, physical equipment configured to control or monitor the door may be located remotely from the door. As an example, an access control device may include a reader that requires a code to open a door. The code may be based on biometric data, card data, RFID data, or electronic key data. The code may be transmitted via Bluetooth, RFID, Wi-Fi, or any other electronic signal. In some cases, an access control system may be contactless and may not require a user to perform any action such as swiping a card or entering a code. For example, an access control system may be comprised of a series of beacons placed in a building which receive authentication from transmitters placed on a user card, phone, badge, wallet or other location. When authentication is received, a door or opening may unlock and/or open automatically. In some cases, an access control device may require a physical key to open a door. An access control component such as a reader may be a standalone unit or be integrated into a larger system. An access reader may be associated with a controller which may send and receive signals from the access reader. In some examples an access control device may also include accessories such as push to exit buttons, door contacts, or power supplies. An access control system may be programmed to grant access to specific individuals or groups under specific conditions (e.g., within certain timeframes, or days of the week). For example, all egress points may require an access control reader to allow access inside the building and to have a safety mechanism to allow movement outside the building. An access control system may have applications beyond physical security and movement through doors and openings. For example, an access control system may track the movement of people or other objects throughout a building. An access control system may collect, transmit, and/or analyze data related to building, zone, space and room occupancy, usage and traffic patterns. This data may be useful, for example, for space planning which may involve understanding the optimal size, location and quantity of meeting rooms in an office based on analysis of current usage patterns. As another example, this data may be useful for understanding if there may be occupancy levels beyond a certain threshold in a room (e.g., COVID-19 regulation or advisement for occupancy) and trigger an alert.

Embodiments may include light control controllers to turn on or off a light, dim a light, flash a light, change a light color, or adjust other light conditions. Light controllers may send and receive signals from lights. A light controller adjacent to a door may be in the form of a light switch, a light dimmer, an actuator, and/or any other device that may regulate light in a space. A light controller may be of the conventional variety or a smart switch which may be connected to a Building Management System (e.g., KNX light controller) or network (e.g., IP or Bluetooth® connected light switch). A light controller may also be in the form of a sensor such as an occupancy sensor or motion sensor connected to the lights and which may trigger a certain action to the lights. Connections between controllers and lights may be physical in terms of a direct connection between the controller and the lights. Disclosed embodiments may include virtual connections between controllers and lights, wherein another piece of equipment may mediate signal between the lights and the controller, and may involve programming or sequences of operation. A light controller may be a standalone unit or part of a system. A light controller may directly execute an action to another piece of equipment (e.g., light switch) and/or use an intermediate piece of equipment (e.g., an actuator) to perform the action. For example, a light controller may be placed within 50 cm of all office doors and movement surrounding the office doors may be covered with motion detectors so that lights may be turned on/off based on the movement of individuals coming in and out of offices.

HVAC control may refer to an HVAC controller or, more generally, to equipment used to control HVAC. An HVAC controller may be equipment used to control heating, cooling, ventilation units such as split-units, fan-coil units, air handling units, fans, and/or any other equipment which may provide thermal comfort and/or acceptable air quality. An HVAC controller may send and receive signals and other forms of communication from HVAC equipment and a variety of sensors through a thermostat, an actuator, and/or any other device that may regulate HVAC. An HVAC controller may also be in the form of a sensor such as an occupancy sensor or motion sensor connected to HVAC equipment, and which may trigger a certain action to the equipment. Connections between controllers and HVAC equipment may be physical in terms of a direct connection between the controller and the equipment. In other embodiments, the connections may be virtual connections wherein another piece of equipment may mediate and/or send/receive signals between the HVAC equipment and the controller, and may involve programming and/or sequences of operation. An HVAC controller may be a standalone unit or part of a system. An HVAC controller may directly execute an action to another piece of equipment (e.g., conventional thermostat switch) and/or use an intermediate piece of equipment (e.g. HVAC actuator) to perform the action. For example, an HVAC controller may be placed within 50 cm of all office doors if the office has an independent HVAC system allowing such control to regulate any equipment which may provide thermal comfort and/or acceptable air quality.

Egress points may allow a building occupant to move from inside a building's interior boundary to an exterior point of the building. Egress points may refer to a door, window, and/or any other site which may allow a building occupant to move from inside a building's interior boundary to an exterior point of the building. Egress points may have a sensor covering and/or associated with it. In some cases, egress points equipped with door access control may refer to egress points having an access control reader to allow access inside the building and to have a safety mechanism to allow movement outside the building, as discussed in greater detail herein. Areas adjacent to office doors equipped with light controllers may refer to placing a lighting controller in the area surrounding an office door, as discussed in greater detail herein. Areas adjacent to office doors equipped with HVAC controllers may refer to placing an HVAC controller in the area surrounding an office door. An office door may refer to an opening associated with an office.

Sensor coverage may refer to covering and/or monitoring an area or specific point with a sensor, such as a video surveillance camera, a temperature sensor, a motion sensor, an occupancy sensor, a light sensor, a water leak sensor, a humidity sensor, a door contact sensor, a glass break sensor, and any other device, module, machine, or subsystem whose purpose is to detect events or changes in its environment and send the information to other electronics and/or to process such events. An area covered by a sensor may be at least partially within the sphere and/or cone of coverage of the sensor. There may be different levels of quality for which a sensor can cover an area (i.e., an occupancy sensor may detect small motions at 4 feet away but only large movements at 15 feet away, and a camera may be able to view an individual's face clearly in one location but only identify movement from another location). In some embodiments, sensor coverage for egress points may include a sensor covering or associated with an egress point and/or area located surrounding the egress point. Sensor coverage for doors may include a sensor covering or associated with a door and/or area located surrounding the door. For example, all exterior doors may be equipped with door contact sensors, all guestroom doors may be covered by a respective motion detector, and/or all egress doors may be covered by security cameras at a certain level of pixel density.

Accessing the functional requirement may include accessing at least two functional requirements associated with at least one opening. As an example, an opening may be associated with a requirement to provide lighting at a predetermined level on the opening and a requirement to enable the identification of persons passing through the opening. As another example, an opening may be associated with a requirement to detect the temperature of building occupants as they pass through the opening and to validate their security credentials. Accordingly, the system may perform a generative analysis to satisfy these requirements by selecting and placing appropriate equipment (e.g., a light and a camera). In some cases, two or more functional requirements may conflict, such as a requirement for privacy in a bathroom that conflicts with a requirement to provide camera coverage of all spaces in a floor plan. In such cases, the system may determine which requirement applies based on user input (e.g., by querying a user to resolve a conflict), based on a stored rule indicating an order of precedence, or by applying a model trained to resolve conflicts. In some embodiments, the accessing the functional requirement may include accessing at least two functional requirements of different types associated with the at least one opening. For example, one requirement may relate to climate control (e.g., an acceptable temperature range), and another requirement may relate to Wi-Fi coverage.

As an illustrative example, FIG. 8 depicts a functional requirement 831 which may be accessed by the at least one processor which recites "Camera with X pixel density looking at the door interior." In this example, the functional requirement is describing the performance expected by the system, i.e., that the system must include a camera with a pixel density "X" which looks at the door interior (one of the door faces).

Consistent with disclosed embodiments, the at least one processor may be configured to access at least one rule that associates the functional requirement with the at least one opening. At least one rule may be used to apply functional requirements, identify a space and/or place equipment. A rule, in this context, may be a logical construct of the type "if A then B" used to create a cause and effect relationship in the computational design process. More generally, rules may include any Boolean logical expression. For example, rules may include statements to "place a light switch next to every door," "apply a certain functional requirement to all offices," or "identify a room as a restroom if it contains a urinal." Logical constructs may also be expressed in exclusionary or negative terms. For example, constructs may include a statement such as "do not place a camera with a view of a toilet stall." Further, constructs may include composite rules that combine multiple rules, such as "(i) place a camera on every door that leads to a stairway and (ii) is numbered with a 3." Embodiments may include a rule which specifies that egress points are to be included with image sensor coverage, egress points are to be equipped with door access control, areas adjacent to office doors are to be equipped with light controllers, or areas adjacent to office doors are to be equipped with HVAC controllers.

By way of example, FIG. 8 depicts a rule 833 which may be accessed by the processor which recites "Door to exterior." In this example, the rule may specify that the functional requirement 831 must be applied to doors which lead to the exterior, that is, egress doors. Functional requirement 831 and the rule 833 may be used by the at least one processor to establish that a camera must be placed at each egress door from within the building to cover an area of interest adjacent to the interior side of the door. Therefore, in this example, the rule may specify that openings 844a, 844b, 844e, and 844f may be associated with areas of interest and openings 824c, 824d, and 824f from floor plan 820 may not be associated with areas of interest.

Embodiments may include using at least one rule and a functional requirement to define at least one of an area of interest or disinterest. The area of interest or disinterest may be less than (i.e., smaller than) an area of the at least one room. Alternatively, or additionally, an area of interest or disinterest may be equal to or larger than an area of a room. In some cases, an area of interest may intersect or be placed within the demarcations and contours of a plurality of rooms. For example, a portion of the AOI may be inside an office near the door and another portion may outside the office in a corridor. By way of example, an area of interest may include at least one of a door, corridor, window, egress, work plane, desk, bed, and/or any other space where a functional requirement may be applied. An egress may refer to an opening. A work plane may refer to an abstract plane which may be set at a certain height (e.g., 80-85 cm in offices). The work plane symbolizes the height of tables or any other work surfaces in that space. The work plane is often used for simulations such as lighting as it is the place where light should be measured. As another example, an area of disinterest may include at least one of a surrounding area of a restroom door, fire escape door, egress door, server room door, stairwell door, office door, bedroom door, and/or any other space where a functional requirement may not be applied. A fire escape door may be a door leading from one room in a floor plan to another room which serves as a fire safety zone (i.e., a place fire may take a long time to get into and/or may be separated by physical fire-retardant properties such as fire doors and/or fire walls) and/or a fire escape route (i.e., the route used when escaping a fire).

A room or space may contain more than one area of interest or disinterest. For example, defining at least one of an area of interest or disinterest may include defining an area of interest and an area of disinterest or defining at least two areas of interest associated with the at least one room. To illustrate this principle, embodiments may include defining an area of disinterest to avoid illumination, such as directly over bed, and defining an area of interest to provide lighting at a high intensity within the same room, such as an area in front of a mirror. As another example, two distinct areas of interest within a same room may be associated with desired camera coverage, such as respective areas adjacent to two egresses on opposite sides of a room. More generally, embodiments may include defining any combination of one or more areas of interest or disinterest.

By way of example, FIG. 8 depicts two defined areas of interest (AOI), AOI 846a and AOI 846b, which are adjacent to openings 844a, 844b, 844e, and 844f, respectively.

Consistent with disclosed embodiments, the at least one processor may be configured to access a technical specification associated with the functional requirement. In some embodiments, the technical specification may include but is not limited to one or more of an equipment specification, a model identifier, and/or any technical characteristic describing one or more properties of a piece of equipment, as discussed in greater detail herein. Technical specifications may be associated with functional requirements in data structures including, for example, databases such as relational databases. For example, a functional requirement may involve a level of light intensity and an associated technical specification may include a brightness of a light fixture. As another example, a functional requirement may involve network coverage, and an associated technical specification may specify a signal range, a signal strength, a connection speed, or other network property. More generally, a particular technical specification may be associated with a functional requirement if that technical specification contains information that may indicate a piece of equipment's ability to satisfy the functional requirement. In the embodiments, accessing a technical specification associated with a functional requirement may include identifying an associated technical specification using a rule or a model trained to associate technical specifications and functional requirements. In some embodiments, a user may associate a technical specification with a functional requirement.

By way of example, in FIG. 8, the at least one processor may access a technical specification (not shown) associated with functional requirement 831. The technical specification may include one or more equipment specifications and/or model identifiers related to a camera which may provide "X" pixel density when facing a door interior at a certain distance.

Embodiments may include generatively analyzing at least one room in conjunction with a technical specification and a defined area of interest or disinterest to define a solution that at least partially conforms to a functional requirement. As disclosed, generative analysis may refer to a process in which a solution to a problem, geometric, mathematical, physical, or otherwise, may be arrived at by a computational device. A solution in this context may include locating a type of a piece of equipment in a way that satisfies demands of a problem. Generally, a solution to a generative analysis may include but is not limited to a technical specification, an ID of a piece of equipment, an equipment location, a setting, a technical detail, technical characteristic, customized setting, programming parameter, or any combination of the foregoing. A solution may describe a simulation performed in relation to the functional requirements defined as the target of the simulation. In some embodiments, a solution may include: placement of a controller associated with the technical specification of an outputted equipment; a technical specification of a controller associated with the technical specification of an outputted equipment; or a technical specification of an auxiliary equipment associated with the technical specification of an outputted equipment; the technical specification of an accessory associated with the technical specification of an outputted equipment. For example, a solution may include a placement of a controller associated with primary or auxiliary equipment. As disclosed, auxiliary equipment (i.e., accessory) may include but is not limited to a piece of electronic, mechanic or any other type of hardware that may be an accessory or serves in a supporting role in a system devised of one or more primary pieces of equipment. For example, the auxiliary equipment for a video camera may include cables, screws, fixings of a patch panel, a video recorder, a network switch, a rack, and/or a UPS. As another example, auxiliary equipment for a light fixture may include cables, a light switch, and/or a main electric board.

A solution may include a wiring diagram associated with the technical specification of an outputted piece of equipment; a customized equipment setting; an equipment classification; a programming parameter; an equipment height; a graphical indication of equipment placement on the floor plan; a graphical indication on the floor plan of equipment directionality; and/or any other placement or type of equipment which satisfies the demands of the problem. As disclosed, a wiring diagram may include a representation of the electrical, audio, video, data or any other cables connecting pieces of equipment to each other. Methods of generating wiring diagrams and types of such diagrams are discussed in greater detail elsewhere herein. Further, examples of a customized equipment setting or a customized equipment configuration may include programming a piece of equipment in a manner that differs from default factory settings. Customizing equipment may include setting or altering a physical component of a piece of equipment, combining one or more pieces of equipment, customizing physical properties of one or more pieces of equipment, or other types of customization as disclosed herein.

A generative analysis may be associated with or be performed in conjunction with a requirement and/or a defined area of interest or disinterest as an input and/or a technical specification as at least one of the definitions of the problem it attempts to solve when generating a new solution to a problem, simulating a solution and comparing its performance to a performance of another solution and retaining the better performing solution, and/or iteratively implementing an algorithm until a performance criterion is satisfied.

As disclosed, generative analysis may include using machine learning or any other process in which a solution to a problem, geometric, mathematical, physical, or otherwise, may be arrived at by a computational device. Machine learning may include algorithms that improve automatically through experience, in the process of generatively analyzing the at least one room. For example, when running a plurality of simulations or a series of simulations, a first answer to a problem may be posited (e.g., cameras placed in the room) and then a performance of the answer may be tested by simulation. An optimization engine may then repeat this process a plurality of times, trying different solutions and may attempt to improve the performance using one of many available optimization algorithms which may include but are not limited to genetic algorithms, annealing algorithms, particle swarm optimization, machine learning algorithms, and/or any algorithm which may repeat a process a plurality of times and improve on a performance throughout. A machine learning model such as a Convolutional Neural Network may be trained to predict equipment placement using the inputs of the geometry of the rooms in which the series of simulations have been performed, the optimization results, and/or the associated functional requirement.

Generatively analyzing may, in some embodiments, include running a simulation in the defined area of interest that includes an egress point associated with the at least one room. Running a simulation may include but is not limited to a process in which a spatial situation may be modeled in the computer in 2D or 3D and one or more pieces of equipment may be situated in that space, the function of the one or more pieces of equipment may be analyzed, and a numeric score which may describe or indicate a performance of the one or more pieces of equipment for a specific task may be provided, as described in greater detail herein. Running a simulation in the defined area of interest may include running the aforementioned simulation wherein the space may be the defined area of interest. For example, a simulation may consider coverage or other aspects of equipment performance in an area of interest or disinterest that include an egress point. The simulation may also consider performance outside the area of interest. For example, the simulation may determine a level of coverage (e.g., signal strength, percent area covered) within an area of interest, and may additionally consider results relating to other areas of a floor plan. In some aspects, generatively analyzing may include running a simulation on the defined area of interest that includes doors associated with the at least one room. It may include running a plurality of simulations. Running a plurality of simulations may also refer to running a series of simulations, which may in turn refer to a specific type of generative analysis sometimes called optimization, as described in greater detail herein.

Further, generative analysis may include implementing a variety of techniques involving an area of interest or disinterest, including, for example, performing at least one of topological analysis, semantic analysis, geometric analysis and/or a machine learning method to determine a preferred door face for a sensor to cover, a lighting controller, or an access control device. For example, based on a defined area of interest, embodiments may include identifying door openings associated with the defined area of interest and determining a preferred door face of the identified door. To illustrate this example, an area of interest adjacent to an inside of a door may be associated with a functional requirement to maintain restricted access, and the generative analysis may determine a location of an access control device on an outside of the door. The analysis may locate a light to assist in use of the access control device, and it may locate a camera to assist in identification of persons attempting to access the restricted area of interest.

In some examples, generatively analyzing may include calculating a distance of the at least one opening to an architectural feature or to a piece of equipment. Calculating a distance of the at least one opening to an architectural feature or to a piece of equipment may refer to determining a distance from one point of a floor plan (i.e., an opening) to another point of the floor plan (i.e., an architectural feature and/or a piece of equipment) through any of image analysis, semantic analysis, geometric analysis, and/or any combination thereof. Such distance calculations may reflect a shortest distance between an opening and an architectural feature or a piece of equipment as would be navigable by a person walking between the points but around objects in a floor plan (e.g., walking around walls). Distances may be calculated based on a shortest distance without regard to intervening object in a floor plan. Distance calculations may reflect distance a wiring path may navigate between two points (e.g., based on a preference to route wires in public spaces). More generally, distance calculations may be based on rules describing a method of navigation between two points that accounts for objects in a floor plan.

Consistent with disclosed embodiments, the at least one processor may be further configured to ignore areas of the at least one room other than the defined area of interest or disinterest. To ignore areas of the at least one room other than the defined area of interest or disinterest may refer to the generative analysis not considering the area outside of the area of interest or disinterest as a possible solution space to output a solution in (e.g., cannot place equipment in the ignored area). The processor may also ignore any inputs available within this ignored space, such as area, architectural features, furniture, and/or any other data that may exist in the area outside of the area of interest or disinterest when performing the generative analysis process.

Generative analysis may include performing an analysis of available space for an outputted solution. Performing an analysis of available space for the outputted solution may refer to determining an area and/or volume of the defined area of interest or disinterest through any of image analysis, semantic analysis, geometric analysis, and/or any combination thereof. For example, the analysis may identify space available for or associated with an installation of equipment based on a determined equipment placement location. Embodiments may include identifying an equipment placement location and a maximize areal extent of the equipment that may be sited at that location without intruding on other objects in a floor plan (e.g., a maximum couch size). Additionally or alternatively, an analysis of available space may indicate a distance between a selected equipment placement location and other objects in a floor plan (e.g., other equipment, architectural features, etc.).

Performing topological analysis may refer to an analysis of the connectivity of rooms, spaces, zones and floors within a floor plan that may reveal information regarding the properties of the rooms, spaces, zones and floors. A topological analysis may define relationships between rooms and their position in the floor plan hierarchy using the doors that connect them to create spatial maps. A spatial map may be described as weighted graphs and graph properties such as connectivity and shortest paths. Topological analysis may employ geometric analysis, which may include an interrogation of a BIM, CAD, PDF, and/or any 2D or 3D floor plan containing geometric entities such as lines, polylines, arcs, circles, and/or vectors. Topological analysis may employ semantic analysis which may include interrogating and parsing a BIM file for information regarding room connectivity, room adjacencies, and/or room openings such as doors. Door faces (i.e., a side of a door) may swing in one direction and not the other, so opposing door faces may behave differently because one face may open inward while the other may open outward. Determining a preferred door face may include establishing which door face may be optimal for a desired result. For example, when determining a preferred door face for a door required to be covered with a sensor, topological analysis may establish that one side of the door is better suited for a particular sensor than the other. As an example, it may determine that the side of the door facing a corridor is more suitable. As another example, when determining a preferred door face for a lighting controller, topological analysis may establish that one side of the door is better suited for the lighting controller than the other, e.g., a light controller may be located on a side of a wall corresponding to a door fact that is easier to reach for an individual entering or exiting a space through the door. In some embodiments, a preferred door face may be identified by means of a machine learning method.

As an illustrative example, in FIG. 8, the at least one processor may generatively analyze rooms 852a and 852b in conjunction with the technical specification (not shown) which may include one or more equipment specifications and/or model identifiers related to a camera which may provide "X" pixel density when facing a door interior at a certain distance and AOIs 856a and 856b to define a solution that at least partially conforms to the functional requirement 831. In this example, the solution includes the placement of cameras 858a and 858b having respective unique equipment specifications and/or model identifiers at specific locations in rooms 852a and 852b, respectively, and having an orientation, direction, rotation, and/or tilt.

Consistent with disclosed embodiments, the at least one processor may be configured to output the solution. An output may be a graphical depiction of equipment location or types which are the result of the generative analysis process, as described in greater detail herein. Outputting a solution may include transmitting the solution, storing the solution in memory, or any other means of transferring data associated with the solution from one media or device (e.g., from local memory) to another media or device (e.g., to a display, cloud storage).

By way of example, FIG. 8 depicts a representation of an outputted solution. In this example, the solution is presented to a user on a screen 860, the user may then view and interact with the outputted solution, which may take the form of a text document, a chart, an image file, a vector image file, a vector architectural file, and/or a BIM model. A user might interact with a solution by selecting options that permit other solutions of the generative analysis to be displayed and/or compared. Additionally, or alternatively, the user might be able to modify aspects of the solution and determine how the modification impacts other aspects of the outcome. For example, a user might be able to select an alternative piece of equipment and view how that change impacts cost and/or conformance with functional requirements. Or a user might prefer a different location for a selected piece of equipment, and might move the equipment and have the system run an update on how the movement impacts compliance with a functional requirement.

Consistent with disclosed embodiments, the at least one processor may be further configured to generate a bill of material based on the outputted solution. A bill of material, also referred to as a "material list" or as a "bill of quantities," may be a list describing the primary, secondary, and/or auxiliary equipment required to physically construct a building system. A bill of material may be a list of equipment models which may include the specific model, the quantity used, price information, specific properties, a physical description, and/or any other property which may describe a piece of electronic, mechanic, or any other type of hardware, cabinetry, or furniture that has a function and a technical specification. A bill of material may include an image of the equipment. A bill of material may be displayed on a screen or exported to a textual (e.g., Word), tabular (e.g., Excel), or image (e.g., .jpg, .pdf) format. A bill of material may be electronically transmitted by email or via the Internet to third-party software, ERP systems, and/or any other system which may receive data or files via a network.

Figure 7A:
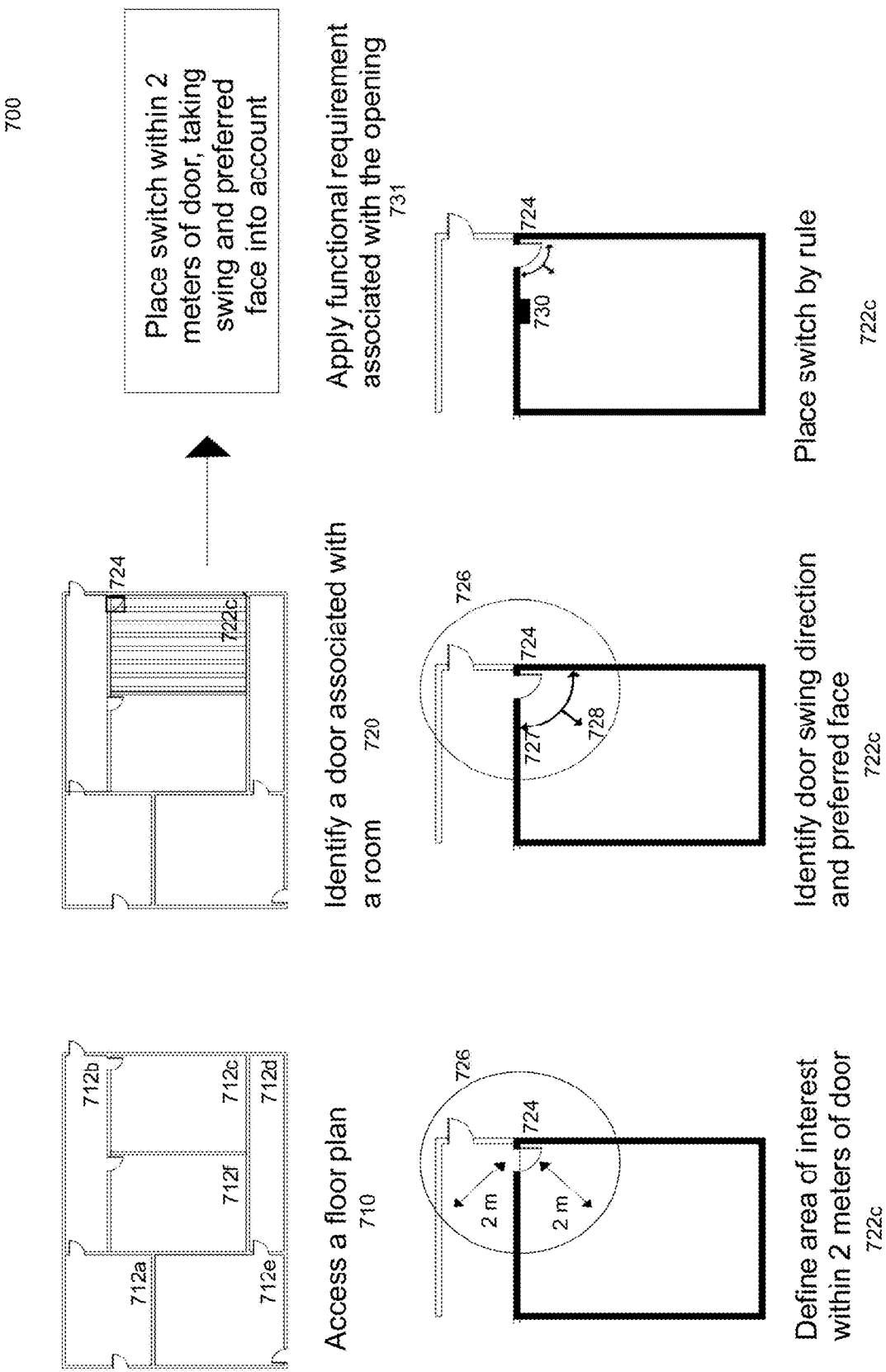
FIG. 7A is a block diagram illustrating aspects of an exemplary method for selective simulation of coverage associated with a switch in a floor plan, consistent with the disclosed embodiments.

By way of example, FIG. 7A illustrates one example of a structural design method 700 for selective simulation of coverage associated with a switch in a floor plan 710 with a plurality of demarcated rooms 712a, 712b, 712c, 712d, 712e, 712f. The method may be implemented, for example, using a system including a processor (not shown). To the extent specific details and examples were already discussed previously, they are not repeated with reference to FIG. 7A. In this example, the processor may identify a door 724 associated with room 722c. The processor may access a functional requirement 731 which recites "Place switch within 2 meters of door, taking swing and preferred face into account." The preferred face may have been defined, for example, to be the face of the door inside a room rather than the face inside a corridor. In this example, functional requirement 731 is describing the placement of a piece of equipment in a system.

The processor may define an area of interest (AOI) 726 which may include a circular area of radius 2 m surrounding door 724, per functional requirement 731. In this example, the processor may then access a technical specification (not shown) associated with functional requirement 731. The technical specification may include one or more equipment specifications and/or model identifiers related to a switch which may be placed within 2 meters of a door. The processor may then generatively analyze room 722c in conjunction with the technical specification (not shown) and AOI 726 to define a solution that at least partially conforms to functional requirement 731. In this example, the solution may include identifying a door swing direction 727 (e.g., left hand in-swing) and a preferred face 728 (e.g., indoors) and placing the switch 730 having a unique equipment specification and/or model identifier at a specific location in room 722c with a specific orientation.

Figure 7B:
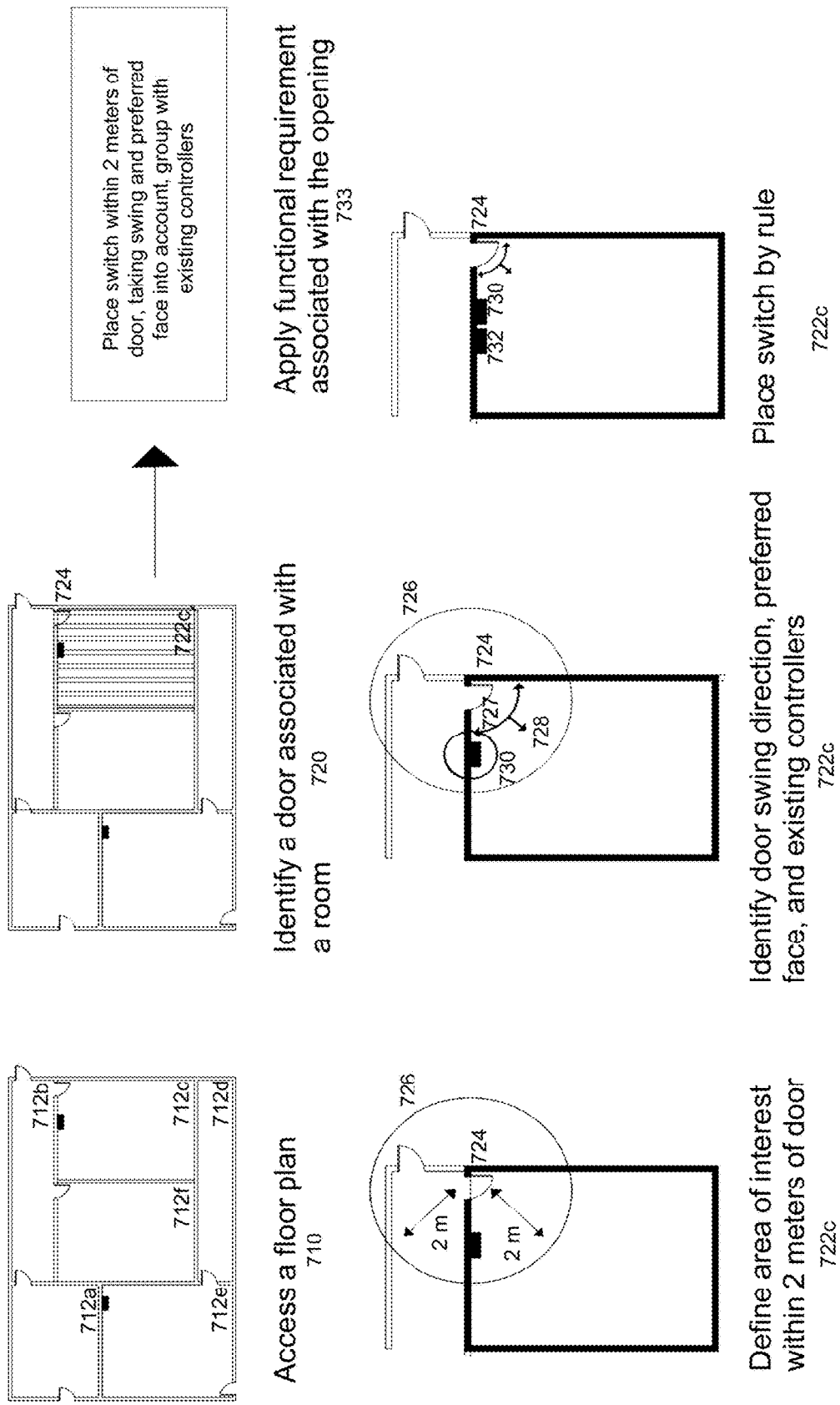
FIG. 7B is a block diagram illustrating aspects of an exemplary method for selective simulation of coverage associated with a switch in a floor plan wherein the floor plan includes an existing controller, consistent with the disclosed embodiments

By way of example, FIG. 7B illustrates one example of a structural design method 701 for selective simulation of coverage associated with a switch in a floor plan 710 with a plurality of demarcated rooms 712a, 712b, 712c, 712d, 712e, 712f wherein floor plan 710 includes an existing controller. In this example, the existing controller may be switch 730 from FIG. 7A. The method may be implemented, for example, using a system including a processor (not shown). In this example, the processor may, such as in FIG. 7A, identify a door 724 associated with room 722c. The processor may access a functional requirement 733 which recites "Place switch within 2 meters of door, taking swing and preferred face into account, group with existing controllers." In this example, functional requirement 733 is describing the placement of a piece of equipment in a system, such as in FIG. 7A, with the additional aspect that the switch be grouped with existing controllers, i.e., switch 730.

The processor may define an area of interest (AOI) 726 which may include a circular area of radius 2 m surrounding door 724, per functional requirement 733. In this example, the processor may then access a technical specification (not shown) associated with functional requirement 733. The technical specification may include one or more equipment specifications and/or model identifiers related to a switch which may be placed within 2 meters of a door. The processor may then generatively analyze room 722c in conjunction with the technical specification (not shown) and AOI 726 to define a solution that at least partially conforms to functional requirement 733. In this example, the solution may include identifying a door swing direction 727 (e.g., left hand in-swing), a preferred face 728 (e.g., indoors), and existing controllers (e.g., switch 730) and placing the switch 732 having a unique equipment specification and/or model identifier at a specific location in room 722c with a specific orientation.

Figure 9:
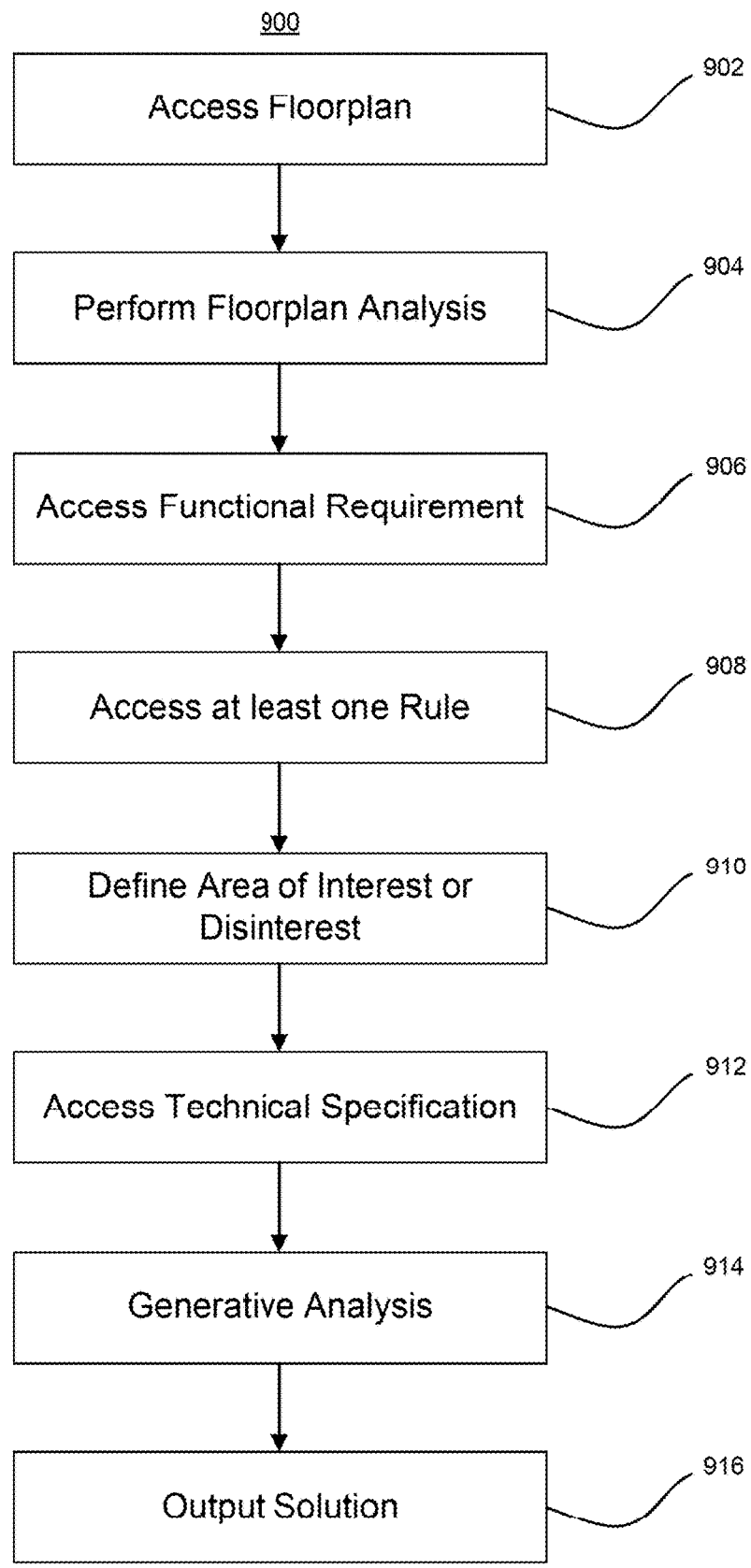
FIG. 9 is a flow chart illustrating an exemplary method for selective simulation of coverage in a floor plan, consistent with the disclosed embodiments.

FIG. 9 further illustrates another example of a structural design method 900 for selective simulation of technical specification coverage in a floor plan. The method may be implemented, by way of example, using a system including at least one processor (not shown). To the extent specific details and examples were already discussed previously, they are not repeated with reference to FIG. 9.

At block 902 in FIG. 9, the at least one processor may access a floor plan demarcating a plurality of rooms. Accessing a floor plan may include obtaining, examining, and/or retrieving data and/or files associated with the floor plan. The floor plan may be in a variety of formats, as disclosed. Further, accessing a floor plan demarcating a plurality of rooms may include analyzing the floor plan to determine contours.

At block 904 the at least one processor may perform at least one of a machine learning method, semantic analysis, or geometric analysis on the floor plan to identify at least one opening associated with at least one room from the plurality of rooms. For example, the system may identify a door, a window, an egress or other opening.

At block 906, the at least one processor may access a functional requirement associated with the at least one opening. Block 906 may further include identifying a door face associated with a functional requirement.

At block 908, the processor may access at least one rule that associates the functional requirement with the at least one opening. For example, the system may use a rule may to apply functional requirements, identify a space, and/or place equipment.

At block 910, the at least one processor may use the at least one rule and the functional requirement to define at least one of an area of interest or disinterest less than an area of the at least one room.

At block 912, the at least one processor may access a technical specification associated with the functional requirement. This may include retrieving the associated technical specification from memory (e.g., from a data structure or a database). Block 912 may, in some examples, include determining a technical specification associated with the functional requirement using a trained model, as disclosed herein.

At block 914, the at least one processor generatively analyzes the at least one room in conjunction with the technical specification and the defined area of interest or disinterest to define a solution that at least partially conforms to the functional requirement.

At block 916 of FIG. 9, the at least one processor may then output the solution. The output may be a graphical depiction of equipment location or types which are the result of the generative analysis process, as discussed in greater detail herein.

Aspects of this disclosure may include systems, methods and computer readable media for rule-based application of functional requirements to spaces in a floor plan. For example, disclosed embodiments may include a structural design system for rule-based application of functional requirements to spaces in a floor plan. Architectural plans may include semantic designations identifying, for example, a room type. Embodiments may include processes for semantic enrichment of floor plans, which refers to a process of adding missing or misrepresented semantic information (e.g., classifications, labels, names, or other semantic designations). Exemplary aspects of semantic enrichment processes are described throughout including, for example, as described in relation to FIG. 10E. Adding semantic designations to architectural plans may be a difficult and labor intensive task. Disclosed embodiments may simplify this process by semantically enriching floor plans to add new or change existing semantic designations associated with spaces of the floor plan. Embodiments include using a variety of automated approaches that consider geometric or other image properties of floor plans and use artificial intelligence models to semantically enrich floor plans. In some embodiments, rules may be applied to information derived from the semantic enrichment of architectural renderings. A processor may run a series of tasks, for example, to identify spaces within a floor plan or other architectural rendering and perform semantic enrichment on the floor plan to associate the spaces with semantic designations.

For ease of discussion, a method is described below, with the understanding that aspects of the method apply equally to systems, devices, and computer-readable media. For example, some aspects of such a method may occur electronically over a network that is wired, wireless, or both. Other aspects of such a method may occur using non-electronic means. In a broadest sense, the method is not limited to particular physical and/or electronic instrumentalities, but rather may be accomplished using many differing instrumentalities.

Consistent with disclosed embodiments, a method may include accessing a floor plan demarcating a plurality of spaces. Accessing may occur, for example, when a floor plan is opened, uploaded, linked, retrieved, recovered, extracted, or otherwise provided to or obtained for analysis by at least one processor. In some embodiments, accessing may occur when at least one processor is enabled to perform operations on the floor plan. Accessing may occur when a floor plan is retrieved from storage, such as a form of memory. A floor plan may be accessed from a variety of locations including from a network location, such as a remote server, a network attached storage drive, a remote database, a cloud storage service, or other types of network storage. In some embodiments, floor plan may be stored in and accessed from local storage, such as a storage device associated with the processor or a local database. In some embodiments, the processor may access a floor plan through a data connection to a scanner, camera, or other device capable of capturing images. Floor plans may also be accessed in other suitable ways, as described herein.

Floor plans may be in any suitable format. For example, a floor plan may be represented in hand drawn or scanned images. In some embodiments, floor plans may be a CAD file or other type of vector-based, an image file, 3D file format. Disclosed embodiments may include floor plans in building information model ("BIM") files. and/or any other graphical or digital format. In some embodiments, a floorplan may be represented as a data structure. Floor plans may be in digital and hard copy formats, or both. A floor plan may include a diagram of a room, a suite of rooms, a whole floor of rooms, or an entire building of rooms. For example, the floor plan may include such representations as viewed from above. A floor plan may consist of other associated information with the plurality of rooms including technical specifications, functional requirements, equipment lists, energy metering, BMS data, iOT data, and other types of information as described herein. The floor plan may be constructed in a 2D format, 3D format or any combination thereof. In some embodiments, the data structure of the original floor plan or architectural file (e.g. BIM file) may be converted to another format. For example, a CAD or IFC file may be converted to a gzip compressed JSON object containing hierarchical buildings information. The JSON object may be constructed in a way that represents the hierarchy of one or multiple buildings. The information stored in the object may contain metadata, architectural features (including but not limited to room geometry, doors, windows, furniture, and/or equipment), and advanced/processed geometry/metrics/information about each element (e.g. buildings, levels, and rooms). Converting drawings in raw binary format (such as CAD or RVT) into gzipped JSON objects may result in reduced memory (relevant to both lesser costs of hosting the files; the time it may take to send the drawing from one service to another; the time it may take to download the file from file hosting services or databases), as well as allowing for further possible processing of other applications that may not able to naively process the drawings in their raw binary form. In some embodiments, the gzipped JSON object may be referred to as a BMD.

In some embodiments, floor plans may demarcate a plurality of spaces. Spaces within a floor plan may indicate rooms other areas within a building or structure. For example, a space may be an office, corridor, conference room, sleeping area, kitchen, balcony, staircase, or other area of a building or structure. An office may be a single room or plurality of rooms used for work. For example, an office may include a desk, chair, and computer. An office can be a private office for a single individual, a shared office for many individuals, or an open plan office. A corridor may be a passageway in a building from with openings such as doors leading into rooms. Corridors may be of various shapes, such as a narrow shape. For example, a corridor may be a long or short a hallway that connects rooms. A sleeping area may be an area where people sleep, including but not limited to, a bedroom, hospital room, hotel guestroom. A sleeping area may include a bed, mattress, futon, convertible sofa bed, or other furniture suitable for sleeping.

Spaces are not limited to rooms or areas within a building or structure. For example, in some embodiments, spaces may include exterior areas of a building or structure, such as a garden, lawn, balcony, patio, deck, gazebo, roof, sidewalk, driveway, parking lot, parking garage, fire escape, or other exterior area related to a building or structure.

A space demarcation may include information relating to a floor plan that may indicate the location of a space in a plan in relation to the rest of the plan. A space demarcation may also include the boundaries (also referred to herein as contours) of a space. Boundaries may include objects, real or imaginary, that constitute borders of a space or room (such as walls or windows that surround a room), openings associated with the space's borders (such as doors or windows leading in and out of a room), equipment and/or architectural features (such as columns, beams, furniture, or others) contained in or around the space.

In some embodiments, floorplan analysis may be performed on the floor plan to identify contours of a plurality of demarcated spaces of the floor plan, as described throughout the present disclosure. Floor plan analysis may include using geometric analysis, semantic analysis, BIM analysis, image analysis, or machine learning methods, as described herein. More generally, floorplan analysis may include extracting information about the floor plan from a BIM, CAD, PDF, image, skeletal model, or other type of floor plan. Floorplan analysis may be used to locate rooms, room areas, room volumes, room boundary segments, room borders, doors, windows, stairs, furniture, equipment or any other feature of a floor plan. In some embodiments, a floorplan analysis may indicate the type of feature detected. In some embodiments, the borders or contours of a room may not initially be demarcated in the floor plan in a machine readable format. Accordingly, accessing the floor plan may include identifying demarcations in the floor plan, as described in greater detail herein. As described herein, contours may be boundaries or other indicators of a space that show a space relative to other spaces within the floor plan.

In some embodiments, floor plans may include representations of furniture. Furniture may describe large movable equipment used to make a house, office, or other space suitable for living or working. Furniture may include tables, chairs, seats, sofas, beds, desks, cabinets, shelves, benches, wardrobes, lamps, or other types of moveable equipment as disclosed herein. In some embodiments, furniture may also include decorative articles such as potted plants or artwork, including statues, pottery, sculptures, paintings, pictures, taxidermy, fountains, and other physical works of art. In some embodiments, furniture may also include other equipment that is built-in, fixed or not easily moveable, such as a bench, table, bookcase, or other piece of equipment affixed to the floor, ceiling, and/or wall of a building. Furniture may be graphically depicted in a floor plan. For example, furniture may be graphically depicted by a symbol, picture, drawing, or other suitable representation.

In some embodiments, floor plans may include or reference architectural features. An architectural feature may be any part of a building or structure. Architectural features may include a zone, a room, wall, a half wall, a door, a window, a column, stairs, a handrail, a beam or any other permanent part of the building. An architectural feature might also be a non-permanent item present within the space of a building and depicted in the floor plan, such a piece of furniture, signage or cabinetry.

Some floor plans may lack information that provides context to the viewer, such as labels, tags, or designations that classify areas or specific features of the floor plan. A complex floor plan with many rooms, all lacking any type of label, might not be as useful to the viewer as a floor plan in which each room, as well as the furniture or equipment within the room, is precisely labeled according to a certain classification. Disclosed embodiments may include performing semantic enrichment on the plurality of spaces in order to determine a semantic designation for at least one space of the plurality of spaces. Semantic enrichment may refer to the process of adding missing or misrepresented semantic information to an architectural floor plan (e.g., as described in relation to FIG. 10E). Semantic information may include semantic designations, labels, tags, classifiers, symbols, and other context providing features of a floor plan. Semantic enrichment may be used to classify a room type by recognizing features of the room. For example, an office may be recognized because it may be a small, square room with a door, window, desk, and chair. Or, even if not illustrated with furniture, artificial intelligence techniques might enable the system to recognize a floor plan as being associated with an office suite, and might automatically recognize a room as an office. Semantic enrichment may also be used to classify a room type by its tag according to a given schema without being dependent on the original draftsman being aware of the requirements of the schema. For example, a room labeled as "Guy's cubicle" may be classified as an office, based at least in part on the label. In some embodiments, semantic enrichment may be used to identify a type of furniture, for example, a chair, table, desk, bed, or any other pieces of furniture. In some embodiments, furniture may be represented by a graphical symbol or other representation on a floor plan.

Performing semantic enrichment may include, but is not limited to, the use of semantic, geometric, topological, image analysis, or machine learning methods together with a computational algorithm as disclosed herein (for example, heuristic, stochastic, machine learning based, or other algorithm types as disclosed herein). For example, a floor plan may be analyzed to determine features of spaces within the floor plan, such as demarcations, areas, volumes, tags, labels, existing names, classification codes, architectural features, furniture, equipment, and other relevant information. While semantic, geometric, topological and image analysis are provided as examples, semantic enrichment is not limited to including only these types of analysis. The analysis may result in a variety of data that may be used as input into an algorithm. The algorithm may then be executed, using the input data to determine one or more semantic designations for spaces of the floor plan based on the analysis and any determined features. In some embodiments, semantic enrichment may be performed using multiple types of analysis or multiple computational algorithms. Various types of analyses and algorithms that be used to implement semantic enrichment are described below. Non-limiting examples of semantic enrichment processes are presented in connection with FIG. 10D and FIG. 10E.

Consistent with disclosed embodiments, a semantic designation may be a classification of a room or an architectural feature according to a fixed schema (i.e., organizational data structure) that includes information such as a name, purpose, or characteristics of a room. In the case of rooms for example, a semantic designation of the room may be "office", "toilet" or "corridor." In the case of furniture, a designation may be "chair", "desk" or "door". In the case of equipment, a designation may be "thermostat," "fan-coil unit," "sensor," or "light switch." Further, semantic designations may be chosen from a limited list of possibilities. Such a list may be formed according to a standard for architectural semantic designations. A standard for semantic designations may be a classification standard such as Uniclass, Omniclass, MasterFormat or other standards. In some embodiments, the standard may be a unique standard of an individual architect, planner and/or designer. In some cases, the semantic designation on CAD, PDF or BIM floor plans may be missing from the data, or not clear (e.g., a room is labeled "accounting" instead of "office") and need to be replaced with a different designation in order to be read by a computer. Thus, disclosed embodiments may use semantic enrichment techniques to add or change semantic designations on floor plans without the need for a planner to manually edit the semantic designations for each part of the floor plan.

In additional or alternative examples, a semantic designation may identify a function of a space or room. A room function may indicate or describe the purpose, use, or occupancy inside of a room. For example, a room may be a space used for eating, cooking, holding meetings, exercising, sleeping, storage, work or other functions. In some embodiments, the semantic designation may inherently identify a function, for example, when the semantic designation is "storage." In other embodiments, a function of a may be implied in a semantic designation. For example, it may be implied that "bedroom" is for sleeping. In some embodiments, a semantic designation may be otherwise associated with a function. For example, a standard such as Omniclass, MasterFormat, Uniclass or Industry Foundation Classes may include certain functions that are associated with the specified semantic designations. As another example, the data structure of a floor plan may be such that semantic designations may be stored in association with one or more functions in a data structure or index.

Embodiments consistent with the present disclosure may include a semantic analysis. A semantic analysis may include but is not limited to an analysis of a BIM, CAD or PDF file which interrogates parameters and attributes of elements in the file. For example, in a CAD file, a semantic analysis may include checking the name of the layer an entity is drawn in, the type of entity, or the type of line it is represented with. As another example, a semantic analysis may include using the name of a CAD block to determine the type of element it describes. In a BIM model, a large amount of information may be contained within semantic, textual fields as object properties and attributes. In this type of file, a semantic analysis may yield information regarding the type and the physical makeup of architectural elements and equipment. For example, a semantic analysis may determine a type of wall, its structure, its fire rating, or its dimensions. For example, a semantic analysis may determine the model number, family, dimensions, 2D image, 3D image and other metadata associated with a BIM object of a desk. A semantic analysis of a BIM file may also yield information regarding the type, model or manufacturer, technical characteristics, 2D image, 3D image and other metadata associated with of equipment. In these files a semantic analysis may also yield relationships or associations between different elements in the floor plan, for example an association of a wall with a door within it, or a wall with the room it borders. Semantic analysis can also yield information regarding the function of a room or element (e.g. sleeping area, office, storage space, etc.). A semantic analysis may include Natural Language Processing algorithms such as word2vector used to infer semantic meaning even when it is not clearly represented in the data. For example, a Natural Language Processing or similar algorithm may be used to infer that "hallway" is another word for a "corridor" or that a "recliner" is a type of "sofa."

In some embodiments, semantic enrichment may include performing a geometric analysis on the floor plan. As used herein, a geometric analysis may include any form analysis for extracting information from a floor plan based on geometries represented in the floor plan. A geometric analysis may include an interrogation of a floor plan represented in a BIM, CAD, PDF or any file format containing geometric entities such as lines, polylines, arcs circles or vectors. The geometric analysis may use coordinates (e.g., XYZ coordinates) of end points of entities to determine properties of the entities and their relationship each other. For example, information derived from a geometric analysis may include line length, line direction, the location of geometric objects in the floor plan, or any other properties represented in the floor plan. The geometric analysis may include searching the floor plan for sets of parallel lines or vectors, perpendicular lines or vectors or lines in a certain angle, which may be indicative of walls or other boundaries of a room. The geometric analysis may include measuring distances between entities and find pairs of entities close to each other, identifying sets of entities that create patterns which repeat in different locations in the floor plan, finding relations of inclusion between a point and a closed geometry, or any other relationships between points, lines, or shapes represented in the floor plan that may indicate room contours.

Embodiments consistent with the present disclosure may include a topological analysis. A topological analysis may include but is not limited to an analysis of the connectivity of spaces within a floor plan that can reveal information regarding the properties of these spaces. A topological analysis may define relationships between rooms and their position in the floor plan hierarchy using the doors that connect between them to create spatial maps. A spatial map may be described as weighted graphs and graph properties such as connectivity and shortest paths derived. In some embodiments, semantic enrichment may include a topological analysis of a floor plan or one or more spaces of a floor plan. For example, a topological analysis of the floor plan may be conducted to identify rooms within the floor plan. As another example, a topological analysis of a space within a floor plan may be conducted to identify features of spaces, such as, for example, number and type of adjacent and connected spaces to a given space, that may be used to identify a semantic designation to associate with the space.

Embodiments consistent with the present disclosure may include an image analysis. An image analysis may include but is not limited to an analysis of a pixel-based image such as a jpg or bmp which uses pixel color and/or location within the image to gather information regarding the geometry it represents. In this context, an image analysis may be used for analyzing a floor plan if no vector information exists, such as with hand drawn or scanned plans and/or for semantic enrichment. For example, image analysis may be used to demarcate contours of spaces, differentiate between spaces, or identify other features of spaces in a floor plan. In some embodiments, algorithms from the world of computer vision can used to reconstruct geometric features from pixel-based images. Other examples of imaging processing may include a Hough transform algorithm, Canny edge detection, and other suitable image processing techniques as described herein.

As discussed above, semantic enrichment may include employing a computational or classification algorithm along with an analysis method to generate semantic designations for a floor plan. For example, an analysis method may be performed to identify various spaces within a floor plan and certain features or characteristics of those spaces. The analysis method may produce output data of several types indicating the spaces within the floor plan and information about the spaces including geometric data (including the shapes, relative sizes, relative locations, and other information related to floor plan or space geometry), textual data (including any existing semantic designations, labels, or other text on a floor plan related to spaces of the floor plan), and image data (including an image of the floor plan, one or more images of portions of the floor plan, symbols of the floor plan, and other data related to visual presentation of the floor plan). Each these types of data may serve as input to one or more algorithms or models to perform semantic enrichment. In some embodiments, multiple algorithms or models may be used in the semantic enrichment process to arrive at a final semantic designation for a space.

In some embodiments, image and text data may be used to classify elements of spaces within the floor plan, such as architectural features, furniture, and equipment. Image data may be input into an algorithm configured to classify elements of the images. In some embodiments, the algorithm may be an artificial neural network, such as a residual neural network (ResNet). A ResNet, for example, may be trained to classify furniture, equipment and/or other elements of a space based on images and symbols (e.g. CAD symbols and blocks, PDF symbols or BIM objects) within an image of a floor plan or from images associated with a BIM object's metadata. As an example, a ResNet may be trained to recognize that a circle placed within a rectangle should be classified as a "sink" or that a series of six or more identical rectangles placed with their long edges touching should be classified as "stairs." As another example, a ResNet may be trained to recognize to that a circle with a line attached to it should be classified as a "light switch." As another example, a ResNet may be trained to recognize a 2D or 3D image of a chair associated with a BIM object and classify the image as a "chair." By way of other non-limiting examples, a ResNet might classify an arrangement of sets of transversely intersecting lines as corners of a room, thereby recognizing the room; recognize a break in a room interior wall of a threshold size as an egress; or recognize in an exterior wall a non-uniformity of a threshold size as a window. During model training, such as a ResNet model for example, a plurality of floor plans may be annotated in different ways to allow multi-type deep learning training and other possible artificial intelligence training techniques. Such annotations may be stored as CSV, JSON, or other file types. As illustrative examples, annotations may include masks or data denoting geometric objects such as boxes, oriented boxes, or polygons that identify or demarcate features of interest in a plurality of floor plans. These objects may be generated manually, for example, by drawing them over the image or automatically using heuristic, geometric or statistic algorithms, or generated or identified using other suitable techniques. Annotations may be used for training a model to perform a variety of tasks, including detection, segmentation, or classification tasks. More generally, annotations may assist in the training of any machine learning algorithm to perform a computer vision task or other artificial intelligence tasks. Annotation may also be applied when using statistical algorithms. In some embodiments, training images may be cleaned by removing text, redundant features, or other elements. For example, when performing small object detection (e.g., detection of doors or door sills), a floor plan may be cropped into a size (e.g., 1000×1000 pixels) and afterwards recomposed and used with non-maximum suppression. Floor plans may be resized (e.g., resized to 1024×1024 or 512-512) before inputting to the artificial intelligence model for detection of larger objects, such as walls or room.

Annotated floor plans may be divided into training and validation sets. For detecting architectural features in the floor plans and predicting features, various deep learning models may be used including the following non-limiting illustrative examples. RetinaNet may be used based on the ResNet classification network. In another example, to detect door sill placement within a door, a classification deep neural network may be used such as ResNet. For segmentation of walls and rooms, which may be a base of a multi-purpose network, UNET may be employed, which includes encoder-decoder architecture to reconstruct semantic segmentation on top of the floor plan image.

Disclosed embodiments may include training deep learning networks on a specialized cloud system with an industrial GPU or with a variety of other types of machines. As an illustrative example, a trained deep learning model may be post-processed with computer visions algorithms. Such algorithms may include RANSAC, Hough lines, connected components algorithms, or other models suitable for computer vision.

Similarly, text data related to elements of spaces, such as architectural features furniture and equipment, may be input into a machine learning algorithm, such a natural language processing (NLP) algorithm (e.g., word2vec or others). An NLP algorithm may be configured to classify a room element based on the text associated with it. For example, a text data input may include a furniture label of "mattress." The NLP algorithm may classify this label as a "bed" label because of a learned association between "mattress" and "bed." As another example, text data input may include a furniture label of "loveseat." The NLP algorithm may classify this label as a "sofa" label because of a learned association between "loveseat" and "sofa." As another example, the NLP algorithm may classify "LED Spot 20 W Warm White" as "light fixture" because of a learned association between the text string as "light fixture." In some embodiments, the NLP algorithm may be configured to classify incomplete or incorrect text. As an example, the NLP algorithm may classify a furniture label "mtress" as a "bed." In some embodiments, the NLP algorithm may be configured to classify text from a plurality of languages. In some embodiments, the classification may remain within the source location of the existing labels.

In some embodiments the semantic enrichment may consider existing semantic designations. For example, matelas" in French ("mattress") may be classified as "lit" ("bed"). In some embodiments, the classification may involve translation to another language. As an example, the NLP may classify a furniture "chaise longue" in French to "chair" in English. Accordingly, the semantic enrichment is configured to determine semantic designations in a plurality of languages.

In some embodiments, the classification language may definable based on, for example, the language of the tags in the floor plan, the geographic location of the project which the floor plan represents, the geographic location of a user, or a user defined presence. In some embodiments, the classifications may be made using rules rather than learned association. For example, any string of text including the word "toilet" shall be classified as a "toilet."

In some embodiments, both the image and text classification outputs of space elements may be provided together as input into a classification algorithm to provide a more accurate classification of an element based on both the image of the element and any associated text. For example, an image classification algorithm may classify an element as a "couch" based on the image or symbol of the element in the floor plan. However, a textual classification algorithm may classify the same element as a "sectional," based on the text associated with the element. Both of these classifications may then be input into a third classifier, which may ultimately classify the element as a "sofa," based on the prior classifications of "couch" and "sectional." In some embodiments, a confidence rating may be associating with a given classification. The third classifier, may for example, elect the classification with the highest confidence rating. It may provide a weighting for a preference for an image or text classification. In some embodiments, another classification type such as a geometric analysis of the shape of the element or user identification of an element may be provided as an additional input to the to the classification algorithm. The classification algorithm may use a majority-rules approach in determining the classification.

In some embodiments, other text data related to a space as whole, but not necessarily to a specific element of the space, may be input into a machine learning algorithm, such a natural language processing (NLP) algorithm. For example, a text data input may include a floor plan room label of "Bob's sleeping quarters." The NLP algorithm may classify this label as a "bedroom" label because of a learned association between "sleeping quarters" and "bedroom." As another example, a text data input may include a floor plan room label of "clothing storage." The NLP algorithm may classify this label as a "closet" because of a learned association between "clothing storage" and "closet." As another example, a text data input of 13-31 15 11 may be classified as an "Open Class Laboratory" because of learned association between this Omniclass code and "Open Class Laboratory." In some embodiments, such associations between classification standards such as Omniclass may be written as rules rather than a learned association (e.g. 13-31 15 11=Open Class Laboratory)."

Resulting element classifications and space classifications based on text, as well as geometric data or other data associated with a space of a floor plan, may be input into yet another classification algorithm, referred to as a semantic enrichment model, to produce an ultimate classification for the room and a corresponding semantic designation. As described herein, a semantic enrichment model may be a computational model, artificial intelligence model, or other model configured to receive floor plan data as input and output semantic designations for spaces within the floor plan. In some embodiments, the semantic enrichment model may also output a confidence rating, as described herein.

The computational algorithm may then be employed to generate a semantic designation for the identified spaces. As an example, an analysis method, such as a semantic analysis, geometric analysis or machine learning methods, may be employed to identify spaces within a floor plan. The analysis method may identify, for example, three spaces within a floor plan and other details about the spaces. The first space may be a room with an area 30 square feet, with two windows, one door, and a desk. The second space may be a long narrow passageway with no windows or furniture. The third space may be a large room of 150 square feet with a window and a bed. This output data from the analysis methods may then be input into a computational algorithm trained to output a semantic designation for each space based on the identified characteristics such as size, architectural features, furniture, or other distinguishing features. For example, the first space above may be given the semantic designation of "office" because it has a desk, along with a single door and two windows. The second may be given the semantic designation of "corridor" because it is a long and narrow shape with no windows. The space may be given the semantic designation of "bedroom" because it includes a bed. This type of automation of determination of semantic designations may save considerable effort and coordination for large scale planning projects. For example, disclosed embodiments may enable a large number of floor plans to be quickly, accurately, and consistently provided with semantic designations. Such a task done manually would be daunting and prone to errors or inconsistencies, as well as time and labor intensive.

Semantic enrichment may also involve an artificial intelligence method to add information to a floor plan. Artificial intelligence methods may include, for example, neural network models, natural language processing techniques, classification models, random forests, deep learning models, support vector machine models and other machine learning or other artificial intelligence techniques as disclosed herein. For example, an algorithm may be trained to analyze a floor plan and determine one or more semantic designations for spaces within the floor plan based on the analysis. For example, a deep learning network may be used to identify walls, extract room boundaries or locate architectural features such as doors, windows or furniture and to predict the room's function based on the identified features and elements. Artificial intelligence models may also be configured to receive input data including various characteristics of a floor plan or spaces within the floor plan (such as geometric data, architectural features, furniture, text, and other suitable identified characteristics of a floor plan) and predict semantic designations for spaces within the floor plan. For example, a neural network model or a random forest model may be configured to receive input data about a space and trained to output a semantic designation for the space based on the data. The input data may indicate for example that the space has four walls, two windows, a desk, two chairs, one door, and a bookcase, as well as text on the floor plan indicating "secretary's office." Thus, the neural network may determine the semantic designation of "office" for the space based on the input data.

In some embodiments, semantic enrichment may include consideration of architectural features of a floor plan. For example, a space of a floor plan may include one or more architectural features that may indicate or suggest that the space is of a certain type. A space may be bounded on two sides by walls, each of which contain a window. On the other two sides, the space may be bounded by a railing. Based on these architectural features, the space may be given the semantic designation of "balcony." As another example, space may be given the semantic designation of "staircase" because it is interior to a building, bound by walls, includes stairs, and includes a railing. An algorithm may distinguish the "staircase" from a "fire escape" during the semantic enrichment process by certain architectural features. While both may include stairs and a railing, the fire escape may be external to the building and not bound by four walls. In some embodiments, the absence of architectural features may also be considered in the semantic enrichment process. For example, a "closet" may be identified as a small space with one door having no windows or furniture within.

In some embodiments, semantic enrichment may include consideration of furniture and equipment within spaces of a floor plan. For example, a space of a floor plan may include one or more pieces of furniture. The types, size, quantity, arrangement that may indicate or suggest that the space is of a certain type. In some embodiments, other equipment within a space may also be considered, such as lighting fixtures, appliances, plumbing fixtures, and other fixtures as disclosed herein. For example, the presence of one or more electrical panels in a small space with no windows and adjacent to a wiring shaft may suggest that a space is an electrical room.

In some embodiments, the arrangement of the furniture within the room may be considered. For example, two spaces may both contain a table and four chairs, but be given different semantic designations. The furniture of the first space may be arranged such that the table is located near the center of a room, with the four chairs placed close to the table and evenly spaced around the table. The furniture of the second space may be arranged such that the chairs are located in separate corners of the room, with the table being small and located adjacent to one of the chairs. In this example, the first space be given the designation of "dining room" while the second space may be given the designation of "library." As another example, a table with 1 chair on one side and 2 chairs on the other side may suggest that it is desk. The same table, for example, with 2 chairs on both sides may suggest that it is a small eating table or a meeting table. Relationships between rooms might also be considered. In the first example above, the dining room designation might be assigned in part based on the location of the room in proximity to a kitchen. However, in a situation where a kitchen is not within a threshold distance, the room might be designated as a "conference room." In some embodiments, the combination of furniture in the room may also be considered. In the previous example, the second space may also include one or more bookcases, the presence of which may also be considered to identify the semantic designation of "library" rather than "dining room."

In some embodiments, semantic enrichment may include adding semantic designations to furniture within a space of a floor plan. The techniques of semantic enrichment described herein may be used to add semantic designations not only to a space itself, but also to furniture and equipment within the space. For example, a large rectangular object with two smaller rectangular objects positioned on one end of it may be given the semantic designation of bed. In some embodiments, semantic enrichment of furniture may be based on a semantic designation of the space the furniture or equipment is within or semantic designations of other furniture or equipment within the space. For example, a rectangular object near another piece of furniture designated as a "chair" in a space designated as an "office" may be given the semantic designation of "desk." As another example, a rectangular object connecting to a fan-coil unit may be given the semantic designation of an "HVAC duct." As another example, a series of lines connecting to lighting fixtures may be given the semantic designation of "electrical cable." Further examples of semantic enrichment of furniture are described with respect to FIG. 10B.

In some embodiments, semantic enrichment may include consideration of existing semantic designations. Existing semantic designations may be semantic designations that already exist within a floor plan before semantic enrichment is performed. For example, a draft may label rooms within a floor plan as "bedroom," "manager's office," or "washroom." As another example, equipment such as "camera" may be labeled as "CAM" and a sensor as "SENS." Existing semantic designations may be identified using a natural language processing or other suitable text-based or language-based algorithm. For example, a semantic analysis may be performed on the floor plan, and existing semantic designations within the floor plan may be identified. In some embodiments, classification rules may be used rather than learned associations. For example, any string of text with the word "CAM" shall be classified as a "camera." These existing semantic designations may then be used as input into the computational algorithm, which may use the existing semantic designations as a factor in its determination of new semantic designations. For example, spaces having the existing semantic designation of "secretary's office" or "computer workroom" may be given the new semantic designation of "office." The new semantic designation may be determined at least in part by the similarity of the existing semantic designations to the new semantic designation "office." As another example, a small room with a toilet, a shower, and an existing semantic designation of "washroom" may be given a new semantic designation of "bathroom."

In some embodiments, semantic enrichment may include updating or augmenting a prior semantic designation. As described above, a floor plan may include one or more existing designations. When semantic enrichment is performed on the floor plan, one or more of these prior existing semantic designations may be updated by replacement with a new designation. Continuing the previous example, the prior designation of "washroom" may be updated to the new semantic designation of "bathroom." In some embodiments, a semantic designation may ebe added to augment an existing semantic designation. For example, an existing designation of Classroom may be augmented with an Omniclass classification such as "13-31 13 13 Classrooms (Age 9 Plus)." In some embodiments, existing semantic designations may be updated to ensure that the semantic designations of the floor plan comply with a certain standard. Further examples of updating semantic designations are described with respect to FIG. 10A.

In some embodiments, semantic enrichment may include adding a semantic designation where one was absent in the floor plan. For example, one or more spaces within a floor plan may not include prior existing semantic designations. Accordingly, semantic enrichment may be performed to determine semantic designations for those spaces lacking one. Adding a semantic designation to a floor plan may include placing the semantic designation on the floor plan within or near the associated space, placing it on a floor plan with a line to the associated space, associating the space with the semantic designation in an index or data entry of floor plan. The designation may be added as an overlay on the floor plan, and/or it may be added as metadata associated with the floor plan. Further examples of updating and adding designations are described with respect to FIG. 10C.

Consistent with disclosed embodiments, a semantic designation may be applied in common to a plurality of spaces. In some embodiments, a semantic designation may be applied in common to plurality of spaces that each lacked a semantic designation. For example, a floor plan may include three spaces that each include a sink, a toilet, and a shower. Each of these spaces may be assigned the common semantic designation of "bathroom."

In some embodiments, a user may be enabled to override a semantic designation. Overriding a semantic designation may allow a semantic designation determined by the semantic enrichment algorithm to be changed by the user. In some embodiments, overrides may be manual by the user or automatic. For example, overrides may be performed using a rule (e.g., change all rooms with semantic designation of "x" to "y"), a graphical interface (e.g., a drop down menu, drag and drop of semantic designation), via an index (e.g., an index displaying all space semantic designations which can be edited individually or in bulk). According to disclosed embodiment, an automatic override may occur according to a confidence rating threshold, as described herein.

In some embodiments, a semantic enrichment may include indicating a confidence rating for a semantic designation. A confidence rating for semantic designations may relates to the degree of the match identified between a space and a determined semantic designation. In some cases, characteristics of spaces may not be identified with a 100% certainty in the semantic enrichment process. The reasons for this may be an ambiguous or meaningless room tag ("IR 300") or a geometry that lacks any clearly identifying features. To account for this, the semantic enrichment algorithm may be configured to provide a confidence rating. For example, a room already tagged as "office" may be assigned the semantic designator "office" with a 100% confidence, while a room tagged as "Guy's room" may be also designated as an office, but with a comparatively low (e.g., 30%) confidence rating. A confidence rating may be numeric (e.g., a number scale or percentage), textual (e.g. high, medium, low, etc.), symbolic (e.g., a checkmark for high confidence and a question mark for lower confidence), graphical (e.g., color based legend), or other suitable form of presentation. A confidence rating may be indicated in a variety of ways, including, by placing the confidence rating on the floor plan near the semantic designation, updating a table with entries associating spaces, semantic designations, and confidences ratings, saving confidence ratings to a data structure, including the confidence rating within metadata, or others. In some embodiments, a confidence rating below a certain threshold may prompt the user and request, for example, the user's intervention.

In some embodiments, a semantic designation may be added or changed according to a threshold confidence rating. For example, an existing semantic designation may be overridden or replaced if a defined confidence rating threshold is met. If such an example, an existing semantic designation may remain in place if the threshold confidence rating is not met.

In some embodiments, semantic designations may be determined based on a standard. For example, a standard may be identified that includes a limited universe of possibilities for semantic designations for spaces. Basing the determination of semantic designations on a limited universe of possibilities may be helpful to assign consistent designations. Consistent designations may then facilitate easier identification of and control over multiple spaces, as a well as permitting easier and more consistent application of rules to multiple spaces. For example, rather than have three spaces with semantic designations of "secretary's office," "manager's office," and "Luke's Cubicle," all three spaces may be given the semantic designation of "office." In some embodiments, the standard may be an international standard, such as Uniclass, Omniclass, MasterFormat or other suitable architectural or file standard. In other embodiments, the standard may be a unique standard of an individual architect, planner and/or designer.

Disclosed embodiments may also involve enriching the floor plan by associating on the floor plan a semantic designation with a space of the floor plan. Such embodiments may involve associative or associating principles. As used herein, associating may include creating a logical pair from two entities of different types, such as a physical item and a functional requirement. In some embodiments, the pairing might take the form of an on-screen representation or a logical pairing within an internal database or code. For example, a stored table may contain a list of associated entities. Stored associated pairs may also be passed together as an argument to a function. In some cases, one member of the pair may appear as a property in the other member's data. Associated items may be one from each of these lists: rooms, architectural features, equipment, functional requirements, rules, technical specifications, technical characteristics, or others.

In some embodiments, associating on the floor plan a semantic designation with a space may include overlaying the semantic designation on the floor plan within the boundaries of the corresponding demarcated space. For example, a floor plan may include a room bounded by four walls. Accordingly, a semantic designation, e.g., "office", may be placed over the floor plan within the boundaries of the four walls of the room. Examples of such semantic designation placement are illustrated in FIGS. 10A-10C. In some embodiments, a semantic designation may not necessarily be placed on a floor plan within the boundary of a space, but may be linked to a space in other manners such as using lines, colors, shapes, or other suitable indicators. In some cases, a floor plan may include key illustrating links between semantic designations with a specific indicator. For example, a room may be associated with the semantic designation of "office" by being colored purple on a floor plan. A key on the floor plan may indicate that spaces colored purple are associated with the "office" designation.

In some embodiments, a floor plan may be enriched by associating a semantic designation with an architectural feature and/or equipment. For example, a semantic designation may be associated with a wall, window, door, railing, or other architectural feature as described herein. In some embodiments, the associated architectural feature may be a piece of furniture, such as a bed, desk, table, chair, or other piece of furniture, or a piece of equipment such as an access control device, sensor, camera, controller, power outlet, cable tray, conduit, electrical panel, duct, HVAC unit, wiring or other piece of equipment.

In some embodiments, a semantic designation may be added to a zone associated with a space. A zone may be the aggregation of a plurality of architectural features, rooms and/or spaces sharing a common characteristic or point of interest for analysis, control, monitoring, or supply. A zone may be a physical zone, for example, a plurality of rooms between structural columns, an area beneath ground floor level, a wing of a building, all areas adjacent to windows, or other defined areas internal or external of a building or structure. In some embodiments, a zone may relate to room functions, for example a zone may include all retail spaces or all storage space within a building. In some embodiments, a zone may relate to safety. For example, a zone may be a plurality of rooms to which access is restricted by access control readers. In some embodiments, a zone may relate to rooms serviced by a common piece equipment, group of equipment, or a certain system. For example, a zone may include a plurality of rooms covered by a certain wifi access point. Zones may also relate to other properties such as thermal properties or solar gain (e.g., a thermal zone).

In some embodiments, a zone may be an HVAC zone, a fire zone, or an occupancy zone. An HVAC zone may be the aggregation of a plurality of rooms and/or spaces for which heating, cooling and ventilation functions may be collectively regulated and controlled. An HVAC zone may be serviced by a common set of HVAC equipment (e.g. air handling units, FCU's, or other appliance used for HVAC functions). In some embodiments, a building may have one or several HVAC zones. A plurality of spaces may receive the semantic designation of an HVAC zone based on a semantic enrichment process which may have identified a plurality of spaces sharing a common room function or common architectural feature. For example, several bedrooms may be identified as an HVAC zone given their common room function and a series of private offices may be identified as another HVAC zone given a shared set of architectural features such as a common façade and common solar radiation. In some embodiments, the shared architectural may have been identified and/or classified by means of semantic enrichment process.

A fire zone may be the aggregation of a plurality of rooms and spaces defined by a building's physical fire controls, fire separating materials, or the building's fire life safety systems. A fire zone may be constituted by all the areas and/or rooms within a set of fire walls, fire doors, or other separating materials. As an example, a semantic designation of a fire zone may be added to a plurality of spaces contained within an identified set of fire walls and fire doors. As an example, the identified fire walls and fire doors may have received these semantic designations from a semantic enrichment process. A fire zone may also be defined by proximity to fire safety equipment, such as fire control equipment (e.g., fire extinguishers, hoses, sprinklers, and other devices used for controlling, fighting, or extinguishing a fire) or fire indicating equipment (e.g., fire alarms, smoke detectors, monitors, and other equipment suitable for detecting a fire). In some embodiments, a fire zone may be defined by limitations of fire safety equipment (e.g., a number of smoke detectors or other equipment that can be grouped together on a single logical unit.) In some embodiments, a fire zone may be defined by specific risks for fire (e.g. a hazardous area may be separated into a zone) or by occupancy (e.g., a mercantile or living area may be a separate zone).

An occupancy zone may be a plurality of rooms or spaces within a building grouped according to their function. Some examples of occupancy zones may include: residential, mercantile, high-hazard, assembly, or others. Occupancy zones may be used for building and fire code enforcement. In some embodiments, occupancy zones may be defined by codes (municipal, state, national, international) or other standards. In some embodiments, an occupancy zone may be further divided into sub-zones. For example, an assembly zone may be divided in a performing arts sub-zone, a food and drink sub-zone, a ticketing sub-zone, and other sub-zones.

Disclosed embodiments may further involve identifying, in a data structure, a rule that includes a functional requirement based on the semantic designation. A data structure may refer to any type of data stored in an organized, searchable manner. A data structure may include different categories of information in predetermined locations. The data may contain textual, tabular, numeric or image information identifies rules. The rules may be stored in the data structure such that they are associated with semantic designations. The data of a data structure may be stored in SQL, MongoDB, AWS S3, CSV, XLS, JSON or any other data storage format. The data may be stored locally, in a network storage device, connected database, a cloud-based server or storage service, or other suitable method of data storage. A rule may be identified in a data structure by querying the data structure. For example, a data structure may be configured to return all stored rules associated with a certain semantic designation when the semantic designation is entered as a query to the structure. The foregoing data structure description is exemplary, and other data structures, as described herein, may be employed.

In the context of semantic enrichment processes, rules may include but are not limited to one or more of the following, taken alone or in combination: logical criteria (is, is not, and, or, etc.), geometric criteria (above, below, bigger, contained, orthogonal, etc.), semantic criteria (field X=first floor, field Y=stairway, etc). In some embodiments a rule might be used to apply functional requirements, apply technical specifications, identify a space or place equipment. A rule, in this context, may be a logical construct of the type "if A then B" used to create a cause and effect relationship in the computational design process. Exemplary rules may include: "place a light switch next to every door," "apply a certain functional requirement to all the offices," "if a room has a urinal, it is a washroom" and many other examples. In some embodiments, a rule may be a negative rule, for example, "do not place a camera with a view of a toilet stall." In some embodiments, a rule may be a composite rule containing multiple causes, effects, limitations, or prerequisites, for example, "place a sensor on every door that leads to a stairway and is numbered 3."

Rules may include one or more functional requirements. A functional requirement may include but is not limited to a description of performance parameters expected from a system. A functional requirement may be defined for the entire system, for a project, a floor plan, a zone, a room, an area or an architectural feature. A functional requirement may describe, for example, a minimal or maximal performance of the system in a task. The type of a functional requirement may be derived from the system it is applied to (e.g., an HVAC functional requirement may describe the performance of an HVAC system). Consistent with disclosed embodiments, a functional requirement may be used as a target for a generative analysis. For example, a functional requirement from a lighting system may be to provide at least 500 lux to a room. A functional requirement from a CCTV system may be to provide enough pixel density and/or resolution to identify the face of a person. A functional requirement from an HVAC system may be to provide air flow and ventilation suitable according to applicable national, state or municipal codes for a specific room occupancy. A functional requirement for a voice evacuation system may be a level for Speech Intelligibility (STI) and sound pressure in DB (SPL) in an area. A functional requirement from an access control system may be to fit all exit doors with keypads. A functional requirement from a fire safety system may be to protect all doors leading to escape corridors with smoke detectors. In some embodiments, different types of functional requirements (for example noise level and camera coverage) may be applied to the same area. Functional requirements may be associated with spaces within a floor plan. For example, a rooms within a floor plan may be associated with a functional requirement of a fire safety system to have a certain density of smoke detectors. In some embodiments, a plurality of different functional requirements may be associated with a space. In some embodiments, technical specifications may be associated with functional requirements. For example, a certain brand, series or model may be associated with a functional requirement.

In some embodiments, a rule may be an energy consumption rule, an occupancy rule, or an equipment placement rule. An energy consumption rule may involve the energy consumed by a space. As a non-limiting example, an energy consumption rule may include the power consumption per square meter or other unit of measurement for a space or room with a certain function and/or use in a building. For example, the energy use of an office can be estimated at X kilowatts per square meter per hour, while the energy use of a dining area can be estimated at Y kilowatts per square meter per hour. An energy consumption rule may be defined, for example, by a user, a code, building standard, pre-loaded template, an artificial intelligence method trained to predict energy consumption base on energy consumption or occupancy patterns, or building profile, as well as many other dataset types. Additional details regarding example artificial intelligence methods are described throughout the present disclosure.

An occupancy rule may be a set of instructions related to a building system that effects the way the system behaves given different occupancy conditions. For example, a lighting system may have an occupancy rule where if there is no one in the room, all lights are turned off. In another example, an HVAC system may be programmed to be one setting if there is no one in the room, in another setting if there are 1-10 people in the room, and in a third different setting if there are over 10 people in the room.

An equipment placement rule may be a rule which associates equipment descriptions, architectural features or semantic properties and a geometric relation. For example: "place a lamp above every work station" or "locate a switch next to every door" or "place occupancy sensors in all rooms larger than 10 sqm."

In some embodiments, a rule may be prestored in a database or other data storage. For example, a rule may be preidentified and stored in a database. Such a prestored rule may not be entered by a user during the operation, but stored before the fact such that the processor may access it later. The data may be stored in SQL, MongoDB, CSV, XLS, JSON or any other data storage format. The rule data may be uploaded by a user before in a previous session, stored by the software designer, uploaded from a different data structure, or automatically derived via an algorithm.

In some embodiments, a rule may defined by a user. For example, a user may be presented with an interface associated with the semantic enrichment process. The user may be able to use the interface to define rules and associate the rules with semantic designations, spaces, or functional requirements. Such capabilities may permit a user to dynamically define rules throughout the semantic enrichment process and permit the user to see corresponding changes to floor plan when different rules are implemented.

Disclosed embodiments may further include associating the identified rule with a space. Associating may include any form or linking, correlating or relating a rule with a space. For example, as described herein, associating may include creating a logical pair between a rule and a space. In some embodiments, the pairing might take the form of an on-screen representation or a logical pairing within an internal database or code. For example, a stored table may contain a list of identified rules and associated spaces. Stored associated pairs may also be passed together as an argument to a function. In some cases, one member of the pair may appear as a property in the other member's data. For example, rules associated with spaces may be stored as properties of the data related to a space. In some embodiments, an index of the spaces within the floor plan may be updated by associating a space with a functional requirement and a semantic designation. An index may be a list of data. An index may be saved in plain text format and optimized to improve efficiency and/or speed of searching and sorting operations on data referenced by the index. Indexes may include metadata or keywords and may allow the data to be searched via the index instead of reading through each file individually. With reference to a building, an index may include a list of all room names, their semantic designation, data regarding their geometric features and architectural features, data regarding functional requirements associated with rooms, and equipment associated with rooms, or any combination thereof and of additional possible information.

In some embodiments, the rule may be applied in a manner that associates a functional requirement of the rule with a space in a graphical representation of the floor plan. For example, associating a rule with a space in a graphical representation may include overlaying a symbol or other visual indicator corresponding to the rule over the floor plan within the boundaries of the corresponding demarcated space. Or, for example, hatching, color-coding, or other graphical indicators may be overlaid on spaces within a floor plan, and a graphical key may be presented to the viewer. In some embodiments, a rule or functional requirement may be associated with a group of spaces. In some embodiments, the group of spaces may be associated with the semantic designation. For example, a rule may be associated with a group of four staircases within a floor plan, based on the semantic designation of "staircase."

In some embodiments, associating a rule with a space may include applying the rule to space. For example, a rule may be identified to "if a space is a bedroom, then place at least one window in the space." Accordingly, when the rule is associated with a space with the semantic designation bedroom and the space does not include a window, a window may be automatically placed in the space.

In some embodiments, the method may include providing a prompt querying acceptance or denial of an application of the function requirement to individual spaces of the plurality of spaces by a user. For example, a functional requirement (Function "X") may be a applied to set of rooms with a certain function. But a room within the set may have originally had a designation of Function "Y" before the semantic enrichment process. A prompt can alert the user to accept this change or override the change. The prompt can be in the form of a pop-up, a modal, or the suitable interface item, and may be textual. For example, a prompt may ask: "Room A originally had Function Y, are you sure you want to apply the functional requirement associated with Function X?" A prompt may also be graphical, for example a space may be shown as a certain color, the color indicating acceptance is required. Other types of graphical prompts are also possible.

Disclosed embodiments may also include generatively analyzing the plurality of spaces to determine an equipment placement location for individual spaces of the plurality of spaces that at least partially conform to the functional requirement. In some embodiments generatively analyzing the room may include generating a series of simulations. For example, generatively analyzing technical specifications may include running some combination of a weighted cost function, image analysis, geometric analysis, semantic analysis, floor plan analysis, topology analysis, BIM analysis, rule based design, statistical analysis, optimization, or any other data analysis as disclosed herein. The series of simulations may be run iteratively until a solution conforms to one or more functional requirements, for example. Simulations may be associated with scores reflecting a degree of conformance to functional requirements, and generative analysis may be performed until a simulation score reaches a predetermined threshold. The series of simulations may be generated based on user input indicating a number of simulations, a desired simulation performance score, or other parameter of the simulations. In some embodiments, user input may terminate an ongoing series of simulations.

A generative analysis may not always include an optimization and may include a calculation or more concrete analysis. In some embodiments the generative analysis may apply a rule-based functional requirement for selecting and placing equipment. In this context, a rule may include any logical relationship defining a functional requirement or how a functional requirement should be applied. For example, the generative analysis may include placing a chair next to all desks or workstations corridor, inserting a door in all openings of a certain size, placing a piece of equipment where there is at least a certain tolerance of space (e.g. 10 cm on either of the equipment), placing a valve adjacent to all fan-coil units, spacing equipment at specified distances with a specified overlap, or various other forms of analysis that may be defined by a functional requirement. In some embodiments, the rule may be a logical construct of the type "if A then B" used to create a cause and effect relationship in the computational design process just like plain human language would. For example, the rule may state "if a room has a urinal it is a toilet," or any other logical relationship. For example, a rule may be identified that requires each "office" within a floor plan to include at least one air vent at least three feet from a door or window. When such a rule is applied to one office within the floor plan, the remainder of the spaces within the floor plan may generatively analyzed to determine a placement for air vents within the other "offices" of the floor plan that complies with the rule. In some embodiments, the rule may include including negative limitations, such as "don't place a camera with a field of view encompassing a toilet stall" or composite limitations, such as "place a camera on every door that leads to a stairway and is numbered 3." In some embodiments, the construct of the rule may reference or use architectural features, technical specifications, equipment as inputs such as, for example, "in room areas greater than 100 square feet, provide sounders with a minimum decibel rating of 88 DB" "if rooms has a functional requirement for access control devices and if the room has a plurality of doors, cover the door leading to a corridor with a sensor," "if a room has fan-coil unit, then place a thermostat with a preference for a placement location adjacent to other controllers. "if a room has an occupancy greater than 10 people, then cover work stations with occupancy sensors," and "if a room has a lux level above 400, then connect its lighting fixtures to a dimming system." In some embodiments, generatively analyzing may include machine learning models trained to predict device selection and placement based on inputs such as functional requirements and room architectural feature. For example, an equipment location can be predicted using a trained machine learning model such as a Convolutional Neural Network. The model may be trained on a data set containing embedded vectors which represents simulation requirements and room's geometry, and their related device locations. Following the prediction, a simulation may be conducted to determine a more precise technical specification or model identifier. On every new simulation result or at set thresholds of new inputs the model, which may be stored in the cloud, may be retrained to improve accuracy. Selection of technical specifications such as model identifiers may also be made via a trained machine learning model such as a Convolutional Neural Network. The model may be trained on a data set containing embedded vectors representing room's geometry and equipment positions, with their embedded equipment technical characteristic data, and predict a new vector of equipment technical characteristic. In such a case, the predicted device may be generic type with technical characteristics and without a model identifier. Another algorithm may then be responsible to select the closest model in the catalog. On every new simulation result the model may be retrained to improve its accuracy.

In some embodiments, the semantic enrichment process and/or the generative analyzing process may be computed on a cloud-based servers, cloud-based system or interface or retrieved from a cloud-based interface. A cloud-based interface may be any user interface allowing a user to download, upload, or otherwise interact with data stored in remote servers. In some embodiments, the remote servers may be managed by a hosting company, such as IBM® Cloud, Amazon® Web Services, or similar online storage platforms. More generally, cloud-based may refer to applications, services, or resources made available to users on demand via the internet from a cloud computing provider's servers. Cloud-based computing can increase capacity, enhance functionality, or add additional services on demand at reduced infrastructure and labor costs. Cloud based services may be used to allow complex, computationally expensive algorithms to be accessed by users directly through their browsers without the need to download software to their personal computers. In some embodiments, machine learning models such as one or more ResNet models trained to classify architectural features or classifications model such as XGBoost trained to predict room functions, may be stored, for example, in cloud based file hosting services (such as Amazon S3, Azure Blob storage, Google cloud storage, DigitalOcean spaces, etc.). The model, for example, may be fetched and loaded into memory (RAM) by microservices during their initialization. Once loaded into RAM, the microservices may able to receive requests in the form of messages (such as synchronous HTTP messages; asynchronous messages via message broking software/services such as Amazon SQS, RabbitMQ, KafkaMQ, ZeroMQ; persistent connection such as websockets or raw TCP sockets, or raw non-persistent packets via the UDP protocol, etc.). Once a request is received, the service may, for example, invoke the model with the payload of the message (such as bitmaps, text, or other appropriate data structures the model was trained with), and receive a result (with a data structure that is based on the type of model) in return. The service may then respond, for example, with the generated machine learning model result.

In some embodiments, a series of simulations or an optimization process may be run on the cloud. A cloud based optimization may be, for example, based on orchestration of one or many microservices that execute an algorithm. For example, an orchestrating service may receive the locations of resources, or the actual resources in either raw binary or human-readable data structure, as well as any other parameters and metadata that may be required for the book keeping (e.g. in a database, in-memory cache service, or file storage services). The orchestrating service then may, for example, preprocess the resources and parameters, and generate permutations that may be dispatched (by either synchronous or asynchornous messaging schemes, often depending on the expected runtime duration of the algorithm) to worker microservices that may be responsible for the actual execution of the optimization algorithm. There may also be additional intermediate steps, for example, between the main algorithm orchestrator and the worker microservices. Upon completion of the optimization algorithm, the microservices may dispatch, for example, a mirroring message that signifies the completion of the algorithm. Artifacts and intermediate results may be kept in in-memory caching services (such as Redis) or in file storage services (such as Amazon S3) for example. The orchestrator or the intermediate orchestrating services may then, for example, postprocess the results (and any of the aforementioned intermediate artifacts and results of the process) of the optimization algorithm, and may choose, for example, to dispatch additional requests based on the nature and performance of the results. After all expected results are received in the algorithm orchestrator, a message may dispatched back, for example, notifying the optimization process is complete, accompanied by either the results (or the locations of the results in file storage services/databases), as well as any other relevant artifacts and intermediate results generated in the process.

FIG. 10A is a depiction of exemplary floor plans showing changing of semantic designations, consistent with disclosed embodiments. As described herein, semantic enrichment may be used to change existing semantic designations of a floor plan. The disclosed system may access a floor plan 1000. The floor plan may include a plurality of demarcated spaces 1003-1013. One or more of the spaces may include an existing designation. For example, space 1003 includes the existing designation of "secretary's office." Similarly, space 1009 includes the existing designation of "chairman's office." As described herein, semantic enrichment may be performed on these spaces to determine new semantic designations for the spaces. Once the new semantic designations are determined, floor plan 1000 may be enriched to by associating spaces of floor plan 1000 with the new semantic designations. In enriched floor plan 1001, the new semantic designations 1017-1029, are shown as overlaid on the floor plan. Spaces 1003 and 1009 of original floor plan 1000 may both have the new semantic designation of "office" in enriched floor plan 1001. The new semantic designations 1017 and 1023 of "office" may have been determined at least in part by the previous designation of "secretary's office" and "chairman's office."

Similarly, spaces 1010 and 1013 of original floor plan 1000 include prior existing semantic designations of "sit out" and "resting room." Space 1010 may be assigned the new designation of "balcony" 1025, at least in part because of the previous designation of "sit out" and the fact that the space is at least partially exposed to the outside exterior of the building represented by the floor plan. This exposure to the exterior may be indicated by the difference in the depiction of the boundaries within the floor plan. Space 1013 may be assigned the new designation of "bedroom" 1027, at least in part because of the previous designation of "resting room." Space 1013 may also be identified as "bedroom" because the space includes a piece of furniture that may be identified as a bed.

In original floor plan 1000, spaces 1005 and 1006 include an overlapping existing designation of "toilet." Semantic enrichment may result in each of spaces 1005 and 1006 receiving their own distinct semantic designation of "toilet" as shown in enriched floor plan 1001 by spaces 1019 and 1020.

Space 1015 illustrates an illegible or incoherent semantic designation. Accordingly, semantic enrichment techniques as disclosed herein may be used to identify the space as including stairs and give it the semantic designation 1029 of "staircase" in enriched floor plan 1001.

FIG. 10B is a depiction of exemplary floor plans showing semantic enrichment of furniture, consistent with disclosed embodiments. As described herein, semantic enrichment may be used to add semantic designations to furniture within a floor plan. The disclosed system may access a floor plan 1030. The floor plan may include a plurality of demarcated spaces. The spaces may include one or pieces of furniture 1031-1039. The system may perform semantic enrichment on floor plan 1030 to add semantic designations to the furniture within each space.

For example, a thin rectangular boundary 1031 within a wall may be identified. A semantic enrichment algorithm may determine that the boundary 1031 should be given the semantic designation of "window" 1041, for example, based on its shape and location within the floor plan. Similarly, item 1033 may be given the semantic designation of door 1043, for example, because it is an opening within a wall and includes a visual indicator of a door swing direction.

Piece of furniture 1035 may be given the semantic designation of "chair" 1045, for example, because it is in close proximity to other similar pieces of furniture, near another piece of furniture that may be designated as a "desk," or within a room with a designation related to "office." Piece of furniture 1037 may be given the semantic designation of "stairs" 1047, for example, because of its unique geometry. Piece of furniture 1039 may be given the semantic designation of "bed" 1045, for example, because it is in close proximity to other similar pieces of furniture, near another piece of furniture that may be designated as a "desk," or within a room with a designation related to "office."

As depicted in enriched floor plan 1040, associating a semantic designation with a piece of furniture may include placing the text of the semantic designation on or near the symbol for the piece of furniture. Associating a semantic designation with a piece of furniture may also include placing a box around the furniture symbol (or other type of visual indicator) to help differentiate between pieces of furniture and illustrate which piece of furniture is associated with the semantic designation.

FIG. 10C is a depiction of exemplary floor plans showing addition of semantic designations, consistent with disclosed embodiments. As described herein, semantic enrichment may be used to add new semantic designations to a floor plan, where semantic designations did not previously exist. The disclosed system may access a floor plan 1050. The floor plan may include a plurality of demarcated spaces 1049-1055 that do not have any preexisting semantic designations on the floor plan. As described herein, semantic enrichment may be performed on these spaces to determine new semantic designations for the spaces. Once the new semantic designations are determined, floor plan 1050 may be enriched by associating spaces of floor plan 1050 with the new semantic designations to generate enriched floor plan 1060. In enriched floor plan 1060, the new semantic designations 1057-1063, are shown as overlaid on the floor plan. Space 1049 may be given the new semantic designation of "office" in enriched floor plan 1060. The new semantic designation 1057 of "office" may have been determined, for example in part by the shape of the room and furniture present within the room. Similarly, space 1051 may be given the new semantic designation of "corridor" 1059 because of it's long narrow shape and because it is bound by a door on each end. The new semantic designation of "corridor" 1059 may also be based in part on the lack of furniture within the space 1051.

Space 1053 may be given the new semantic designation of "toilet" in enriched floor plan 1060. The new semantic designation 1061 of "toilet" may be determined, for example in part by presence of a toilet and a sink within space 1053. Space 1055 may be assigned the new semantic designation of "balcony" 1063, for example, because space 1055 is at least partially exposed to the outside exterior of the building represented by the floor plan. This exposure to the exterior may be indicated by the difference in the depiction of the boundaries 1065 and 1067 within the floor plan. The new semantic designation of "balcony" may also be based on the presence of a combination of furniture including a table, chairs, and an umbrella. The presence of the umbrella located above or near a table may further indicate that the space 1055 is exterior to the building depicted by the floor plan.

Figure 10D:
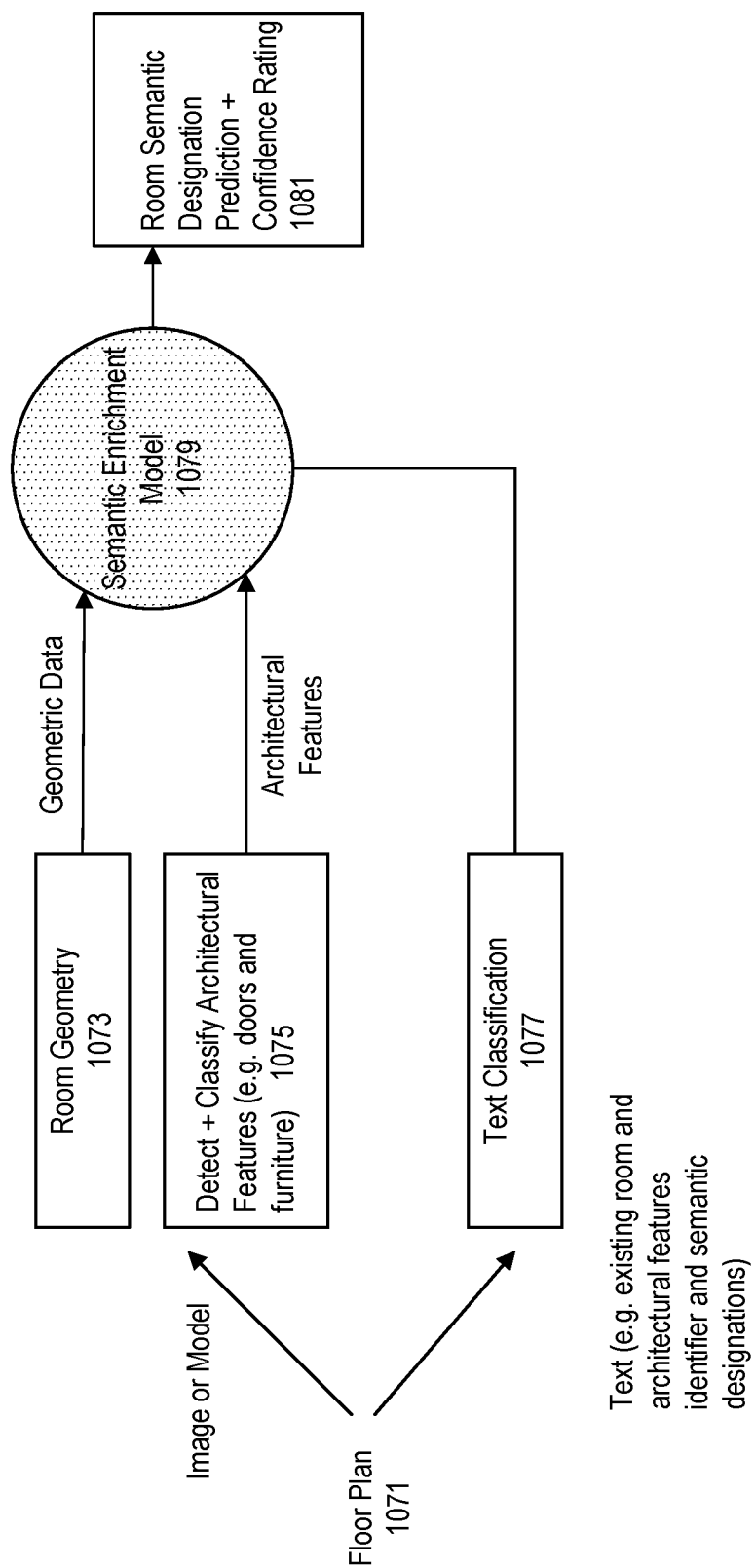
FIG. 10D is a block diagram representing an exemplary semantic enrichment process, consistent with disclosed embodiments.

FIG. 10D is a block diagram representing an exemplary semantic enrichment process, consistent with disclosed embodiments. As described herein semantic enrichment may be conducted on a floor plan 1071. Semantic enrichment may start by implement one or more classification or analysis algorithms, such as Room Geometry analysis or a semantic analysis which extracts geometrical data 1073, detection and classification of architectural features analysis 1075 which may involve one or more machine learning models, geometric analysis or semantic analysis or any combination thereof, text classification analysis 1077 which may consider existing semantic designations such as existing names, descriptions, classifications, tags and other textual metadata associated with rooms, architectural features, furniture and equipment. In some embodiments, analysis algorithms may be configured to analyze an image or model of a floor plan. For example, geometric analysis, topological analysis, image analysis, or other types of floor plan analysis as described herein may be performed on the floor plan 1071 to generate information about room or space geometry 1073. Space geometry information may include the shapes, relative sizes, relative locations, and other geometric information as described herein. As another example, geometric analysis, topological analysis, image analysis, machine learning methods, or other types of floor plan analysis as described herein may be performed on the floor plan to detect and classify architectural features 1075 of spaces within the floor plan.

In some embodiments, text analysis, for example semantic analysis, natural language processing, or other text-based analyses as described herein, may be performed on the floor plan. These analyses may be used to identify existing semantic designations, labels, descriptions, or other text on a floor plan related to spaces of the floor plan.

Once a floor plan has been analyzed, the resulting space data (including but not limited to geometric data, architectural feature data, and textual data) may be input into a semantic enrichment model 1079. As described herein, a semantic enrichment model may be a computational model, artificial intelligence model, or other model configured to receive floor plan data as input and output semantic designations for spaces within the floor plan. In some embodiments, the semantic enrichment model 1079 may also output a Room Semantic Designation 1081 and perhaps a Confidence Rating, as described herein.

Figure 10E:
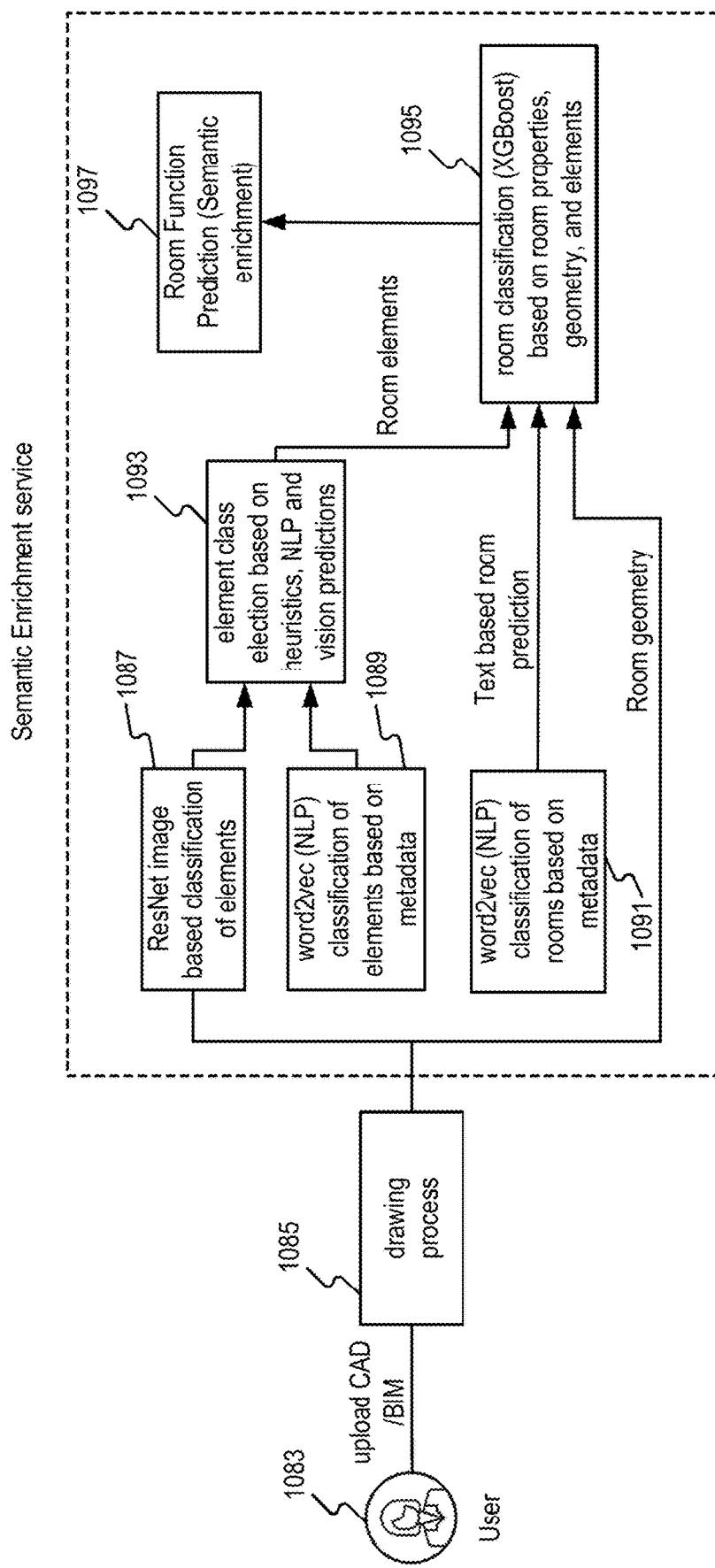
FIG. 10E is a block diagram representing an exemplary semantic enrichment process, consistent with disclosed embodiments.

FIG. 10E is a block diagram representing an exemplary semantic enrichment process, consistent with disclosed embodiments. FIG. 10E is presented by way of example only and is not intended to be limiting of the disclosure. For example, although the algorithms depicted in the block diagram are referred to as "classification algorithms" below, as disclosed herein, other types of algorithms may be used. As described herein, the semantic enrichment process may include accessing a floor plan. As illustrated in FIG. 10E, accessing may include a user 1083 uploading a floor plan file. This file may be CAD file, PDF file, BIM file or image file. In some embodiments, the file may be uploaded to a cloud-based interface. In other embodiments, it may be opened using software installed on a local computer or an app on a portable device such as phone or tablet. The floor plan file may be uploaded to, for example, a computer, server, or cloud computing service to perform the semantic enrichment process.

Once the file is uploaded, a floor plan analysis 1085 may be initiated. The drawing process may include using geometric analysis, semantic analysis, image analysis, topological analysis, and/or machine learning methods. In some embodiments, the processing may be used to identify room contours, as described above. In other embodiments, drawing process 1085 may extract room geometry such as areas, volumes, room bounding ratio (length/width of bounding box), room triangles, standard deviation of Delaunay triangulation, room bounding width, room bounding length, or any other forms of geometries. In other embodiments, the processing may be to rectify modeling errors in a BIM file such as columns or walls that are not bound with a room.

An analysis of the floor plan may be conducted to identify spaces in the floor plan and elements, geometry, and text associated with the spaces. As described herein, the analysis may be conducted in a variety of ways and may result in variety of types of data, including geometric data (including the shapes, relative sizes, relative locations, and other information related to floor plan or space geometry), textual data (including any existing semantic designations, labels, or other text on a floor plan related to spaces of the floor plan), and image data (including an image of the floor plan, one or more images of portions of the floor plan, symbols of the floor plan, and other data related to visual presentation of the floor plan). Each these types of data may serve as input to one or more algorithms or models to perform semantic enrichment. In some embodiments, multiple algorithms or models may be used in the semantic enrichment process to arrive at a final semantic designation for a space.

In some embodiments, image and text data may be used to classify elements of spaces within the floor plan, such as architectural features and furniture. Image data may be input into image classification algorithm 1087 configured to classify elements of the images that are fed into the algorithm. Image classification algorithm 1087 may be an artificial neural network, such as a residual neural network (ResNet). A ResNet, for example, may be trained to classify furniture and/or equipment based on furniture and/equipment symbols within an image of floor plan or images associated with the metadata of BIM objects. As an illustrative example, floor plan pictures may be sent for machine learning inferring via HTTP requests to a service that hosts a deep learning model (RetinaNet) for furniture and equipment detection and labeling. The service may receive the pictures, execute the model, and send back the results in CSV format, consisting of the inferred furniture and equipment. The results may include their type (label), the geometry of the bounding boxes surrounding the furniture and equipment, as well as confidence rating of the prediction. The machine learning generated CSV furniture bounding boxes may be associated and matched with BMD furniture and equipment based on IOU (intersection over union).

Similarly, text data related to elements of spaces, such as architectural features and furniture, may be input into text classification algorithm 1089. Text classification algorithm 1089 may be a machine learning algorithm, such a natural language processing (NLP) algorithm (e.g., word2vec or others). As described herein a machine learning algorithm may be configured to classify a room element based on the text associated with it. For example, a classify a data input with a "mattress" label as a "bed" label because of a learned association between "mattress" and "bed." In some embodiments, the machine learning algorithm may be configured to classify incomplete or incorrect text, as described above.

In some embodiments, the outputs of both the image classification algorithm 1087 and text classification 1089 may be provided together as input into classification algorithm 1093. Classification algorithm 1093 may be any of a variety of suitable classification, machine learning, artificial intelligence methods, or other suitable algorithms disclosed herein. Algorithm 1093 may provide classification for elements associated with a space based on both the prior image and textual classifications. For example, image classification algorithm 1087 may classify an element as a "couch" based on the image or symbol of the element in the floor plan. However, textual classification algorithm 1089 may classify the same element as a "sectional," based on the text associated with the element. Both of these classifications may then be input into classification algorithm 1093, which may ultimately classify the element as a "sofa," based on the prior classifications of "couch" and "sectional." In some embodiments, classification algorithm 1093 may include electing furniture and equipment types by comparing NLP confidence ratings with deep learning confidence ratings. This process may be executed by a Semantic enrichment service: the service may be an orchestrator of other 2 services making up the entire flow of enriching an image PDF, CAD, BIM file RVT derived BMD dervied BMD file with room functions and/or classifying furniture and equipment according to semantic designations.

Other text data related to a space as whole, but not necessarily to a specific element of the space, may be input into text classification algorithm 1091. This may include room metadata including existing names, descriptions, labels and tags. Text classification algorithm 1091 may be machine learning algorithm, such a natural language processing (NLP) algorithm. For example, a text data input may include a floor plan room label of "Bob's sleeping quarters." The NLP algorithm may classify this label as a "bedroom" label because of a learned association between "sleeping quarters" and "bedroom." As another example, a group whose metadata includes "Multi-Person Work Area" is likely to be inferred as "Open Space Office," and may also receive a higher confidence rating.

Resulting element classifications and space classifications based on text, as well as geometric data or other data associated with a space of a floor plan, may be input into room classification algorithm 1095 to produce an ultimate classification for the room and a corresponding semantic designation. Classification algorithm 1095 may be a computational model, artificial intelligence model, or other model configured to receive floor plan data as input and output semantic designations for spaces within the floor plan. In some embodiments, classification algorithm 1095 may be a decision tree, such as XGBoost, or another classification algorithm. As described above, classification algorithm 1095 may also output a confidence rating. In some embodiments, another type of classification algorithm may be used. In some embodiments, a different machine learning method may be used. Many other artificial intelligence models, networks and algorithms may be used to predict room function. A Convolutional Neural Network, for example, may determine a semantic designation for a room using an image of the room including its architectural features as an input in the model. In some embodiments, an ensemble of a plurality of different models may be used. In some embodiments, the input types may vary. For example, some embodiments may not use text classification or furniture classifications as inputs.

Various other services may be provided a part of the semantic enrichment service. In some embodiments, this may include a furniture and equipment classification service, that hosts a RetinaNet based deep learning model, and receives inferring requests via HTTP messages consisting of bitmap images. The service may returns tabular information in CSV format, where each row consist of a inferred furniture and equipment label (e.g. "chair," "light switch"), the geometry of the bounding box surrounding the furniture and/or equipment, and confidence rating (from 0 to 1).

In some embodiments, this may include a room function classification service, that hosts an XGBoost classifier model. The service may receive requests via HTTP messages consisting of the model's architectural features (room properties such as area, perimeter length, number of doors, adjacent rooms, connected rooms, and number of occurrences of each furniture type within the room). The model may have been trained using a training set consisting of such architectural features for a given set of rooms and labelled semantic designations such room function from the set of rooms. The trained model may attempt to classify room functions based on the aforementioned features, e.g. a small room with a sink and a toilet should be inferred as a bathroom.

Additionally, the enrichment service may host an NLP model (word2vec) that may be used for inferring furniture and/or equipment metadata text (such as name and description) as an equipment or furniture type. For example, "Sink 120×70 White/Gray" may be inferred as "Sink". Upon instantiation, the service may subscribe to a dedicated SQS RVT derived BMD enrichment request queue. When a message is sent to the aforementioned request queue, the service may receive it via SQS message broker. The request message may contain all resources and information required to execute the enrichment flow. For example, the message may include the S3 folder path to the BMD file; the S3 folder path to the floor plans pictures of the accessed floor plan (image, CAD, PDF or BIM file) drawing, as previously generated as part of the image or CAD or PDF or RVT to BMD translation flow; the S3 folder path to a JSON file, consisting of the properties of the floor plans picture, such as the relative dimensions of the floor plans; or similar information. This information may be used to associate BMD geometry with the floor plan pictures. A process similar to the one described above may be used to add semantic designations and/or classifications to architectural features, furniture and equipment.

Classification algorithm 1095 may receive as input the room elements and text based room prediction from classification algorithms 1093 and 1091. It may also receive as an input data identifying room geometry, which may have been collected during a drawing process 1085 of the floor plan. Based on this input data, classification algorithm may generate a classification for the room. Based on the classification, a room function or semantic designation 1097 associated with the classification may be identified.

Figure 11:
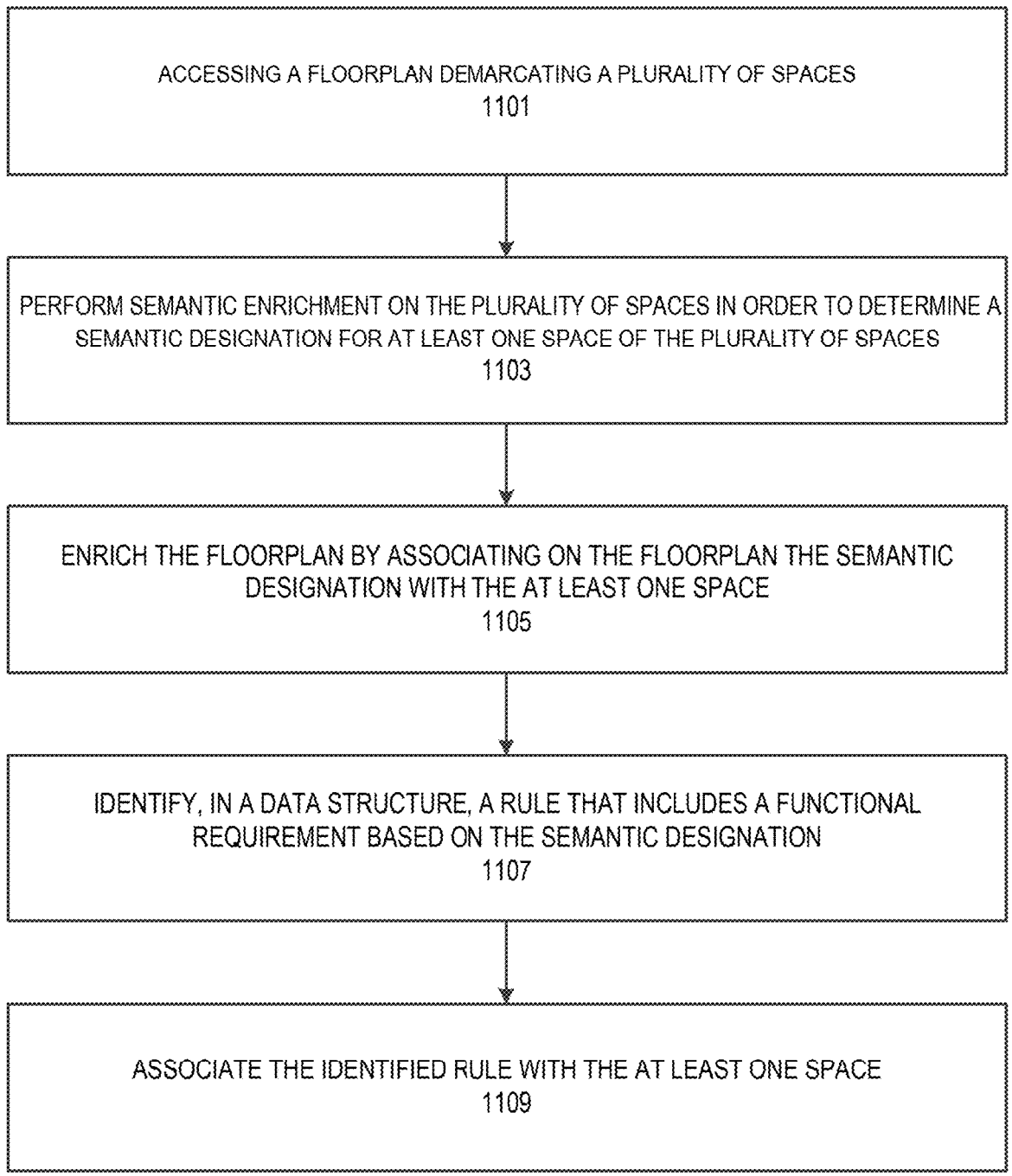
FIG. 11 is a flowchart illustrating an exemplary process for rule-based application of functional requirements to spaces in a floor plan, consistent with disclosed embodiments.

FIG. 11 is a flowchart illustrating an exemplary process for rule-based application of functional requirements to spaces in a floor plan, consistent with disclosed embodiments. Process 1100 may be performed by a processing device, such as any of the processors described throughout the present disclosure. It is to be understood that throughout the present disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 1100. Process 1100 is not necessarily limited to the steps shown in FIG. 11 and any steps or processes of the various embodiments described throughout the present disclosure may also be included in process 1100.

At step 1101, process 1100 may include accessing a floor plan demarcating a plurality of spaces. As described herein, floor plans may be accessed in a variety of formats and may include other information associated with the spaces within the floor plan. A floor plan may be accessed in a variety of ways including from a network location, a cloud storage, local storage, or other types of access as described herein. In some embodiments, floor plans may include or reference furniture or other architectural features. In some embodiments, step 1101 may include performing a floor plan analysis on the floor plan to identify contours of a plurality of demarcated spaces of the floor plan.

At step 1103, process 1100 may include performing semantic enrichment on the plurality of spaces in order to determine a semantic designation for at least one space of the plurality of spaces. In some embodiments, step 1103 may include performing a semantic analysis, geometric analysis, topological analysis, image analysis, or other type of analysis as described herein on the floor plan to generate floor plan data for input into a semantic enrichment algorithm. As described herein such floor plan data may include demarcations, tags, labels, architectural features, furniture, and other relevant features of the floor plan.

In some embodiments, step 1103 may include applying a semantic enrichment algorithm or model (e.g., an artificial intelligence method, computational algorithm, or other suitable model) to determine one or more semantic designations for spaces of the floor plan based on the analysis and any determined features. As described herein, in some embodiments, semantic enrichment may be performed using multiple types of analysis or multiple computational algorithms. In some embodiments, step 1103 may include determining a confidence rating for a semantic designation, as described above.

At step 1105, process 1100 may include enriching the floor plan by associating on the floor plan the semantic designation with the at least one space. As described herein, associating a semantic designation with a space may be performed in several ways. In some embodiments, associating on the floor plan a semantic designation with a space may include overlaying the semantic designation over the floor plan within the boundaries of the corresponding demarcated space. In some embodiments, a semantic designation may not necessarily be placed over a floor plan within the boundary of a space, but may be linked to a space in other manners such as using lines, colors, shapes, or other suitable indicators. In some embodiments, step 1105 may include enriching a floor plan by associating a semantic designation with an architectural feature. In some embodiments, step 1105 may include adding a semantic designation to a zone associated with a space, as described above. Additionally, or alternatively, semantic enrichment may occur at a metadata level.

At step 1107, process 1100 may include identifying, in a data structure, a rule that includes a functional requirement based on the semantic designation. As described herein, a rule may be identified in a data structure by querying the data structure. For example, a data structure may be configured to return all stored rules associated with a certain semantic designation when the semantic designation is entered as a query to the structure. Additional details regarding rules and functional requirements are provided above.

At step 1109, process 1100 may include associating the identified rule with the at least one space. For example, as described herein, associating may include creating a logical pair from two entities of different types, such as, in this case a rule and a space. In some embodiments, the pairing might take the form of an on-screen representation or a logical pairing within an internal database or code. For example, a stored table may contain a list of identified rules and associated spaces. In some embodiments, step 1109 may include applying the identified rule to one or more spaces of the floor plan. For example, a rule may specify that at least one light switch must be within 2 feet of every door in spaces with the semantic designation of "bedroom." Accordingly, applying the rule may include adding light switches near doors in the floor plan with spaces having the semantic designation of "bedroom." In some embodiments, the rule may be applied in a manner that associates a functional requirement of the rule with a space in a graphical representation of the floor plan. In some embodiments, step 1109 may include providing a prompt querying acceptance or denial of an application of the function requirement to individual spaces of the plurality of spaces by a user. According to disclosed embodiments, step 1109 may include generatively analyzing the plurality of spaces to determine an equipment placement location for individual spaces of the plurality of spaces that at least partially conforms to the functional requirement.

Aspects of this disclosure may relate to systems, methods and computer readable media for customizing equipment for use in buildings based on floor plans. Installers of customized equipment face challenges in determining the appropriate equipment for installation in each room, locations to install the equipment, and configurations of the customizable equipment. These problems may compound for large scale (i.e., mass) customization of dozens, hundreds, or even thousands of rooms in floor plan. Embodiments may include using automated analysis to customize equipment and equipment locations on a large scale, and to generate and provide information to manufactures and/or installers to facilitate installation. This may include generating and applying labels to equipment. Further, this may include using simulations to automatically generate customized settings and placement location for equipment on a room-by-room basis (or similar basis) within a floor plan. This information, which may include a room identifier, may be sent to a manufacturer. In turn, the manufacturer may customize the product in a factory before shipping, which may include presetting a product according to the customized settings, and packaging the product with a room identifier or other information.

For ease of discussion, a method is described below, with the understanding that aspects of the method apply equally to systems, devices, and computer readable media. For example, some aspects of such a method may occur electronically over a network that is either wired, wireless, or both. Other aspects of such a method may occur using non-electronic means. In a broadest sense, the method is not limited to particular physical and/or electronic instrumentalities, but rather may be accomplished using many differing instrumentalities.

Disclosed embodiments may involve accessing a floor plan. As described above, the floor plan may include a graphic representation of a horizontal section of a building, which may include an interior of the building, an exterior of the building, or both. The floor plan may be represented in any suitable format, including a hand-drawn or scanned image, a vector-based format (e.g., CAD, PDF, DWG, SVG, or other 2D drawing formats), an image format (e.g., BMP, JPG, PNG, or similar image files), a 3D models, a building information model ("BIM") format, or any other graphical or digital format. For example, accessing the floor plan may include accessing a CAD file or BIM file demarcating the boundaries (sometimes referred to as contours) of the plurality of rooms.

In some embodiments, the borders or contours of a room may not initially be demarcated in the floor plan in a machine readable format. In this way, a floor plan may be imported in a format that lacks semantic designations or other indicators of room contours, and the disclosed embodiments may include processes to automatically add such contours. In a CAD or PDF floor plan, for example, the data structure representing the geometry used to symbolize or represent rooms including their walls, doors and other architectural feature many not contain any machine readable metadata or semantic designations identifying them as such and may only contain the actual points that make up the geometry. For example, there may be 4 points that constitute a rectangle, but without any semantical information relating to the function of the rectangle. In such files, the data structure may include a list of points (e.g. [(0,0), (2,2), . . . ]), rather than a list of points structured with associated metadata or a semantic designation, e.g., [{name: line 0, type: wall, points: [(0, 0), (2, 2)]]. In some cases, a set of points or lines in a file may be grouped together in a layer which may be associated with a name or other metadata. However, this metadata may be unstructured and not conform to a standard, convention, classification and/or semantic designation. A layer, for example, containing lines representing walls may be named "A3-1." In an image file, the representations of room contours may only be pixels without any associated metadata or semantic designation. In some cases, room demarcations in BIM file such as walls, windows and doors may not be bound and/or associated with a room. This may be the result, for example, of a user error during the creation of the BIM model or an issue with a BIM object. In some cases, in a BIM floor plan, the exact contours of the room boundaries may be absent or may have not been stored in a data structure or may not have been stored in a manner such that the demarcations can be accessed without user intervention, such as manually identifying the demarcations and/or using another tool or command to identify the demarcations.

Accordingly, accessing the floorplan demarcating contours of a room may include performing additional processing on the floor plan to demarcate the contours of the room. This may include image processing, geometric analysis, semantic analysis, machine learning methods, or any other analysis or processing techniques that may allow the system to identify the contours of a room.

The floor plan can be accessed in a variety of ways. In some embodiments, the floor plan may be retrieved from a network location, such as a network drive, a cloud-based platform, a remote server, or other forms of network storage locations. The floor plan may also be accessed from local storage, such as a local memory device associated with the processor performing the disclosed methods. In other embodiments, the floor plan may be uploaded by a user, for example, through a user interface. Additional details regarding floor plans and the accessing of floor plans are described throughout the present disclosure.

Figure 12A:
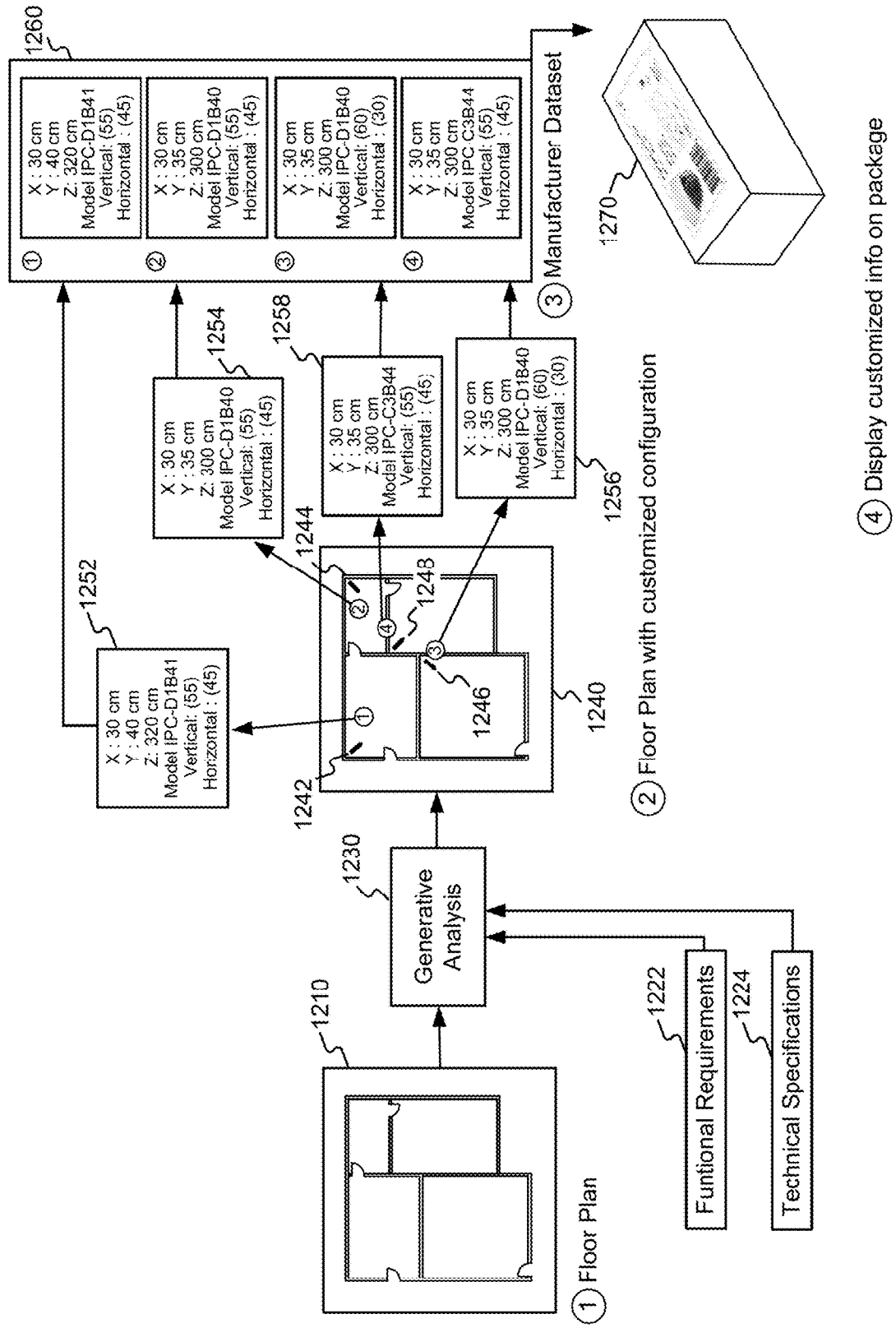
FIG. 12A is a block diagram illustrating an example process for mass customization of equipment, consistent with the disclosed embodiments.

FIG. 12A is a block diagram illustrating an example process for mass customization of equipment, consistent with the disclosed embodiments. As shown in step 1, the mass customization process may include accessing floor plan 1210. Floor plan 1210 may include a plurality of rooms as illustrated in FIG. 12A.

Disclosed embodiments may further include accessing functional requirements associated with the plurality of rooms. As described above, the functional requirements may define expected or required performance parameters for a system. The functional requirements may be specific to a particular room within a floor plan, or may apply to multiple rooms, such as a cluster of rooms, an area or zone within the floor plan, a group of rooms having a particular room type, a particular floor, a particular building, or any other basis for applying the functional requirement to a floor plan. Accordingly, each room within a floor plan may have a different set of functional requirements that apply. In some embodiments, at least two different functional requirements may be associated with the plurality of rooms. These different functional requirements may be of the same type, or may be of different functional requirement types, as described in greater detail above. The functional requirements may be represented in the accessed floor plan (e.g., through color indicators, textual information, symbology, patterns, or any other means of graphical representation), or may be stored in a separate data structure configured to associate the functional requirements with one or more floor plans, rooms, areas, zones, or buildings.

In some embodiments, the functional requirements may be adaptive. In other words, the requirements may according to the context of the equipment with which it is associated. Examples of adaptive technical specifications may include "include IR illumination of a certain level with all outdoor cameras unless there is adjacent light source, in which case do nothing" or "place a ventilation system with a certain ventilation, unless the area is a kitchen in which use a higher ventilation rate." In some embodiments, the technical specifications may also be adaptive. For example, technical specifications may be adaptive according to the context of the functional requirement, technical specifications of other pieces of equipment, based on the room, the room function, area, zone, or building, or any other variables. Examples may include the selection of a waterproof power socket and/or a waterproof cover for a power socket in a bathroom or a wet area, electrical enclosures of a certain size based on the number of breakers required to be housed inside of it, a thermostat with programmable features suitable for a hotel guestroom, a distribution electrical panel with characteristics compatible with the main distribution panel inside a building, or an access point with a higher number of concurrent users based on its placement inside a room with a room function of multi-occupant office as opposed to single person office room function. The technical specifications may also be adaptive based on a geographic location of the building represented in the floor plan. In other words, technical specification may change according to the location simulated. For example, a power socket type, a voltage requirement, or applicable code or standard may change depending on the country in which the equipment is located. Accordingly, the technical specification may include a data structure or other data format linking a plurality of geographic locations to a respective set of technical parameters.

As shown in FIG. 12A, this may include accessing functional requirements 1222. Functional requirements 1222 may include functional requirements that apply to all rooms within floor plan 1210, or may include functional requirements that apply to individual rooms or groups of rooms (e.g., areas, zones, etc.) of floor plan 1210. In the example shown in FIG. 12A, functional requirements 1222 may relate to placement of one or more cameras within floor plan 1210. For example, the functional requirements may relate to pixel density, coverage requirements, camera functions (e.g., monitoring, identification, recognition, etc.), or any other performance parameters that may relate to a camera device.

Embodiments of the present disclosure may further include accessing technical specifications associated with the functional requirements. As described above, the technical specification for a piece of equipment may refer to any means of identifying the equipment. The technical specification may include a model identifier, an equipment class, technical characteristics of the equipment, or any other means for specifying a piece of equipment. Additional details regarding technical specifications are provided throughout the present disclosure. In some embodiments, the technical specifications may be included in or otherwise defined according to the functional requirements. For example, the functional requirement may specify a particular model or technical characteristic or the equipment to be placed within a floor plan. In some embodiments, the functional requirement may specify a performance parameter, that may define the technical specification. For example, the functional requirement may define a network connection speed, and the technical specification may identify equipment, such as a wireless router, that satisfies the network connection speed. In some embodiments, the association of a technical specification with a functional requirement may constrain the search space for a generative analyzing process. For example, the technical specification of specific series of sensors which may have a certain range of lens rotation of view may limit the range of lens rotations simulations during an optimization process. As another example, the technical specification of specific series of Bluetooth beacons which may only be wall-mountable may limit the sampling points during an optimization process to those points along the walls.

The technical specifications may be accessed in a variety of ways. In some examples, the technical specifications may be stored in a database or other storage location. The technical specifications may be associated with functional requirements in a data structure, and accessing the technical specifications may include determining which technical specifications are applicable according to the data structure. The technical specifications may be accessed over a network connection, for example, by accessing a remote server, a separate computing device, a cloud-based storage platform, or any other remote storage location. In other embodiments, the technical specification may be stored locally, for example, in a local memory, a flash drive, in a transient memory device, or the like. In some embodiments, the technical specifications may be input by a user. For example, a user may define equipment to be used in one or more rooms or areas through a user interface. Further, as described above, the technical specification may be determined based on parameters defined by the functional requirements. Accordingly, accessing the technical specification may include analyzing the functional requirements along with a plurality of equipment options to identify the technical specifications.

As shown in FIG. 12A, this may include accessing technical specifications 1224. Technical specifications 1224 may specify one or more technical characteristics of cameras to be installed in floor plan 1210. For example, technical specifications 1224 may specify a camera make or manufacturer, a camera model, a camera type (e.g., dome-type, etc.), power specifications, network connectivity parameters, an IP address, or any other camera characteristics. In some embodiments, technical specifications 1224 may partially define the full specifications for the cameras. For example, specific model numbers, lens configurations, or other properties may be unspecified and may depend on particular features of a room in which they are located.

The disclosed methods may further include performing floor plan analysis on the floor plan to distinguish the plurality of rooms from each other. In instances where the floor plan is represented as an image, this may include applying one or more image processing techniques to identify lines or other geometric features within the floor plan, or the use of machine learning methods to segment rooms and/or room boundaries such as walls. The floorplan analysis may further include a geometric analysis to identify properties of the geometric features and/or relationships between the geometric features. For example, this may include identifying perpendicular lines, identifying parallel lines, searching for lines or vectors having a certain angle, measuring distances between features, identifying patterns of features in the floor plan, or any other properties or relationships that may indicate room definitions within the floor plan. The geometric analysis may include identifying common shapes that may indicate a room's function. For example, the floor plan analysis may recognize the shape of a toilet and infer that the room containing the shape is a bathroom. The size of a room or other properties (e.g., placement along an exterior wall, placement near an exit, etc.) may also indicate a room's function, which may help to distinguish rooms from each other.

In some embodiments, the floor plan analysis may include a semantic analysis, which may include analyzing properties or attributes of objects in a floor plan. For example, the floor plan may be represented as a BIM, CAD, or PDF file, which may contain metadata associated with shapes or lines in the floor plan. The semantic analysis may include accessing the information associated with the shapes, such as textual fields, layer properties, labels, comments, or any other forms of information, which may indicate room boundaries or room classifications. A semantic analysis may include accessing and/or extracting data from a BIM file regarding room demarcations (otherwise referred to as room contours or room boundaries). In some embodiments, the floorplan analysis may further include use of a natural language processing algorithm. For example, the analysis may include applying an algorithm, such as a word2vec algorithm or similar algorithm, to determine that "corridor" refers to a hallway or that "lavatory" refers to a bathroom.

The floor plan analysis may further allow the system to ascertain room features associated with the functional requirements and technical specifications. A room feature may include any aspect or component of a building associated within a room. The room feature may include an architectural feature, as described in greater detail herein. For example, the room feature may include a wall, a half wall, a door, a window, a skylight, a column, stairs, a handrail, a beam, flooring, an elevator, a fireplace, or any other permanent or semi-permanent part of the building. In some embodiments, the room feature may include a shape or dimension of the room. For example, the room feature may include whether the room has a nook or a closet, a number of walls or corners included in the room, a width of the room, a height of the room, or any other features associated with a room geometry. The room feature may include other properties, such as whether the room is along an exterior of a building, whether the room is included in a particular zone, whether a government or industry standard applies to the room, or any other descriptive properties. In some embodiments, the room features may include a room function. For example, the floor plan analysis may indicate that a room is a kitchen, which may be relevant to equipment selection and configurations within the room. As another example, the room features may include a furniture type. For example, the room feature may indicate whether the room includes desks and chairs, or specific types of desks or chairs.

The room features may be associated with the functional requirements and technical specifications if they relate to or affect the functional requirements or technical specifications in any way. For example, the functional requirement may be an air turnover rate requirement for an HVAC system and the room feature may include a size of the room, which may define a sizing or other technical specifications for HVAC equipment. As another example, the functional requirement may be a minimum lighting requirement for a room. The room feature may indicate that the room is an interior room, which may indicate that ambient lighting will need to be installed. In some embodiments, the customized equipment configuration may be determined based on a room function of at least one room. For example, the functional requirement may define the provisioning electrical sockets and the room function (e.g., bathroom) may indicate the room is wet space which may define a waterproof specification for the electrical sockets.

Embodiments of the present disclosure may further include generatively analyzing the room features with reference to the functional requirements and the technical specifications to determine at least one customized equipment configuration for at least some of the plurality of rooms. As described herein, a generative analysis may include any process in which a solution to a problem is arrived at by a computational device. For example, generative analysis may include an iterative process involving a program that generates a series of outputs meeting predetermined constraints. Artificial intelligence techniques may be employed to identify the preferred solution from among the outputs. In some embodiments, the generative analysis may include a series of simulations that are evaluated against a functional requirement to determine conformance with the functional requirement. This may include an optimization process, in which the best alternatives from each simulation are modified and re-simulated in multiple iterations to reach an optimal solution, as described above with respect to FIG. 1. The generative analysis may include one or more algorithms, such as rule-based design, heuristics, L-systems, genetic algorithms, evolutionary algorithms, model-based solvers, machine learning models, decision trees, random forests, artificial intelligence methods, simulated annealing, or any other forms of analytical techniques. The generative analysis process may not always include an optimization and may include a calculation or more concrete analysis. In some embodiments the generative analysis may apply a rule-based functional requirement for selecting and placing equipment. In this context, a rule may include any logical relationship defining a functional requirement or how a functional requirement should be applied, as described in greater detail above. greater In some embodiments, generative analysis may consider equipment technical specifications and functional requirements across the plurality of rooms being analyzed. Accordingly, the generative analysis may include receiving, as an input, a technical specification for at least one piece of equipment placed on the floor plan prior to the generative analyzing process. The generative analysis may seek to avoid unnecessary duplication of equipment, code and compliance issues, clashing equipment locations, and incompatible or inconsistent technical specifications or manufacturers across a plurality of rooms in a given level or a project.

The generative analysis may result in customized equipment configurations, as noted above. As used herein, a customized equipment configuration may refer to any parameter or technical characteristic of a piece of equipment that is selected according to the features of a room. For example, customized equipment configuration may include customizations to the mounting configuration, resolution, decibel rating, luminosity, IR rating, lens type, network speed, network connection type, wattage or other power requirements, color, finish, dimensions, materials of construction, flammability rating, water-resistance rating, a number of connection ports, or any other property of a piece of equipment. These customizations are provided by way of example and it is understood that many other customized equipment configurations may apply, depending on the type of equipment being customized. In some embodiments, the customized equipment configuration may include a customization to the technical specifications accessed by the system. The customized equipment configuration may affect the equipment behavior, appearance, or performance according to specific features of the room in which it is placed such that the equipment at least partially conforms with the functional requirements of the room.

In some embodiments, the customized equipment configuration may include a physical equipment device setting. This may include any setting, alteration, adjustment, or other manipulation to a physical component of a piece of equipment. For example, the physical equipment device setting may include an orientation, rotation, aperture setting, field of view setting, and/or tilt of a lens in a CCTV camera in a manner that differs from its default factory setting. Other examples may include the setting of voltage switch, the inclusion of a button, a varifocal adjustment of a lens, the connection of a cable, the installation of an accessory, equipment dimensions or shape, a battery type or size, a motor size or configuration, a lubrication type, a filter size or type, a spring size or type, a material selection, a paint or finish type (e.g., color, coating thickness, application methods, etc.), specifications for a bolt or other fastener, an orifice size, a seal type or material, a door swing direction, or any other physical characteristics of a piece of equipment.

In accordance with the present disclosure, the customized equipment configuration may include a programming parameter. As described in greater detail above, a programming parameter may include any variable, input, or field associated with the firmware, operating software, programming software, communication protocol, or other electronic configuration for a piece of equipment that may influence its operation or performance. In some embodiments, the programming parameter may be related to a communications address or network of a device. For example, the customized equipment configuration may include setting of an IP address, a KNX address, an addressable fire alarm address, a BACNET/IP address, or any other form of identifier of a node within a network. Similarly, the customized equipment configuration may include a communications protocol. As used herein, a communication protocol may refer to a system of rules that allow two or more pieces of equipment to send and receive information. The communications protocol may defines rules, syntax, semantics, and/or synchronization of a communication. Example communication protocols may include TCP/IP, BANET/IP, MODBUS, KNX, BLUETOOTH, ZIGBEE, or similar protocols. The communication protocols may apply to transmission of information over wired, wireless, or hybrid networks.

Consistent with the disclosed embodiments, the programming parameter may include the selection of firmware and/or operating software of a piece of equipment. For example, the customized configuration may include a firmware or firmware type to be installed in a memory associated with the equipment. As used herein, firmware may refer to a type of software that provides the low-level control (e.g. standardized operating environment or even complete operating system) for a piece of equipment's hardware. It may perform some or all of the control, monitoring, and/or data manipulation functions for the equipment. The firmware may be permanent software installed in a read-only memory of a piece of equipment. Examples of equipment with firmware may include thermostats, access control readers, controllers, and the like. In some embodiments, the customized configuration may include a firmware version to be installed on the piece of equipment.

In some embodiments, the programming parameter may include the setpoint or programming a particular operation or series of operations. For example, the programming parameter may direct a piece of equipment to turn on at 6:00 AM and to enter a standby mode at 6:00 PM. In some embodiments, the programming parameter may include a conditional or logical event. For example, the programming parameter may direct a piece of equipment to turn off at 6:00 PM if no people are present in a room, or similar conditional logic. As another example, the programming parameter may trigger an alert to be sent if a certain event, such as maximum occupancy threshold in a room being exceeded, occurs. In some embodiments, the generated programming parameter may be adaptive to the room's function (e.g., private office, corridor, etc.). For example, for a given functional requirement to control lighting fixtures with a lighting controller, the lighting in a hotel corridor may be programmed to be on between the hours of 6:00 am-12:00 am, while the lighting in a hotel lobby may be programmed to be always on. As another example, for a given functional requirement to capture video a given pixel density, the cameras in a lobby area may be programmed for continuous recording at a certain frame rate and resolution whereas the cameras in a storage room may be set to only record upon detection of movement at a lower frame rate and resolution.

A customized equipment configuration in accordance with the present disclosure may include the aggregation of at least two different pieces of equipment. As used herein, an aggregation of equipment may refer to two or more pieces of equipment that are combined physically or logically to form a functional or logical unit. Example combinations may include a lighting switch with a switch plate cover, a camera with a lens, an electrical enclosure with electrical circuit breakers, a controller with a power supply, an access control reader with a controller, an access control reader with a power supply, a smoke detector with a mount, or any other pairs or groupings of equipment. The aggregation may be a physical combination (e.g., a fuse inside a piece of equipment) or a relational or logical combination (e.g. an access reader paired with a controller via a cable connection, or a beacon paired with a transmitter via a wireless connection). In some embodiments, the aggregated equipment may be fabricated or delivered inside a common chassis, housing, rack, or enclosure. In some embodiments, the customized equipment setting can refer to the spacing and/or organization of aggregated equipment. For example, the customized equipment setting may define the layout and spacing of electrical breakers and fuses within an electrical panel, or similar spacing or layout of components. The customized equipment setting may include order codes for the aggregated equipment components.

In some embodiments, the customized equipment setting may specify primary equipment and at least one piece of auxiliary equipment. As used herein, auxiliary equipment may include but is not limited to a piece of electronic, mechanical, or any other type of hardware that contributes to the function, installation, or operation of a primary piece of equipment. Example auxiliary equipment may include control devices, mounting hardware, batteries, cables or wiring, bolts, screws, nuts, flanges, spare equipment, or any other items that may be associated with the primary equipment. The example customized equipment settings described herein are provided by way of example. Various other customized equipment settings may apply, depending on the equipment and/or application.

In some embodiments, the generative analysis may include determining a preferred equipment placement location. For example, the generative analysis may include simulating a same piece of equipment (or differing pieces of equipment) in differing locations in a room to thereby determine a preferred equipment placement location for a particular piece of equipment. As described above, this may include simulating a plurality of initial placement options for a piece of equipment, determining the best solutions of the initial placement options, and re-simulating the placement options with modifications to determine an optimal solution. The optimal solution may be a solution that best conforms to functional requirements and/or other constraints (e.g., user settings, etc.) associated with a room. In some embodiments, the optimization may also take into consideration preferred or undesirable areas for equipment placement, which may be specified by a user, defined according to one or more rules, or otherwise identified. A preferred solution may be specific to a room or may be a preferred solution when a number of rooms are taken into account. For example, preferred Wi-Fi coverage in one room might depend in part on Wi-Fi equipment to be installed in an adjoining room or a nearby room.

Referring to FIG. 12A, the disclosed embodiments may include performing generative analysis 1230, which may include floor plan 1210, functional requirements 1222, and technical specifications 1224 as inputs. The generative analysis may determine equipment placement locations for a plurality of cameras within floor plan 1210, such as cameras 1242, 1244, 1246, and 1248. The generative analysis may output a customized floor plan 1240 including the equipment placement locations, as described above. For example, customized floor plan 1240 may be an image file with equipment placement locations overlaid on the image, a vector or drawing file including the equipment placement locations, a BIM file containing BIM objects associated with the equipment placement locations, a text or data file including equipment placement coordinates, or any other suitable means for representing locations within the floor plan. For ease of discussion and illustration, floor plan 1240 in FIG. 12A illustrates four adjoining rooms. It is to be understood that the generative analysis may be performed on many rooms (e.g., 10's, 100's or 1000's of rooms) simultaneously, as part of the same generative process, and/or sequentially.

Generative analysis 1230 may also determine customized equipment configurations for the cameras. For example, as shown in FIG. 12A, generative analysis 1230 may determine customized equipment configurations 1252, 1254, 1256, and 1258. While each of cameras 1242, 1244, 1246, and 1248 may have the same manufacturer and based model, there may be slight variations in the configurations of the cameras. These variations may be based on particular features of the respective rooms the cameras are placed in, different functional requirements for different rooms, or a combination of both. In the example shown in FIG. 12A, the customized equipment configurations may include a specified model number, as well as customized vertical and horizontal camera orientations for cameras 1242, 1244, 1246, and 1248. For example, the shape or size of the room in which camera 1242 is placed may result in a different model number than camera 1244. Similarly, camera 1246 may have a different vertical and horizontal camera orientation than cameras 1242, 1244, and 1248. As shown in FIG. 12A, the generative analysis may also specify X, Y, and Z coordinates defining preferred placement locations for each of the cameras. The coordinates may be in reference to a coordinate system of floor plan 1240, a coordinate system of the respective rooms, a real-word coordinate system, or any other suitable representation of a placement location as described throughout the present disclosure.

Embodiments of the present disclosure may further include generating a manufacturer dataset including the at least one customized equipment configuration. As used herein, a manufacturer data set may include a set of instructions for an equipment manufacturer specifying details relating to the manufacture, calibration, programming, packaging, labeling, shipment, and or installation of the equipment. The manufacturer data set may fully specify the equipment or may be a partial specification. Information in the dataset may include but is not limited to a brand, series, model, type, color, configuration, accessories, equipment address, technical specifications of other equipment located inside and/or outside the room, firmware, panel or enclosure layout, dimensions, auxiliary equipment, room architectural features, room function, and/or any other information needed to produce the item, including the customized equipment configurations described above. The manufacturer dataset may include information for equipment to be installed in a particular building, equipment to be installed in a particular zone or area of a building, equipment associated with a particular project, equipment associated with a particular phase of a project, equipment of a particular type, equipment to be supplied from a particular manufacturer, equipment included in an particular order, or any other grouping of equipment or a subset thereof.

Information in the dataset may also include location information. In some embodiments, this may include a room identifier. The room identifier may be any information identifying a room in which an associated piece of equipment is to be placed. The room identifier may be a numeric identifier (e.g., "room 501"), a textual identifier (e.g., "judge's chamber"), a graphical indicator (e.g., an image, a symbol, a logo, etc.) identifying a particular room or room function, or any other information that may identify a room.

The room identifier may also include a building number, a building section, a building wing, a project name or number, tenant information, a classification number according to an international standard, or any other information that may indicate a room. In some embodiments, the room indicator may be represented on a floor plan. For example, the room indicator may include a floor plan with the associated room highlighted based on color, shading, outlining, or other means for specifying a room. The location information may also include coordinates of the room or the equipment placement location (e.g., X, Y, and/or Z coordinates) in relation to room, in relation to floor of a building, coordinates in relation to building, in real-world coordinates, or any other coordinate system. In some embodiments, a graphical indicator may include a perspective view of the installation location. The perspective view might include an illustration of the equipment, properly installed.

In some aspects of the disclosed embodiments, generating the manufacturer data set may include generating the room identifier by means of a semantic enrichment process. Semantic enrichment may refer to the process of adding missing or misrepresented semantic information to an architectural floor plan. In this context, semantic enrichment may be used to classify a room type by recognizing features of the room. Semantic enrichment may for, example, determine a room function. The classification of a room by type may include assigning a textual room function (e.g. private office) and/or a classification number which may be specified by a standard (e.g., 12566789, which may represent a private office according to a standard). For example, an office may be recognized as a small, square room with a door, window, desk and chair or other features common to an office. Semantic enrichment includes, but is not limited to, the use of semantic, geometric, topological or image analysis together with a computational algorithm (heuristic, stochastic or machine learning based), and artificial intelligence methods to add information to a floor plan.

In some embodiments, the manufacturer data set may include a level identifier. The level identifier may indicate the floor for which a piece of equipment is meant. The level indicator may be represented as a floor number (e.g, 0, 1, 2) a floor name or description (e.g., basement, ground, roof, etc.) a height relative to a reference point associated with the building (e.g., +0.00, +5.00, etc.) an absolute height from sea level (e.g., +182.1), or any other information that may specify a floor or a combination such information.

In some embodiments, the manufacturer data set may include an equipment identifier. The equipment identifier may be any information identifying a particular piece of equipment or a group of equipment. The equipment identifier may include a numeric identifier (e.g., "Model IPC-D1B41"), a textual identifier (e.g., "20 amp lighting switch"), a graphical representation (e.g., an image, symbol, etc.) of an equipment model, manufacturer, or classification (e.g., a type according to a standard such as OmniClass), or any other information identifying a piece of equipment. In some embodiments, in addition to identifying the equipment technical specifications, the identifier may also identify its location. For example, the equipment identifier may include a floor plan with the placement of the equipment indicated on the floor plan through a graphical representation (e.g., a graphical indicator, etc.), or other information indicating a placement location. In some embodiments, the equipment identifier may be a unique identifier for the equipment. The unique identifier may be unique relative to a building, a site location, a company or organization, a project, a floor or other subdivision of a building, or any other grouping of equipment.

A manufacturer data set in accordance with the present disclosure may further include other identifiers associated with the room or the customized equipment. For example, the manufacturer data set may include a room function identifier. The room function identifier may be any information representing a class or purpose of a room. This may include a semantic designation of the room a piece of equipment is to be placed in. The manufacturer data set may include a project identifier. A project identifier may refer to an indication of a project a piece of equipment is associated with. The project identifier may include a project name, a project number, a geographic location, a client, a project address or location, a construction company, a project phase, or any other information that may identify a project.

The manufacturer data set may be generated in a manner enabling a manufacturer to customize equipment for each of the plurality of rooms. For example, the manufacturer data set may include the customized equipment configuration one or more pieces of equipment. The manufacturer data set may further enable a manufacturer to package the customized equipment in a manner displaying the room identifier. As used herein, packaging of equipment may include enclosing the equipment in a box or other container. Customized packaging may include within the packaging a representation of the customization preformed on the equipment, the room identifier, or any other information included in the manufacturer data set. In some embodiments, the room identifier and other information may be printed on the packaging (or printed on a label of the packaging). This may include printed text, printed images, printed scannable codes including the information (e.g., barcodes, QR codes, data matrices, PDF417 codes, or any other form of machine-readable code), or any other form of printed representation of the information. In some embodiments, the information may be included in an electronic format. For example, some or all of the information may be included in an RFID tag that may be scanned to receive information represented in the tag.

As discussed above, the customized equipment configuration may include generating a programming parameter for one or more pieces of equipment. Accordingly, the manufacturer data set may further include at least one programming parameter to thereby enable the manufacturer to configure the customized equipment. As described above, the programming parameter may be a variable or input to for the firmware or software of a piece of equipment. The manufacturer may customize the equipment for various placement locations based on the programming parameter included in the manufacturer data set, which may include programming the parameter into the firmware or software, including instructions to program the parameter into the firmware or software, including customized software on a separate medium (e.g., a flash drive, a CD, via an electronic link, etc.), or other forms of customization based on the programming parameter. The customized equipment may be noted specifically on the packaging for the customized equipment. This may include a specific designation of the programming parameter on the packaging. Alternatively, or additionally, this may be represented through other information, such as an equipment identifier, a custom model number, a representation of the intended placement location, or any other means of distinguishing the equipment from other equipment.

In some embodiments, the manufacturer dataset may further include product orientation information for the manufacturer to package with the customized equipment. In this context, product orientation information may refer to any information added signifying the direction a piece of equipment is facing or is intended to face. The product orientation may be represented as a horizontal and vertical rotation, an absolute direction vector, a yaw, pitch and roll, or any other type of notation used to define angles in a space. The product orientation may be a 2D orientation (e.g., within a plane) or a 3D orientation (e.g., within a three dimensional space, such as a room). The product orientation may be represented on the packaging of the customized equipment. In some embodiments, the label may present the product orientation in a text format, as a graphical representation, as a machine-readable code, or other manner of presenting information. For example, the packaging may include a label with a floor plan including a symbol oriented to represent the product orientation.

In some example embodiments, the manufacturer dataset may further include equipment placement location data, to thereby enable the manufacturer to package the equipment placement location data with the customized equipment. As described above, the equipment placement location data may specify the equipment placement location for a piece of equipment. the equipment placement location data may be represented in coordinates (e.g., X, Y, and/or Z coordinates) in relation to room, in relation to floor of a building, coordinates in relation to building, in real-world coordinates, or any other coordinate system. In some embodiments, the equipment placement location data may include a representation of a floor plan. For example, the equipment placement location data may include an image, a vector file, a drawing file, a BIM file, or similar file including a representation of the equipment placement location for one or more pieces of equipment. Packaging the equipment placement location data with the customized equipment may include presenting the equipment placement location for a piece of equipment on the equipment packaging. This may include a textual representation, a graphical representation, a machine-readable code, or any other manner of representing the information.

According to some embodiments, of the present disclosure, the generative analysis may include generating a wiring diagram. In such embodiments, the manufacturer dataset may further include the wiring diagram. As described above, the wiring diagram may include a representation of electrical, audio, video, data or any other cables connecting pieces of equipment to each other and a main controlling panel. The wiring diagram may be generated during the generative analysis according to any of the various embodiments described throughout the present disclosure. For example, generating the wiring diagram may include generating a series of interconnected nodes across a floor plan. The nodes may be adjusted according to preferred corridors, to avoid obstacles, to optimize wiring lengths, or based on any other constraints. The wiring diagram may be relevant for customization of the equipment by the manufacturer. For example, the manufacturer may be enabled to add information to the wiring diagram, such as highlighting the respective equipment on a wiring diagram for each piece of equipment, adding additional information (such as voltage, data connectivity, or other requirements), grouping equipment based on the wiring diagram (e.g., packaging equipment along the same wiring corridor together, labeling equipment along the same wiring pathway with a certain indicator, or other means of grouping equipment) or other ways of customizing the wiring diagram. In some embodiments, the customization may include physical or programming changes based on the wiring diagram. For example, the wiring diagram may indicate a number of ports to be included in the equipment, a voltage requirement, a data connectivity requirement, an IP address, or other values or parameters that may be indicated on the wiring diagram.

In some embodiments, the manufacturer dataset may include a graphical representation of the room for which equipment is intended with an indication in the graphical representation of an equipment placement location. This may thereby enable the manufacturer to package the graphical representation of the room with the customized equipment. For example, the graphical representation of the room may include an image, BIM file or CAD file for the room. The graphical representation may further include surrounding portions or areas of the floor plan, including an entire floor, a region or area, a group of rooms, a wing, a building, or other portions of a floor plan. In such embodiments, the room may be highlighted, for example, by a bold outline, by color, through shading or patterns, or other means of highlighting the room. The graphical representation of the equipment placement location may include a symbol indicating the intended location, which may include an equipment placement location determined as part of the generative analysis, as described above. The symbol may be placed spatially within the representation of the room to correspond to the actual intended equipment placement location. The symbol may be a picture of the equipment, an icon representing the equipment, a generic symbol (e.g., an "X," a circle, an arrow, a generic equipment symbol, a company logo, etc.), a textual indicator (e.g., an equipment identifier, a model number, words such as "install here," etc.) or any other manner of indicating location. The manufacturer may package the graphical representation of the room with the customized equipment by including the graphical representation in the packaging (e.g., printed on a paper insert, printed on a customized instructions or installation guide, etc.), printing the graphical representation on a surface of the packaging, printing the graphical representation on a label to be applied to the packaging, including the graphical representation (or a link to the graphical representation) in a machine-readable code, including the graphical representation (or a link to the graphical representation) in an electronically scannable medium, such as a RFID chip, or any other means for including the graphical representation.

In some embodiments, the manufacturer dataset may include a label layout. The label layout may specify how information is to be presented on a product label by a manufacturer. The label layout may specify what information is to be included, the position of the included information, the manner in which information is to be included, spacing requirements, font or other formatting requirements, the inclusion of company or project logos, or any other details that may be specified on a label.

Figure 12B:
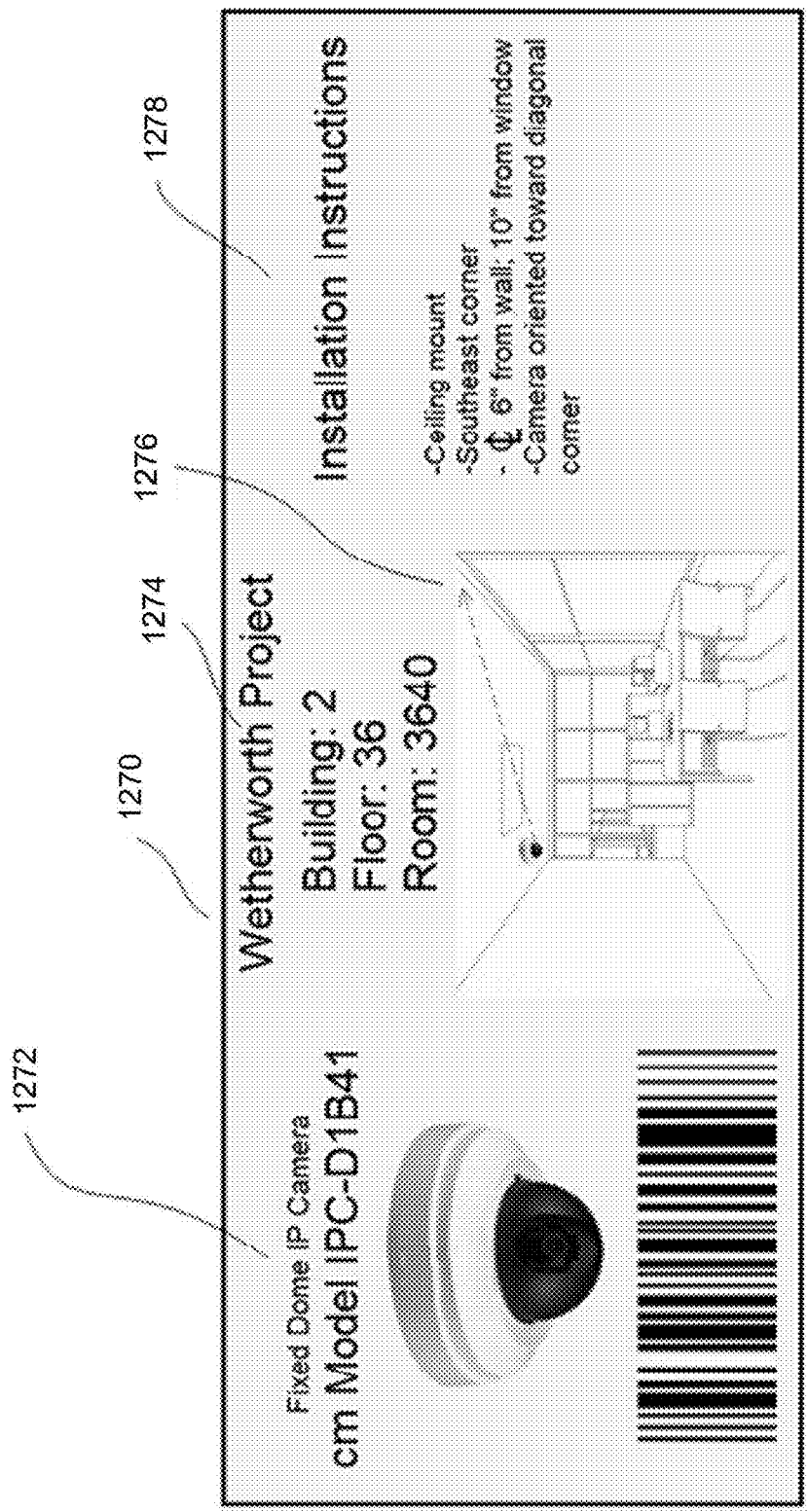
FIG. 12B is an illustration of an exemplary label layout for a customized label.

FIG. 12B illustrates an exemplary label layout for customized label 1270. The label may include a portion 1272 that identifies the product by type, model number, image and bar code identifier. Another portion 1274 of the label 1270 may identify the building or project to ensure that the package makes it to the correct room. This may include an identification of the project, the building, the floor and the room. Another portion of the label 1276 might include a graphical indication of the room and/or the placement location. For example, on label 1270, a perspective view of the room may be illustrated along with the equipment placement location and a arrow indicating equipment orientation. In addition, portion 1278 of label 1270 might include installation instructions. Additional pieces of information from the manufacturer's data set such as a device address (e.g. IP address such as, for example, 192.168.1.15), or fewer pieces of information may be included on the label, depending on the requirements of a specific project. By requiring the manufacturer to include such a label on every piece of equipment, the chances of error both in terms of the wrong equipment installed in the wrong room, incorrect equipment placement, and incorrect equipment orientation can be minimized. Moreover, each piece of equipment can be custom configured at the manufacturer for specific rooms, greatly reducing set up time on site. Particularly for large construction projects where hundreds or thousands of pieces of equipment might be ordered, this system allows a data file to be transmitted electronically to the manufacturer, enabling the manufacturer in an automated or semi-automated way to fulfill the custom order and label each piece of equipment in a custom way.

In some embodiments, the label layout may contain an image of a portion of the floor plan illustrating the room to which the equipment is to be installed, along with a room identifier. The floor plan may include the floor plan of the particular room or a floor plan of an entire floor, building, wing, or other area including the room. The label layout may further contain a graphical representation of an equipment placement location associated with the customized equipment. For example, the floor plan may include a symbol representing the equipment placement location relative to the room, such as is illustrated in a center portion of label 1270 in FIG. 12B. In some embodiments, the graphical representation may include other information associated with the customized equipment characteristics, such as a product orientation, a viewing angle, a product color, a product model, or any other information that may be represented graphically.

Embodiments of the present disclosure may further include outputting the manufacturer data set. This may include any means of providing or making the data set available. In some embodiments, this may include transmitting the manufacturer data set electronically. This may include transmitting the manufacture data set via email, through a secure connection, uploading the data to a network location (e.g., a cloud storage platform, a project Sharepoint™ site, a shared network folder, or other forms of remote server locations), or any other means for transmitting data electronically. The transmission may be to the manufacturer, to a third party (e.g., a construction contractor, a project manager, an engineering or architectural firm, or any other entity that may be involved in design, planning, or installation associated with the equipment. This transmission may be to an enterprise resource planning (ERP), customer relationship management (CRM), or similar types of systems. In some embodiments, some or all of the manufacturer data set may be exported to a machine readable format. For example, the data may be represented in a barcode, a QR code, a data matrix, a PDF417 code, a proprietary or customized code, or any other form of machine-readable code. In some embodiments, the manufacturer data set may be exported to a third party application or software program. For example, the manufacturer data set may be exported in a format accessible by particular software program, including a CAD software package, a BIM authoring tool and/or software package, a construction planning tool, a product labeling software, a 3D-printing software package, or any other form of software that may process, store, or use information included in the manufacturer data set.

In some embodiments, the system may be a cloud-based system. For example, the methods described herein may be executed in a virtual instance by a remote computer, rather than a local processor. Cloud-based computation can provide advantages in scalability, cost, and security over approaches that rely on local computational or conventional servers.

Referring to FIG. 12A, the disclosed systems may generate manufacturer data set 1260. Manufacturer data set 1260 may include some or all of the parameter specified in customized equipment configurations 1252, 1254, 1256, and 1258, as shown. Manufacturer data set 1260 may include other forms of information as described above, including intended placement locations, equipment identifiers, or other information related to cameras 1242, 1244, 1246, and 1248. Based on manufacturer data set 1260, a manufacturer may be enabled to package equipment to include some or all of the information included in manufacturer data set 1260 for a particular piece of customized equipment. In some embodiments, this may include affixing a customized label 1270 to the package. As discussed earlier in connection with FIG. 12B, Label 1270 may include an image of the customized equipment, a project name, a project number, a room identifier, a floor identifier, product orientation information, a graphical representation of an intended room for the equipment to be installed, a graphical representation of an intended placement location, coordinates, or other information indicating the placement location, a model number, a series number, a product name, a logo, or any other information that may be relevant to the installation, shipment, or use of the customized equipment. In some embodiments, some or all of the information included in the manufacturer data set may be represented in a machine-readable format, which may facilitate handling, storage, installation, or other procedures associated with the equipment.

Figure 13:
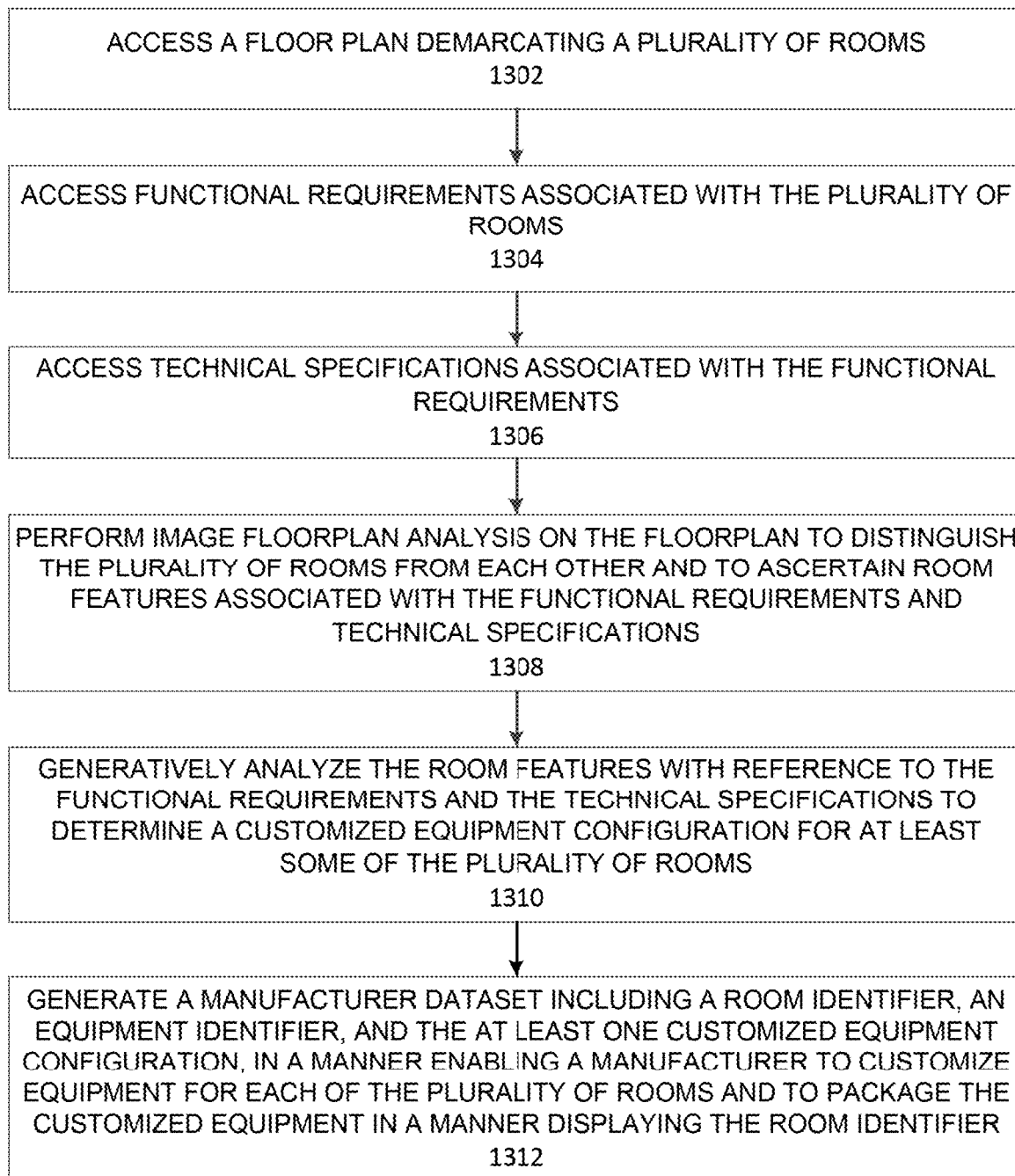
FIG. 13 is a flowchart illustrating an example process for customizing equipment for use in buildings based on floor plans, consistent with the disclosed embodiments.

FIG. 13 is a flowchart illustrating an example process 1300 for customizing equipment for use in buildings based on floor plans, consistent with the disclosed embodiments. Process 1300 may be performed by a processing device, such as any of the processors described throughout the present disclosure. In some embodiments, a non-transitory computer readable medium may contain instructions that when executed by a processor cause the processor to perform process 1300. Process 1300 is not necessarily limited to the steps shown in FIG. 13 and any steps or processes of the various embodiments described throughout the present disclosure may also be included in process 1300.

At step 1302, process 1300 may include accessing a floor plan demarcating a plurality of rooms. As described above, the floor plan may include any graphic representation of an interior of a building, an exterior of a building, or both. In some embodiments, the demarcations may not be included in the floor plan and step 1302 may further include determining the demarcations through an machine learning methods or geometric analysis, as described above. In some embodiments, the floor plan may demarcate a plurality of zones in addition to or instead of the demarcations for the plurality of rooms.

At step 1304, process 1300 may include accessing functional requirements associated with the plurality of rooms. In some embodiments, at least two different functional requirements may be associated with the plurality of rooms. These different functional requirements may be of the same type, or may be of different functional requirement types, as described in greater detail above. At step 1306, process 1300 may include accessing technical specifications associated with the functional requirements. The technical specifications may include a model identifier, an equipment class, technical characteristics of equipment, or any other means for specifying a piece of equipment.

At step 1308, process 1300 may include performing a floor plan analysis on the floor plan to distinguish the plurality of rooms from each other and to ascertain room features associated with the functional requirements and technical specifications. The floor plan analysis may include an image processing technique, a geometric analysis, a semantic analysis, a machine learning method, or other analytical techniques that may indicate room boundaries or features. As described above, the room features may include any aspect or component of a building associated within a room.

At step 1310, process 1300 may include generatively analyzing the room features with reference to the functional requirements and the technical specifications to determine at least one customized equipment configuration for at least some of the plurality of rooms.

At step 1312, process 1300 may include generating a manufacturer dataset including a room identifier, an equipment identifier, and the at least one customized equipment configuration. The room identifier may be a number, a text-based identifier, a graphical representation of the room, or any other means for identifying a room. The room identifier may indicate an intended placement location for the equipment customized by the customized equipment configuration. The equipment identifier may include a number, a text-based identifier, a graphical representation, or any other means for identifying the customized equipment. The manufacturer dataset may be generated in a manner enabling a manufacturer to customize equipment for each of the plurality of rooms and to package the customized equipment in a manner displaying the room identifier. In some embodiments, process 1300 may further include other steps such as outputting the manufacturer dataset, as discussed above.

In accordance with the present disclosure, systems, methods, and computer readable media may be provided for selecting equipment for use in buildings. Embodiments may include generating solutions that include selected equipment and then updating the solutions based on iterative analysis and/or user input. In this way, embodiments can flexibly arrive at improved solutions that at least partially conform to various functional requirements. Selected equipment may refer to a piece of electronic, mechanical or any other type of hardware, cabinetry or furniture, or any other element of a building that has a function and/or a technical specification. In the present disclosure, equipment is sometimes referred to as "primary equipment" differentiating it from auxiliary equipment which is defined elsewhere.

For example, a system may determine a piece, set, or group of equipment with an associated use, function, or purpose in a building. Additionally or alternatively, the system may determine the equipment placement location within a building including any supporting systems or additional equipment necessary for the piece, set, or group of equipment to accomplish the associated use, function, or purpose (e.g., wiring associated with a piece of electrical equipment).

Embodiments consistent with the present disclosure may include a data structure for storing equipment models and their technical specifications. A data structure may refer to any type of data stored in an organized, searchable manner. Data can contain textual, tabular, numeric or image information which describes equipment, for example. Further, data associated with a piece of equipment may contain its model, type, brand, series, price information, specific properties (such a IR rating or weather resistance), a technical specification, a physical description or a picture of the object. The data may be stored in SQL, MongoDB, AWS S3, CSV, XLS, JSON or any other data storage format. Data may be stored locally or in a cloud-based server. In some cases, data may be accessible using simple queries (e.g., retrieve a specific piece of equipment) or complex queries (e.g., retrieve all model numbers of all equipment of a certain type). Data may be entered manually into the data structure or imported electronically.

Disclosed embodiments may include receiving a floor plan demarcating contours of a room. A floor plan may include any depiction of a facility layout. Further, receiving a floor plan may include any means of accessing a floor plan, as described here. Additionally, a floor plan may be received in any medium containing a layout representation. For example, a floor plan may be received as a digital, textual, hand drawn, hard copy, photographic, or any other format capable of being stored in a data structure. A floor plan may in 2D or 3D or any combination thereof. A floor plan may be contained in image file, PDF file, CAD file or Building Information Model (BIM) file. In some embodiments, the data structure of the original floor plan or architectural file (e.g. BIM file) may be converted to another format. For example, a CAD or IFC file may be converted to a gzip compressed JSON object containing hierarchical buildings information. The JSON object may be constructed in a way that represents the hierarchy of one or multiple buildings. The information stored in the object may contain metadata, such as information about architectural features, as described above.

Room demarcations may indicate the location of a room in a plan in relation to the rest of the plan. For example, a room demarcation may also include the boundaries or contours of the room. Objects, real or imaginary, that constitute the rooms borders of the room may be included in room demarcations. Demarcations may indicate walls or windows that surround a room, and openings associated with the room's borders such as doors or windows leading in and out of the room. In some cases, demarcations may include equipment and/or architectural features, columns, beams, furniture, or other objects contained in the room. In some embodiments, the borders or contours of a room may not initially be demarcated in the floor plan in a machine readable format. Accordingly, accessing the floor plan may further include automatically identifying contours or other room features, as described above.

In some embodiments receiving a floor plan demarcating contours of a room may include performing image processing on the floor plan to demarcate the contours of the room. For example, a floor plan may be received as an image, CAD, or PDF file. The system may use semantic analysis, geometric analysis, and/or machine learning methods to demarcate contours of one or more rooms. Semantic analysis, geometric analysis, and machine learning methods may include but are not limited to the techniques described herein. Semantic analysis may include but is not limited to the methods of adding semantic designations described herein, including semantic enrichment.

More generally, contours of a room may be identified using geometric analysis, topological analysis and/or BIM analysis and/or semantic analysis and/or machine learning methods may be used to classify a room and/or determine its function. Methods may also be used to classify a space in a floor plan as, for example, a bedroom based on room features such as topological connections, area, furniture, and number of doors and windows. As illustrative non-limiting examples, number of doors and relation between area and perimeter can be used to identify corridors. The existence of sanitary utilities can indicate a bathroom. Stair-like features with an egress can indicate a stairway. Performing these analyses in combination with a machine learning model may result in improvements in efficiency, speed, accuracy, and level of detail of selective simulation of equipment coverage in a floor plan.

As another example, contours may be identified using topological analysis, which may include an analysis of connectivity of spaces within a floor plan. Topological analysis can reveal information regarding the properties of these spaces. For example, topological analysis may define relationships between rooms and their position in the floor plan hierarchy based on a door that connects them. Topological analysis may be used to create spatial maps, such as a heatmap, or a weighted graph that illustrates connectivity by highlighting shortest paths through a floor plan between two locations.

Further, the system may use building information model (BIM) analysis to identify contours of a floor plan. BIM may include an analysis of a BIM model (e.g., a three dimensional representation of a building with associated labels, BIM objects and parametric data) using a combination of geometric analysis, semantic analysis, and machine learning methods aimed at extracting specific information regarding the architecture of a floor plan. The results of a BIM analysis may include a set of room boundaries, names, numbers and descriptions of the rooms, walls, doors and windows associated with said rooms, materiality and description of any of these elements, etc.

Figure 14A:
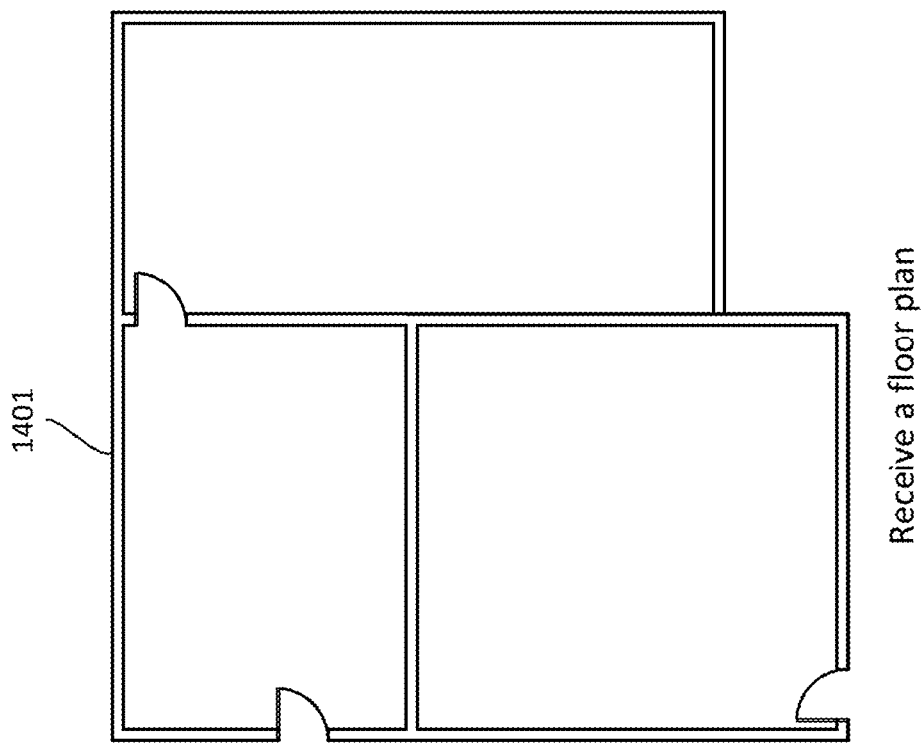
FIG. 14A depicts an exemplary schematic illustration of a floor plan, consistent with disclosed embodiments.
Figure 14B:
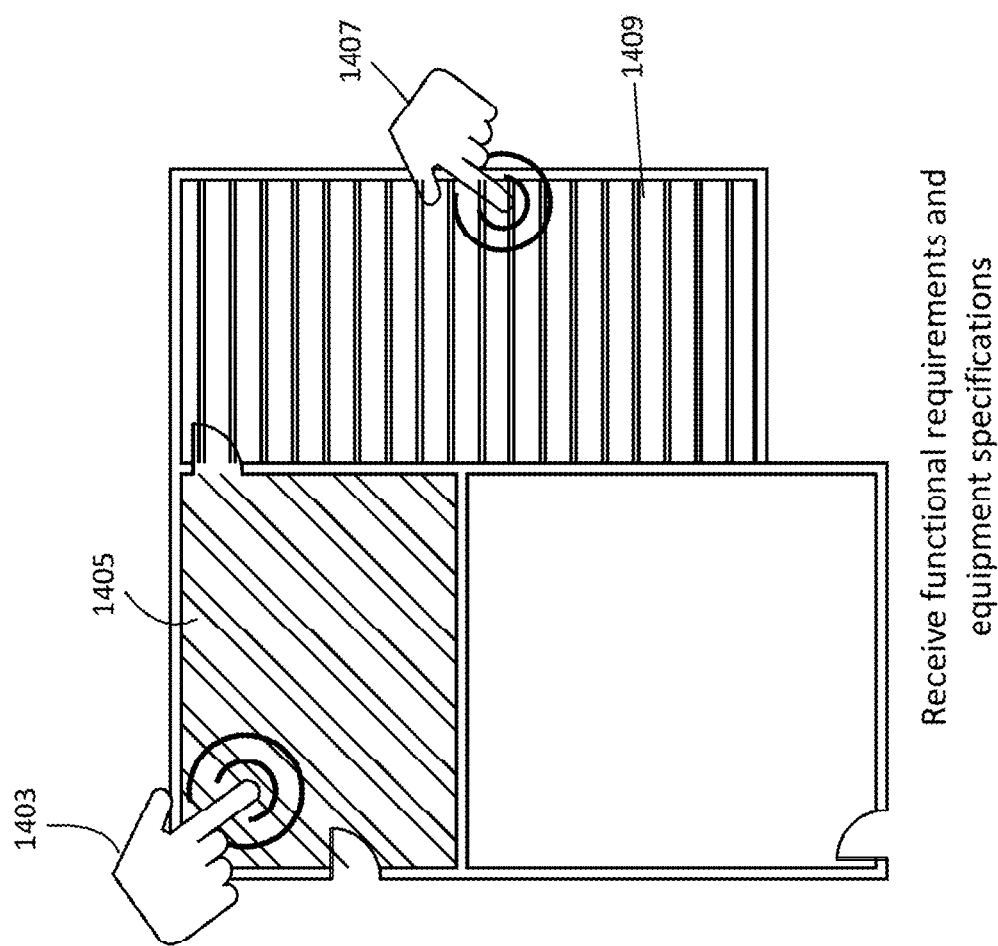
FIG. 14B depicts exemplary user input including a functional requirement, consistent with disclosed embodiments.

In some embodiments, contours of a room may be identified using geometric analysis. As described, geometric analysis may include, for example, an interrogation of a BIM, CAD, PDF, image or any 2D floor plan containing geometric entities such as lines, polylines, arcs circles or vectors. By way of example, FIG. 14A depicts a schematic illustration of an exemplary floor plan 1401.

Disclosed embodiments may include receiving a selection of at least one functional requirement or equipment specification associated with the room. An equipment specification may otherwise be referred to as a technical specification. A selection may be received via a user interface. A user may select a functional requirement or equipment specification from among a list of options, for example. Additionally, or alternatively, a selection may be made automatically by a system based on learned associations between a room and a functional requirement or an equipment specification. As an example, the system may identify an equipment symbol using image analysis or semantic analysis, and select a known equipment specification associated with that symbol. In some embodiments, a functional requirement may be selected based on a rule, as described in various embodiments throughout the present disclosure. For example, a rule may be used to apply functional requirement for sensor coverage to all rooms on level 3, or apply a functional requirement for access control on all doors leading to a secure area.

In some embodiments a selected equipment specification may include an equipment placement location, an equipment model, an equipment classification, a customized setting, a wiring diagram, an equipment mounting height, an equipment orientation, an equipment sensor type, a lux level, an energy consumption, a heating or cooling capacity, a dimension, a detection range, a resolution, an equipment setting, or any other equipment parameter and combinations thereof. For example, a selected equipment specification may include equipment orientation information that signifies a direction a component of the equipment faces. Orientation may include horizontal and/or vertical rotation, an absolute direction vector, yaw pitch and roll, or any other type of notation used to define angles in space.

As yet another example, an equipment specification may include lux, a unit of measurement of light level intensity, which a may also be referred to as "illuminance" or "illumination". A measurement of 1 lux may be equal to the illumination of a one meter square surface that is one meter away from a single candle. In the embodiments, lux levels may be used in simulations to evaluate the amount of light on a given surface. A work table, for example, may have a requirement to receive 300 to 1000 lux because lower levels may be too dark to work, while higher levels may lead to excessive glare. Accordingly, functional requirements may specify a lux level, and a simulation may be evaluated on the ability of a selected piece of equipment to conform to a specified lux level.

Other equipment specifications include energy consumption, which can be expressed in watts, kilo watts, kilo watt hours, volt amperes, or other units. Further, equipment specifications may include heating capacity, cooling capacity, air flow, ventilation and/or intensity in of an HVAC system. Such properties of an HVAC system may be specified in British thermal units, cubic feet per minute, fan speed, steps (cooling power 1, 2, 3, etc.), or a targeted, preferred temperature (heat/cool the room to 24 deg C). As yet an additional example, an equipment specification may include a detection range of a sensor. This may refer to distances from which the sensor can sense a phenomenon within acceptable performance thresholds, and a range may include a lower or upper bound (e.g., a minimum or maximum). The detection range of a camera, for example, may be the range in which a camera can take an image at a certain pixel density. The range of a motion detector may be the distance within which it can reliably sense motion. In some cases, an equipment specification may include a resolution of a television, computer monitor, or other display device and may be the number of distinct pixels in each dimension that can be displayed (i.e., a "display resolution"). Resolution may be expressed as a width and height in pixels. For example, 1024×768 may indicate a width of 1024 pixels and a height of 768 pixels.

An equipment specification may include a dimension that describes a distance measurement of distance between points in space (e.g., between two points in a floor plan). A dimension may be a height, expressed, for example as a distance from a floor. A dimension may be an X or Y dimension, in which case it may signify a distance from an origin point along an orthogonal X or Y vectors, for example.

In some embodiments the at least one functional requirement may include a desired equipment placement location within a floor plan. An equipment placement location may be specified as X,Y coordinates and may also include Z or height information related to the reference point. In some cases, an equipment placement location may include horizontal and vertical rotation information.

In some embodiments the user may be enabled to vary the equipment placement location prior to performance of the generative analysis to obtain the plurality of solutions. For example, the system may receive input from a user to select or vary equipment placement location prior to the system performing generative analysis to obtain one or more solutions including equipment placement locations. In addition, or alternatively, following a generative analysis, the user may be enabled to vary an equipment placement location (prior to performance of a follow on generative analysis.

Disclosed embodiments may include generatively analyzing the room to obtain a plurality of solutions that at least partially conform to the at least one functional requirement or equipment specification. For example, a system may generatively analyze rooms within a floor plan in order to cycle through a plurality of solutions that at least partially conform to the at least one functional requirement or equipment specification. The plurality of solutions may include an equipment placement location, an equipment model, an equipment classification, a customized setting, a wiring diagram, an equipment mounting height, an equipment orientation, an equipment sensor type, a lux level, an energy consumption, a heating or cooling capacity, a dimension, a detection range, a resolution, an equipment setting, or any other equipment parameter and/or combinations thereof.

In some embodiments generatively analyzing the room may include use of machine learning. Embodiments consistent with the present disclosure may include using artificial intelligence (i.e., machine learning models) for identifying wall contours, rooms, windows, walls, doors, door sills, architectural features, semantic features, many other possible features as well as predicting energy consumption and equipment types and locations. Machine learning models may include but are not limited to classification models, neural network models, random forest models, Convolutional Neural Network Models, deep learning models, recurrent Neural network models, support vector machine models, a recurrent neural network model, a random forest model, a support vector machine model, ensemble prediction models, Adaptive Network Based Inference System, or any other machine learning model. Possible deep neural types of CNN's for computer vision and other potential tasks may vary by tasking and may include Resnet 50 for Classification, RetinaNet and Mask RCNN for Detection- and Unet and Mask RCNN for Segmentation. Embodiments consistent with the present disclosure may include structured data models such as, for example, boosting algorithms (e.g XGBoost), standard neural networks, and random forest models.

More generally, machine learning may include training a model to perform a task, the training including providing example training data to the model and iteratively optimizing model parameters until training criteria are satisfied. For example, a model may be trained to classify data using labelled datasets. In some embodiments, a model may be trained to use training input data to produce an output that closely matches training output data. Model training may include hyperparameter tuning, sizing of mini-batches, regularization and changes in network architectures. It should be understood that systems and methods contemplated herein include using available machine learning platforms and/or libraries to train and/or manage models (e.g., TENSORFLOW, PYTHON, MATLAB, KERAS, MICROSOFT COGNITIVE TOOLKIT, and/or any other machine learning platform). In some embodiments, training of machine learning models may be supervised and/or unsupervised. Training data may take many forms including, for example, the annotation of elements including but not limited to various architectural features (e.g. doors, door sills, windows, walls, rooms, etc.) and equipment (e.g. sensors, furniture, cabinetry, lighting fixtures, HVAC ducting, etc.)

During model training, a plurality of floor plans may be annotated in different ways to allow multi-type deep learning training and other possible artificial intelligence training techniques. Such annotations may be stored as CSV, JSON, masks, or other file types. As illustrative examples, annotations may include data denoting geometric objects such as boxes, oriented boxes, or polygons that identify or demarcate features of interest in a plurality of floor plans. These objects may be generated manually, for example, by drawing them over the image or automatically using heuristic, geometric or statistic algorithms, or generated or identified using other suitable techniques. Annotations may be used for training a model to perform a variety of tasks, including detection, segmentation, or classification tasks. More generally, annotations may assist in the training of any machine learning algorithm to perform a computer vision task or other artificial intelligence tasks. Annotation may also be applied when using statistical algorithms.

In some embodiments, training images may be cleaned by removing text, redundant features, or other elements. For example, when performing small object detection (e.g., detection of doors or door sills), a floor plan may be cropped into a size (e.g., 1000×1000 pixels) and afterwards recomposed and used with non-maximum suppression. Floor plans may be resized (e.g., resized to 1024×1024 or 512-512) before inputting to the artificial intelligence model for detection of larger objects, such as walls or room.

Annotated floor plans may be divided into training and validation sets. For detecting architectural features in the floor plans and predicting features, various deep learning models may be used including the following non-limiting illustrative examples. RetinaNet may be used based on the Resnet classification network. In another example, to detect door sill placement within a door, a classification deep neural network may be used such as Resnet. For segmentation of walls and rooms, which may be a base of a multi-purpose network, UNET may be employed, which includes encoder-decoder architecture to reconstruct semantic segmentation on top of the floor plan image.

Disclosed embodiments may include training deep learning networks on a specialized cloud system with an industrial GPU or with a variety of other types of machines. As an illustrative example, a trained deep learning model may be post-processed with computer visions algorithms. Such algorithms may include RANSAC, Hough lines, connected components algorithms, or other models suitable for computer vision.

In some embodiments the plurality of solutions may include an equipment model. An equipment model may include an identifier such as a numeric identifier, a textual identifier, a graphical identifier, or any other indication of a specific equipment model.

In some embodiments the plurality of solutions may include an equipment classification. Equipment Classification may include a textual and/or numeric identification to classify a piece of equipment based on its characteristics and/or technical specification (e.g. 1332ABB relates to all electrical circuit breakers). Additionally, or alternatively, an equipment classification may include an international standard such as OmniClass, MasterFormat Uniclass, IFC or International Harmonized Tarrif, Tax Code, etc. Additionally, or alternatively, an equipment classification may include a unique classification defined by a user and/or manufacturer and/or pre-loaded in the system.

In some embodiments the plurality of solutions may include a customized setting of equipment. A customized setting for equipment may include, for example, programming a computerized component of equipment in a manner that differs from default factory settings. This programming may include setting an IP address, setting a KNX address, or selecting an addressable fire alarm address or any other address suitable for a system standard for building automation. Additional examples of programming a component may include modifying device settings, modifying system parameters, uploading software or firmware, setting a display light (e.g., an LED color or status), changing a aperture, changing a field of view, selecting a frequency, selecting a power level, or any other change to a configuration of a computerized component of equipment.

In some cases, customizing an equipment setting may include establishing or changing a physical component of a piece of equipment. For example, it may include setting an orientation, rotation, and/or tilt of a lens in a CCTV camera in a manner that differs from its default factory setting. Customization may involve setting a voltage, a fuse, a power supply, a switch, or other electrical component.

Still other examples of customized setting of equipment may involve combining one or more pieces of equipment, each with their own separate order codes, configured to be fabricated or delivered inside a common chassis, housing, rack, or enclosure. By way of example, a customized setting may include configuring an electrical panel that includes an enclosure to be delivered as a single panel to a project. The enclosure may include circuit breakers, fuses, terminal locks, contactors, or other electronic hardware. A customized setting may involve combining protection devices to a lighting switch delivered with a backbox and cover plate, for example. More generally, a customized setting may include combining any primary and/or auxiliary equipment.

Consistent with the present disclosure, a customized setting may include customizing physical properties of one or pieces of equipment. For example, it may include a customized color, dimension, construction, door swing direction, or other feature of equipment's appearance or performance.

Customizing an equipment setting may involve generating a custom order code for ordering the customized equipment from a vendor or manufacturer. For example, customization may include specifying an optional or separately ordered accessory or auxiliary equipment. The accessary may include, for example, a peripheral, a lens, a masking lens, a breaker, a cover plate, a fuse, a cable, a mount or module with a piece of equipment, or other component that attaches to or enables performance of a piece of equipment.

In some embodiments the plurality of solutions may include wiring diagrams. A wiring diagram, in this context, may be optimized to include the shortest paths between points on the floor plan, or the shortest overall wire usage in the floor plan or a sub-part thereof. Generating wiring diagram may involving calculating paths. In some embodiments, points representing equipment and a terminal panel may be the ends of a path. To generate wiring diagrams, a calculation may be powered by a graph traversal algorithm such as Djikstra or BFS or any other relevant algorithm. The calculation may be based on architectural features, including corridors or walls. Embodiment may include using architectural features of the floor plan as weighting in a graph traversal algorithm.

Wiring diagrams included in solutions may be dynamic such that, when one piece of equipment is moved in the floor plan, at least some part of the calculation may be rerun to regenerate the diagram according to the modified data. Additionally, or alternatively, a calculation may be regenerated in response to a specific user request or as part of an automatic process configured to detect when changes are made to the equipment placement which require recalculation.

A wiring diagram may be generated using one of several optional typologies. In this context, typology signifies the type of route connecting between the devices. A home run typology is one in which every piece of equipment finds the shortest path to the panel (the "head end" or "home run") and uses that as its wiring route regardless of the paths connecting other pieces of equipment. As another example, a "travelling salesman" typology may connect all devices in a single path, where every device is connected to one device before and one after it in the path. A "maximal loop" typology may connect devices using a "travelling salesman" approach until a certain maximal amount of devices is reached, where the wiring will return to the terminal point. The foregoing exemplary typologies are not limiting on the embodiments, which include still other typologies for routing wires through a floor plan.

In some embodiments generatively analyzing the room may include generating a series of simulations. For example, generatively analyzing technical specifications may include running some combination of a weighted cost function, image analysis, geometric analysis, semantic analysis, floor plan analysis, topology analysis, BIM analysis, rule based design, statistical analysis, optimization, or any other data analysis as disclosed herein. The series of simulations may be run iteratively until a solution conforms to one or more functional requirements, for example. Simulations may be associated with scores reflecting a degree of conformance to functional requirements, and generative analysis may be performed until a simulation score reaches a predetermined threshold. The series of simulation may be generated based on user input indicating a number of simulations, a desired simulation performance score, or other parameter of the simulations. In some embodiments, user input may terminate an ongoing series of simulations. A generative analysis may not always include an optimization and may include a calculation or more concrete analysis, as described above. In some embodiments the generative analysis may apply a rule-based functional requirement for selecting and placing equipment, as described throughout the present disclosure. For example, the generative analysis may include placing a chair next to all desks or workstations corridor, inserting a door in all openings of a certain size, placing a piece of equipment where there is at least a certain tolerance of space (e.g. 10 cm on either of the equipment), placing a valve adjacent to all fan-coil units, spacing equipment at specified distances with a specified overlap, or various other forms of analysis that may be defined by a functional requirement. Various other details regarding rules are described throughout the present disclosure. Disclosed embodiments may include receiving a selection of a solution from the plurality of solutions, wherein the selected solution includes an equipment placement location. The selection may be based on user input or selected automatically by a system based on, for example, a performance score of a solution. Further, the selected solution may include an equipment placement location determined by the system. In some embodiments, instructions to vary an equipment location may be received. A location can be varied by modifying its location within a room along the X,Y and/or Z coordinates or any combination thereof. An equipment location may be varied, for example, in reference to a coordinate system of floor plan, a coordinate system of the respective rooms, a real-word coordinate system, or any other suitable representation of a placement location as described throughout the present disclosure. A location may be, for example, modified in 2D or 3D. In some embodiments, varying a location may also refer to modifying equipment mounting height, orientation, or directionality. In this context, embodiments may include receiving an instruction to vary a parameter associated with equipment in a selected solution. A parameter may include a technical specification or a setting of equipment. Such instructions may be received from a user, triggered automatically by the system, triggered based on criterion in a rule-based design system, or received from any other element of a system. Parameters associated with the equipment in a solution may include an equipment placement location, an equipment model, an equipment classification, a customized setting, a wiring diagram, an equipment mounting height, an equipment orientation, an equipment sensor type, a lux level, an energy consumption, a heating or cooling capacity, a dimension, a detection range, a resolution, an equipment setting, or any other equipment parameter and combinations thereof. Receiving instruction to vary parameters associated with the equipment in a solution allows for customization of a solution based on user preferences while additionally providing improvements in efficiency, speed, accuracy, level of detail, design capabilities, and project scale when selecting equipment for use in buildings. In some embodiments the system may receive instructions to vary two or more equipment parameters.

In some embodiments receiving instructions to vary the equipment placement location may include receiving instructions to remove equipment. Removal may include deleting equipment from a floor plan. For example, the system may receive instructions to remove a piece, set, or group of equipment from a solution. Additionally, or alternatively, the system may receive instructions to remove equipment based on a parameter associated with the equipment.

Consistent with the present disclosure, receiving instructions to vary the equipment placement location may include receiving instructions to add equipment. Adding equipment may include adding a representation of equipment on a floor plan. The system may receive instructions to add a piece, set, or group of equipment to a solution. Additionally or alternatively, the system may receiving instructions to add equipment based on a parameter associated with the equipment.

In some embodiments receiving instructions to vary the equipment placement location may include receiving instructions to add at least one accessory. For example, the system may receive instructions to add one or more accessories to a solution. An accessory (i.e., auxiliary equipment) may include a piece of electronic, mechanic or any other type of hardware that serves in a role in a making a system devised of one or more primary pieces of equipment functional or at least partially functional. An accessory may attach to or enable performance of a primary piece of equipment.

For example, the auxiliary equipment for a video camera may include a lens, cables, screws, mounting hardware, a patch panel, a video recorder, a network switch, a rack, and/or a UPS. As another example, the auxiliary equipment for a light fixture may include cables, a light switch, electrical breakers and an electrical panel board. Other examples of accessories include electrical enclosure with electrical circuit breakers; a power supply controller; a controller of an access control reader; a mount of a smoke detector; a mount for a TV or other furniture item; a handle; a bulb for a light fixture; an HDMI cable; or a valve for an AC unit. The relationship between primary and auxiliary equipment may be physical (e.g. a fuse may be inside a piece of equipment) or related/logical (e.g. an access reader may be paired with a controller via a cable connection).

In some embodiments receiving instructions to vary the equipment placement location may include receiving instructions to lock a manually modified parameter associated with at least one piece of equipment. For example, the system may receive instructions to lock a parameter upon receiving instructions to vary the parameter associated with the equipment in a solution. Examples of the many types of parameters that may locked include location, mounting height, orientation, directionality, and rotation. Locking a parameter may include preventing the system from modifying the parameter in a subsequent generative analysis. This would prevent user input from being removed, ignored, or otherwise modified by the system.

Disclosed embodiments may include generatively analyzing a room to update the selected solution based on the instructions to vary the equipment placement location. For example, a system may generatively analyze rooms as disclosed herein within a floor plan in order to update a selected solution based on the instructions received and to vary the equipment placement location or other parameter associated with at least on piece of equipment.

Disclosed embodiments may include displaying the updated solution. For example, the system may display of a graphical depiction of equipment location or type which are the result of the generative analysis process. The depiction may be drawn on top of the input floor plan. It may contain textual information regarding the model, placement, price, or parameters (a material list). The display may be supplemented by a representation of the solution in one of many forms. For example, a graphical display may include a text document, a chart or table, an image, a vector image file, a vector architectural file, or a BIM model. Files included in a display may be in a variety of formats, including Word™, Excel™, PDF, .JPG, .PNG, .DWG, .RVT or .IFC. In some embodiments, a graphical display of an solution may be based on a database or index containing information such as placement information and/or technical specifications. Information sufficient to generate the graphical display may be electronically transmitted to, for example, an enterprise resource planning system, a customer relationship management system, programming software, or other hardware or software component. Additionally or alternatively, an output may be displayed via a graphical user interface such as on a computer screen. The system may display the plurality of solutions, the updated solution, or both.

In some embodiments displaying may include a performance visualization. In further embodiments the performance visualization may be automatically updated based on instructions to vary an equipment location. A performance visualization may include a numeric identifier, a textual identifier, a graphical identifier, a 3D model, or any other visual representation of equipment and its associated function. A 3D model may be a three dimensional (e.g., length, wide, and height) representation of a solution that may be visualized on the display of a computer or hologram so that a user can visually interact with and understand the makeup of the space. This may be achieved using pixels, vectors, lines, and colored areas.

In some embodiments the at least one processor may be further configured to rate the plurality of solutions and to present an associated rating to a user. Rating the plurality of solutions may include calculating, assigning, or otherwise determining a metric for a solution, multiple solutions, or a portion of a solution. A metric may include a score, a percentage (such as a percentage of coverage), or any representation describing the solution, multiple solutions, or portion of a solution. For example, the system may rate a solution to determine Wi-Fi coverage in a floor plan and describe the rating as a percentage of total square feet of the floor plan covered by Wi-Fi.

Disclosed embodiments may include enabling the user to copy one piece of equipment manually modified from the updated solution. For example, the system may receive input modifying a parameter associated with a piece of equipment and enable the piece of equipment and associated parameters to be saved or copied. The system may enable saving or copying of a piece of equipment with the associated parameters, of the equipment alone, or of the associated parameters alone. Additionally, or alternatively, the system may enable a user to apply a manually modified parameter of a first piece of equipment to a second piece of equipment. For example, the system may enable a piece of equipment and associated parameters that has been saved or copied to be replicated or pasted elsewhere in the solution or in another solution. The system may enable replicating or pasting of a piece of equipment with the associated parameters, of the equipment alone, or of the associated parameters alone.

In some embodiments, identifying room contours and/or semantic enrichment and/or the generative analyzing process may be computed on a cloud-based servers or interface or retrieved from a cloud-based interface. A cloud-based interface may be any user interface allowing a user to download, upload, or otherwise interact with data stored in remote servers. In some embodiments, the remote servers may be managed by a hosting company, such as IBM® Cloud, Amazon® Web Services, or similar online storage platforms. More generally, cloud-based may refer to applications, services, or resources made available to users on demand via the internet from a cloud computing provider's servers. Cloud-based computing can increase capacity, enhance functionality, or add additional services on demand at reduced infrastructure and labor costs. Cloud based services may be used to allow complex, computationally expensive algorithms to be accessed by users directly through their browsers without the need to download software to their personal computers. In some embodiments, machine learning models such as one or more ResNet models trained to classify architectural features or classifications model such as XGBoost trained to predict room functions, may be stored, for example, in cloud based file hosting services (such as Amazon S3, Azure Blob storage, Google cloud storage, DigitalOcean spaces, etc). The model, for example, may be fetched and loaded into memory (RAM) by microservices during their initialization. Once loaded into RAM, the microservices may able to receive requests in the form of messages (such as synchronous HTTP messages; asynchronous messages via message broking software/services such as Amazon SQS, RabbitMQ, KafkaMQ, ZeroMQ; persistent connection such as websockets or raw TCP sockets, or raw non-persistent packets via the UDP protocol, etc.). Once a request is received, the service may, for example, invoke the model with the payload of the message (such as bitmaps, text, or other appropriate data structures the model was trained with), and receives a result (with a data structure that is based on the type of model) in return. The service then may respond, for example, with the generated machine learning model result. In some embodiments, a series of simulations or an optimization process may be run on the cloud. A Cloud based optimization may be, for example, based on orchestration of one or many microservices that execute an algorithm. For example, an orchestrating service may receive the locations of resources, or the actual resources in either raw binary or human-readable data structure, as well as any other parameters and metadata that may be required for the book keeping (e.g. in a database, in-memory cache service, or file storage services). The orchestrating service then may, for example, preprocess the resources and parameters, and generate permutations that may be dispatched (by either synchronous or asynchronous messaging schemes, often depending on the expected runtime duration of the algorithm) to worker microservices that may be responsible for the actual execution of the optimization algorithm. There may also be additional intermediate steps, for example, between the main algorithm orchestrator and the worker microservices. Upon completion of the optimization algorithm, the microservices may dispatch, for example, a mirroring message that signifies the completion of the algorithm. Artifacts and intermediate results may be kept in in-memory caching services (such as Redis) or in file storage services (such as Amazon S3) for example. The orchestrator or the intermediate orchestrating services may then, for example, postprocess the results (and any of the aforementioned intermediate artifacts and results of the process) of the optimization algorithm, and may choose, for example, to dispatch additional requests based on the nature and performance of the results. After all expected results are received in the algorithm orchestrator, a message may dispatched back, for example, notifying the optimization process is complete, accompanied by either the results (or the locations of the results in file storage services/databases), as well as any other relevant artifacts and intermediate results generated in the process.

By way of example, FIGS. 14A through 15E depict a method for updating a solution. FIG. 14A depicts a schematic illustration of an exemplary floor plan 1401. The floor plan 1401 may be received in any of the ways described earlier. FIG. 14B depicts exemplary user inputs 1403 and 1407 to the floor plan. User inputs may be received via a keyboard, a touch screen, a mouse, a trackpad, or other suitable means for entering information into a computerized system. The user inputs may include functional requirements 1405 and 1409 associated with respective rooms, as indicated by shading in FIG. 14B. After a functional requirement input, a user may select a piece of equipment or a technical specification for association with the respective rooms, and may touch a display at locations 1403 and 1407 to indicate suggested locations for a piece of equipment. Alternatively, the equipment specifications may be chosen from a pick list presented on a display, omitting a desired location, which can be calculated by the system as part of a generative analysis. In yet another embodiment, after the functional requirements are selected, the user may indicate the general spaces to which those requirements should be applied. In some embodiments, the room contours may have been identified through the processing described above which enables a user to apply the functional requirements to the entire boundaries of the room without the need to manually define the room boundaries. This can occur by touching or otherwise selecting the spaces through a touch (1403, 1407), a click, or a pick. In doing so, an entire bounded area may be identified for application of functional requirements. Shading or colorization may be applied to the selected area to confirm that the functional requirements are applied to that area. A key may be displayed to the user indicating the functional requirements that conform to the colorization or shading.

Figure 14C:
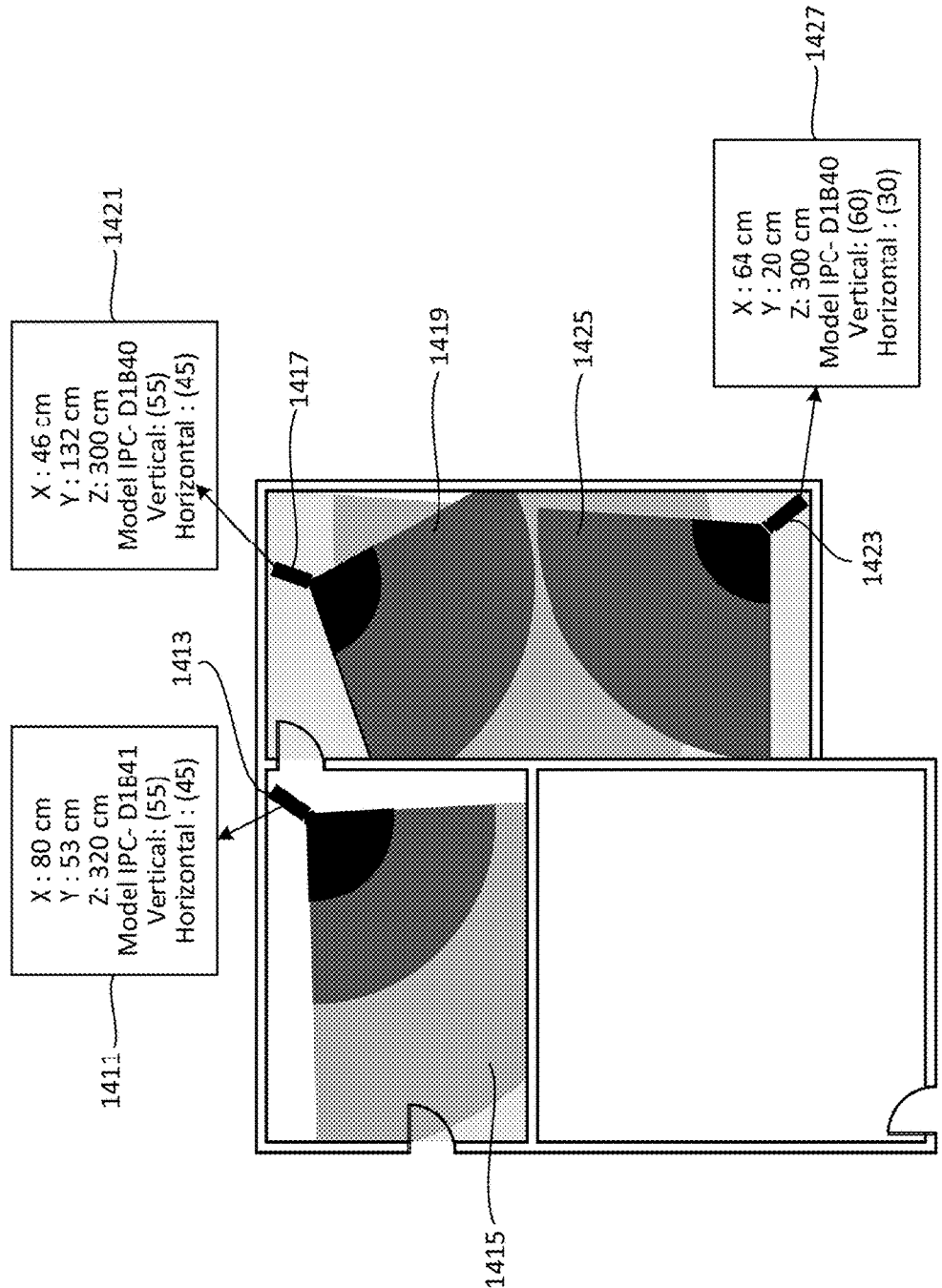
FIG. 14C depicts an exemplary solution as a result of generative analysis indicating equipment placement and providing specification details, consistent with disclosed embodiments.

Continuing the example, FIG. 14C depicts a graphical representation of an exemplary solution as a result of a generative analysis. As shown, the solution indicates the placement of sensor 1413, sensor 1417, and sensor 1423. Further, the solution may include a detection range 1415, 1419, and 1425 associated with sensors 1413, 1417, and 1423, respectively. The solution may also include specification details 1411, 1421, and 1427 associated with respective sensors 1413, 1417, and 1423. Specification details may include equipment placement location expressed in (X, Y, Z) coordinates, an equipment model, and equipment orientation express in vertical and horizontal rotation (in degrees), or any other relevant detail depending on the specific use case.

A user may desire to update the solution of FIG. 14C. Accordingly, FIG. 14D depicts exemplary user input 1429 varying the equipment location of a sensor. User input 1429 depicts a user selecting sensor 1417 and changing the location of sensor 1417 to a new location as indicated by user input 1431. Although depicted by way of example as an input on a touch screen, the location may be varied in other ways such as by drag and drop or point and click with a mouse.

Following instructions to vary an equipment location, the system may generate an updated solution. As with the original solution, the updated solution may occur through generative analysis. The updated solution may differ from the user's instructions in that one or more of the desired equipment locations, specified equipment, or specified setting may vary. The user may be provided with a series of options illustrating how the functional requirements can be more closely met if another piece of equipment is chosen, another location is chosen, and/or another setting is selected.

Figure 14E:
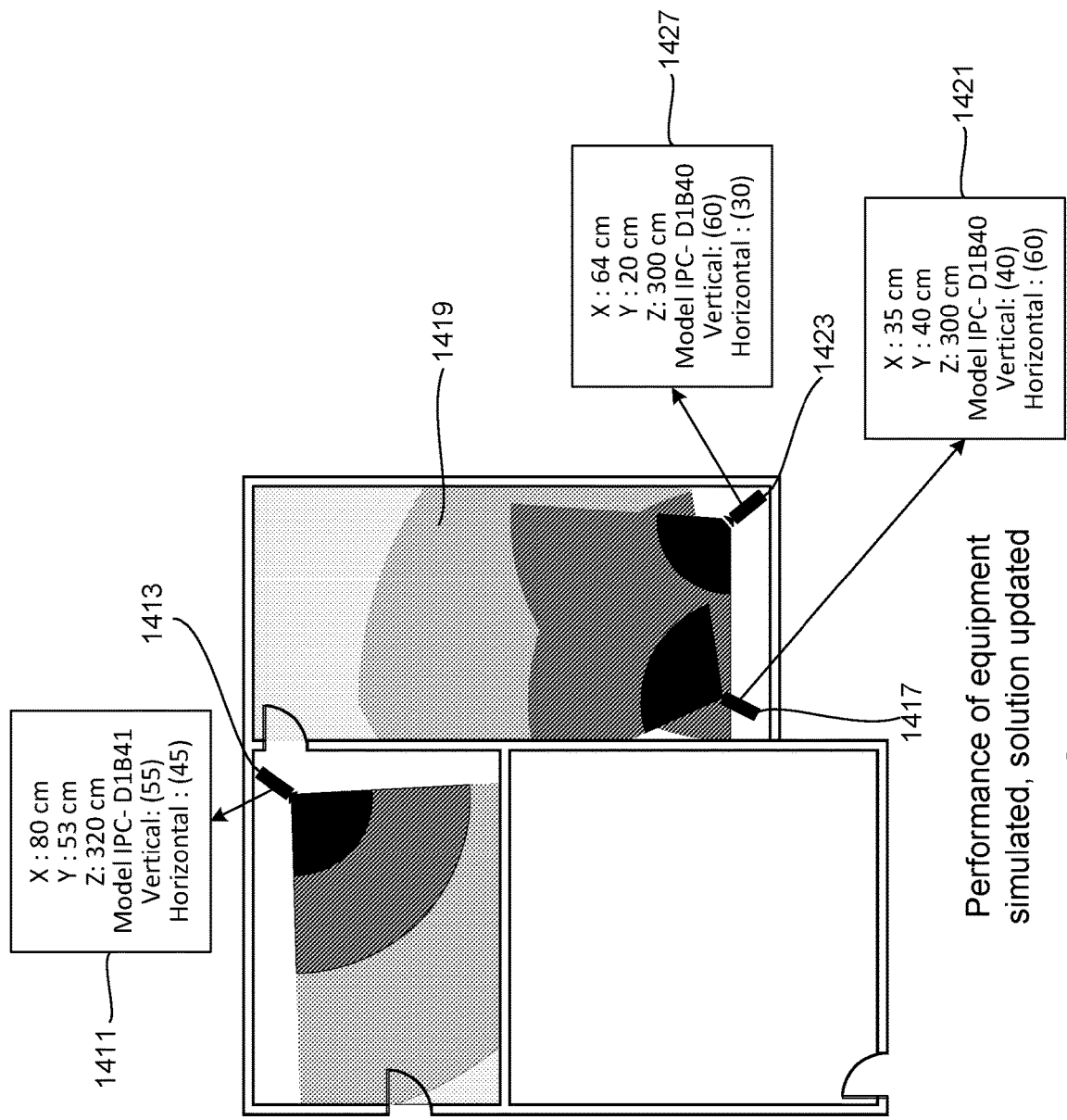
FIG. 14E depicts an exemplary updated solution as a result of generative analysis indicating equipment placement and providing specification details, consistent with disclosed embodiments.

FIG. 14E depicts an exemplary updated solution as a result of generative analysis using the updated placement of sensor 1417 as provided by user input. The updated solution may include specification details 1421 consistent with the updated position.

Figure 15A:
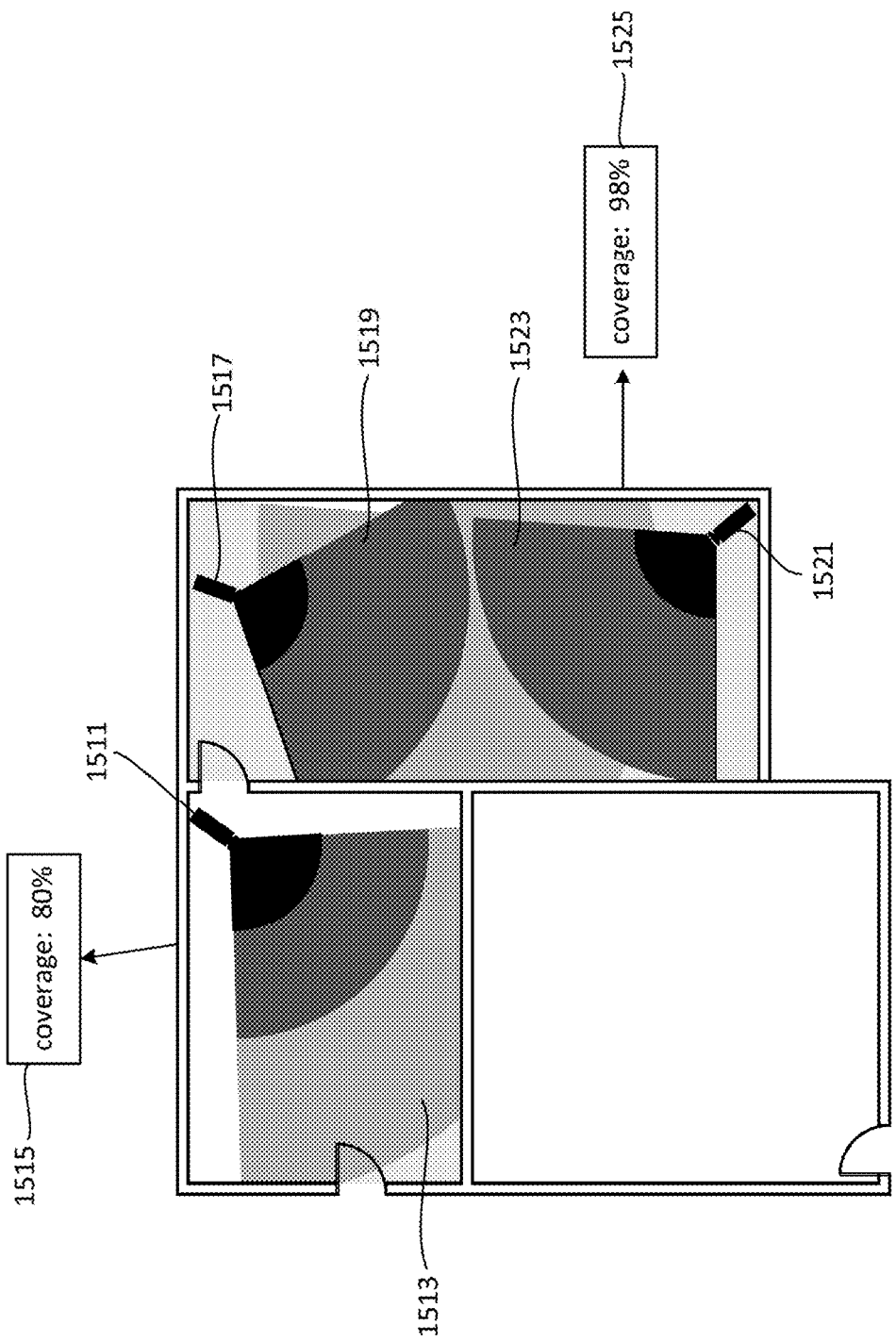
FIG. 15A depicts an exemplary solution as a result of generative analysis indicating equipment placement and providing specification details, consistent with disclosed embodiments.
Figure 15B:
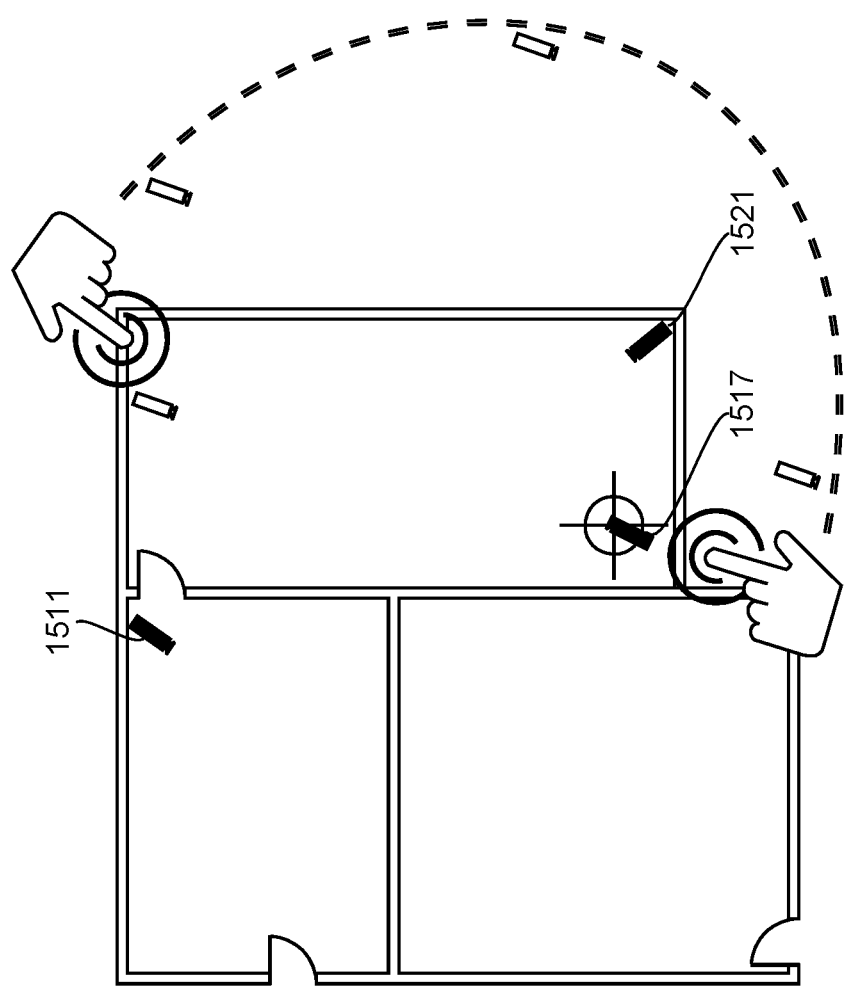
FIG. 15B depicts exemplary user input varying equipment location, consistent with disclosed embodiments.
Figure 15C:
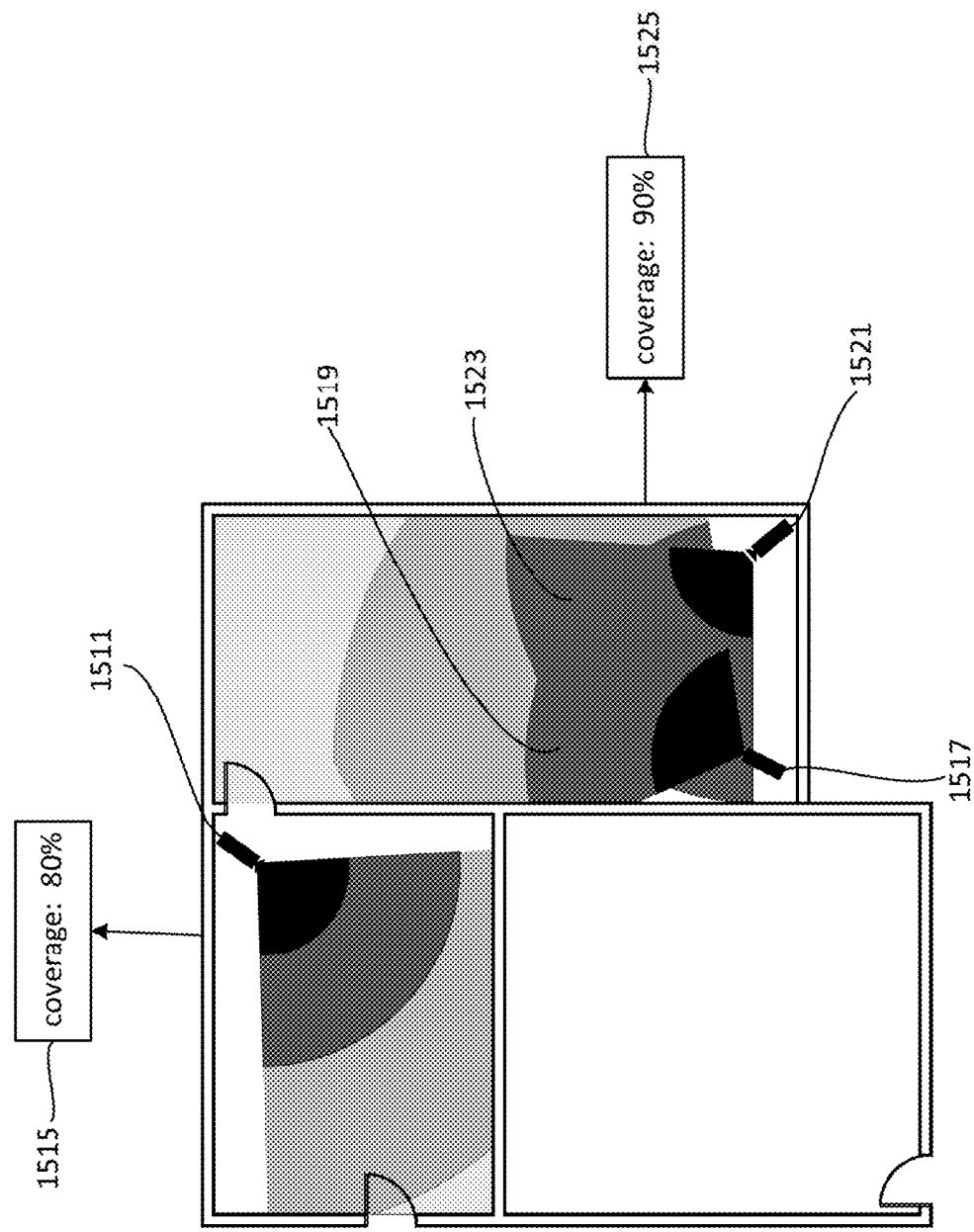
FIG. 15C depicts an exemplary updated solution as a result of generative analysis indicating equipment placement and providing specification details, consistent with disclosed embodiments.

By way of example, FIGS. 15A through 15C depict another exemplary method for updating a solution. Based on a received floor plan and received functional requirements such as described earlier in connection with FIGS. 14A and 14B, and based on instructions to vary an equipment location such as described earlier in connection with FIG. 14D, the system may generate solutions. FIG. 15A may represent an original solution and FIG. 15B may represent an updated solution following update instructions.

More specifically, the delta between FIGS. 15A and 15B represents an exemplary updated solution. Initially, as reflected in FIG. 15A, generative analysis placed sensors 1511, 1517, and 1521. Such a solution may include a depiction of coverage area 1513, coverage area 1519, and coverage area 1523 associated with sensor 1511, sensor 1517, and sensor 1521, respectively. Further, the solution may include a rating of the solution 1515, 1525 for each room expressed in a coverage percentage.

A user may update the solution, as discussed earlier in connection with FIG. 14D. Based on the instructions, the system may update the solution. FIG. 15B depicts an exemplary updated solution as a result of generative analysis indicating the updated placement of sensor 1517 and providing specification details 1525 for the room consistent with the updated position.

Figure 16A:
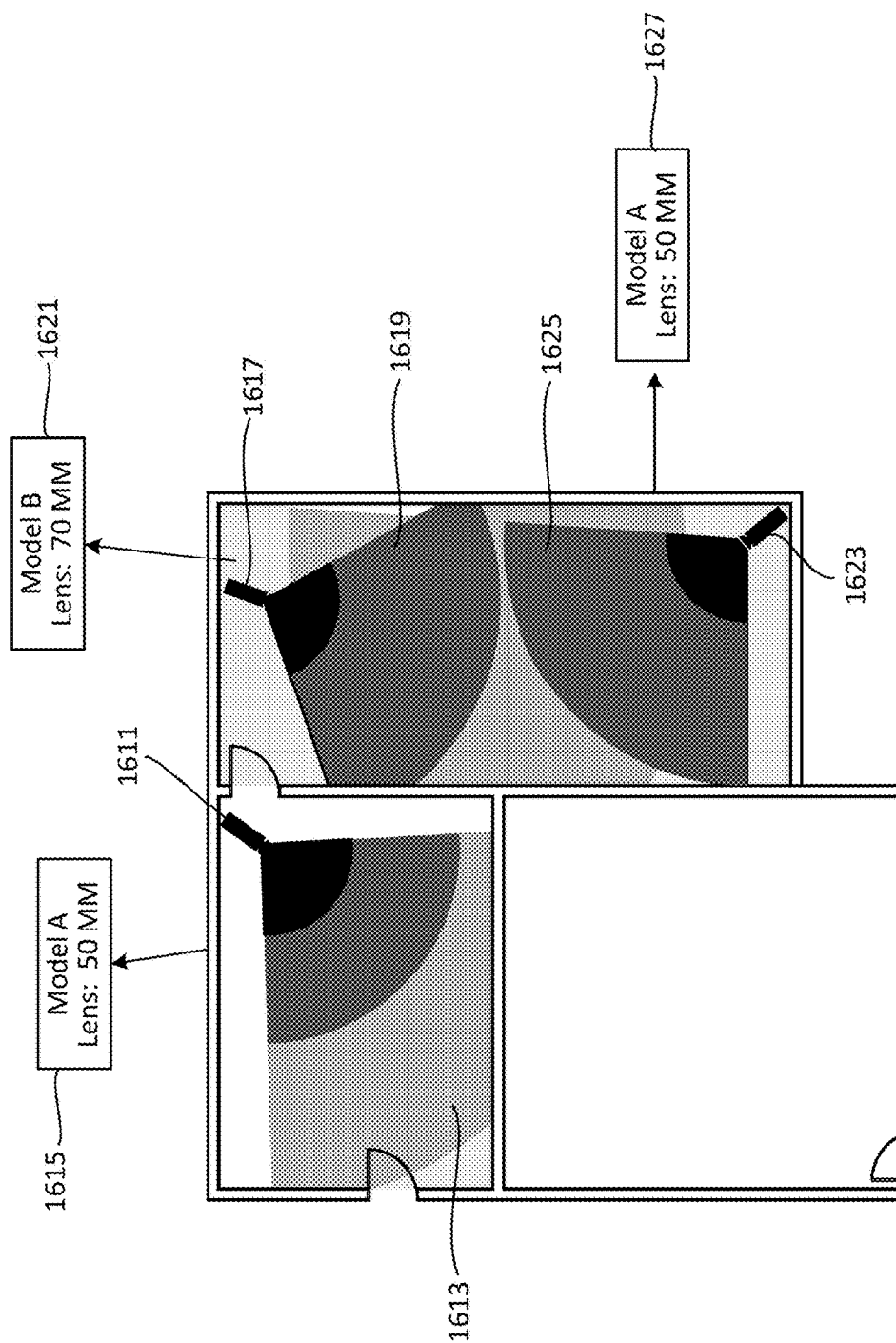
FIG. 16A depicts an exemplary solution as a result of generative analysis indicating equipment placement and providing specification details, consistent with disclosed embodiments.
Figure 16B:
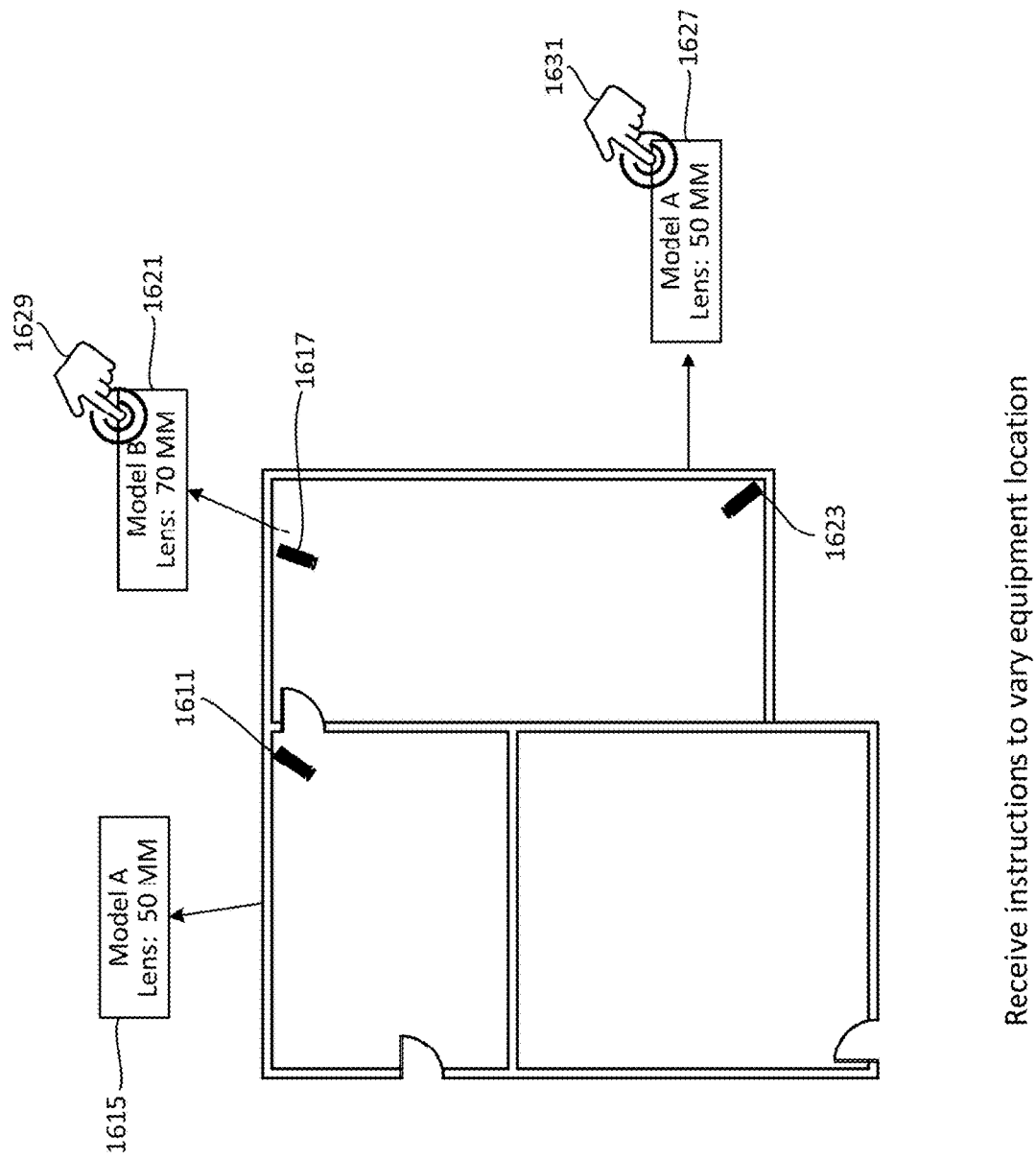
FIG. 16B depicts exemplary user input varying equipment model type, consistent with disclosed embodiments.
Figure 16C:
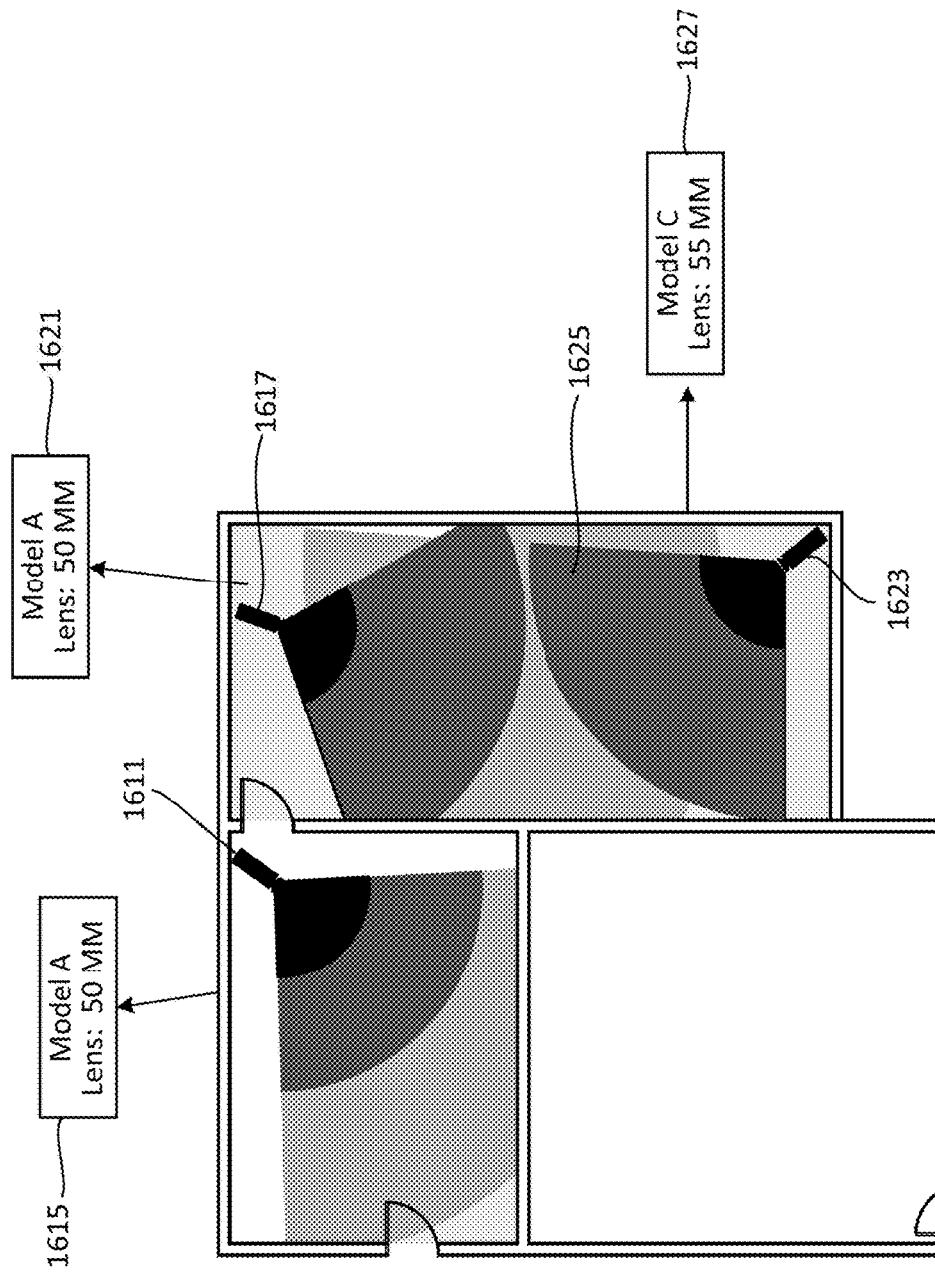
FIG. 16C depicts an exemplary updated solution as a result of generative analysis indicating equipment placement and providing specification details, consistent with disclosed embodiments.

By way of example, FIGS. 16A-C depict another exemplary method for updating a solution. FIG. 16A depicts an exemplary solution as a result of generative analysis indicating the equipment model and focal length 1615 of camera 1611, the equipment model and focal length 1621 of camera 1617, and the equipment model and focal length 1627 of camera 1623. The solution may include a depiction of coverage area 1613, coverage area 1619, and coverage area 1625 associated with camera 1611, camera 1617, and camera 1623, respectively. FIG. 16B depicts exemplary user input 1629 varying equipment model for camera 1617 and user input 1631 varying equipment model for camera 1623. FIG. 16C depicts an exemplary updated solution as a result of generative analysis indicating the updated equipment model and focal length 1621 of camera 1617 and the updated equipment model and focal length 1627 of camera 1623.

Figure 17B:
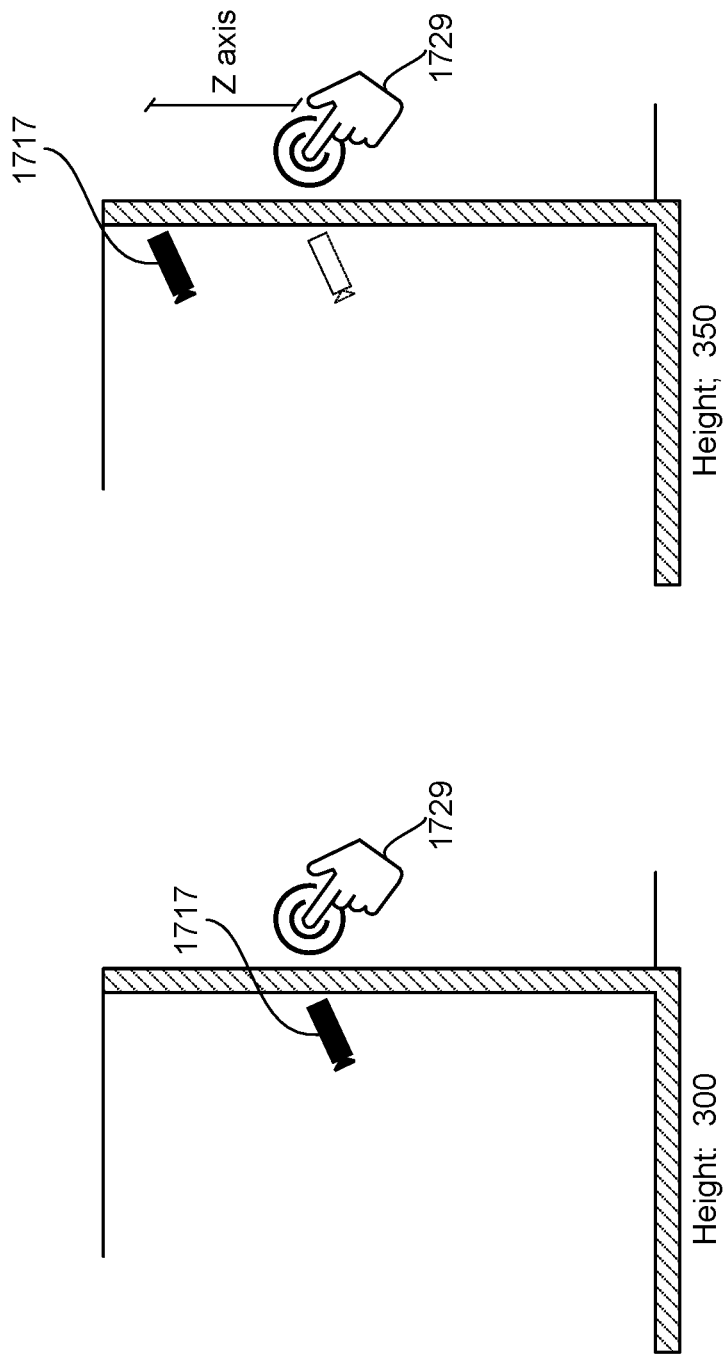
FIG. 17B depicts exemplary user input varying equipment height, consistent with disclosed embodiments.
Figure 17C:
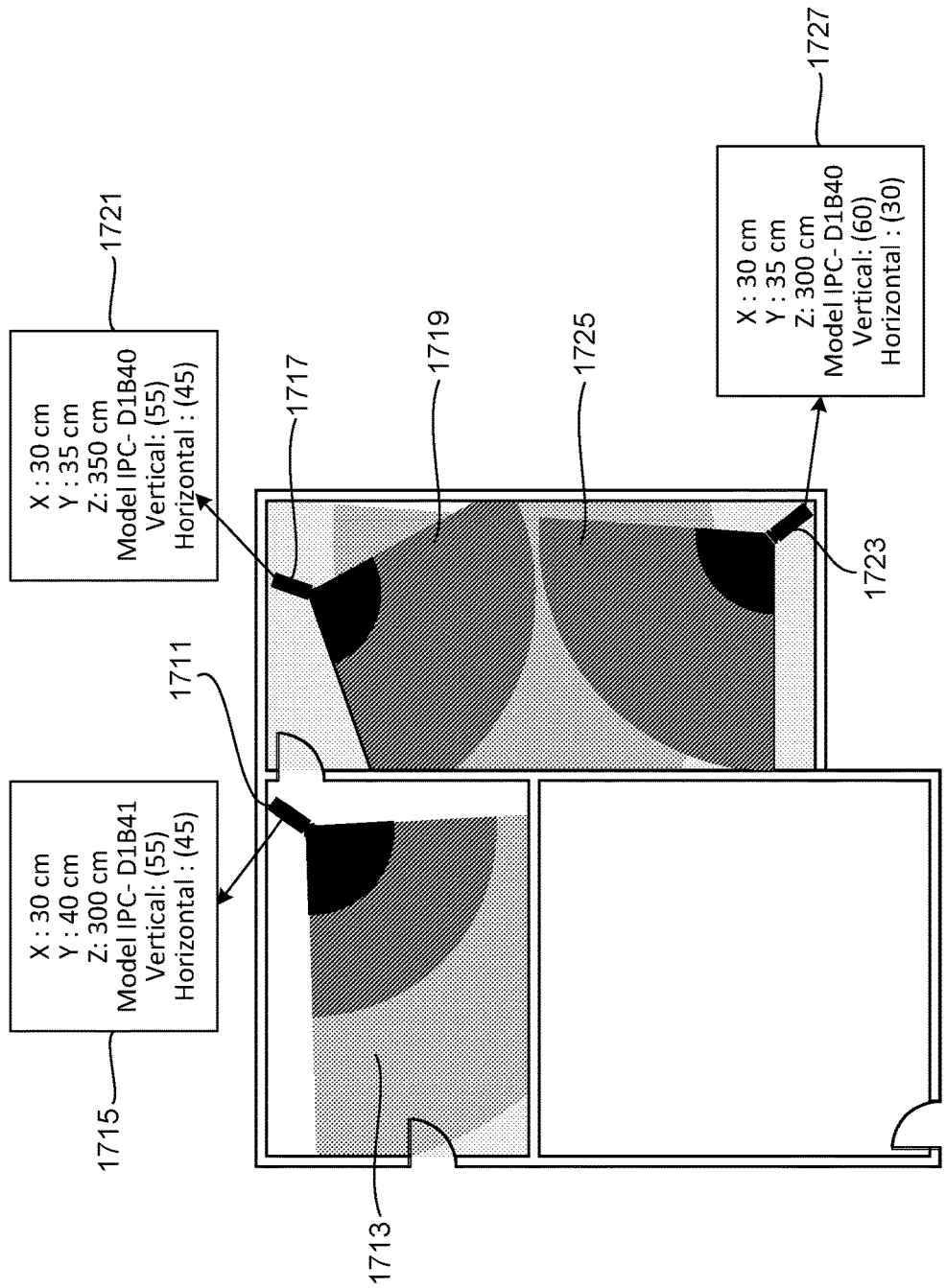
FIG. 17C depicts an exemplary updated solution as a result of generative analysis indicating equipment placement and providing specification details, consistent with disclosed embodiments.

By way of example, FIGS. 17A-C depict another exemplary method for updating a solution. FIG. 17A depicts an initial generative solution. The solution may include a detection range 1713, 1719, and 1725 associated with sensors 1711, 1717, and 1723, respectively. The solution may further include specification details 1715, 1721, and 1727 associated with sensor 1711, sensor 1717, and sensor 1723, respectively. Specification details 1715, 1721, and 1727 may include equipment placement location expressed in (X, Y, Z) coordinates, an equipment model, and equipment orientation express in vertical and horizontal rotation (in degrees). FIG. 17B illustrates input 1729 by a user changing the mounting height (Z position) of equipment 1717 placed by the initial generative analysis. FIG. 17C depicts an exemplary updated solution as a result of generative analysis indicating the updated placement of sensor 1717 and providing updated specification details 1721 consistent with the updated mounting height (Z position).

Figure 18A:
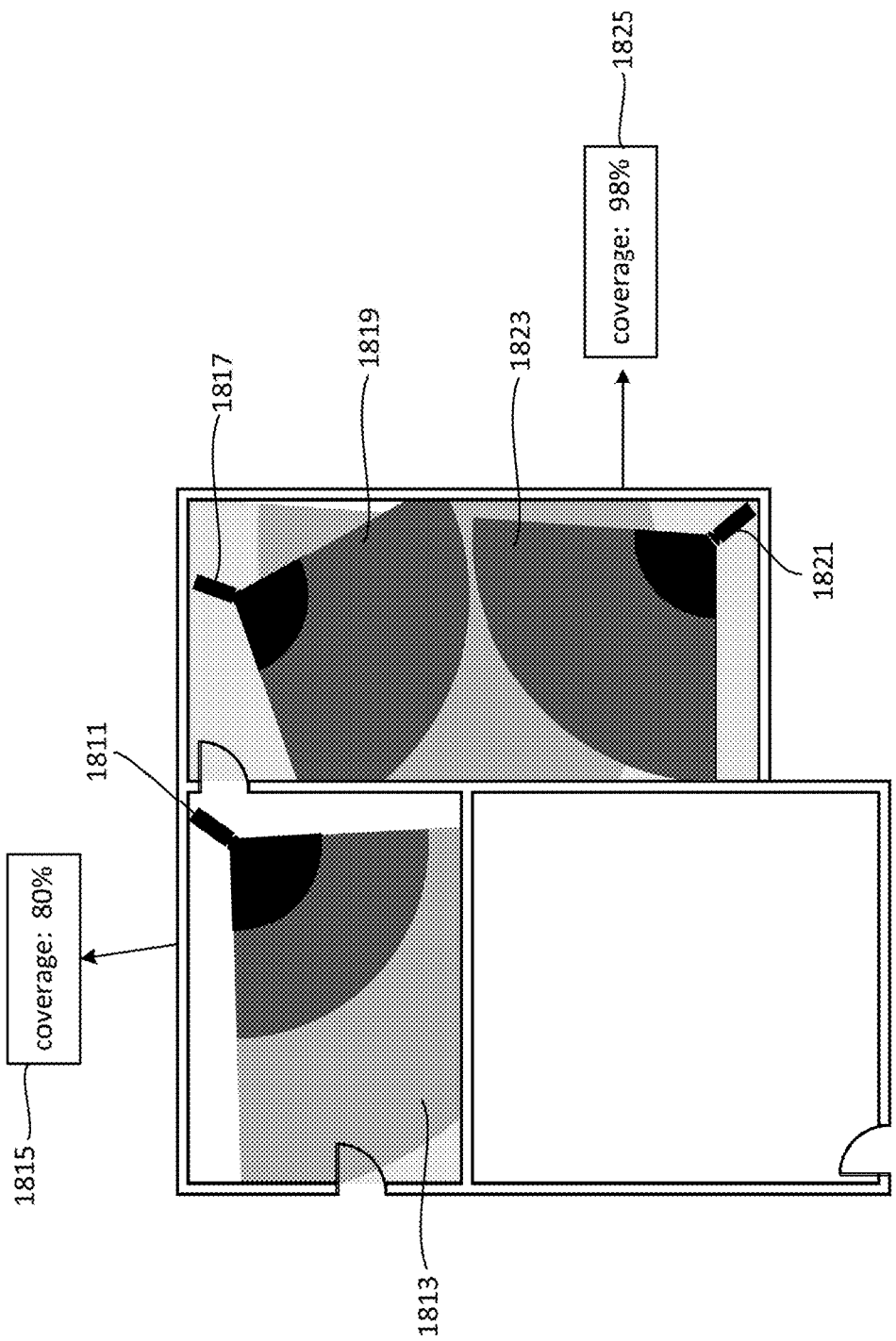
FIG. 18A depicts an exemplary solution as a result of generative analysis indicating equipment placement and providing specification details, consistent with disclosed embodiments.
Figure 18B:
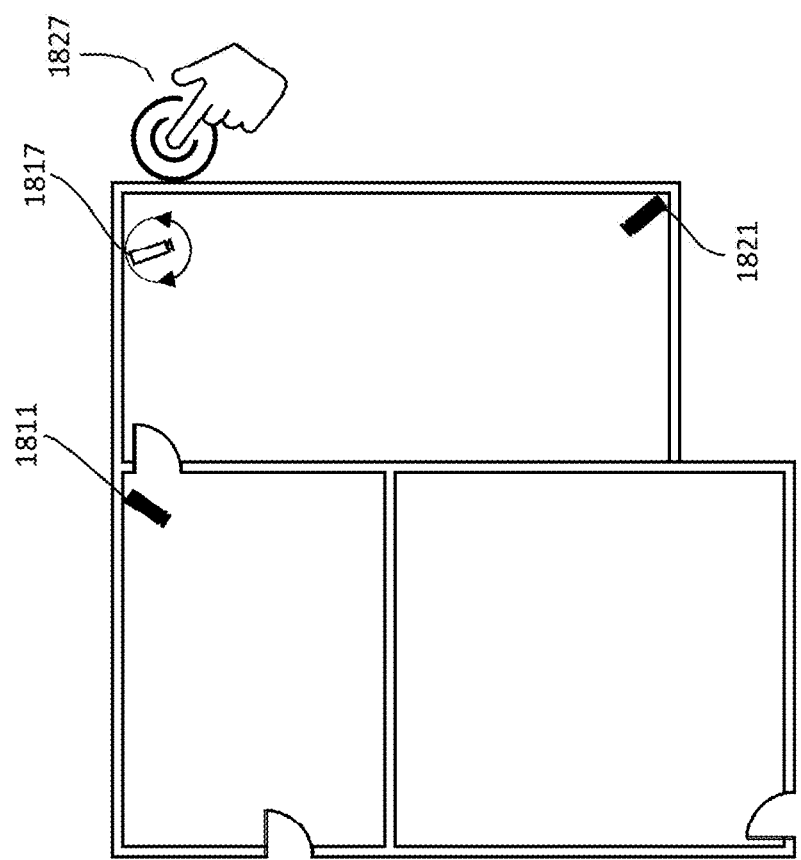
FIG. 18B depicts exemplary user input varying equipment orientation, consistent with disclosed embodiments.
Figure 18C:
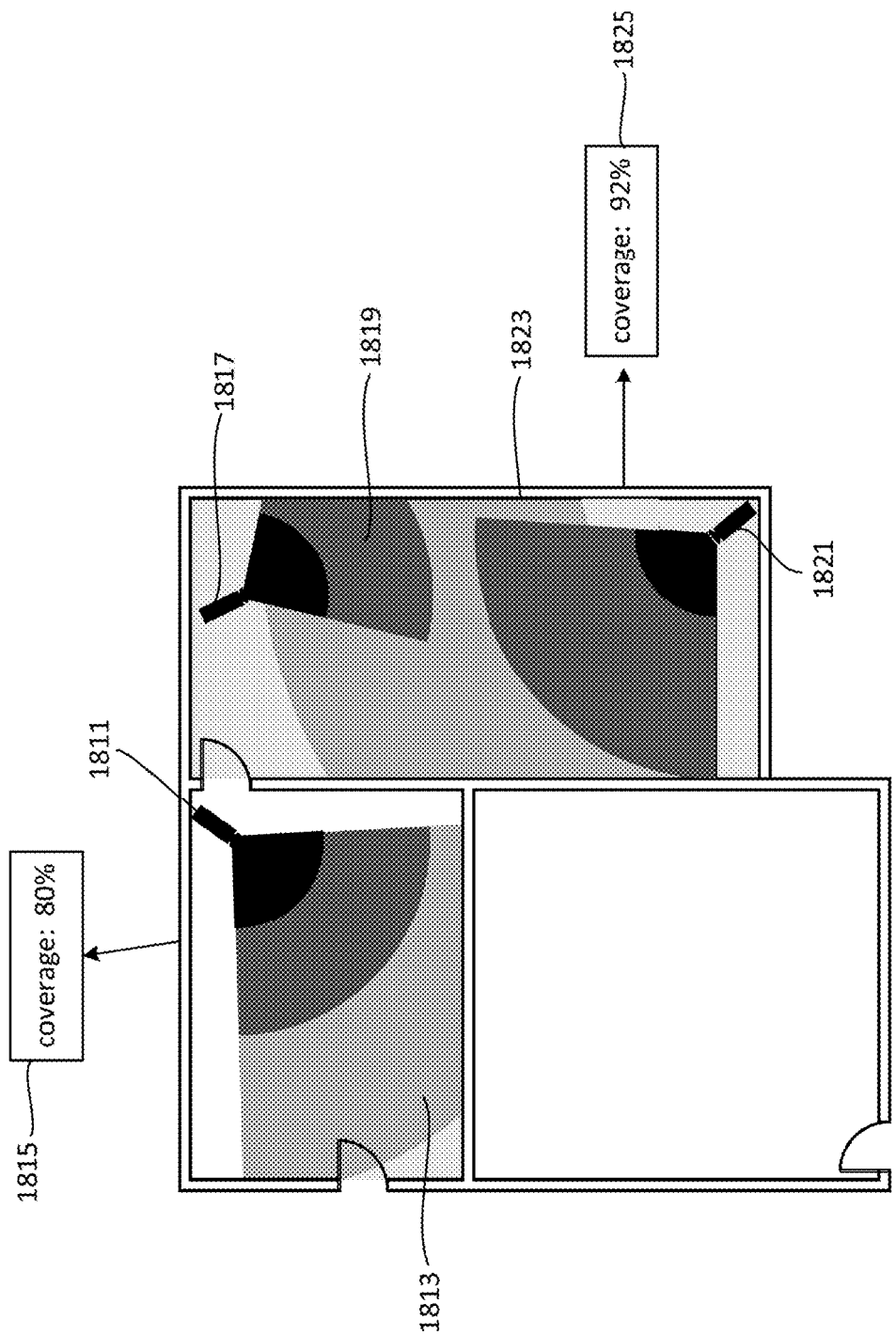
FIG. 18C depicts an exemplary updated solution as a result of generative analysis indicating equipment placement and providing specification details, consistent with disclosed embodiments.

By way of another example, FIGS. 18A through 18C depict another exemplary method for updating a solution. FIG. 18A depicts an exemplary solution as a result of generative analysis indicating the placement of camera 1811, camera 1817, and camera 1821. The solution may include a depiction of coverage area 1813, coverage area 1819, and coverage area 1823 associated with camera 1811, camera 1817, and camera 1821, respectively. The solution may include a rating of the solution 1815, 1825 for each room expressed in a coverage percentage. FIG. 18B depicts exemplary user input 1827 varying the orientation of camera 1817. User input 1827 depicts a user selecting camera 1817 and changing the orientation of camera 1817. FIG. 18C depicts an exemplary updated solution as a result of an updated generative analysis reflecting the updated orientation of camera 1817 and providing updated specification details 1825 for the room consistent with the updated orientation.

Figure 19:
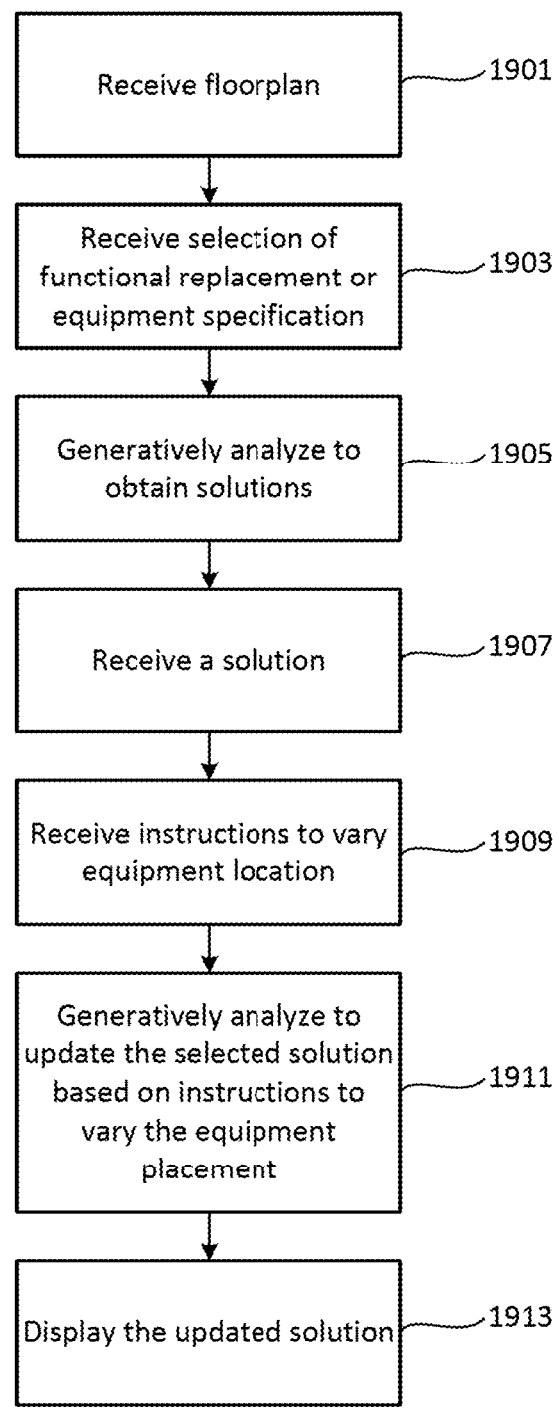
FIG. 19 depicts an exemplary flow chart of a process for selecting equipment for use in buildings, consistent with disclosed embodiments.

FIG. 19 is a flowchart of an exemplary process for selecting equipment for use in buildings, consistent with disclosed embodiments. The process may be performed by at least one processor. In some embodiments the process is not necessarily limited to the steps illustrated and any of the various embodiments described herein may be included in or excluded from the process.

At step 1901, the process may include receiving a floor plan demarcating contours of a room. As discussed herein, a floor plan may be received in any medium containing a representation of a floor plan. For example, a floor plan may be received as a digital, textual, hand drawn, hard copy, photographic, or any other representation of a floor plan capable of being stored in a data structure.

At step 1903, as discussed previously, the process may include receiving a selection of at least one functional requirement or equipment specification associated with the room.

At step 1905, the process may include generatively analyzing the room to obtain a plurality of solutions that at least partially conform to the at least one functional requirement or equipment specification. The generative analysis may consider a functional requirement or equipment specification, as discussed earlier. As described here, generative analysis may include, for example, image analysis, geometric analysis, or semantic enrichment. Generative analysis may further include machine learning.

At step 1907, the process may include receiving a solution. The solution may be an optimized solution. An optimized solution may be one designed to maximize compliance with functional specifications, minimize cost, minimize labor hours, minimize total wire usage, or maximize or minimize any other design constraint. Alternatively, the solution may be one that balances multiple factors and does not necessarily optimize any one factor or constraint. Multiple solutions may be provided along with an indication of the extent to which each solution complies with a particular design constraint. (E.g., one solution might be lowest cost; another solution might be maximal compliance with functional specifications; etc.). Each solution may be accompanied by an indication of an extent of compliance with a design constraint (E.g., Solution 1 is 15% higher cost than Solution 2, but is 10% more compliant with functional specifications.) Rules might set defining thresholds for selections of a preferred solution. (E.g., if functional requirements are within 5% of specifications, select lowest cost option.). Alternatively, or additionally, the user may be provided with the ability to override the system's preferred solution. At step 1909, the process may include receiving instructions to vary equipment location. The instructions may be received via a user interface. By way of example only, receiving instructions to vary equipment locations may include any of the examples discussed in connection with FIGS. 14D, 16B, 17B, 18B, or any other examples consistent with disclosed embodiments.

At step 1911, the process may include generatively analyzing the room to update the selected solution based on the instructions to vary the equipment placement location, as discussed earlier.

At step 1913, the process may include displaying the updated solution. Displaying the solution may include generating and displaying a graphical representation of a floor plan that includes equipment placement locations, equipment technical specifications, a solution performance score, or other information related to the solution. Alternatively, displaying the updated solution may include displaying information in non-graphical form or in a different graphical form.

As previously discussed, the present disclosure relates to a method and a system for selecting equipment for use in buildings, as well as a non-transitory computer-readable medium that may include instructions that, when executed by at least one processor, cause the at least one processor to execute operations enabling selection of equipment for use in buildings.

In accordance with the present disclosure, a structural design system, method, and/or computer readable medium may be provided for automatically positioning primary equipment and auxiliary equipment in a floor plan. For ease of discussion, a system is described below, with the understanding that aspects of the system apply equally to methods, devices, and computer readable media. For example, some aspects of such a system may occur electronically over a network that is either wired, wireless, or both. Other aspects of such a system may occur using non-electronic means. In a broadest sense, the system is not limited to particular physical and/or electronic instrumentalities, but rather may be accomplished using many differing instrumentalities.

Consistent with disclosed embodiments, a system may include at least one processor configured to access a floor plan demarcating a plurality of rooms. Demarcations may include information indicating the location of one or more rooms in a plan in relation to the rest of the plan. Generally, a room may include any fully or partially enclosed section of a building, the boundaries of the enclosed section (sometimes referred to as contours) of the room, the openings associated with the room's borders, equipment, or architectural features contained within the enclosed section.

Consistent with disclosed embodiments, the at least one processor may be configured to assign functional requirements to each of a plurality of rooms. A functional requirement may include a description of performance parameters expected from a system, as discussed in greater detail herein. Assigning functional requirements to each of the plurality of rooms may include selecting one or more functional requirements for application. This selection process may repeat for a plurality of rooms. For example, assigning functional requirements to each of the plurality of rooms may include presenting an interface enabling a user to select and assign functional requirements on a room-by-room basis. Assigning a functional requirement to a room may include storing information indicating the assignment in a data structure. In some aspect, assigning may include updating a floor plan with data indicating an association between a functional requirement and a room. Further, a user may be enabled to interact with a representation of a room in a floor plan to retrieve or display information related to a functional requirement assigned to a room.

In this context, an interface may allow a user to select one or more elements on the screen. Further, an interface may allow a user to apply certain operations to those elements, to add, edit, and/or delete elements, and/or to interact with the elements in any way. Selecting and assigning functional requirements may include allowing a user to identify and attach one or more appropriate functional requirements to a room, and embodiments may include repeating this process for a plurality of rooms, one room at a time.

Consistent with disclosed embodiments, the at least one processor may be configured to access at least one data structure containing technical specifications for primary equipment and auxiliary equipment, and further containing locations of primary equipment and compatibility rules associating primary and auxiliary equipment. As disclosed, at least one data structure may refer to any type of data stored in a processor in an organized, searchable manner. Technical specifications may include but are not limited to one or more of an equipment specification, a model identifier, or any technical characteristic describing one or more properties of a piece of equipment. Locations may include information regarding the position of a piece of equipment within a floor plan.

Compatibility rules may be rules designed to ascertain the compatibility between two pieces of equipment. For example, if one piece of equipment uses a data cable of type A, and the other of type B, and A and B are non-interchangeable, a compatibility rule would prevent using the two pieces of equipment together without an interface that permits their connection. Compatibility rules may be positive-"equipment W is compatible with all equipment which is X;" negative-"equipment Y is not compatible with any equipment which is Z;" and/or composite-"equipment Z is compatible with any equipment which is X but not Y." More generally, compatibility rules may contain any Boolean logical expression. Further, compatibility rules may require calculations, thresholding, or other types of mathematical analysis. For example, a compatibility rule may be related a cable length, signal strength, field of view, zoom, focus, or other measurable property of equipment. Compatibility rules may constrain power supplies, data cable types, data transfer protocols, compression formats, input and output types, and/or any of a myriad of properties of equipment. Compatibility rules may constrain the maximum or minimum distance between a piece of primary equipment with a piece auxiliary equipment.

Compatibility rules may be pre-stored in one or more data structures. A data structure containing a pre-stored compatibility rule may be organized in a searchable manner. A data structure containing a compatibility rule may be stored in local memory, in a database, in cloud storage, or other storage location. In some examples, compatibility rules may be user definable, and users may be enabled to create, modify, or delete compatibility rules via an interface.

Embodiments may include generatively analyzing a floor plan using functional requirements and technical specifications for primary equipment to select and position in the floor plan primary equipment to at least partially conform to the functional requirements for each of the plurality of rooms. As disclosed herein, a generative analysis may include deriving a solution to a problem, geometric, mathematical, physical, or otherwise, may be arrived at by a computational device. Generative analysis may be performed to identify a solution that includes a technical specification, type, brand, model, settings, configurations, parameters, and/or placement of a piece of equipment in a way that satisfies the demands of the problem. The solution may fulfill the functional requirement in full or in part. For example, a functional requirement may be to cover all of a room, but a solution may include a camera covering just 80% of a room, only partially conforming to the requirement.

By way of example, FIG. 20A illustrates equipment selection and placement in floor plan 2000 based on functional requirements to provide protect occupants from fire. Rooms and corridors of floor plan 2000 include selected primary equipment represented by various symbols. For example, room 2002 includes led flasher 2004 and smoke detector 2006. As shown, floor plan 2000 may include still other types of primary equipment, such as emergency break glass 2008, toilet 2010, sink 2012. As further examples, a generative analysis may lead to selection of a group 2020 of primary equipment, such as led flasher 2004, smoke detector 2006, emergency break glass 2008, water sprinkler 2022, heat detector 2024, and alarm 2027.

Disclosed embodiments may include considering one or more locations of architectural features within each of the plurality of rooms during a generative analysis. Architectural features may be any part of a building and may include a zone, room, wall, half wall, door, window, column, stairs, handrail, beam, and/or any other permanent part of the building, as discussed in greater detail herein. By considering locations of architectural features within each of the plurality of rooms, embodiments may reduce or eliminate overlap in the placement of primary and auxiliary equipment with architectural features. In some embodiments, the material and technical characteristic of architectural features may be considered. For example, the generative analysis process may select a different auxiliary equipment mount for a concrete wall as compared to a gypsum wall. In some embodiments, a distance between primary and auxiliary equipment and an architectural feature may be calculated. As an illustrative example, in FIG. 20A, technical specification for the emergency break glass 2008 may have a preferred location near fire exits (an architectural feature).

Based on the selection and positioning of the primary equipment in the floor plan, embodiments may include using compatibility rules and technical specifications for primary equipment and auxiliary equipment to determine whether auxiliary equipment is required for each of a plurality of rooms. For example, compatibility rules and technical specifications may indicate that a piece of primary equipment requires a power source, a network connection, or other accessories. Further, rule may specify that auxiliary equipment is required based on location. For example, a rule may specify that a piece of primary equipment may require a mount when located on a ceiling (e.g., a ceiling mount for a speaker), while that same piece of equipment may not require a mount when located on a countertop. By way of example, using compatibility rules and technical specifications for primary equipment and auxiliary equipment to determine whether auxiliary equipment is required for each of a plurality of rooms may include implementing processes depicted in FIG. 20B, described in greater detail elsewhere herein.

Further, embodiments may include selecting auxiliary equipment to at least partially conform to the functional requirements of each of the plurality of rooms requiring auxiliary equipment As disclosed, this may include identifying an equipment type, brand, model, settings, configurations, parameters, or placement of a piece of auxiliary equipment in a way that satisfies the demands of the problem. The selected auxiliary equipment may include one or more of wiring, conduits, ducts, pipes, and/or cable trays. In some embodiments, selecting the auxiliary equipment may include considering whether the selected primary equipment is located on at least one of walls or ceilings. For example, wall mounts and ceiling mounts may differ for a same piece of primary equipment. For example, as illustrated in FIG. 20A, auxiliary equipment 2030 may be selected based on selection or location of primary equipment 2020. Control panel 2032, power source 2034, and door release 2036 may be selected due to technical specifications or locations of any of primary equipment 2020.

In some embodiments, generative analysis may include providing a preference for selecting auxiliary equipment from a manufacturer product family for each of a type of auxiliary equipment In this context, a manufacturer product family may include a group of related goods produced by the same company and/or under the same brand, and a type of auxiliary equipment may refer to a category of similar kinds of auxiliary equipment (e.g., a sensor type may include CCTV cameras, IR sensors, thermostats, and/or any other device which detects or measures a physical property and records, indicates, and/or otherwise responds). By providing a preference to select auxiliary equipment from a particular manufacturer, embodiments may result in more uniform equipment selections for large scale design and planning. Such uniformity may lead to downstream efficiencies in ordering, shipping, installation, and it may reduce costs due to bulk discounts.

In some aspects, selecting the auxiliary equipment may include running calculations that consider various technical characteristics, including network bandwidth, voltage drop, cable tray dimensions, conduit dimensions, power consumption, ethernet switch port capacity, uninterruptable power supply runtime, battery backup runtime, generator runtime, air flow, water pressure, or other equipment properties. For example, auxiliary equipment may be selected to provide network bandwidth that meets data transfer needs. Auxiliary equipment may be selected based on calculations that determine an available, necessary, maximum, minimum, average and/or any other amount of network bandwidth. Calculations may be performed with various candidate auxiliary equipment.

In some cases, auxiliary equipment may be selected to satisfy voltage drop requirements (i.e., decrease of electrical potential along the path of a current flowing in an electrical circuit). Calculations on voltage drop may determine voltage drop in one or more components of a system of the floor plan. Such calculations may be used to select candidate auxiliary equipment for implementation in the floor plan.

Auxiliary equipment selection may be based on calculations that determine cable tray dimensions (e.g., width and height for cable trays, diameter for conduits). A cable tray system may be used to support insulated electrical cables used for power distribution, control, and/or communication. Cable trays may be used as an alternative to open wiring or electrical conduit systems and are commonly used for cable management in commercial and industrial construction. Conduits include tubes or troughs used for protecting and routing electrical wiring in a building or structure. When physically constructing the wiring of a building, several parallel wires may be placed in the same cable tray or conduit. By running calculations on cable tray dimensions and/or conduit dimensions, systems and methods according to the embodiments may select cable trays and conduits that are configured to pass all necessary wires.

Other information may factor into auxiliary equipment selection. For example, calculations on power consumption may determine available, necessary, maximum, minimum, average and/or any other amount of power consumption in a system in the floor plan. As another example, calculations involving network switch capacity (e.g., ethernet switch capacity) may determine a maximum number of devices which may be connected to a network. In general, a network switch may be a networking hardware device that connects other devices on a computer network by using packet switching to receive and forward data to the destination device. Network switches may include ports that enable device connection through cables. Network or Ethernet switch port capacity may refer to a maximum amount of devices which may be connected to a network or Ethernet switch. Additionally or alternatively, runtime estimates may be used to select auxiliary equipment. For example, an uninterruptable power supply (UPS), a battery backup, and a generator may include an electrical apparatus that provides emergency power to a load when a main power source fails (i.e., a backup power supply). Generally, runtime may describe the length of time a backup power supply may be used in the event of a main power source failure. Calculations on UPS, battery backup, and generator runtime may estimate a maximum or optimal number of devices in a floor plan that may depend on a backup power supply.

Calculations on air flow may identify the available, necessary, maximum, minimum, or average air flow in a system in the floor plan. The amount of air flowing through a duct in an HVAC system may be regulated by pressure difference and system resistance. Higher the pressure difference increase air velocity and quantity of air that may flow from the duct. Pressure differences may be created by the chillers and AHU which generate the flow, while resistance may be a function of the length, material, and/or dimension of the ducts.

Some embodiments include running calculations on water pressure within a building to establish whether a candidate piece of auxiliary equipment for selection may be implemented in the floor plan. Generally, pipe flow calculations, a branch of hydraulics and fluid mechanics, may describe liquid flow within a closed conduit. Pipe flow, being confined within the closed conduit, may not exert direct atmospheric pressure, but may exert hydraulic pressure on the conduit.

Embodiments may include calculating a number of inputs and outputs of the selected primary equipment. Building Management Systems, fire alarms, access controls, and other building systems may contain a variety of components such as sensors (e.g. smoke detection, occupancy or temperature), user interfaces (light controller, thermostat controller, display panels, or other displays, etc.), valves (e.g. fan-coil valve), or other equipment. These pieces of equipment may communicate with and integrate to a system or other pieces of equipment via a plurality of low-current inputs types and outputs types. Examples of the types of inputs and outputs include electrical inputs and outputs, analog inputs and outputs, digital inputs and outputs, and a variety of communication protocol inputs and outputs such as KNX, TCP/IP, BACNET/IP, or a fire alarm address loop.

A generative analysis process may include calculating the number and types of inputs and outputs of primary equipment in order to determine auxiliary equipment with a sufficient number of compatible inputs and outputs. For example, primary equipment may include two fan-coil units each with a 1-10 v modulating input signal to control a valve for AC, and three electrical relay inputs to control fan speed. Exemplary primary equipment may also include two thermostats which communicates via a KNX bus. Then, a selection of auxiliary equipment may include, for example, calculating the total quantity and type of inputs and outputs (e.g., 10 v inputs, six electrical relays, and two KNX bus connections), and selecting an auxiliary piece of equipment such as HVAC actuator or controller which at least matches the input and output requirements of the primary equipment.

In some aspects, embodiments may include positioning selected auxiliary equipment in a floor plan. Positioning may be automatic. For example, a generative analysis may include optimizing placement of a piece of auxiliary equipment in a way that satisfies the demands of the problem, as discussed in greater detail herein. Alternatively or additionally, positions of selected auxiliary equipment may be determined according to a user definable rule. A user definable rule may refer to any logical construct, including Boolean expressions and mathematical calculations.

Embodiments may include receiving technical specification assignments for the plurality of rooms and/or a plurality of functional requirement assignments for the plurality of rooms. Receiving assignments of technical specifications or functional requirements may include receiving data from an external source via a network transmission or retrieving data from memory (e.g., local memory, cloud storage). For purposes of this disclosure, such an assignment may include associating technical specifications or functional requirements with respective rooms in a data structure. Technical specifications may be assigned to rooms by a user using, for example, a user interface In some cases received technical specifications may be used to select auxiliary equipment.

Users may be permitted to influence primary and auxiliary equipment selection. For example, embodiments may permit a user to specify primary equipment and/or primary equipment locations for a generative analysis. Permitting a user to specify primary equipment for the generative analysis may include enabling (e.g., via an interface) the user to select primary equipment from a list, to input identifiers of primary equipment, or to perform other actions sufficient to identify and select primary equipment. Further, specifying primary equipment locations may include setting the location of one or more pieces of primary equipment before, during, and/or after the generative analysis takes place (e.g., updating a location). In some instances, embodiments may include automatically identifying auxiliary equipment unspecified by the user. For example, a processor may find, select, place, and/or in any other way interact with auxiliary equipment which has not been inputted by the user. In this way, embodiments may automatically supplement user selections to generate comprehensive auxiliary equipment selections for floor plan. The user may be permitted to define areas where primary or auxiliary equipment may be located, or to define areas of exclusion where such equipment location is not preferred. Such definitions may occur, for example, through a user interface that enables users to block areas. Similarly, the interface may permit users to define equipment placement rules and migrate those rules across rooms in a floor plan.

Some embodiments may include generating technical specifications of the auxiliary equipment based on the selected primary equipment and the compatibility rules. Further, auxiliary equipment selection may change when primary equipment selections change after an initial generative analysis. As an example, embodiments consistent with the present disclosure may include receiving a request to alter a technical specification of selected primary equipment for at least one of a plurality of rooms. A request to alter technical specifications may include an instruction to change a technical specification of selected primary equipment after generative analysis. Further, a technical specification of a selected primary equipment may be updated for at least one of a plurality of rooms based on a request to alter a technical specifications. For example, the technical specification of the selected primary equipment may change to match the technical specification modifications made in a request. Then, embodiments may include updating, based on the update of the selected primary equipment technical specification, a technical specification of the selected auxiliary equipment, the selected auxiliary equipment being associated with the selected primary equipment according to a compatibility rule. Technical specifications of auxiliary equipment may change based on a compatibility rule to match the technical specification of updated primary equipment, for example. The foregoing process of changing primary equipment and updating auxiliary equipment may be repeated any number of times.

Prior to selecting auxiliary equipment, embodiments may include displaying a comparison of alternative auxiliary equipment technical specifications. Displaying may include outputting information and/or data to a user through an interface. The output may be represented in many forms: a generated text document such as Word, a chart such as Excel, an image file such as a .jpg, a vector image file such as a PDF, a vector architectural file such as DWG, and/or a BIM model such as an RVT or IFC. The output may be an electronic file, database, and/or index containing information such as placement information and/or technical specifications. The comparison may include an interactive list of auxiliary equipment technical specifications illustrating the differences and similarities among one or more pieces of auxiliary equipment.

Then, having selected primary and auxiliary equipment, embodiments may include generating a bill of material based on the selected primary and auxiliary equipment. In some cases, the bill of material is exportable in one or more electronic formats. As disclosed, a bill of material, sometimes referred to as "material list" or "bill of quantities," may refer to a list describing the primary and auxiliary equipment required to physically construct a building system. In some examples, a bill of material may be exportable to an ERP or CRM system.

Further, at least one programming parameter for the selected primary equipment may be generated. As disclosed, a programming parameter may include a variable and/or input and/or field for the firmware, operating software, programming software, and/or communication protocol, for a piece of equipment that influences its operations. In some embodiments, at least one classification tag for the selected primary and auxiliary equipment may be generated. A classification tag or equipment classification may include a textual or numeric identification to classify a piece of equipment based on its characteristics and/or technical specification (e.g., 1332ABB may relate to all electrical circuit breakers). Embodiments may include generating at least one customized setting for the selected auxiliary equipment. A customized setting or customized equipment configuration may include equipment configurations associated with any one or more of the following: programming a piece of equipment in a manner that differs from default factory settings; setting or altering a physical component of a piece of equipment; combining one or more pieces of equipment, each with their own separate order codes, configured to be fabricated or delivered inside a common chassis, housing, rack, or enclosure; customizing physical properties of one or more pieces of equipment; combining one or more pieces of equipment requiring a custom order code; and/or including an optional or separately-ordered accessory with a piece of equipment, and/or any other component ordered independently, as discussed in greater detail herein.

In some cases, wiring diagrams may be generated indicating connections between at least one piece of selected primary equipment and at least one piece of selected auxiliary equipment. A wiring diagram may include a representation of the electrical, audio, video, data and/or any other cables (sometimes called the "wiring runs") connecting pieces of equipment to each other and a termination point in a control panel (sometimes called the "head end"), as discussed in greater detail herein.

Embodiments may include selecting at least two pieces of auxiliary equipment of at least two types, the at least two types including at least one of wiring and/or a cable tray. Selecting at least two pieces of auxiliary equipment of at least two types may refer to the at least one processor identifying and choosing two or more pieces of auxiliary equipment, wherein the two or more pieces of auxiliary equipment having differing characteristics.

Embodiments may enable specification of a spare capacity for at least one of ports, cable fill, and/or power capacity. Spare capacity (also referred to as the available capacity) may be calculated as a maximum capacity minus a current usage level (or usage level at any point in time). In this context, ports may refer to sockets in a computer network, such as a network switch, into which devices may be plugged. Spare capacity as it relates to ports may refer to an available amount of free ports into which devices may be plugged. Cable fill, also referred to as "conduit fill" or "raceway fill," may refer to an amount of a conduit's cross-sectional area which may be occupied, or filled, by one or more cables. And power capacity may refer to the amount of power available in a system, that is, the total power minus the present consumption of power. In some embodiments, enabling specification of a spare capacity may include allowing an external source to create, modify, delete, and/or in any way alter the spare capacity of ports, cable fill, and/or power capacity. For example, spare capacity may be defined by a user. A user may store a spare capacity definition for later use by the system and/or may define or re-define spare capacity dynamically during analysis.

Embodiments may include generating an equipment schedule indicating an association of primary and auxiliary equipment based on the selected primary and auxiliary equipment. An equipment schedule may refer to a list, a file, or, more generally, any data structure associating primary and auxiliary equipment. The schedule may specify desired or available quantities of equipment.

Auxiliary equipment may be selected for groups of rooms in aggregate. For example, a processor may consider selected primary equipment in a subset a plurality of rooms and select the auxiliary equipment based on an aggregation of primary equipment in the subset of the plurality of rooms. Accordingly, by considering aggregates of primary equipment in a subset of room, embodiments improve efficiency by enabling auxiliary equipment selection based on the group of pieces of primary equipment in bulk. Further, when auxiliary equipment relates to more than one piece of primary equipment, such as a cable connecting two pieces of primary equipment, conflicting compatibility rules can be resolved by considering the primary equipment in aggregate. As an example, if an aggregation of primary equipment share a manufacturer, auxiliary equipment from that same manufacturer may satisfy compatibility rules associated with the primary equipment.

In addition, embodiments may include considering an aggregate quantity of selected primary equipment in the subset of the plurality of rooms based on the aggregation of primary equipment in the subset of the plurality of rooms; and/or select the auxiliary equipment based on the aggregate quantity of primary equipment. An aggregate quantity of selected primary equipment in the subset of the plurality of rooms may refer to a value representing the number of pieces of primary equipment in an aggregation of pieces of primary equipment. Selecting the auxiliary equipment based on the aggregate quantity of primary equipment may refer to identifying and choosing pieces of auxiliary equipment based on the number of pieces of primary equipment that are in a group of pieces of primary equipment. For example, if an aggregation of primary equipment includes 15 pieces of primary equipment, the at least one processor may select a piece of auxiliary equipment which performs best in conjunction with 15 pieces of primary equipment as opposed to a piece of auxiliary equipment which does not.

Embodiments may include identifying contours demarcating rooms from the accessed floor plan by performing at least one of image processing and/or semantic analysis. As described herein, contours (sometimes referred to the boundaries) may include the objects, real or imaginary, that constitute the borders of the room (e.g., walls and/or windows surrounding a room). For example, geometric analysis or other techniques may be used to identify walls, windows, doors and other architectural feature which may demarcate the contours of the room, as discussed in greater detail throughout the present disclosure.

Figure 21:
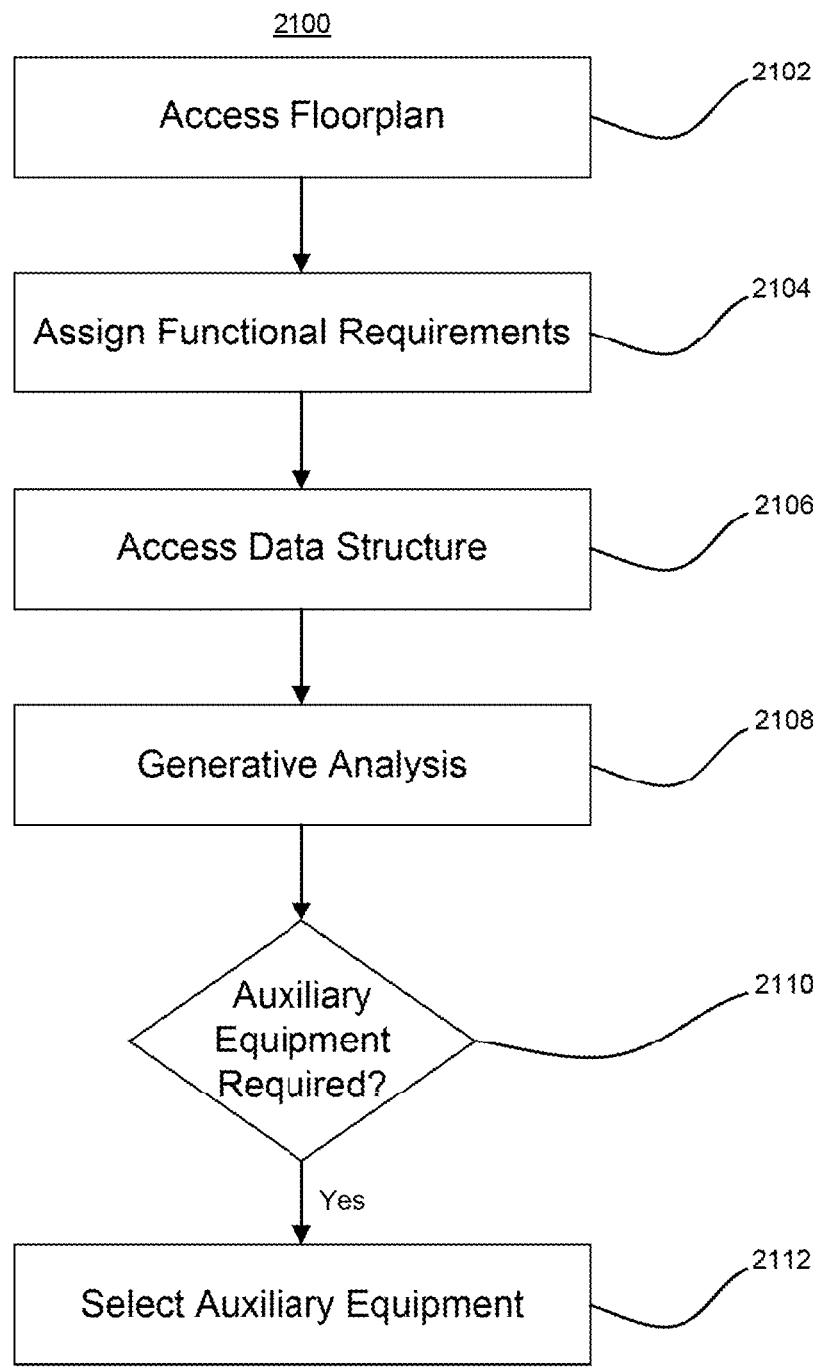
FIG. 21 is a flow chart illustrating an exemplary method for automatically positioning primary equipment and auxiliary equipment in a floor plan, consistent with the disclosed embodiments.

FIG. 21 illustrates a structural design method 2100 for automatically positioning primary equipment and auxiliary equipment in a floor plan. The method may be implemented, by way of example, using a system including at least one processor (illustrated by way of example in FIG. 30).

At block 2102 of process 2100 in FIG. 21, at least one processor may access a floor plan demarcating a plurality of rooms. Accessing a floor plan may include obtaining, examining, and/or retrieving data and/or files associated with the floor plan.

At block 2104, the at least one processor may assign functional requirements to each of the plurality of rooms. Assigning functional requirements to each of the plurality of rooms may refer to the at least one processor selecting one or more functional requirements and associating the one or more functional requirements with one of the plurality of rooms and repeating this process for each of the plurality of rooms.

At block 2106, the at least one processor may access at least one data structure containing technical specifications for primary equipment and auxiliary equipment, and further containing locations of primary equipment and compatibility rules associating primary and auxiliary equipment. For example, a data structure may refer to any type of data stored in a processor in an organized, searchable manner.

At block 2108, the at least one processor may generatively analyze a floor plan using functional requirements and technical specifications for primary equipment to select and position in the floor plan primary equipment to at least partially conform to the functional requirements for each of the plurality of rooms.

At block 2110, the at least one processor may determine whether auxiliary equipment is required for each of the plurality of rooms based on the selection or positioning of the primary equipment in the floor plan, and using the compatibility rules and the technical specification for the primary equipment and the auxiliary equipment. Determining whether auxiliary equipment is required for each of the plurality of rooms may include establishing whether conforming to the functional requirement necessitates both primary and auxiliary equipment for one of the plurality of rooms and repeating this process for each of the plurality of rooms.

At block 2112, the at least one processor selects the auxiliary equipment to at least partially conform to the functional requirements of each of the plurality of rooms requiring auxiliary equipment. Selecting the auxiliary equipment may include identifying the technical specification, type, brand, model, settings, configurations, parameters, and/or placement of a piece of auxiliary equipment in a way that satisfies the demands of the problem for every room in the plurality of rooms which necessitates the use of auxiliary equipment.

Buildings may include a wide variety of equipment that requires electrical wiring. Therefore, when designing a building, an architect or designer may need to create complex wiring diagrams for equipment to ensure that wires are run properly throughout the building and permit various pieces of equipment to access electrical power. Creating such complex wiring diagrams may be am extremely difficult and labor intensive task. Further, there is need to accurately and efficiently identify optimal solutions that satisfy functional requirements of room, minimize equipment and labor costs and/or minimize future operating costs.

Accordingly, aspects of this disclosure may include systems, methods and computer readable media for generating wiring diagrams for equipment. Disclosed embodiments may include a structural design system for generating a wiring diagram for equipment. The embodiments may simplify this process by automatically generating wiring diagrams, for example, for equipment placed in a building's floor plan. Disclosed embodiments may also permit more accurate simulations, such as cost estimations, by selecting and locating specific equipment, and determining the specific materials needed to wire a room or building. Disclosed embodiments may also permit the selection of equipment associated with wiring such as cable trays and conduits. A processor may run a series of tasks to analyze rooms of a floor plan to locate equipment and generate a wiring diagram for the room. In some embodiments, the system may be a cloud-based system. For example, the methods described herein may be executed in a virtual instance by a remote computer, rather than a local processor. Cloud-based computation can provide advantages in scalability, cost, and security over approaches that rely on local computational or conventional servers.

For ease of discussion, a method is described below, with the understanding that aspects of the method apply equally to systems, devices, and computer-readable media. For example, some aspects of such a method may occur electronically over a network that is wired, wireless, or both. Other aspects of such a method may occur using non-electronic means. In a broadest sense, the method is not limited to particular physical and/or electronic instrumentalities, but rather may be accomplished using many differing instrumentalities.

Disclosed embodiments may include accessing a floor plan defining a plurality of rooms. As disclosed herein, floor plans may be in any suitable format. For example, a floor plan may be represented in hand drawn or scanned images. In some embodiments, floor plans may be a CAD file or other type of vector-based or 2D or 3D file format. Floor plans may be in building information model ("BIM") files, for example, or any other graphical or digital format. In some embodiments, a floor plan may be represented as a data structure. Floor plans may be in digital and hard copy formats, or both. A floor plan may include a diagram of a room, a suite of rooms, a whole floor of rooms, or an entire building of rooms. For example, the floor plan may include such representations as viewed from above. A floor plan may consist of other associated information with the plurality of rooms including technical specifications, functional requirements, equipment lists, energy metering, BMS data, iOT data, and other types of information as described herein.

A floor plan may be accessed in a variety of ways including from a network location, such as a remote server, a network attached storage drive, a remote database, a cloud storage service, or other types of network storage. In some embodiments, floor plans may be stored in and access from local storage, such as a storage device associated with the processor or a local database. In some embodiments, the processor may access a floor plan using an associated scanner, camera, or other device capable of capturing images. Floor plans may also be accessed in other suitable ways, as described herein.

In some embodiments, floor plans may define or demarcate a plurality of rooms. As used herein, a room may include any defined indoor and/or outdoor space. For example, a room may be an office, corridor, sleeping area, kitchen, balcony, staircase, or other area of a building or structure. Rooms are not limited to areas within a building or structure. For example, in some embodiments, rooms may include exterior areas of a building or structure, such as a garden, lawn, balcony, patio, deck, gazebo, roof, sidewalk, driveway, fire escape, or other exterior area related to a building or structure. A room demarcation may include information in the floor plan indicating the location of a room in relation to the rest of the floor plan. The demarcation may include representations of one or more boundaries (sometimes referred to as contours) of the room. The boundaries may include objects, real or imaginary, that constitute the room's borders (such as walls or windows that surround a room), openings associated with the room's borders (doors and window leading in and out of the room), equipment and/or architectural features (columns, beams, furniture, etc.) contained in the room. In some embodiments, the floor plan may include textual information, such as the name and function of the rooms, information regarding the dimensions of the room, or other textual information In some embodiments, the borders or contours of a room may not initially be demarcated in the floor plan. Accordingly, receiving the floor plan demarcating contours of a room may include performing additional processing on the floor plan to demarcate the contours of the room. In some embodiments, the plurality of rooms may be defined using floor plan analysis. Floor plan analysis may be used to demarcate contours of the room. Floor plan analysis may include an image analysis, geometric analysis, or other type of analysis suitable for defining rooms of a floor plan as disclosed herein.

Disclosed embodiments may also include receiving input associating at least one of a plurality of functional requirements with at least one room of the plurality of rooms. As used herein, a functional requirement may include but is not limited to a description of performance parameters expected from a system. A functional requirement may be defined for the entire system, for a project, a floor plan, a zone, a room, an area or an architectural feature. A functional requirement may describe, for example, a minimal or maximal performance of the system in a task. The type of a functional requirement may be derived from the system it is applied to (e.g., an HVAC functional requirement may describe the performance of an HVAC system). Functional requirements may be used as a target for a generative analysis. In some embodiments, functional requirements may be of different types. Further, different types of functional requirements (for example noise level and camera coverage) may be applied to the same area.

Functional requirements may be associated with rooms within a floor plan. For example, a room within a floor plan may be associated with a functional requirement of a fire safety system to have a certain density of smoke detectors. In some embodiments, a plurality of different functional requirements may be associated with a room. In some embodiments, multiple rooms may be associated with one or more of the same functional requirements.

As described herein, associating may include creating a logical pair from two entities of different types, such as, a room and a functional requirement. The pairing might take the form of an on-screen representation or a logical pairing within an internal database or code. For example, a stored table may contain a list of rooms and associated functional requirements. Stored associated pairs may also be passed together as an argument to a function and, in some cases, one member of the pair may appear as a property in the other member's data. For example, functional requirements associated with rooms may be stored as properties of the data related to a room.

Accordingly, input associating rooms and functional requirements may take a variety of forms, such as data indicating logical pairs. The data may be provided in, for example, a database, spreadsheet, list, or medium suitable for storing logical pairs. In some embodiments, the associations may be stored in data properties of the rooms or functional requirements, as described herein. In some embodiments, the input may take the form of user input, as described in greater detail below.

Input associating a functional requirement to a room may be received in a variety of ways. For example, the input may be received from a storage location. For example, the input associations may be received from a network location, such as a remote server, a network attached storage drive, a remote database, a cloud storage service, or other types of network storage. In some embodiments, input associations may be stored in and accessed from local storage, such as a storage device associated with the processor or a local database. In some embodiments, the processor may receive input from a user through an input device, for example a mouse, keyboard, touchscreen, or other suitable instrument for receiving user input.

Embodiments may include receiving the input as user input. For example, the input associating at least one of a plurality of functional requirements with at least one room of the plurality of rooms may be user defined. As an example, the system may generate a user interface to present to a user. The user may interact with the user interface to manually define associations between rooms and functional requirements. In some embodiments, the interface may present a list of rooms and permit the user to select from a plurality of functional requirements that the user may associate with each room. For example, the user may select functional requirements from a dropdown menu, using checkboxes, buttons, or other suitable methods of user interface interaction, such as examples described herein.

In some embodiments, a user input defining an association of functional requirements can be bulk applied to a plurality of rooms. For example, the user may apply one or more functional requirements to a plurality of rooms at the same time, rather than individually associate each room with the same functional requirement. In this way, embodiments can increase efficiency and reduce labor. This may occur, for example, through classification of rooms into a group, and then assigning a functional requirement to the group. In a hotel floor plan for example, artificial intelligence may identify sleeping rooms from other rooms, to enable functional requirements to be applied to all sleeping room through a single assignment.

Disclosed embodiments may include accessing, in a data structure, technical specifications associated with electrical equipment. In this context, electrical equipment may refer to any piece of equipment that may use or transmit electrical power. In some cases, electrical equipment may include but is not limited to: CCTV cameras, IR sensors, thermostats, motion detectors, occupancy sensors, smoke detectors, heat detectors, thermal detectors, glass break detectors, door contacts, window contacts, or other sensors; audio speakers, strobes, alarms, amplifiers, lighting fixtures, IR illuminators, or any other devices that may produce an output; WI-FI routers, WI-FI Access Points, edge switches, core switches, access switches, Bluetooth routers, patch panels, or other network devices; light switches, access control panel, smart house touchscreens and keypads, or other controllers; electrical devices, including generators, uninterruptable power devices (UPS), distribution boards, transformers, breakers, power sockets and outlets, electrical wiring, cable trays, conduits, or any other equipment related to power or communications; lighting controllers, including relay modules, dimming modules, dimming switches, or any other devices for controlling lighting; HVAC equipment, including air intake and output vents, AC units, fan coil units, variable air flow handlers, chillers, heaters, fans, or other equipment for controlling climate in a building; display devices, including televisions, monitors, projectors, projection screens, or other equipment that provides visual output; computers, refrigerators, dishwashers, washing machines, drying machines, or other appliances; and any other object using electrical power. In some embodiments, electrical equipment may also include equipment that does not use or transmit electrical power but is related to equipment that does, for example, enclosures, mounting hardware, harnesses, connectors, and conduits.

A data structure may refer to any type of data storage, accessible and/or searchable via a processor. As disclosed, data may contain textual, tabular, numeric or image information which describes equipment. The data associated with a piece of equipment, for example, may contain its model, type, brand, series, price information, specific properties (such a IR rating or weather resistance), a technical specification, a physical description or a picture of the object. The data may be stored in a variety of formats, including SQL, MongoDB, AWS S3, CSV, XLS, JSON or any other data storage format. The data may be stored locally or in a cloud-based server.

A technical specification of equipment may include, but is not limited to, one or more of a model identifier (specific manufacturer model or series) and/or equipment class (e.g. Outdoor WI-FI Access Point, Long Range Access Point, Infrared Motion Sensor with 90 Degree Coverage, Modular Kitchen Cabinets). In some embodiments, a technical specification may include power consumption data. A technical specification can also include one or more technical characteristics. A technical characteristic may describe one or more properties of a piece of equipment. In some embodiments, a technical characteristic may not be related to any specific model of equipment. A technical characteristic may include properties such as mounting device type, resolution, DB rating, luminosity, IR rating, lens type, network speed, wattage requirement, color, dimensions, material, flammability rating, or water-resistance.

Disclosed embodiments may further include selecting, from the data structure, a plurality of the technical specifications associated with electrical equipment. For example, the data structure may include a large number of technical specifications associated with electrical equipment, such as power consumption specifications, voltage specifications, current specifications, and others. One or more of the technical specifications may be selected and retrieved from the data structure.

Embodiments consistent with the present disclosure may involve generation of a wiring diagram. A wiring diagram may include a representation of the electrical, audio, video, data, low-current cables, or any other cables, sometimes called the "wiring runs," connecting pieces of equipment to each other and its termination point in a controlling panel. Wiring diagrams may also include homeruns. A homerun may include a connection from a device, not branched from another circuit or wiring run, but that connects directly to the building's main electrical panel. The termination point of a wiring run may be referred to as a "head end." In some embodiments, all or portions of a wiring diagram may be designed by hand or manually drawn in a graphic software by an engineer. A wiring diagram often uses graphic symbols to represent different elements of the diagram.

Automatic generation of a wiring diagram may be performed in several different ways. An illustrative example of one of many ways for generating a wiring diagram may include: spreading a network or graph of interconnected nodes across the floor-plan; determining which of the nodes is closest to a piece of equipment and will serve as the wiring target; adjusting the positioning of the graph nodes to align to the floor plan geometry; weighting the edges of the graph according to their length; adjusting the weights to encourage certain pathways: avoidance of walls, preference to corridors or other architectural features; performing a graph traversal algorithm that suits the type of wiring technique required (such as Shortest walk, Djikstra, BFS or many other possible algorithms) to determine the optimal pathways from a chosen head-end to all the wiring targets in the graph; and accounting for parameters and subjects which may include but are not limited to parameters as turn cost and multiple source points so that the generated pathways are suitable. In some embodiments, wiring diagrams may be generated in three dimensions. For example, an accessed floor plan may be a BIM file and the generated wiring diagram may travers x, y, and z coordinates of the BIM file.

In some embodiments, a wiring diagram may include conducting, cable trays, and other devices for holding or routing wiring or cables. For example, a cable tray system may be used to support insulated electrical cables used for power distribution, control, and communication. Cable trays may be used as an alternative to open wiring or electrical conduit systems, and may be used for cable management in commercial and industrial construction. A wiring diagram may indicate inputs and outputs at which equipment is to be connected. A wiring diagram may indicate wiring traversing from the point of a piece of equipment to another point. Further, a wiring diagram may indicate wiring homeruns using a homerun symbol, rather than indicating wiring traversing from the point of a piece of equipment to another point (e.g. point-to-point representation of a homerun). For example, a homerun symbol may be an arrow which may further contain textual information indicating the termination point of the wire (e.g., to Electrical Panel EHD-102 Breaker 6). A symbol may also be used to indicate the destination of a wiring from a first piece of equipment to another equipment on a circuit, branch, loop or other wiring typology. A wiring diagram may include termination connector technical specifications (e.g. RJ-45, RJ-11, etc.). A wiring diagram may also define the spare capacity and/or fill-capacity of conduits and cable trays. Generation of a wiring diagram may include accessing power consumption data of equipment connected by wiring, performing a power calculation such as a voltage drop calculation and determining a conforming wiring/cable specification accordingly.

A wiring diagram may include one or more technical specifications for wiring. In the disclosed embodiments, a wiring diagram may be comprised of a plurality of equipment types and wire types. Identifiers for each wiring connection may be specified in a wiring diagram. In some cases, a wiring diagram may include a single line diagram, which may be also be referred to as a "one line diagram," and may refer to a simplified notation for representing an electrical system. In such diagrams, electrical elements such as circuit breakers, transformers, capacitors, bus bars, and conductors can be shown by standardized schematic symbols. A one-line diagram can also be used to show a high level view of conduit runs for any type system of electrical building system (such as lighting, power, VSS, fire, HVAC, and other systems) where schematic symbols may be used to describe various components of the specific system.

In some embodiments, a wiring diagram may indicate point to point wiring paths. Point to point wiring paths may display the entire path wiring traverses from an originating point (e.g. piece of equipment) to its termination points (e.g. another piece of equipment, a rack, enclosure, etc.) or to another piece of equipment on its branch, circuit, loop or other wiring typology. Such point to point wiring paths may differ from a homerun wiring diagram using a symbol, which indicates the path traversed by a piece of wiring to its termination point by using a homerun symbol or other type of symbol to indicate its destination point. Generally, cable distance may be calculated based on point to point wiring paths. Point to point wiring paths may be schematic or approximate, or precisely drawn on a project's conditions such as available space in the ceiling, whether wiring is in conduits or cable trays, whether it runs along floors, ceilings or walls and/or any combination thereof. Point to point wiring paths may be drawn in 3D. Point to point wiring paths may include specific inputs/outputs on pieces of equipment to which wiring is connected (e.g. Output A on Piece of Equipment X connected to Input A on Piece of Equipment Y). In some embodiments, a wiring diagram may indicate a homerun by using direct point to point wiring paths.

A wiring diagram may be made using one of several optional typologies. In this context, a typology may signify a type of route connecting between devices. For example, a "homerun" typology may be one in which every piece of equipment finds the shortest path to the panel (the "head end" or "homerun") and uses that as its wiring route regardless of the paths connecting other pieces of equipment. A "travelling salesman" typology may connect all devices in a single path, where every device is connected to one device before and one after it in the path. In the context of wiring diagrams, a travelling salesman wiring topology refers to a wiring diagram which connect all the devices to a termination point (e.g. electrical panel or other head-end) by the shortest possible path which passes through each device only once and returns to the termination point. A "maximal loop" typology may connect devices using a "travelling salesman" approach until a certain maximal amount of devices is reached, where the wiring will return to the terminal point. Other typologies are also possible, such as bus, ring, star, mesh, full-connected, tree, line and bus. In some embodiments, wiring diagrams may be generated with a plurality of wiring typologies. For example, a diagram may implement combinations of two or more typologies. In some embodiments, the method may include associating one or more wiring typologies with equipment technical specifications.

Figure 22A:
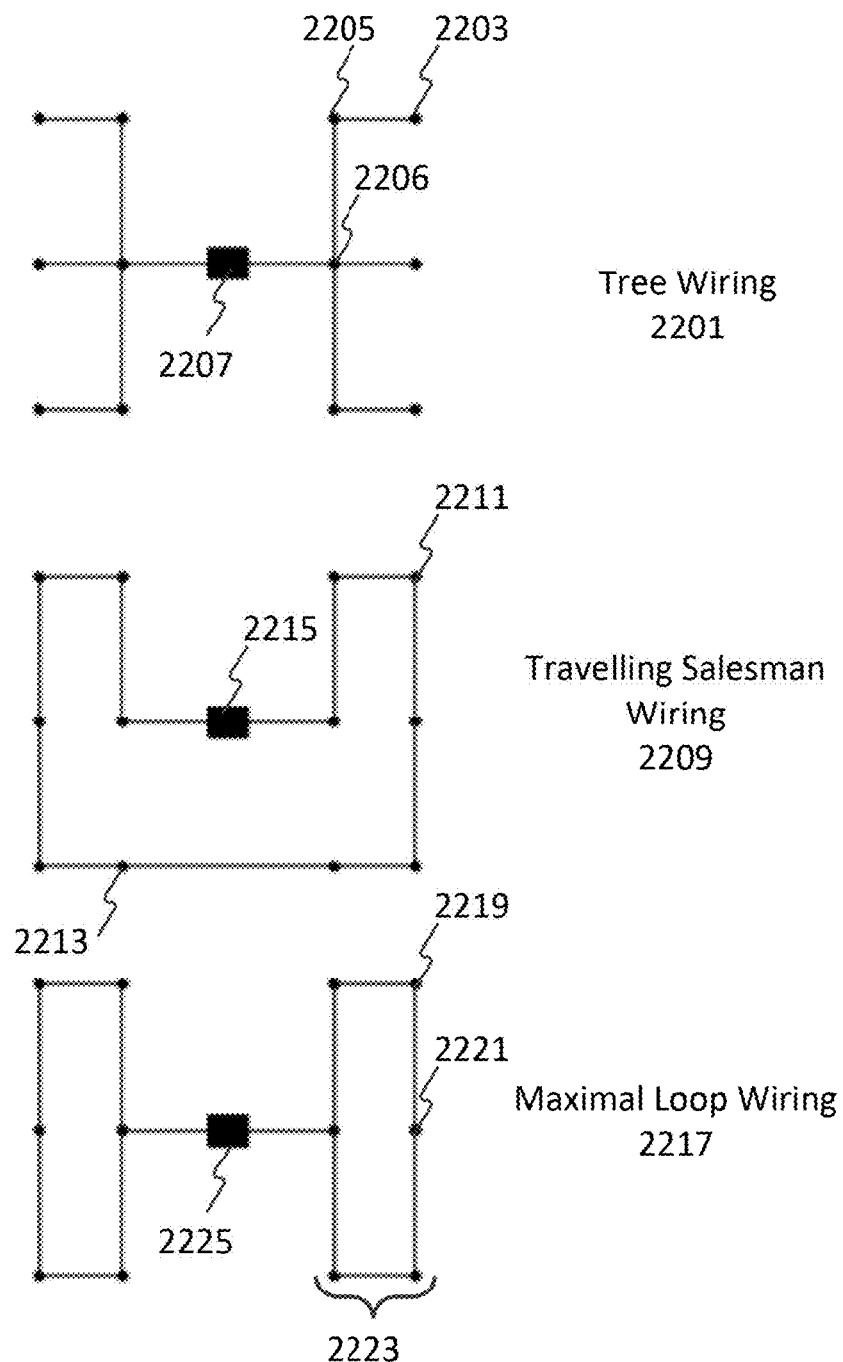
FIG. 22A is a depiction of exemplary wiring typologies, consistent with disclosed embodiments.

FIG. 22A is a depiction of exemplary wiring typologies, consistent with disclosed embodiments. Tree wiring 2201 illustrates n example of a tree typology, as described herein. As illustrated, device 2203 connected to panel 2207 in a "tree" that includes devices 2205 and 2206. Travelling salesman wiring 2209 illustrates an example of a travelling salesman typology, as described herein. Devices 2211 and 2213 are part of a single path between the devices and panel 2215. Maximal loop wiring 2217 illustrates a "maximal loop" typology, as described herein. For example, a system may determine that a loop may have a maximal amount of five devices based, for example, on the power consumption of each device. Accordingly, only five devices may be connected in loop 2223, including devices 2219 and 2221. Once the loop 2223 reaches five devices, it may return to panel 2225.

FIG. 22B is a depiction of further exemplary wiring typologies, consistent with disclosed embodiments. Ring wiring typology 2231 may include a ring in which each device 2233 is connected to two other devices in a single ring. Mesh wiring typology 2235 may include a variety of connections between devices, but all devices may not be connected together or to a single point. For example, devices 2237 and 2239 are connected together, as well as connected to device 2241. However, device 2240 is only connected to device 2239. Star wiring typology 2243 may include a single central point 2249 to which the other device 2247, 2245 are all connected. Star wiring typology 2243 also illustrates the idea of a wiring "homerun." For example, the line from device 2247 to device 2249 is a direct path "homerun."

Fully connected wiring typology 2251 may include a connection from each to device to every other device within the system. As shown, device 2253 may be connected to every other device within the wiring diagram. Each device in line wiring typology 2255 may be connected to at most two other devices. For example, as shown, device 2257 is connected to one device in the line and device 2259 is connected to two other devices within the line. Tree wiring topology 2261 may include "branches" in which multiple devices 2263, 2265 are connected together in a line to another device 2267. Device 2267 may then be connected to other devices within the system. Bus wiring typology 2269 may include a central line 2273 or "bus" to which devices 2273 are connected.

FIG. 22B also includes exemplary wiring diagram representations. Point to Point wiring representation 2275 illustrates homerun wires or other connections between two pieces of equipment in a wiring diagram using a line with a point on each end, the point indicating the connection at the piece of equipment. FIG. 22B also includes homerun symbol example 2277. As explained above, a homerun may be represented by a homerun symbol instead of showing a point to point connection between two devices. As shown, a homerun symbol may include an arrow 2273 and notation 2274 indicating the device to which the homerun connection is made.

Disclosed embodiments may further include generatively analyzing the at least one room in conjunction with the functional requirement and the selected technical specifications in order to select a piece of equipment for the at least one room and select an equipment placement location of the selected piece of equipment within the at least one room.

Embodiments consistent with the present disclosure may include a generative analysis (e.g., a series of simulations), as disclosed herein. A generative analysis may include but is not limited to a process in which a solution to a problem, geometric, mathematical, physical, or otherwise, is arrived at by a computational device. As an example, a solution in this context may be finding the placement of a piece of equipment in a way that satisfies the demands of the problem. As another example, a solution in this context may be finding the type, brand or model of a piece of equipment. As an example, a solution in this context may be finding the settings, configurations, settings or parameters of a piece of equipment. In some embodiments, generative analysis may use optimization to arrive at a solution. In some embodiments, generative analysis may use rule based design to arrive at a solution. Generative analysis may include implementing an algorithm, which may include but is not limited to any of a large class of algorithms such as L-systems, Model based solvers, Machine Learning models, Decision trees, Random forests, Artificial Intelligence methods, Simulated Annealing, or other suitable algorithms for simulating or solving a problem. A generative analysis process may include a learning process. In some embodiments, a system may learn from the behavior of solutions as parameters change.

In some embodiments, a generative analysis may be associated with a one or a plurality of functional requirements, technical specifications, and technical characteristics as an input. For example, a generative analysis of a room may be based on a plurality of functional requirements. Examples for such requirements include but are not limited to power consumption, resolution, focal length, communication protocol, wiring typology, coverage range, sensor type, dimensions, pixel density, brand, type, series and model. A generative analysis may use a variety of input data including: room geometric and architectural features such as area, volume, ceiling height, number of boundary segments, boundary complexity, number and locations of doors, number and locations of windows, obstacles such as columns and shafts, furniture such as desks, chairs and tables, topological connections, adjacent rooms and areas, room name, room function, the level of a building the room is located in, the zone the room is part of, and other data related to rooms, architectural features, and equipment. The data may also include data relating rooms and equipment to other rooms or equipment. For example, the data may refer to the distance between a piece of equipment in the room and the nearest exit point, the distance between a piece of equipment to a corridor, or to an equipment room, head-end or electrical panel. An analysis may also consider equipment technical specifications and functional requirements, both within rooms and outside of them. This analysis may seek to avoid duplicating equipment, avoid code and compliance issues, fix clashing locations, and harmonize technical specifications or manufacturers across all rooms in a given level or a project.

In some embodiments, a generative analysis may be used to select equipment. In some embodiments, a selected piece of equipment may include a light fixture, power socket, light switch, sensor, or other piece of equipment as described herein. A light fixture may be any type of device used to light up a space. Sensors may be items of equipment that sense data in the physical world. Sensors types may include CCTV cameras, IR sensors, thermostats, motion detectors, occupancy sensors, smoke detectors, heat detectors, thermal detectors, glass break detectors, door contacts, window contacts, and other suitable devices for sensing data related to rooms or other spaces. In some embodiments, the selected equipment may include a model identifier. As described here, the equipment selection may be based on functional requirement and technical specifications. For example, a room may have a functional requirement that its lighting system must provide at least 500 lux to a room. The room may also have a second functional requirement that the room include no more than six overhead lights. A selected technical specification may define a class of lighting equipment, for example LED lights. Accordingly, generative analysis may be conducted to select the specific LEDs lights and the number of lights to place in the room. The generative analysis may use an algorithm to optimize the selection of the light according to one or more parameters. For example, the selection may be optimized according to the initial cost of the lights, the power consumption of the lights, or other parameters, including wiring paths associated with the lights.

In some embodiments, the generative analysis may include selecting equipment locations, and the selection may be based on wiring paths associated with the equipment. For example, the selected equipment may be assigned a location on the floor plan within a room or relative to other pieces of equipment within a room or space. In some embodiments, the generative analysis may include generating wiring runs between located pieces of equipment. As described above, wiring runs may be generating according to one or more wiring typologies. In some embodiments, a location of primary or auxiliary equipment may be selected based on, for example, the ability of a piece of equipment to connect with other equipment using a particular wiring typology. A location may be based on optimizing shortest paths of wiring runs, or, for example, a location of an electrical enclosure, a cable tray, a wiring rack, or other object.

In some embodiments, the selected piece of equipment and wiring runs may be associated with at least one of a fire safety system, a security system, an electrical system, or sensors. A fire safety system may be of an array of equipment used to detect and warn building occupants when smoke, fire or other emergencies are present and to contain such emergencies. Examples of fire safety equipment include smoke detectors, carbon monoxide detectors, heat detectors, manual pull stations, sounders, strobes, speakers, and other equipment for fire detection or alert. For example: a sounder may emit an auditory sound to alert occupants if a fire is detected by a smoke detector. A fire safety system may be integrated into a building management system. It may be an addressable or non-addressable type. The wiring typologies of a fire safety system may vary. The requirements of fire safety systems may vary based on codes and regulations. In some embodiments, a fire alarm system may include one or more fire alarm panels. A fire alarm system may include one or more wiring loops connecting the fire alarm panels to the array of detectors, sounders and other equipment.

A security system in a building may include a physical security system that monitors and controls access to areas, rooms, or specific points of interest of a building. Security systems may include multiple types or contain multiple components. For example, Video Surveillance Systems (VSS) and camera systems, which may be components of security systems, may include cameras, network components, records/NAS drives, and the like. An intrusion alarm system may include various sensors and contacts such as door contacts, window contacts, glass breaker sensors, as well as sirens and audible alerts to alert occupants of an instruction and/or emergency. An access control system may include door locks, access control readers, controllers, and other suitable devices to restrict or control access to doors, gate, and other points of entry.

A building electrical system may be a network of equipment designed to carry, distribute and convert electrical power safely from the point of delivery or generation to the various loads around the building that consume the electrical energy. An electrical system may include a plurality of transformers, generator, meter, switchgear, bus/feeder, branch panels, distributions panels, circuit breakers, fuses, electrical circuits and the loads connected to them (e.g. equipment such as HVAC units, chillers, pumps, elevators, lighting fixtures, power sockets, IT equipment, and other equipment that uses electrical power), electrical cable, enclosures, panels, equipment racks, and conduits and/or cable trays that contain electrical cables.

In some embodiments, the generative analysis may generate a preferred wiring path. A preferred wiring path (or run) may relate to a preference for passing wiring through one space rather than through another. For example, a functional requirement may include a preference to pass wiring through corridors rather than through private spaces such as offices or sleeping areas, because public spaces may be accessed more easily and with less disturbance to building occupants than private spaces, because of available space within a ceiling for the wiring. In this context, a preferred path may indicate rooms, areas within rooms, zones, lines or points in the floor plan where the wiring may pass.

Additionally, or alternatively, generative analysis may include a plurality of simulations to determine a preferred grouping of equipment and wiring routes. For example, the selection of equipment may be optimized according to different parameters in different simulations. As another example, multiple different simulations may be run using different algorithms. In some embodiments, wiring runs may also be generated by each of a plurality of simulations. The preferred grouping of equipment may be selected based at least in part on the efficiency of the wiring runs. Efficiency of wiring may be determined, for example, based on the maximum distance of cables and/or total quantity of cables and/or thickness and/or gauge of cables and/or cost of cables and/or cable trays and/or conduits and/or electrical panels, and/or cost and time of installation and/or minimizing voltage drops. In other embodiments, the multiple simulations may be run for different wiring typologies. For example, two simulations may be run with the same equipment or equipment locations, but one using a tree wiring typology and one using a maximal loop wiring typology.

Consistent with disclosed embodiments, the method may include accessing structural data associated with the at least one room, the structural data including wall locations. Structural data may be stored and accessed from a variety of locations including a network location, such as a remote server, a network attached storage drive, a remote database, a cloud storage service, or other types of network storage. In some embodiments, structural data may be stored and accessed from local storage, such as a storage device associated with the processor or a local database. In some embodiments, structural data may be stored in a data structure. According to disclosed embodiments, structural data may be stored as properties associated with rooms of the floor plan within the floor plan data. Structural data associated with wall locations may further include an ability of a wall to convey wiring. Certain walls, for example, may be constructed in a manner making them more suitable for handling wiring. Conversely, some types of walls, such as fire rated walls, for example, may be ill-suited for wiring penetrations. Or certain sections of walls might already be occupied by conduits of other systems, making them less optimal for handling wiring. The system may take these realities into account during a generative analysis.

Structural data may also include a door location, a window location, a wall location, a shaft location, a column location, or locations of other structural elements of buildings. In this context, a shaft may be any vertical space which traverses more than one floor of a building. Shafts may be used to pass electrical, water or any other types of cabling vertically throughout the building. As an example, a shaft might be used for elevators. In some embodiments, a shaft may be empty of any equipment or cabling. In some embodiments, a shaft may be an enclosed space with no door leading to it, only accessible by, for example, a service opening. In the context of structural data, a column may include any physical, fixed, vertical element in the floor plan which is not a wall. Generally, a column or pillar may be a structural element that transmits, through compression, the weight of the structure above to other structural elements below. Large round support columns may support beams or arches on which the upper parts of walls or ceilings rest, for example. Column may also refer to such a structural element that also has certain proportional and decorative features.

In some embodiments, accessing structural data may include performing geometric analysis, semantic analysis, image analysis, machine learning methods or any combination thereof in order to identify the plurality of rooms in the floorplan and structural data associated with the rooms such as walls, doors, windows and shafts.

Disclosed embodiments may further include generating a wiring diagram for the at least one room using the selected technical specifications and the structural data, wherein the wiring diagram includes a graphical representation on the floor plan of the equipment placement location of the selected piece of equipment and wiring runs to the selected piece of equipment. A graphical representation may a symbolic image which describes architecture as an image in CAD, PDF, JPG, BIM or any other suitable format. As an example, the graphical representation may use drawing conventions or symbols e.g., a wall may be represented by 2 parallel lines) or as a BIM object which may contain a graphical representation along with metadata and parametric information. The graphical representation can represent layouts, rooms and architectural features such as doors and furniture. In some embodiments, it may represent the system within the floor plan, equipment of the system, and the wiring connecting them. Graphical representations may also contain textual information regarding the objects represented.

Disclosed embodiments may also include generating wiring diagrams for a plurality of rooms. In some embodiments, at least some of the wiring routes for the plurality of rooms aggregate along a single path. For example, wiring routes for multiple rooms may pass through the same column, corridor, or structural feature of a building.

In some embodiments, wiring diagrams may be generated for a plurality of pieces of equipment of different equipment types. For example, a wiring diagram may include wiring runs for light fixtures, as well as wiring runs for a fire alarm system. Generating the wiring diagram may be based on a rule to avoid exterior areas of a building for wiring runs. For example, the generative analysis algorithm may be configured to not place wiring runs on the exterior of a building. This may be advantageous to keep wires concealed for aesthetics and security, as well as protect them from weather.

Some embodiments may include automatically selecting auxiliary equipment associated with the selected piece of equipment and the generated wiring diagram. Auxiliary equipment may include but is not limited to a piece of electronic, mechanic or any other type of hardware that is an accessory or serves in a role in a making a system devised of one or more primary pieces of equipment functional or at least partially functional. For example, the auxiliary equipment for a video camera may include a lens, cables, screws, fixings a patch panel, a video recorder, a network switch, a rack and a UPS. As another example, the auxiliary equipment for a light fixture may include cables, a light switch, electrical breakers and an electrical panel board. In some embodiments, auxiliary equipment may include network infrastructure, electrical breakers, and enclosures or racks. Other examples may include: electrical enclosure with electrical circuit breakers, a controller with a power supply, an access control reader with a controller, an access control reader with a power supply, smoke detector with a mount, a mount for a TV or piece of furniture, a bulb for a light fixture, an HDMI cable and bracket for a TV, or a valve for an AC unit. The relationship between primary and can be a physical combination (e.g. fuse inside a piece of equipment) or related/logical (e.g. access reader is paired with a controller via a cable connection).

Some embodiments may include defining a wiring termination point for equipment located in at least one room. In some embodiments, the wiring termination point may be located in another room, different from the at least one room. As described above, a wiring termination point may be another piece of equipment, a rack, an enclosure, or another point at which a wiring run may end. In some embodiments, generated wiring may traverse from the piece of equipment located in the at least one room to the termination point in the other room. In some embodiments, there may be a plurality of rooms with selected equipment and the generated wiring runs in the wiring diagram may terminate at a single termination point. As an example, a wing of a floor of a building may be given a wiring diagram for wall power outlets that implements a tree wiring typology. The wiring for the power outlets in all six rooms of the wing of the building may all terminate at a single panel (e.g., a circuit breaker enclosure). For example, a plurality of wiring terminations points may terminate at a single level of a building (i.e., the termination points are located on a same level of a multi-level building).

In some embodiments, the termination point may be associated with an equipment rack or equipment enclosure. An equipment rack may house or enclose various pieces of equipment. The equipment can be of varying types and sizes, for example, patch panels, network switches, amplifiers, controllers, and other equipment. Racks may vary in dimensions and may be designated by a "U" size designation. Equipment may be rail mounted or shelf mounted inside a rack. In some embodiments, a rack may be ventilated. A rack may have an IP rating. An enclosure may house and/or enclose various piece of equipment. The equipment can be of varying types and sizes, for example, patch panels, network switches, controllers, actuators, circuit breakers, fuses, and the like. Enclosures may be of varying dimensions. Equipment may be mounted inside enclosures using a DIN rail system. An enclosure may be an electrical enclosure, a building management system enclosure, an enclosure for audio-video equipment, a network enclosure, or other type of enclosure. In some embodiments, the termination point associated with a rack or enclosure maybe a piece of equipment within the rack or enclosure, for example, a circuit breaker, a switch, a fuse, or piece of equipment.

In some embodiments, the generated wiring runs may indicate a specific input or output port at the wiring termination point. For example, a wiring diagram may illustrate an enclosure that depicts multiple input or output port locations. The wiring runs on the wiring diagram may be shown as terminating at a specific one of the enclosure's multiple ports.

Consistent with disclosed embodiments, a defined wiring termination point may be user defined. For example, a user may select a point on a floor plan via a user interface, as disclosed herein. The selected point may be a user's desired termination point for a wiring run. In other embodiments, a user may be enabled to edit wiring termination points. For example, the user may be able to move a termination point or select a different termination point for a wire. For example, a user may move a termination from one head-end to another, or from one port on a piece of equipment to another port on the same piece of equipment or a different piece of equipment. In some embodiments, a user may be enabled to bulk update of wiring termination points. Some embodiments may include receiving user input modifying a termination of the selected piece of equipment and generating a new wiring diagram based on the modified termination.

Exporting data associated with the wiring diagrams including the termination points may be included in some embodiments. Exporting data may include saving the data to a data structure or other data storage location, as described herein. In some embodiments, exporting may include saving, visualizing, printing, or otherwise outputting the generated wiring diagrams.

Consistent with disclosed embodiments, the generated wiring diagram may be based on one or more preferred wiring runs. For example, generating the wiring diagram for a room may be based on a user definition of a preferred wiring run. A user may define a preferred wiring run via a user interface provided by the system. In some embodiments, the preferred wiring run may be indicated by setting user preferences. For example, a user may set user preferences to indicate that wires should be run through corridors rather than other rooms whenever possible. As another example, a user preference may indicate that wires going between floors of a building should be run through shafts, as opposed to, for example, walls or columns. This may be especially important for cases where wires physically cannot be run through certain structural features, such as solid structural columns or fire-rated walls. In some embodiments, a user may specifically define a preferred wiring path on a floor plan or diagram. For example, a user may define a wire path using a line or other visual wire indicator drawn along floor plan. In some embodiments, the user may define a wire path in three dimensions in the x, y, and z axes of a floor plan. In some embodiments, a user may specify a non-preferred path for wiring runs. In contrast to a preferred path, a non-preferred path may indicate a path that should be avoided by wiring runs.

In some embodiments, the method may include identifying a corridor and identifying a preferred wiring run through the corridor, and generating the wiring diagram may be based on the preferred wiring run. Consistent with disclosed embodiments, the corridor may be identified using a semantic enrichment process. Identifying a preferred wiring run may include accessing a rule that defines one or more preferred wiring runs. The rule may be associated with, for example, the corridor, or another room or area of the floor plan.

Disclosed embodiments may additionally include making calculations for materials needed to wire a building according to the generated wiring diagram. In some embodiments, the method may include calculating a total wire length of the wiring runs. The total wire length may represent the total length of wiring needed to connect a system, counting individual wires, meaning if there are two wires running in parallel in a certain segment of a wiring diagram, the total length is counted twice for that segment. Thus, the total wiring calculation may represent the entire amount of wire (length of the wire) needed to wire the room, area, floor, zone, building, etc. that corresponds to a given wiring diagram. In some embodiments, this calculation may be made on a per equipment basis. For example, the wiring length for a piece of equipment may signify the distance traversed by a wire from the equipment to its terminal point in the diagram (e.g., a panel or other piece of equipment). As an example, the system may indicate that a certain power outlet requires 10 feet of wire to run from the outlet to a circuit breaker in the corresponding termination panel. In some embodiments, a user may define a spare margin of wire lengths. A spare margin of wire lengths may indicate an extra amount of wire to be added to each calculated length. This may account for extra length that may possibly be needed during the wiring installation process. A spare margin may be defined for the entire length generated for the wiring diagram, or on a per device basis. In some embodiments, the user may define different spare margins for specific type of devices. In some embodiments, spare margins may be already built into the system's calculations. For example, device properties may indicate a spare margin that should be added to the wiring length calculations for that device. Thus, when calculating the wire length needed for that device, it may account for the associated spare margin.

In some embodiments, the wiring diagram may include a cable tray, and calculating dimensions of the cable tray. When physically constructing the wiring of a building, several parallel wires may be placed in the same cable tray or conduit. In these cases it may be necessary to calculate the physical dimensions (diameter for conduit, width and height for trays) needed to pass all the necessary wires. This may be done by taking into account the thickness of the wires, any required spacing between wires (e.g. separating electrical and low-voltage cables by a certain distance to avoid interference) as well as a certain redundancy. A certain over fill or capacity threshold may be defined according to a user, international standard, local code and the like (e.g. cable tray to be filled to max 60% capacity). In a generative analysis process, the size of the cable tray and or conduit may be modified taking into account the technical specifications and quantity of the wires (e.g. thickness and diameter). The generative analysis process may also take into account rules (user defined or standards and the like) regarding spacing of certain cable types (e.g. cat-6 cable distance from electrical cables) or to other objects in determining conduit and cable tray sizes.

The dimensions of the cable tray may be used to determine a fill capacity for the cable tray indicating the maximal amount of wiring or cables that may fit within the tray. In some embodiments, a user may define a sub-maximal fill capacity. For example, the user may define that all cable trays be filled to no more than 75 percent of maximal capacity. Such sub-maximal fill capacities may permit easier installation and maintenance of wires within cable trays.

In some embodiments, the wiring diagram may include a conduit and may include calculating the dimensions of the conduit. As described above with respect to cable trays, the dimensions of the conduit may be used to determine a fill capacity for the conduit indicating the maximal amount of wiring or cables that may fit within the conduit. In some embodiments, a user may define a sub-maximal fill capacity for conduit. In some embodiments, the technical specifications of wiring or cables that may be contained in the same conduit may be defined (e.g. no electrical and low-voltage cables within the same conduit).

In some embodiments, a bill of material may be generated for at least one of a selected piece of equipment, wiring run, a conduit, or a cable tray of a wiring diagram. Embodiments consistent with the present disclosure may include generation of a material list, sometimes referred to as a "bill of materials" or as a "bill of quantities." A material list, or bill of materials, may be a list describing the primary, secondary and auxiliary equipment required to physically construct a building system. A material list may be a list of equipment models which may or may not include the specific model, the quantity used, price information, specific properties, and a physical description. A material list may include an image of the equipment. An equipment list may be displayed on the screen or exported to a textual (word), tabular (excel) or image (jpg, pdf) format. A material list may be electronically transmitted by email or via the internet to third-party software, ERP systems and the like. For example, a bill of materials for a wiring diagram of a room may include the materials needed for completing the wiring of the room, including type and quantity of each piece of equipment (outlets, switches, light fixtures, alarms, and other equipment as disclosed herein), the type and length of wire, the size and length of conduit, the size of cable trays, and other materials that may be needed to complete wiring of the room. In some embodiments, a bill of material may include generic technical specifications or equipment identifiers.

Some embodiments may include outputting a technical specification of the wiring diagram based on technical specifications of the selected piece of equipment. Technical specification of the wiring diagram may refer to the general category of wiring/cable (e.g., high-voltage, medium-voltage, low-voltage, network, fiber optic, audio, video, or other cable type), a specific type within a category (e.g., Cat6 network cable or Cat7 network cable), a thickness and/or gauge (e.g., 14 American Wire Gauge (AWG) electrical cable), a color, a fire rating, an IP rating (e.g., indoor or indoor), jack/insultation type, a plenum rating, conductivity rating, number of conductors, or other property or characteristic of wiring. The technical specifications may include a specific manufacturer and/or model identifier. As an example, technical specifications may identify one or more technical characteristics or a wire such as 12 AWG thickness, 4 conductors, and a yellow PVC jacket.

In some embodiments, the selected technical specifications may include power consumption data, and the wiring diagram may conform to the power consumption data. For example, a voltage drop calculation related to the wiring diagram may be performed to ensure that the diagram conforms to a power consumption limit or standard. In some embodiments, the wire size selected may adapt based on the voltage drop calculations and a user may define a voltage drop threshold. The system may be configured to adapt the technical specifications of the wire or other equipment based on the calculated voltage drop and the voltage drop threshold. For example, a different size wire may be selected if the calculated voltage drop exceeds the voltage drop threshold. As another example, equipment with lower power consumption may be selected so the voltage drop threshold is not exceeded.

Some embodiments, may include generating an report indicating the selected piece of equipment, the wiring runs, and a wiring length on a per piece of equipment basis.

Some embodiments may be configured to permit a user to select functional requirements for the plurality of rooms and to calculate wire runs for equipment selected for the plurality of rooms. As described herein, a user may select or associate a variety of functional requirements with one or more rooms of a floor plan. The wire runs of equipment calculated for a wiring diagram may be based on the one or more user selected functional requirements.

Some embodiments may include enabling a user to change the equipment placement location of the piece of equipment. This may include updating the wire runs associated with the changed equipment placement location. For example, a user may use an interface to select a piece of equipment on a wiring diagram and drag the piece of equipment to a new location within the diagram. The wiring diagram may then be updated based on the new location. As described herein, a wiring diagram may be a calculation of the shortest paths between points on the floor plan, the points representing the equipment and the terminal panel. The calculation may be powered by a graph traversal algorithm such as Djikstra or BFS or any other relevant algorithm. The calculation may also take into account architectural aspects (corridors, walls, etc) of the floor plan as weighting in the graph traversal algorithm. Thus, when one piece of equipment is moved in the floor plan, at least some part of the calculation may need to be re-run, in order to regenerate the diagram according to the modified data. The calculation may be regenerated because of a specific user request or because of an automatic process configured to detect when changes were made to the equipment placement which require recalculation. For example, after a piece of equipment is moved, an update to the wiring diagram may occur automatically without user intervention. If a piece of equipment is changed when it is moved, or is simply changed, embodiments might compare the wiring requirements of the newly selected equipment, and if necessary, update the wiring diagram to account for the new equipment. This might require changes in wire used, wire paths, channels, and conduits.

Some embodiments may include generating wiring diagrams for equipment select and located by a user. For example, a user may access an interface to select a piece of equipment from a list of equipment and locate the equipment on a floor plan. A wiring diagram may then be generated based on the user selected and located equipment.

Some embodiments may include generating wiring diagrams for equipment already placed on the accessed floor plan. For example, accessed floor plans may already include equipment located on the floor plan. Accordingly floor plan analysis may be employed to recognize such pre-placed equipment, and generate a wiring diagram for it, or include it in a wiring diagrams that includes newly selected and located equipment.

It is to be understood that wiring diagrams may be generated for equipment that is selected and located in a variety of ways. For example, a single wiring diagram may include a combination of equipment that was selected and located by the embodiments disclosed herein, equipment that was selected and located by a user, and equipment that was already placed on the accessed floor plan.

In some embodiments, the system may be configured to enable user editing of wiring runs. For example, a user may be able to select and move wiring runs within a wiring diagram. After a user edits a wiring run, the wiring diagram may be updated. In response, other outputs associated with the wiring diagram may also be updated, such as wire length calculations, bills of materials, indexes, and other outputs or calculations that are based at least in part on wiring runs of a wiring diagram.

Disclosed embodiments may include generating a second wiring diagram for a room and enabling a user to select a preferred diagram from among the first and at least the second wiring diagram. As disclosed herein, a variety of different wiring diagrams may be generated for a single room based on for example, different equipment selections, equipment locations, functional requirements, technical specifications, wiring paths, wiring typologies, generative analysis algorithms, user inputs, and other factors that may affect the generation of a wiring diagram. In some embodiments, the two diagrams may include various specifications related to each diagram, such as wire length, wire gauge, voltage drop, cable tray size, conduit size, cost, and other data related to a specific diagram, displayed within the diagrams. Comparative data might be displayed to assist the user in making a decision between wiring diagrams. For example, information associated with material cost, labor cost, and/or material volume may be presented to the user.

Figure 22C:
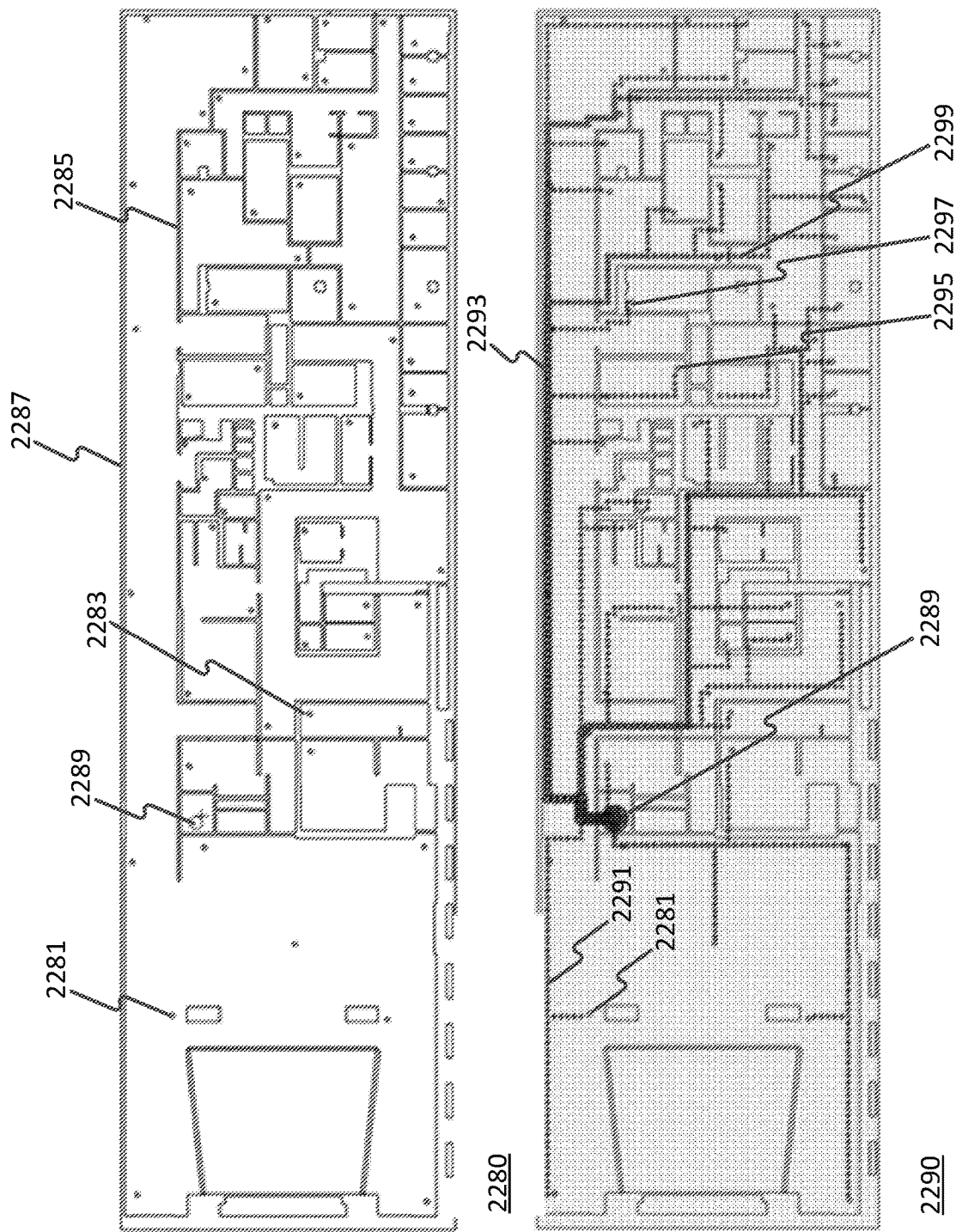
FIG. 22C is a depiction of an exemplary wiring diagram, consistent with disclosed embodiments.

FIG. 22C is a depiction of an exemplary wiring diagram, consistent with disclosed embodiments. Floor plan 2280 indicates exemplary device locations. As disclosed herein, equipment may be selected and located within the floor plan using a variety of methods. In floor plan 2280, devices are represented by a variety of symbols. For purposes of illustration, devices 2281, 2283 are illustrated using small circles, but any other suitable symbol may be used in the embodiments. Different symbols may be used to represent different models or types of devices. For example, termination point 2289 is illustrated using a different symbol from devices 2281, 2283. The floor plan may also include depictions of structural data, for example, walls 2285 and 2287.

Further, as disclosed herein, a wiring diagram may be generated for the devices located on floor plan 2280. In wiring diagram 2290, wiring runs are represented by dotted lines, but other methods of representing wiring runs may be used, including solid lines, dashed lines, colored lines, BIM objects, and others. A wiring diagram may illustrate a wiring run (i.e., path) from each device back to a termination point. For example, wiring run 2291 connects device 2281 to termination point 2289. As disclosed herein, the termination point may be, for example, an enclosure or panel that includes equipment, such as circuit breakers or switches.

As depicted in wiring diagram 2290, some of the wiring runs for rooms may aggregate along a single path 2293. For example, run 2293 includes wiring runs from devices 2295 and 2297, as well as a number of other devices, as shown. As shown by run 2293, aggregated runs may be represented by a different style or type of lines, a larger or thicker line, a different color, or other differentiating technique. Other aggregated runs such as run 2299 may be represented with a different line. In some embodiments, the determination of whether to use a different line may be made based on the number of runs aggregated along the particular path of the diagram.

Figure 23:
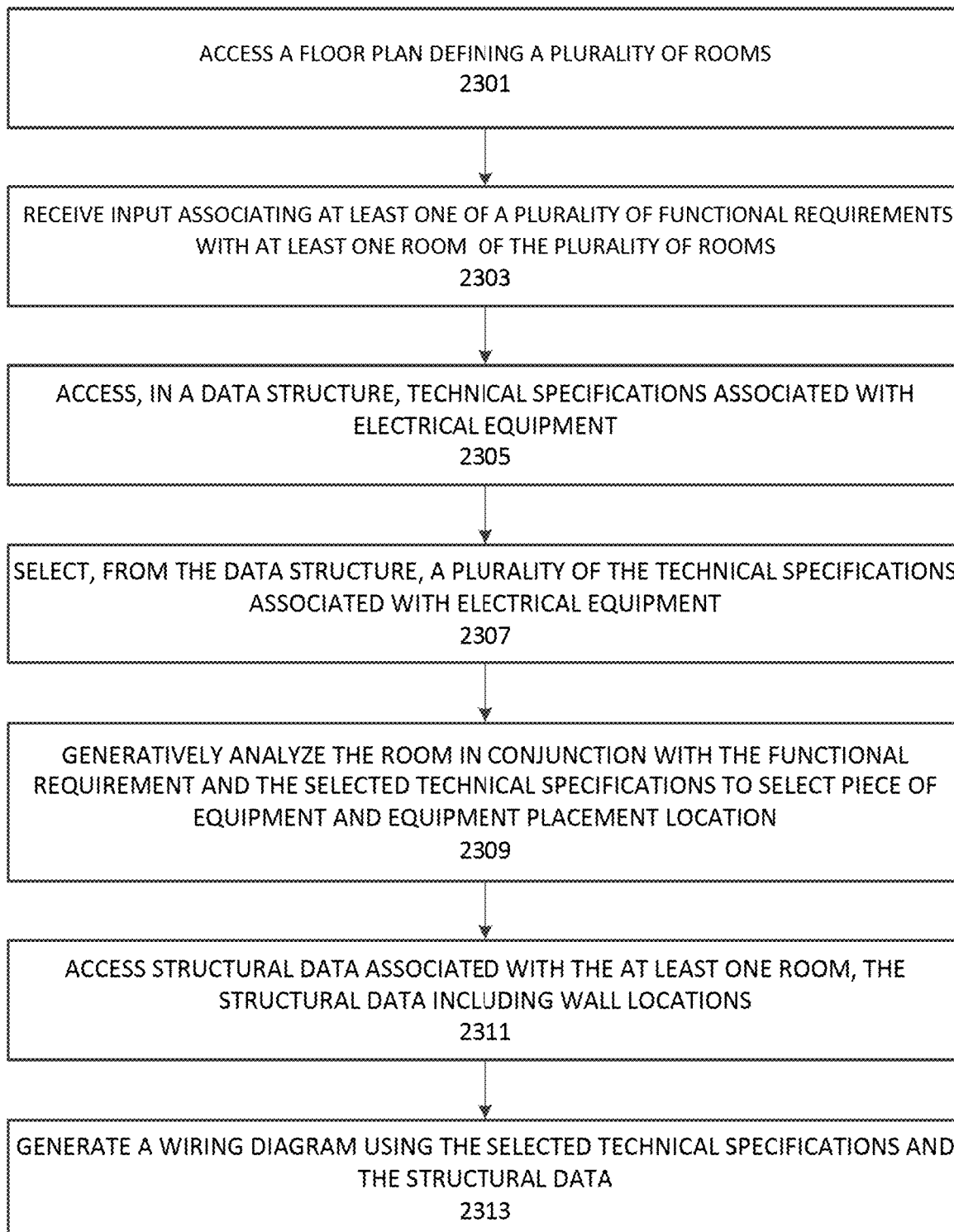
FIG. 23 is a flowchart illustrating an exemplary process for generating a wiring diagram for equipment, consistent with disclosed embodiments.

FIG. 23 is a flowchart illustrating an exemplary process 2300 for generating a wiring diagram for equipment, consistent with disclosed embodiments. Process 2300 may be performed by a processing device, such as any of the processors described throughout the present disclosure. It is to be understood that throughout the present disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 2300. Process 2300 is not necessarily limited to the steps shown in FIG. 19 and any steps or processes of the various embodiments described throughout the present disclosure may also be included in process 2300.

At step 2301, process 2300 may include accessing a floor plan defining a plurality of rooms. As described herein, floor plans may be accessed in a variety of formats and may include other information associated with the spaces within the floor plan. A floor plan may be accessed in a variety of ways including from a network location, a cloud storage, local storage, or other types of access as described herein. In some embodiments, floor plans may include or reference furniture or other architectural features. In some embodiments, step 2301 may include performing a floor plan analysis on the floor plan to identify contours of a plurality of demarcated rooms of the floor plan.

At step 2303, process 2300 may include receiving input associating at least one of a plurality of functional requirements with at least one room of the plurality of rooms. As described above, functional requirements may be associated with rooms within a floor plan and the input associating rooms and functional requirements may take a variety of forms and be received in a variety of ways.

In some embodiments, step 2303 may include receiving the input as user input. For example, step 2303 may include generating a user interface to present to a user. The user may interact with the user interface to manually define associations between rooms and functional requirements, as described above.

At step 2305, process 2300 may include accessing, in a data structure, technical specifications associated with electrical equipment. As described herein, data in a data structure may access in variety of ways and be stored in a variety of locations.

At step 2307, process 2300 may include selecting, from the data structure, a plurality of the technical specifications associated with electrical equipment. For example, the data structure may include a large number of technical specifications associated with electrical equipment, such as power consumption specifications, voltage specifications, current specifications, and others. One or more of the technical specifications may be selected and retrieved from the data structure, as disclosed herein.

At step 2309, process 2300 may include generatively analyzing the at least one room in conjunction with the functional requirements and the selected technical specifications in order to select a piece of equipment for the at least one room and select an equipment placement location of the selected piece of equipment within the at least one room. As described herein a generative analysis may be performed in variety of ways, including using one of number of disclosed algorithms to analyze data related to a room and select equipment and equipment locations based on such data. In some embodiments, the generative analysis may include implementation of a machine learning or artificial intelligence model, as described above. A generative analysis may use a variety of input data including: room geometric and architectural features such as area, volume, ceiling height, number of boundary segments, boundary complexity, number and locations of doors, number and locations of windows, obstacles such as columns and shafts, furniture such as desks, chairs and tables, topological connections, adjacent rooms and areas, room name, room function, the level of a building the room is located in, the zone the room is part of, and other data related to rooms, architectural features, equipment, functional requirements, and technical specifications. In some embodiments, a generative analysis may be used to select and locate equipment in a floor plan. In some embodiments, the generative analysis of step 2309 may include a plurality of simulations to determine a preferred grouping of equipment and wiring routes.

At step 2311, process 2300 may include accessing structural data associated with the at least one room, the structural data including wall locations. Structural data may be stored in and accessed from a variety of locations and may include a door location, a window location, a wall location, a shaft location, or a column location. Structural data may also include locations of other structural elements of buildings.

At step 2313, process 2300 may include generating a wiring diagram for the at least one room using the selected technical specifications and the structural data, wherein the wiring diagram includes a graphical representation on the floor plan of the equipment placement location of the selected piece of equipment and wiring runs to the selected piece of equipment. As described above, a variety of wiring diagrams may be generated based on various data related to the floor plan, equipment, user input, functional characteristic, technical features, and others. Consistent with disclosed embodiments, step 2313 may include generating wiring diagrams for a plurality of rooms, such as is illustrated and described in connection with FIG. 18B. In some embodiments, step 2313 may include generating wiring diagrams for a plurality of pieces of equipment of different equipment types.

In some embodiments, step 2313 may include defining a wiring termination point for equipment located in at least one room or receiving a user defined termination point, as described above. In some embodiments, step 2313 may include exporting data associated with the wiring diagrams including the termination points. In some embodiments, as described above, step 2313 may include permitting a variety of user interactions, including, for example, selecting equipment, locating equipment, moving previously located equipment, moving wiring runs, indicating preferred or non-preferred wiring paths, and others.

Step 2313 may also include, consistent with disclosed embodiments, making calculations for materials needed to wire a building according to the generated wiring diagram, generating a bill of materials, and outputting technical specifications. Step 2313 may also include generating multiple wiring diagrams for a room or floor plan, and permitting the user to choose between the multiple diagrams.

Aspects of this disclosure may include systems, methods and computer readable media for extracting data from a 2D floor plan and retaining it in a building information model. Architectural plans may include two-dimensional ("2D") drawings or other 2D visual representations of floors of buildings. The lack of structured semantic information and metadata regarding architectural features in a 2D drawing may impede or prevent a generative analysis process, or other computational or based processes. For example, in the case of running a simulation to place equipment within a room, the room geometry, demarcations and contours may be critical. Without a means of efficiently identifying these demarcations, running simulations on a plurality of rooms may be infeasible or not practical. As another example, room area, boundary segments and other architectural features may be relevant to the generation of an index or bill of material. These features may also be critical inputs, for example, to a semantic enrichment process. Without the means to efficiently extract these features, the process may be laborious or, on large projects, not feasible. Other actions, such as bulk application of functional requirements, technical specifications, or equipment to rooms may not be feasible without identified room demarcations. Furthermore, 2D drawings may also provide limited context. For example, a designer may not be able to fully grasp the relative size or proportions of a room on a 2D floor plan, without having a visualization of the height of the walls of the room. Additionally, visualizing differences between floors of a building or the relative location of rooms located on different floors may be difficult.

Accordingly, semantically structured building information models, which may be a 3D model, may be useful when designing and constructing buildings. However, creating building information models of unstructured 2D floor plans manually may be inaccurate and labor-intensive. In some cases, a user may wish to create a building information model from a floor plan that is hand drawn or otherwise not already in a computerized format. To address these challenges, disclosed embodiments may facilitate creation of building information models of pre-existing floor plans by extracting data from a 2D floor plan and using the extracted data to generate a building information model. Embodiments include using a variety of automated approaches that consider geometric or other image properties of floor plans. Disclosed embodiments may also generate 3D representations of multiple related floor plans to permit a designer to, for example, view multiple floors of at building at once using a single model.

A processor may run a series of tasks to access a floor plan, identify wall boundaries of rooms within the floor plan, and generate a building information model based at least in part on the wall boundaries. In some embodiments, the system may be a cloud-based system. For example, the methods described herein may be executed in a virtual instance by a remote computer, rather than a local processor. Cloud-based computation can provide advantages in scalability, cost, and security over approaches that rely on local computational or conventional servers.

For ease of discussion, a method is described below, with the understanding that aspects of the method apply equally to systems, devices, and computer-readable media. For example, some aspects of such a method may occur electronically over a network that is wired, wireless, or both. Other aspects of such a method may occur using non-electronic means. In a broadest sense, the method is not limited to particular physical, electronic instrumentalities, but rather may be accomplished using many differing instrumentalities.

Disclosed embodiments may include accessing a 2D floor plan demarcating a plurality of rooms. As described herein, accessing may occur, for example, when a floor plan is opened, uploaded, linked, retrieved, recovered, extracted, or otherwise provided to or obtained for analysis by at least one processor. In some embodiments, accessing may occur when at least one processor is enabled to perform operations on the floor plan. Accessing may occur when a floor plan is retrieved from storage, such as a form of memory. A floor plan may be accessed from a variety of locations, as disclosed herein.

By way of example, FIG. 24A is an illustration of exemplary stages of an exemplary process for extracting data from a 2D floor plan and retaining it in a building information model, consistent with disclosed embodiments. As shown, an exemplary floor plan 2400 may be accessed. The floor plan may demarcate a plurality of wall boundaries including window 2401, exterior wall 2403, and interior wall 2405.

Floor plans may be in any suitable format, as disclosed herein. For example, a floor plan may be represented in hand drawn or scanned graphics. In some embodiments, a 2D floor plan may be a CAD file. CAD may include but is not limited to a vector based representation of geometry used to describe architectural projects. CAD files may contain geometric primitives such as points, lines, polylines, curves. The primitives may be organized in drawing layers, which may be used to add graphical information (e.g., plot line widths and colors) or semantic information (e.g., names which identify a function of an object). Additionally or alternatively, CAD files may contain one or more collections of primitives arranged together in different collections such as texts, hatches, groups, blocks, and XREFs, which represent different types of geometric or functional abstractions (such as furniture, mechanical equipment, or information from other parties). CAD files may be displayed using dedicated software such as AutoCAD, converted into printable formats such as PDF.

In other embodiments, a 2D floor plan may be a PDF file. Portable Document Format ("PDF") files may be used to present documents, including text formatting and images, in a manner independent of application software, hardware, and operating systems. Based on PostScript language, each PDF file may encapsulate a complete description of a fixed-layout flat document, including text, fonts, vector graphics, raster images and other information needed to display it. PDF files may contain a variety of content besides flat text and graphics including logical structuring elements, interactive elements such as annotations and form-fields, layers, rich media (including video content) and three dimensional objects using U3D or PRC, and various other data formats. PDF files are often used as an output for CAD software since they preserve vector format of CAD, albeit without conventional editing capabilities.

As yet another example, a 2D floor plan may be an image file. Image file formats may include standardized formats for organizing and storing digital images. An image file format may store data in an uncompressed format, a compressed format (which may be lossless or lossy), or a vector format. Image files may include digital data in one of these formats so that data can be rasterized for use on a computer display or printer. Rasterization may convert image data into a grid of pixels. Each pixel can have a number of bits to designate its color (and in some formats, its transparency). Rasterizing an image file for a specific device may take into account a number of bits per pixel (color depth) that a device is designed to handle. Non-limiting examples of image file formats include JPEG file, TIFF file, PNG file, BMP file, or other graphical or digital file formats.

In some embodiments, a floor plan may be stored in a data structure. Floor plans may be in digital and hard copy formats, or both. A floor plan may include a diagram of a room, a suite of rooms, a whole floor of rooms, or an entire building of rooms. For example, a floor plan may include such representations as viewed from above. A floor plan may consist of other associated information with a plurality of rooms including technical specifications, functional requirements, equipment lists, energy metering, BMS data, iOT data, and other types of information as described herein.

In some embodiments, floor plans may demarcate a plurality of rooms. A room within a floor plan may be an area within a building or structure, for example, an office, corridor, sleeping area, kitchen, balcony, staircase, or other area of a building or structure. As described herein, rooms are not limited to rooms or areas within a building or structure. For example, in some embodiments, rooms may include exterior areas of a building or structure, such as a garden, lawn, balcony, patio, deck, gazebo, roof, sidewalk, driveway, fire escape, or other exterior area related to a building or structure.

A room demarcation may include information relating to a floor plan that may indicate a location of a room in a floor plan in relation to the rest of the floor plan. A room demarcation may also include boundaries (also referred to herein as contours) of a room. Boundaries may include objects, real or imaginary, that constitute borders of a room (such as walls or windows that surround a room), openings associated with a room's borders (such as doors or windows leading in and out of a room), equipment, architectural features (such as columns, beams, furniture, or others) contained in or around a room.

Embodiments may include identifying wall boundaries of a plurality of rooms using a machine learning method. As described herein, wall boundaries may be contours or other indicators of a space that show a room relative to other rooms within a floor plan. Identifying may include pointing, tagging, measuring, specifying, extracting, labeling, or any other means of identifying. In some embodiments, identifying may include highlighting or otherwise delineating identified boundaries on a floor plan.

For example, as shown in floorplan 2407 of FIG. 24A, embodiments may include identifying wall boundaries of floor plan 2400. Identifying wall boundaries may include highlighting the wall boundaries on the floor plan 2407. For example, window 2405 may be highlighted as identified boundary 2409. Similarly, interior wall 2405 and exterior wall 2403 may be highlighted as identified boundaries 2413 and 2411, respectively.

According to disclosed embodiments, machine learning may be used to identify rooms and/or room demarcations contained in a floor plan. Machine learning may refer to artificial intelligence or machine learning models or algorithms as described herein. Embodiments may include using artificial intelligence to segment walls and rooms from images of floor plans. For example, artificial intelligence may be used to detect and classify architectural features on floor plan images, detecting features such as windows, doors, door sills, stairs, furniture, equipment or any other features. As another example, artificial intelligence may determine room type using feature based ML models such as XGBoost. Embodiments may include using artificial intelligence NLP (Natural Language Processing) to infer semantic meaning from text. Machine learning models may include but are not limited to classification models, neural network models, random forest models, Convolutional Neural Network Models, deep learning models, recurrent Neural network models, support vector machine models, a support vector machine model, ensemble prediction models, Adaptive Network Based Inference System, or any other machine learning model. Possible deep neural types of CNN's for Computer Vision and other potential tasks may vary by tasking and may include Resnet 50 for Classification, RetinaNet and Mask RCNN for Detection, and Unet and Mask RCNN for Segmentation. Embodiments consistent with the present disclosure may include structured data models such as, for example, boosting algorithms (e.g XGBoost), standard neural networks, and random forest models.

As an illustrative non-limiting example, a Unet or Mask RCNN model may be used to segment walls from the images of 2D floorplan. As illustrative non-limiting examples regarding annotations, geometric objects such as boxes, oriented boxes or polygons may be used to identify and demarcate features of walls in a plurality of floor plans. Annotation objects may be generated in a variety of ways, such as automatically by using heuristic, geometric or statistic algorithms. Alternatively or additionally, other object generation techniques may be employed. Alternatively, the walls may be manually annotated. Annotated floorplans may be divided into training and validation sets. In this context, annotations may be used for detection, segmentation, classification tasks, computer vision tasks, or a variety of other artificial intelligence tasks, as well as in statistical methods. As illustrative non-limiting examples, training images with annotated walls may be cleaned by removing text, redundant features, other elements and/or cropped and/or augmented. Following the segmentation of walls by a machine learning model, for example, various post-processing techniques may be used. On a black and white image, for example, edge detection may be used to determine borders between black and white, and to join these edges into polyline chains.

Identifying wall boundaries may include performing one of a variety of types of analysis on the floor plan to extract room features such as doors, windows, walls, as wall length, area and many other possible features. The extraction of these features may be based on lines within the floor plan. For example, an analysis differentiate between different types of lines present on floor plan to determine which lines correspond to room walls and which lines do not. In some embodiments, aspects of the rooms of the floor plan other than walls may be used to identify wall boundaries. For example, a door, window, railing, half wall, or other feature may form part of a boundary between rooms and thus be used to identify wall boundaries. Some embodiments may involve identifying at least one of a door or a window in the 2D floor plan, and identifying wall boundaries of the plurality of rooms may be based on the door or the window.

Some embodiments may involve ignoring at least one of a gridline, a dimension, or an irrelevant layer in the 2D floor plan. A floor plan may include a number of lines which do not correspond to room demarcations. Such lines may need to be ignored during wall boundary identification in order to accurately identify boundaries. For example, in architectural plans, a design plan may be based upon a grid. The grid intersection points may mark the centers of foundations, columns, or other architectural features of a building. An architectural grid is not always uniform and may be depicted by dashed or solid lines. In some plans, a grid may be accompanied by notations marking the numbers of the structural elements. As another example, a floor plan may include dimensions, which may be graphic notations marking distances between elements of the plan. Dimensions may indicate distances between objects or between abstractions such as gridlines. Dimensions may be drawn using a line with accented endpoints and a number signifying the dimension size. Dimensions may be in mm, meter, inches or any other accepted unit. A dimension may be ignored, for example, recognizing the accented endpoints or a number associated with the dimension line. As another example, one or more layers of a floor plan file may include information that is not relevant to the structure of the building. For example, a CAD plan may include irrelevant layers containing text, annotations, or furniture. Conversely, layers containing, for example, walls, doors and windows may be relevant layers that are not ignored.

Types of analysis used to identify room wall boundaries may include using geometric analysis, topological analysis, image processing, and artificial intelligence methods as described herein. In some embodiments, the process may include using a geometric analysis may be used to identify the wall boundaries. As used herein, a geometric analysis may include any form of analysis for extracting information from a floor plan based on geometries represented in the floor plan. A geometric analysis may include an inspection of a floor plan represented in a BIM, CAD, PDF or file format containing geometric entities such as lines, polylines, arcs circles or vectors. The geometric analysis may use coordinates (e.g., XYZ coordinates) of end points of entities to determine properties of the entities and their relationship each other. For example, information derived from a geometric analysis may include: line length, line direction, the location of geometric objects in the floor plan, or any other properties represented in the floor plan. The geometric analysis may include searching the floor plan for sets of parallel lines or vectors, perpendicular lines or vectors or lines in a certain angle, which may be indicative of walls or other boundaries of a room. The geometric analysis may include measuring distances between entities and find pairs of entities close to each other, identifying sets of entities that create patterns which repeat in different locations in the floor plan, finding relations of inclusion between a point and a closed geometry, or any other relationships between points, lines, or shapes represented in the floor plan that may indicate room boundaries.

Embodiments may also include performing a topological analysis on the floor plan. A topological analysis may include but is not limited to an analysis of the connectivity of spaces within a floor plan that can reveal information regarding the properties of these spaces. A topological analysis may define relationships between rooms and their position in the floor plan hierarchy using the doors that connect between them to create spatial maps. A spatial map may be described as weighted graphs and graph properties such as connectivity and shortest paths derived. The spatial map may be used to define rooms and accordingly, identify the corresponding wall boundaries.

According to disclosed embodiments, an image analysis may be performed on the floor plan. An image analysis may include but is not limited to an analysis of a pixel-based image such as a jpg or bmp which uses pixel color and location within the image to gather information regarding the geometry it represents. In this context, an image analysis may be used for analyzing a floor plan if no vector information exists, such as with hand drawn or scanned plans, for semantic enrichment. For example, image analysis may be used to demarcate contours of rooms, differentiate between rooms, or identify other features of rooms in a floor plan. In some embodiments, algorithms from the world of computer vision can used to reconstruct geometric features from pixel-based images. Other examples of imaging processing may include a Hough transform algorithm, Canny edge detection, and other suitable image processing techniques as described herein.

Consistent with the present disclosure, other various forms of machine learning analysis may also be employed to identify wall boundaries of rooms of floor plan. For example, a semantic analysis may be performed that identifies wall boundaries based on labels associated with the lines of a floor plan. Further, as disclosed herein, the various forms of analysis may also be used to identify other features of rooms apart from wall boundaries, including but not limited to architectural features or equipment located within the room.

Some embodiments may further include identifying rooms in the 2D floor plan and identifying wall boundaries based on the identified rooms. For example, rooms may be identified through data related to the rooms in the floor plan, such as labels or other semantic designations. In some embodiments, a flooding algorithm may be used to identify rooms based on their wall boundaries. In some embodiments, a machine learning model may be trained to identify rooms based on their wall boundaries. In some embodiments, rooms may also be identified through architectural features apart from wall boundaries, such as columns, railings, or beams. Rooms may also be identified based on locations of furniture on the floor plan. Once an area of a floor plan is identified as a room, the machine learning model may identify the wall boundaries associated with the room. For example, an area of a floor plan may be identified as a room based on its label of "Office" and the presence of furniture in the area, including a desk and two chairs. Accordingly, the machine learning model may identify the lines around the space of the floor plan that includes the "Office" label and furniture symbols as the wall boundaries of the room.

In some embodiments, rooms and their contours may be identified based on the identified wall boundaries using a flooding algorithm. For example, room boundary reconstruction from a black and white image pixelated image in which wall locations are represented in black may be accomplished via a 4-way flood fill algorithm. Flood fill may refer to an algorithm that may determine the area connected to a given node in a 2D array. As an example, a flood fill algorithm may be implemented by the "bucket" fill tool of paint programs to fill connected, similarly-colored areas with a different color. The algorithm may look for all nodes in the array that are connected to the start node by a path of a target color and changes them to the replacement color. In this case, the algorithm may start in a random white (empty) point and, for example, flood fills using a third color (orange for example). The resulting orange pixels, for example, which changed colors in this flooding sequence, may represent a single room and are stored in a list. The orange pixels on this list which may have black neighbors may be considered the border of the room and may be joined together in a sequence. The sequence, for example, may then cleaned to keep only the corners and remove pixels on the lines between them. Then, another white pixel may be chosen and the process may start again, until all pixels are either orange or black. The room with the bounding box of the original image may be discarded as it represents the frame of the picture and not a bounded room. An example of the results of flood fill is illustrated in FIG. 24G, described in greater detail below.

Disclosed embodiments may further include calculating an area of the 2D floor plan. Calculating an area of the 2D floor plan may include estimating a two-dimensional areal extent or size of a room, corridor, area of interest, area of disinterest, or other space within the floor plan. An area calculation may be approximate, rather than exact. A calculation may include summing pixels contained within boundaries of the area, using an equation (e.g., length times width for rectangular or square spaces, one half base time height for triangular areas). A calculation may include summing estimates of sub-areas of an area (e.g., a sum of a rectangular sub-area plus a semi-circular sub-area). Calculating an area may be based on boundaries of a room. Calculating an area may include subtracting enclosed spaces (e.g., subtracting the area of a stairway for a room enclosing the stairway). More generally, calculating an area of a 2D floor plan may include using any suitable method of geometric or image analysis to estimate the area.

Some embodiments may further include identifying a wall material. For example, a floor plan may include data related to the materials of various walls of the building. Wall material data may be included in metadata associated with the floor plan. In some embodiments, the wall materials for various walls may be stored in a data structure associated with the floor plan such as a layer name or block attribute in a CAD file. Accordingly, identifying the wall material of a wall may include retrieving the wall material from a corresponding data entry. In some embodiments, wall material may be identified based on the graphical representation and geometric data of the wall on a 2D floorplan. For example, different wall thicknesses, fill patterns, hatches, colors, line styles (e.g. dashed or continuous), number of lines (e.g. a plurality of parallel may represent a window) and other attributes may represent be used to represent different wall materials. A machine learning model such as ResNet-50, for example, may be trained to classify wall materials from images of floorplans. A wall material may be, for example, brick, gypsum, concrete, wood, tile, plaster, metal, or others. The wall material data may be used, for example, to generate a bill of materials or enhance the visual representation of the building information model discussed in greater detail below.

Disclosed embodiments may also include storing the identified wall boundaries in a retention data structure. It may be useful to retain the data associated with the identified wall boundaries for later use, for example, in generating a building information model, as described in greater detail below. As used herein, a retention data structure is any data structure or other type of data storage used to store data associated with identified wall boundaries as well as other architectural features such as doors, windows, furniture, equipment and room geometric data. As described herein, a data structure may refer to any type of data stored in an organized, searchable manner and include a variety of data storage formats. Storing the wall boundaries may include saving, sending, uploading, or otherwise communicating the data associated with the identified wall boundaries to a storage device. For example, storing may include saving the wall boundary data to a local storage device or uploading the data to a cloud storage service.

Some embodiments may additionally include identifying architectural features of a 2D floor plan and storing the identified architectural features in a retention data structure. The architectural features may include, for example, furniture. Disclosed embodiments may also include identifying equipment in the 2D floor plan located within the identified wall boundaries and storing the identified equipment in the retention data structure. Architectural features or equipment may be stored in association with corresponding identified wall boundaries or identified rooms in the retention data structure.

Consistent with disclosed embodiments, the method may include generating a building information model, wherein the building information model includes the identified wall boundaries. As used herein, a building information model may include any model depicting a building that may include semantic information and metadata information related to the building and architectural features, elements, systems and equipment which it may contain. A building information model may include a 3D representation of a floorplan or a building. Further, Building Information Modeling (BIM) models may combine geometric, 3D models of building elements with semantic and functional information regarding those elements. BIM may be used to generate and manage digital representation, equivalents or "twins" of real world objects, places and buildings. In BIM, objects may describe actual architectural elements such as walls or doors and can hold a large amount of information regarding them. For example, a wall element may contain a wall geometry, a physical makeup of a wall (bricks, concrete or gypsum), a finishing type of a wall, a fire resistance rating of a wall, locations of openings in a wall and parametric relationships between the wall and other architectural features. Additionally, abstractions such as floors and rooms can be supported by BIM software, which may automatically identify enclosed spaces and provide the user with a simple way to store information regarding the spaces.

In some embodiments, a building information model may be generated using a variety of BIM authoring tools, including Revit, Microstation, Catia, Digital Project, Navis Works, and other software. A BIM authoring tool enables the user to both display and edit any all of the information contained in a BIM file. BIM files may be provided in a variety formats. For example, the BIM model may be in an Industry Foundation Classes format (IFC). The Industry Foundation Classes (IFC) data model format may describe architectural, building and construction industry data. IFC may refer to a platform neutral, open file format specification that is not controlled by a single vendor or group of vendors. IFC may include an object-based file format with a data model developed to facilitate interoperability in the architecture, engineering and construction (AEC) industry. In some cases, IFC may be used as a collaboration format in Building information modeling (BIM) based projects. IFC may be used to translate between different BIM platforms, or to read BIM files outside of the BIM authoring software. Other formats for BIM models may also be used, including Revit RVT, Microstation DGN, and other file formats suitable for BIM files.

BIM models may include BIM objects. A BIM object may include a combination of detailed information that defines the product and geometry that represents the product's physical characteristics in 3D and 2D. A BIM object may include visualization data that gives an object a particular appearance (e.g., a color, texture, shape, or other aspect of an appearance). Building Information Modeling (BIM) objects may include a combination of detailed information, attributes, parameters, technical characteristics, geometry and metadata that defines an object (e.g., piece of equipment) and represents the object's physical characteristics in two and/or three dimensions. A BIM object may be described as a "digital twin" or digital equivalent of real world objects, architectural features and equipment. For example, a BIM object may contain a description, dimension, BIM family classification, model number, a 2D floorplan symbol and a 3D image. A BIM object may include technical characteristics such as visualization data that gives the object a recognizable appearance and behavioral data, such as detection zones, which enable the object's position to be determined or to behave in exactly the same way as the product itself, for example in a simulation. A BIM object may represent windows, doors, boilers, or any other equipment, as disclosed herein. An BIM object may indicate a specific model of equipment, a generic piece of equipment, a family of equipment, or any level of specificity in between. An object may represent windows, doors, boilers etc. An object may be a specific model of equipment. An object might be generic and provide information relating a family of equipment (a door type).

Referring to the example of FIG. 24A, identified boundaries of the floor plan may then be used to generate a 3D building information model 2415. As described, the building information model may be a 3D visualization of the rooms of the floor plan. The building information may be created by giving the walls of the model a certain height, and by "extruding" the walls by the length of the height measurement. As shown by building information model 2415, a building information model may allow a user to visualize each room 2417 within a floor plan. Although not depicted in building information model 2415, building information models may include architectural features, equipment, semantic designations, and other additional information as disclosed herein.

Generating a BIM model may include using wall boundaries identified from the floor plan. For example, a 3D BIM model may be generated by associating wall boundaries with a height and constructing a 3D model of the wall boundaries using the height. The height may be indicated with respect to the scale of the floor plan. For illustration purposes, wall boundaries from the floor plan may be presented in two dimensions (e.g., x and y axes). A 3D BIM model may be created from the two dimensional wall boundaries by "extruding" the wall boundaries into a third dimension (e.g., z axis) to form a three-dimensional model. A depiction of an exemplary 3D model is shown in FIG. 24A, described in greater detail below.

A height may be relative to the scale of the floor plan or the scale of the floor plan file. For example, some CAD programs are vector based software, and may not use real world units but rather an abstraction called drawing units. Drawing units may differ from real world units in scale. For example, a line in a CAD file which is 10 drawing units long might represent 10 mm, 10 meters, or ten inches in the real world. This may be further complicated when a CAD file is printed, and the paper units (a mm on paper) needs to be correlated to both the drawing units and the real world units. The scale of the CAD file refers to the real world units a drawing unit represents (e.g., one file may be in meters, another may be in inches). The scale of an image describes the relation between sizes on the paper and real world sizes (one mm on paper is 10 mm in the real world 1:10). Scaling a CAD file, image, or other 2D floor plan may include to changing this relation. Accordingly, the method may include accessing a rule defining a scale of the 2D floor plan. A BIM model may be generated using the scale of the 2D floor plan. In other embodiments, generating a BIM model may include scaling the 2D floor plan and generating the BIM model using a different scale than the scale of the accessed rule.

Embodiments may include accessing a rule defining a respective height for the identified wall boundaries and updating the retention data structure based associating the identified wall boundaries with their respective wall heights and presenting the building information model in a 3D format. A rule defining a respective height for wall boundaries may indicate that walls of a building must be of a same height, for example. Alternatively or additionally, a rule defining a respective height may indicate that walls of different materials should be of different heights. For example, a rule may indicate that walls made of concrete block should be eight feet tall, while walls of plaster should be seven feet tall, and curtain walls should be nine feet tall. Embodiments may include updating the retention data structure to store the wall heights with associated wall boundaries. Wall heights may be used to generate or visualize a 3D BIM model. Presenting a 3D model may include displaying the model on the display of a computer so that a viewer can view the model and understand the makeup of the space. This may be achieved using, for example, pixels, vectors, lines and colored areas. In some embodiments, presenting a 3D model based on the 2D floor plan, may include extruding the lines of the identified walls in the Z direction according to a height rule. The extrusion may be colored for ease of visualization and displayed according to the angle the 3D model is viewed from.

Disclosed embodiments may include identifying rooms of a 2D floor plan or a building information model based on identified wall boundaries. For example, wall boundaries that enclose a space and have no other wall boundaries within the space may be identified as a room. Identifying rooms may be useful for associating other features of a building information model with a certain area of the model, running a generative analysis process or a semantic enrichment process. For example, as described below, architectural features, equipment, and semantic designations may be associated with a room of the building information model.

Building information models may also include information relating to architectural features of a floor plan. For example, disclosed embodiments may include associating an identified architectural feature with an object of the building information model. In this context, the association may be stored in a data structure, an index, a graphical representation of a floor plan, a database, or in any other suitable modality for storing associations between data. The association of the identified architectural feature with the object of the building information model may be based on a rule.

For example, an architectural feature such as a door may be identified, and a rule may indicate that all doors should be associated with the wall in which they are located. Accordingly, the identified door may be associated with the object of the building information model that defines the wall in which the door is placed. In some embodiments, associating the architectural feature with an object in the model may include generating the model such that feature is depicted in the model. For example, the associating the door with the wall's object in the prior example may include placing the door in the wall on the generated model.

Building information models may also include information relating to equipment within a floor plan. For example, embodiments may include associating identified equipment architectural feature with an object of the building information model. In this context, the association may be stored in any other suitable modality for storing associations between data, as disclosed herein. An association of the identified equipment with the object of the building information model may be based on a rule. For example, a rule may define that all doors shall be associated with a specific BIM object. A rule may indicate, for example, that all appliances should be associated with the room in which they are located. In some embodiments, associating equipment with a BIM object may include association with an existing BIM object which may be accessed in a data structure, database or BIM authoring tool. In some embodiments, a rule associating an identified piece of equipment with a BIM object may involve the creation of a new BIM object based on technical characteristics or other attributes contained in the rule. For example, a exemplary rule may define that all sensors on a plan shall be associated with a BIM object in the Sensor Family with Model # TCBH, and technical characteristics of 6 megapixels and power consumption of 3 watts, and dimensions of 6×10×20 cm.

In some embodiments, a user may be able to define portions of a floor plan for which to generate a building information model. For example, an interface may be provided that enables selection of an area of the 2D floor plan. Generation of the building information model may then be based on the selection. An interface may provide the user a depiction of the floor plan, based on the identified wall boundaries. The user may then be able to select which wall boundaries will be used to generate the building information model. For example, a floor plan may include eight rooms, but the user may only wish to see three of the rooms in three dimensions. Accordingly, the user may select the wall boundaries corresponding to the three rooms and a building information model may be generated that includes the three selected rooms, but not the five rooms that were not selected. In some embodiments, a user may use a crop tool to define the selected area of the 2D floorplan.

Disclosed embodiments may include enabling aggregation of a 2D floor plan with one or more additional 2D floor plans into the building information model. For example, two different 2D floor plans may depict two adjacent floors of a building. A building information model generated from the aggregation of the two separate floor plans may be may depict both floors of the building in relation to each other. In other words, the building information model may show the second floor of the building on top of the first. Each floor of the building may correspond to a different level of the building information model. In some embodiments, the system may enable a user to select a level to visualize from a plurality of levels contained within the building information model. For example, a building information model may include two adjacent floors of a building. Upon user selection of the first floor of the building information model, the second floor may disappear to permit easier viewing of the first floor.

Disclosed embodiments may include receiving functional requirements associated with the plurality rooms and generatively analyzing the plurality of rooms in conjunction with the functional requirement to identify at least one technical specification and at least one equipment placement location in order to at least partially conform to the functional requirement. For example, based on a functional requirement related to light switches, a technical specification for light switches and location for light switches within rooms of the floor plan may be identified. Then, the building information model may be generated including the light switches, which may be placed within the model according to the identified locations.

Some embodiments may include performing a semantic enrichment process and adding a semantic designation to at least one room of the plurality of rooms. For example, several rooms within a floor plan may be identified. Semantic enrichment may be performed on the rooms to generate a plurality of semantic designations for the different rooms, such as "bedroom," "office," "kitchen" and "closet," The building information model may then be generated such that the rooms of the model are associated with the semantic designations. For example, the model may include the semantic designations as labels within the corresponding identified rooms.

Once a 3D BIM model is generated, disclosed embodiments may include outputting the building information model. Outputting may include saving, exporting, sending, or uploading the model to another location. In some embodiments, outputting may include displaying the model on a screen. As an example, a BIM model file may be saved to a local storage device or exported into a certain file format to be sent to another computer. As described herein, BIM models may be in a variety of formats. For example, the building information model may be saved or exported in an industry foundation classes (IFC) format.

Disclosed embodiments may further include displaying, at an interface, a comparison of at least a portion of a 2D floor plan and the building information model. A comparison of a 2D floor plan and a building information model may include displaying both the 2D floor plan and the model. A 2D floor plan and the building information model may be positioned such that a 3D model objects "spring" from 2D objects which represented them. For example, the edges of the 3D walls could be exactly aligned with 2D lines representing them. In a 2D view, 3D and 2D representations completely overlap and might be differentiated by color. In a perspective or isometric view, the 3D walls may appear to start in 2D lines and grow from them towards the positive "z direction." An example of such a comparison is depicted in FIG. 20, which is described in greater detail below.

Referring to FIG. 24A, exemplary comparison 2419 may include a building information model overlaid on top of the floor plan such that the floor plan can be viewed through a model. A building information model may be placed on the floor plan such that wall 2421 of the building information model is directly atop wall boundary 2423 of the floor plan. Comparison 2419 may include furniture 2425, as displayed on a floor plan.

In some embodiments, a comparison of at least a portion of a 2D floor plan and the building information model may include a graphical indication of the identified wall boundaries. Walls may be graphically indicated in many ways, for example, by sets of two parallel lines, by sets of parallel lines with a solid color fill, by parallel lines with a hatched pattern, by a series of details describing their physical makeup, or others. In some cases, walls may not be parallel lines, and then may be represented, by for example, a solid or hatch fill. In some cases, 2D floorplan walls that are absent in the building information may be highlighted by means of a different color, shading, pattern, a symbol, textual identifier, or other means of drawing attention to the discrepancy.

Disclosed embodiments may further include displaying a graphical representation of the building information model at the interface and enabling pan, tilt, and zooming of the graphical representation of the building information model. Pan tilt and zoom (or pan orbit and zoom) may to standard 3D view manipulations in 3D viewing and editing software. These manipulations may refer to the view as if it originates from a real camera in space. Pan may refer to moving the camera in a plane parallel to the view, zoom may refer to moving the camera farther and closer from the target, tilt may refer to rotating the camera around itself, and orbit may refer to rotating the camera around the object. A user may be able to use these manipulations to change the view of the building information model presented on a screen in order to view different parts of the model, different angles of the model, zoom in on certain parts of the model, and so on.

Disclosed embodiments may additionally include receiving, from an interface, input based on a comparison. As described herein, the system may present an interface to the user that permits the user to interact with the generated building information model. The user may use that interface to provide various inputs to change, for example, the model or the views of the model displayed. The input may be communicated to the software from the interface using, for example, text, a mouse pointer, or a touch sensitive interface. In some embodiments, the input received from the interface may include at least one of an instruction to delete a wall or an instruction to add a wall. The user may delete or add walls to change the size or orientation of rooms. As another example, the input received from the interface may include an instruction to modify of at least one of wall length or thickness. As another example, the input received may be to vary the height of a wall, window or door. As another example, the input received may be to associate an identified architectural feature or piece of equipment with a building information model object. As yet another example, the input received from the interface may include an instruction to execute a floor plan remediation technique. Remediation techniques may permit the user to, for example, edit a floor plan to fix errors in the floor plan causing issues with the building information model. Various remediation techniques are described herein.

Embodiments consistent with the present disclosure may include architectural model and floorplan remediations, which may include automatic or semi-automatic processing on an architectural model or floorplan to prepare for a generative analysis, semantic enrichment process, energy simulation analysis, or other computational analysis. Defined spaces may be missing from a source architectural model or may too large, too small, or in an unsuitable grouping for simulation purposes and automatic identification of spaces may be used to identify single architectural spaces, closed or unclosed, for the purpose of dividing plans into logical units. Spaces may be identified by finding enclosed areas surrounded by boundary walls, windows or door sills, as described herein. In some examples, spaces may be demarcated using artificial intelligence, image recognition, or Boolean operations on the enclosing elements.

Generally, spatial divisions may be further refined by analyzing geometrical features such as, for example, corridor openings and door frames to infer additional dividing elements even when these features are not present in the architectural drawing or model. A space that includes an elevator lobby and a connecting corridor may be defined as a single space in a source floorplan when there is no physical separation between, for example. However, for the purpose of a simulation to select equipment, a lobby and a corridor may be split into separate spaces. As another example, a door which would normally separate one space from another in floorplan may be missing due to an architectural modeling error or because there is a door frame but no door in an architectural design.

More generally, a geometric algorithm may be used to refine spatial divisions by, for example, connecting pairs of points in a floor plan to close gaps between two spaces. Such points may be part of a concave or convex bump, for example. Pairs may be selected which are the closest bump points from a same polygon on a floor plan or a different polygon. Pairs which pass criteria may be selected to close gaps. Criteria may specify width, length, skew angle, exit angle, orientation, or other geometric features of pairs of points in relation to other features of a floor plan. Further, a geometric algorithm may be used to automatically separate and demarcate two or more spaces when such separations are not present in the original architectural floorplan.

Embodiments may include using a geometric algorithm or artificial intelligence to automatically identify and remove gridlines, equipment, furniture, or other elements on a floorplan to improve generative analysis outcomes (e.g., to improve simulation performance). Additionally or alternatively, an algorithm may be configured to remove duplicate spaces to improve generative analysis outcomes. As an example, an algorithm may filter spaces inside a BIM file based on area of the spaces (e.g., removing spaces with areas smaller than a threshold). Spaces may be removed for areas that contain a self-intersection or less than 2 boundary points. Further, an algorithm may check for intersections or overlapping of spaces, including containment of one space by another. As an example, containment checks may consider the height of the space. An overlapping space may be removed from a BIM file according to a rule (e.g., the largest space that overlaps another space may be removed, or spaces may be removed to generate a set of unique spaces that covers all areas of a floorplan).

Disclosed embodiments may include updating a retention data structure based on an input. For example, the input may include instructions to add, delete, move or extend individual walls within the model. The retention data structure may be updated to account for these changes in the wall boundaries of the model. As another example, the retention data structure may be updated when the input relates to adding, removing, modifying or splitting entire rooms. In some embodiments, updating the retention data structure may include updating the architectural features or equipment associated with rooms, based on the input. For example, an input may include directions to move a door or add a new door in a wall of the building information. The retention data structure may then be updated to associate the wall's boundary data with the new door location or the new door.

FIG. 24B is an illustration depicting an exemplary geometric analysis on a floor plan. Geometric analysis may begin by accessing a floor plan 2431. Then, the geometric analysis method may identify parallel lines on the floor plan as wall candidates 2433. For example, as shown in floor plan illustration 2433, identifying wall candidates may include highlighting the walls candidates on the floor plan by, for example, bolding or increasing the weight of the lines corresponding to the candidate walls. In some embodiments, candidate walls may be identified by determining parallel lines that are less than a threshold length on the floor plan. A geometric analysis may also include identifying 90-degree circular arcs, that touch lines of the same size, as door candidates 2435. For example, the 90-degree arc may represent the swing path of a door. As shown in floor plan illustration 2435, identifying door candidates may include placing a circle around or otherwise highlighting the candidate doors on the floor plan. A geometric analysis may also include identify lines on the floor plan as grid candidates. As shown, a floor plan 2431 may include long grid lines that do not represent a physical part of the building within in the floor plan. Geometric analysis may include identifying grid line candidates to permit differentiation between grid lines and walls of the floor plan. In some embodiments, candidate grid lines may be identified by determining single lines that are great than a threshold length on the floor plan. As shown in floor plan illustration 2437, identifying wall candidates may include highlighting the walls candidates on the floor plan by, for example bolding or increasing the weight of the lines corresponding to the candidate walls.

FIG. 24C is an illustration depicting an exemplary geometric analysis for detecting doors and sills. A sill may refer to an opening in a wall identifying the space that would be occupied by a closed door. The geometric analysis may begin by accessing a floor plan 2439. Geometric analysis for sill and door detection may include detecting doors on the floor plan 2441. Doors may be detected by, for example, a geometric analysis, as described herein. The geometric analysis of FIG. 24C may include detecting two sides of the 90-degree arc symbol that represents the door on the floor plan. In illustration 2443, the sides of the door arc are shown as double-sided arrows. The sides of the arc may be the legs of the 90-degree angle formed by the circular 90-degree arc of the door symbol. In other words, the sides of the arc and the arc together may form one quarter of a circle. The two detected sides of the arc may be identified as sill candidates. The geometric analysis may include checking the sill candidates for intersection with walls. For example, one sill candidate may be parallel to the wall in which the door is located, and the other sill candidate may perpendicularly intersect the wall. The geometric analysis may include choosing the sill candidate that successfully continues the wall. In other words, a sill candidate that is parallel to the wall may be chosen as the sill for the corresponding door because it completes the wall segment rather than intersects the wall segment. In some embodiments, the geometric analysis may include identifying multiple sills throughout the accessed floor plan. As shown in illustration 2449, the identifying sills may include highlighted the sills on the floor plan using, for example, a line demarcating the sill within the wall.

Figure 24D:
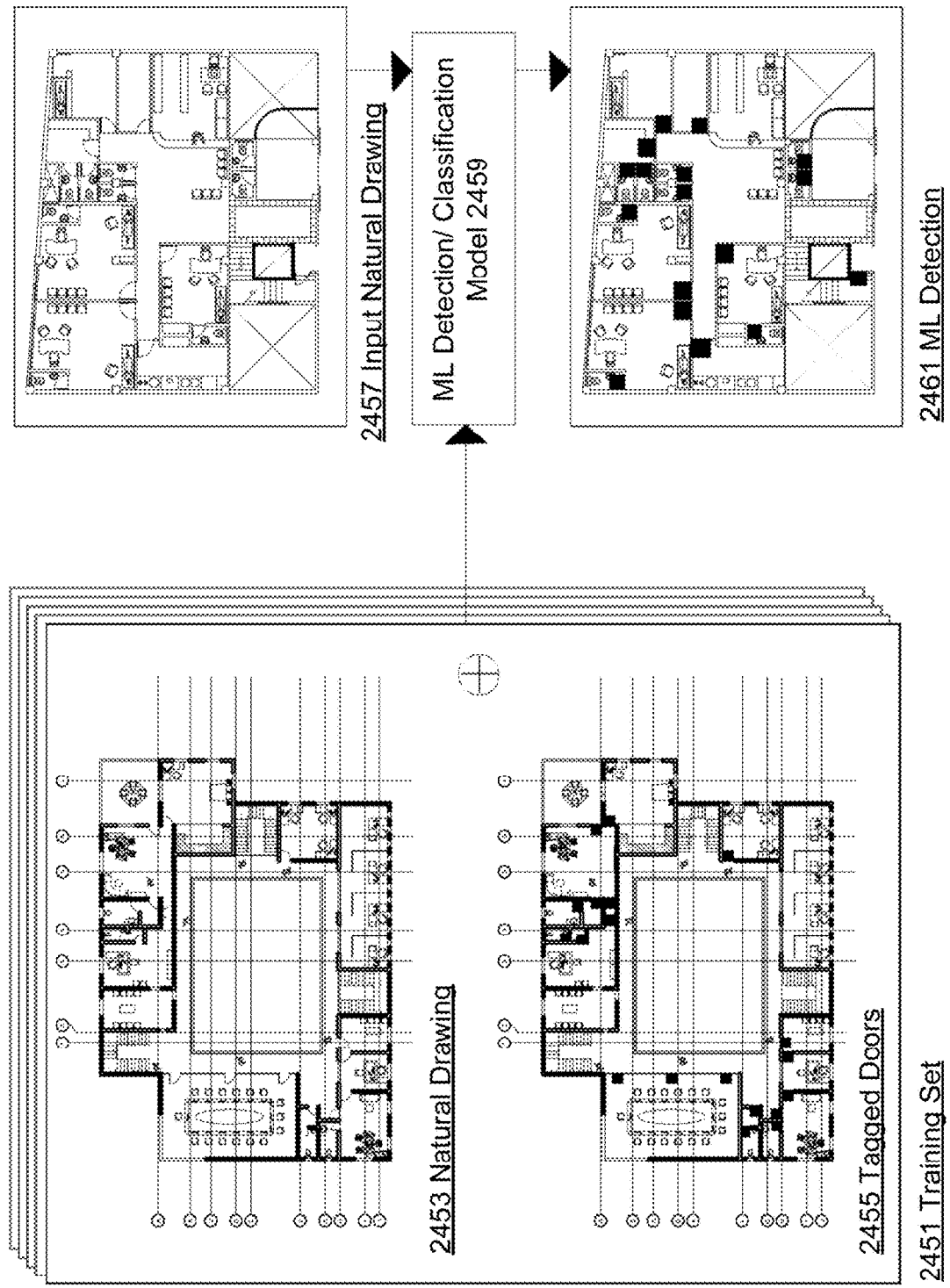
FIG. 24D is an illustration depicting an exemplary machine learning door analysis, consistent with disclosed embodiments.

FIG. 24D is an illustration depicting an exemplary machine learning door analysis. Machine learning door analysis may be used to identify doors within a floor plan, as described herein. Machine learning door analysis may include training a machine learning detection or classification model 2459 to detect doors of a floor plan using a training data set 2451. Training set 2451 may include two sets of floor plans. The first set of floor plans may be natural drawings 2453. Natural drawings 2453 may be original floor plans without any specific demarcation of doors, outside of the door symbols therein. As a nonlimiting example, natural drawings 2477 may be scans of previously created floor plans or flat PDFs of floor plans. The second set of floor plans in training set 2451 may include floor plans with tagged doors 2455. Tagged doors 2455 may be, for example, identified manually or using a different analysis algorithm. The training data set 2451 may be used to train a machine learning detection or classification model 2459. Once machine learning detection or classification model 2459 is trained, it may receive an input natural drawing 2457. The input natural drawing 2457 may be a drawing for which a user wishes to have doors detected. After receiving the input natural drawing 2457, machine learning detection or classification model 2459 may detect and demarcate doors of the floor plan by one or more of the various methods described herein. In some embodiments, as shown in floor plan illustration 2461, machine learning door analysis may include highlighting the detected doors by, for example, placing a black square over the doors or otherwise demarcating the doors on the floor plan.

Figure 24E:
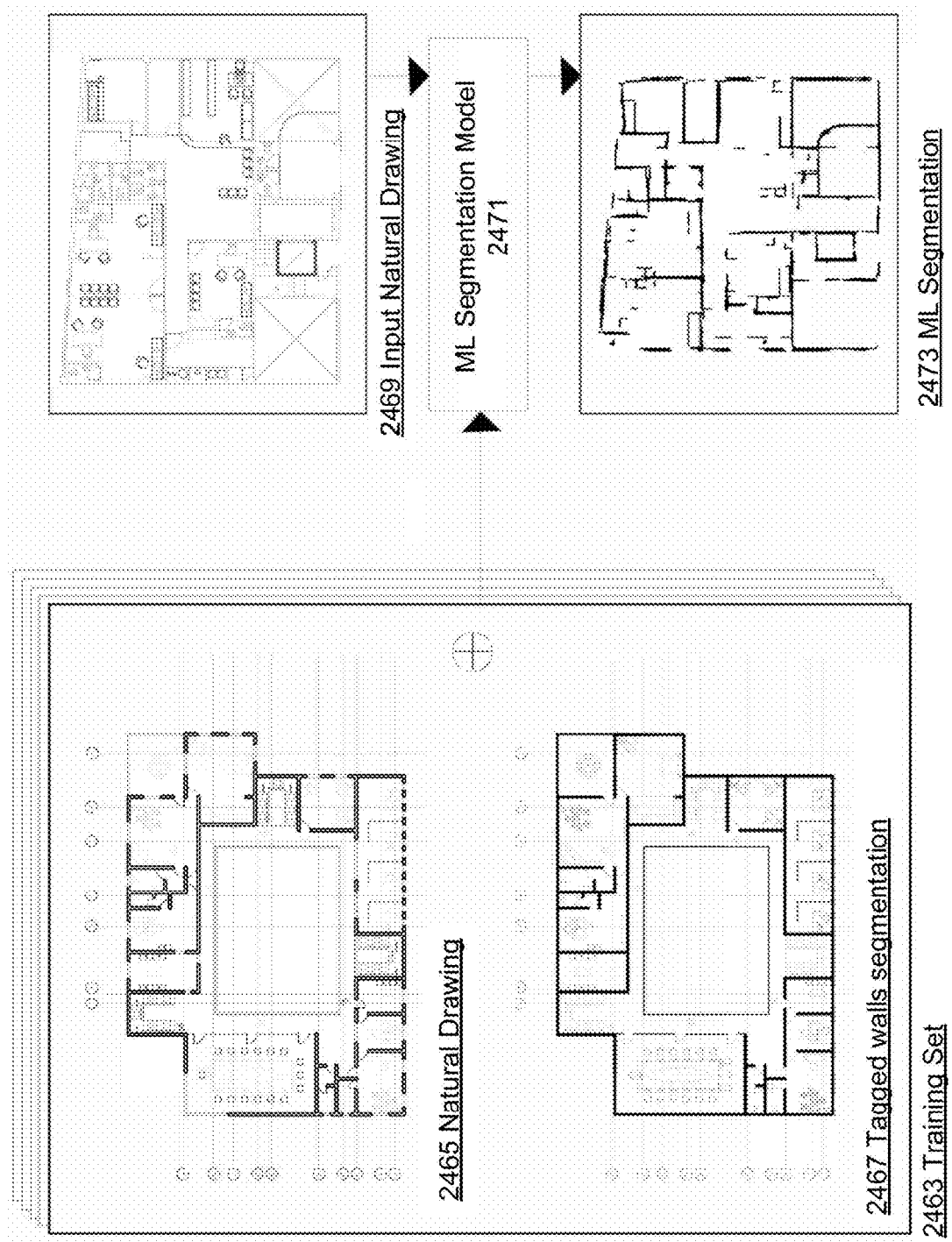
FIG. 24E is an illustration depicting an exemplary machine learning walls analysis, consistent with disclosed embodiments

FIG. 24E is an illustration depicting an exemplary machine learning walls analysis. Machine learning walls analysis may be used to identify walls within a floor plan, as described herein. Machine learning walls analysis may include training a machine learning segmentation model 2471 to detect walls of a floor plan using a training data set 2463. Training set 2463 may include two sets of floor plans. The first set of floor plans may be natural drawings 2465. Natural drawings 2465 may be original floor plans without any specific demarcation of walls. The second set of floor plans in training set 2463 may include floor plans with tagged wall segmentations 2467. Tagged walls 2467 may be, for example, identified manually or using a different analysis algorithm. The training data set 2463 may be used to train a machine learning segmentation model 2471. Once machine learning segmentation model 2471 is trained, it may receive an input natural drawing 2469. The input natural drawing 2469 may be a drawing for which a user wishes to have walls detected. After receiving the input natural drawing 2469, machine learning segmentation model 2471 may detect and demarcate wall segments of the floor plan by one or more of the various methods described herein. In some embodiments, as shown in floor plan illustration 2473, machine learning wall analysis may include highlighting the detected wall segments by, for example, providing a reproduction of the floor plan including only the detected wall segments.

Figure 24F:
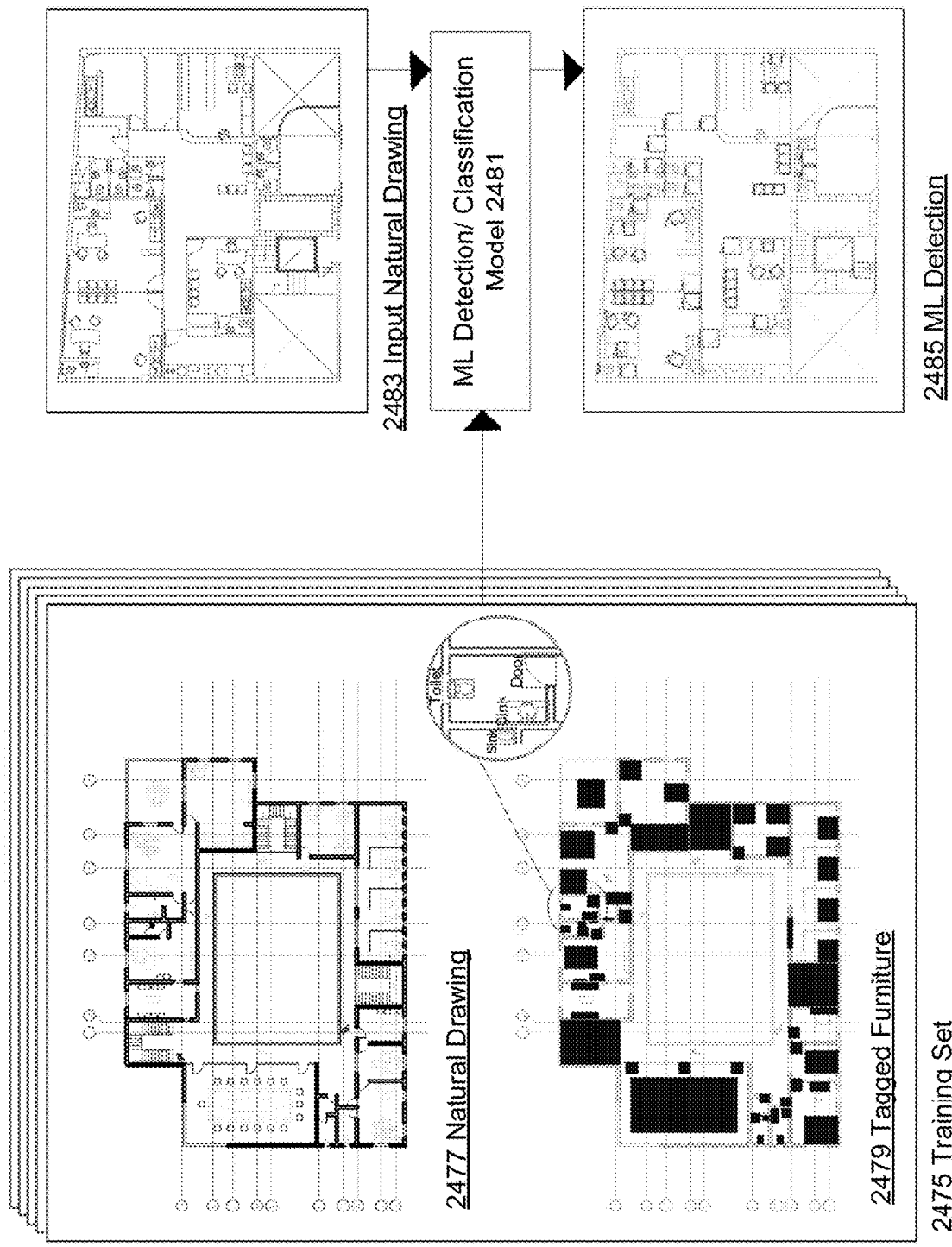
FIG. 24F is an illustration depicting an exemplary machine learning furniture analysis, consistent with disclosed embodiments.
Figure 24G:
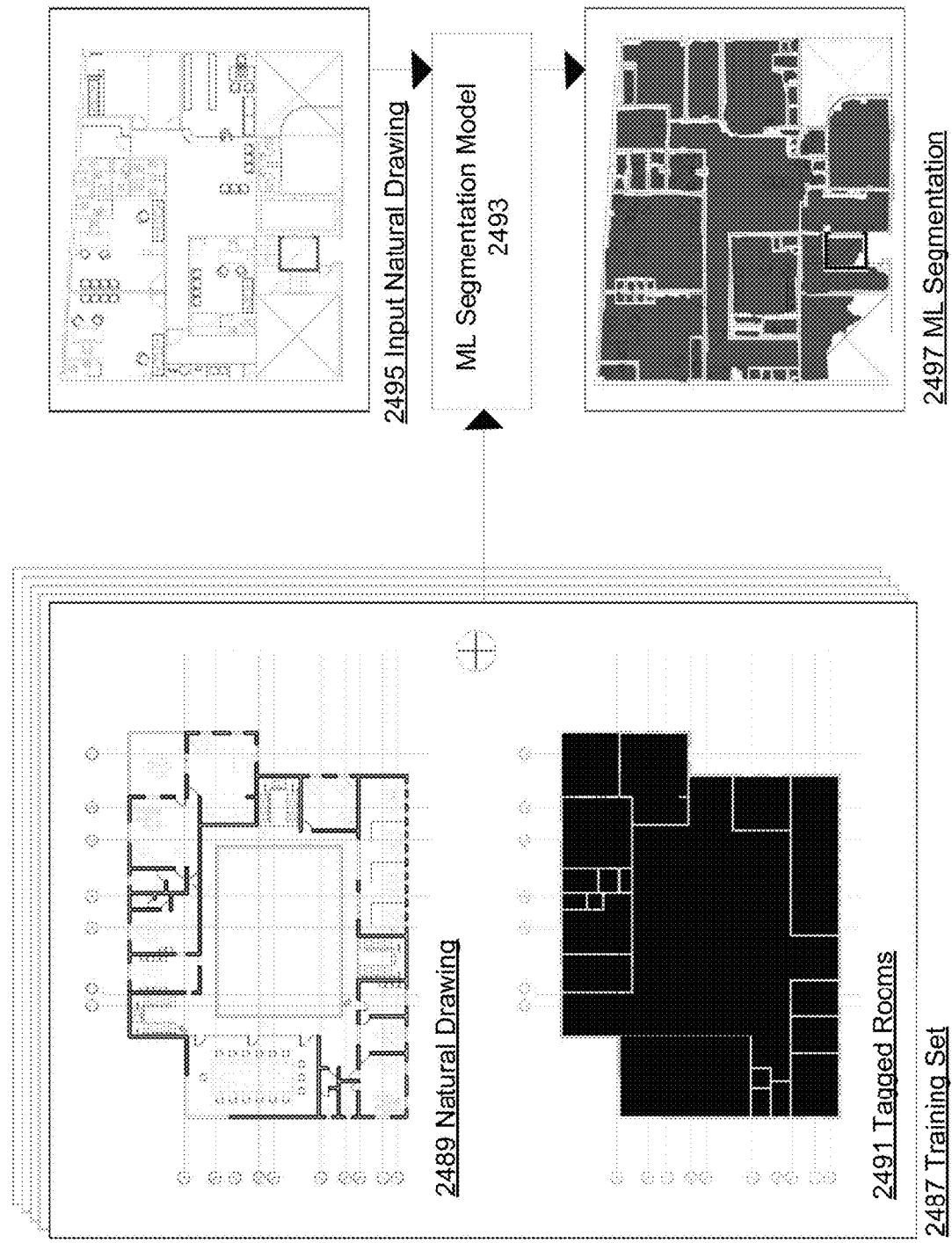
FIG. 24G is an illustration depicting an exemplary machine learning room analysis, consistent with disclosed embodiments.

FIG. 24F is an illustration depicting an exemplary machine learning furniture analysis. Machine learning furniture analysis may be used to identify furniture within a floor plan, as described herein. Machine learning furniture analysis may include training a machine learning detection or classification model 2481 to detect furniture of a floor plan using a training data set 2475. Training set 2475 may include two sets of floor plans. The first set of floor plans may be natural drawings 2477. Natural drawings 2477 may be original floor plans without any specific demarcation of furniture, outside of the furniture symbols therein. As a nonlimiting example, natural drawings 2477 may be scans of previously created floor plans or flat PDFs of floor plans. The second set of floor plans in training set 2475 may include floor plans with tagged doors 2479. Tagged doors 2479 may be, for example, identified manually or using a different analysis algorithm. The training data set 2475 may be used to train a machine learning detection or classification model 2481. Once machine learning detection or classification model 2481 is trained, it may receive an input natural drawing 2483. The input natural drawing 2457 may be a drawing for which a user wishes to have furniture detected. After receiving the input natural drawing 2483, machine learning detection or classification model 2481 may detect and demarcate furniture of the floor plan by one or more of the various methods described herein. In some embodiments, as shown in floor plan illustration 2485, machine learning door analysis may include highlighting the detected furniture, for example, placing a square around furniture item and including a semantic designation for the furniture near the square.

FIG. 24G is an illustration depicting an exemplary machine learning room analysis. Machine learning room analysis may be used to identify rooms within a floor plan, and may include training a machine learning segmentation model 2493 to detect rooms of a floor plan using a training data set 2487. Training set 2487 may include two sets of floor plans. The first set of floor plans may be natural drawings 2489. Natural drawings 2489 may be original floor plans without any specific demarcation of rooms. In some embodiments, natural drawings 2489, as illustrated in FIG. 24E, may include wall demarcations. The second set of floor plans in training set 2487 may include floor plans with tagged rooms 2491. Tagged rooms 2491 may be, for example, identified manually or using a different analysis algorithm. The training data set 2487 may be used to train a machine learning segmentation model 2493. Once machine learning segmentation model 2493 is trained, it may receive an input natural drawing 2495. The input natural drawing 2495 may be a drawing for which a user wishes to have rooms detected. After receiving the input natural drawing 2495, machine learning segmentation model 2493 may detect and demarcate rooms of the floor plan by one or more of the various methods described herein. In some embodiments, as shown in floor plan illustration 2497, machine learning room analysis may include highlighting the detected rooms by, for example, shading the area of the floor plan corresponding to the detected room. The shading of rooms in floor plan illustration 2497 may be done using a flood fill algorithm, as described above.

FIG. 25A is an illustration depicting an exemplary process for adding identified features and equipment associated with BIM objects to a building information model, consistent with disclosed embodiments. Associating features with BIM objects may include accessing a floor plan 2501. The features of the floor plan may then be identified by using machine learning methods, as disclosed herein. For example, a machine learning algorithm may be used to identify furniture within the floor plan. As depicted in illustration 2503, identifying features may include demarcating or highlighting the features on the floor plan by, for example, placing a box around them, with a semantic designation. At 2505, the identified features on the floorplan may be associated with BIM objects. In some embodiments, this may be based on a rule, as described above. The associations may also be stored in a data structure that identifies the feature and the room in which it is located. As an example, as shown in illustration 2505, a table may be formed that includes a reference to each room of the floor plan, and includes a reference to each type of furniture within the floor plan, as well as a quantity of each of type of furniture.

FIG. 25B is an illustration depicting an exemplary process for adding identified features and equipment associated with BIM objects to a building information model, consistent with disclosed embodiments. Adding the features to the building information model may include accessing a floor plan 2507. The features of the floor plan may then be identified by using machine learning methods, as disclosed herein. For example, a machine learning algorithm may be used to identify furniture within the floor plan. As depicted in illustration 2509, identifying features may include demarcating or highlighting the features on the floor plan by, for example, placing a box around them, with a semantic designation. At 2511, the identified features may be associated with BIM objects by a user, as described above. At 2513, a user may apply a rule to identified features to, for example, change the type of BIM objects associated with a certain type or class of feature, or associate features that were not previously associated with BIM objects by the user. The BIM objects may then be updated, based on the user changes, and may stored in a data structure. Updating the BIM objects and storing them may also include updating the building information model to include the updated BIM objects, as depicted by illustration 2515.

FIG. 25C is an illustration depicting exemplary user input for updating a retention data structure, consistent with disclosed embodiments. As described above, a building information model may be presented to a user in an interface. The user may use the interface to edit the building information model. The retention data structure may then be updated accordingly. For example, as depicted by illustration 2517, a user may add a room to a building information model by selecting the room or a contour of the room on the floor plan. The building information model may then be updated to include a 3D representation of the room. The retention data structure may also be updated to include data corresponding to this room. As shown in illustration 2519, user may also select an existing room in the building information model to delete the room and remove it from the model. In the event a user deletes a room, the retention data structure may also be updated to account for this removed room. Similarly, as described above, a user may move an existing wall in a building information model. For example, as shown by illustration 2521, a user may select a wall of the building information model and, for example, drag the wall out to increase its length. The data retention structure may then be updated to account for this increase in the length of the wall. As also shown in illustration 2521, the retention data structure may be updated such that other walls related to the moved wall are also updated so as to increase the size of the room defined by the moved wall.

Figure 25D:
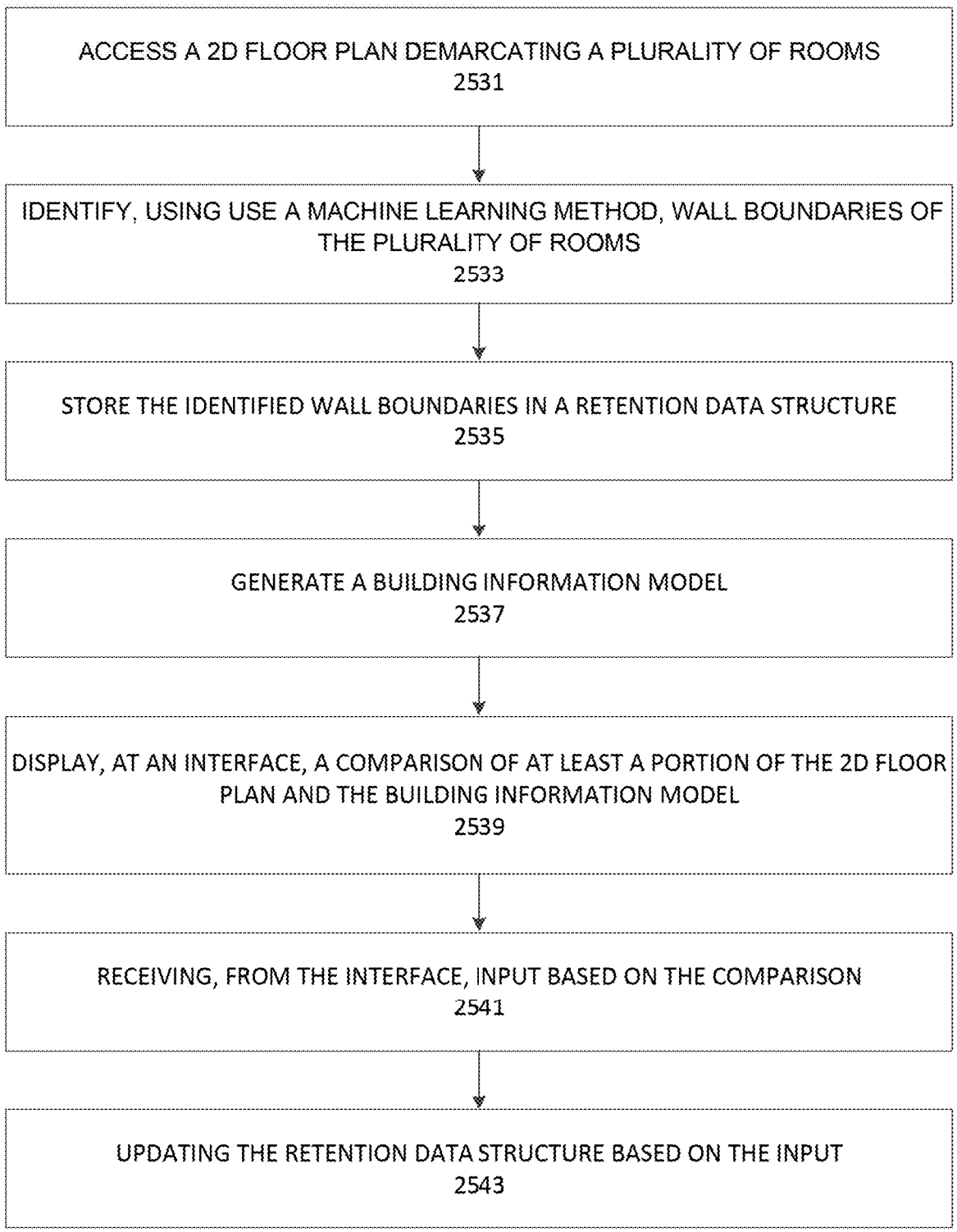
FIG. 25D is a flowchart illustrating an exemplary process for extracting data from a 2D floor plan and retaining it in a building information model, consistent with disclosed embodiments.

FIG. 25D is a flowchart illustrating an exemplary process 2530 for extracting data from a 2D floor plan and retaining it in a building information model, consistent with disclosed embodiments. Process 2530 may be performed by a processing device, such as any of the processors described throughout the present disclosure. It is to be understood that throughout the present disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 2530. Process 2530 is not necessarily limited to the steps shown in FIG. 21 and any steps or processes of the various embodiments described throughout the present disclosure may also be included in process 2530.

At step 2531, process 2530 may include accessing a floor plan demarcating a plurality of rooms. As described herein, floor plans may be accessed in a variety of formats and may include other information associated with the spaces within the floor plan. A floor plan may be accessed in a variety of ways including from a network location, a cloud storage, local storage, or other types of access as described herein. In some embodiments, floor plans may include or reference furniture or other architectural features.

At step 2533, process 2530 may include performing identifying, using a machine learning method, wall boundaries of the plurality of rooms. As described herein, a variety of machine learning methods may be used and variety of types of analysis may be conducted to identify wall boundaries. In some embodiments, step 2533 may also include identifying other features of a floor plan, such as architectural features and equipment.

At step 2535, process 2530 may include storing the identified wall boundaries in a retention data structure. As described herein, the wall boundaries may be stored in a variety ways. In some embodiments, step 2015 may include storing identified architectural features and equipment in the retention data structure.

At step 2537, process 2530 may include generating a building information model, wherein the building information model includes the identified wall boundaries. As disclosed herein, building information model may provided in a variety of formats. The building information model may combine geometric, 3D models of building elements with semantic, functional information regarding those elements. A building information model may be generated using wall boundaries identified from the floor plan. For example, a 3D BIM model may be generated by associating wall boundaries with a height and constructing a 3D model of the wall boundaries using the height. The height may be indicated with respect to the scale of the floor plan. Step 2537 may include accessing a rule defining a scale of a 2D floor plan, which may be used to generate the building information model.

In some embodiments, step 2537 may include accessing a rule defining a respective height for the identified wall boundaries and updating the retention data structure based associating the identified wall boundaries with their respective wall heights and visualizing the building information model in a 3D format. The building information model may be generated using the rule defining the height for the wall boundaries. Disclosed embodiments may include enabling the aggregation of a 2D floor plan with one or more additional 2D floor plans into the building information model in step 2537. For example, a building information model generated from the aggregation of the two separate floor plans may depict both floors of the building in relation to each other. In other words, the building information model may show the second floor of the building on top of the first. Step 2537 may also include outputting the building information model, as described herein.

At step 2539, process 2530 may include displaying, at an interface, a comparison of at least a portion of a 2D floor plan and the building information model. As described, a comparison of a 2D floor plan and a building information model may include displaying both the 2D floor plan and the model. Step 2539 may also include displaying a graphical representation of the building information model at the interface and enabling pan, tilt, and zooming of the graphical representation of the building information model, as described.

At step 2541, process 2530 may include receiving, from the interface, input based on the comparison. As described herein, the system may present an interface to the user that permits the user to interact with the generated building information model. The user may use that interface to provide various inputs to change, for example, the model or the views of the model displayed.

At step 2543, process 2530 may include updating the retention data structure based on the input. For example, the input may include instructions to edit various aspects of the building information model or floor plan. As described, the retention data structure may be updated to account for these changes in the wall boundaries of the model.

In accordance with the present disclosure, systems, methods, and computer readable media may be provided for selecting equipment models and optimizing placement of equipment. Selecting equipment models may refer to a process of choosing and locating equipment in a floor plan in order to identify an equipment model that at least partially conforms to a functional requirement. Optimizing placement of equipment may include adjusting the location of equipment in order to increase conformity with a functional requirement.

The disclosed embodiments may include accessing a floor plan demarcating a plurality of rooms, as disclosed herein. For example, a floor plan may be accessed by receiving a digital, textual, hand draw, hard copy, photographic, or any other representation of a floor plan as stored in a data structure. The floor plan may include a room demarcation indicating the location of a room in a plan in relation to the rest of the plan. More generally, a room demarcation may include information relating to a floor plan that may indicate the location of a room in a plan in relation to the rest of the plan. It may also include the boundaries (i.e., contours) of the room. Boundaries may include the objects, real or imaginary, that provide borders of the room, including walls or windows that surround a room. Openings associated with the room's borders may be included in room contours (e.g., doors or window leading in and out of the room). Demarcating a room may include contours defining equipment locations or the locations of architectural features, including columns, beams, furniture, or other objects contained in the room.

Figure 26:
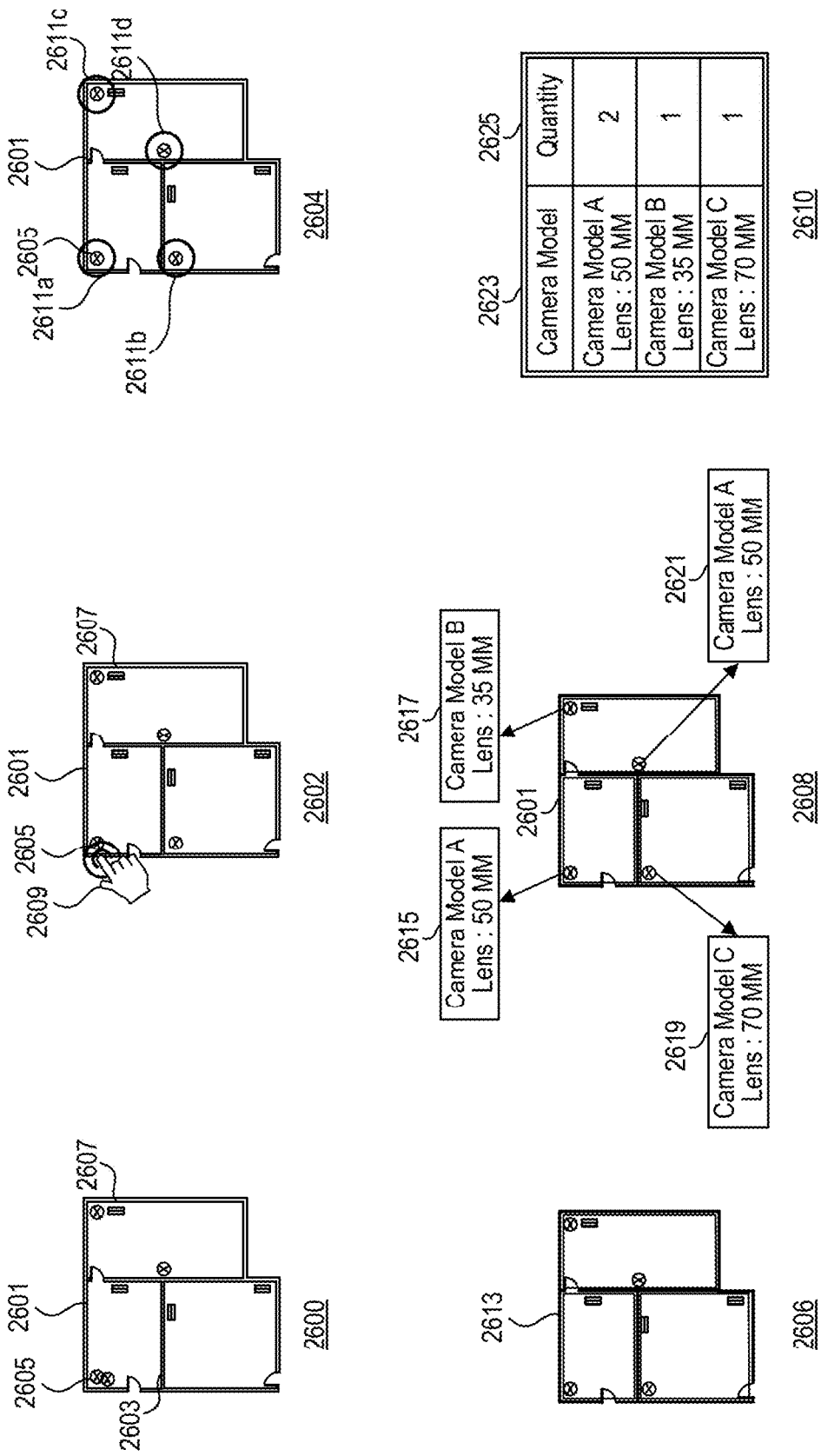
FIG. 26 depicts exemplary floor plans with equipment symbols, consistent with disclosed embodiments.

As a non-limiting example, FIG. 26 depicts schematic illustrations 2600, 2602, 2604, 2606, and 2608 of an exemplary floor plan, with room demarcations 2601 indicating the locations of room 2603 and doors leading into that room. In the example, doors are represented as they traditionally are in floor plans, with the door's swing path expressed as a curve.

In some embodiments a floor plan may include a plurality of equipment symbols. Equipment symbols may include graphical symbols and/or building information modeling (BIM) objects used to represent equipment on a floor plan as depicted in two or three dimensions. For example, an equipment symbol may denote a lighting fixture, a sensor, or any other equipment. The symbols may mimic the shape of the represented equipment or assume an abstract representation. For example, a camera might be represented as a rectangle, a circle, a square, a square with an X inside, or as any other combination of shapes and/or characters. The symbol may also include a text element. A symbol may be represented as a separate CAD entity (block or group) or as lines on the drawing or as a BIM object which may include a 2D or 3D representation of the BIM object on the floorplan along with parameters, attributes, metadata, or other object data associated with piece of equipment it represents. These object data may be contained in a list, index or data structure A legend may be provided to represent the association between the equipment and the symbol. In some instances, a symbol may have different meanings in different floor plans. For example, a circle might represent a camera in one plan and a lighting fixture in another. Generally, a symbol will be used consistently within a single plan, referring to a single type of equipment. A symbol may additionally refer to an equipment family (e.g., lighting fixture), a more specific type of equipment (e.g., pendant lighting fixture), a series of pieces equipment, or a specific equipment model. An equipment family may refer to a set of pieces of equipment sharing a common, purpose, function, style, size, shape, denominator, or other common characteristic. The sets may be large and inclusive, such as sensors, network devices, or power supplies. Or the sets may be smaller and more specific, such as IR motion sensors, WIFI access points, and Uninterruptible Power Devices. Equipment symbols may be assigned according to CAD or BIM authoring software, drafter preference, BIM object database, or based on an accepted standard published elsewhere. A drafter may include an architect, an engineer, a consultant, a draftsperson, BIM modeler, any person using CAD software to depict geometry, or any person using Building Information Modeling software to depict to depict BIM objects. By way of example, FIG. 26 depicts exemplary floor plans 2602, 2604, and 2606, 2608 with equipment symbols 2605 and 2607.

In some examples, an equipment symbol may be a BIM object. In other examples, an equipment symbol may be contained within or may be associated with a BIM object. BIM objects may include a combination of detailed information, attributes, parameters, technical characteristics, geometry and metadata that defines an object (e.g., piece of equipment) and represents the object's physical characteristics in two and/or three dimensions. A BIM object may be described as a "digital twin" or digital equivalent of real world objects, architectural features and equipment. For example, a BIM object may contain a description, dimension, BIM family classification, model number, a 2D floor-plan symbol and a 3D image. A BIM object may include technical characteristics such as visualization data that gives the object a recognizable appearance and behavioral data, such as detection zones, which enable the object's position to be determined or to behave in exactly the same way as the product itself, for example in a simulation. A BIM object may represent windows, doors, boilers, or any other equipment, as disclosed herein. A BIM object may indicate a specific model of equipment, a generic piece of equipment, a family of equipment, or any level of specificity in between.

Embodiments may include enabling a user to select an equipment symbol for analysis. For example, a user may be presented with a graphical user interface on a physical or virtual display that enables the user to select an equipment symbol or multiple equipment symbols by touching, clicking on, drawing a rectangular section box around, marking, or otherwise designating an equipment symbol or multiple equipment symbols (any or all of which may be considered "selecting"). The user may provide, via such a graphical user interface, information selecting an equipment symbol or multiple equipment symbols. Selecting may also include storing a designation in a data structure, index, or database, for example. In another example, a user may be presented with a graphical user interface enabling a user to access a list of equipment symbols and select a plurality of equipment symbols from a list for analysis. For example, a user may select a BIM object (e.g. light fixture) for analysis from a list, index, or database. The list of equipment may include equipment symbols that appear within a floor plan, equipment symbols absent from a floor plan, or any combination thereof. The user may be enabled to select an equipment symbol, multiple equipment symbols, an equipment family, a series of equipment, an equipment model, or any combination thereof. By way of example, FIG. 26 depicts an exemplary floor plan 2602 receiving user input 2609.

In some embodiments, the at least one processor may be further configured to enable specification of an equipment model for selected instances of equipment symbols. For example, a graphical user interface may enable the user to provide or otherwise indicate an equipment model to be associated with the selected instances of the equipment symbols. Associating equipment models with equipment symbols may refer to creating a logical link between a symbol displayed in a floor plan, for example, a CAD plan or BIM plan, or a real equipment model. After the link is created between the equipment symbol and an equipment model, the link may be expanded to include all of the identical equipment symbols in the drawing, linking them all to the same equipment model. To expand the selection in this way may require semantic, geometric, image, or ML processing in order to detect similarities and group the symbols. After a symbol is associated, a processor may be configured to count the number of occurrences of the symbol, determine their locations, or perform operations with the locations of the equipment symbol as an input.

A selected equipment symbol analysis may be or may be associated with a BIM object containing a first model. A selected equipment symbol may be contained within or represent a part of a BIM object. The first model may be a BIM object representing a particular piece of equipment or category of equipment, as disclosed herein. For example, the first model may be a BIM object representing a light fixture, a camera, a sensor, or other equipment. In this context, an equipment symbol may be associated with a BIM object or with the first model in an index, data base, or other data structure. In some cases, the BIM object itself may contain a representation of the symbol. Further, in some embodiments, a generative analysis process may include determining that a second model would achieve higher conformance with a functional requirement, and, as a result, a processor may associate the second model with the equipment symbol based on the determination. The system may then update a floor plan to include information indicating a selection of the second model. Additionally or alternatively, at an interface, a system may display a prompt querying acceptance of the selected second model's association with the selected equipment symbol. Further, acceptance may be received as a user input.

Disclosed embodiments may include parsing a floor plan to identify instances of a selected equipment symbol. As described, floor plans may be unstructured, and by parsing a floor plan, the embodiments provide structured information to facilitate equipment selection. Parsing a floor plan may include at least one of a geometric analysis, a semantic analysis, an image analysis, artificial intelligence methods, or any other analysis, as disclosed herein. Disclosed embodiments may include using a machine learning detection model such as ResNet trained to identify a plurality of equipment symbols. Disclosed embodiments may include parsing a data structure, list, database, or index. A floor plan, such as BIM floorplan, for example, may be structured or semi-structured, and contain BIM objects which may associated with attributes, metadata and semantic information. The BIM file may be interrogated, and semantic analysis may be used, for example, to identify instances of the BIM object. For example, a user may be presented with a graphical user interface on a physical or virtual display that enables the user to select an equipment symbol or multiple equipment symbols, as discloser herein. The system may then parse, analyze, or otherwise search a floor plan to identify, list, count, indicate, or store instances of the selected equipment symbol or multiple equipment symbols. The system may identify, list, count, indicate, or store instances a selected equipment symbol or multiple equipment symbols visually on a floor plan or provide a separate graphical user interface, as disclosed herein. In the example of FIG. 26 the user's selection 2609 of equipment symbol 2605 at location 2611a may then cause other instances of equipment symbol 2605 to be identified on exemplary floor plan 2604 at locations 2611b, 2611c, and 2611d.

Disclosed embodiments may include parsing a floor plan to identify structural elements, including walls. In this context, structural elements may include ceilings, windows, doors, walls, railings, columns, beams, equipment, or any other physical detail. Identifying structural elements may include identifying boundaries of the elements. By way of example, FIG. 26 depicts floor plan 2606 with wall 2613 identified (as represented by bold lines) after parsing a floor plan.

Embodiments may include accessing functional requirements for a set of rooms in a plurality of rooms containing instances of selected equipment symbols. This may occur when a functional requirement is stored in memory, such as a data structure, and the system accesses the functional requirement for application to a floor plan. In some embodiments a set of functional requirements may be defined and stored for a project, and the system might simultaneously run the functional requirements against a floor plan, defining all instances of the selected equipment symbols in a common process. In some embodiments accessing functional requirements may be based on user input. For example, a user may access stored functional requirements via a user interface and select those requirements which correspond to a plurality of rooms. As another example, a user may select rooms, and a system may retrieve functional requirements for those rooms based on the selection.

Disclosed embodiments may include accessing equipment technical specifications to identify equipment technical specifications associated with functional requirements. Accessing in this context may involve retrieving a technical specification from memory, such as in a data structure. The technical specifications may be accessed based on stored associations between the technical specifications and functional requirements. For example, functional requirements to provide sensor coverage may be associated in memory with technical specifications that indicate a sensitivity or a range of a sensor. In some cases, a functional requirement and a technical specification may be associated based on a logical rule or a machine learning model which indicates that the specification provides information that relates to an equipment's ability to satisfy the functional requirement. In some embodiments accessing equipment technical specifications may be based on user input.

Disclosed embodiments may include performing a generative analysis on identified equipment technical specifications within identified walls of each room in a set of rooms to select an equipment model that at least partially conforms to functional requirements. An equipment model may include a specific brand, manufacturer, series, model number and order code. In some situations it may not be possible to completely conform to a functional requirement, In such instances, the generative analysis might partially conform, meaning that, for example, equipment locations, technical specifications and/or technical characteristics might only partially fulfill functional requirements. For example, a camera may cover only 80% of the room with a required resolution, a lighting fixture may only provide 70% of the required lux level, an HVAC equipment unit may only provide 95% of the required airflow, and/or an electrical panel may meet 90% of a room's power requirements. This may occur as the result of the realities of a design or the realities of available or selected equipment. For example, in a small bathroom, it may not be possible to locate an electrical outlet at least four feet from a door and at least four feet from a sink. Only one or the other might be achievable. The system might evaluate both options (e.g., a generative analysis where more than one option is considered) and select a solution that gets closest to achieving the conflicting specifications. Or a technical specification for an amount of airflow through a space might not be achievable by the available or selected equipment. Generative analysis might be used to check different vent locations and available equipment to select the combination that gets closest to achieving the functional requirement. A generative analysis process may further include optimizing a parameter of a specified equipment model. Optimizing in this context may include maximizing a conformity to functional requirements provided for a room or set of rooms. For example, optimizing parameters for a camera may identify values for vertical or horizontal lens rotation, focal length, or mounting height which maximize coverage of a room according to a functional requirement. As another example, the resolution of a sensor may be set to a level which achieves conformance with the functional requirement with the minimal amount of network bandwidth. In additional embodiments, a generative analysis process may include selecting auxiliary equipment. For example, a system may select equipment that contributes to the function, installation, or operation of a primary piece of equipment, as disclosed herein. FIG. 26 depicts an exemplary floor plan 2608 with selected equipment 2615, 2617, 2619, and 2621.

In some embodiments the generative analysis process may consider a semantic designation of a room in a set of rooms. A semantic designation may refer to any form of classification of a room according to a fixed schema, as disclosed herein. For example, the generative analysis process may consider a semantic designation of a room in a set or rooms when selecting an equipment model that at least partially conforms to functional requirements of that room. For example, a generative analysis process may select a Wi-Fi access point model located in space having a semantic designation indicating it is an open space office with higher capacity for concurrent users than a one indicating it is residential bedroom.

In some embodiments, the generative analysis process may consider an architectural feature of a room in a set of rooms. For example, the system may analyze data associated with the architectural features of one or more rooms and then automatically select a piece of equipment and its placement that conforms to the functional requirement. Architectural features that might impact such analyses may include ceiling height, lines of sight, window, door, railing, column or furniture location, area, furniture type, locations of other pieces of equipment specified, or any other physical detail. For example, a generative analysis process may select a light fixture with a shallow depth in order to fit within the available space of a dropped or suspended ceiling. As another example, a generative analysis process may select an access control device with a weatherproof IP rating for an open-air parking garage.

The generative analysis may include selecting different equipment models for the same equipment symbol in a plurality of rooms. For example, different equipment models may be selected based on an extent to which the different equipment models conform to respective functional requirements of the plurality of rooms.

By way of example, FIG. 26 illustrates an example floor plan 2608 depicting selected equipment 2615, 2617, 2619, and 2621, all corresponding to the same selected equipment symbol 2611. In this example, the selected equipment symbol 2611 represents a camera and performing generative analysis selected three different camera models, Model A, Model B, and Model C for the same equipment symbol in multiple rooms within floor plan 2608. This may have occurred through generative analysis which determined that although the camera symbols were identical, in order to meet the functional requirements in each room, a different camera model for each was required.

Disclosed embodiments may include updating the floor plan by associating a selected equipment model with instances of selected equipment symbols. For example, a graphical user interface may indicate or display an association between a selected equipment model and selected instances of the equipment symbols. In some embodiments, associating a selected equipment model with a selected equipment symbol may include associating a Building Information Modeling object reflecting the selected equipment model with the equipment symbol. For example, the association between a BIM object and the equipment symbol may be stored in a data structure. A BIM object may be associated with instances of the equipment symbol appearing in a display of a floor plan to enable users to interact with the BIM object (e.g., move the object, retrieve technical specifications and metadata associated with the object). As another example, a BIM object may be updated to include a representation or label associated with the equipment symbol. As another example, a BIM object's properties, attributes, metadata and technical characteristic may be updated to reflect those of the selected equipment model.

In some embodiments, associating a BIM object may override another BIM object previously associated with a symbol. For example, a BIM object may have been previously associated with a selected equipment symbol manually or as part of a previous generative analysis. Therefore, when another equipment symbol is selected, and the generative analysis repeated, the BIM object may be associated with a different equipment symbol based on the more recently selected equipment symbol.

Disclosed embodiments may include outputting a bill of material based on the updated floor plan. For example, the system may determine the number of instances of an equipment symbol associated with an equipment model in the updated floor plan and output a bill of material. A bill of material, also referred to as a materials list or bill of quantities, may include a list describing the primary, secondary, and auxiliary equipment required to physically construct a building system. A bill of material may be a list of equipment models and may or may not include the specific model, the quantity used, price information, specific properties, and a physical description. A bill of material may include in image or other representation of the equipment, and may be displayed on the screen or exported to a textual (e.g., word), tabular (e.g., excel) or image (e.g., jpg or pdf) format. A bill of material may further be electronically transmitted by email or via the internet to third-party software, enterprise resource planning systems, CRM system, construction management tool, or any other destination for further use (e.g., purchasing) or processing. As a nonlimiting example, FIG. 26 depicts an exemplary bill of material 2610 as a list of camera models 2623 and an associated quantity 2625.

Disclosed embodiments may include updating a floor plan by modifying at least one of quantity or location of an instance of selected equipment symbols in order to improve compliance with functional requirements. In system design, there is a need to select the right equipment to meet functional requirements of a room. Flexible approaches that allow for changes to floor plans to improve performance can address this need. For example, it may be desirable that a light fixture provide enough light and/or provide light in a particular color-temperature. If so, a floor plan may be modified to meet such light requirements. Further, compliance with a functional requirement may include considering purchase or operational costs of selected equipment, and a floor plan may be modified to select alternative equipment that conform to such cost constraints.

Modifying the quantity of selected equipment symbols may include any combination of adding, deleting, and moving equipment items in the floor plan. Modifying a location of a selected equipment symbol in a floor plan may include altering geometries associated with the equipment symbol in a way that an equipment model remains fixed but its relation to the rest of the geometry in the floor plan is altered. The modified location may be in any direction. A location may be expressed as a change in X, Y, or Z coordinates. The user may modify equipment location via input to a graphical user interface such as a mouse, a touch interface, or textual input device. After the equipment is moved, the floor plan depicting the equipment location may be updated to reflect the change and stored in memory, such as a database. For example, in a floor plan of a room with four light fixtures that exceed a functional specification, updating the floor plan may include deleting or moving one or more of the fixtures. In a room with uneven distribution of light, updating the floor plan may include rearranging the fixtures or adding a fixture.

Embodiments may include enabling a user to define a maximum allowed modification variance in at least one of a quantity or a location of selected equipment symbols. When equipment locations or quantities are changed by an automated process, the system may determine or a user may provide a maximum allowable variance. For example, a maximum variance may include a maximum amount of change permitted when moving equipment. The maximum may be expressed as a measurement or in X, Y or Z coordinates. Additionally or alternatively, a maximum allowed modification variance in a quantity of the selected equipment symbols may be expressed as a maximum absolute or relative increase or decrease in the number of equipment symbol instances. A maximum may be received from a user or retrieved from memory (e.g., retrieving a default value). The maximum may serve as a limit when performing the automated process associated with updating or optimizing equipment placement in a floor plan.

Disclosed embodiments may include prompting a user to accept at least one location modification of one of the instances of selected equipment symbols. In this context, prompting a user may include asking a user for permission to perform an action or ratification of a performed action. For example, in the case of an application of a functional requirement to set of rooms with a certain functional requirement (Function "X") previously designated with Function "Y" prior to a semantic enrichment process, a prompt may be provide to the user via a graphical user interface, alerting the user to accept the change. The prompt may be in the form of a pop-up, a modal, or other element of a graphical user interface. The prompt may be textual (e.g., "Room A originally had Function Y, are you sure you want to apply the functional requirement associated with Function X?"), or graphical (e.g. a color indicating acceptance is required). In the case of moving equipment, a prompt may be provided to allow the user to accept or reject a change to the automatically suggested move. The prompt may provide the original equipment location and the updated equipment location.

Disclosed embodiments may include identifying at least two equipment models for a given equipment symbol which at least partially conforms to a use selection. For example, the system may receive a selection of a desired use for a given equipment symbol and determine two or more equipment models which at least partially conform to the desired use. The two or more equipment models may be provided as a prompt or in a bill of materials, as disclosed herein.

Additional embodiments may select compatible auxiliary equipment for a selected equipment model. For example, the system may receive a selection of an equipment model and select auxiliary equipment that is necessary or compatible with the selected equipment model. For example, if the selected equipment is a light fixture, auxiliary equipment may include a compatible light bulb or a light switch, such as a light switch with dimming capabilities.

Disclosed embodiments may include generating a wiring diagram. A wiring diagram, in this context, may be optimized to include the shortest paths between points on the floor plan. A wiring diagram may be generated using one of several optional typologies, as described herein.

Disclosed embodiments may include performing a floor plan analysis on a floor plan to identify room contours of a plurality of demarcated rooms. For example, floor plan analysis may be used on a floor plan to identify the room contours of one or more previously demarcated rooms. Room contours may include boundaries of a room that constitute the boarders of the room, as disclosed herein. Floor plan analysis may include image analysis, semantic analysis, or geometric metric analysis, alone or in combination. It may include but is not limited to extracting information about the floor plan from a BIM, CAD, PDF, image or skeletal model. The floor plan analysis may be used to locate rooms, room borders, doors, windows, stairs, furniture and any other architectural feature. A floor plan analysis may indicate the type of feature detected. A floor plan analysis may include using geometric analysis, semantic analysis, BIM analysis, image analysis and artificial intelligence methods as descried herein.

Figure 27:
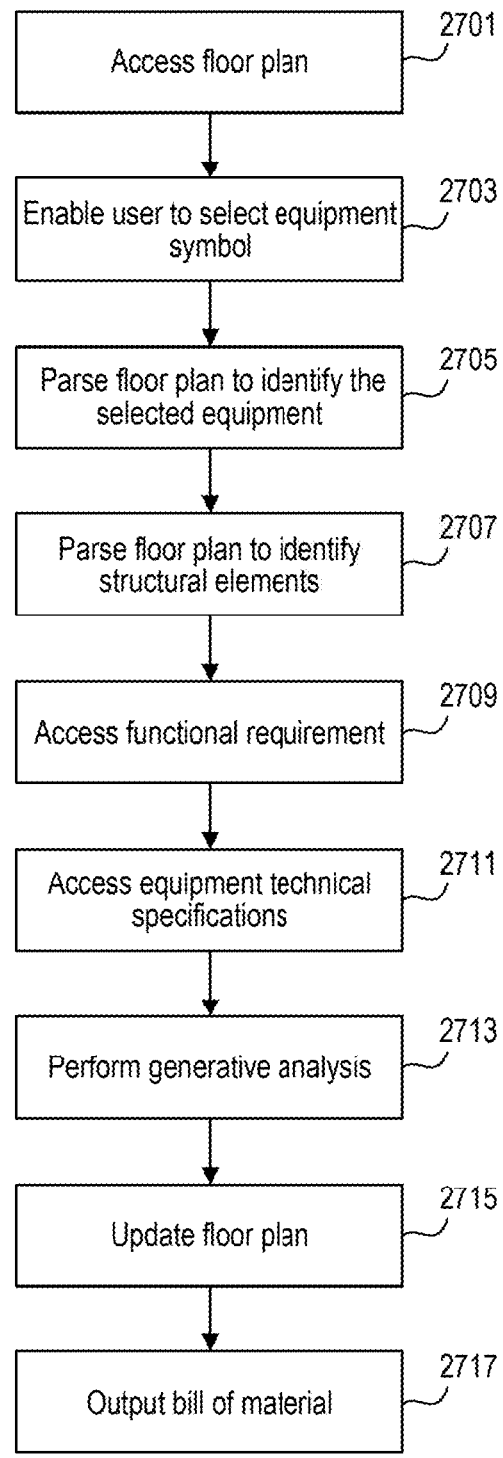
FIG. 27 depicts an exemplary flow chart of a process for selecting equipment models and optimizing placement of equipment in floor plans, consistent with disclosed embodiments

FIG. 27 depicts a flowchart of an example process for selecting equipment models and optimizing placement of equipment in floor plans, consistent with disclosed embodiments. The process may be performed by at least one processor. In some embodiments the process is not necessarily limited to the steps illustrated and any of the various embodiments described herein may be included in or excluded from the process.

At step 2701, the process may include accessing a floor plan demarcating a plurality of rooms, where the floor plan includes a plurality of equipment symbols. As discussed herein, for example, a floor plan may be accessed by receiving any medium containing a representation of a floor plan. A floor plan may be accessed by receiving a digital, textual, hand draw, hard copy, photographic, or any other representation of a floor plan as stored in a data structure.

At step 2703, the process may include enabling a user to select an equipment symbol for analysis. For example, a user may be presented with a graphical user interface on a physical or virtual display that enables the user to select an equipment symbol or multiple equipment symbols by touching, clicking on, drawing a section box, or otherwise designating an equipment symbol or multiple equipment symbols (any or all of which may be considered "selecting"). The user may provide, via such a graphical user interface, information selecting an equipment symbol or multiple equipment symbols. Selecting may also include storing a designation in a data structure, index, or database, for example. In another example, a user may be presented with a graphical user interface enabling a user to access a list of equipment symbols and select a plurality of equipment symbols from a list for analysis. The list of equipment may include equipment symbols that appear within a floor plan, equipment symbols absent from a floor plan, or any combination thereof. The user may be enabled to select an equipment symbol, multiple equipment symbols, an equipment family, a series of equipment, an equipment model, or any combination thereof.

At step 2705, the process may include parsing the floor plan to identify instances of the selected equipment symbol. The system may parse, analyze, or otherwise search a floor plan to identify, list, count, indicate, or store instances of the selected equipment symbol or multiple equipment symbols, as disclosed herein.

At step 2707, the process may include parsing the floor plan to identify structural elements including walls.

At step 2709, the process may include accessing functional requirements for a set of rooms in the plurality of rooms containing the instances of the selected equipment symbols. For example, the at least one processor may access functional requirement associated with a set of rooms that are stored in memory, such as a data structure as disclosed herein.

At step 2711, the process may include accessing equipment technical specifications to identify equipment technical specifications associated with the functional requirements. Accessing in this context may involve retrieving a technical specification from memory, such as in a data structure, as disclosed herein. By way of non-limiting example, if the functional requirement is to provide wireless internet coverage for an area, the technical specifications may include details for various Wi-Fi routers and their capabilities.

At step 2713, the process may include performing a generative analysis on the identified equipment technical specifications within identified walls of each room in the set of rooms to select an equipment model that at least partially conforms to the functional requirements. For example, the at least one processor may generatively analyze the identified equipment technical specifications within identified walls of each room in the set of rooms to select an equipment model or models that at least partially conforms to the functional requirements for each room or set of rooms. Continuing the above wireless internet coverage example, the system may generatively analyze the technical specifications of various Wi-Fi access points to select a specific access point or access points. The selection may be a function of wireless internet coverage, but also may be a function of cost, equipment usage, and/or aesthetic preferences across other regions of the floor plan other than the particular room under analysis.

At step 2715, the process may include updating the floor plan by associating the selected equipment model with the instances of the selected equipment symbols. For example, a graphical user interface may indicate or display an association between a selected equipment model and selected instances of the equipment symbols, as disclosed herein.

At step 2717, the process may include outputting a bill of material based on the updated floor plan. For example, the system may determine the number of instances of an equipment symbol associated with an equipment model in the updated floor plan and output a bill of material, as disclosed herein.

As previously discussed, the present disclosure relates to a method and a system for selecting equipment models and optimizing placement of equipment in floor plans, as well as a non-transitory computer-readable medium that may include instructions that, when executed by at least one processor, cause the at least one processor to execute operations enabling selecting equipment models and optimizing placement of equipment in floor plans.

Aspects of this disclosure may relate to systems, methods and computer readable media for automatically indexing rooms in a floor plan and group similar rooms so that actions implemented on one room in the group may be applied to others in the group. Such indexes may facilitate rapid searching and may enable efficient application of bulk actions (e.g., locating equipment in positions within a group of rooms based on shared semantic designations among the group of rooms). Conventionally, identifying similar rooms may be challenging as their semantic designations (e.g. labels indicating a private office, corridor, or other space type) may not be structured. The semantic designation of architectural features, furniture, and equipment located inside rooms may similarly not be structured. The disclosed systems may use machine learning and/or other methods to generate semantic designations of a plurality of rooms and the architectural features, furniture, and equipment located inside the rooms to obviate conventional problems of working directly in floor plans or using labor intensive and inconsistent methods to generate semantic designations. The disclosed embodiments may improve semantic enrichment processes by facilitating an implementation of room color-coding, allowing for the bulk application of functional requirements, bulk application of equipment additions, bulk application of technical specifications, and enabling efficient sorting and searching of various attributes and characteristics within a building, for example.

For ease of discussion, a method is described below, with the understanding that aspects of the method apply equally to systems, devices, and computer readable media. For example, some aspects of such a method may occur electronically over a network that is either wired, wireless, or both. Other aspects of such a method may occur using non-electronic means. In a broadest sense, the method is not limited to particular physical and/or electronic instrumentalities, but rather may be accomplished using many differing instrumentalities.

Disclosed embodiments may involve accessing a floor plan. As described above, the floor plan may include a graphic representation of a horizontal section of a building, which may include an interior of the building, an exterior of the building, or both. The floor plan may be represented in any suitable format, including a hand-drawn or scanned image, a vector-based format (e.g., CAD, PDF, DWG, SVG, or other 2D drawing formats), an image format (e.g., BMP, JPG, PNG, or similar image files), a 3D models, a Building Information Models ("BIM") format (e.g., RVT, IFC), or any other graphical or digital format.

The floor plan can be accessed in a variety of ways. In some embodiments, the floor plan may be retrieved from a network location, such as a network drive, a cloud-based platform, a remote server, or other forms of network storage locations. The floor plan may also be accessed from local storage, such as a local memory device associated with the processor performing the disclosed methods. In other embodiments, the floor plan may be uploaded by a user, for example, through a user interface. Additional details regarding floor plans and the accessing of floor plans are described throughout the present disclosure.

In some embodiments, the borders or contours of a room may not initially be demarcated in the floor plan. Accordingly, the disclosed embodiments may include identifying contours of the plurality of rooms. The contours may include walls, windows, doors, columns, beams, furniture, balconies, equipment, or any other objects that may constitute boundaries of a room, as discussed above. This may include semantic analysis, geometric analysis, machine learning methods, or any other analysis or processing techniques that may allow the system to identify the contours of a room.

In some embodiments, the disclosed embodiments may include identifying rooms, walls, and/or doors using artificial intelligence. As one of skill in the art will appreciate, machine learning may include training a model to perform a task. Example machine learning models may include but are not limited to classification models, neural network models, random forest models, convolutional neural network (CNN) models, deep learning models, recurrent neural network models, support vector machine models, ensemble prediction models, adaptive network based inference system, or any other types of machine learning models. In some embodiments, a deep neural network such as Resnet 50, RetinaNet, Mask RCNN, Unet, and/or Mask RCNN may be used. Embodiments consistent with the present disclosure may include structured data models such as, for example, boosting algorithms (e.g XGBoost), standard neural networks, and random forest models.

Training the model may include providing example training data to the model and iteratively optimizing model parameters until a training criteria is satisfied. For example, a model may be trained to classify data using labelled datasets. In some embodiments, a model may be trained to use training input data to produce an output that closely matches training output data. Model training may include hyperparameter tuning, sizing of mini-batches, regularization and changes in network architectures. Systems and methods contemplated herein may include using available machine learning platforms and/or libraries to train and/or manage models (e.g., TensorFlow™, Python™, Matlab™, Keras™, Microsoft Cognitive Toolkit™, and/or any other machine learning platform). The training of machine learning models may be supervised and/or unsupervised. Training data may take many forms including, for example, the annotation of elements including but not limited to various architectural features (e.g. doors, door sills, windows, walls, rooms, etc.) and equipment (e.g. sensors, furniture, cabinetry, lighting fixtures, HVAC ducting, etc.). The training data may include a plurality of floor plans may be annotated in different ways including but not limited to CSV, JSON, masks, and/or other file types to allow multi-type deep learning training and other possible artificial intelligence training techniques. These objects may be generated manually by drawing them over the image or may be generated automatically using heuristic, geometric, or statistic algorithms.

In some embodiments, additional processing may be performed to generate the training data set. For example, training images may be cleaned by removing text, redundant features and/or other elements or augmented through the rotation of the images or addition of noise to the images. For small object detection such as doors and door sills, the floor plan may be cropped (for example to 1000×1000 pixels) and may later be recomposed and used with non-maximum suppression. For larger holistic objects such as walls and rooms, the images may be resized (e.g., to 1024×1024 or 512×512) before inputting into the artificial intelligence model. The trained model may then be used to identify rooms, windows, doors, columns, beams, furniture, balconies, equipment, or any other objects or architectural features in the floor plan.

The disclosed embodiments may further include accessing architectural feature data associated with the plurality of rooms. As described throughout the present disclosure, an architectural feature may include a wall, a half wall, a door, a window, a skylight, a column, stairs, a handrail, a beam, flooring, an elevator, a fireplace, or any other permanent or semi-permanent part of the building. In some embodiments, the architectural feature data may include furniture. As used herein, furniture may describe large movable equipment, such as tables and chairs, used to make a house, office, or other space suitable for living or working. In some embodiments, the architectural feature data may include geometric data, which may include geometric features, such as shape or dimension of a room. For example, the architectural feature may include whether the room has a nook or a closet, a number of walls or corners included in the room, a width of the room, a height of the room, volume of the room, boundary segments of the room, topological connections of the room, other room adjacencies to the room, room bounding ratio, room bounding width, room bounding length, or any other features associated with room geometry. The architectural feature data may be represented in any suitable way that may be accessed by the system. In some embodiments, the architectural feature data may be included in the floor plan. In such instances, architectural features may be accessed at the same time the floor plan is accessed. Said another way, accessing a floor plan and accessing architectural features might occur together at a single time or as part of a single step. Or, after the floor plan is accessed, AI analysis, geometric analysis, and/or semantic analysis may be performed on the floor plan to identify architectural features. Alternatively, or additionally, some or all architectural features may be embedded in metadata and may be accessed after the floor plan is accessed. As an example, a BIM file may contain BIM objects of architectural features which contain metadata. Thus, the disclosed embodiments may include performing a floor plan analysis, which may include image recognition or geometric analysis techniques, to identify the architectural feature data. In some embodiments, some or all of the architectural feature data may be stored in metadata associated with the floor plan, or separately from the floor plan, for example, in an associated data structure or other format.

FIG. 28A is a diagram illustrating an example floor plan 2800, consistent with the disclosed embodiments. As described above, disclosed embodiments may be used to access architectural features within a region 2802 of floor plan 2800. For example, the designation "Chairman's Office," as shown in the transformed image on the right of FIG. 28A may have been derived from metadata, and AI analysis may have been used to identify chair 2812, window 2814, door 2816, or various other features within floor plan 2800, as described above. In some embodiments, the architectural features may include an area 2918 of the office, or other geometric or architectural properties.

Using the architectural feature data, the disclosed embodiments may include performing a semantic enrichment process on the plurality of rooms in order to determine semantic designations for the plurality of rooms. As described in embodiments throughout the present disclosure, a semantic enrichment may refer to the process of adding semantic information to a floor plan. In this context, semantic enrichment may be used to classify a room based on its architectural features. For example, a room with a door, window, desk and chair may be recognized as an office. The semantic enrichment may also include analysis of geometric data or features, as described above. For example, a small, square-shaped room may indicate a room is an office, whereas a larger size may indicate a conference room, or other lager space. In some embodiments, the semantic enrichment may include applying a machine learning model, as described above. As disclosed, semantic enrichment may include using a Random Forest or XGBoost algorithm trained to determine semantic designation based on architectural feature data and where architectural feature data is provided as an input to determine semantic designations. Training of a machine learning model may include manually tuning of, hyperparameters manually and/or with a grid, to identify optimal parameters including, but not limited to, the number of trees, minimum child weight, maximum depth among many others. In some embodiments, a Convolutional Neural Network may be used to determine semantic designations. Each room may be associated with a single semantic designation, or may be associated with multiple semantic designations.

As used herein, a semantic designation may refer to any form of classification of a room according to a fixed schema. In some embodiments, the semantic designation may be associated with respective room functions, describing the purpose or use of a room. For example, a semantic designation may include "kitchen," "office", "bedroom," "restroom," "corridor," or other descriptive information. The semantic designations may be clear and consistent terms chosen from a limited list of possibilities such that they can be recognized by a computer. For example, the list may include only one of the terms "restroom," "bathroom," "men's room," "women's room," "toilet," or other similar terms to avoid multiple designations for the same room.

In some embodiments, the semantic designations may be based on international standards. For example, a list of semantic designations may be based on an OmniClass™ standard, Industry Foundation Classes (IFC), Uniclass™, MasterFormat™, or other standard lists of architectural semantic designations that may be accepted internationally and/or commonly used in the industry. Alternatively, or additionally, semantic designations may be based on user-definable standards. For example, the list may be an internally maintained standard that is custom built or semi-custom built for a specific purpose. The list may be a proprietary or unique standard defined by an individual architect, planner, designer, firm, client, builder, or various other entities involved in architectural development.

In some instances, not all room functions or semantic designations can be identified with a 100% certainty in the semantic enrichment process. For example, this may be due to an ambiguous or meaningless room tag ("IR 300") or a geometry that lacks clearly identifying features. To account for this, the semantic enrichment process may include determining a confidence level or confidence rating, representing a degree of confidence that the determined semantic designation for a room matches the room geometry or features. The confidence level may be represented as a value in a range of values (e.g., 0-1, 1-10, 1-100, etc.), as a percentage (e.g., 0-100%), based on a textual rating (e.g., "very high," "low," etc.), as a symbolic or graphical representation (e.g. based on a color-based legend, predefined symbols, etc.), or by any other representation of varying degrees of confidence. As an illustrative example, a room tagged as "Office" may be assigned a semantic designation of "Office" with a 100% (or near 100%) confidence, while a room tagged as "A. Davis" might still be designated as an office, but with a relatively low confidence rating (e.g., 30%). In some embodiments, the disclosed methods may perform different operations based on a confidence levels associated with a semantic designation. In some embodiments, the confidence levels may be compared to a confidence threshold to determine appropriate actions. As used herein, a confidence threshold may refer to a minimum confidence level associated with a determined semantic designation (or maximum confidence level, depending on how the value is defined). For example, the semantic enrichment process may not display semantic designations with a confidence rating is below 60%, or any other suitable threshold.

In many cases, semantic designations may be missing altogether from a floor plan. Accordingly, the semantic enrichment process may include determining a semantic designation where one was absent. For example, a floor plan may have no data or properties associated with a room (e.g., if the floor plan is an image file), or may have some data or properties associated with the rooms but may not include a semantic designation. Even in instances where semantic designations are included in the floor plan, the semantic designations may be incorrect or unclear. For example, a room may be labeled with "manager" or "accounting" instead of "office". Accordingly, disclosed embodiments provide additional information at scale by enabling the identification of accurate, consistent semantic designations in floor plans.

In other instances, the semantic designations may not conform to a defined standard, such as the standards noted above. Accordingly, the semantic enrichment process may include replacing or supplementing information on the floor plans with a different designation in order to be read by a computer. For example, the semantic enrichment processes may include overriding an existing semantic designation. Overriding the semantic designation may include replacing the existing semantic designation or supplementing the existing semantic designation with a correct semantic designation. In some embodiments, the existing semantic designation may be overridden manually by a user. For example, the user may manually modify text or properties within the floor plan to conform to an industry standard list of semantic designations. In some embodiments, the disclosed systems may provide a graphical user interface to allow the user to override existing semantic designations, for example, through a drop down menu, by dragging and dropping semantic designations, through a text entry field, or through any other suitable controls or functions. In some embodiments, the overriding may be performed automatically or as a bulk operation. For example, a rule may be defined to change all rooms with the semantic designation "bathroom" to "restroom," or similar rule-based operations. In some embodiments, the overriding may be performed using an index displaying all room functions, which may then be edited individually or in bulk. According to some embodiments, the override may be based on a confidence threshold, as described above. For example, the existing semantic descriptions may only be overridden with semantic designations having a confidence score greater than 70%, or any other suitable threshold.

In some embodiments, information associated with rooms in the floor plan may be relevant to the semantic designation process. For example, the semantic enrichment process may include considering an existing room name. In this context, the room name may include any identifier associated with a room on a floor plan, including descriptive text, room numbers, symbols, shading, coloring, or any other forms of identifiers. In some embodiments, the room names may be semantic designations that are unclear or that do not conform to an industry or international standard, as discussed above. For example, a room labeled "workstation" may indicate that the room is an office, although the term "workstation" may not be a recognized semantic designation. In some embodiments, the semantic enrichment process may supplement or augment an existing room name or tag by associating the determined semantic designation with the existing ones. For example, a room with an existing semantic designation of RM 201 may supplemented with the additional determined designation of "office" (e.g. RM 201 Office).

In some embodiments, the semantic enrichment process may include considering semantic designations of architectural features. Similar to the semantic designations for rooms, as described above, architectural features may also be defined according to an international or industry standard or a user-defined standard. Example architectural feature semantic designations may include "chair," "desk," "column," "balcony," "door," or any other descriptors of architectural features that may be included in a floor plan. A room may be assigned a semantic designation based on architectural features within the room having semantic designations commonly associated with a particular room semantic designation. For example, architectural features designated as "chair" and "desk" may commonly be associated with an office. In some embodiments, combinations of architectural features may be considered. For example, an architectural feature designated as "chair" may indicate a room is an office when included in the same room as an architectural feature designated as "desk," but may indicate a room is a living room when included in the same room as an architectural feature designated as "sofa." Further, the number of features designated as "chair" may indicate a room is a conference room rather than an office. In some embodiments, the spatial architectural features and furniture may be considered. For example, the position of chairs relative to a table may indicate whether the table is a meeting table or a dining table.

According to some embodiments, the disclosed methods may further include determining semantic designations for furniture or architectural features. For example, in embodiments where the floor plan does not include semantic designations for furniture or architectural features, they may be determined and added as part of the semantic enrichment process. In instances where semantic designations for furniture or architectural features are included, these may be modified, supplemented, or replaced. The semantic designations for furniture or architectural features may be determined using methods similar to those described above with respect to the semantic designations for the rooms. In some embodiments, this may include identifying geometric shapes or features on the floor plan and associating them with furniture or architectural features, as described above, which may then be used to generate the semantic designations. In some embodiments, this may include semantic analysis of BIM object metadata and other property data which may include manufacturers, model number, BIM families, description, technical characteristics, classification tags and a variety of other data. In some embodiments, a machine learning model may be trained using a training data set of floor plans with geometric data representing furniture or architectural features as well sematic designations for those features. Based on the training data, a machine learning model may be developed to automatically associate geometric data with semantic designations. In some embodiments, the semantic designations may be determined based on property data or other metadata associated with the floor plan. For example, object property data of a BIM object, for example, may include a model number for an office chair, which the disclosed systems may associate with a "chair" semantic designation.

Embodiments of the present disclosure may further include associating, on the floor plan, the semantic designations with the plurality of rooms. This may involve any mechanism for representing the determined semantic designation such that it is linked in some manner to its respective room. In some embodiments, this may include adding the semantic descriptions as text to the floor plan. For example, the word "Office" may be overlaid on the floor plan within a room determined to be an office based on the architectural features. In some embodiments, associating the semantic designations with the plurality of rooms may include modifying or inserting text as a property, data field, or other metadata associated with the floor plan. In embodiments, where the floor plan is a CAD, drawing, or vector file, this may include adding or updating properties of one or more shapes representing the room in the floor plan to include the semantic designation. This may be included in a dedicated semantic designation field, or may be included within general property data. In embodiments where the floor plan is a BIM file, the semantic designations may be added as properties of the room in the BIM file or to a BIM object. In some embodiments, the semantic designations may be associated with the floor plan in a separate file or separate portion of a file. For example, the semantic designations may be associated with the rooms (e.g., using a room identifier, room name, etc.) in a data structure.

In some instances, the disclosed embodiments may further include associating, on the floor plan, a confidence level for the semantic designations. As described above, the semantic enrichment process may include determining a confidence level for one or more of the semantic designation determinations. These confidence levels may be represented in any manner such that they are associated with the semantic designations in the floor plan. The confidence levels may be represented as a text or numerical value along with the semantic designations (e.g., "Laboratory [80%]"), which may be overlaid on the floor plan, included in object properties or other metadata, or otherwise included in the floor plan. In some embodiments, the confidence levels may be represented as one or more symbols on the floor plan (e.g., as a number of stars, etc.), as a color (e.g., on a color scale for a shading of a room or for the font of the semantic designation), as a shading or pattern, or other graphical representations. In some embodiments, whether or not the confidence level for a room exceeds a confidence threshold may be indicated on the floor plan. This may be represented, for example, in the font of the semantic designation (e.g., green font, bold or underlined font, or other highlights), by including a symbol (e.g., a star or checkmark), by a textual or numerical indicator, a color, of any other suitable indication.

Figure 28B:
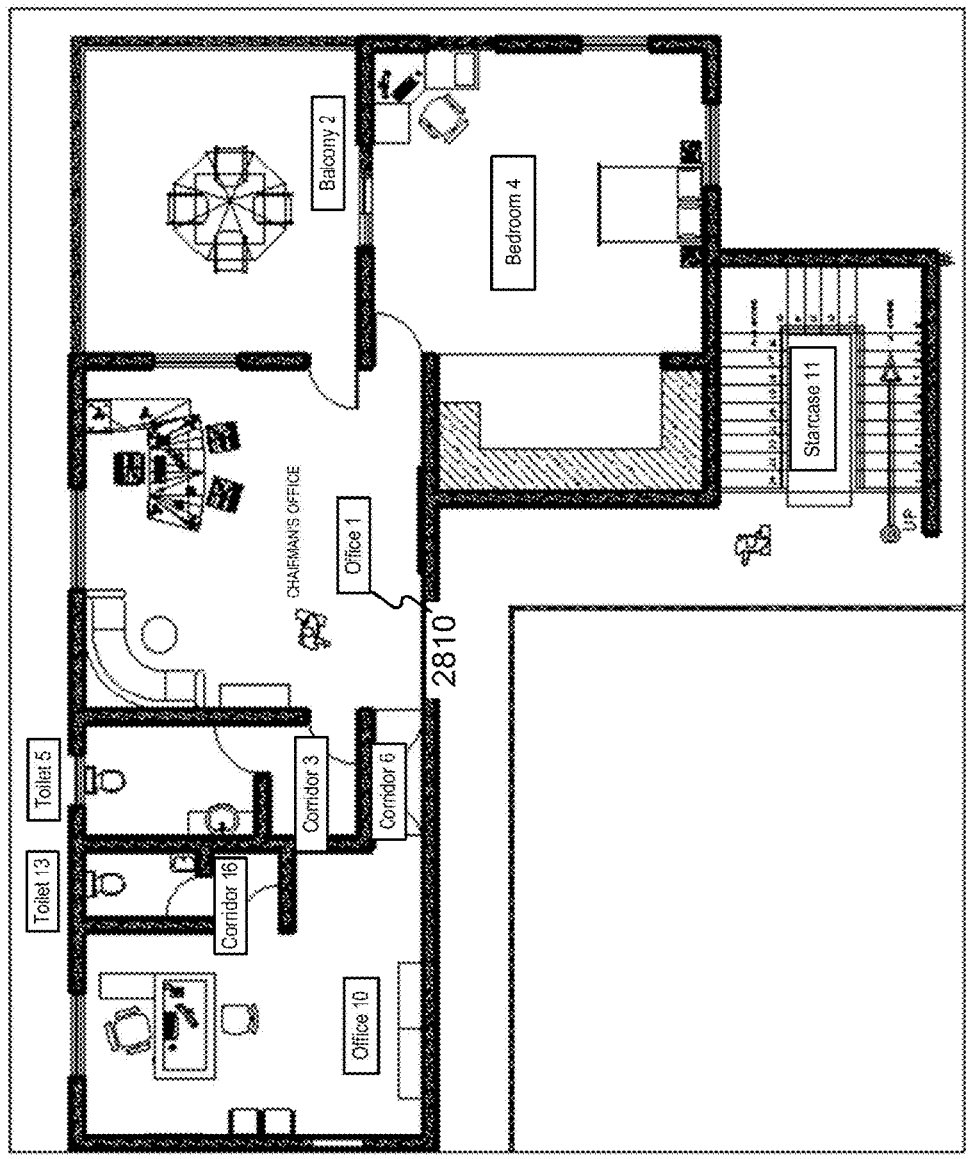
FIG. 28B illustrates an example a semantic enrichment process consistent with disclosed embodiments.

FIG. 28B illustrates an example semantic enrichment process that may be performed on region 2802 of floor plan 2800, consistent with the disclosed embodiments. As discussed above with respect to FIG. 28A, the disclosed methods may be used to determine architectural features within region 2802, such as chair 2812, window 2814, door 2816, and area 2818. Based on these and other architectural features, the disclosed method may determine semantic designation 2810, which may specify the chairman's office as "Office 1." Semantic designation 2810, as well as other semantic designations for rooms in region 2802 may be associated with floor plan 2800, as shown. These might be overlaid on an image of the floor plan itself, be constructed as a separate image layer, stored in an index, and/or maintained in metadata.

Embodiments of the present disclosure may further include associating, in an index, the semantic designations with the plurality of rooms. This may be performed before, after, or concurrently with associating the semantic designations with the plurality of rooms on the floor plan. As used herein, an index may include a data structure or other format for representing data to define relationships between data elements. The index may be stored in plain text, a table or chart, a database, or any other suitable format. The index may be stored in a single file or may include multiple files. The index may be applicable to one or more particular projects, buildings, site locations, floor plans, wings, areas, disciplines (e.g., electrical equipment, HVAC equipment, etc.), or any other classifications or scopes. In reference to a building, the index may include a list of all room names (which may include room numbers, or other identifiers), their semantic designation, data regarding their geometric features and architectural features, data regarding functional requirements associated with rooms, data regarding equipment associated with rooms, data regarding technical specifications associated with rooms, IoT or Building Management System data associated with rooms (e.g. energy metering, occupancy statuses, temperature set-points, light levels, maintenance records, alarms, etc.) or any other relevant information or a combination thereof.

The index may be optimized to improve efficiency and/or speed of accessing and organizing data referenced by the index. In some embodiments, the index may be configured to be searched, filtered or both. For example, the index may be organized as a self-balancing tree (e.g., a B-Tree) or other searchable data structure. An index may be organized such that data elements may be identified based on their inclusion of particular text or properties, or their relationship with other data elements. In some embodiments, the index may also include metadata or keywords to allow the data to be searched for or filtered to identify elements, rather than having to read through each file individually. For example, the index may associate a building level with each of the plurality of rooms, such that the index is configured to be filtered and/or searched by a building level.

In some embodiments, the semantic enrichment process described above may be performed after the index is generated. For example, the index may be an existing index stored in a local memory, a remote memory (e.g., a cloud-based service, a remote server, a network drive or folder, etc.), a volatile memory (e.g., random access memory), a database, or other storage location. Accordingly, associating the semantic designations with the plurality of rooms may include adding the rooms and/or semantic designations to the index, modifying or replacing rooms and/or semantic designations in the index, or both. In other embodiments, the semantic enrichment process described above may be performed before the index is generated. Accordingly, associating the semantic designations with the plurality of rooms may include generating and storing the index.

Various other information may be included in the index in addition to (or, in some cases, in place of) the semantic designations. In some embodiments, the index may contain a confidence rating for the semantic designations. For example, the semantic enrichment process described above may include generating confidence levels associated with each of the semantic designations and the confidence levels may be included in the index. Accordingly, the index may be configured to be filtered or searched by confidence level. This may include filtering to show semantic designations with confidence levels above a confidence threshold.

In some embodiments, the disclosed methods may include associating room names with the plurality of rooms in the index. As described above, a room name may include any identifier associated with a room. In some embodiments, the room name may be a textual description of a function or category of room. For example, the room name may be similar to the semantic designation but may not conform to a structured format, such as an OmniClass™ designation, or similar standards. In some embodiments, the room names may be generated by the disclosed systems, for example, during the semantic enrichment process, as described above. In other embodiments, the room names may be included in or otherwise associated with the floor plan. Accordingly, the index may include the determined semantic designation and existing room names of at least one of the plurality of rooms.

Some embodiments of the present disclosure may include associating rooms with their associated architectural features in the index. The architectural features may be identified by accessing architectural feature data, as described in greater detail above, which may be stored as part of the floor plan (e.g., in property data or other metadata), may be represented as geometric features in the floor plan, or stored separately from the floor plan. The index may include a column, row, or other field for associating architectural features with the rooms in the index. The index may include any other data that may be associated with rooms described throughout the present disclosure, including, but not limited to, technical characteristics, technical specifications, areas of interest, zone identifications, room features, placement locations, room functions, functional requirements, project identifiers, level identifiers, or similar information.

Some disclosed embodiments may include associating semantic designations for furniture, architectural features, equipment or all three elements, with their respective rooms in the index. For example, semantic designations for furniture, equipment, and/or architectural features may be determined as part of the semantic enrichment process, as described above. In other embodiments, the semantic designations for furniture, equipment, or architectural features may be included in the floor plan. Accordingly, the index may be searched or filtered based on these semantic designations.

By way of example, FIG. 28C illustrates a tabular representation of an example index 2820 that may be generated based on floor plan 2800 consistent with the disclosed embodiments. Index 2810 may associate semantic designations (shown here in the Identified Room Function column) with room numbers, room names, or other room identifiers. The index may include other information associated with the rooms. This may include architectural features (such as the area of the room and semantic designations for identified furniture and equipment), furniture text and energy consumption values. For example, the chairman's office described above may be associated with a semantic designation of "Office," as described above. Based on furniture text associated with objects in the room (e.g., in object properties or other metadata), index 2820 may also include semantic designations for a desk, three chairs, and a sofa, as shown. The index may also identify a thermostat equipment designation, as shown. It is to be understood that the index illustrated in FIG. 28C is provided by way of example, and the index is not limited to the format or type or quantity of information shown in FIG. 28C. Although FIG. 28C is organized as a table having particular column headers, indexes according to the embodiments may be organized using different schema (e.g., with different headers, as relational databases, as searchable trees, or in other formats).

Embodiments of the present disclosure may further include updating the floor plan by using the index to enable an action to be applied to a group of rooms. The group of rooms may be defined based on any information included in the index, as described above. For example, the index may be searched or filtered based on any of the information in the index for purposes of applying the action. In some embodiments, the group of rooms may share a common semantic designation. For example, the group of rooms may include all rooms which share "office" as a semantic designation. Accordingly, the index may enable a functional requirement, such as a rule defining task lighting placement and brightness, to be applied to all rooms in a floor plan designated as offices. Any other information included in the index, as described above, may similarly be used to apply actions to a group of rooms. For example, updating the floor plan may include using the index to enable the action to be applied to a group of rooms sharing common architectural features. This may include applying an action to rooms containing a column, rooms along an exterior of a building, rooms including a desk, rooms having a particular shape, or any other architectural features described throughout the present disclosure.

As another example, the group of rooms may be identified based on equipment that is included in or that will be included in the rooms. For example, the disclosed methods may include accessing a list of equipment in the plurality of rooms and associating, in the index, equipment from the list of the equipment with respective ones of the plurality of rooms in the index. The list of equipment may include a materials list or any other means of associating equipment with a particular room. The disclosed embodiments may further include using the index to enable the action to be performed on rooms sharing common equipment. For example, this may include applying a functional requirement requiring all rooms containing cameras to have a particular data connection requirement, or all rooms containing welding equipment to have a particular power requirement.

In some embodiments, the group of rooms may be identified based on an input from a user. For example, the disclosed embodiments may include enabling a user to select a plurality of rooms from the index and associating functional requirements with the selected rooms. The selection may include any manner in which a user may identify a group of rooms. This may include a manual selection, applying one or more filters, applying one or more searches, or a combination thereof. In some embodiments, enabling the user to select a room from the index may include enabling the user to click in the floor plan on a room that was previously indexed. Accordingly, the disclosed methods may include displaying the floor plan for selection of rooms by a user. The user may similarly select a room by clicking, tapping, annotating, circling, highlighting, or otherwise marking a display of the floor plan via a user interface. In some embodiments, the selection may be made by marking the area defined by the room in the floor plan, marking a boundary of the room, marking an icon or symbol associated with the room, marking a semantic description displayed on the floor plan, or various other elements on the floor plan. In some embodiments, the floor plan may include symbols or other elements for selecting groups of rooms. For example, a user may mark a toilet icon to select all rooms with a "restroom" semantic designation. In some embodiments, enabling the user to select a room from the index includes enabling the user to select a room from a list. In this context, a list may be a display of some or all of the rooms included in the index. For example, the list may be presented as a drop-down menu, enabling a user to select one or more rooms for which an action is to be applied. The list may also be displayed as a series of checkboxes or radio buttons, a series of selectable items, or any other display enabling a user to select one or more rooms. In some embodiments, some or all of the index itself may be displayed. For example, a user may select one or more rooms from a table or other representation of the index.

As noted above, updating the floor plan may enable an action to be applied to the group of rooms. As used herein, an action may refer to any operation that involves accessing or modifying data in the floor plan. In some embodiments, this may include editing the content of room data in the floor plan, for example, by changing information in a field, adding or removing a data field, modifying or adding image or shape data, or any other means of editing contents of the floor plan. In some embodiments, this may include defining or associating a functional requirement with one or more rooms in the floor plan. For example, the action may include application of a functional requirement containing at least one of a candela intensity, lux level, a decibel sound level, a Speech Transmission Index level, wireless signal strength, a pixel density level, door access control, a BTU level, an energy consumption level, or any other functional requirements as described throughout the present disclosure.

Similarly, an action may include associating a technical specification with the group of rooms. For example, a user may select one or more rooms from a floor plan and define a particular manufacturer or model of camera, or particular technical characteristics of a camera to be installed in the room. The associated technical specification may be used, for example, during a generative analysis to determine equipment to be placed in the room. In some embodiments, this may also include updating information in the index. For example, the action may include changing an equipment model identifier or other technical specification information or technical characteristics. In some embodiments, the action may include adding equipment to the group of rooms. Adding the equipment may include any means for associating equipment with the rooms. For example, as described above, the action may include associating a technical specification with the rooms, which may define equipment that is to be included in the room. This may also include adding a graphical representation of the equipment to the floor plan, such as an icon or other symbol representing the equipment. This may also include updating an equipment list or other actions associating a piece of equipment with the room.

In some embodiments, the action may include an application of a rule. As described herein, the rule may define how functional requirements are to be applied or how equipment should be placed. In some embodiments, the rule may be associated with a functional requirement of the group of rooms. For example, the rule may define a functional requirement to place a camera on every door that leads to a stairway, or similar rules, as described throughout the present disclosure. In some embodiments, the rule may be an energy consumption rule. An energy consumption rule may be any rule relating to the use of power or energy associated with a room. As a non-limiting example, an energy consumption rule may include the power consumption per square meter or other unit of measurement for a space and/or room with a certain function and/or use in a building. For example, the energy use of an office can be estimated at X kilowatts per square meter per hour, while the energy use of a dining area can be estimated at Y kilowatts per square meter per hour. An energy consumption rule may be defined, for example, by a user, a code, building standard, pre-loaded template, an artificial intelligence method trained to predict energy consumption based on energy consumption and/or occupancy patterns and/or building profiles, as well as many other potential dataset types.

According to some embodiments of the present disclosure, updating the floor plan may further include coloring rooms sharing a common semantic designation according to a legend. In this context, coloring a room may refer to marking a room with a color for display purposes. The color may be applied to the floor of the room, a border, a wall, a ceiling, a 3D volume, furniture or equipment within a room, or any combination thereof. The colored room may be shown on screen in a 2D top view or a 3D perspective or isometric view. It may also be used as an output for different file, such as a PDF, JPG, or other file format.

In some embodiments, the index may be used in conjunction with the generative analysis process for selection and/or placement of equipment, as described throughout the present disclosure. For example, the disclosed methods may further include accessing functional requirements associated with the plurality of rooms. For example, a user may select various rooms within a floor plan, as described above, and may initiate a generative analysis process based on the selection. Accordingly, the method may further include performing a generative analysis process in conjunction with technical specifications of equipment associated with the functional requirements and outputting a solution that least partially conforms to the functional requirement, as described above.

In some embodiments, the system may be a cloud-based system. For example, the methods described herein may be executed in a virtual instance by a remote computer, rather than a local processor. Cloud-based computation can provide advantages in scalability, cost, and security over approaches that rely on local computational or conventional servers.

Figure 28D:
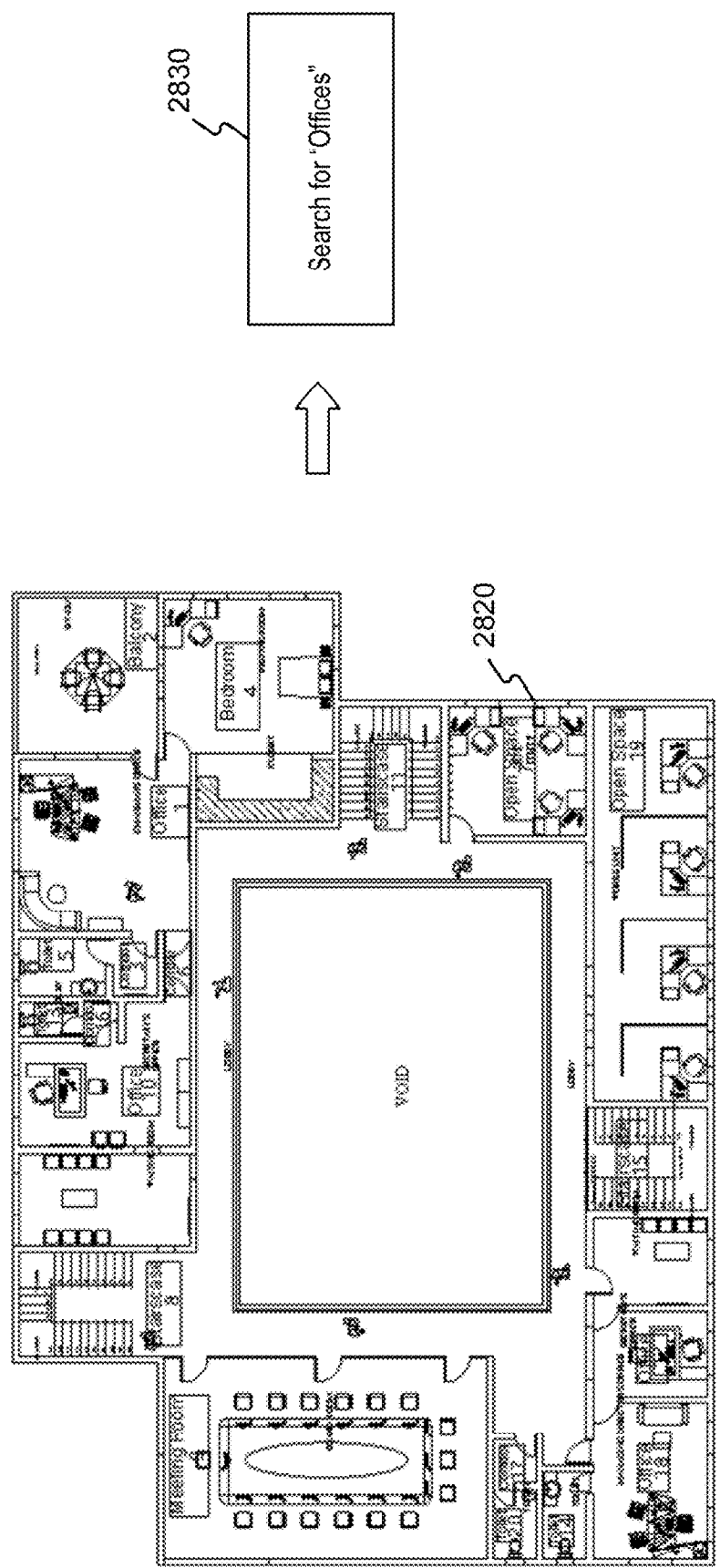
FIG. 28D illustrates an example search function that may be performed consistent with disclosed embodiments.
Figure 28F:
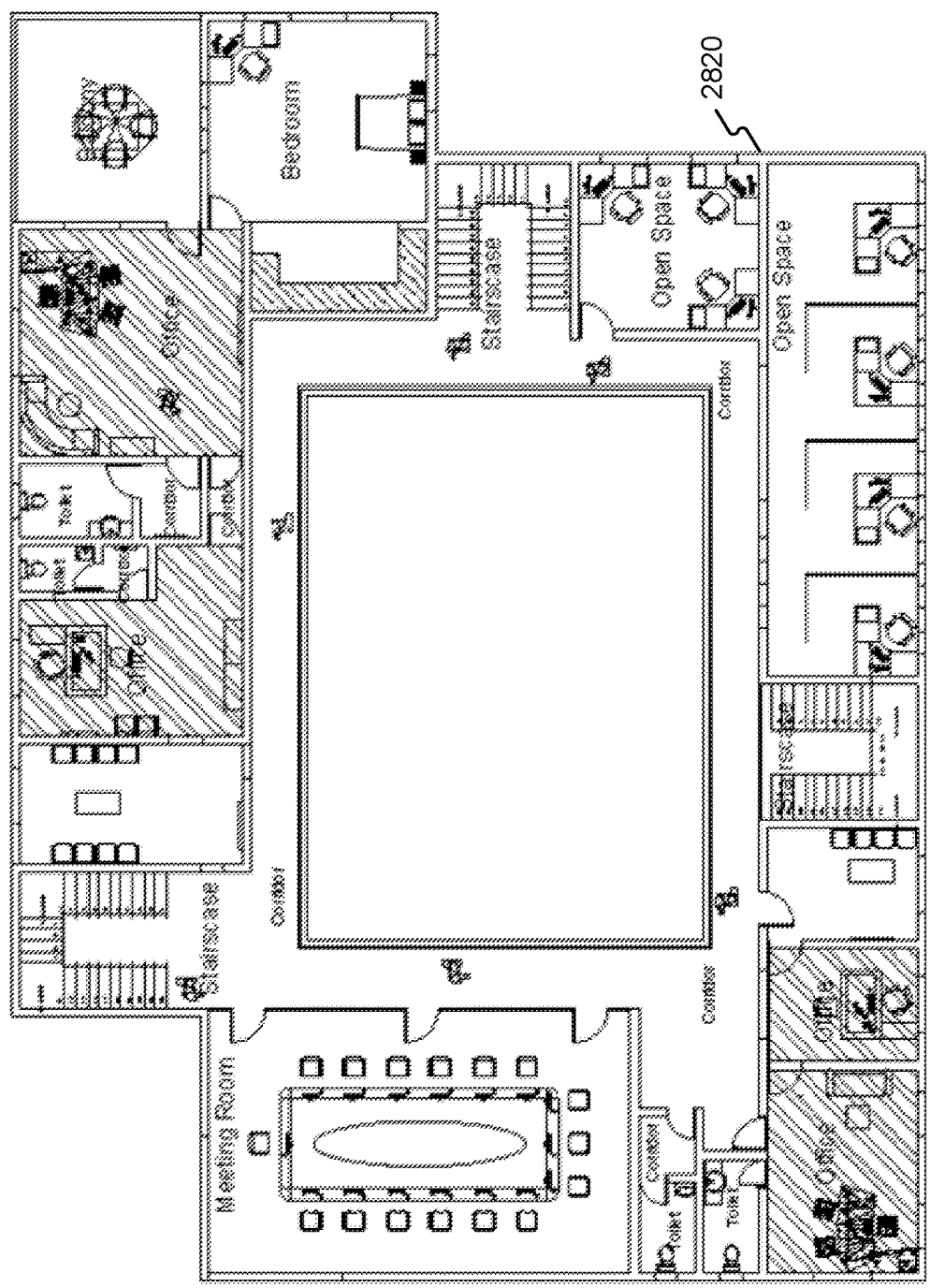
FIG. 28F illustrates an example floor plan with offices highlighted, consistent with disclosed embodiments.

By way of example, FIG. 28D illustrates an example search function 2830 that may be performed on floor plan 2800 to search for spaces having a semantic designation of "office". For example, a user may interact with floor plan 2800 through a graphical user interface, which may include a button, drop-down list, or other control allowing a user to search for offices. As shown in FIG. 28E, index 2820 may be searched to identify any rooms associated with a semantic designation including the term "Office." By searching an index instead of directly searching floor plans, disclosed embodiment improve search speed and efficiency. As described above, offices identified in a search may be colorized or otherwise highlighted on a display of the floor plan. FIG. 28F illustrates an example floor plan with offices highlighted, consistent with the disclosed embodiments. For example, as shown, chairman's office discussed above may be highlighted using a diagonal shading pattern overlaid on floor plan 2820. By identifying spaces based on a search, embodiments may enable a user to apply a functional requirement to search results (e.g., to apply requirements to highlighted offices). For example, the user may apply a functional requirement for a lighting level of 500 lux and occupancy sensor coverage for each of the highlighted office spaces.

Figure 28G:
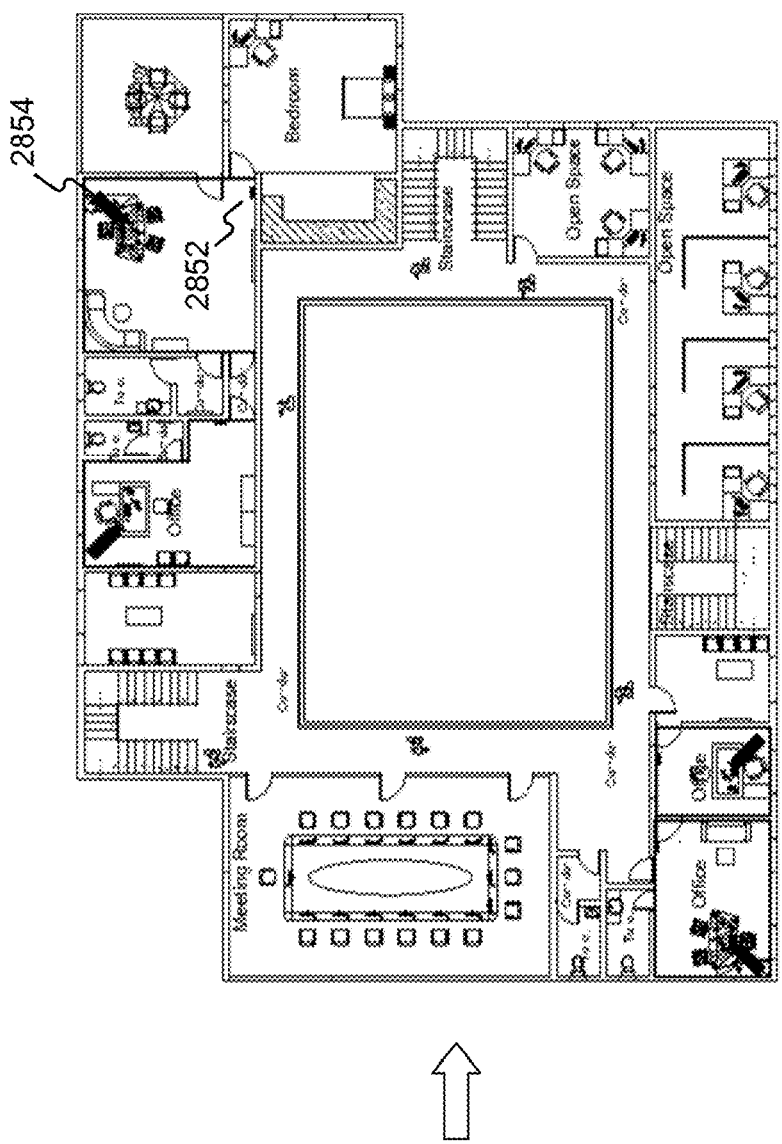
FIG. 28G illustrates an example process for automatically generating an actionable index, consistent with disclosed embodiments.

FIG. 28G illustrates another example action that may be performed on floor plan 2800 using index 2820, consistent with the disclosed embodiments. As described above, a user may select a group of rooms including all offices within floor plan 2800. The user may then perform an action of placing equipment within the offices. As shown in FIG. 28G, a user may be presented a list 2850 of items to be placed in each room designated as an office. List 2850 may be a checklist, as shown in FIG. 28G, or any other form of user control, such as a drop-down menu, a series of buttons, a catalog of available equipment items, or various other control features. List 2850 may include a list of all available equipment, a list of equipment commonly associated with the selected rooms, a list of items defined by a technical specification associated with the rooms, a list of recent equipment items, or any other suitable category of equipment. As shown, a user may select a camera model YY and a thermostat model XZ for placement into the offices. Accordingly, the system may place thermostat 2852 and camera 2854 in the chairman's office. This may be performed using a generative analysis, or any other processes described throughout the present disclosure.

FIG. 28H illustrates another example action that may be performed based on index 2820, consistent with the disclosed embodiments. In this example, a user may apply an action 2860, which may apply a technical specification to all lights within floor plan 2800. For example, the technical specification may define a model LYX1 to be used for all equipment with a semantic designation matching the term "light," as shown. Index 2820 may be updated to include model number LYX1, as illustrated by the updated index in FIG. 28I. The various examples described throughout are provided for illustrative purposes and should not be construed to limit the present disclosure. Various other example actions may be performed, consistent with the embodiments disclosed herein.

FIG. 28J illustrates another example action that may be performed based on index 2820. In this example, a rule 2870 may be defined, which may require electrical floor boxes having a model "xx" to be placed in the center of all conference tables. For example, this may be an outlet box allowing laptops or other devices to be connected to a power source during a meeting. Rule 2870 may also define a requirement that the electrical floor boxes must be connected to an electrical distribution panel DB-X1A. Rule 2870 may be performed as part of an automated process that applies rule 2710 (and perhaps additional rules) to one or more floor plans. In other embodiments, rule 2870 may be applied manually. For example, a user may select rule 2870 for application to floor plan 2800. To apply rule 2872, a search function 2872 may be performed. As shown in FIG. 28J, search function 2872 may search index 2820 for room that have furniture with a semantic designation matching "conference table." In some embodiments, search function 2872 may be performed automatically as part of application of rule 2870. In other embodiments, search function 2812 may be a manual function. For example, a user may manually search index for rooms including a conference table and may apply the rule to those rooms. Search function 2872 may result in a match for a room named "BOARD Room" and having a room number 9.

Figure 28K:
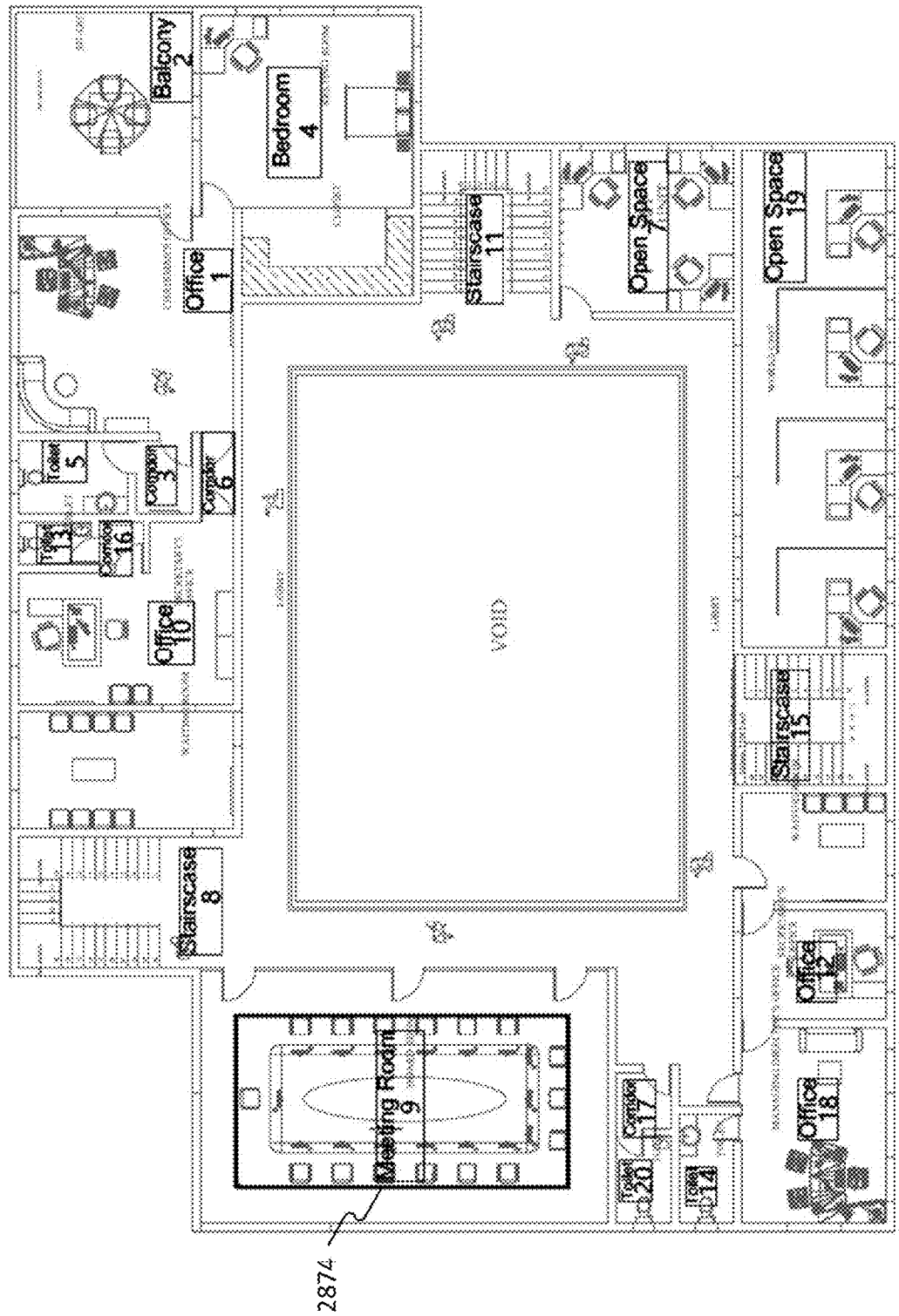
FIG. 28K illustrates an updated floor plan indicating rooms with conference tables following the action performed in the prior figure, consistent with disclosed embodiments.
Figure 28L:
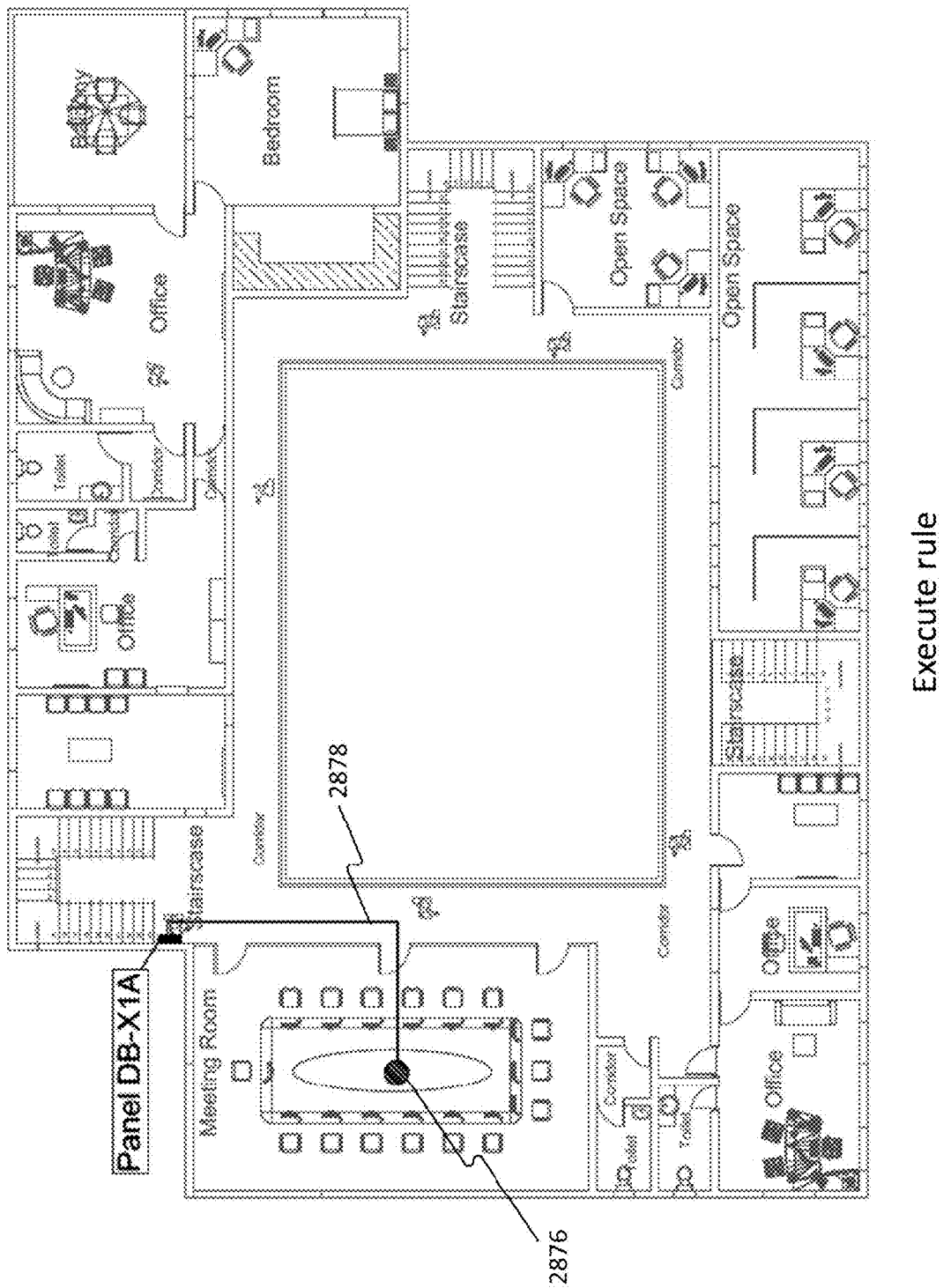
FIG. 28L illustrates an updated floor plan after the action in FIG. 28J has been performed, consistent with disclosed embodiments.

FIG. 28K illustrates an updated floor plan indicating rooms with conference tables following the action performed in the prior figure, consistent with disclosed embodiments. As shown in FIG. 28K, the meeting room identified through search function 2872 may be highlighted. This may include generating a box around conference table 2874, as shown. The meeting room may also be highlighted by color, shading, patterns, a border, or various other highlights, as described above. Rule 2870 may then be applied to the selected room. FIG. 28L illustrates an updated floor plan after rule 2870 has been performed, consistent with disclosed embodiments. This may include placing electrical floor box 2876 (having a model "xx") in the center of conference table 2874, as shown. The system may also generate a wiring diagram showing an electrical connection 2878 from electrical floor box 2876 to Panel DB-X1A, as shown in FIG. 28L.

Embodiments of the present disclosure may further include outputting the index. This may include any means of providing or making the index available. In some embodiments, this may include transmitting the index set electronically. This may include transmitting the index via email, through a secure connection, uploading the data to a network location (e.g., a cloud storage platform, a project Sharepoint™ site, a shared network folder, or other forms of remote server locations), or any other means for transmitting data electronically. The transmission may be to a manufacturer, to a third party (e.g., a construction contractor, a project manager, an engineering or architectural firm, or any other entity that may be involved in design, planning, or installation associated with the equipment. In some embodiments, the index may be exported to a third party application or software program. For example, the index may be exported in a format accessible by particular software program, including a CAD software package, BIM software package or tool, an ERM or CRM system, a construction planning tool, or any other form of software that may process, store, or use information included in the index.

FIG. 29 is a flowchart illustrating an example process 2900 for analysis, segmentation, and indexing of architectural renderings, consistent with disclosed embodiments. Process 2900 may be performed by a processing device, such as any of the processors described throughout the present disclosure. In some embodiments, a non-transitory computer readable medium may contain instructions that when executed by a processor cause the processor to perform process 2900. Process 2900 is not necessarily limited to the steps shown in FIG. 29 and any steps or processes of the various embodiments described throughout the present disclosure may also be included in process 2900.

At step 2902, process 2900 may include accessing a floor plan demarcating a plurality of rooms. As described above, the floor plan may include any graphic representation of an interior of a building, an exterior of a building, or both. In some embodiments, the demarcations may not be included in the floor plan and step 2902 may further include determining the demarcations through machine learning methods, semantic analysis, or geometric analysis, as described above. In some embodiments, the floor plan may demarcate a plurality of zones in addition to or instead of the demarcations for the plurality of rooms. At step 2904, process 2900 may include accessing architectural feature data associated with the plurality of rooms. The architectural feature data may include geometric data, furniture, or other types of architectural features, as described above. As previously discussed, if the architectural features are already fully provided in the accessed floor plan, accessing architectural features may be part of the same step as accessing a floor plan.

At step 2906, process 2900 may include using the architectural feature data to perform a semantic enrichment process on the plurality of rooms in order to determine semantic designations for the plurality of rooms. The semantic designations may be based on industry, international, and/or user-definable standards, as described above. In some embodiments, step 2906 may further include generating a confidence level for the semantic designations, as described in greater detail above. Step 2906 may further include determining semantic designations for architectural features, which may be used, at least in part, to determine the semantic designations for the plurality of rooms.

At step 2908, process 2900 may include associating, on the floor plan, the semantic designations with the plurality of rooms. For example, the semantic designations may be overlaid as labels on the floor plan, similar to the semantic designations shown in FIG. 28B. At step 2910, process 2900 may include associating, in an index, the semantic designations with plurality of rooms. For example, the index may include a table or other data structure linking the determined semantic designations with corresponding room names or other room identifiers.

At step 2912, process 2900 may include updating the floor plan by using the index to enable an action to be applied to a group of rooms sharing a common semantic designation. In some embodiments, this may include coloring or otherwise highlighting rooms sharing a common semantic designation according to a legend. The action may include applying a functional requirement to the group of rooms as described above. For example, the functional requirement may contain at least one of a candela intensity, lux level, a decibel sound level, a Speech Transmission Index level, wireless signal strength, a pixel density level, door access control, a BTU level, or an energy consumption level, as described above. In some embodiments, process 2900 may further include other steps such as outputting the index, as discussed above.

Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. A processor a component of a local computer, a mobile device, a server, a server cluster, a cloud-based platform, or any other computing environment. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. Processors may be coupled electrically, magnetically, optically, acoustically, mechanically or by other means that permit them to interact.

Embodiments may involve using microservices. In this context, a microservice may include any application built to operate in an ecosystem of that includes interconnected packages and platforms (i.e., a microservice ecosystem). Microservices may include containerized applications hosted in a cloud-based platform (e.g, KUBERNETES by AMAZON) and may be written in PYTHON, JavaScript/TypeScript, and C++, or other suitable programming languages. Microservices may communicate with each other via both synchronous schemes (e.g., using an HTTP request and response scheme) and asynchronous messaging schemes. In the present context, microservices may be configured to manage (e.g., read, write, delete, or perform other data operations) a single resource. A microservice may be unable, by design, to access or even be made aware of other resources directly. By implementing structural design systems and methods using microservices, disclosed embodiments that use microservices provide technical improvements over conventional approaches. These improvements include enhanced security, stability, and scalability as compare to conventional systems that are not containerized, which do not operate in an ecosystem, or which may be vulnerable to discovery by malware or others.

In greater detail, containerization can include partitioning instances of an operating system into isolated instances of itself. Containerization processes may include spinning up such instances to perform a task, and terminating instances upon completion of the task, for example. An operating system may include LINUX, UNIX, WINDOWS, or other suitable architectures. Partitioning may be achieved using operating-system-level computer virtualization (e.g., running a virtual instance of a computer within another computer) technique, where an operating system is partitioned into multiple, isolated, instances of itself. Each partition may behave as an independent, isolated operating system. This approach provides advantages in scalability by shortening processing times by dedicating computational resources as needs arise. Containerization can also improve security by destroying data internal to an instance after the instance is terminated. As an example, microservices may be implemented using KUBERNETES, a container-orchestration software, that may be responsible for deploying and managing containerized applications; load balancing, scaling, security, notifications, reporting, user interfacing API servers, or otherwise managing jobs. Embodiments may include using other suitable containerization platforms (e.g., AMAZON LAMBDA, MICROSOFT AZURE, or other virtual private services).

Microservices may communicate via an HTTP request and response scheme, which may include sending, by one client, an HTTP request to another client, who sends an HTTP response directly. Such communication between two clients may be maintained during processing of the request to enable the response to be sent as a direct response to the sent request. Alternatively or additionally, microservices may communicate using asynchronous messaging in which a client may send a message without maintaining communication receiving an immediate or direct response. Asynchronized communication may be managed by a suitable message queue broker (e.g., SIMPLE QUEUE SERVICE (SQS) by AMAZON). Further, microservices may be subscribed to dedicated features or topic message queues (e.g., queues that are dedicated for sending requests to perform operations within a system). In some example workflows when messages are sent to queues, microservices may receive these messages (e.g., via a message broker component) and perform relevant operations as instructed in the messages. In some cases, microservices may send a message to a mirroring response queue.

In the embodiments, data may be structured using a variety of schema to encapsulate building and equipment information. For example, embodiments may include using BEAMUP definition (BMD) statements. BMD statements may include a compressed JavaScript Object Notation (JSON) object (e.g., compressed via GZIP) containing hierarchical buildings information. More generally, a JSON object or other data structure may be constructed in a way that represents the hierarchy of one or of multiple buildings. Information stored in objects may contain metadata, architectural feature data (e.g., information specifying room geometry, doors, windows, furniture, equipment), or advanced/processed geometry/metrics/information about each element (buildings, levels, and rooms). As a non-limiting example, a structure of an object may be specified according to the following statements:

```
Site
guid
-[buildings]
   guid
   -[levels]
      guid, name, elevation
      -[rooms]
         guid, number, longname, plan, comments,
         beamupRoomType, internal, height, area, minZ,
         maxZ, wallLength, outside, polygonComplexity,
         department, tags, extraInfo
         -[boundarySegments]
            line
         -[boundaryPoints]
            point
         -[doors]
            guid, name, midpoint, pointonclosestsegment
            -[boundaryPoints]
         windows
            -[guid]
         -[elements]
            guid, family, category, name, area, volume,
            minZ, maxZ, material, system, type,
            mechanical, identityData, beamupFurNumber,
            beamupFurType, -[boundaryPoints]
         -[obstacles]
            element
         connectedRooms
            -[guid]
         adjacentRooms
            -[guid]
```

Figure 30:
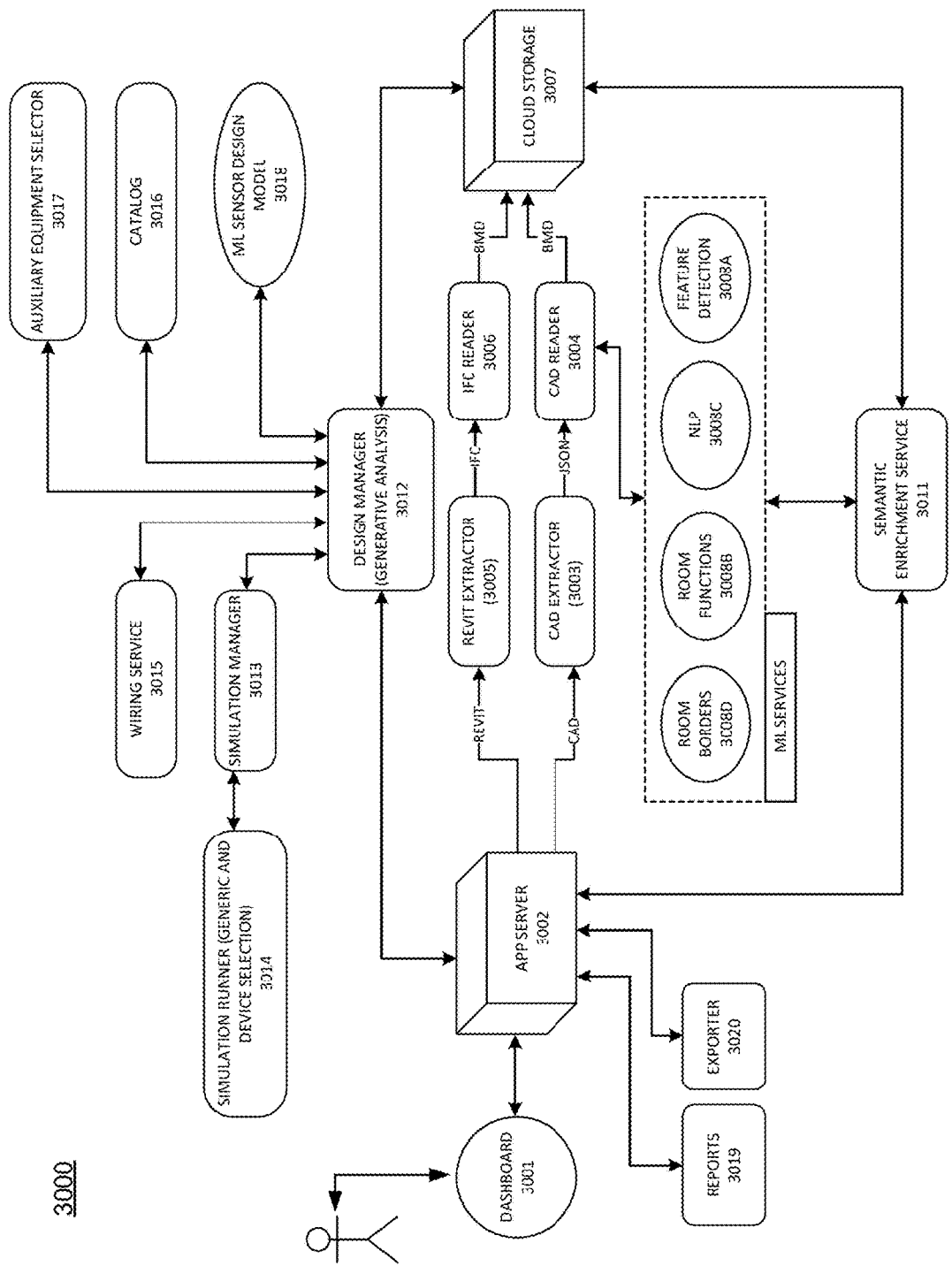
FIG. 30 illustrates an exemplary system architecture for using modeling and simulation to select equipment, consistent with disclosed embodiments.

By way of example, FIG. 30 depicts an exemplary system architecture 3000 consistent with disclosed embodiments. Components of architecture 3000 are shown for purposes of illustration only, and embodiments may include additional components not depicted, fewer components, and different arrangements of components than the example architecture of FIG. 30.

Dashboard 3001 may include an interface enabling a user to access a system performing the disclosed methods. In greater detail, dashboard 3001 may include a library of scripts or programs to facilitate user interaction, such as REACTJS or other JavaScript user interface library. The library may include VUEJS, ANGULARJS, KNOCKOUT, POLYMER, RIOT, or library to manage a web-based user interface. Dashboard 30001 may be stored in event-driven media (e.g., AMAZON S3 buckets), and fetched by client browsers based on triggers (e.g., following a user-log in to a microservice). More generally, a user may log in via a web user interface and perform various actions that propagate to microservices where inter-system operations are invoked (e.g., generative analysis to select equipment), and then reflected back to the user.

Dashboard 3001, among other functions, may facilitate a visualization of geometry of floor plans and other drawings in 3D and 2D views. It may also be used to convey user instructions to microservices to perform analysis (e.g., generative analysis) and receive results generated by microservices executing system simulation algorithms and machine learning models per the requirements and geometry. In other examples, dashboard 3001 may enable a user to upload a drawing, apply a functional requirement to a visualized floor plan, or perform other operations.

As shown, architecture 3000 may include app server 3002, which may group microservices for managing primitive resources of the system (e.g., via CRUD operations). For example, app server 3002 may provide services for associated primitive resources such as user services to store and manage users account data (e.g., in a MONGODB collection), such as documents and information associated with users (e.g., email, name, organization, login credentials, projects associated with a user, or other user profile data). App server 3002 may provide project service to store and manage project data (e.g., in a MONGODB collection), such as documents and information associated with projects (e.g., a project name, user profile data associated with a project, design data, or other project data). In addition, app server 3002 may also include a drawing service. In this context, a drawing service may manage drawing resources for creating, accessing or updating floor plans, for example. A drawing service may include documents containing information about drawing files, (e.g., associated user data, file name, metadata describing a drawing, a drawing type, or location in storage). Further, the drawings service may include S3 folders that contain drawing files in a raw, binary form. App server 3002 may include still other services, such as an "enums service" for managing variables used by different services in architecture 3000, or it may include a catalogs service to manage a catalog resource. The catalog resource may contain data related to equipment (e.g., sensors, sensor accessories, wiring, or other devices) associated with various manufacturers (e.g., as received in a catalog or other product listing). Aspects of app server 3002 may be stored in S3 buckets, databases, or other suitable storage media.

Architecture 3000 may include components configured to access (e.g., receive or retrieve) technical specifications. For example, CAD Extractor 3003 may be a microservice responsible for receiving requests (e.g., via SQS) for translating binary CAD drawings (e.g., in DWG format) into a human readable JSON object, an XML format, or a YAML format, or any other suitable object. Upon instantiation, CAD extractor 3003 may subscribe to a dedicated SQS message queue, where request messages for CAD translations are received. Such requests may contain relevant information for retrieval of an original files (e.g., an S3 folder location, a file name), as well as the information of where to upload the translated JSON upon translation (S3 folder location and file name). In some cases, CAD extractor service 3003 may host a container image of a third party executable program that is able to translate or otherwise convert file formats (e.g., convert DWG to JSON). Upon successful translation using the aforementioned executable, for example, the service may upload a translated JSON to a designated S3 folder path, and it may further send a message with the request fields to a mirroring CAD translation response queue, signifying that the translation is complete.

As shown in FIG. 30 by way of example, embodiments may include a CAD reader 3004. Generally, a CAD reader may include a microservice that is responsible for identifying rooms in CAD drawings, as well as creation of a file (e.g., a BMD file) that represents extracted rooms in a floor plan context. A CAD Reader may include algorithms and models for performing analysis to identify room contours. For example, A CAD Rader may include algorithms for performing geometric analysis, semantic analysis, and/or machine learning, as described herein. Upon instantiation, a CAD Reader may subscribe to a dedicated SQS message queue, where request messages for CAD rooms identification are received. Such requests may contain relevant information for retrieval of the a file representing a drawing (e.g., a JSON file representing the DWG binary). A request may further include information to retrieve a drawing as translated by CAD Extractor 3003 (e.g., a request may S3 folder location and file name), and information of where to upload the translated BMD upon translation (S3 folder location and file name). After receiving a request message, a CAD reader service may fetch a representation of a CAD drawing (e.g., retrieve a JSON object from an S3 location), and execute an algorithm to processes unstructured vectoral CAD data in the JSON. The algorithm may recognize rooms via heuristic or ML algorithms, in some cases. As a non-limiting example, a CAD reader may execute some or all of the following operations in various combinations and orders:

Fetch a CAD JSON translation file from S3.

Load a JSON file to memory.

Recursively traverse a JSON object while dereferencing CAD blocks and populating a flat data structure containing the vectorial elements within the blocks.

Filter CAD layers that may contain (a) irrelevant geometry such as furniture, (b) layers that do not contain wall candidates as per statistical analysis, (c) layers whose metadata (particularly names) signify they do not consist of walls. For example, rooms may include walls represented by line segments within certain proximity to one another, and which may be parallel to each other, and layers that do not include such lines may be filtered out.

Identify doors using a geometric analysis algorithm which searches for approximately 90 deg arcs and lines which come close to wall end points and have roughly the same size. To identify doors, a CAD reader may request a machine learning inference (e.g. RetiNet model trained to identify doors) via an HTTP request to a microservice. After doors are recognized, the CAD reader may identify sills doors, which can be used to close gaps that doors create in room perimeters. Sills may be recognized via geometric analysis based on the proximity of the potential sills to the surrounding walls.

Identify windows by looking for aggregations of parallel lines of roughly the size and direction enclosed within blocks which has a high length/width ratio. Identifying such windows may enable the closing gaps in room perimeters, for example.

Identify walls in the different types of post-filter geometry by, for example, filtering out inappropriate geometry based on line length and selecting candidates pairs of lines which are parallel, have at least some overlap, and whose distance relative to each other does not exceed a threshold distance.

Identify additional wall candidates using a machine learning room segmentation model (e.g. Mask RCNN trained to segment walls) by sending an HTTP request (e.g., a request may transmit an image in JPEG format as payload) to a dedicated microservice that hosts a deep learning model for room segmentation.

Process identified wall candidates and create bounding boxes from each wall candidate.

Filter out bounding boxes based on heuristics: bounding boxes that may have sizes below a threshold (too small) or which may be located within recognized doors or windows are presumably not walls, and may be filtered out in some cases.

Join wall bounding boxes into polygons that can define rooms in a CAD floor plan.

Determine which architectural features(doors, windows, furniture) may belong in different rooms Create an object by, for example generating a BMD statement that populates a JSON-like Python dictionary with the aforementioned rooms polygons geometry and generating a globally unique identifier (GUID) per each room Upload an object to storage (e.g., to a designated S3 folder path location), and send an SQS message to the mirroring response queue with request fields that indicate a CAD JSON was processed and the BMD was successfully created.

As shown in FIG. 30, embodiments may include a Revit extractor 3005, which may use geometric analysis, semantic analysis, topological analysis, and/or machine learning methods (e.g. BIM analysis) to identify room contours, fix modeling errors in a BIM file and/or to render the BIM model suitable for computational processes such as generative analysis. Revit extractor 3005 may enrich a Revit™ file and export it to a light (IFC4 Design Transfer View V1.0) enriched IFC file, including export of images per level (floor) of the model. Revit extractor 3005 may run as a plugin inside Revit™ using Autodesk Forge™ (but can also run locally using a standard Revit™ plugin). In some embodiments, a Revit™ file may also be exported to an IFC file by using other methods such as the Open Design Alliance (ODA) IFC SDK. In some embodiments, BIM analysis may be performed on Revit™ without exporting to IFC file format and a BMD may be created directly from a Revit™ file. In some embodiments, a generative analysis process may be performed directly on a Revit™ file without export or conversion to another file format. In some embodiments, Revit extractor 3005 may involve a preprocessing step. For example, a Revit IFC export function may export some or all of the spaces and rooms of a model as IFCSPACE entities in IFC schema. In order to ensure the model contains all the spaces and rooms with the relevant information, preprocessing may be performed to ensure all the walls and columns will be room bounding making every space and room bound to them (which will correct any spaces and rooms the user made not bounding to room, offsetting from the actual space location). As a non-limiting example, preprocessing may include using FilteredElementCollector to collect all the walls and columns in the model; for instantiated elements within the collector, using LookupParameter ("Room Bounding") to assign a true value, and for family instances, casting the element to FamilyInstance and use the LookupParameter ("Room Bounding") to assign a true value. This function may ensure all possible spaces and rooms within a model exist and also prioritize any spaces made by the user (e.g., the model maker) if they exist.

In some embodiments, Revit extractor 3005 may automatically designate spaces, for example, by creating rooms for all closed circuits. Plan circuits are enclosed regions as seen on a plan view, they are used to determine the boundary extents of rooms based on the placement of walls. As a non-limiting example, this may include using FilteredElementCollector to collect all the levels in the model; get document current phase; for each level within the collector, get the level topology using get_PlanTpology (level, phase). For each topology, Revit extractor 3005 may get the all the possible circuits. For each circuit, Revit extractor 3005 may check if there is already a room assigned to the circuit using circuit.IsRoomLocated. Revit extractor 3005 may assign a new room to the circuit, if necessary, using document.Create,NewRoom (null, circuit) and may give the room a name and a serial number.

Revit extractor 3005 may then export the Revit to an IFC file. This may include using predetermined settings to guarantee all necessary data is in place while file size is kept to a minimum.

In some embodiments, the IFC file may be exported to IFC reader 3006, as shown. IFC reader 3006 may use IFCopenshell to parse and read IFC files and manipulate their geometry using the open cascade (OCC) geometry library. The data structure used by IFC reader 3006 may be a list to hold all the rooms (the attributes listed at the end) and a site object to hold information about the site extracted from the IFC file.

In some embodiments, IFC reader 3006 may perform an initialization step. For example, IFCopenshell may require bounding rep data and curves to include all the geometry needed for the disclosed embodiments. The IFCSite may be used to build the spatial structure of a building. Accordingly, IFC reader 3006 may load ifcopenshell settings, read the IFC file and extract the ifcsite geometry, and save the site direction.

IFC reader 3006 may further be configured to parse IFC rooms. Because Revit™ exports all rooms and spaces as IfcSpace, there may be duplications and overlapping of spaces. IFC reader 3006 may read all the spaces, create their geometry, and attempt to fix errors and extract the necessary information. The geometry extracted may be of type TopoDS Shape and can include compounds, solids, edges, faces, shells, vertices and wires. IFC entities might include part or all of the above geometry and further processing may be needed to extract and simplify the wanted geometry. To manipulate and iterate over the geometry the service may use OCC Topology explorer to navigate through the Shape and extract the edges of the shape. As a non-limiting example, IFC reader 3006 may execute a parsing algorithm including some or all of the following operations in various combinations and orders:

For each edge extracted, get its type.
Determine the line type.
If the edge is a line, extract its vertices, create a segment using the edges points, and the and add it to the list of segments.
If the edge is a curve type (Circles, Arcs, Ellipse) segment the edge. This may include getting the curve length; determining the split size and intervals; for each piece of segmenting i trim the curve so that every part is a line (e.g., Starting point: Curve starting point+interval*I/ End point: Curve starting point+interval*(i+1); and adding the line to the list of segments.
The list of segments may contain segments of length 0 so any segment containing equal first point and last point will be filtered out and converted into BMD segment
Filter duplicate segments and calculate the room height using segments maximum elevation (Z attribute) and minimum elevation.
Create boundary points list from the segments, using only segments with minimum elevation (to create the room polyline) and remove duplicate points.
Extract the spaces immediate data (guid, name, plan name).
Extract the space bounding data attribute from the space.
Extract Contained Elements inside the space.

IFC reader 3006 may further be configured to Get bounded elements. bounded elements can be physical elements such as doors, windows, columns; or virtual elements like separation lines, model lines, or other elements. Bounded elements can be virtual or non-virtual. In some embodiments, IFC reader 3006 may connect doors to segments. This may include connecting all doors to their closest room segment (wall). For each door IFC reader 3006 may check which segment in the room is the closest to it using the midpoint of the door and a vector to it from each segment of the room. The door attributes may be updated with the closest point on the closest segment and the segment itself.

IFC reader 3006 may further be configured to Get internal elements. This may include extracting the elements and their data and assigning them to the room they reside in. As a non-limiting example, IFC reader 3006 may execute some or all of the following operations in various combinations and orders:

Filter based on category. For example, this may include extracting all the elements of type 'IfcFurniture', 'IfcSystemFurnitureElement', 'IfcFlowTerminal', 'IfcStairs'.
Extract element data and geometry: For each of the elements extracted, derive the bounding box coordinates from the comments. Specifically look for these fields: Family, Category, Area, Volume, System, Type, Material, Identity Data, beamup_fur_number, beamup_fur_type, beamup_fur_category.
Assign element to room. For example, an element may be assigned to the room if the room boundaries contain the element center point (in 2D); the minimum elevation of the element is greater than the room minimum elevation; or the distance from the bottom of the room is smaller than the distance to the top of the room.

In some embodiments, IFC reader 3006 may further perform topological analysis to create a connectivity list. A connectivity list in a room may refer to a GUID list of all rooms that have a shared door/opening to the current room. The connectivity list may be crucial in understanding the topology of the plan. Creating the connectivity list may include building a door map containing all doors and their corresponding rooms; for every room within the door map corresponding to the room, adding the GUID of the other rooms to its connectivity list; and based on the door map finding doors that do not map to more than one room and assign them as 'outside' doors. An outside door may be defined as a door that leads to only 1 room.

Based on one or more of the steps above performed by IFC Reader 3006, the site hierarchy may be complete and may be ready to be written to a new file, according to the BMD format.

Architecture 3000 may include various storage devices or mediums. For example, architecture 3000 may include cloud storage 3007. Cloud storage 3007 may be any form of cloud-based storage platform or server, as described throughout the disclosed embodiments. Clouds storage 3007 may include data that is stored in persistent data stores (e.g. relational database, non-relational databases, object stores). Resources may hold information in clear text (such as JSON objects, simple text files, XML files), binary data (such as pictures, videos, executables), or may be entries in databases. Example cloud storage may include, for example, a NoSQL document oriented database, such as, MongoDB™, or a hierarchical/directories based object (general purpose binary data) store, such as Amazon™ S3. This may include the use of an external provider (e.g., MongoDB Atlas™ or similar providers) for managing cloud storage 3007.

Architecture 3000 may include various machine learning services for performing various operations, as referred to throughout the present disclosure. In some embodiments, this may include feature detection microservice 3008A. Feature detection microservice 3008A may be a dedicated microservice for furniture/door detection and classification that receives images, and outputs detected furniture in the images. Feature detection microservice 3008A may host a deep learning model based on RetinaNet that accepts inferring requests via HTTP requests containing the images in bitmap format. The model may be trained, for example, using a large set of floor plans, with bounding boxes of the different features drawn on them and catalogued in a CSV file. Feature detection microservice 3008A may execute the model with the image of the floor plan which was generated by plotting the geometry, and return an HTTP response containing the predicted furniture in CSV format, where each row consisting of a inferred furniture and equipment label (e.g. "chair," "light switch"), the geometry of the bounding box surrounding the furniture and/or equipment, and a confidence rating (from 0 to 1).

In some embodiments, this may include room function microservice 3008B. The function of a room in an architectural plan (i.e. living room, office etc.) often holds important information for many decisions regarding its design. An office, for example, will have a completely different sensor array than a bedroom. An automatic design system may be configured to infer a room's function from its name, geometry, and features in order to implement automatic decisions. Room function microservice 3008B may be a service that hosts an XGBoost classifier model for inferring room function (office, bedroom, etc.) from its features. Room function microservice 3008B may request via HTTP messages consisting of the model's architectural features (room properties such as area, perimeter length, number of doors, adjacent rooms, connected rooms, and number of occurrences of each furniture type within the room). The model may attempt to classify room functions based on the aforementioned features, e.g. a small room with a sink and a toilet should be inferred as a bathroom. As an illustrative example, the model may be trained on a dataset of over 10,000 rooms and their features.

In some embodiments, the machine learning services may include natural language processing (NLP) microservice 3008C. This may include the use of a natural language processing model to identify aspects of the floor plan or any elements included therein. For example, NPL microservice 3008C may determine the name of a room or an object. However, in many cases the name is given without reference to any accepted standard or definition (an office might be labeled, "office" or "Ben's Room" or "Bureau" (french) "Officina" (spanish) or just "off. 21". Natural Language Processing (NLP) is a machine learning model used for inferring semantic meaning from text. It may be used for inferring a standardized meaning from room, furniture and/ or equipment metadata text (such as name and description). Thus, "Sink 120×70 White/Gray" may be inferred as "Sink", "chez Lounge" as "sofa" and "boy's room" as "toilet". NPL microservice 3008C may be built using a word2vec library spacey which turns words into n-dimensional vectors and measures the distances between these vectors. NPL microservice 3008C may be trained by constructing catalogs of texts which signify the same thing as the required designation (for example, the catalog of words signifying toilet include: WC, loo, mens room, gents, womens, 00, etc.). A distance method may then applied between an input word and all the words from the different categories, and the category exhibiting the shortest average distance from the input is chosen, with a confidence rating reflecting that distance. Heuristics may further improve precision by identifying exact sequences of phrases used in the catalog and overriding the word2vec results.

The machine learning services may also include room borders microservice 3008D, which may be configured to identify room borders and wall candidates by using a machine learning room segmentation model. The model may be run by sending an HTTP request (with the image in JPEG format as payload) to a dedicated microservice that hosts a deep learning model for room segmentation. Room borders microservice 3008D may use a UNET+attention architecture to segment walls and rooms from an image. The model may be trained using a dataset of hundreds of floor plans with rooms walls marked on them as polylines and stored in the COCO JSON format. Room borders microservice 3008D may return the wall and room prediction in the same JSON format.

In some embodiments, architecture 3000 may include a semantic enrichment service 3011. This service may be an orchestrator of other services making up the entire flow of enriching an image PDF, CAD, BIM file, or derived BMD file with room functions and/or classifying furniture and equipment according to semantic designations. Other example services provided by semantic enrichment service 3011 may include furniture and equipment classification, room function classification service, and or NLP modeling for inferring meaning from text. Upon instantiation, semantic enrichment service 3011 may subscribe to a dedicated SQS RVT derived BMD enrichment request queue. When a message is sent to the aforementioned request queue, semantic enrichment service 3011 may receive it via SQS' message broker. The request message may contain all of the resources and information required to execute the enrichment flow. This may include the S3 folder path to the BMD file; the S3 folder path to the floor plans pictures of the accessed floor plan (image, CAD, PDF or BIM file), as previously generated as part of the image or CAD or PDF or RVT to BMD translation flow; and/or the S3 folder path to a JSON file, consisting of the properties of the floor plans picture, such as the relative dimensions of the floor plans. This information may be used to associate BMD geometry with the floor plan pictures.

As a non-limiting example, semantic enrichment may include some or all of the following operations in various combinations and orders:

Floor plan pictures are sent for feature detection and classification.
  Machine learning generated CSV furniture bounding boxes are associated and matched with BMD furniture and equipment based on IOU (intersection over union).
  The BMD is traversed for furniture and equipment metadata and geometry. The furniture is being extracted into groups, based on the metadata of the furniture (name, description, etc). Each group's metadata is called for NLP inferring be inferred as "Toilet", and also receive a higher confidence rating.
  Furniture and equipment type is elected by comparing NLP confidence rating with deep learning confidence rating. And assembled into a set of features for each room.
  A service hosting the room function model is called via an HTTP request consisting of all the assembled features.
  The BMD is enriched with the inferred room functions (each room object in the BMD is populated with an additional "function" field, where values are strings such as "Bathroom", "Kitchen", "Corridor", etc.) and identified furniture and equipment semantic designations/labels.

Semantic enrichment service 3011 may update the BMD in S3 (by reuploading the BMD to its original S3 folder path location), and sends an SQS message to the CAD enrichment response queue. The message indicates the operation is complete, and contains all the request's fields as well.

In some embodiments, architecture 3000 may include a design manager 3012. Design manager 3012 may be responsible for receiving input from the user and then generating optimal device locations, types and generic characteristics. Design manager 3012 may be responsible for performing various generative analysis methods, as described throughout the present disclosure. For example, design manager 3012 may choose the correct model of equipment (e.g., a sensor) from a catalog. Design manager 3012 may generate a wiring diagram and choose secondary equipment. The result of the process may be displayed to the user on the screen and exported in several file formats. The flow of information within design manager 3012 may be complex. As an illustrative example, design manager 3012 may perform one or more of the following steps:

Add requirements and constraints to a room using dashboard 3001.
Send a simulation request to simulation manager 3013 (described below).
Fetch rooms geometric data from a cloud storage, such as AMAZON S3.
Aggregate all requirements within the rooms context, by their space-filter.
If a requirement specified subset of devices, fetch them from the catalog and constant a generic device range.
Generate room generic simulation request and send it to simulation-runner 3014 microservice as an SQS message.
Consume a room simulation request via the relevant queue.
Preprocess the request, if necessary, to split the request to several requests and run in parallel or in series.
Construct a simulation from each request.
Optimize (Generic simulation) using simulation runner 3014 or a machine learning model 3018.
Store the result in Redis™, and send status to the response que.
In simulation manager 3013, wait for all simulations to finish.
From each result extract the parameters of every generic result-device, fetch all items in the catalog subset and choose the closest devices to results devices, send the new request to simulation-runner 3014, for example, via SQS message.
Preprocess and construct a specific simulation.
Optimize (see simulation runner 3014 and catalog 16).
Store the result in Redis™, and send status to the response que.
Wait for all simulations to finish, post-process the results.
Send a request to wiring service 3015, for example, via SQS message.
Send a request to auxiliary equipment selector 3017, for example, via SQS message.
Store the final results in cloud storage 3007 and display them to the user using dashboard 3001.

The generative analysis may start with a user setting requirements for a room and saving them in a cloud storage such as AWS S3. Requirements might contain goals such as a functional requirement applicable to the whole room or specific Areas of Interest (AOI) (such as requirements for pixel density, sound level, signal coverage etc.). The requirements may further include specific areas or areas of exclusion/disinterest (which a device must not cover). In some embodiments, the requirements may define constraints such as areas on non-placement (e.g., stored as a dictionary containing the requirement type and a list of boundary points on which it applies); areas/paths/points of preferred placement of predefined devices (e.g., stored as a dictionary containing information of the requirement type, the geometry it applies on, and a list of device filters describing the subset of catalog items that should be placed); and/or preferred devices, which may be listed as specific catalog items, such as branch, series, or manufacturer of catalog, or any combination of them. In some embodiments, the requirements may define certain angles, such as an angle span or a direct angle from which an Area of Interest (AOI) should be covered. Angle span may be stored as a dictionary containing the start angle in radians and the angle span size. For example, the angle span may be stored as:

Angles=[
{
"startAngle": 2.357,
"angleSize": 1.571
},
{
"startAngle": 0.0,
"angleSize": 0.707
}
]

In some embodiments, the requirements may contain a space filter entry, which may be a string or dictionary including guides/index of the BMD element that the requirement is applied on. In the case of specific area within this BMD element, the space filter entry may include additional geometry data that describes the sub region (e.g., boundary points/polyline's points/single point coordinates). An example key value dictionary space-filter may include:

{
"building":0,
"level":"fb40ace0-e5e6-11ea-a508-53f05618a1bb",
"room":"33bb7230-e5e7-11ea-9ec2-0b6dff2c6e54"
}

An example string space-filter may include:
"{\"building\":0,\"level\":\"fb40ace0-e5e6-11ea-a508-53f05618a1bb\",\"room\":\"33bb7230-e5e7-11ea-9ec2-0b6dff2c6e54\"}"

As shown in FIG. 30, architecture 3000 may further include a simulation manager 3013. Simulation manager 3013 may be a microservice responsible for receiving generation requests for a system via HTTP from design manager 3012 and to initiate a simulation process. Once a generation request is received, simulation manager 3013 may fetch all requirements from a data structure and aggregate them per space; dispatch jobs for runner-services via SQS message; and collect the results and store them in cloud storage 3007. Simulation manager 3013 may also communicate with other services such as catalog-service 3016 to collect data regarding catalog items that should propagate into the simulations.

In order to map optimization parameters to device parameters more efficiently, in some cases, simulation manager 3013 may associate certain devices with specific requirements. For example, if a simulation of four devices is requested and the room contains two AOI requirements, it may be beneficial to target at least one device per AOI and to limit its search space in such a way that increases the convergence changes of the optimization.

When a simulation generation request is received, the relevant requirements and the geometric description of the room may be fetched from the cloud storage 3007. Simulation manager 3013 may pre-process them if necessary. A request pre-process could contain some of, any combination of, or none of the following sub-processes:

- Selection of simulation sampling method, and calculation of simulation resolution as number of sampling points, if applicable.
- Based on different types of goals and requirements, and if multi objective—scalar optimization is used—weights calculation of different optimization objectives such as objective's coefficient and power, and some additional argument if applicable.
- Optimizer constraints setting—based on the relevant requirement, some of the optimization parameters that are responsible for device's position, resolution, rotation or other parameters could be constrained or removed. Constraints may be pairs of an array in the following shape:
  lower bound: [α1, α2, α3 . . . αn]
  upper bound: [β1, β2, β3 . . . βn]
  Where:
  n: number of optimization parameters $\alpha i \leq \beta i \forall i \in n$ After the request has been pre-processed, if necessary, it can be split into two or more simulations that differ by the number of requested devices and some additional parameters. From this stage the requests might be processed in parallel (by dispatching each request as a separate job on a cloud instance) or in series. Requests may be sent to a dedicated microservice as a SQS message.

In some embodiments, one of the requirements may specify more than one device. In such instances simulation manager 3013 may conduct a generic simulation. The problem of selecting a specific device from a given set of catalog items, is combinatorial by its nature. As such, it may multiply the processing time of an optimization because for each combination of devices, a separate simulation may be conducted. In order to avoid running numerous simulations just for model selection, the concept of a generic simulation may be introduced. The goal of a generic simulation is to select the devices from the requested sub-group that are more likely to produce optimal results. The generic simulation process may include some or all of the following sub-process:

Device range calculation: Simulation manager 3013 fetches the sub-set of items from the catalog DB (mongoDB or equivalent) according to device filters on the requirement, and calculates the effective range of some parameters such as but not constraints to resolution, vertical angle, horizontal rotation, catalog frequency, and cost. Once a device range is set, simulation manager 3013 may simulate the device as a generic device that can get any value in the properties selected ranges. For example, a sensor simulation requirement which specifies the three following devices:
  Device 1: {megapixels: 6, hfov: 24, vfov: 18}
  Device 2: {megapixels: 4, hfov: 100, vfov: 75}
  Device 3: {megapixels: 5, hfov: 60, vfov: 45}
would produce the following device range:
  "device_range": {
  "megapixels": {"min": 4, "max": 6},
  "hfov": {"min": 24, "max": 100},
  "vfov": {"min": 18, "max": 75}
  }.

Therefore, this selected device will be able to get all the values in those ranges during an iteration (cycle) of optimization.

New request construction: A new request will be constructed and sent as an SQS message to simulation manager 3013 to conduct an optimization.

After receiving a message that the generic optimization is complete (or once the equipment location is predetermined by the user), the simulation manager 3013 may generate a specific simulation. The specific simulation may be generated by one or more of the following subprocesses:

- Device Selection: From a generic simulation result the algorithm selects the closest device in the sub-set. The algorithm might score each device in the subset by the relevant field or conduct another optimization in order to select the best match. In the case of multiple close device scores, one or more preferences may be applied to select an item. For example, a less costly item might be preferred.
- New request construction: After selecting the closest devices in the sub-set, a new request is constructed, with the properties of the selected devices. If applicable, some of the optimization parameters responsible for the selected parameters might be constrained or removed to improve runtime.
- A new request is constructed and sent to simulation manager 3013 as an SQS message.
- Optimization is performed.
- Returning results: The specific simulation result will be stored temporarily in a in memory data structure such as Redis™, which may send an SQS message back to the microservice that originated the request that the job is done.

If a simulation request was split to several requests, a post processing might be conducted after all results are calculated. In some embodiments, the post processing may include removal of redundant results. For example, if in a group of result, a result with a redundant device (device which its effect on the score is marginal) that result might be removed. Post processing may also include removal of inefficient results. Given some threshold, two results may have similar scores but the one more expensive/the one with more devices may be removed. For example, where
  r': tested result
  S(r): result's score
  D(r): number of devices in a result
r' will be removed if ∃r∈R≠r', where S(r')≤S(r) ∨ D(r')>D(r).

In some embodiments, post processing may further include results ranking. For example, according to an overall score (fitness) efficiency, the remaining results in the group may be ranked. The most efficient results may be presented first to the user. For example, for a given margin, M, r1 may be ranked higher than r2 if S(r1)≥S(r2)−M ∨ D(r')<D(r).

After post-process, results may be saved into cloud storage 3007 (e.g., in Amazon™ S3 or equivalent) in a key-value dictionary, such as a JSON file. The results may later be accessed by each client (e.g., through dashboard 3001) that has access and would like to query the results. In some embodiments, the group of room's results can be scrolled by the user. In this stage, a result modification may also be possible. This may include manually changing certain device parameters by a user, such as, height, resolution, focal length, rotations, location, or any other similar parameters. Modifications may also include changing a device model to another model existing in the catalog or adding or removing a specific device. Various other modifications are described throughout the present disclosure. Based on a modification, simulation manager 3013 may extract the requested new device parameters from cloud storage 3007 or a local storage, fetch the request that originated the result, modify it with the new parameters, and run a new simulation of a single cycle. This single-cycle simulation request may be sent, for example, directly through an HTTP request to the runner service. In this example, the results may be stored locally at the client storage, and cloud service 3007 may be updated only on a specific save operation.

Architecture 3000 may include a simulation runner 3014, as shown in FIG. 30. Simulation runner 3014 may be a microservice responsible for receiving requests (via SQS) for a device placement simulation. Simulation runner 3014 may, for example, receive the request, preprocess it if necessary, run the optimization, post-process the result and send it back to the result que. Optimization may take place, for example, in an algorithm, which may receive various inputs, including the number of parameters to optimize, the type of the optimization (minimize/maximize), and a forwarded function that takes the given parameters as an input and yields a scalar (fitness/score). In some cases, the optimizer may receive additional parameters such as stopping conditions or an initial state. GALAPAGOS is an example optimization solver that may be used. CMA-ES is another example of an optimization that may be used, which combines an evolutionary strategy with statistical learning. Machine learning based algorithms, such as RBFOpt, may be used. The optimization solver may differ depending on the task and nature of the optimization. For different systems, other solvers and algorithms might be more suitable. An example case that may require a different solver is the placement of smoke detectors. The smoke detectors may need to be positioned exactly X meters apart from each other and may need to be spaced to fill the room geometry. This may be accomplished by using a relaxation-based sphere packing algorithm with a slightly decreased offset to achieve overlap and complete coverage.

Various optimization objectives may be used for the optimization process. Optimization objectives may refer to a set of functions with optimized values. Example optimization objectives may include a coverage score (i.e. the percentage of a room which is covered in the desired functional requirement), a gross coverage score (i.e. the percentage of a room which is covered but not necessarily in the functional requirement), an AOI score (i.e. the percentage of the AOIs being covered), and/or a placement score (i.e. based on the percentage of devices). In some embodiments, an optimization objective may include a proximity penalty. For example, where n is a number of devices, T is a minimum allowed threshold distance between two devices, and Dij is a distance from device i to device j, a penalty may be defined by the equation:

$$\text{Penalty} = \Pi ij \left(1 - \frac{Dij}{T}\right) \text{for every } i, j \in n, \text{ where } Dij < T$$

In some embodiments, such as for CCTV, VSS, or other systems, an optimization objective may include pixel density describing the number of pixels per meter (or similar metric). Some standards use pixel density to construct different functional requirements. In some embodiments, this may include a range of pixel density categories, such as "monitor" (25 pixels/m), "detect" (50 pixels/m), "observe" (125 pixels/m), "recognize" (250 pixels/m), "identify" (500 pixels/m), "inspect" (2000 pixels/m), or other categories.

In some embodiments, an optimization objective may include meeting a functional range. A functional range may be the measurement in which the specific device is functioning above the requested requirement. In a sensor system, such as CCTV or VSS system, the functional range may be the distance from a camera to the target in which an object could be seen in the desired pixel density (see Pixel density). For example, given a pixel density, Dp, a vertical resolution Rv, and a vertical field of view Av (in radians), a functional range (R) can be calculated in the following way:

$$\text{for fisheye lens}: R = \frac{Rv}{Av * Dp}$$

$$\text{for rectilinear lens}: R = \frac{Rv}{2(Dp * \tan(Av/2))}$$

For example, a camera with fisheye lens and vertical fov=3.14r, vertical resolution=2048 pixels, and functional requirement of "recognize" may have a functional range=2.6 m. Similarly, a camera with a rectilinear lens having a vertical fov=1.51r, a vertical resolution=2048 pixels, and a functional requirement of "recognize" may have a functional range=4.79 m. These values are provided by way of example, and various other camera properties or functional range equations may be used.

According to some embodiments, architecture 3000 may include a wiring service 3015. Wiring service 3015 may be used to provide wiring path solutions for a given BMD level and a list of devices. The service may generate a wiring path for some or all of the devices (which may represent a starting point) to a given headend (which may represent a destination point). In some embodiments, the process performed by wiring service 3015 may be divided into two parts: a grid creation and path calculation for a given list of starting points and an endpoint.

The grid creation may include, for each level in the BMD, creating a grid (nodes and edges) and associating each grid to the level GUID and uploading it to be used later by the second part of the service. The grid creation may include a room planes calculation. For each room, this may include vectorizing the room segments and creating unit vectors. Wiring service 3015 may then remove duplicate vectors and add the remaining to a list. Next, wiring service 3015 may calculate and save the amount of repeating vectors for any direction (parallel and orthogonal included). Wiring service 3015 may then sort the results by size and decide on the 'winner' vector (e.g., based on the highest amount of other parallel vectors). Finally, the room planes calculation may include creating a plane using the 'winner' as the X axis.

In some embodiments, the grid creation may include plane rotation and aggregation. For example, wiring service 3015 may rotate all planes so that every plane which is similar but flipped (X and Y axes in one plane are Y and X axes in another plane) will be the same. The function may aggregate similar planes into groups so each group will represent a different plane, and filter each group to contain only one plane, resulting in unique planes.

The grid creation may include room grouping and perimeter determination. For example, wiring service 3015 may aggregate all rooms with the same plane and create a perimeter for the entire level by offsetting each of the rooms outwards, merging their boundaries and offsetting the result inwards, creating a single polygon that represents the perimeter of the rooms. The grid creation phase may further merge similar rooms. For each group of rooms of the same plane, wiring service 3015 offset their polygons outwards and merge the polygons, creating a polygon for each of the aggregated rooms with similar planes.

In some embodiments, the grid creation may include grid population. For each of the joined rooms' polygons, wiring service 3015 may create nodes (grid points) parallel to the plane of the polygon. Wiring service 3015 may filter nodes that are outside of the polygon. Wiring service 3015 may then perform a triangulation technique, such as a Delaunay triangulation to create triangles from three grid points in such a way that for any given triangle there is no other point inside the circumcircle of the triangle. The algorithm may also be configured to make the smallest triangles possible. The result of the algorithm may represent the possible paths from each point to any point on the grid and the triangles may represent the edges of the grid.

The grid creation phase may then include converting the triangles to quads. For example, wiring service 3015 may try to merge every two triangles that share the same longest edge. For every two triangles, if they share an edge and the edge is the biggest in both triangles, wiring service 3015 may create a quad from the four edges that are not shared. Wiring service 3015 may leave any remaining triangle and add them to the result. Wiring service 3015 may the perform a quad filtering, in which the remaining triangles are filtered out using the perimeter polygon the wiring service 3015 created previously.

Wiring service 3015 may then populate the grid. For example, using the results from the previous step, wiring service 3015 may create a grid using the networkx library. Nodes and edges may be created for every point and line. Every node in the grid may contain information about its position and its neighbors, and every edge may hold information to be used to calculate wiring paths including distance from closest wall and containing room functions.

As noted above, after the grid creation phase, wiring service 2015 may perform a path calculation phase. For home run wiring (described in greater detail above), after the grid is laid out, a modified Dijkstra algorithm may be used to calculate the shortest path between each of the devices to the head end (e.g., a control panel, etc.). In some embodiments, the Dijkstra algorithm may be modified in various ways. For example, the algorithm may be modified to take into account the distance from walls (e.g., preferring paths that pass a certain distance from walls), take into account the function of the room (e.g., preferring corridors and public spaces), and attempt to achieve straight paths by applying a turn penalty. In cases where several head ends are present in the floor plan, the algorithm may run once for each head end and then may choose the head end closest to the device. For shortest path wiring, the process may be similar, but may use a different algorithm, such as a v-opt algorithm, as the starting point.

In some embodiments, architecture 3000 may include a catalog 3016. Catalog 3016 may be a data structure (such as a table in MongoDB) containing multiple items and their relevant properties. Those properties can be queried by different services in the ecosystem. Catalog 3016 may be used in several places in the generative analysis process. Some items of catalog 3016 may contain necessary data for a simulation to be constructed. For example, in a sensor system, some of the relevant information may be related to megapixels, resolution, hfov, vfov, cost (msrp), architecture (fisheye/rectilinear/other), or other relevant information. An example catalog item entry may include:

{"_id":{"$oid":"5efd8682ccc797002ef5ef02"},"device-Type":"lens","features":{"focal Length":"5-10 mm", "angle":"39-89°","colorLens":false, "B&W":true, "LPF":false,"the rmal":false, "microphone":true, "colour":"white","EANCode":4.43432803055+12,"cu stomCode":"90021900"},"manufacturer":"TBDH", "msrp":299,"shortDescription":"6 MP 6,5-9 mm (Night), White","longDescription":"Sensor module TBDH (focal length 1.5-10 mm, f/1.6-2.3, 39°-89° x)29°-65°)·6 Megapixel (night)·Max. image size: 6MP (3072×2048)·IP66, −35 to 65° C./−22 to 140° F. (only with vandal cover), white","series":"/","name":"vss-max-20344","sku":"vss-max-20344-24009","_v":0}

In some embodiments, a simulation requirement may contain a specific request for a subset of catalog items. This sub-set may be represented as an array of filters, each one being a key-value dictionary containing information of the selected branch in the catalog tree. A branch may be a whole manufacturer, a series, or a single device. In some embodiments, a device filter may be a manufacturer filter, which may specify an entire manufacturer. For example, for a Manufacturer X, the filter may include {name: "manufacturerX/outdoor", manufacturer: "manufacturerX"}. In some embodiments, the device filter may be a series filter. For example, a series filter specifying an "outdoor" series for Manufacturer X may include {name: "manufacturerX/outdoor", manufacturer:" "manufacturerX", series: "/outdoor"}. Similarly, a device filter may be a single device filter. For example a single device filter may specify an A-model-lens036 model in "outdoor" series by {name: "manufacturerX/outdoor/a-model/a-model-lens-088", id: "5eaec595f5c9605f389f12f5"}

Architecture 3000 may include auxiliary equipment selector 3017, which may be a dedicated service for determining the type and amount of accessory equipment necessary to complete a system design. In some implementations, auxiliary equipment selector 3017 may receive an HTTP request for auxiliary equipment calculation. A request may specify an identifier of primary equipment and other variables, including user input or constraints that may be used to select auxiliary equipment. Given the ID of the system and the other relevant type of resources, for example, the service may dispatch HTTP requests to the services that are responsible for managing the resource, (e.g. for the video results containing camera information) such as service sending, for example, an HTTP request to the video simulations manager. In some embodiments, an association between auxiliary and primary equipment may stored. In other embodiments, no association may be stored as the scope of the auxiliary calculation may a single report (e.g. calculating one at the time of generating a bill of material). The actual resources that are required (alongside the aforementioned variables and constraints) for auxiliary calculation may be stored in S3 or in MongoDB, on a per resource basis. Auxiliary equipment selector 3017 may select equipment through a cascading process of satisfying successive requirements (e.g., as depicted in greater detail in FIG. 20B).

Figure 20B:
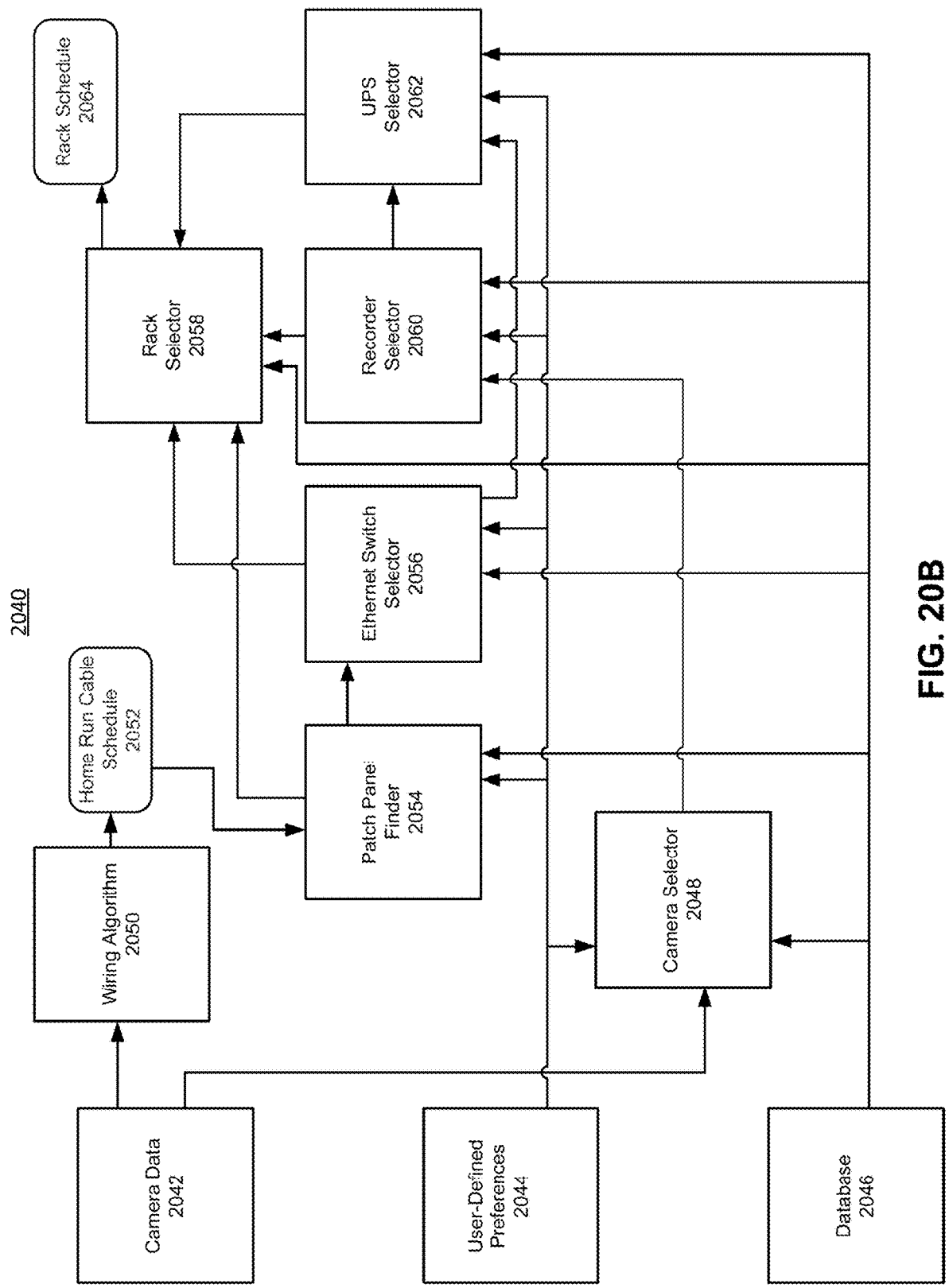
FIG. 20B illustrates an exemplary process for using generative analysis to select primary equipment and auxiliary equipment, consistent with disclosed embodiments.

For example, when designing a video surveillance system (VSS), once a number of cameras have been determined and their corresponding wiring diagrams generated, additional auxiliary equipment may need to be selected. Such accessories to the VSS may include a patch panel, an ethernet switch, a UPS, and an equipment rack. In this example, auxiliary equipment selector 3017 may implement some or all of following sub-processes in various orders as depicted in FIG. 20B:

A wiring algorithm 2050 may generate homerun schedule 2052 using camera data 2042, which may include technical specifications of cameras (e.g., focal length) and respective equipment placement location data of the cameras. Camera data 2042 may pass candidate or generic camera information to wiring algorithm 2050, rather than selected cameras, and wiring algorithm 2050 may use that information to generate home run cable schedule 2052. Alternatively or additionally, camera data 2042 may include camera data associated with cameras selected for a floor plan, which may be used by wiring algorithm 2050. More generally, to generate home run schedule 2052, wiring algorithm 2050 may implement any process for generating a wiring diagram as disclosed herein. Home run schedule may specify specific a number of cables (e.g., power or communication cables) traveling between cameras and a patch panel, for example, and it may depict such cable paths in a 2D floor plan.

Camera selector 2048 may select a camera using any of the methods for selecting and placing equipment disclosed herein. The selection may be based on information received from camera data 2042 and database 2046 including, for example, technical specifications, floor plan data, or other information suitable for selecting primary equipment. In some examples, camera selector 2048 may filter database 2046 according to technical specifications or user preferences 2044, and choose a model camera based on functional requirements. Additionally or alternatively, cameras may be chosen based on cost.

A patch panel may be selected by finding a panel that meets system requirements (e.g., a minimum number of inputs and desired redundancy level) at minimum costs. Patch panel finder may consider information stored in database 2046, such as compatibility rules, device classification data relating to candidate patch panels or technical specification data of candidate patch panels. For example, patch panel finder 2054 may receive home run schedule 2052 and identify a patch panel from among candidate patch panels. Patch panel finder 2054 may be an algorithm of auxiliary equipment selector 3017. In some cases, patch panel finder 2054 may choose a panel that satisfies a minimum number of incoming cables and a desired level of redundancy. A desired redundancy may be received from user-defined preferences 2044, for example, while the minimum number of cables may be determined according to homerun schedule 2052. Generally, patch panel finder may implement a combination of calculations using compatibility rules or machine learning models to select patch panels.

An ethernet switch may be selected according to a number of incoming cables and desired level of redundancy. As shown by way of example in FIG. 20B, an ethernet switch selector 2056 may select an ethernet switch from among candidate switches whose technical specifications may be stored in database 2046. Ethernet switch selector 2054 may be an algorithm of auxiliary equipment selector 3017. In some examples, ethernet switch selector 2054 may receive input from patch panel finder 2054 regarding a selected panel (e.g., a number of cables), input from database 2046 (e.g., candidate ethernet switch data, equipment classification data and technical specifications of primary equipment in a floor plan), input from camera selector 2048 (e.g., selected camera identifiers or technical specifications), and input from user-defined preferences 2044 (e.g., a desired level of redundancy). Accordingly, ethernet switch selector 2056 may consider the various inputs and select the switch which best satisfies functional requirements from among candidate switches. Generally, ethernet switch selector may implement a combination of calculations using compatibility rules or machine learning models to select ethernet switches.

As shown by way of example in FIG. 20B, recorder selector 2060 may select a recorder configured to store image or video output of selected cameras (e.g., a disc, drive, cloud storage location, server storage location, or any other storage media) from among candidate recorders whose technical specifications may be stored in database 2046. Recorder selector 2060 may be an algorithm of auxiliary equipment selector 3017. In some examples, recorder selector 2060 may receive input from database 2046 (e.g., candidate recorder data, equipment classification data and technical specifications of primary equipment in a floor plan), input from camera selector 2048 (e.g., selected camera identifiers or technical specifications), and input from user-defined preferences 2044 (e.g., a desired level of redundancy). Accordingly, recorder selector 2060 may consider the various inputs and select the recorder which best satisfies functional requirements from among candidate recorders. As an example, a recorder may be selected based on a storage requirement for storing video for multiple cameras over a time period (e.g., 200 Mb multiplied by a number of cameras and a number of days), a number of incoming cables and desired level of redundancy, and cost. Generally, recorder selector 2060 may implement a combination of calculations using compatibility rules or machine learning models to select recorders.

UPS selector 2062 may select a UPS from among candidate UPS devices whose technical specifications may be stored in database 2046. UPS selector 2062 may be an algorithm of auxiliary equipment selector 3017. In some examples, UPS selector 2062 may receive input from database 2046 (e.g., candidate UPS data, equipment classification data and technical specifications of primary equipment in a floor plan), input from camera selector 2048 (e.g., selected camera identifiers or technical specifications), input from user-defined preferences 2044 (e.g., a desired level of redundancy), input from ethernet switch selector 2056 (e.g., selected ethernet switch identifiers or technical specifications, cable specifications), input from record selector 2060 (e.g., selected recorder identifiers or technical specifications). Accordingly, UPS selector 2062 may consider the various inputs and select the UPS device which best satisfies functional requirements from among candidate UPS devices. As an example, a UPS may be selected according to electrical power needs (e.g., total load in Watts). A DC-BUS may be selected based on a number of batteries at a particular voltage, and a battery needed may be selected based on a multiplying a current, by a factor, by a number of back up hours. The factor may be 1.5 for backup periods of under 2 hours, 1.3 for backup periods of over 2 hours, for example.

By way of example, rack selector 2058 may select one or more racks from among candidate racks whose technical specifications may be stored in database 2046. Rack selector 2058 may be an algorithm of auxiliary equipment selector 3017. In some examples, rack selector 2058 may receive input from database 2046 (e.g., candidate rack data, equipment classification data and technical specifications of primary equipment in a floor plan), receive input from patch panel finder 2054 regarding a selected panel (e.g., a number of cables), input from ethernet switch selector 2056 (e.g., selected ethernet switch identifiers or technical specifications, cable specifications), input from record selector 2060 (e.g., selected recorder identifiers or technical specifications). input from UPS selector 2062 (e.g., selected UPS device identifiers or technical specifications). Accordingly, Rack selector 2058 may consider the various inputs and select one or more racks which best satisfy functional requirements from among candidate racks. As an example, a rack may be selected based on depth (maximal depth of all previous devices) and calculating size of cables. Accordingly, rack selector may generate a rack schedule 2064, which may be provided to a user, stored in memory, included in a bill of materials, or otherwise outputted.

Embodiments may include a dedicated service receives an HTTP request for auxiliary equipment calculation, consisting of the ID of the relevant information as well as any other relevant variables and constraints Although the Example of FIG. 20B depicts a process for selecting particular auxiliary equipment associated with cameras, embodiments are not limited to this example. Auxiliary equipment selector 3017 may undertake similar processes to select various auxiliary equipment associated with other types of primary equipment, consistent with disclosed embodiments.

Referring again to FIG. 30, embodiments may include a machine learning (ML) sensor design module 3018. For example, for simple room geometry (e.g., rectilinear rooms having one to two doors or windows per wall), a generic device location and properties may be predicted using a CNN model with two-variable regression. As compared to using a more complex model, an approach using a two-variable regression CNN model may reduce runtime of a simulation by a factor of 10, 100, or even more. In some implementations, the CNN model may be trained on a data set containing embedded vectors which represents simulation requirements and room's geometry, and their related device locations and properties. The data may be sourced from results of the heuristic optimization process performed on a large amount of pre-generated rooms and functional requirements. In some examples, a dataset may be increased with each run of the optimization process to improve the precision of the model. An exact catalog item may be determined using a device selection simulation (e.g., a simulation of simulation manager 3013).

Embodiments may include outputting a solution. For example, app server may transmit data from a microservice of architecture 3000 to reports 3019. In some embodiments, reports 3019 is a component of dashboard 3001 (not shown). Generally, reports 3019 may include text, numeric, or graphical data in any file format that includes information representing or describing floor plans, equipment, or other aspects of a structural design. As an example, reports 3019 may include a list of material or a manufacturer dataset, as disclosed in greater detail elsewhere herein.

In addition, reports 3019 may include a report service. After a generative analysis process completes, a report service of reports 3019 may generate a report or sets of reports describing equipment needed by the system. Users may access and interact with reports 3019 using dashboard 3001 (e.g., by retrieving and displaying data from reports 3019). Further, in response to requests, reports may be generated by a report service of reports 3019. Requests may be initiated via dashboard 3001 based on user input, for example. In some cases, a report service may send an HTTP requests for relevant resources or microservices that are responsible for locating and choosing the equipment that make up the report such as design manager 3012, simulation manager 3013, simulation runner 3014, wiring service 3015, catalog 3016, auxiliary equipment selector 3017, ML sensor design model 3018, or other components of architecture 3000. These services may fetch data from storage (e.g., a MONGODB or S3), and provide the data to reports 3019.

After receiving data from services, the service processes the results and writes data to a file (e.g., a text file, an HTML file, an EXCEL spreadsheet, or any other type of files). The file may contain data regarding the equipment model, type, characteristics, properties, pricing, location, setting and quantities. Data from the file or the file itself may be returned to the user via an HTTP response sent to dashboard 3001. Dashboard 3001 may enable a user to download such data or files. In some embodiments, the data or files may be sent to a user, CRM, or ERP system via, for example, an HTTP response in case of API interfacing, or via a dedicated services/software (such as email servers in case of an email).

Disclosed embodiments may include outputting solutions by exporting designs in 2D or 3D format using elements of exporter 3020. In some cases, exporter 3020 may cause an image, CAD, or BIM object to return to a user populated with various additional information, including symbols, blocks, family instances of selected equipment, or other design elements. These elements may have placement location selected by, for example, a generative analysis. Output may contain properties of such elements (e.g., equipment type, technical specification, or other characteristics). Designs may be sent to a user via multiple mediums such as email or via dedicated API, for example. The designs may be serialized, for example, into a human readable format (such as JSON or XML), and then sent to a user, CRM, or ERP system via, for example, an HTTP response in case of API interfacing, or via a dedicated services/software (such as email servers in case of an email). Further, a design export flow may include different types of microservices, including, for example an exporter orchestrator service, an export service, and a post adaptation results service.

For example, an export orchestrator service may receive requests for design export. A request may contain an identifier of a design, systems within a design to be exported, or other information related to a design. Then, an export orchestrator may dispatch requests to a dedicated export service, which may return JSON objects. These objects may describe 2D symbols, CAD blocks REVIT objects, IFC family instances, or any other BIM objects adapted to a design.

An export flow (where a design is exported onto the originating drawing) may involve, for example, three types of microservices as follows:

An export orchestrator service (service #1) may receive requests for design exports. A request that may contain, for example, the ID of the design, and the desired systems within the design to be exported.

The export orchestrator may dispatch requests, for example, for each individual system for dedicated system export services (service #2) such as, for example, a video exporter service).

The system export service may return, for example, JSON objects that are being adapted per the originating drawing the system's geometry was simulated against.

The post adaptation results may then be sent to a service (service #3), for example, that is responsible for receiving the adapted results A post adaptation results service may receive adapted results and export them (e.g., overlay or add them) onto an original input drawing. For example, given an image input, exporting adapted results may include using a plotter which draws lines over the original. For a CAD file, exporting may involve using an Open Design Alliance (ODA) based software to add block entities to the original field. And for BIM files, an application may be used to generate family instances according to pre-programmed families of equipment, locate those families, write family information into a BIM object and associate these families with relevant entities (e.g., walls, doors, rooms, or other features of a floor plan). Further, for an IFC file, the original IFC file may be enriched with the generated designs according to the one or more of the following operations, performed in various orders. Using a function (e.g., ifcopenshell) a post adaptation results service may write new entities assigned to a correct room. To add a new geometrical element to an IFC file, the service may create corresponding entities to support the new geometrical element (geometrical data, semantic data etc). To create an element geometry, for example, post adaptation results service may execute some or all of the following operations in various combinations and orders:

Create an IfcAxis2Placement3D from Location, Axis and RefDirection.

Create an IfcLocalPlacement from Location, Axis and Direction using the previous IfcAxis2Placement3D and createIfcLocalPlacement command.

Create an IfcPolyLine from a list of points using createIfcPolyLine.

Create an IfcExtrudedAreaSolid from a list of points using the following commands: createIfcArbitraryClosedProfileDef and createIfcExtrudedAreaSolid.

Create IfcShapeRepresentation and IfcProductDefinitionShape.

Create the corresponding ifc object with all of the above information.

Assign the ifc object to the correct building storey hierarchy using: reateIfcRelContainedInSpatialStructure.

Disclosed embodiments may include any one of the following bullet-pointed features alone or in combination with one or more other bullet-pointed features, whether implemented as a method, by at least one processor, and/or stored as executable instructions on non-transitory computer-readable media:

providing a recommendation based on the determined at least one action accessing a floor plan demarcating a plurality of rooms;

receiving a first functional requirement for at least one first room of the plurality of rooms;

receiving a second functional requirement for at least one second room of the plurality of rooms;

generatively analyzing the at least one first room in conjunction with the first functional requirement to identify a first technical specification and a first equipment placement location in order to at least partially conform to the first functional requirement;

generatively analyzing the at least one second room in conjunction with the second functional requirement to identify a second technical specification and a second equipment placement location order to at least partially conform to the second functional requirement;

outputting the first technical specification and the first equipment placement location in an associative manner with the at least one first room;

outputting the second technical specification and the second equipment placement location in an associative manner with the at least one second room;

wherein generatively analyzing the at least one first room includes a series of simulations including one or more analyses of differing equipment placement locations;

wherein the first functional requirement is defined by a user;

wherein the first functional requirement is prestored in a data structure;

wherein the first functional requirement is applied by a user;

wherein generatively analyzing the at least one first room includes outputting a plurality of equipment placement location options for selection by a user;

wherein generatively analyzing the at least one first room includes displaying a plurality of technical specifications options for selection by a user;

wherein generatively analyzing the at least one first room further includes displaying a plurality of technical specifications and equipment placement location options for selection by a user;

wherein the outputted technical specification includes a model identifier;

receiving different functional requirements for the at least one first room and the at least second room;

receiving a plurality of functional requirements for the at least one first room;

receiving at least two different functional requirement types for the at least one first room;

receiving a third functional requirement for the at least one first room, the third functional requirement having a different type than the first functional requirement;

generatively analyzing the at least one first room in conjunction with the third functional requirement, the first identified technical specification, and the first equipment placement location to identify a third technical specification and a third equipment placement location in order to at least partially conform to the third functional requirement;

outputting the third technical specification and the third equipment placement location in an associative manner with the at least the first room;

wherein generatively analyzing the at least one first room further includes identifying technical specifications which are adaptive based on the geographic location of the building represented in the floor plan;

generating a programming parameter based on the first technical specification;

generating a classification tag based on the first technical specification and the first equipment placement location;

receiving a technical specification along with the functional requirement for generative analyzing the at least one first room;

outputting an accessory associated with a piece of equipment associated with the first technical specification and the first equipment placement location;

outputting a customized setting associated with a piece of equipment associated with the first technical specification and the first equipment placement location;

wherein the first technical specification and the second technical specification are different;

wherein identifying the first technical specification includes retrieving the first technical specification from a prestored data structure;
identifying obstructions in the floor plan using at least one of semantic analysis, geometric analysis, or machine learning methods;
wherein identifying the first equipment placement location is based on an identified obstruction;
wherein outputting the first technical specification with the first equipment includes displaying a coverage map spatially indicating regions covered by at least one of sensors, Bluetooth beacons, wireless emitters or transmitters, lighting emitting devices, or sound emitting devices;
wherein outputting the first technical specification with the first equipment includes displaying power consumption data for the first technical specification;
wherein outputting the first technical specification with the first equipment includes displaying connectivity data for the first technical specification;
wherein the first equipment placement location can be manually modified by a user;
wherein outputting the first technical specification with and first equipment placement location includes displaying a score evaluating the first equipment placement location;
wherein the floor plan demarcates a plurality of zones;
wherein the at least one first room comprises a first zone of the plurality of zones and the at least one second room comprises a second zone of the plurality of zones;
wherein identifying the at least one equipment specification includes a weighting of a cost function;
receiving a user input varying the weighting of the cost function;
generating a material list of equipment based on the generative analysis of the at least one first room;
receiving user input defining a preferred area for equipment placement, and identifying the first technical specification and first equipment placement location is based on the preferred area;
receiving user input defining an undesirable area for equipment placement;
wherein identifying the first technical specification and first equipment placement location is based on the undesirable area;
associating color indicators with functional requirements;
wherein functional requirements are colorized on the floor plan with respective ones of the color indicators;
access a data structure containing a list of equipment models and their associated technical specifications and identifying the first technical specification is based on the list;
exporting a floor plan to at least one of PDF, CAD or BIM format;
receiving a third functional requirement for the at least one first room;
wherein generatively analyzing the at least one first room further includes using the third functional requirement to identify the first technical specification and first equipment placement location;
generating installation tasks based on the first technical specification and the first equipment placement;
modifying the first functional requirement;
generatively analyzing the at least one first room in conjunction with the modified first functional requirement to identify a third equipment placement location in order to at least partially conform to the modified first functional requirement;
wherein receiving the floor plan includes performing a machine learning method on the floor plan to demarcate the contours of the room;
wherein receiving the floor plan includes performing at least one of a semantic analysis or a geometric analysis on the floor plan to demarcate the contours of the room;
populating a CAD and BIM format architectural file with the first equipment placement location and first technical specification;
enabling input of a functional requirement according to the contours of the at least one room without manual definition of the room contours;
receiving at least one of equipment technical specifications or architectural features of the at least first room as inputs to the generative analysis process for the at least first room;
receiving at least one of equipment technical specifications or architectural features of an at least third room as inputs to the generative analysis process for the at least first room;
receiving the location of a door in an at least third room as an input to the generative analysis process for the at least first room;
generating a single line diagram based on the first technical specification and placement location and the second technical specification and placement location;
wherein the generatively analyzing the at least one first room further includes identifying technical specifications that are adaptive based on the room function of the at least one room;
receiving a third functional requirement for the at least one first room;
generatively analyzing the at least one first room in conjunction with the third functional requirement using the first technical specification and first equipment location as an input to identify a third technical specification and a third equipment placement location to at least partially conform to the first functional requirement;
wherein the generative analysis process is performed on a cloud-based system.
accessing a floor plan demarcating at least one room;
receiving, via a graphical user interface, information marking an area within the at least one room;
wherein the marked area defines an area of interest or disinterest within the at least one room;
wherein the area of interest or disinterest covers an area less than an area of the at least one room;
accessing a functional requirement associated with the area of interest or disinterest;
accessing technical specifications associated with the functional requirement;
generatively analyzing the technical specifications to define a solution that at least partially conforms to the functional requirement;
outputting the solution;
wherein the solution includes a selection of at least one piece of equipment;
wherein the solution includes defining an equipment placement location of at least one of a sensor or a wireless emitter;
wherein the area of disinterest defines an area outside a desired sensor coverage area;
wherein the area of interest defines an area of desired sensor coverage;

wherein the area of interest defines an area for placement of a controller;
wherein the area of interest defines an area for placement of furniture;
wherein the area of interest defines an area for placement of electrical equipment.
wherein the area of interest defines an area for placement of an access control device;
wherein generatively analyzing the technical specifications to define the solution includes running a series of simulations;
receiving, via the graphical user interface, information marking a plurality of areas of interest in the at least one room;
receiving, via the graphical user interface, information marking overlapping respective areas of interest within the at least one room;
receiving, via the graphical user interface, information marking a plurality of areas of disinterest within the at least one room;
wherein the plurality of respective areas of interest or disinterest have respective different functional requirements;
wherein the plurality of respective areas of interest or disinterest have respective different functional requirement types;
receiving information defining an area of interest with a plurality of functional requirements;
applying a functional requirement to an entire area of the at least one room without user definition of the room contours in addition to the graphically marked areas of interest;
wherein accessing the floor plan demarcating the at least one room includes performing at least one of a machine learning method or semantic analysis on the floor plan to demarcate contours of the at least one room;
wherein the solution is based on a weighted cost function;
wherein a weight of the weighted cost function is based on user input;
wherein outputting the solution includes displaying a coverage map spatially indicating regions covered by at least one of sensors, wireless emitters, WiFi Access Points, lighting emitting devices or sound emitting devices;
wherein outputting the solution includes displaying a furniture layout;
wherein outputting the solution includes an equipment placement location of electrical equipment;
wherein the generative analysis receives as an input an architectural feature of the at least one room;
wherein the generative analysis receives as an input an architectural feature outside the at least one room;
wherein the generative analysis receives as an input a furniture placement within the at least one room;
wherein the generative analysis includes a topological analysis to determine a preferred door face for equipment placement;
wherein the area of interest or disinterest includes a door;
wherein marking the area of interest or disinterest includes selecting an area automatically identified using at least of one of semantic analysis, a machine learning method or geometric analysis;
wherein the area of interest or disinterest includes a desk;
wherein floor plan analysis is performed on the access floor plan to identify the room contours of the at least one demarcated room;
wherein the system is implemented on a cloud based system.
accessing a floor plan demarcating a plurality of rooms;
performing at least one of a machine learning method, semantic analysis, or geometric analysis on the floor plan to identify at least one opening associated with at least one room from the plurality of rooms;
accessing a functional requirement associated with the at least one opening;
accessing at least one rule that associates the functional requirement with the at least one opening;
using the at least one rule and the functional requirement to define at least one of an area of interest or disinterest less than an area of the at least one room;
accessing a technical specification associated with the functional requirement;
generatively analyzing the at least one room in conjunction with the technical specification and the defined area of interest or disinterest to define a solution that at least partially conforms to the functional requirement;
outputting the solution;
wherein the technical specification includes an equipment specification;
wherein the technical specification includes a model identifier;
wherein the solution includes the placement of a controller associated with the technical specification of an outputted equipment;
wherein the solution includes the technical specification of a controller associated with the technical specification of an outputted equipment;
wherein the solution includes the technical specification of an auxiliary equipment associated with the technical specification of an outputted equipment;
wherein the solution includes the technical specification of an accessory associated with the technical specification of an outputted equipment;
wherein the solution includes a wiring diagram associated with the technical specification of an outputted equipment;
wherein the solution includes a customized equipment setting;
wherein the solution includes an equipment classification;
wherein the solution includes a programming parameter;
wherein the solution includes an equipment height;
generating a bill of material based on the outputted solution;
wherein generatively analyzing comprises running a plurality of simulations;
ignoring areas of the at least one room other than the defined area of interest or disinterest;
wherein defining at least one of an area of interest or disinterest comprises defining a first area of interest and a first area of disinterest;
wherein defining at least one of an area of interest or disinterest comprises defining at least two areas of interest associated with the at least one room;
wherein the defined area of interest includes at least one of a door, corridor, window, egress, or a workplane;
wherein the defined area of disinterest includes at least one of a surrounding area of a restroom door, fire escape door, egress door, server room door, stairwell door, office door and bedroom door;
wherein the functional requirement includes image sensor coverage;
wherein the at least one rule specifies that egress points are to be included with the image sensor coverage;

identifying an egress point;
including the egress point within the defined area of interest;
wherein the functional requirement is associated with door access control;
wherein the at least one rule specifies that egress points are to be equipped with door access control;
wherein the functional requirement includes light control;
wherein the at least one rule specifies that areas adjacent to office doors are to be equipped with light controllers;
identifying an office door;
including the area adjacent to an office door within the defined area of interest;
wherein the functional requirement includes HVAC control;
wherein the at least one rule specifies that areas adjacent to office doors are to be equipped with HVAC controllers;
wherein the functional requirement includes sensor coverage for egress points;
wherein generatively analyzing the at least one room includes running a simulation in the defined area of interest that includes an egress point associated with the at least one room;
wherein the functional requirement includes sensor coverage for doors;
wherein generatively analyzing the at least one room includes topological analysis to determine a preferred door face for a sensor-covered door;
wherein the functional requirement is associated with light controllers adjacent to doors;
wherein generatively analyzing the at least one room includes topological analysis to determine a preferred door face for a lighting controller
wherein the functional requirement is associated with access control devices for doors;
wherein generatively analyzing the at least one room includes running a simulation on the defined area of interest that includes doors associated with the at least one room;
wherein the simulation includes a topological analysis to determine a preferred door face for an access control device;
wherein generatively analyzing the at least one room includes calculating a distance of the at least one opening to an architectural feature;
wherein generatively analyzing the at least one room includes calculating a distance of the at least one opening to a piece of equipment;
wherein generatively analyzing the at least one room includes analysis of available space for the outputted solution;
wherein performing at least one of a machine learning method, semantic analysis, or geometric analysis on the floor plan to identify at least one opening includes using artificial intelligence to identify the at least one opening;
wherein the solution includes a graphical indication of equipment placement on the floor plan;
wherein the solution includes a graphical indication on the floor plan of equipment directionality;
wherein accessing a functional requirement includes accessing at least two functional requirements associated with the at least one opening;
wherein accessing a functional requirement includes accessing at least two functional requirements of different types associated with the at least one opening;
wherein generatively analyzing includes using a machine learning method;
wherein identifying the at least one opening includes a combination of machine learning methods and semantic analysis;
wherein identifying the at least one opening includes using geometric analysis.
accessing a floor plan demarcating a plurality of spaces;
performing semantic enrichment on the plurality of spaces in order to determine a semantic designation for at least one space of the plurality of spaces;
enriching the floor plan by associating on the floor plan the semantic designation with the at least one space;
identifying, in a data structure, a rule that includes a functional requirement based on the semantic designation;
associating the identified rule with the at least one space;
generatively analyzing the plurality of spaces to determine an equipment placement location for individual spaces of the plurality of spaces that at least partially conforms to the functional requirement;
wherein a plurality of different functional requirements is associated with the at least one space;
wherein the semantic enrichment process considers existing semantic designations;
wherein the semantic enrichment involves an artificial intelligence method;
wherein the semantic enrichment considers architectural features of the at least one space;
wherein the semantic enrichment considers a furniture piece of the at least one space;
wherein the semantic enrichment includes topological analysis of the at least one space;
wherein the semantic enrichment includes at least one of updating or augmenting a prior semantic designation;
wherein the semantic enrichment includes adding the semantic designation where one was absent;
applying the rule in a manner that associates the functional requirement with the at least one space in a graphical representation of the floor plan;
wherein the at least one space is one of an office, a corridor, or a sleeping area;
adding the semantic designation to a zone associated with the at least one space;
wherein the zone is one of an HVAC zone, a fire zone, or an occupancy zone;
wherein one or more of the plurality of spaces lack a semantic designation;
wherein the semantic designation is applied in common to the one or more of the plurality of spaces;
wherein the rule includes at least one of an energy consumption rule, an occupancy rule, or an equipment placement rule;
wherein the rule is prestored in a database;
wherein the rule is defined by a user;
determining semantic designations of individual spaces of the plurality of spaces based on an international standard;
associating the functional requirement with a group of spaces of the plurality of spaces;
wherein the group of spaces is associated with the semantic designation;
updating an index of the plurality of spaces by associating the at least one space with the functional requirement and the semantic designation;
indicating a confidence rating for the semantic designation;

enabling a user to override the semantic designation;
wherein an existing semantic designation is overridden if a defined confidence rating threshold is met;
wherein the semantic designation identifies a room function;
providing a prompt querying acceptance or denial of an application of the function requirement to individual spaces of the plurality of spaces by a user;
semantically enriching the floor plan by associating a semantic designation with an architectural feature;
wherein the architectural feature is a piece of furniture;
wherein the accessed floor plan is at least one of a PDF or CAD file;
wherein the accessed floor plan is a BIM file;
wherein floor plan analysis is performed on the floor plan to identify contours of the plurality of demarcated spaces;
wherein the rule further includes a technical specification;
wherein the rule further includes the addition of at least one of architectural features or equipment;
wherein the semantic enrichment considers existing semantic designations in a plurality of languages;
wherein the semantic enrichment is configured to determine semantic designations in a plurality of languages;
wherein the semantic enrichment is performed on a cloud-based system;
wherein the generative analysis is performed on a cloud-based system;
semantically enriching the floor plan by associating a semantic designation with equipment;
accessing a floor plan demarcating a plurality of rooms;
accessing functional requirements associated with the plurality of rooms;
accessing technical specifications associated with the functional requirements;
performing floor plan analysis on the floor plan to ascertain room features associated with the functional requirements and technical specifications;
generatively analyzing the room features with reference to the functional requirements and the technical specifications to determine at least one customized equipment configuration for at least some of the plurality of rooms;
generating a manufacturer dataset including a room identifier, an equipment identifier, and the at least one customized equipment configuration, in a manner enabling a manufacturer to customize equipment for each of the plurality of rooms and to package the customized equipment in a manner displaying the room identifier;
wherein the manufacturer dataset further includes equipment placement location data, to thereby enable the manufacturer to package the equipment placement location data with the customized equipment;
wherein the manufacturer dataset further includes product orientation information for the manufacturer to package with the customized equipment;
wherein the manufacturer dataset further includes a room function identifier;
wherein the manufacturer dataset further includes a project identifier;
wherein the manufacturer dataset further includes a level identifier;
wherein the manufacturer data set further includes at least one programming parameter to thereby enable the manufacturer to configure the customized equipment;
wherein the generative analysis includes generating a wiring diagram;
wherein the manufacturer dataset further includes the wiring diagram;
wherein generatively analyzing includes simulating a same piece of equipment in differing locations in a room to thereby determine a preferred equipment placement location for the piece of equipment;
wherein the manufacturer dataset includes a graphical representation of the room for which equipment is intended with an indication in the graphical representation of an equipment placement location, to thereby enable the manufacturer to package the graphical representation of the room with the customized equipment;
wherein the manufacturer dataset includes a label layout containing the room identifier and a floor plan of a room associated with the room identifier;
wherein the label layout contains a graphical representation of an equipment placement location associated with the customized equipment;
wherein at least two different functional requirements are associated with the plurality of rooms, the different functional requirements being of different functional requirement types;
wherein the customized configuration includes an IP address;
wherein the operations further include outputting the manufacturer dataset;
wherein accessing the floor plan comprises accessing a CAD file;
wherein the customized configuration includes a communications protocol;
wherein the customized configuration includes a firmware type;
wherein the at least one customized equipment configuration includes both a physical equipment device setting and programming parameter;
wherein the customized equipment configuration specifies a primary equipment and at least one auxiliary equipment;
wherein the customized equipment configuration includes the aggregation of at least two different pieces of equipment;
wherein accessing the floor plan comprises accessing a BIM file;
wherein the technical specifications are adaptive based on a geographic location of a building represented in the floor plan;
wherein the accessed technical specifications are adaptive based on a room function of at least one room;
wherein the customized equipment configuration is determined based on a room function of at least one room;
wherein the generative analysis includes receiving, as an input, a technical specification for at least one piece of equipment placed on the floor plan prior to the generative analyzing process;
wherein the room features include a furniture type;
wherein generating the manufacturer dataset includes generating the room identifier based on a semantic enrichment process.
wherein the system is implemented on a cloud-based system.
receive a floor plan demarcating contours of a room
receive a selection of at least one functional requirement or equipment specification associated with the room generatively analyze the room to obtain a plurality of solutions that at least partially conform to the at least one functional requirement or equipment specification
receive a selection of a solution from the plurality of solutions, wherein the selected solution includes an equipment placement location
receive instructions to vary the equipment placement location
generatively analyze the room to update the selected solution based on the instructions to vary the equipment placement location
display the updated solution
the at least one processor is further configured to rate the plurality of solutions and to present an associated rating to a user
display includes a performance visualization
the performance visualization is automatically updated based on the instructions to vary the equipment location
the plurality of solutions includes an equipment model
receiving instructions to vary the equipment placement location includes receiving instructions to vary the equipment model
the plurality of solutions includes an equipment classification
receiving instructions to vary the equipment placement location includes receiving instructions to vary the equipment classification
the plurality of solutions includes a customized setting
receiving instructions to vary the equipment placement location includes receiving instructions to vary the customized setting
the plurality of solutions includes wiring diagrams
receiving instructions to vary the equipment placement location includes receiving instructions to vary the wiring diagrams
the at least one processor is further configured to receive instructions to vary two or more equipment parameters
the at least one functional requirement includes a desired equipment placement location
the user is enabled to vary the equipment placement location prior to performance of the generative analysis to obtain the plurality of solutions
receiving instructions to vary the equipment placement location includes receiving instructions to remove equipment.
receiving instructions to vary the equipment placement location includes receiving instructions to add equipment
receiving instructions to vary the equipment placement location includes receiving instructions to add at least one accessory
the at least one processor is further configured to enable the user to copy one piece of equipment manually modified from the updated solution
receiving instructions to vary the equipment placement location includes receiving instructions to lock a manually modified parameter associated with at least one piece of equipment
the at least one processor is further configured to enable user to apply a manually modified parameter of first piece of equipment to a second piece of equipment
generatively analyzing the room includes use of machine learning
generatively analyzing the room includes generating a series of simulations
receiving the floor plan demarcating contours of a room includes performing image processing on the floor plan to demarcate the contours of the room
the contours of a room are identified using at least one of machine learning methods, a geometric analysis, or a semantic analysis
the equipment specification is associated with a sensor
the generative analysis is performed on a cloud-based system
the solution is selected by a user
varying the location includes at modifying least one of an equipment height or an equipment orientation
accessing a floor plan demarcating a plurality of rooms
assigning functional requirements to each of the plurality of rooms
accessing at least one data structure containing technical specifications for primary equipment and auxiliary equipment, and further containing compatibility rules associating primary and auxiliary equipment
generatively analyzing the floor plan using the functional requirements and the technical specifications for the primary equipment to select and position in the floor plan primary equipment to at least partially conform to the functional requirements for each of the plurality of rooms
based on the selection and positioning of the primary equipment in the floor plan, using the compatibility rules and the technical specifications for the primary equipment and the auxiliary equipment to determine whether auxiliary equipment is required for each of the plurality of rooms and to select the auxiliary equipment to at least partially conform to the functional requirements of each of the plurality of rooms requiring auxiliary equipment
positioning the selected auxiliary equipment in the floor plan
wherein the positions of the selected auxiliary equipment are determined according to a user definable rule
receiving technical specification assignments to the plurality of rooms
receiving a plurality of functional requirement assignments to the plurality of rooms
receiving technical specifications used for the selection of auxiliary equipment
wherein the technical specifications used for the selection of auxiliary equipment are assigned by a user
permit the user to specify primary equipment locations for the generative analysis
identifying auxiliary equipment unspecified by the user
wherein assigning functional requirements to each of the plurality of rooms includes presenting an interface enabling a user to select and assign functional requirements on a room-by-room basis
permitting a user to specify primary equipment for the generative analysis
identifying auxiliary equipment unspecified by the user
receiving a request to alter the technical specification of the selected primary equipment for at least one of the plurality of rooms
updating the technical specification of the selected primary equipment for the at least one of the plurality of rooms based on the request
updating, based on the update of the selected primary equipment technical specification, the technical specification of the selected auxiliary equipment, the selected auxiliary equipment being associated with the selected primary equipment according to a compatibility rule
wherein selecting auxiliary equipment includes running calculations on network bandwidth
wherein selecting auxiliary equipment includes running calculations on voltage drop
wherein selecting auxiliary equipment includes running calculations on cable tray dimensions
wherein selecting auxiliary equipment includes running calculations on conduit dimensions
wherein selecting auxiliary equipment includes running calculations on power consumption
wherein selecting auxiliary equipment includes running calculations on ethernet switch port capacity
wherein selecting auxiliary equipment includes running calculations on uninterruptable power supply runtime, battery backup runtime, or generator runtime
wherein selecting auxiliary equipment includes running calculations on air flow
wherein selecting auxiliary equipment includes running calculations on water pressure
wherein selecting auxiliary equipment considers whether the selected primary equipment is located on at least one of walls or ceilings
wherein selecting auxiliary equipment includes calculating a number of low-current inputs and outputs of the selected primary equipment
wherein the selected auxiliary equipment includes one or more of wiring, conduits, ducts, pipes, and cable trays
generating the technical specifications of the auxiliary equipment based on the selected primary equipment and the compatibility rules
displaying a comparison of alternative auxiliary equipment technical specifications prior to selecting the auxiliary equipment
generating a bill of material based on the selected primary and auxiliary equipment
wherein the bill of material is exportable
generating at least one programming parameter for the selected primary equipment
generating at least one classification tag for the selected primary and auxiliary equipment
generating at least one customized setting for the selected auxiliary equipment
generating a wiring diagram indicating the connections between at least one piece of selected primary equipment and at least one piece of selected auxiliary equipment
selecting at least two pieces of auxiliary equipment having at least two types, respectively
wherein at least one type of the at least two types is wiring
wherein at least one type of the at least two types is a cable tray
enabling specification of a spare capacity for at least one of ports, cable fill or power capacity
wherein the spare capacity is defined by a user
generating an equipment schedule indicating the association of primary and auxiliary equipment based on the selected primary and auxiliary equipment
wherein generatively analyzing further includes providing a preference for selecting auxiliary equipment from a manufacturer product family for each of a type of auxiliary equipment
considering the selected primary equipment in a subset of the plurality of rooms and to select the auxiliary equipment based on an aggregation of primary equipment in the subset of the plurality of rooms
considering an aggregate quantity of selected primary equipment in the subset of the plurality of rooms based on the aggregation of primary equipment in the subset of the plurality of rooms and select the auxiliary equipment based on the aggregate quantity of primary equipment
wherein the compatibility rules associating primary and auxiliary equipment are pre-stored in the at least one data structure
wherein the compatibility rules associating primary and auxiliary equipment are user definable
wherein generatively analyzing further includes considering one or more locations of architectural features within each of the plurality of rooms
identifying contours demarcating rooms from the accessed floor plan by performing at least one of image processing or semantic analysis
using the location of selected primary equipment to determine whether auxiliary equipment is required for each of the plurality of rooms and to select the auxiliary equipment to at least partially conform to the functional requirement.
accessing a floor plan defining a plurality of rooms;
receiving input associating at least one of a plurality of functional requirements with at least one room of the plurality of rooms;
accessing, in a data structure, technical specifications associated with electrical equipment;
selecting, from the data structure, a plurality of the technical specifications associated with electrical equipment;
generatively analyzing the at least one room in conjunction with the functional requirement and the selected technical specifications in order to select a piece of equipment for the at least one room;
selecting an equipment placement location of the selected piece of equipment within the at least one room;
accessing structural data associated with the at least one room, the structural data including wall locations;
generating a wiring diagram for the at least one room using the selected technical specifications and the structural data;
wherein the wiring diagram includes a graphical representation on the floor plan of the equipment placement location of the selected piece of equipment and wiring runs to the selected piece of equipment;
wherein the selected piece of equipment includes a model identifier;
wherein the selected piece of equipment and wiring runs are associated with at least one of a fire safety system, a security system, an electrical system, or sensors;
wherein the selected piece of equipment is at least one of a light fixture, a power socket, or a light switch;
wherein generatively analyzing the at least one room is based on the plurality of functional requirements;
wherein the plurality of functional requirements is of different types;
generating wiring diagrams for each of the plurality of rooms;
wherein at least some of the wiring routes for the plurality of rooms aggregate along a single path;
generating wiring diagrams for a plurality of pieces of equipment of different equipment types;
wherein the wiring diagram indicates wiring homeruns using a homerun symbol;

wherein wiring diagram indicates wiring homeruns by using direct point-to-point wiring paths;
defining a wiring termination point for a selected piece of equipment located in the at least one room;
wherein the wiring termination point is in another room of the plurality of rooms;
wherein the defined wiring termination point is user defined;
wherein the generated wiring traverses from the selected equipment located in the at least one room to the termination point in the another room;
wherein there are a plurality of rooms with selected equipment;
wherein the generated wiring runs in the wiring diagram terminate at a single termination point;
wherein there are plurality of wiring terminations points on a single level;
wherein the generated wiring runs indicates a specific input/output port at the wiring termination point;
exporting data associated with the wiring diagrams including the termination points;
wherein the termination point is associated with an equipment rack or equipment enclosure;
wherein generating the wiring diagram for the at least one room is based on a user definition of a preferred wiring run;
identifying a corridor;
identifying a preferred wiring run through the corridor;
wherein generating the wiring diagram is based on the preferred wiring run;
wherein the corridor is identified using a semantic enrichment process;
calculating a total wire length of the wiring runs;
wherein the wiring diagram includes a cable tray;
calculating dimensions of the cable tray;
wherein the wiring diagram includes a conduit;
calculating dimensions of the conduit;
wherein the wiring diagram includes at least one of a conduit or a cable tray;
generating a bill of material for at least one of a selected piece of equipment, wiring run, a conduit, or a cable tray;
permitting a user to select functional requirements for the plurality of rooms;
calculating wire runs for equipment selected for the plurality of rooms;
enabling a user to change the equipment placement location of the piece of equipment;
updating the wire runs associated with the changed equipment placement location;
wherein the update occurs automatically without user intervention;
wherein the graphical representation includes a single line diagram;
wherein the structural data includes at least one of a door location, a window location, a wall location, a shaft location, or a column location;
wherein generating the wiring diagram is based on a rule to avoid exterior areas of a building for wiring runs;
outputting a technical specification of the wiring diagram based on technical specifications of the selected piece of equipment;
wherein the selected technical specifications include power consumption data;
wherein the wiring diagram conforms to the power consumption data;
automatically selecting auxiliary equipment associated with the selected piece of equipment and the generated wiring diagram;
wherein generative analysis includes a plurality of simulations to determine preferred grouping of equipment and wiring routes;
generating a report indicating the selected piece of equipment, the wiring runs, and a wiring length on a per piece of equipment basis;
receiving user input modifying a termination of the selected piece of equipment;
generating a new wiring diagram based on the modified termination;
enabling user editing of wiring runs;
enabling user editing of wiring termination points;
enabling bulk updating of wiring termination points;
wherein the wiring diagram is a first wiring diagram;
generating at least a second wiring diagram for the at least one room;
enabling a user to select a preferred diagram from among the first and at least the second wiring diagram;
enabling the user to specify a non-preferred path for wiring runs;
associating one or more wiring typologies with the equipment technical specifications;
generating wiring diagrams with a plurality wiring typologies;
generating wiring diagrams for equipment selected and located by a user;
generating wiring diagrams for equipment already placed on the accessed floor plan;
wherein the plurality of rooms is defined using floor plan analysis;
wherein the accessed floor plan is a BIM file;
wherein the generated wiring diagram traverses x, y and z coordinates;
wherein the input associating at least one of a plurality of functional requirements with at least one room of the plurality of rooms is user defined;
wherein the user input defining the association of functional requirements can be bulk applied to a plurality of rooms;
wherein at least a portion of the system is cloud-based;
accessing a 2D floor plan demarcating a plurality of rooms;
identifying, using use a machine learning method, wall boundaries of the plurality of rooms;
storing the identified wall boundaries in a retention data structure;
generating a building information model, wherein the building information model includes the identified wall boundaries;
displaying, at an interface, a comparison of at least a portion of the 2D floor plan and the building information model;
receiving, from the interface, input based on the comparison;
updating the retention data structure based on the input;
accessing a rule defining a respective height for the identified wall boundaries and updating the retention data structure based associating the identified wall boundaries with their respective wall heights and visualize the building information model in a 3D format;
using geometric analysis to identify the wall boundaries;
wherein the input received from the interface includes at least one of an instruction to delete a wall or an instruction to add a wall;

wherein the input received from the interface includes an instruction to modify of at least one of wall length or thickness;
wherein the input received from the interface includes an instruction to execute a floor plan remediation technique;
outputting the building information model;
performing at least one of saving or exporting the building information model in an industry foundation classes format;
wherein the 2D floor plan is a CAD file;
wherein the 2D floor plan is a PDF file;
wherein the 2D floor plan is an image file;
identifying rooms in the 2D floor plan
wherein identifying wall boundaries of the plurality of rooms is based on identified rooms;
identifying rooms in at least one of the 2D floor plan or the building information model based on the identified wall boundaries;
identifying at least one of a door or a window in the 2D floor plan
wherein the identifying wall boundaries of the plurality of rooms is based on at least one of the door or the window;
identifying architectural features of the 2D floor plan and storing the identified architectural features in the retention data structure;
wherein the architectural features include furniture;
associating an identified architectural feature with an object of the building information model;
wherein associating the identified architectural feature with the object of the building information model is based on a rule;
identifying equipment in the 2D floor plan located within the identified wall boundaries and store the identified equipment in the retention data structure;
associating the identified equipment with at least one object of the building information model;
wherein the associating the identified equipment with the at least one object of the building information model based on a rule;
ignoring at least one of a gridline, a dimension, or an irrelevant layer in the 2D floor plan;
calculating an area of the building information model;
wherein the comparison of at least a portion of the 2D floor plan and the building information model includes a graphical indication of the identified wall boundaries;
enabling selection of an area of the 2D floor plan;
wherein generating the building information model is based on the selection;
accessing a rule defining a scale of the 2D floor plan;
displaying a graphical representation of the building information model at the interface;
enabling pan, tilt, and zooming of the graphical representation of the building information model;
wherein the building information model is in an industry foundation classes format;
enabling the aggregation of the 2D floor plan with one or more additional 2D floor plans into the building information model;
enabling a user to select a level to visualize from among a plurality of levels contained within the building information model;
receiving functional requirements associated with the plurality rooms;
generatively analyzing the plurality of rooms in conjunction with the functionals requirement to identify at least one technical specification and at least one equipment placement location in order to at least partially conform to the functional requirement;
performing a semantic enrichment process;
adding a semantic designation to at least one room of the plurality of rooms;
identifying wall material;
wherein the system is implemented on a cloud based system accessing a floor plan demarcating a plurality of rooms;
wherein the floor plan includes a plurality of equipment symbols;
enabling a user to select an equipment symbol for analysis;
parsing the floor plan to identify instances of the selected equipment symbol;
parsing the floor plan to identify structural elements including walls;
accessing functional requirements for a set of rooms in the plurality of rooms containing the instances of the selected equipment symbols;
accessing equipment technical specifications to identify equipment technical specifications associated with the functional requirements;
performing a generative analysis on the identified equipment technical specifications within identified walls of each room in the set of rooms to select an equipment model that at least partially conforms to the functional requirements;
updating the floor plan by associating the selected equipment model with the instances of the selected equipment symbols;
outputting a bill of material based on the updated floor plan;
updating the floor plan by modifying at least one of quantity or location of an instance of selected equipment symbols in order to improve compliance with the functional requirements;
enabling a user to define a maximum allowed modification variance in at least one of a quantity or a location of the selected equipment symbols
prompting the user to accept at least one location modification of one of the instances of the selected equipment symbols;
identifying at least two equipment models for a given equipment symbol which at least partially conforms for a user's selection;
wherein the generative analysis includes selecting different equipment models for the same equipment symbol in the plurality of rooms;
wherein a plurality of equipment symbols is selected for analysis;
enabling specification of an equipment model for one of the selected instances of the equipment symbols;
wherein the generative analysis process includes at least one of optimizing a parameter of a specified equipment model or selecting auxiliary equipment;
wherein accessing the equipment technical specifications is based on user input;
wherein accessing the functional requirements is based on user input;
wherein parsing the floor plan includes at least one of a geometric analysis, a semantic analysis, or a machine learning method;
wherein parsing the floor plan to identify instances of the selected equipment symbol includes using artificial intelligence methods;

enabling a user to access a list of equipment symbols and select a plurality of equipment symbols from the list for analysis;
wherein the selected equipment symbol denotes a lighting fixture;
wherein the selected equipment symbol denotes a sensor;
selecting compatible auxiliary equipment for the selected equipment model;
wherein the generative analysis process considers a semantic designation of a room in the set of rooms;
wherein the generative analysis process considers an architectural feature of a room in the set of rooms;
wherein the architectural feature includes area;
wherein the architectural feature includes a furniture type;
generating a wiring diagram;
performing a floor plan analysis on the floor plan to identify room contours of the plurality of demarcated rooms;
wherein the equipment symbol is a building information modeling object;
wherein associating the selected equipment model with the selected equipment symbol includes associating a building information modeling object reflecting the selected equipment model with the equipment symbol;
wherein associating the building information modeling object overrides another building information modeling object previously associated with the symbol;
wherein the selected equipment symbol analysis is associated with a building information modeling object containing a first model;
wherein the generative analysis process includes determining a second model would achieve higher conformance with the functional requirement;
associating the second model with the equipment based on the determination;
displaying a prompt querying acceptance of the selected second model's association with the selected equipment symbol.
accessing a floor plan demarcating a plurality of rooms;
accessing architectural feature data associated with the plurality of rooms;
using the architectural feature data, performing a semantic enrichment process on the plurality of rooms in order to determine semantic designations for the plurality of rooms;
associating, on the floor plan, the semantic designations with the plurality of rooms;
associating, in an index, the semantic designations with the plurality of rooms;
updating the floor plan by using the index to enable an action to be applied to a group of rooms sharing a common semantic designation;
identifying contours of the plurality of rooms;
wherein the semantic designations are associated with respective room functions;
wherein the semantic designations are based on international standards;
wherein the semantic designations are based on user definable standards;
wherein updating the floor plan further includes coloring rooms sharing a common semantic designation according to a legend;
wherein the semantic enrichment process is performed before the index is generated;
wherein the semantic enrichment process is performed after the index is generated;
associating room names with the plurality of rooms in the index;
wherein the index includes the determined semantic designation and existing room names of at least one of the plurality of rooms;
associating rooms with their associated architectural features in the index;
using the index to enable the action to be applied to a group of rooms sharing common architectural features;
wherein at least one of the index is configured to be searched or the index is configured to be filtered;
wherein the index is configured to be filtered by a building level;
wherein the architectural feature data includes at least one of geometric data or furniture;
wherein the semantic enrichment process includes considering an existing room name;
wherein the semantic enrichment process includes determining a semantic designation where one was absent;
wherein the semantic enrichment process includes overriding an existing semantic designation;
wherein the override is based on a confidence threshold;
wherein the semantic enrichment process includes considering semantic designations of architectural features;
wherein the semantic enrichment process includes analysis of at least one of geometric features, architectural features, or existing room names;
determining semantic designations for at least one of furniture, equipment, or architectural features;
associating the designations with their respective rooms in the index;
identifying at least one of rooms, walls, or doors using a machine learning method;
accessing a list of equipment in the plurality of rooms;
associating, in the index, equipment from the list of the equipment with respective ones of the plurality of rooms in the index;
using the index to enable the action to be performed on rooms sharing common equipment;
wherein the action includes changing an equipment model identifier;
wherein the index contains a confidence rating for the semantic designations;
associating, on the floor plan, a confidence level for the semantic designations;
enabling a user to select a plurality of rooms from the index and associate functional requirements with the selected rooms;
wherein enabling the user to select a room from the index includes enabling the user to click in the floor plan on a room that was previously indexed;
wherein enabling the user to select a room from the index includes enabling the user to select a room from a list;
wherein the action includes application of a functional requirement containing at least one of a candela intensity, lux level, a decibel sound level, a Speech Transmission Index level, wireless signal strength, a pixel density level, door access control, a BTU level, or an energy consumption level;
accessing functional requirements associated with the plurality of rooms;
performing a generative analysis process in conjunction with technical specifications of equipment associated with the functional requirements;
outputting a solution that least partially conforms to the functional requirement;

wherein the action includes an application of a rule;
wherein the rule is an energy consumption rule;
wherein the rule is associated with a functional requirement of the group of rooms;
wherein the action includes adding equipment to the group of rooms;
wherein the action includes associating a technical specification with the group of rooms;
outputting the index
the system is implemented on a cloud based system Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules may be created using a variety of programming techniques. For example, programs, scripts, functions, program sections or program modules may be designed in or by means of languages, including JAVASCRIPT, C, C++, JAVA, PHP, PYTHON, RUBY, PERL, BASH, or other programming or scripting languages. One or more of such software sections or modules may be integrated into a computer system, non-transitory computer readable media, or existing communications software. The programs, modules, or code may also be implemented or replicated as firmware or circuit logic.

Moreover, while illustrative embodiments have been described herein, the scope may include any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A structural design system for extracting data from a 2D floor plan and retaining it in a building information model, the system comprising:
at least one processor configured to:
access a 2D floor plan demarcating a plurality of rooms;
identify, using machine learning, wall boundaries of the plurality of rooms;
store the identified wall boundaries in a retention data structure;
access a rule defining at least one respective height for the identified wall boundaries;
update the retention data structure to associate the identified wall boundaries with the at least one respective wall height;
generate a building information model, wherein the building information model includes the identified wall boundaries;
present the building information model in a 3D format;
display, at an interface, a comparison of at least a portion of the 2D floor plan and the building information model;
receive, from the interface, input based on the comparison; and
update the retention data structure based on the input.

2. The structural design system of claim 1, wherein the at least one processor is further configured to use geometric analysis to identify the wall boundaries.

3. The structural design system of claim 1, wherein the input received from the interface includes at least one of an instruction to delete a wall or an instruction to add a wall.

4. The structural design system of claim 1, wherein the input received from the interface includes an instruction to modify of at least one of wall length or thickness.

5. The structural design system of claim 1, wherein the input received from the interface includes an instruction to execute a floor plan remediation technique.

6. The structural design system of claim 1, wherein the at least one processor is further configured to output the building information model.

7. The structural design system of claim 1, wherein the at least one processor is further configured to perform at least one of saving or exporting the building information model in an industry foundation classes.

8. The structural design system of claim 1, wherein the 2D floor plan is a CAD file.

9. The structural design system of claim 1, wherein the 2D floor plan is a PDF file.

10. The structural design system of claim 1, wherein the 2D floor plan is an image file.

11. The structural design system of claim 1, wherein the at least one processor is further configured to identify rooms in the 2D floor plan, and the identifying wall boundaries of the plurality of rooms is based on identified rooms.

12. The structural design system of claim 1, wherein the at least one processor is further configured to identify rooms in at least one of the 2D floor plan or the building information model based on the identified wall boundaries.

13. The structural design system of claim 1, wherein the at least one processor is further configured to identify architectural features of the 2D floor plan and store the identified architectural features in the retention data structure.

14. The structural design system of claim 13, wherein the processor is further configured to associate an identified architectural feature with a building information model object.

15. The structural design system of claim 14, wherein associating the identified architectural feature with the building information object is based on a rule.

16. The structural design system of claim 1, wherein the at least one processor is further configured to identify equipment in the 2D floor plan located within the identified wall boundaries and store the identified equipment in the retention data structure.

17. The structural design system of claim 16, wherein the processor is further configured to associate the identified equipment with at least one building information model object.

18. The structural design system of claim 1, wherein the at least one processor is further configured to ignore at least one of a gridline, a dimension, or an irrelevant layer in the 2D floor plan.

19. The structural design system of claim 1, wherein the comparison of at least a portion of the 2D floor plan and the building information model includes a graphical indication of the identified wall boundaries.

20. The structural design system of claim 1, wherein the at least one processor is further configured to enable selection of an area of the 2D floor plan, and generating the building information model is based on the selection.

21. The structural design system of claim 1, wherein the building information model is in an industry foundation classes format.

22. The structural design system of claim 1, wherein the at least one processor is further configured to enable the aggregation of the 2D floor plan with one or more additional 2D floor plans into the building information model.

23. The structural design system of claim 1, wherein the system is further configured to perform a semantic enrichment process and add a semantic designation to at least one room of the plurality of rooms.

24. The structural design system of claim 1, wherein the at least one processor is further configured to identify wall material.

25. The structural design system of claim 1, wherein the system is implemented on a cloud based system.

26. A structural design system for extracting data from a 2D floor plan and retaining it in a building information model, the system comprising:
    at least one processor configured to:
    access a 2D floor plan demarcating a plurality of rooms;
    identify, using machine learning, wall boundaries of the plurality of rooms;
    store the identified wall boundaries in a retention data structure;
    generate a building information model, wherein the building information model includes the identified wall boundaries;
    display, at an interface, a comparison of at least a portion of the 2D floor plan and the building information model;
    receive, from the interface, input based on the comparison;
    update the retention data structure based on the input;
    receive functional requirements associated with the plurality rooms; and
    generatively analyze the plurality of rooms in conjunction with the functional requirement to identify at least one technical specification and at least one equipment placement location in order to at least partially conform to the functional requirement.

27. A structural design method for extracting data from a 2D floor plan and retaining it in a 3D model, the method comprising:
    accessing a 2D floor plan demarcating a plurality of rooms;
    identifying, using machine learning, wall boundaries of the plurality of rooms;
    storing the identified wall boundaries in a retention data structure;
    accessing a rule defining a respective height for the identified wall boundaries;
    generating the 3D model, wherein the 3D model includes the identified wall boundaries and wall height specified in the rule; and
    displaying, at an interface, a comparison of at least a portion of the 2D floor plan and the 3D model;
    receiving, from the interface, input based on the comparison; and
    altering the retention data structure based on the input.

28. A non-transitory computer readable medium comprising instructions that, when executed by at least one processor, cause the at least one processor to execute operations enabling a structural design method for extracting data from a 2D floor plan and retaining it in a 3D model, the operations comprising:
    accessing a 2D floor plan demarcating a plurality of rooms;
    identifying, using machine learning, wall boundaries of the plurality of rooms;
    storing the identified wall boundaries in a retention data structure;
    accessing a rule defining a respective height for the identified wall boundaries;
    generating the 3D model, wherein the 3D model includes the identified wall boundaries and wall height specified in the rule; and
    displaying, at an interface, a comparison of at least a portion of the 2D floor plan and the 3D model;
    receiving, from the interface, input based on the comparison; and
    altering the retention data structure based on the input.

29. A structural design system for extracting data from a 2D floor plan and retaining it in a building information model, the system comprising:
    at least one processor configured to:
    access a 2D floor plan demarcating a plurality of rooms;
    identify, using machine learning, wall boundaries of the plurality of rooms;
    store the identified wall boundaries in a retention data structure;
    generate a building information model, wherein the building information model includes the identified wall boundaries;
    display, at an interface, a comparison of at least a portion of the 2D floor plan and the building information model;
    receive, from the interface, input based on the comparison;
    update the retention data structure based on the input;
    identify equipment in the 2D floor plan located within the identified wall boundaries and store the identified equipment in the retention data structure; and
    associate the identified equipment with at least one building information model object based on a rule.

* * * * *